US012411927B2

(12) United States Patent
Dedonato et al.

(10) Patent No.: US 12,411,927 B2
(45) Date of Patent: Sep. 9, 2025

(54) DEVICES, METHODS, AND GRAPHICAL USER INTERFACES FOR USER AUTHENTICATION AND DEVICE MANAGEMENT

(71) Applicant: Apple Inc., Cupertino, CA (US)

(72) Inventors: Amy E. Dedonato, San Francisco, CA (US); Jonathan R. Dascola, San Francisco, CA (US); Katherine W. Kolombatovich, San Francisco, CA (US); Vitalii Kramar, Woodinville, WA (US); Jay Moon, San Francisco, CA (US); Joseph Y. Chan, San Francisco, CA (US)

(73) Assignee: Apple Inc., Cupertino, CA (US)

(*) Notice: Subject to any disclaimer, the term of this patent is extended or adjusted under 35 U.S.C. 154(b) by 170 days.

(21) Appl. No.: 18/374,606

(22) Filed: Sep. 28, 2023

(65) Prior Publication Data

US 2024/0020371 A1 Jan. 18, 2024

Related U.S. Application Data

(63) Continuation of application No. PCT/US2023/023627, filed on May 25, 2023.

(60) Provisional application No. 63/408,768, filed on Sep. 21, 2022, provisional application No. 63/346,168, filed on May 26, 2022.

(51) Int. Cl.

| | |
|---|---|
| ***G06F 21/32*** | (2013.01) |
| ***G06F 3/04815*** | (2022.01) |
| ***G06F 3/04842*** | (2022.01) |
| ***G06F 21/36*** | (2013.01) |

(52) U.S. Cl.

CPC .......... *G06F 21/32* (2013.01); *G06F 3/04815* (2013.01); *G06F 3/04842* (2013.01); *G06F 21/36* (2013.01); *G06F 2221/2149* (2013.01)

(58) Field of Classification Search

None

See application file for complete search history.

(56) References Cited

U.S. PATENT DOCUMENTS

| | | | | |
|---|---|---|---|---|
| 11,270,672 | B1 * | 3/2022 | Lee | G06F 3/012 |
| 12,124,675 | B2 * | 10/2024 | Berliner | G06F 3/011 |
| 2013/0015946 | A1 | 1/2013 | Lau et al. | |
| 2014/0368537 | A1 | 12/2014 | Salter et al. | |
| 2015/0317831 | A1 * | 11/2015 | Ebstyne | G06F 3/011 345/419 |

(Continued)

FOREIGN PATENT DOCUMENTS

| | | | |
|---|---|---|---|
| EP | 3528173 | A1 | 8/2019 |
| WO | 2018/226265 | A1 | 12/2018 |

(Continued)

OTHER PUBLICATIONS

International Search Report and Written Opinion received for PCT Patent Application No. PCT/US2023/023273, mailed on Sep. 15, 2023, 19 pages.

(Continued)

*Primary Examiner* — Linda Huynh

(74) *Attorney, Agent, or Firm* — DLA Piper LLP (US)

(57) ABSTRACT

The present disclosure generally relates to user interfaces for electronic devices, including user interfaces for user authentication and device management.

59 Claims, 72 Drawing Sheets

(56) References Cited

U.S. PATENT DOCUMENTS

| | | | |
|---|---|---|---|
| 2015/0317832 | A1 | 11/2015 | Ebstyne et al. |
| 2016/0284123 | A1 | 9/2016 | Hare et al. |
| 2018/0005435 | A1 | 1/2018 | Anderson et al. |
| 2018/0314066 | A1 | 11/2018 | Bell et al. |
| 2019/0005838 | A1 | 1/2019 | Yu et al. |
| 2019/0080070 | A1 | 3/2019 | Van Os et al. |
| 2019/0080072 | A1* | 3/2019 | Van Os .................. G06F 3/016 |
| 2019/0080189 | A1 | 3/2019 | Van Os et al. |
| 2019/0107990 | A1* | 4/2019 | Spivack .................. G06T 11/60 |
| 2019/0370448 | A1 | 12/2019 | Devine et al. |
| 2020/0104620 | A1 | 4/2020 | Cohen et al. |
| 2020/0193976 | A1 | 6/2020 | Cartwright et al. |
| 2020/0311429 | A1 | 10/2020 | Chen |
| 2021/0191600 | A1 | 6/2021 | Lemay et al. |
| 2022/0091663 | A1 | 3/2022 | Hashimoto et al. |
| 2022/0129882 | A1* | 4/2022 | Spender ............. G06Q 20/3278 |
| 2022/0229534 | A1 | 7/2022 | Terre et al. |
| 2022/0262080 | A1 | 8/2022 | Burton et al. |
| 2023/0026638 | A1* | 1/2023 | Schoen .................. G06F 3/012 |
| 2023/0326144 | A1 | 10/2023 | Insley |
| 2023/0384860 | A1 | 11/2023 | Dedonato et al. |
| 2024/0078846 | A1 | 3/2024 | Chyn et al. |
| 2024/0104849 | A1 | 3/2024 | Nie et al. |
| 2024/0214208 | A1* | 6/2024 | Herman ................ G06F 21/602 |
| 2024/0220009 | A1* | 7/2024 | Dryer .................... G06F 1/1626 |
| 2024/0289007 | A1 | 8/2024 | Mckenzie et al. |
| 2024/0393871 | A1 | 11/2024 | Thiebot et al. |
| 2024/0395073 | A1 | 11/2024 | Huergo Wagner et al. |
| 2025/0022237 | A1 | 1/2025 | Burton et al. |

FOREIGN PATENT DOCUMENTS

| | | |
|---|---|---|
| WO | 2021/071532 A1 | 4/2021 |
| WO | 2022/093401 A1 | 5/2022 |

OTHER PUBLICATIONS

International Search Report and Written Opinion received for PCT Patent Application No. PCT/US2023/023627, mailed on Nov. 28, 2023, 25 pages.

Non-Final Office Action received for U.S. Appl. No. 18/242,948, mailed on Sep. 6, 2024, 29 pages.

Invitation to Pay Additional Fees and Partial International Search Report received for PCT Patent Application No. PCT/US2023/023626, mailed on Sep. 19, 2023, 21 pages.

Invitation to Pay Additional Fees and Partial International Search Report received for PCT Patent Application No. PCT/US2023/023627, mailed on Sep. 21, 2023, 21 pages.

Krotov Ilya, "Bellus3D app experience", Available online at: https://www.youtube.com/watch?v=aSu688lY26c&t=45s, Aug. 17, 2021, 2 pages.

Liebers et al., "Using Gaze Behavior and Head Orientation for Implicit Identification in Virtual Reality", VRST '21: Proceedings of the 27th ACM Symposium on Virtual Reality Software and Technology, Available online at: https://doi.org/10.1145/3489849.3489880, Dec. 8-10, 2021, 9 pages.

Stephenson et al., "SoK: Authentication in Augmented and Virtual Reality", 2022 IEEE Symposium on Security and Privacy (SP), Available online at: https://pages.cs.wisc.edu/~chatterjee/papers/sok-arvr.pdf, 2022, 18 pages.

International Search Report and Written Opinion received for PCT Patent Application No. PCT/US2023/023626, mailed on Nov. 9, 2023, 25 pages.

Applicant-Initiated Interview Summary received for U.S. Appl. No. 18/242,948, mailed on Nov. 5, 2024, 5 pages.

Notice of Allowance received for U.S. Appl. No. 18/242,948, mailed on Nov. 21, 2024, 9 pages.

International Preliminary Report on Patentability received for PCT Patent Application No. PCT/US2023/023273, mailed on Dec. 5, 2024, 13 pages.

International Preliminary Report on Patentability received for PCT Patent Application No. PCT/US2023/023626, mailed on Dec. 5, 2024, 18 pages.

International Preliminary Report on Patentability received for PCT Patent Application No. PCT/US2023/023627, mailed on Dec. 5, 2024, 18 pages.

International Search Report and Written Opinion received for PCT Patent Application No. PCT/US2024/028208, mailed on Nov. 13, 2024, 20 pages.

Invitation to Pay Additional Fees and Partial International Search Report received for PCT Patent Application No. PCT/US2024/028208, mailed on Sep. 23, 2024, 12 pages.

International Preliminary Report on Patentability received for PCT Patent Application No. PCT/US2023/033208, mailed on Apr. 3, 2025, 10 pages.

Non-Final Office Action received for U.S. Appl. No. 18/131,833, mailed on Apr. 3, 2025, 15 pages.

* cited by examiner

Figure 10B:
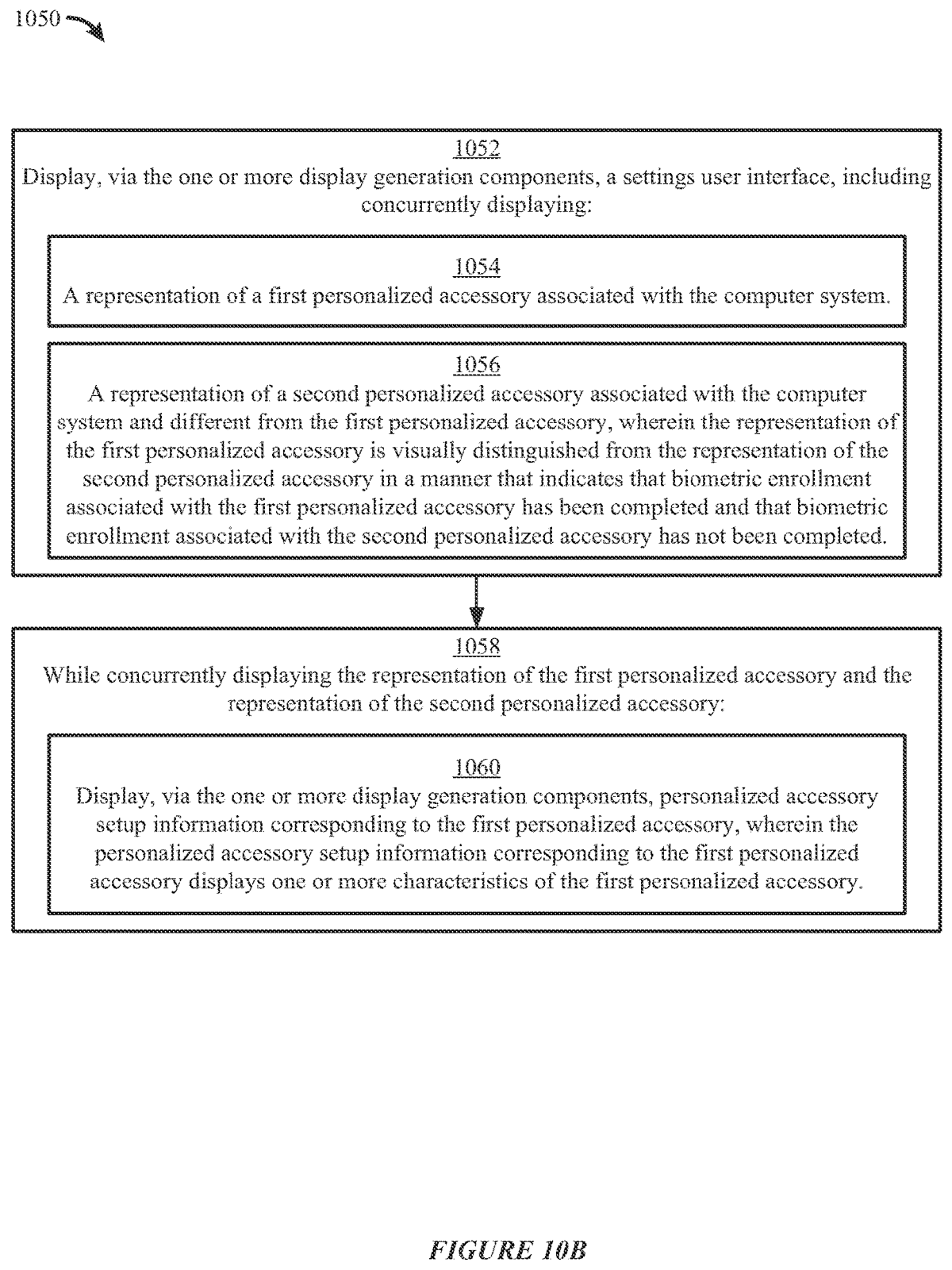

1050

1052
Display, via the one or more display generation components, a settings user interface, including concurrently displaying:

1054
A representation of a first personalized accessory associated with the computer system.

1056
A representation of a second personalized accessory associated with the computer system and different from the first personalized accessory, wherein the representation of the first personalized accessory is visually distinguished from the representation of the second personalized accessory in a manner that indicates that biometric enrollment associated with the first personalized accessory has been completed and that biometric enrollment associated with the second personalized accessory has not been completed.

1058
While concurrently displaying the representation of the first personalized accessory and the representation of the second personalized accessory:

1060
Display, via the one or more display generation components, personalized accessory setup information corresponding to the first personalized accessory, wherein the personalized accessory setup information corresponding to the first personalized accessory displays one or more characteristics of the first personalized accessory.

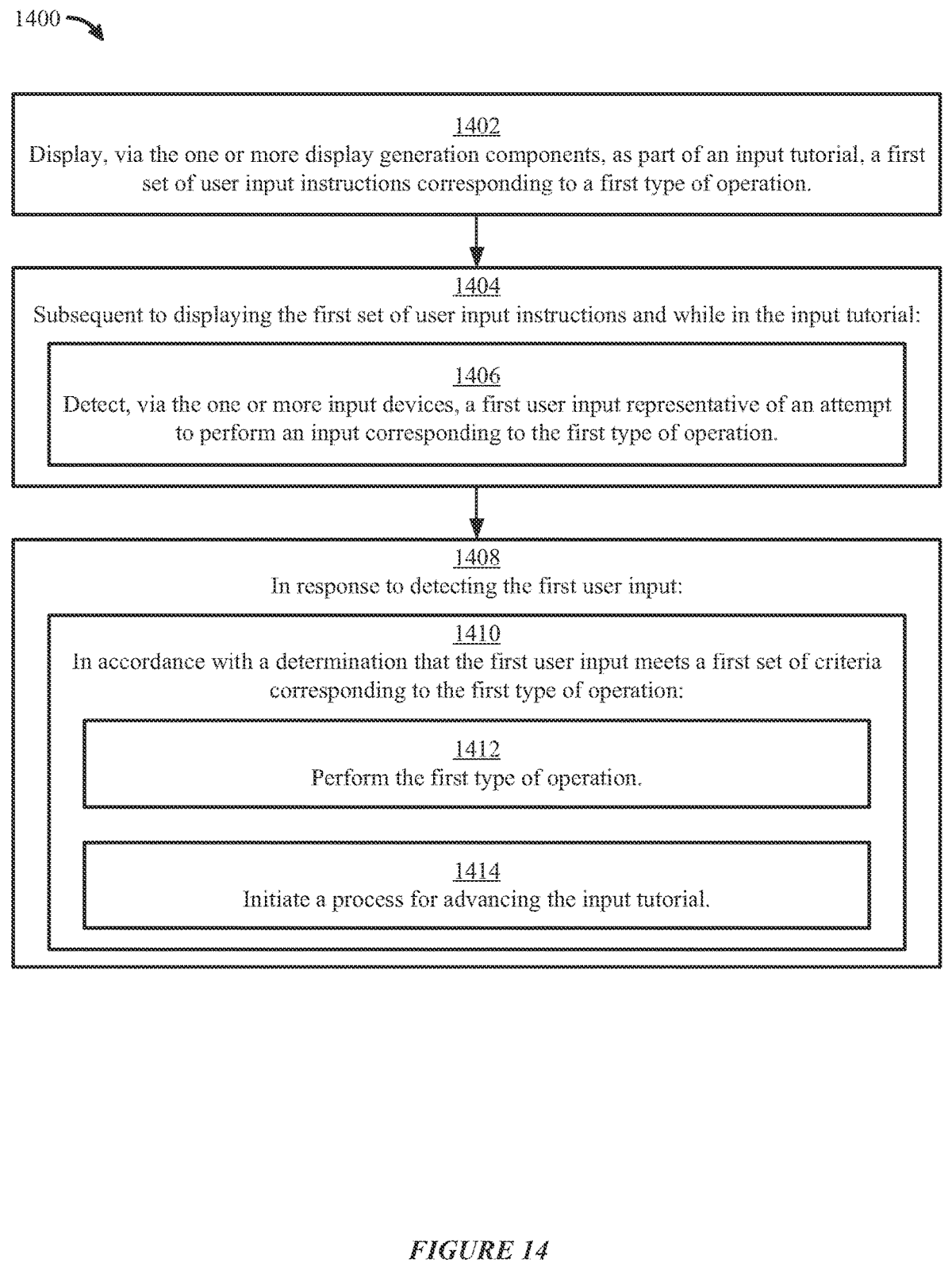

1402
Display, via the one or more display generation components, as part of an input tutorial, a first set of user input instructions corresponding to a first type of operation.

1404
Subsequent to displaying the first set of user input instructions and while in the input tutorial:

1406
Detect, via the one or more input devices, a first user input representative of an attempt to perform an input corresponding to the first type of operation.

1408
In response to detecting the first user input:

1410
In accordance with a determination that the first user input meets a first set of criteria corresponding to the first type of operation:

1412
Perform the first type of operation.

1414
Initiate a process for advancing the input tutorial.

*FIGURE 14*

DEVICES, METHODS, AND GRAPHICAL USER INTERFACES FOR USER AUTHENTICATION AND DEVICE MANAGEMENT

CROSS-REFERENCE TO RELATED APPLICATIONS

This application is a continuation of PCT Patent Application Serial No. PCT/US2023/023627, entitled "DEVICES, METHODS, AND GRAPHICAL USER INTERFACES FOR USER AUTHENTICATION AND DEVICE MANAGEMENT," filed on May 25, 2023, which claims priority to U.S. Provisional Patent Application No. 63/346,168, entitled "DEVICES, METHODS, AND GRAPHICAL USER INTERFACES FOR USER AUTHENTICATION AND DEVICE MANAGEMENT," filed on May 26, 2022, and to U.S. Provisional Patent Application No. 63/408,768, entitled "DEVICES, METHODS, AND GRAPHICAL USER INTERFACES FOR USER AUTHENTICATION AND DEVICE MANAGEMENT," filed on Sep. 21, 2022. The contents of each of these applications are incorporated herein by reference in their entirety.

TECHNICAL FIELD

The present disclosure relates generally to computer systems that are in communication with a display generation component and, optionally, one or more input devices that provide computer-generated experiences, including, but not limited to, electronic devices that provide virtual reality and mixed reality experiences via a display.

BACKGROUND

The development of computer systems for augmented reality has increased significantly in recent years. Example augmented reality environments include at least some virtual elements that replace or augment the physical world. Input devices, such as cameras, controllers, joysticks, touch-sensitive surfaces, and touch-screen displays for computer systems and other electronic computing devices are used to interact with virtual/augmented reality environments. Example virtual elements include virtual objects, such as digital images, video, text, icons, and control elements such as buttons and other graphics.

SUMMARY

Some methods and interfaces for user authentication and device management on devices that display and/or provide at least some virtual elements (e.g., applications, augmented reality environments, mixed reality environments, and virtual reality environments) are cumbersome, inefficient, and limited. For example, systems that provide insufficient feedback for performing actions associated with virtual objects, systems that require a series of inputs to achieve a desired outcome in an augmented reality environment, and systems in which manipulation of virtual objects are complex, tedious, and error-prone, create a significant cognitive burden on a user, and detract from the experience with the virtual/augmented reality environment. In addition, these methods take longer than necessary, thereby wasting energy of the computer system. This latter consideration is particularly important in battery-operated devices.

Accordingly, there is a need for computer systems with improved methods and interfaces for providing user authentication and device management that make interaction with the computer systems more efficient and intuitive for a user. Such methods and interfaces optionally complement or replace conventional methods for providing user authentication and/or device management. Such methods and interfaces reduce the number, extent, and/or nature of the inputs from a user by helping the user to understand the connection between provided inputs and device responses to the inputs, thereby creating a more efficient human-machine interface.

The above deficiencies and other problems associated with user interfaces for computer systems are reduced or eliminated by the disclosed systems. In some embodiments, the computer system is a desktop computer with an associated display. In some embodiments, the computer system is portable device (e.g., a notebook computer, tablet computer, or handheld device). In some embodiments, the computer system is a personal electronic device (e.g., a wearable electronic device, such as a watch, or a head-mounted device). In some embodiments, the computer system has a touchpad. In some embodiments, the computer system has one or more cameras. In some embodiments, the computer system has a touch-sensitive display (also known as a "touch screen" or "touch-screen display"). In some embodiments, the computer system has one or more eye-tracking components. In some embodiments, the computer system has one or more hand-tracking components. In some embodiments, the computer system has one or more output devices in addition to the display generation component, the output devices including one or more tactile output generators and/or one or more audio output devices. In some embodiments, the computer system has a graphical user interface (GUI), one or more processors, memory and one or more modules, programs or sets of instructions stored in the memory for performing multiple functions. In some embodiments, the user interacts with the GUI through a stylus and/or finger contacts and gestures on the touch-sensitive surface, movement of the user's eyes and hand in space relative to the GUI (and/or computer system) or the user's body as captured by cameras and other movement sensors, and/or voice inputs as captured by one or more audio input devices. In some embodiments, the functions performed through the interactions optionally include image editing, drawing, presenting, word processing, spreadsheet making, game playing, telephoning, video conferencing, e-mailing, instant messaging, workout support, digital photographing, digital videoing, web browsing, digital music playing, note taking, and/or digital video playing. Executable instructions for performing these functions are, optionally, included in a transitory and/or non-transitory computer readable storage medium or other computer program product configured for execution by one or more processors.

There is a need for electronic devices with improved methods and interfaces for user authentication and device management. Such methods and interfaces may complement or replace conventional methods for user authentication and device management. Such methods and interfaces reduce the number, extent, and/or the nature of the inputs from a user and produce a more efficient human-machine interface. For battery-operated computing devices, such methods and interfaces conserve power and increase the time between battery charges.

In accordance with some embodiments, a method is described. The method comprises: at a computer system that is in communication with one or more display generation components and one or more input devices: detecting, via the one or more input devices, a request to authenticate a user; in response to detecting the request to authenticate the user: displaying, via the one or more display generation components, in a three-dimensional environment, a first authentication user interface that includes a first user interface object, wherein: the first user interface object is a viewpoint-locked object that stays in a respective region of a field of view of the user as the viewpoint of the user shifts relative to the three-dimensional environment; and the first user interface object is part of a user interface for biometric authentication; and subsequent to displaying the first authentication user interface in the three-dimensional environment, performing a first authentication of the user; and in response to performing the first authentication of the user: in accordance with a determination that the first authentication of the user fails to authenticate the user, displaying, via the one or more display generation components, a second authentication user interface different from the first authentication user interface, wherein the second authentication user interface includes a second user interface object that is an environment-locked object that moves out of the respective region of the field of view of the user as the viewpoint of the user shifts relative to the three-dimensional environment.

In accordance with some embodiments, a non-transitory computer-readable storage medium is described. In some embodiments, the non-transitory computer-readable storage medium stores one or more programs configured to be executed by one or more processors of a computer system that is in communication with one or more display generation components and one or more input devices, the one or more programs including instructions for: detecting, via the one or more input devices, a request to authenticate a user; in response to detecting the request to authenticate the user: displaying, via the one or more display generation components, in a three-dimensional environment, a first authentication user interface that includes a first user interface object, wherein: the first user interface object is a viewpoint-locked object that stays in a respective region of a field of view of the user as the viewpoint of the user shifts relative to the three-dimensional environment; and the first user interface object is part of a user interface for biometric authentication; and subsequent to displaying the first authentication user interface in the three-dimensional environment, performing a first authentication of the user; and in response to performing the first authentication of the user: in accordance with a determination that the first authentication of the user fails to authenticate the user, displaying, via the one or more display generation components, a second authentication user interface different from the first authentication user interface, wherein the second authentication user interface includes a second user interface object that is an environment-locked object that moves out of the respective region of the field of view of the user as the viewpoint of the user shifts relative to the three-dimensional environment.

In accordance with some embodiments, a transitory computer-readable storage medium is described. In some embodiments, the transitory computer-readable storage medium stores one or more programs configured to be executed by one or more processors of a computer system that is in communication with one or more display generation components and one or more input devices, the one or more programs including instructions for: detecting, via the one or more input devices, a request to authenticate a user; in response to detecting the request to authenticate the user: displaying, via the one or more display generation components, in a three-dimensional environment, a first authentication user interface that includes a first user interface object, wherein: the first user interface object is a viewpoint-locked object that stays in a respective region of a field of view of the user as the viewpoint of the user shifts relative to the three-dimensional environment; and the first user interface object is part of a user interface for biometric authentication; and subsequent to displaying the first authentication user interface in the three-dimensional environment, performing a first authentication of the user; and in response to performing the first authentication of the user: in accordance with a determination that the first authentication of the user fails to authenticate the user, displaying, via the one or more display generation components, a second authentication user interface different from the first authentication user interface, wherein the second authentication user interface includes a second user interface object that is an environment-locked object that moves out of the respective region of the field of view of the user as the viewpoint of the user shifts relative to the three-dimensional environment.

In accordance with some embodiments, a computer system is described. In some embodiments, the computer system is configured to communicate with one or more display generation components and one or more input devices, and comprises: one or more processors; and memory storing one or more programs configured to be executed by the one or more processors, the one or more programs including instructions for: detecting, via the one or more input devices, a request to authenticate a user; in response to detecting the request to authenticate the user: displaying, via the one or more display generation components, in a three-dimensional environment, a first authentication user interface that includes a first user interface object, wherein: the first user interface object is a viewpoint-locked object that stays in a respective region of a field of view of the user as the viewpoint of the user shifts relative to the three-dimensional environment; and the first user interface object is part of a user interface for biometric authentication; and subsequent to displaying the first authentication user interface in the three-dimensional environment, performing a first authentication of the user; and in response to performing the first authentication of the user: in accordance with a determination that the first authentication of the user fails to authenticate the user, displaying, via the one or more display generation components, a second authentication user interface different from the first authentication user interface, wherein the second authentication user interface includes a second user interface object that is an environment-locked object that moves out of the respective region of the field of view of the user as the viewpoint of the user shifts relative to the three-dimensional environment.

In accordance with some embodiments, a computer system is described. In some embodiments, the computer system is configured to communicate with one or more display generation components and one or more input devices, and the computer system comprises: means for detecting, via the one or more input devices, a request to authenticate a user; means for, in response to detecting the request to authenticate the user: displaying, via the one or more display generation components, in a three-dimensional environment, a first authentication user interface that includes a first user interface object, wherein: the first user interface object is a viewpoint-locked object that stays in a respective region of a field of view of the user as the viewpoint of the user shifts relative to the three-dimensional environment; and the first user interface object is part of a user interface for biometric authentication; and means for, subsequent to displaying the first authentication user interface in the three-dimensional environment, performing a first authentication of the user; and means for, in response to performing the first authentication of the user: in accordance with a determination that the first authentication of the user fails to authenticate the user, displaying, via the one or more display generation components, a second authentication user interface different from the first authentication user interface, wherein the second authentication user interface includes a second user interface object that is an environment-locked object that moves out of the respective region of the field of view of the user as the viewpoint of the user shifts relative to the three-dimensional environment.

In accordance with some embodiments, a computer program product is described. In some embodiments, the computer program product comprises one or more programs configured to be executed by one or more processors of a computer system that is in communication with one or more display generation components and one or more input devices, the one or more programs including instructions for: detecting, via the one or more input devices, a request to authenticate a user; in response to detecting the request to authenticate the user: displaying, via the one or more display generation components, in a three-dimensional environment, a first authentication user interface that includes a first user interface object, wherein: the first user interface object is a viewpoint-locked object that stays in a respective region of a field of view of the user as the viewpoint of the user shifts relative to the three-dimensional environment; and the first user interface object is part of a user interface for biometric authentication; and subsequent to displaying the first authentication user interface in the three-dimensional environment, performing a first authentication of the user; and in response to performing the first authentication of the user: in accordance with a determination that the first authentication of the user fails to authenticate the user, displaying, via the one or more display generation components, a second authentication user interface different from the first authentication user interface, wherein the second authentication user interface includes a second user interface object that is an environment-locked object that moves out of the respective region of the field of view of the user as the viewpoint of the user shifts relative to the three-dimensional environment.

In accordance with some embodiments, a method is described. The method comprises: at a computer system that is in communication with one or more display generation components and one or more input devices: while the computer system is in a locked state, performing a first authentication of a user; and in response to performing the first authentication of the user: in accordance with a determination that the first authentication of the user successfully authenticates the user, transitioning the computer system from the locked state to an unlocked state in which a first set of features are made accessible to the user; in accordance with a determination that the first authentication of the user fails to authenticate the user and that a set of guest mode criteria are satisfied, displaying, via the one or more display generation components, a guest mode user interface object that is selectable to cause the computer system to enter a guest mode state in which a second set of features different from the first set of features are made accessible to the user, wherein the first set of features includes one or more features that are not included in the second set of features; and in accordance with a determination that the first authentication of the user fails to authenticate the user and that the set of guest mode criteria are not satisfied, forgoing display of the guest mode user interface object.

In accordance with some embodiments, a non-transitory computer-readable storage medium is described. In some embodiments, the non-transitory computer-readable storage medium stores one or more programs configured to be executed by one or more processors of a computer system that is in communication with one or more display generation components and one or more input devices, the one or more programs including instructions for: while the computer system is in a locked state, performing a first authentication of a user; and in response to performing the first authentication of the user: in accordance with a determination that the first authentication of the user successfully authenticates the user, transitioning the computer system from the locked state to an unlocked state in which a first set of features are made accessible to the user; in accordance with a determination that the first authentication of the user fails to authenticate the user and that a set of guest mode criteria are satisfied, displaying, via the one or more display generation components, a guest mode user interface object that is selectable to cause the computer system to enter a guest mode state in which a second set of features different from the first set of features are made accessible to the user, wherein the first set of features includes one or more features that are not included in the second set of features; and in accordance with a determination that the first authentication of the user fails to authenticate the user and that the set of guest mode criteria are not satisfied, forgoing display of the guest mode user interface object.

In accordance with some embodiments, a transitory computer-readable storage medium is described. In some embodiments, the transitory computer-readable storage medium stores one or more programs configured to be executed by one or more processors of a computer system that is in communication with one or more display generation components and one or more input devices, the one or more programs including instructions for: while the computer system is in a locked state, performing a first authentication of a user; and in response to performing the first authentication of the user: in accordance with a determination that the first authentication of the user successfully authenticates the user, transitioning the computer system from the locked state to an unlocked state in which a first set of features are made accessible to the user; in accordance with a determination that the first authentication of the user fails to authenticate the user and that a set of guest mode criteria are satisfied, displaying, via the one or more display generation components, a guest mode user interface object that is selectable to cause the computer system to enter a guest mode state in which a second set of features different from the first set of features are made accessible to the user, wherein the first set of features includes one or more features that are not included in the second set of features; and in accordance with a determination that the first authentication of the user fails to authenticate the user and that the set of guest mode criteria are not satisfied, forgoing display of the guest mode user interface object.

In accordance with some embodiments, a computer system is described. In some embodiments, the computer system is configured to communicate with one or more display generation components and one or more input devices, and the computer system comprises: one or more processors; and memory storing one or more programs configured to be executed by the one or more processors, the one or more programs including instructions for: while the computer system is in a locked state, performing a first authentication of a user; and in response to performing the first authentication of the user: in accordance with a determination that the first authentication of the user successfully authenticates the user, transitioning the computer system from the locked state to an unlocked state in which a first set of features are made accessible to the user; in accordance with a determination that the first authentication of the user fails to authenticate the user and that a set of guest mode criteria are satisfied, displaying, via the one or more display generation components, a guest mode user interface object that is selectable to cause the computer system to enter a guest mode state in which a second set of features different from the first set of features are made accessible to the user, wherein the first set of features includes one or more features that are not included in the second set of features; and in accordance with a determination that the first authentication of the user fails to authenticate the user and that the set of guest mode criteria are not satisfied, forgoing display of the guest mode user interface object.

In accordance with some embodiments, a computer system is described. In some embodiments, the computer system is configured to communicate with one or more display generation components and one or more input devices, and the computer system comprises: means for, while the computer system is in a locked state, performing a first authentication of a user; and means for, in response to performing the first authentication of the user: in accordance with a determination that the first authentication of the user successfully authenticates the user, transitioning the computer system from the locked state to an unlocked state in which a first set of features are made accessible to the user; in accordance with a determination that the first authentication of the user fails to authenticate the user and that a set of guest mode criteria are satisfied, displaying, via the one or more display generation components, a guest mode user interface object that is selectable to cause the computer system to enter a guest mode state in which a second set of features different from the first set of features are made accessible to the user, wherein the first set of features includes one or more features that are not included in the second set of features; and in accordance with a determination that the first authentication of the user fails to authenticate the user and that the set of guest mode criteria are not satisfied, forgoing display of the guest mode user interface object.

In accordance with some embodiments, a computer program product is described. In some embodiments, the computer program product comprises one or more programs configured to be executed by one or more processors of a computer system that is in communication with one or more display generation components and one or more input devices, the one or more programs including instructions for: while the computer system is in a locked state, performing a first authentication of a user; and in response to performing the first authentication of the user: in accordance with a determination that the first authentication of the user successfully authenticates the user, transitioning the computer system from the locked state to an unlocked state in which a first set of features are made accessible to the user; in accordance with a determination that the first authentication of the user fails to authenticate the user and that a set of guest mode criteria are satisfied, displaying, via the one or more display generation components, a guest mode user interface object that is selectable to cause the computer system to enter a guest mode state in which a second set of features different from the first set of features are made accessible to the user, wherein the first set of features includes one or more features that are not included in the second set of features; and in accordance with a determination that the first authentication of the user fails to authenticate the user and that the set of guest mode criteria are not satisfied, forgoing display of the guest mode user interface object.

In accordance with some embodiments, a method is described. The method comprises: at a computer system that is in communication with one or more display generation components and one or more input devices: detecting, via the one or more input devices, that a first set of criteria are satisfied; in response to detecting that the first set of criteria are satisfied: in accordance with a determination that the computer system has detected a personalized accessory connected to the computer system without the computer system having corresponding biometric enrollment data for the personalized accessory, displaying, via the one or more display generation components, a first user interface that prompts a user to provide biometric enrollment data corresponding to the personalized accessory; and in accordance with a determination that the computer system has not detected a personalized accessory connected to the computer system without the computer system having corresponding biometric enrollment data for the personalized accessory, forgoing display of the first user interface.

In accordance with some embodiments, a non-transitory computer-readable storage medium is described. In some embodiments, the non-transitory computer-readable storage medium stores one or more programs configured to be executed by one or more processors of a computer system that is in communication with one or more display generation components and one or more input devices, the one or more programs including instructions for: detecting, via the one or more input devices, that a first set of criteria are satisfied; in response to detecting that the first set of criteria are satisfied: in accordance with a determination that the computer system has detected a personalized accessory connected to the computer system without the computer system having corresponding biometric enrollment data for the personalized accessory, displaying, via the one or more display generation components, a first user interface that prompts a user to provide biometric enrollment data corresponding to the personalized accessory; and in accordance with a determination that the computer system has not detected a personalized accessory connected to the computer system without the computer system having corresponding biometric enrollment data for the personalized accessory, forgoing display of the first user interface.

In accordance with some embodiments, a transitory computer-readable storage medium is described. In some embodiments, the transitory computer-readable storage medium stores one or more programs configured to be executed by one or more processors of a computer system that is in communication with one or more display generation components and one or more input devices, the one or more programs including instructions for: detecting, via the one or more input devices, that a first set of criteria are satisfied; in response to detecting that the first set of criteria are satisfied: in accordance with a determination that the computer system has detected a personalized accessory connected to the computer system without the computer system having corresponding biometric enrollment data for the personalized accessory, displaying, via the one or more display generation components, a first user interface that prompts a user to provide biometric enrollment data corresponding to the personalized accessory; and in accordance with a determination that the computer system has not detected a personalized accessory connected to the computer system without the computer system having corresponding biometric enrollment data for the personalized accessory, forgoing display of the first user interface.

In accordance with some embodiments, a computer system is described. In some embodiments, the computer system is configured to communicate with one or more display generation components and one or more input devices, and the computer system comprises: one or more processors; and memory storing one or more programs configured to be executed by the one or more processors, the one or more programs including instructions for: detecting, via the one or more input devices, that a first set of criteria are satisfied; in response to detecting that the first set of criteria are satisfied: in accordance with a determination that the computer system has detected a personalized accessory connected to the computer system without the computer system having corresponding biometric enrollment data for the personalized accessory, displaying, via the one or more display generation components, a first user interface that prompts a user to provide biometric enrollment data corresponding to the personalized accessory; and in accordance with a determination that the computer system has not detected a personalized accessory connected to the computer system without the computer system having corresponding biometric enrollment data for the personalized accessory, forgoing display of the first user interface.

In accordance with some embodiments, a computer system is described. In some embodiments, the computer system is configured to communicate with one or more display generation components and one or more input devices, and the computer system comprises: means for detecting, via the one or more input devices, that a first set of criteria are satisfied; means for, in response to detecting that the first set of criteria are satisfied: in accordance with a determination that the computer system has detected a personalized accessory connected to the computer system without the computer system having corresponding biometric enrollment data for the personalized accessory, displaying, via the one or more display generation components, a first user interface that prompts a user to provide biometric enrollment data corresponding to the personalized accessory; and in accordance with a determination that the computer system has not detected a personalized accessory connected to the computer system without the computer system having corresponding biometric enrollment data for the personalized accessory, forgoing display of the first user interface.

In accordance with some embodiments, a computer program product is described. In some embodiments, the computer program product comprises one or more programs configured to be executed by one or more processors of a computer system that is in communication with one or more display generation components and one or more input devices, the one or more programs including instructions for: detecting, via the one or more input devices, that a first set of criteria are satisfied; in response to detecting that the first set of criteria are satisfied: on accordance with a determination that the computer system has detected a personalized accessory connected to the computer system without the computer system having corresponding biometric enrollment data for the personalized accessory, displaying, via the one or more display generation components, a first user interface that prompts a user to provide biometric enrollment data corresponding to the personalized accessory; and in accordance with a determination that the computer system has not detected a personalized accessory connected to the computer system without the computer system having corresponding biometric enrollment data for the personalized accessory, forgoing display of the first user interface.

In accordance with some embodiments, a method is described. The method comprises: at a computer system that is in communication with one or more display generation components and one or more input devices: displaying, via the one or more display generation components, a settings user interface, including concurrently displaying: a representation of a first personalized accessory associated with the computer system; and a representation of a second personalized accessory associated with the computer system and different from the first personalized accessory, wherein the representation of the first personalized accessory is visually distinguished from the representation of the second personalized accessory in a manner that indicates that biometric enrollment associated with the first personalized accessory has been completed and that biometric enrollment associated with the second personalized accessory has not been completed.

In accordance with some embodiments, a non-transitory computer-readable storage medium is described. In some embodiments, the non-transitory computer-readable storage medium stores one or more programs configured to be executed by one or more processors of a computer system that is in communication with one or more display generation components and one or more input devices, the one or more programs including instructions for: displaying, via the one or more display generation components, a settings user interface, including concurrently displaying: a representation of a first personalized accessory associated with the computer system; and a representation of a second personalized accessory associated with the computer system and different from the first personalized accessory, wherein the representation of the first personalized accessory is visually distinguished from the representation of the second personalized accessory in a manner that indicates that biometric enrollment associated with the first personalized accessory has been completed and that biometric enrollment associated with the second personalized accessory has not been completed.

In accordance with some embodiments, a transitory computer-readable storage medium is described. In some embodiments, the transitory computer-readable storage medium stores one or more programs configured to be executed by one or more processors of a computer system that is in communication with one or more display generation components and one or more input devices, the one or more programs including instructions for: displaying, via the one or more display generation components, a settings user interface, including concurrently displaying: a representation of a first personalized accessory associated with the computer system; and a representation of a second personalized accessory associated with the computer system and different from the first personalized accessory, wherein the representation of the first personalized accessory is visually distinguished from the representation of the second personalized accessory in a manner that indicates that biometric enrollment associated with the first personalized accessory has been completed and that biometric enrollment associated with the second personalized accessory has not been completed.

In accordance with some embodiments, a computer system is described. In some embodiments, the computer system is configured to communicate with one or more display generation components and one or more input devices, and the computer system comprises: one or more processors; and memory storing one or more programs configured to be executed by the one or more processors, the one or more programs including instructions for: displaying, via the one or more display generation components, a settings user interface, including concurrently displaying: a representation of a first personalized accessory associated with the computer system; and a representation of a second personalized accessory associated with the computer system and different from the first personalized accessory, wherein the representation of the first personalized accessory is visually distinguished from the representation of the second personalized accessory in a manner that indicates that biometric enrollment associated with the first personalized accessory has been completed and that biometric enrollment associated with the second personalized accessory has not been completed.

In accordance with some embodiments, a computer system is described. In some embodiments, the computer system is configured to communicate with one or more display generation components and one or more input devices, and the computer system comprises: means for displaying, via the one or more display generation components, a settings user interface, including concurrently displaying: a representation of a first personalized accessory associated with the computer system; and a representation of a second personalized accessory associated with the computer system and different from the first personalized accessory, wherein the representation of the first personalized accessory is visually distinguished from the representation of the second personalized accessory in a manner that indicates that biometric enrollment associated with the first personalized accessory has been completed and that biometric enrollment associated with the second personalized accessory has not been completed.

In accordance with some embodiments, a computer program product is described. In some embodiments, the computer program product comprises one or more programs configured to be executed by one or more processors of a computer system that is in communication with one or more display generation components and one or more input devices, the one or more programs including instructions for: displaying, via the one or more display generation components, a settings user interface, including concurrently displaying: a representation of a first personalized accessory associated with the computer system; and a representation of a second personalized accessory associated with the computer system and different from the first personalized accessory, wherein the representation of the first personalized accessory is visually distinguished from the representation of the second personalized accessory in a manner that indicates that biometric enrollment associated with the first personalized accessory has been completed and that biometric enrollment associated with the second personalized accessory has not been completed.

In accordance with some embodiments, a method is described. The method comprises: at a computer system that is in communication with one or more display generation components: detecting that a companion device satisfies a first set of criteria including a first criterion that is satisfied when the companion device has initiated a set up process; and in response to detecting that the companion device satisfies the first set of criteria: in accordance with a determination that the companion device is in a first state, displaying, via the one or more display generation components of the computer system, a first quick start user interface; and in accordance with a determination that the companion device is in a second state different from the first state, displaying, via the one or more display generation components of the computer system, a second quick start user interface different from the first quick start user interface.

In accordance with some embodiments, a non-transitory computer-readable storage medium is described. In some embodiments, the non-transitory computer-readable storage medium stores one or more programs configured to be executed by one or more processors of a computer system that is in communication with one or more display generation components and one or more input devices, the one or more programs including instructions for: detecting that a companion device satisfies a first set of criteria including a first criterion that is satisfied when the companion device has initiated a set up process; and in response to detecting that the companion device satisfies the first set of criteria: in accordance with a determination that the companion device is in a first state, displaying, via the one or more display generation components of the computer system, a first quick start user interface; and in accordance with a determination that the companion device is in a second state different from the first state, displaying, via the one or more display generation components of the computer system, a second quick start user interface different from the first quick start user interface.

In accordance with some embodiments, a transitory computer-readable storage medium is described. In some embodiments, the transitory computer-readable storage medium stores one or more programs configured to be executed by one or more processors of a computer system that is in communication with one or more display generation components and one or more input devices, the one or more programs including instructions for: detecting that a companion device satisfies a first set of criteria including a first criterion that is satisfied when the companion device has initiated a set up process; and in response to detecting that the companion device satisfies the first set of criteria: in accordance with a determination that the companion device is in a first state, displaying, via the one or more display generation components of the computer system, a first quick start user interface; and in accordance with a determination that the companion device is in a second state different from the first state, displaying, via the one or more display generation components of the computer system, a second quick start user interface different from the first quick start user interface.

In accordance with some embodiments, a computer system is described. In some embodiments, the computer system is configured to communicate with one or more display generation components and one or more input devices, and the computer system comprises: one or more processors; and memory storing one or more programs configured to be executed by the one or more processors, the one or more programs including instructions for: detecting that a companion device satisfies a first set of criteria including a first criterion that is satisfied when the companion device has initiated a set up process; and in response to detecting that the companion device satisfies the first set of criteria: in accordance with a determination that the companion device is in a first state, displaying, via the one or more display generation components of the computer system, a first quick start user interface; and in accordance with a determination that the companion device is in a second state different from the first state, displaying, via the one or more display generation components of the computer system, a second quick start user interface different from the first quick start user interface.

In accordance with some embodiments, a computer system is described. In some embodiments, the computer system is configured to communicate with one or more display generation components and one or more input devices, and the computer system comprises: means for detecting that a companion device satisfies a first set of criteria including a first criterion that is satisfied when the companion device has initiated a set up process; and means for, in response to detecting that the companion device satisfies the first set of criteria: in accordance with a determination that the companion device is in a first state, displaying, via the one or more display generation components of the computer system, a first quick start user interface; and in accordance with a determination that the companion device is in a second state different from the first state, displaying, via the one or more display generation components of the computer system, a second quick start user interface different from the first quick start user interface.

In accordance with some embodiments, a computer program product is described. In some embodiments, the computer program product comprises one or more programs configured to be executed by one or more processors of a computer system that is in communication with one or more display generation components and one or more input devices, the one or more programs including instructions for: detecting that a companion device satisfies a first set of criteria including a first criterion that is satisfied when the companion device has initiated a set up process; and in response to detecting that the companion device satisfies the first set of criteria: in accordance with a determination that the companion device is in a first state, displaying, via the one or more display generation components of the computer system, a first quick start user interface; and in accordance with a determination that the companion device is in a second state different from the first state, displaying, via the one or more display generation components of the computer system, a second quick start user interface different from the first quick start user interface.

In accordance with some embodiments, a method is described. The method comprises: at a computer system that is in communication with one or more display generation components and one or more input devices: displaying, via the one or more display generation components, as part of an input tutorial, a first set of user input instructions corresponding to a first type of operation; subsequent to displaying the first set of user input instructions and while in the input tutorial, detecting, via the one or more input devices, a first user input representative of an attempt to perform an input corresponding to the first type of operation; and in response to detecting the first user input: in accordance with a determination that the first user input meets a first set of criteria corresponding to the first type of operation: performing the first type of operation; and initiating a process for advancing the input tutorial.

In accordance with some embodiments, a non-transitory computer-readable storage medium is described. In some embodiments, the non-transitory computer-readable storage medium stores one or more programs configured to be executed by one or more processors of a computer system that is in communication with one or more display generation components and one or more input devices, the one or more programs including instructions for: displaying, via the one or more display generation components, as part of an input tutorial, a first set of user input instructions corresponding to a first type of operation; subsequent to displaying the first set of user input instructions and while in the input tutorial, detecting, via the one or more input devices, a first user input representative of an attempt to perform an input corresponding to the first type of operation; and in response to detecting the first user input: in accordance with a determination that the first user input meets a first set of criteria corresponding to the first type of operation: performing the first type of operation; and initiating a process for advancing the input tutorial.

In accordance with some embodiments, a transitory computer-readable storage medium is described. In some embodiments, the transitory computer-readable storage medium stores one or more programs configured to be executed by one or more processors of a computer system that is in communication with one or more display generation components and one or more input devices, the one or more programs including instructions for: displaying, via the one or more display generation components, as part of an input tutorial, a first set of user input instructions corresponding to a first type of operation; subsequent to displaying the first set of user input instructions and while in the input tutorial, detecting, via the one or more input devices, a first user input representative of an attempt to perform an input corresponding to the first type of operation; and in response to detecting the first user input: in accordance with a determination that the first user input meets a first set of criteria corresponding to the first type of operation: performing the first type of operation; and initiating a process for advancing the input tutorial.

In accordance with some embodiments, a computer system is described. In some embodiments, the computer system is configured to communicate with one or more display generation components and one or more input devices, and the computer system comprises: one or more processors; and memory storing one or more programs configured to be executed by the one or more processors, the one or more programs including instructions for: displaying, via the one or more display generation components, as part of an input tutorial, a first set of user input instructions corresponding to a first type of operation; subsequent to displaying the first set of user input instructions and while in the input tutorial, detecting, via the one or more input devices, a first user input representative of an attempt to perform an input corresponding to the first type of operation; and in response to detecting the first user input: in accordance with a determination that the first user input meets a first set of criteria corresponding to the first type of operation: performing the first type of operation; and initiating a process for advancing the input tutorial.

In accordance with some embodiments, a computer system is described. In some embodiments, the computer system is configured to communicate with one or more display generation components and one or more input devices, and the computer system comprises: means for displaying, via the one or more display generation components, as part of an input tutorial, a first set of user input instructions corresponding to a first type of operation; means for, subsequent to displaying the first set of user input instructions and while in the input tutorial, detecting, via the one or more input devices, a first user input representative of an attempt to perform an input corresponding to the first type of operation; and means for, in response to detecting the first user input: in accordance with a determination that the first user input meets a first set of criteria corresponding to the first type of operation: performing the first type of operation; and initiating a process for advancing the input tutorial.

In accordance with some embodiments, a computer program product is described. In some embodiments, the computer program product comprises one or more programs configured to be executed by one or more processors of a computer system that is in communication with one or more display generation components and one or more input devices, the one or more programs including instructions for: displaying, via the one or more display generation components, as part of an input tutorial, a first set of user input instructions corresponding to a first type of operation; subsequent to displaying the first set of user input instructions and while in the input tutorial, detecting, via the one or more input devices, a first user input representative of an attempt to perform an input corresponding to the first type of operation; and in response to detecting the first user input: in accordance with a determination that the first user input meets a first set of criteria corresponding to the first type of operation: performing the first type of operation; and initiating a process for advancing the input tutorial.

In accordance with some embodiments, a method is described. The method comprises, at a computer system that is in communication with one or more display generation components and one or more input devices: detecting a first event; and in response to detecting the first event while the one or more display generation components have a respective spatial relationship to one or more eyes of a user: in accordance with a determination that corrective lens criteria are met, wherein the corrective lens criteria include one or more criteria pertaining to corrective lens information corresponding to one or more corrective lenses used to modify content visible via the one or more display generation components while the one or more display generation components have a respective spatial relationship to one or more eyes of the user, displaying, via the one or more display generation components, a corrective lens management user interface that includes user interface elements associated with one or more corrective lenses for the computer system; and in accordance with a determination that the corrective lens criteria are not met, forgoing display of the corrective lens management user interface.

In accordance with some embodiments, a non-transitory computer-readable storage medium is described. The non-transitory computer-readable storage medium stores one or more programs configured to be executed by one or more processors of a computer system that is in communication with one or more display generation components and one or more input devices, the one or more programs including instructions for: detecting a first event; and in response to detecting the first event while the one or more display generation components have a respective spatial relationship to one or more eyes of a user: in accordance with a determination that corrective lens criteria are met, wherein the corrective lens criteria include one or more criteria pertaining to corrective lens information corresponding to one or more corrective lenses used to modify content visible via the one or more display generation components while the one or more display generation components have a respective spatial relationship to one or more eyes of the user, displaying, via the one or more display generation components, a corrective lens management user interface that includes user interface elements associated with one or more corrective lenses for the computer system; and in accordance with a determination that the corrective lens criteria are not met, forgoing display of the corrective lens management user interface.

In accordance with some embodiments, a transitory computer-readable storage medium is described. The transitory computer-readable storage medium stores one or more programs configured to be executed by one or more processors of a computer system that is in communication with one or more display generation components and one or more input devices, the one or more programs including instructions for: detecting a first event; and in response to detecting the first event while the one or more display generation components have a respective spatial relationship to one or more eyes of a user: in accordance with a determination that corrective lens criteria are met, wherein the corrective lens criteria include one or more criteria pertaining to corrective lens information corresponding to one or more corrective lenses used to modify content visible via the one or more display generation components while the one or more display generation components have a respective spatial relationship to one or more eyes of the user, displaying, via the one or more display generation components, a corrective lens management user interface that includes user interface elements associated with one or more corrective lenses for the computer system; and in accordance with a determination that the corrective lens criteria are not met, forgoing display of the corrective lens management user interface.

In accordance with some embodiments, a computer system is described. The computer system is configured to communicate with one or more display generation components and one or more input devices, and comprises: one or more processors; and memory storing one or more programs configured to be executed by the one or more processors, the one or more programs including instructions for: detecting a first event; and in response to detecting the first event while the one or more display generation components have a respective spatial relationship to one or more eyes of a user: in accordance with a determination that corrective lens criteria are met, wherein the corrective lens criteria include one or more criteria pertaining to corrective lens information corresponding to one or more corrective lenses used to modify content visible via the one or more display generation components while the one or more display generation components have a respective spatial relationship to one or more eyes of the user, displaying, via the one or more display generation components, a corrective lens management user interface that includes user interface elements associated with one or more corrective lenses for the computer system; and in accordance with a determination that the corrective lens criteria are not met, forgoing display of the corrective lens management user interface.

In accordance with some embodiments, a computer system is described. The computer system is configured to communicate with one or more display generation components and one or more input devices, and comprises: means for detecting a first event; and means for, in response to detecting the first event while the one or more display generation components have a respective spatial relationship to one or more eyes of a user: in accordance with a determination that corrective lens criteria are met, wherein the corrective lens criteria include one or more criteria pertaining to corrective lens information corresponding to one or more corrective lenses used to modify content visible via the one or more display generation components while the one or more display generation components have a respective spatial relationship to one or more eyes of the user, displaying, via the one or more display generation components, a corrective lens management user interface that includes user interface elements associated with one or more corrective lenses for the computer system; and in accordance with a determination that the corrective lens criteria are not met, forgoing display of the corrective lens management user interface.

In accordance with some embodiments, a computer program product is described. The computer program product comprises one or more programs configured to be executed by one or more processors of a computer system that is in communication with one or more display generation components and one or more input devices, the one or more programs including instructions for: detecting a first event; and in response to detecting the first event while the one or more display generation components have a respective spatial relationship to one or more eyes of a user: in accordance with a determination that corrective lens criteria are met, wherein the corrective lens criteria include one or more criteria pertaining to corrective lens information corresponding to one or more corrective lenses used to modify content visible via the one or more display generation components while the one or more display generation components have a respective spatial relationship to one or more eyes of the user, displaying, via the one or more display generation components, a corrective lens management user interface that includes user interface elements associated with one or more corrective lenses for the computer system; and in accordance with a determination that the corrective lens criteria are not met, forgoing display of the corrective lens management user interface.

In some embodiments, a computer system displays a set of controls associated with controlling playback of media content (e.g., transport controls and/or other types of controls) in response to detecting a gaze and/or gesture of the user. In some embodiments, the computer system initially displays a first set of controls in a reduced-prominence state (e.g., with reduced visual prominence) in response to detecting a first input, and then displays a second set of controls (which optionally includes additional controls) in an increased-prominence state in response to detecting a second input. In this manner, the computer system optionally provides feedback to the user that they have begun to invoke display of the controls without unduly distracting the user from the content (e.g., by initially displaying controls in a less visually prominent manner), and then, based on detecting a user input indicating that the user wishes to further interact with the controls, displaying the controls in a more visually prominent manner to allow for easier and more-accurate interactions with the computer system.

Note that the various embodiments described above can be combined with any other embodiments described herein. The features and advantages described in the specification are not all inclusive and, in particular, many additional features and advantages will be apparent to one of ordinary skill in the art in view of the drawings, specification, and claims. Moreover, it should be noted that the language used in the specification has been principally selected for readability and instructional purposes, and may not have been selected to delineate or circumscribe the inventive subject matter.

BRIEF DESCRIPTION OF THE DRAWINGS

For a better understanding of the various described embodiments, reference should be made to the Description of Embodiments below, in conjunction with the following drawings in which like reference numerals refer to corresponding parts throughout the figures.

FIG. 10B is a flow diagram of methods of managing personalized accessories of one or more users of a computer system, in accordance with various embodiments.

FIG. 14 is a flow diagram of methods of providing an input tutorial, in accordance with some embodiments.

DESCRIPTION OF EMBODIMENTS

Figure 1A:
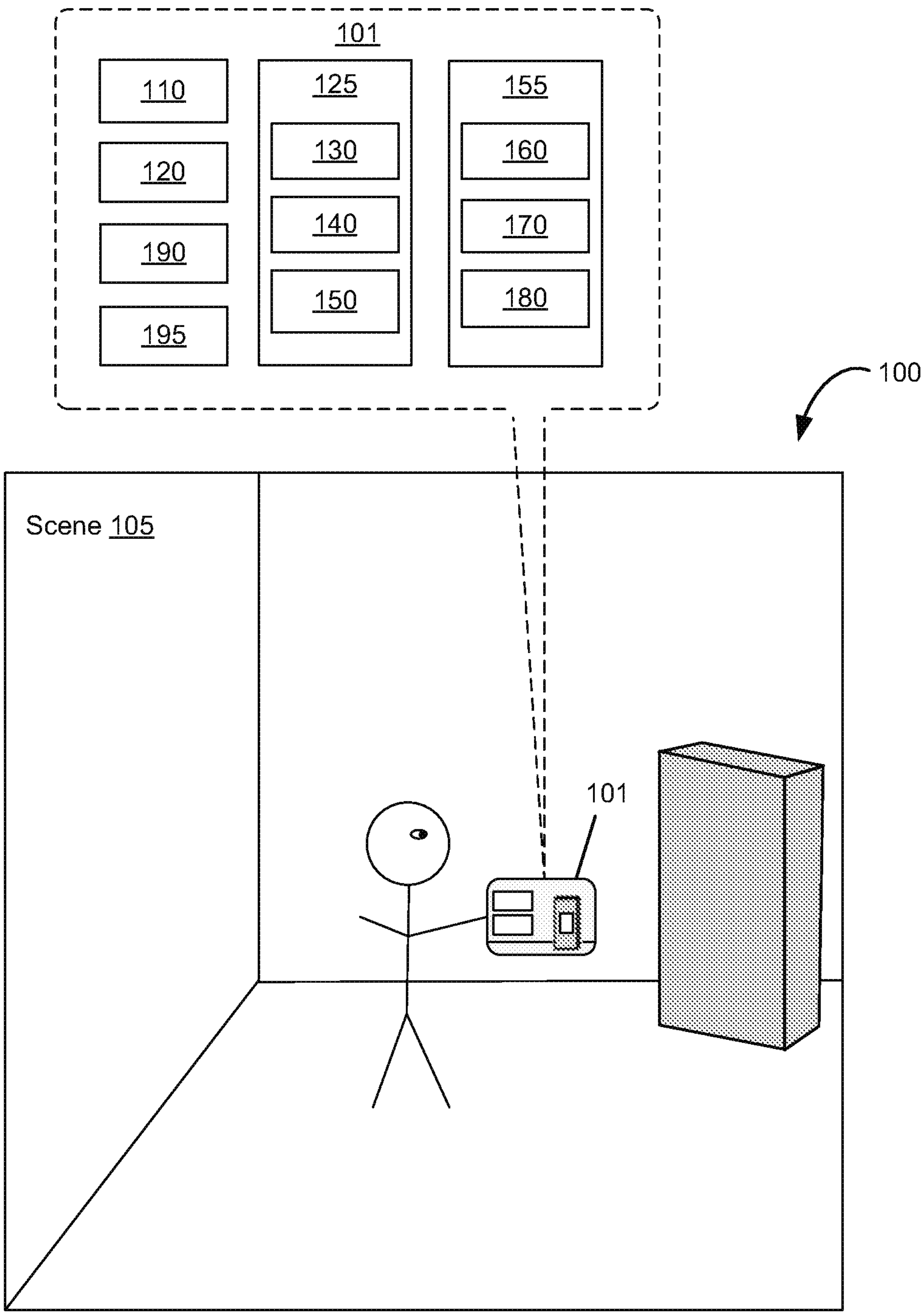
FIG. 1A is a block diagram illustrating an operating environment of a computer system for providing XR experiences in accordance with some embodiments.

The present disclosure relates to user interfaces for providing an extended reality (XR) experience to a user, in accordance with some embodiments.

The systems, methods, and GUIs described herein improve user interface interactions with virtual/augmented reality environments in multiple ways.

In some embodiments, a computer system displays, within a three-dimensional environment, a first authentication user interface that includes one or more viewpoint-locked objects. For example, in some embodiments, the one or more viewpoint-locked objects include a viewpoint-locked gaze target for a user to look at in order for the computer system to perform eye-based authentication. By displaying a viewpoint-locked gaze target that remains stationary within the user's field of view, the user is more inclined to look at the gaze target to allow for more accurate eye-based user authentication. In some embodiments, if the initial authentication of the user does not succeed in authenticating the user, the computer system displays, within the three-dimensional environment, a second authentication user interface that includes one or more environment-locked objects. For example, in some embodiments, the second authentication user interface is a passcode entry user interface that includes one or more keys that are environment-locked objects. The environment-locked passcode entry user interface allows a user to more intuitively interact with the passcode entry user interface to enter passcode information.

In some embodiments, while a computer system is in a locked state, the computer system performs a first authentication of a user (e.g., a biometric authentication of the user and/or non-biometric authentication of the user (e.g., passcode and/or password-based authentication)). If the authentication of the user fails, the computer system determines whether guest mode criteria are satisfied. If guest mode criteria are satisfied, the computer system displays an option that is selectable by a user to operate the computer system in a guest mode. In some embodiments, the guest mode represents a restricted user experience that allows the user to user the computer system but with fewer features and/or functions available. If the guest mode criteria are not satisfied, the computer system does not display the option to operate the computer system in the guest mode. By selectively displaying the guest mode option only when guest mode criteria are satisfied, the computer system prevents unauthorized users from accessing sensitive data.

In some embodiments, a computer system determines whether a personalized accessory is connected to the computer system, and if a personalized accessory is connected, the computer system further determines whether the computer system has biometric enrollment data for the personalized accessory. For example, in some embodiments, the personalized accessory includes one or more optical lenses (e.g., prescription optical lenses or non-prescription optical lenses), and the biometric enrollment data includes gaze-tracking enrollment data and/or eye-based biometric authentication data that corresponds to the optical lenses. If the computer system detects a personalized accessory for which the computer system does not have corresponding biometric enrollment data, the computer system displays a user interface that prompts the user to provide biometric enrollment data corresponding to the personalized accessory. If the computer system does not detect a personalized accessory for which the computer system does not have corresponding biometric enrollment data (e.g., the computer system does not detect a personalized accessory or the computer system detects a personalized accessory for which the computer system already has corresponding biometric enrollment data), the computer system does not display the user interface. By ensuring that the computer system has biometric enrollment data for a personalized accessory before a user uses the personalized accessory, the computer system ensures that user inputs received from the user are accurate and the user does not mistakenly provide erroneous or faulty inputs due to the personalized accessory not being properly configured.

In some embodiments, a computer system displays a settings user interface in which a representation of a first personalized accessory (e.g., a first set of optical lenses (e.g., prescription optical lenses or non-prescription optical lenses)) is concurrently displayed with a representation of a second personalized accessory (e.g. a second set of optical lenses). The representation of the first personalized accessory is visually distinguished from the representation of the second personalized accessory in a manner that indicates that biometric enrollment associated with the first personalized accessory has been completed and that biometric enrollment associated with the second personalized accessory has not been completed. Displaying a settings user interface in which a representation of a first personalized accessory is displayed in a manner that indicates that biometric enrollment associated with the first personalized accessory has been completed and a representation of a second personalized accessory is displayed in a manner that indicates that biometric enrollment associated with the second personalized accessory has not been completed provides the user with visual feedback about the state of the device (e.g., that biometric enrollment has been completed for the first personalized accessory but has not been completed for the second personalized accessory), thereby providing improved visual feedback to the user. Furthermore, ensuring that the computer system has biometric enrollment data for a personalized accessory before a user uses the personalized accessory ensures that user inputs received from the user are accurate and the user does not mistakenly provide erroneous or faulty inputs due to the personalized accessory not being properly configured.

In some embodiments, a computer system detects that a companion device is being set up, and further determines whether the companion device is in a first state or whether the companion device is in a second state. For example, in some embodiments, the first state is a "worn" state in which the companion device is worn by a user, the second state is an "unworn" state in which the companion device is not being worn by a user. If the companion device is in the first state, the computer system displays a first quick start user interface, and if the companion device is in the second state, the computer system displays a second quick start user interface. For example, in some embodiments, if the companion device is being worn by the user, the computer system displays a first quick start user interface that provides instructions for when the companion device is worn, and if the companion device is not being worn by the user, the computer system displays a second quick start user interface that instructs the user to wear the companion device. Displaying the first quick start user interface when the companion device is in the first state and displaying the second quick start user interface when the companion device is in the second state enhances the operability of the device and makes the user-device interface more efficient by helping the user to provide the proper inputs and reducing user mistakes when operating/interacting with the device (e.g., by providing appropriate feedback and/or instructions for the companion device being in the first state or being in the second state).

In some embodiments, a computer system displays, as part of an input tutorial, a first set of user input instructions corresponding to a first type of operation. For example, the computer system displays, as part of an input tutorial, instructions instructing the user on how to perform a first type of user input to interact with one or more virtual objects (e.g., graphical user interface objects). Subsequent to displaying the first set of user input instructions, the computer system detects a first user input representative of an attempt to perform an input corresponding to the first type of operation. For example, in some embodiments, the computer system instructs the user to try performing a first type of user input based on the instructions provided. If the user correctly performs the first type of user input (e.g., in accordance with a determination that the first user input meets a first set of criteria corresponding to the first type of operation), the computer system performs the first type of operation, and also initiates a process for advancing the input tutorial. For example, in some embodiments, once the user correctly performs the first type of user input, the computer system displays an indication that the user correctly performed the first type of user input, and then displays a second set of user input instructions corresponding to a second type of operation.

Figure 12:
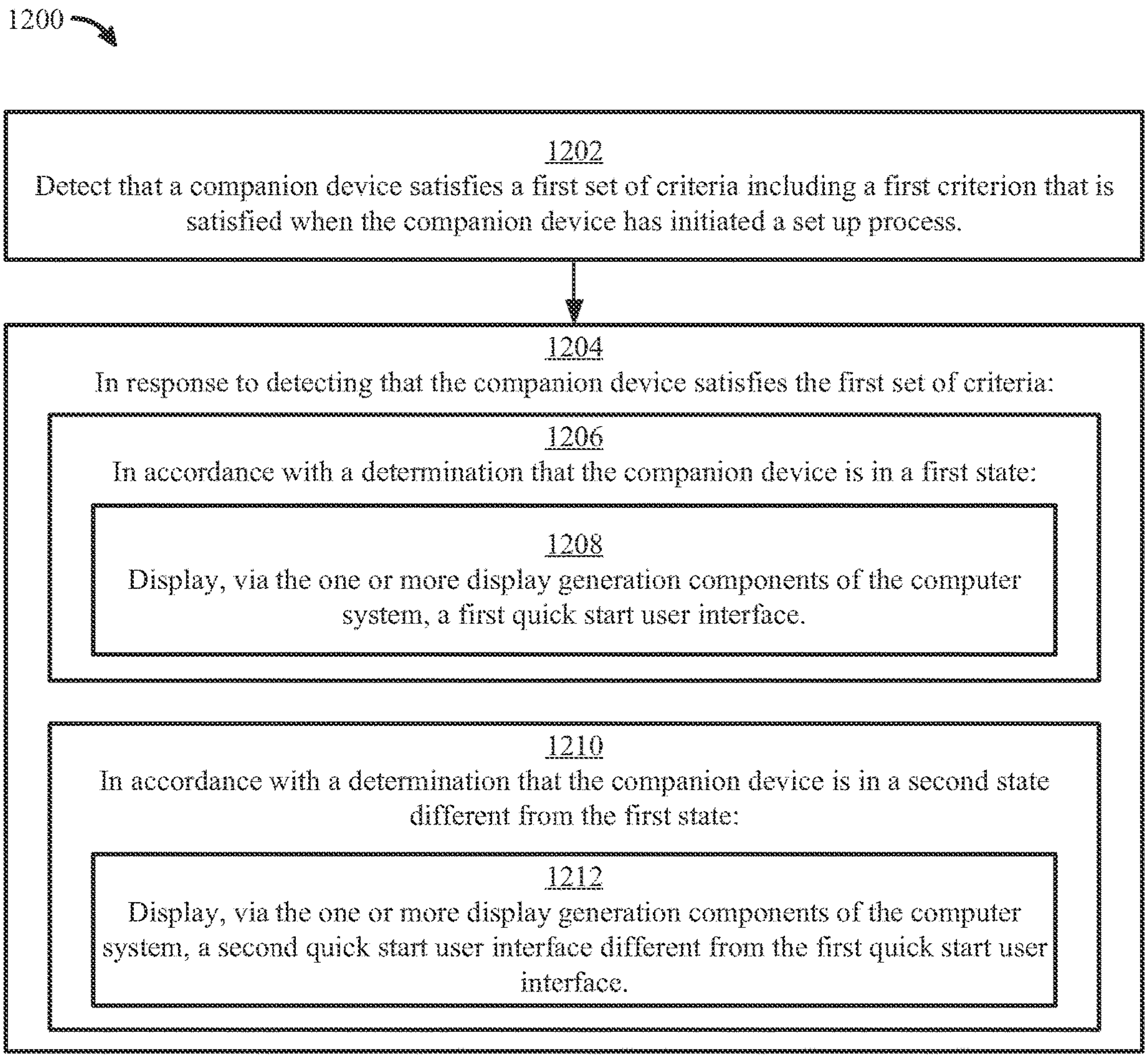
FIG. 12 is a flow diagram of methods of setting up a computer system, in accordance with various embodiments.
Figure 13A:
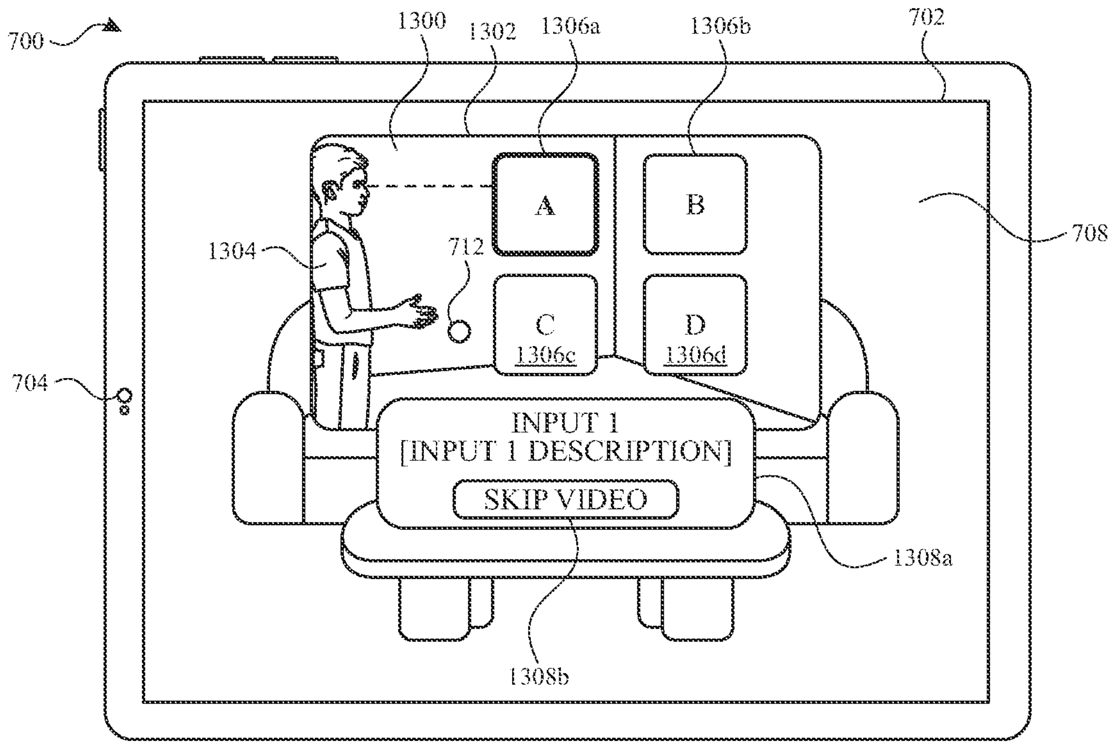
FIGS. 13A-13X illustrate example techniques for providing an input tutorial, in accordance with some embodiments.
Figure 15A:
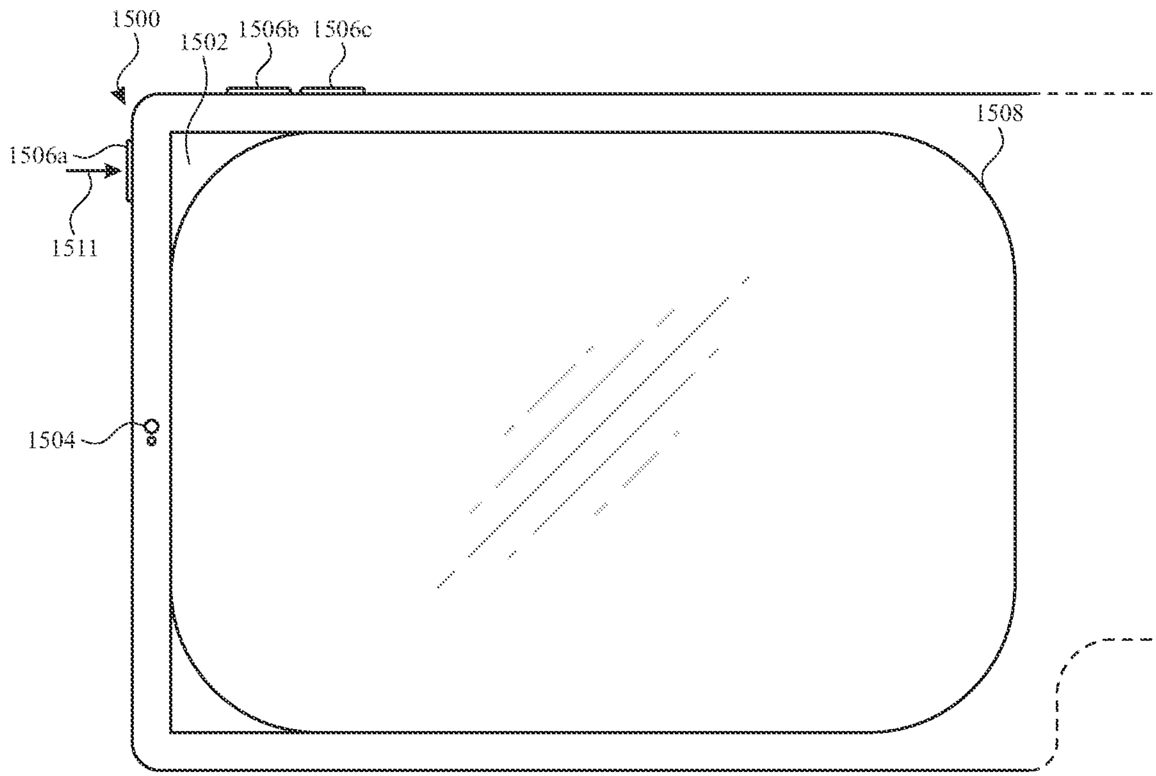
FIGS. 15A-15Q illustrate example techniques for managing personal accessories, in accordance with some embodiments.
Figure 15Q:
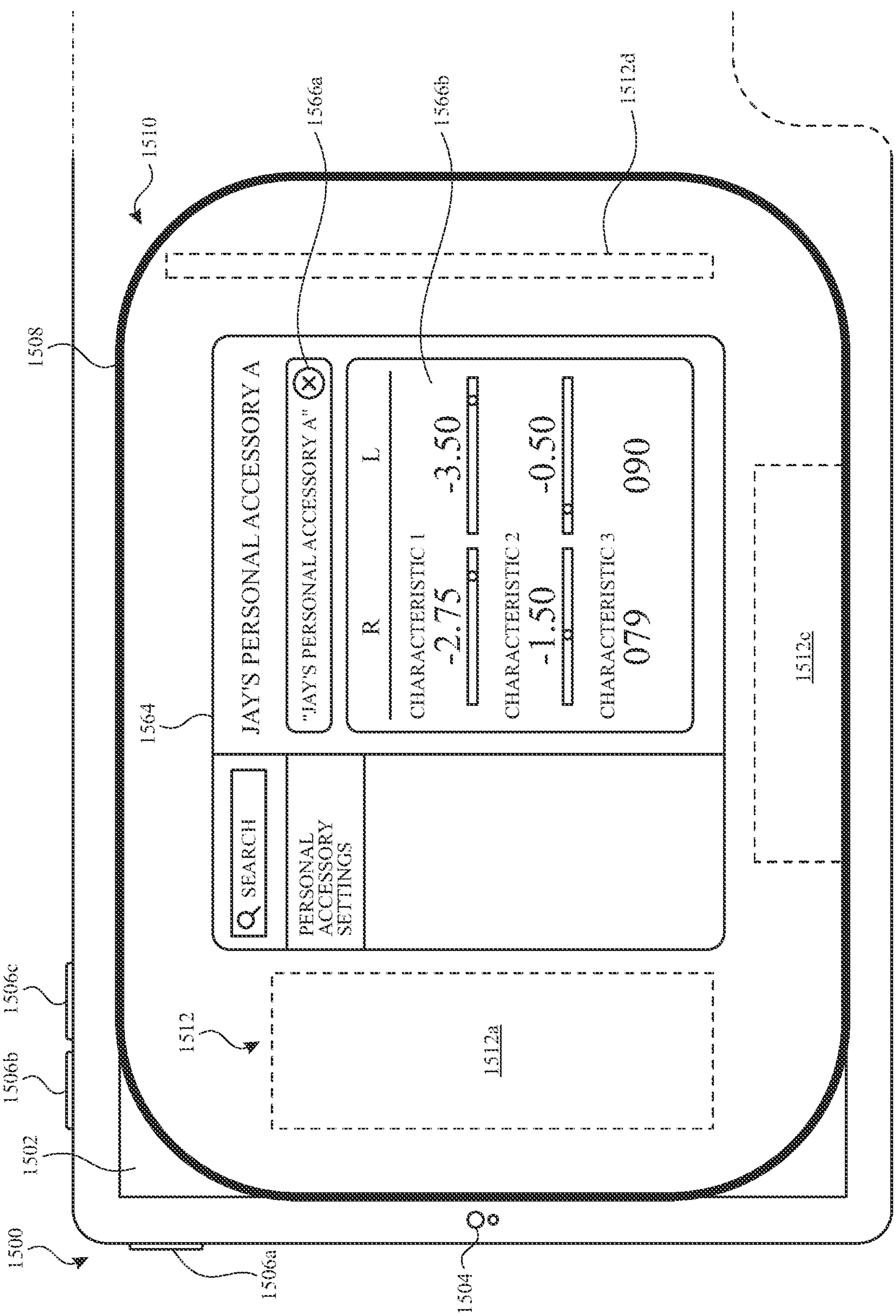
Figure 16:
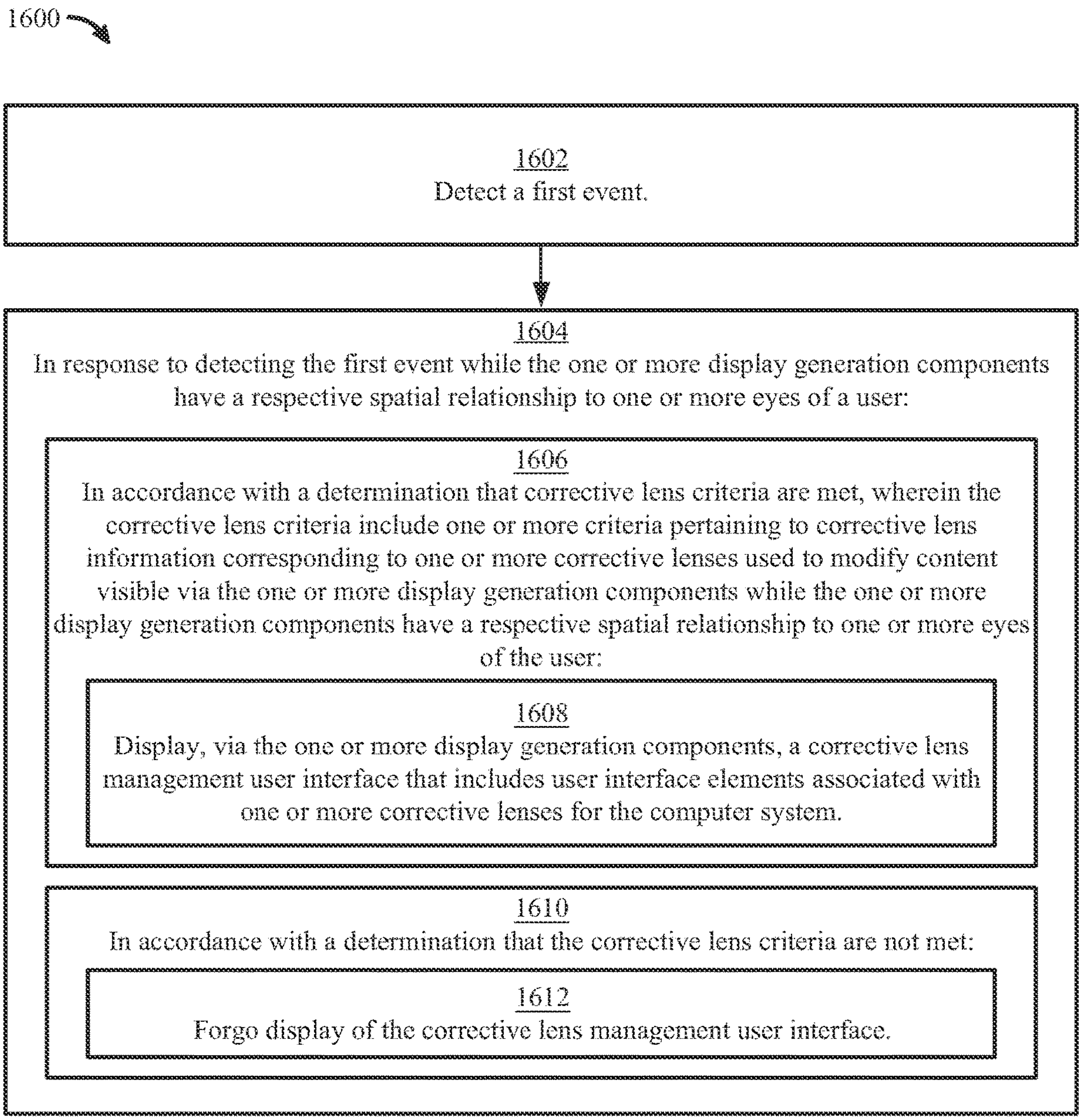
FIG. 16 is a flow diagram of methods of managing personal accessories.

In some embodiments, a computer system detects an event. For example, in some embodiments, the first event includes detecting that the computer system has been worn by a user (e.g., on the head and/or the face of the user) and/or has been placed on the body of a user. In some embodiments, detecting the first event includes detecting one or more user inputs (e.g., one or more touch inputs, one or more gestures, one or more air gestures, one or more gaze-based inputs, and/or one or more hardware control inputs). In response to detecting the first event (e.g., while the computer system is worn on the body of the user), in accordance with a determination that corrective lens criteria are met, the computer system displays a corrective lens management user interface that includes user interface elements associated with one or more corrective lenses for the computer system. In response to detecting the first event, in accordance with a determination that the corrective lens criteria are not met, the computer system forgoes display of the corrective lens management user interface. For example, in some embodiments, the corrective lens management user interface indicates that a device calibration profile has been applied to the computer system based on one or more corrective lenses being attached to the computer system or not being attached to the computer system. In some embodiments, the corrective lens management user interface includes one or more selectable options corresponding to different sets of corrective lenses that are enrolled on the computer system, and are selectable by a user to apply a particular device calibration profile corresponding to the selected set of corrective lenses. In this way, a user is able to switch between different device calibration profiles, as appropriate, based on which corrective lenses are attached to the computer system and/or based on corrective lenses not being attached to the computer system. FIGS. 1-6 provide a description of example computer systems for providing XR experiences to users. FIGS. 7A-7O illustrate example techniques for user authentication, in accordance with some embodiments. FIG. 8A is a flow diagram of methods of user authentication, in accordance with various embodiments. FIG. 8B is a flow diagram of methods of user authentication, in accordance with various embodiments. The user interfaces in FIGS. 7A-7O are used to illustrate the processes in FIGS. 8A and 8B. FIGS. 9A-9M illustrate example techniques for enrolling and managing personalized accessories for a computer system, in accordance with some embodiments. FIG. 10A is a flow diagram of methods of enrolling personalized accessories of one or more users of a computer system, in accordance with various embodiments. FIG. 10B is a flow diagram of methods of managing personalized accessories of one or more users of a computer system, in accordance with various embodiments. The user interfaces in FIGS. 9A-9M are used to illustrate the processes in FIGS. 10A and 10B. FIGS. 11A-11H illustrate example techniques for setting up a computer system, in accordance with some embodiments. FIG. 12 is a flow diagram of methods of setting up a computer system, in accordance with various embodiments. The user interfaces in FIGS. 11A-11H are used to illustrate the process in FIG. 12. FIGS. 13A-13X illustrate example techniques for providing an input tutorial, in accordance with some embodiments. FIG. 14 is a flow diagram of methods of providing an input tutorial, in accordance with various embodiments. The user interfaces in FIGS. 13A-13X are used to illustrate the process in FIG. 14. FIGS. 15A-15Q illustrate example techniques for managing personal accessories, in accordance with some embodiments. FIG. 16 is a flow diagram of methods of managing personal accessories, in accordance with some embodiments. The user interfaces in FIGS. 15A-15Q are used to illustrate the process in FIG. 16.

The processes described below enhance the operability of the devices and make the user-device interfaces more efficient (e.g., by helping the user to provide proper inputs and reducing user mistakes when operating/interacting with the device) through various techniques, including by providing improved visual feedback to the user, reducing the number of inputs needed to perform an operation, providing additional control options without cluttering the user interface with additional displayed controls, performing an operation when a set of conditions has been met without requiring further user input, improving privacy and/or security, providing a more varied, detailed, and/or realistic user experience while saving storage space, and/or additional techniques. These techniques also reduce power usage and improve battery life of the device by enabling the user to use the device more quickly and efficiently. Saving on battery power, and thus weight, improves the ergonomics of the device. These techniques also enable real-time communication, allow for the use of fewer and/or less precise sensors resulting in a more compact, lighter, and cheaper device, and enable the device to be used in a variety of lighting conditions. These techniques reduce energy usage, thereby reducing heat emitted by the device, which is particularly important for a wearable device where a device well within operational parameters for device components can become uncomfortable for a user to wear if it is producing too much heat.

In addition, in methods described herein where one or more steps are contingent upon one or more conditions having been met, it should be understood that the described method can be repeated in multiple repetitions so that over the course of the repetitions all of the conditions upon which steps in the method are contingent have been met in different repetitions of the method. For example, if a method requires performing a first step if a condition is satisfied, and a second step if the condition is not satisfied, then a person of ordinary skill would appreciate that the claimed steps are repeated until the condition has been both satisfied and not satisfied, in no particular order. Thus, a method described with one or more steps that are contingent upon one or more conditions having been met could be rewritten as a method that is repeated until each of the conditions described in the method has been met. This, however, is not required of system or computer readable medium claims where the system or computer readable medium contains instructions for performing the contingent operations based on the satisfaction of the corresponding one or more conditions and thus is capable of determining whether the contingency has or has not been satisfied without explicitly repeating steps of a method until all of the conditions upon which steps in the method are contingent have been met. A person having ordinary skill in the art would also understand that, similar to a method with contingent steps, a system or computer readable storage medium can repeat the steps of a method as many times as are needed to ensure that all of the contingent steps have been performed.

In some embodiments, as shown in FIG. 1A, the XR experience is provided to the user via an operating environment 100 that includes a computer system 101. The computer system 101 includes a controller 110 (e.g., processors of a portable electronic device or a remote server), a display generation component 120 (e.g., a head-mounted device (HMD), a display, a projector, a touch-screen, etc.), one or more input devices 125 (e.g., an eye tracking device 130, a hand tracking device 140, other input devices 150), one or more output devices 155 (e.g., speakers 160, tactile output generators 170, and other output devices 180), one or more sensors 190 (e.g., image sensors, light sensors, depth sensors, tactile sensors, orientation sensors, proximity sensors, temperature sensors, location sensors, motion sensors, velocity sensors, etc.), and optionally one or more peripheral devices 195 (e.g., home appliances, wearable devices, etc.). In some embodiments, one or more of the input devices 125, output devices 155, sensors 190, and peripheral devices 195 are integrated with the display generation component 120 (e.g., in a head-mounted device or a handheld device).

When describing an XR experience, various terms are used to differentially refer to several related but distinct environments that the user may sense and/or with which a user may interact (e.g., with inputs detected by a computer system 101 generating the XR experience that cause the computer system generating the XR experience to generate audio, visual, and/or tactile feedback corresponding to various inputs provided to the computer system 101). The following is a subset of these terms:

Physical environment: A physical environment refers to a physical world that people can sense and/or interact with without aid of electronic systems. Physical environments, such as a physical park, include physical articles, such as physical trees, physical buildings, and physical people. People can directly sense and/or interact with the physical environment, such as through sight, touch, hearing, taste, and smell.

Extended reality: In contrast, an extended reality (XR) environment refers to a wholly or partially simulated environment that people sense and/or interact with via an electronic system. In XR, a subset of a person's physical motions, or representations thereof, are tracked, and, in response, one or more characteristics of one or more virtual objects simulated in the XR environment are adjusted in a manner that comports with at least one law of physics. For example, an XR system may detect a person's head turning and, in response, adjust graphical content and an acoustic field presented to the person in a manner similar to how such views and sounds would change in a physical environment. In some situations (e.g., for accessibility reasons), adjustments to characteristic(s) of virtual object(s) in an XR environment may be made in response to representations of physical motions (e.g., vocal commands). A person may sense and/or interact with an XR object using any one of their senses, including sight, sound, touch, taste, and smell. For example, a person may sense and/or interact with audio objects that create a 3D or spatial audio environment that provides the perception of point audio sources in 3D space. In another example, audio objects may enable audio transparency, which selectively incorporates ambient sounds from the physical environment with or without computer-generated audio. In some XR environments, a person may sense and/or interact only with audio objects.

Examples of XR include virtual reality and mixed reality.

Virtual reality: A virtual reality (VR) environment refers to a simulated environment that is designed to be based entirely on computer-generated sensory inputs for one or more senses. A VR environment comprises a plurality of virtual objects with which a person may sense and/or interact. For example, computer-generated imagery of trees, buildings, and avatars representing people are examples of virtual objects. A person may sense and/or interact with virtual objects in the VR environment through a simulation of the person's presence within the computer-generated environment, and/or through a simulation of a subset of the person's physical movements within the computer-generated environment.

Mixed reality: In contrast to a VR environment, which is designed to be based entirely on computer-generated sensory inputs, a mixed reality (MR) environment refers to a simulated environment that is designed to incorporate sensory inputs from the physical environment, or a representation thereof, in addition to including computer-generated sensory inputs (e.g., virtual objects). On a virtuality continuum, a mixed reality environment is anywhere between, but not including, a wholly physical environment at one end and virtual reality environment at the other end. In some MR environments, computer-generated sensory inputs may respond to changes in sensory inputs from the physical environment. Also, some electronic systems for presenting an MR environment may track location and/or orientation with respect to the physical environment to enable virtual objects to interact with real objects (that is, physical articles from the physical environment or representations thereof). For example, a system may account for movements so that a virtual tree appears stationary with respect to the physical ground.

Examples of mixed realities include augmented reality and augmented virtuality. Augmented reality: An augmented reality (AR) environment refers to a simulated environment in which one or more virtual objects are superimposed over a physical environment, or a representation thereof. For example, an electronic system for presenting an AR environment may have a transparent or translucent display through which a person may directly view the physical environment. The system may be configured to present virtual objects on the transparent or translucent display, so that a person, using the system, perceives the virtual objects superimposed over the physical environment. Alternatively, a system may have an opaque display and one or more imaging sensors that capture images or video of the physical environment, which are representations of the physical environment. The system composites the images or video with virtual objects, and presents the composition on the opaque display. A person, using the system, indirectly views the physical environment by way of the images or video of the physical environment, and perceives the virtual objects superimposed over the physical environment. As used herein, a video of the physical environment shown on an opaque display is called "pass-through video," meaning a system uses one or more image sensor(s) to capture images of the physical environment, and uses those images in presenting the AR environment on the opaque display. Further alternatively, a system may have a projection system that projects virtual objects into the physical environment, for example, as a hologram or on a physical surface, so that a person, using the system, perceives the virtual objects superimposed over the physical environment. An augmented reality environment also refers to a simulated environment in which a representation of a physical environment is transformed by computer-generated sensory information. For example, in providing pass-through video, a system may transform one or more sensor images to impose a select perspective (e.g., viewpoint) different than the perspective captured by the imaging sensors. As another example, a representation of a physical environment may be transformed by graphically modifying (e.g., enlarging) portions thereof, such that the modified portion may be representative but not photorealistic versions of the originally captured images. As a further example, a representation of a physical environment may be transformed by graphically eliminating or obfuscating portions thereof. Augmented virtuality: An augmented virtuality (AV) environment refers to a simulated environment in which a virtual or computer-generated environment incorporates one or more sensory inputs from the physical environment. The sensory inputs may be representations of one or more characteristics of the physical environment. For example, an AV park may have virtual trees and virtual buildings, but people with faces photorealistically reproduced from images taken of physical people. As another example, a virtual object may adopt a shape or color of a physical article imaged by one or more imaging sensors. As a further example, a virtual object may adopt shadows consistent with the position of the sun in the physical environment.

In an augmented reality, mixed reality, or virtual reality environment, a view of a three-dimensional environment is visible to a user. The view of the three-dimensional environment is typically visible to the user via one or more display generation components (e.g., a display or a pair of display modules that provide stereoscopic content to different eyes of the same user) through a virtual viewport that has a viewport boundary that defines an extent of the three-dimensional environment that is visible to the user via the one or more display generation components. In some embodiments, the region defined by the viewport boundary is smaller than a range of vision of the user in one or more dimensions (e.g., based on the range of vision of the user, size, optical properties or other physical characteristics of the one or more display generation components, and/or the location and/or orientation of the one or more display generation components relative to the eyes of the user). In some embodiments, the region defined by the viewport boundary is larger than a range of vision of the user in one or more dimensions (e.g., based on the range of vision of the user, size, optical properties or other physical characteristics of the one or more display generation components, and/or the location and/or orientation of the one or more display generation components relative to the eyes of the user). The viewport and viewport boundary typically move as the one or more display generation components move (e.g., moving with a head of the user for a head mounted device or moving with a hand of a user for a handheld device such as a tablet or smartphone). A viewpoint of a user determines what content is visible in the viewport, a viewpoint generally specifies a location and a direction relative to the three-dimensional environment, and as the viewpoint shifts, the view of the three-dimensional environment will also shift in the viewport. For a head mounted device, a viewpoint is typically based on a location an direction of the head, face, and/or eyes of a user to provide a view of the three-dimensional environment that is perceptually accurate and provides an immersive experience when the user is using the head-mounted device. For a handheld or stationed device, the viewpoint shifts as the handheld or stationed device is moved and/or as a position of a user relative to the handheld or stationed device changes (e.g., a user moving toward, away from, up, down, to the right, and/or to the left of the device). For devices that include display generation components with virtual passthrough, portions of the physical environment that are visible (e.g., displayed, and/or projected) via the one or more display generation components are based on a field of view of one or more cameras in communication with the display generation components which typically move with the display generation components (e.g., moving with a head of the user for a head mounted device or moving with a hand of a user for a handheld device such as a tablet or smartphone) because the viewpoint of the user moves as the field of view of the one or more cameras moves (and the appearance of one or more virtual objects displayed via the one or more display generation components is updated based on the viewpoint of the user (e.g., displayed positions and poses of the virtual objects are updated based on the movement of the viewpoint of the user)). For display generation components with optical passthrough, portions of the physical environment that are visible (e.g., optically visible through one or more partially or fully transparent portions of the display generation component) via the one or more display generation components are based on a field of view of a user through the partially or fully transparent portion(s) of the display generation component (e.g., moving with a head of the user for a head mounted device or moving with a hand of a user for a handheld device such as a tablet or smartphone) because the viewpoint of the user moves as the field of view of the user through the partially or fully transparent portions of the display generation components moves (and the appearance of one or more virtual objects is updated based on the viewpoint of the user).

In some embodiments a representation of a physical environment (e.g., displayed via virtual passthrough or optical passthrough) can be partially or fully obscured by a virtual environment. In some embodiments, the amount of virtual environment that is displayed (e.g., the amount of physical environment that is not displayed) is based on an immersion level for the virtual environment (e.g., with respect to the representation of the physical environment). For example, increasing the immersion level optionally causes more of the virtual environment to be displayed, replacing and/or obscuring more of the physical environment, and reducing the immersion level optionally causes less of the virtual environment to be displayed, revealing portions of the physical environment that were previously not displayed and/or obscured. In some embodiments, at a particular immersion level, one or more first background objects (e.g., in the representation of the physical environment) are visually de-emphasized (e.g., dimmed, blurred, and/or displayed with increased transparency) more than one or more second background objects, and one or more third background objects cease to be displayed. In some embodiments, a level of immersion includes an associated degree to which the virtual content displayed by the computer system (e.g., the virtual environment and/or the virtual content) obscures background content (e.g., content other than the virtual environment and/or the virtual content) around/behind the virtual content, optionally including the number of items of background content displayed and/or the visual characteristics (e.g., colors, contrast, and/or opacity) with which the background content is displayed, the angular range of the virtual content displayed via the display generation component (e.g., 60 degrees of content displayed at low immersion, 120 degrees of content displayed at medium immersion, or 180 degrees of content displayed at high immersion), and/or the proportion of the field of view displayed via the display generation component that is consumed by the virtual content (e.g., 33% of the field of view consumed by the virtual content at low immersion, 66% of the field of view consumed by the virtual content at medium immersion, or 100% of the field of view consumed by the virtual content at high immersion). In some embodiments, the background content is included in a background over which the virtual content is displayed (e.g., background content in the representation of the physical environment). In some embodiments, the background content includes user interfaces (e.g., user interfaces generated by the computer system corresponding to applications), virtual objects (e.g., files or representations of other users generated by the computer system) not associated with or included in the virtual environment and/or virtual content, and/or real objects (e.g., pass-through objects representing real objects in the physical environment around the user that are visible such that they are displayed via the display generation component and/or a visible via a transparent or translucent component of the display generation component because the computer system does not obscure/prevent visibility of them through the display generation component). In some embodiments, at a low level of immersion (e.g., a first level of immersion), the background, virtual and/or real objects are displayed in an unobscured manner. For example, a virtual environment with a low level of immersion is optionally displayed concurrently with the background content, which is optionally displayed with full brightness, color, and/or translucency. In some embodiments, at a higher level of immersion (e.g., a second level of immersion higher than the first level of immersion), the background, virtual and/or real objects are displayed in an obscured manner (e.g., dimmed, blurred, or removed from display). For example, a respective virtual environment with a high level of immersion is displayed without concurrently displaying the background content (e.g., in a full screen or fully immersive mode). As another example, a virtual environment displayed with a medium level of immersion is displayed concurrently with darkened, blurred, or otherwise de-emphasized background content. In some embodiments, the visual characteristics of the background objects vary among the background objects. For example, at a particular immersion level, one or more first background objects are visually de-emphasized (e.g., dimmed, blurred, and/or displayed with increased transparency) more than one or more second background objects, and one or more third background objects cease to be displayed. In some embodiments, a null or zero level of immersion corresponds to the virtual environment ceasing to be displayed and instead a representation of a physical environment is displayed (optionally with one or more virtual objects such as application, windows, or virtual three-dimensional objects) without the representation of the physical environment being obscured by the virtual environment. Adjusting the level of immersion using a physical input element provides for quick and efficient method of adjusting immersion, which enhances the operability of the computer system and makes the user-device interface more efficient.

Viewpoint-locked virtual object: A virtual object is viewpoint-locked when a computer system displays the virtual object at the same location and/or position in the viewpoint of the user, even as the viewpoint of the user shifts (e.g., changes). In embodiments where the computer system is a head-mounted device, the viewpoint of the user is locked to the forward facing direction of the user's head (e.g., the viewpoint of the user is at least a portion of the field-of-view of the user when the user is looking straight ahead); thus, the viewpoint of the user remains fixed even as the user's gaze is shifted, without moving the user's head. In embodiments where the computer system has a display generation component (e.g., a display screen) that can be repositioned with respect to the user's head, the viewpoint of the user is the augmented reality view that is being presented to the user on a display generation component of the computer system. For example, a viewpoint-locked virtual object that is displayed in the upper left corner of the viewpoint of the user, when the viewpoint of the user is in a first orientation (e.g., with the user's head facing north) continues to be displayed in the upper left corner of the viewpoint of the user, even as the viewpoint of the user changes to a second orientation (e.g., with the user's head facing west). In other words, the location and/or position at which the viewpoint-locked virtual object is displayed in the viewpoint of the user is independent of the user's position and/or orientation in the physical environment. In embodiments in which the computer system is a head-mounted device, the viewpoint of the user is locked to the orientation of the user's head, such that the virtual object is also referred to as a "head-locked virtual object."

Environment-locked virtual object: A virtual object is environment-locked (alternatively, "world-locked") when a computer system displays the virtual object at a location and/or position in the viewpoint of the user that is based on (e.g., selected in reference to and/or anchored to) a location and/or object in the three-dimensional environment (e.g., a physical environment or a virtual environment). As the viewpoint of the user shifts, the location and/or object in the environment relative to the viewpoint of the user changes, which results in the environment-locked virtual object being displayed at a different location and/or position in the viewpoint of the user. For example, an environment-locked virtual object that is locked onto a tree that is immediately in front of a user is displayed at the center of the viewpoint of the user. When the viewpoint of the user shifts to the right (e.g., the user's head is turned to the right) so that the tree is now left-of-center in the viewpoint of the user (e.g., the tree's position in the viewpoint of the user shifts), the environment-locked virtual object that is locked onto the tree is displayed left-of-center in the viewpoint of the user. In other words, the location and/or position at which the environment-locked virtual object is displayed in the viewpoint of the user is dependent on the position and/or orientation of the location and/or object in the environment onto which the virtual object is locked. In some embodiments, the computer system uses a stationary frame of reference (e.g., a coordinate system that is anchored to a fixed location and/or object in the physical environment) in order to determine the position at which to display an environment-locked virtual object in the viewpoint of the user. An environment-locked virtual object can be locked to a stationary part of the environment (e.g., a floor, wall, table, or other stationary object) or can be locked to a moveable part of the environment (e.g., a vehicle, animal, person, or even a representation of portion of the users body that moves independently of a viewpoint of the user, such as a user's hand, wrist, arm, or foot) so that the virtual object is moved as the viewpoint or the portion of the environment moves to maintain a fixed relationship between the virtual object and the portion of the environment.

In some embodiments a virtual object that is environment-locked or viewpoint-locked exhibits lazy follow behavior which reduces or delays motion of the environment-locked or viewpoint-locked virtual object relative to movement of a point of reference which the virtual object is following. In some embodiments, when exhibiting lazy follow behavior the computer system intentionally delays movement of the virtual object when detecting movement of a point of reference (e.g., a portion of the environment, the viewpoint, or a point that is fixed relative to the viewpoint, such as a point that is between 5-300 cm from the viewpoint) which the virtual object is following. For example, when the point of reference (e.g., the portion of the environment or the viewpoint) moves with a first speed, the virtual object is moved by the device to remain locked to the point of reference but moves with a second speed that is slower than the first speed (e.g., until the point of reference stops moving or slows down, at which point the virtual object starts to catch up to the point of reference). In some embodiments, when a virtual object exhibits lazy follow behavior the device ignores small amounts of movement of the point of reference (e.g., ignoring movement of the point of reference that is below a threshold amount of movement such as movement by 0-5 degrees or movement by 0-50 cm). For example, when the point of reference (e.g., the portion of the environment or the viewpoint to which the virtual object is locked) moves by a first amount, a distance between the point of reference and the virtual object increases (e.g., because the virtual object is being displayed so as to maintain a fixed or substantially fixed position relative to a viewpoint or portion of the environment that is different from the point of reference to which the virtual object is locked) and when the point of reference (e.g., the portion of the environment or the viewpoint to which the virtual object is locked) moves by a second amount that is greater than the first amount, a distance between the point of reference and the virtual object initially increases (e.g., because the virtual object is being displayed so as to maintain a fixed or substantially fixed position relative to a viewpoint or portion of the environment that is different from the point of reference to which the virtual object is locked) and then decreases as the amount of movement of the point of reference increases above a threshold (e.g., a "lazy follow" threshold) because the virtual object is moved by the computer system to maintain a fixed or substantially fixed position relative to the point of reference. In some embodiments the virtual object maintaining a substantially fixed position relative to the point of reference includes the virtual object being displayed within a threshold distance (e.g., 1, 2, 3, 5, 15, 20, 50 cm) of the point of reference in one or more dimensions (e.g., up/down, left/right, and/or forward/backward relative to the position of the point of reference).

Hardware: There are many different types of electronic systems that enable a person to sense and/or interact with various XR environments. Examples include head-mounted systems, projection-based systems, heads-up displays (HUDs), vehicle windshields having integrated display capability, windows having integrated display capability, displays formed as lenses designed to be placed on a person's eyes (e.g., similar to contact lenses), headphones/earphones, speaker arrays, input systems (e.g., wearable or handheld controllers with or without haptic feedback), smartphones, tablets, and desktop/laptop computers. A head-mounted system may include speakers and/or other audio output devices integrated into the head-mounted system for providing audio output. A head-mounted system may have one or more speaker(s) and an integrated opaque display. Alternatively, a head-mounted system may be configured to accept an external opaque display (e.g., a smartphone). The head-mounted system may incorporate one or more imaging sensors to capture images or video of the physical environment, and/or one or more microphones to capture audio of the physical environment. Rather than an opaque display, a head-mounted system may have a transparent or translucent display. The transparent or translucent display may have a medium through which light representative of images is directed to a person's eyes. The display may utilize digital light projection, OLEDs, LEDs, uLEDs, liquid crystal on silicon, laser scanning light source, or any combination of these technologies. The medium may be an optical waveguide, a hologram medium, an optical combiner, an optical reflector, or any combination thereof. In one embodiment, the transparent or translucent display may be configured to become opaque selectively. Projection-based systems may employ retinal projection technology that projects graphical images onto a person's retina. Projection systems also may be configured to project virtual objects into the physical environment, for example, as a hologram or on a physical surface. In some embodiments, the controller 110 is configured to manage and coordinate an XR experience for the user. In some embodiments, the controller 110 includes a suitable combination of software, firmware, and/or hardware. The controller 110 is described in greater detail below with respect to FIG. 2. In some embodiments, the controller 110 is a computing device that is local or remote relative to the scene 105 (e.g., a physical environment). For example, the controller 110 is a local server located within the scene 105. In another example, the controller 110 is a remote server located outside of the scene 105 (e.g., a cloud server, central server, etc.). In some embodiments, the controller 110 is communicatively coupled with the display generation component 120 (e.g., an HMD, a display, a projector, a touch-screen, etc.) via one or more wired or wireless communication channels 144 (e.g., BLUETOOTH, IEEE 802.11x, IEEE 802.16x, IEEE 802.3x, etc.). In another example, the controller 110 is included within the enclosure (e.g., a physical housing) of the display generation component 120 (e.g., an HMD, or a portable electronic device that includes a display and one or more processors, etc.), one or more of the input devices 125, one or more of the output devices 155, one or more of the sensors 190, and/or one or more of the peripheral devices 195, or share the same physical enclosure or support structure with one or more of the above.

In some embodiments, the display generation component 120 is configured to provide the XR experience (e.g., at least a visual component of the XR experience) to the user. In some embodiments, the display generation component 120 includes a suitable combination of software, firmware, and/or hardware. The display generation component 120 is described in greater detail below with respect to FIG. 3. In some embodiments, the functionalities of the controller 110 are provided by and/or combined with the display generation component 120.

According to some embodiments, the display generation component 120 provides an XR experience to the user while the user is virtually and/or physically present within the scene 105.

In some embodiments, the display generation component is worn on a part of the user's body (e.g., on his/her head, on his/her hand, etc.). As such, the display generation component 120 includes one or more XR displays provided to display the XR content. For example, in various embodiments, the display generation component 120 encloses the field-of-view of the user. In some embodiments, the display generation component 120 is a handheld device (such as a smartphone or tablet) configured to present XR content, and the user holds the device with a display directed towards the field-of-view of the user and a camera directed towards the scene 105. In some embodiments, the handheld device is optionally placed within an enclosure that is worn on the head of the user. In some embodiments, the handheld device is optionally placed on a support (e.g., a tripod) in front of the user. In some embodiments, the display generation component 120 is an XR chamber, enclosure, or room configured to present XR content in which the user does not wear or hold the display generation component 120. Many user interfaces described with reference to one type of hardware for displaying XR content (e.g., a handheld device or a device on a tripod) could be implemented on another type of hardware for displaying XR content (e.g., an HMD or other wearable computing device). For example, a user interface showing interactions with XR content triggered based on interactions that happen in a space in front of a handheld or tripod mounted device could similarly be implemented with an HMD where the interactions happen in a space in front of the HMD and the responses of the XR content are displayed via the HMD. Similarly, a user interface showing interactions with XR content triggered based on movement of a handheld or tripod mounted device relative to the physical environment (e.g., the scene 105 or a part of the user's body (e.g., the user's eye(s), head, or hand)) could similarly be implemented with an HMD where the movement is caused by movement of the HMD relative to the physical environment (e.g., the scene 105 or a part of the user's body (e.g., the user's eye(s), head, or hand)).

Figure 1B:
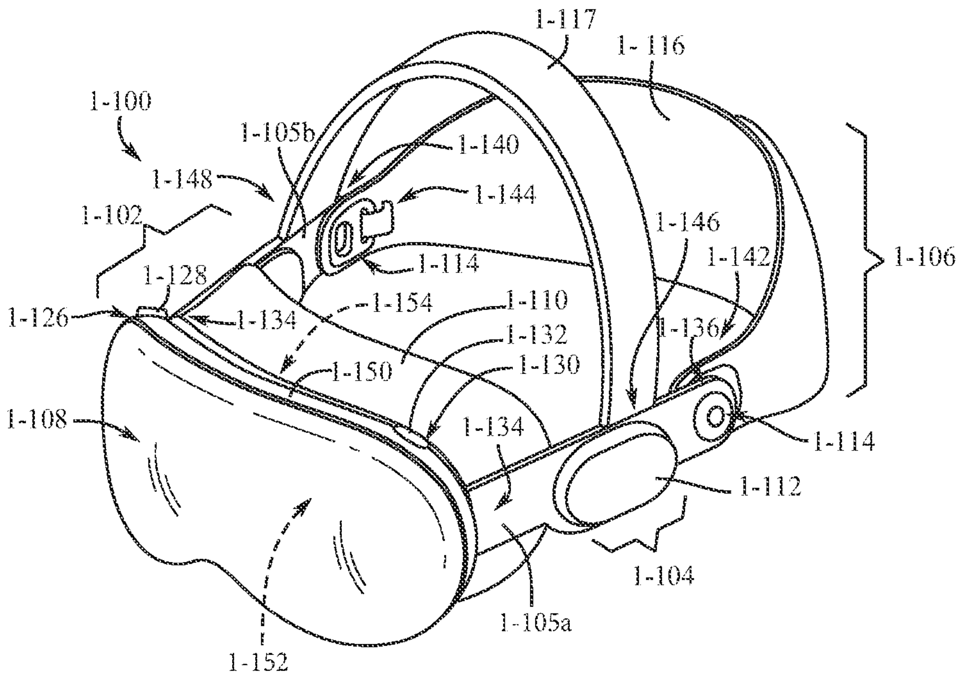
FIGS. 1B-1P are examples of a computer system for providing XR experiences in the operating environment of FIG. 1A.
Figure 1C:
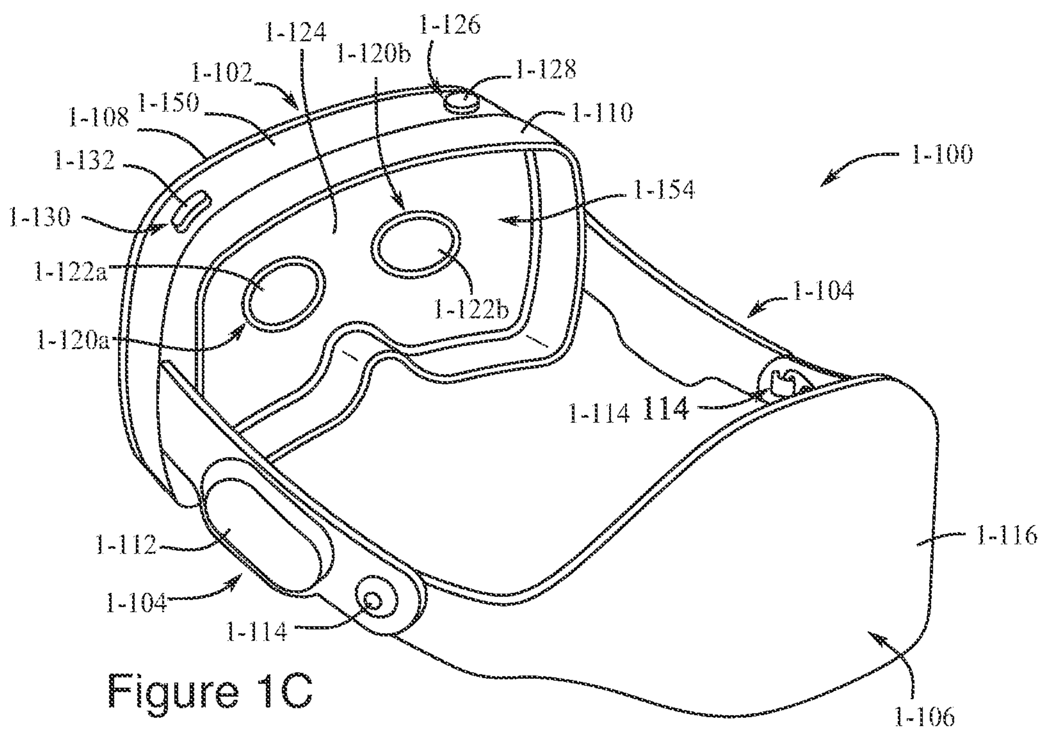
Figure 1D:
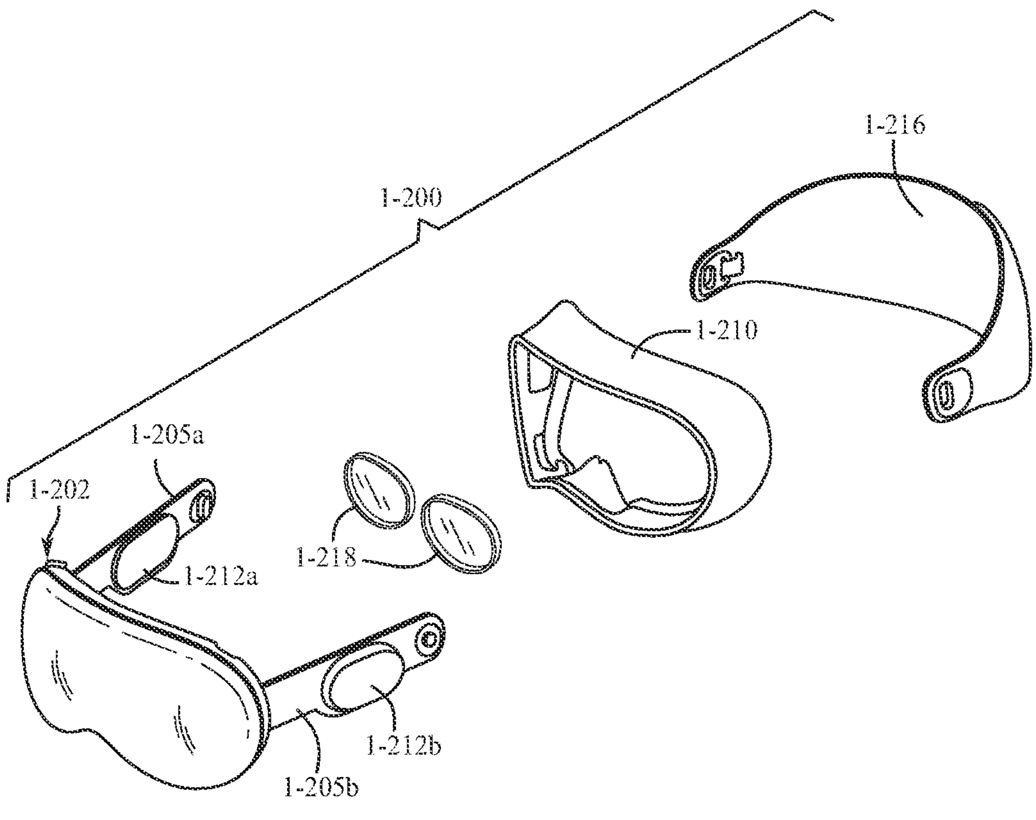
Figure 1E:
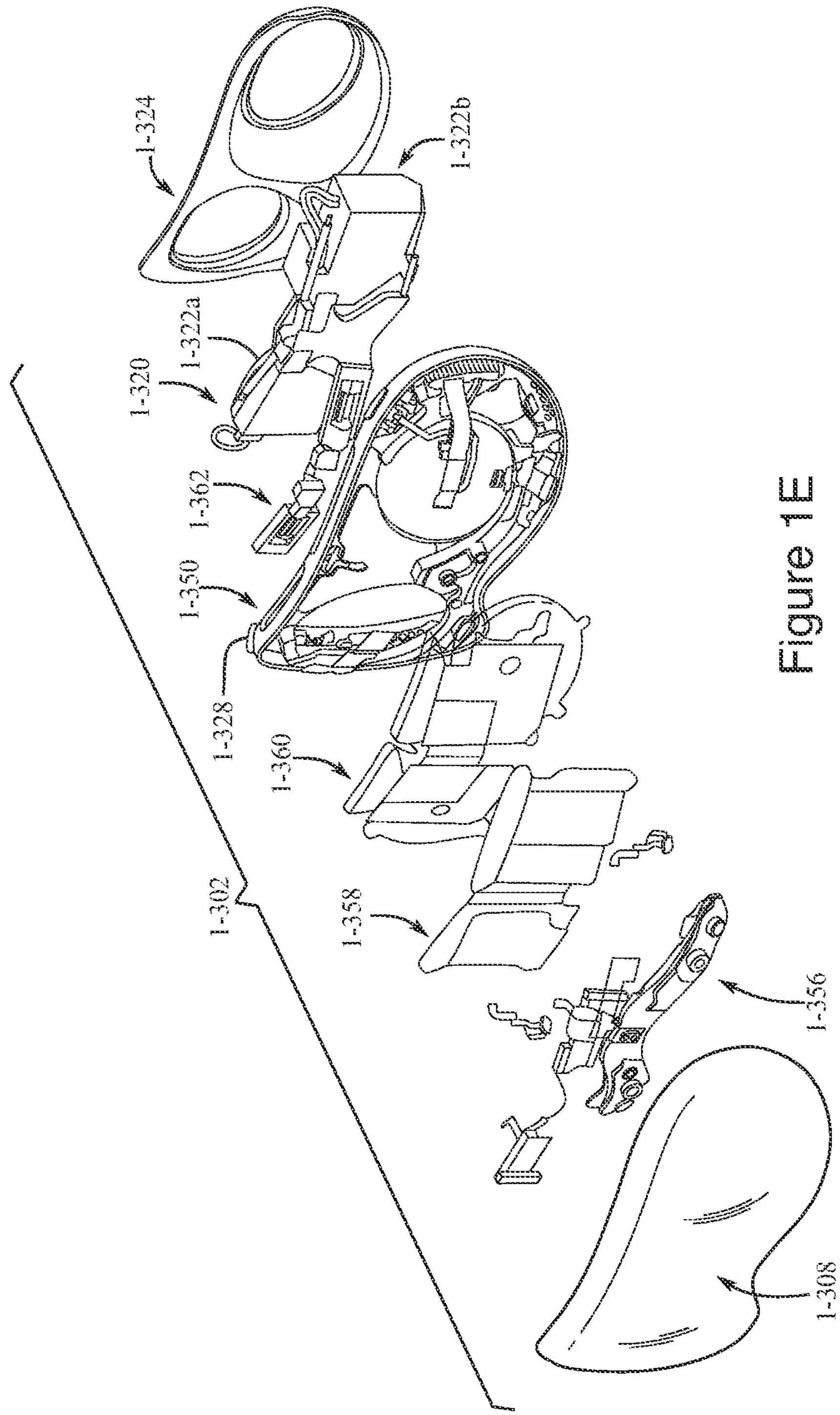
Figure 1F:
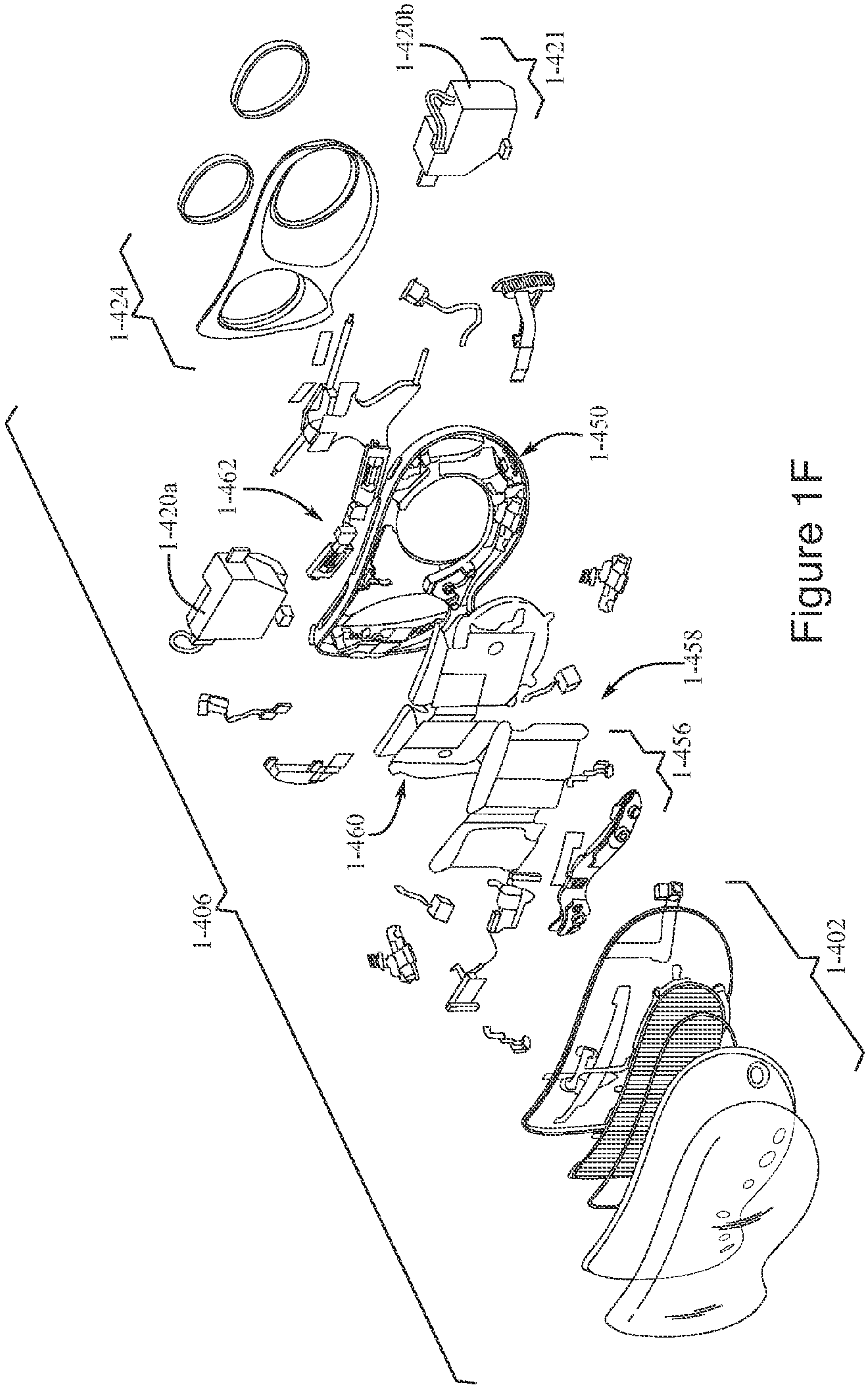
Figure 1G:
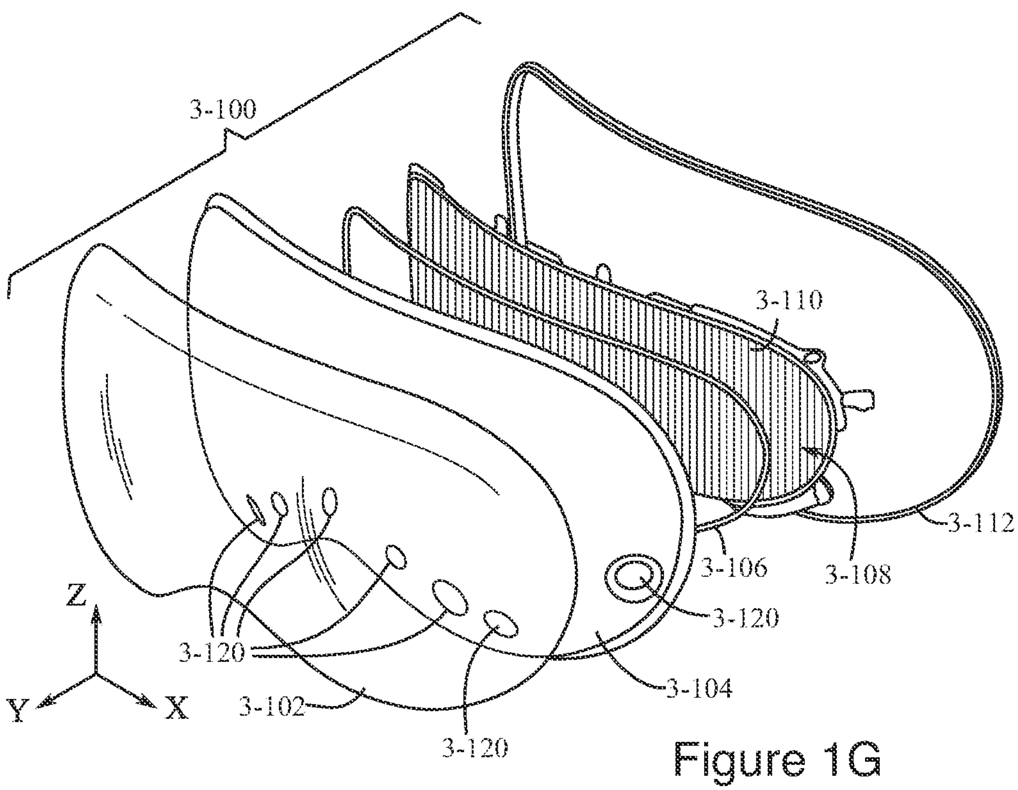
Figure 1H:
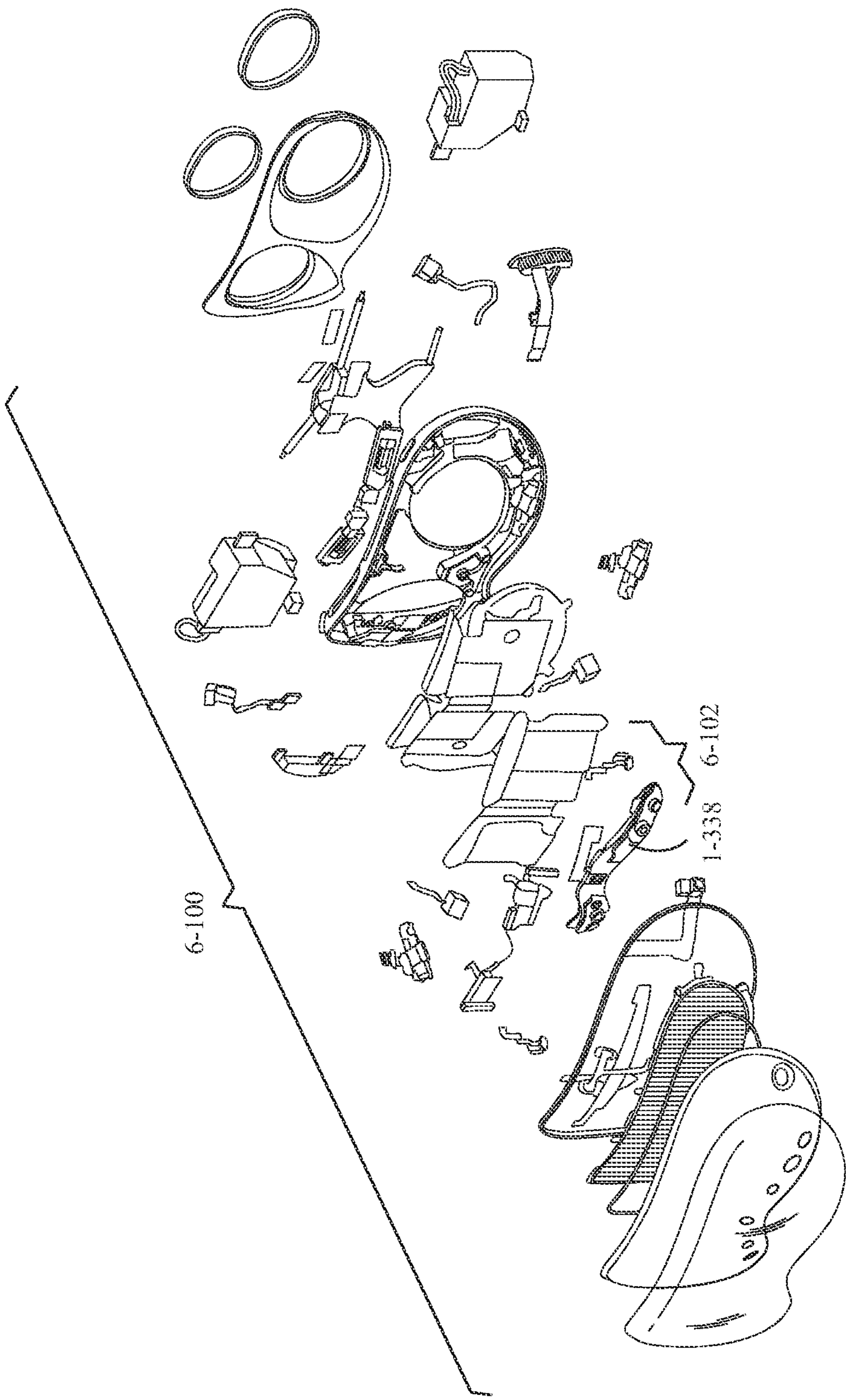
Figure 1I:
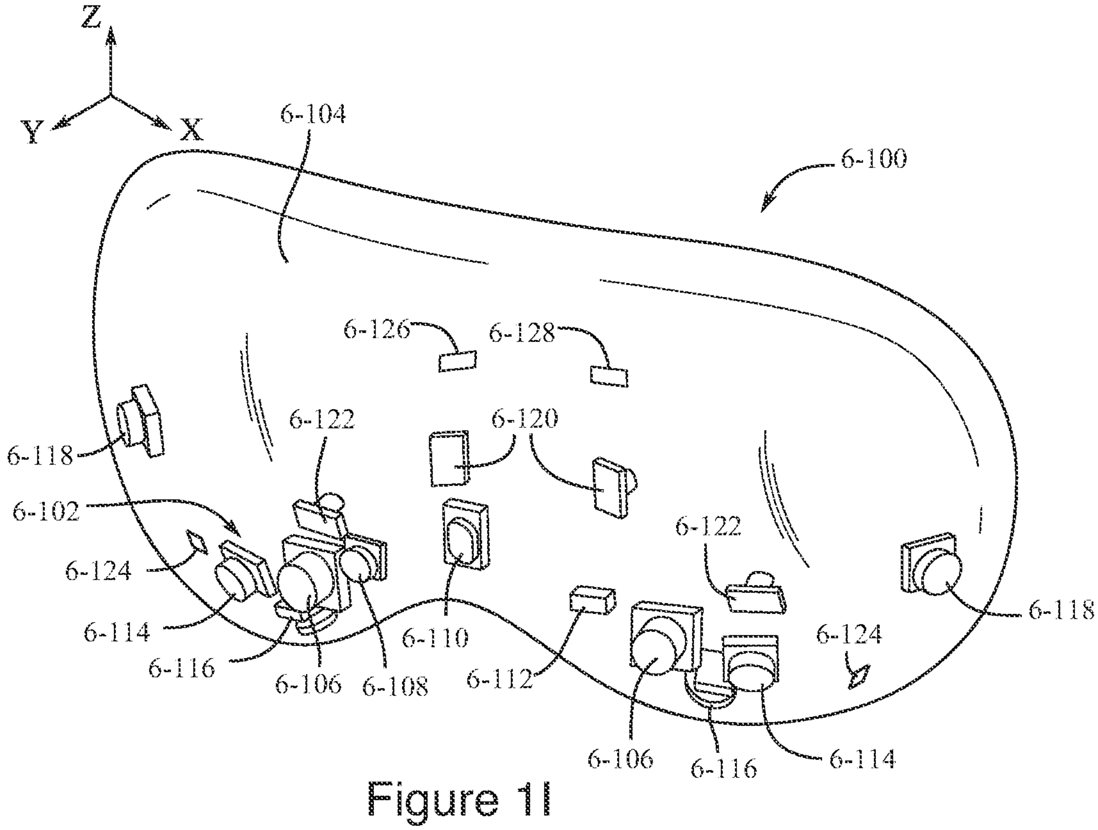
Figure 1J:
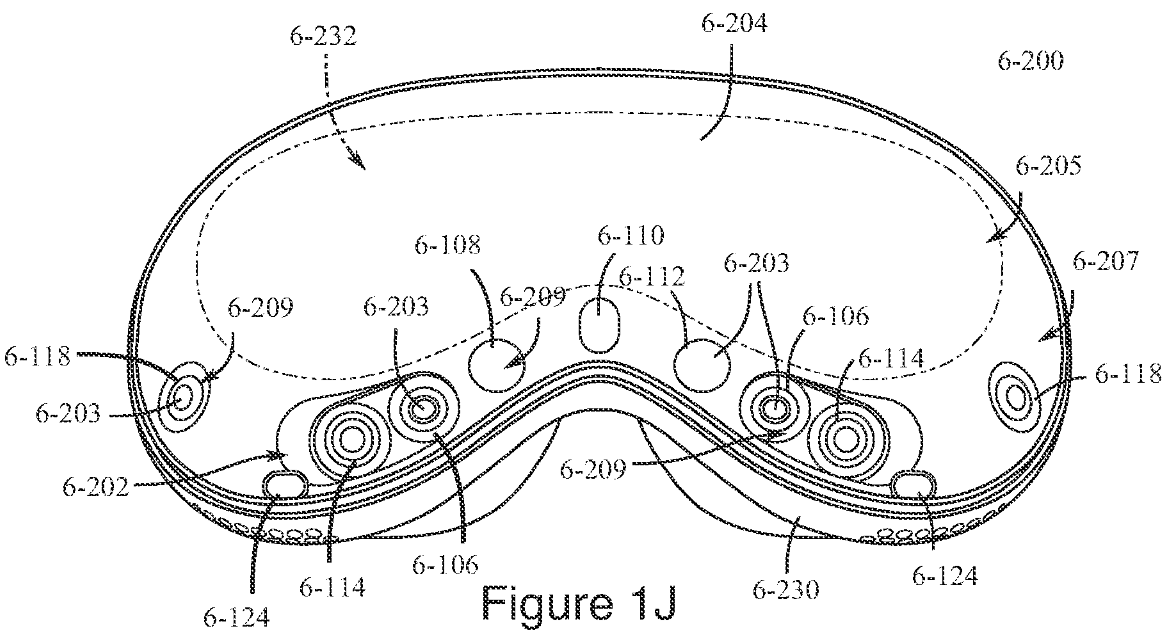
Figure 1K:
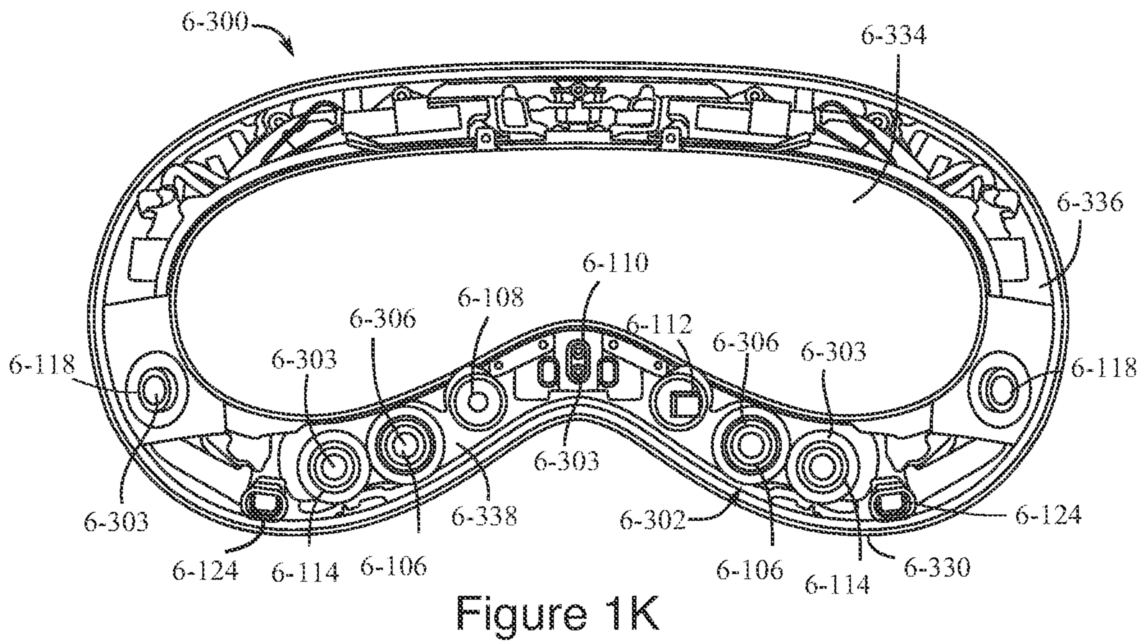
Figure 1L:
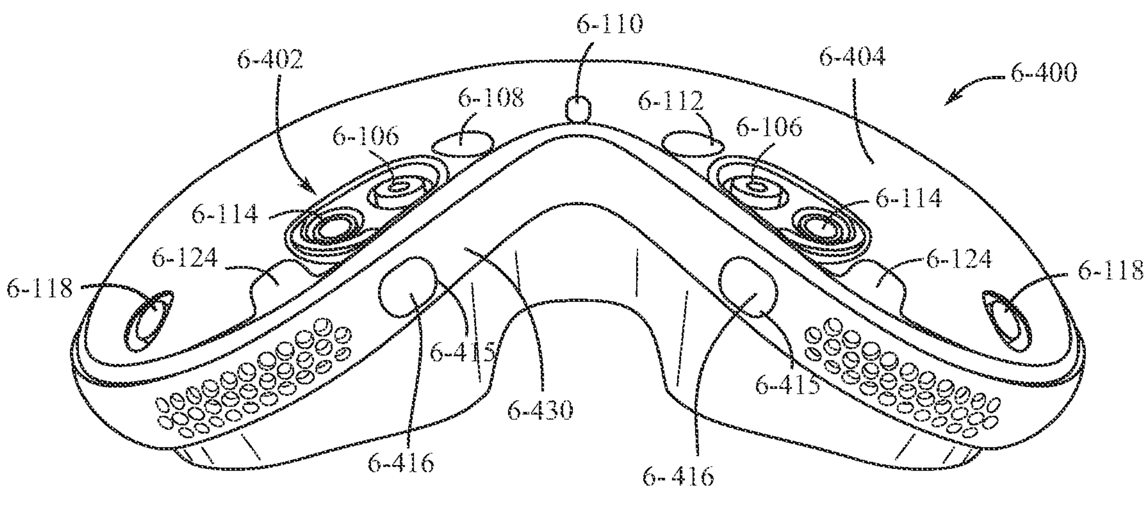
Figure 1M:
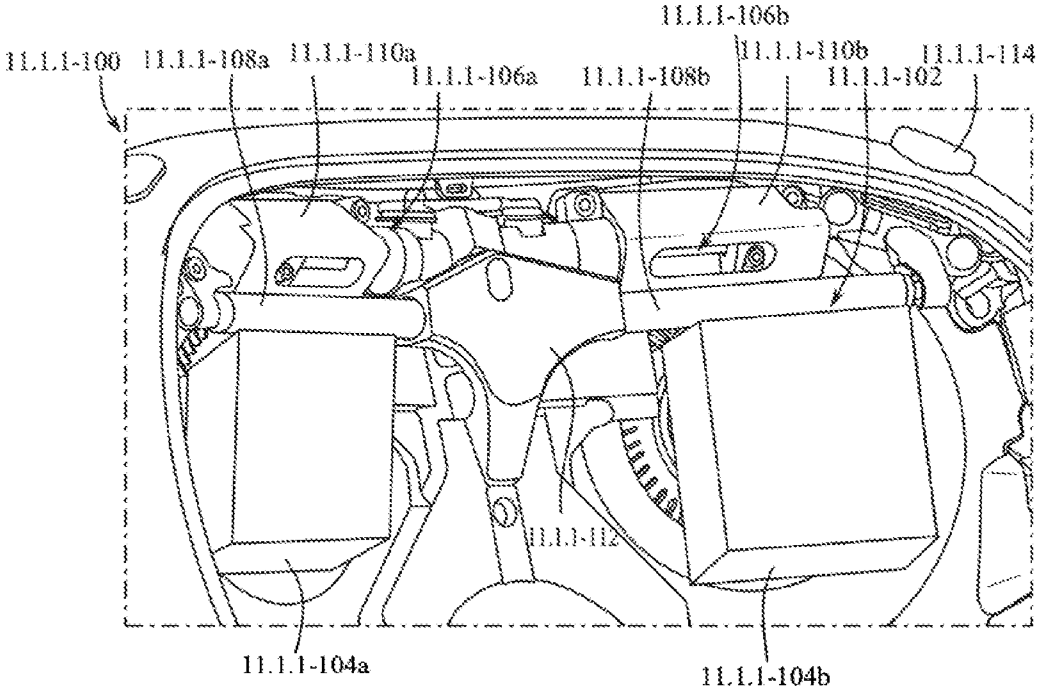
Figure 1N:
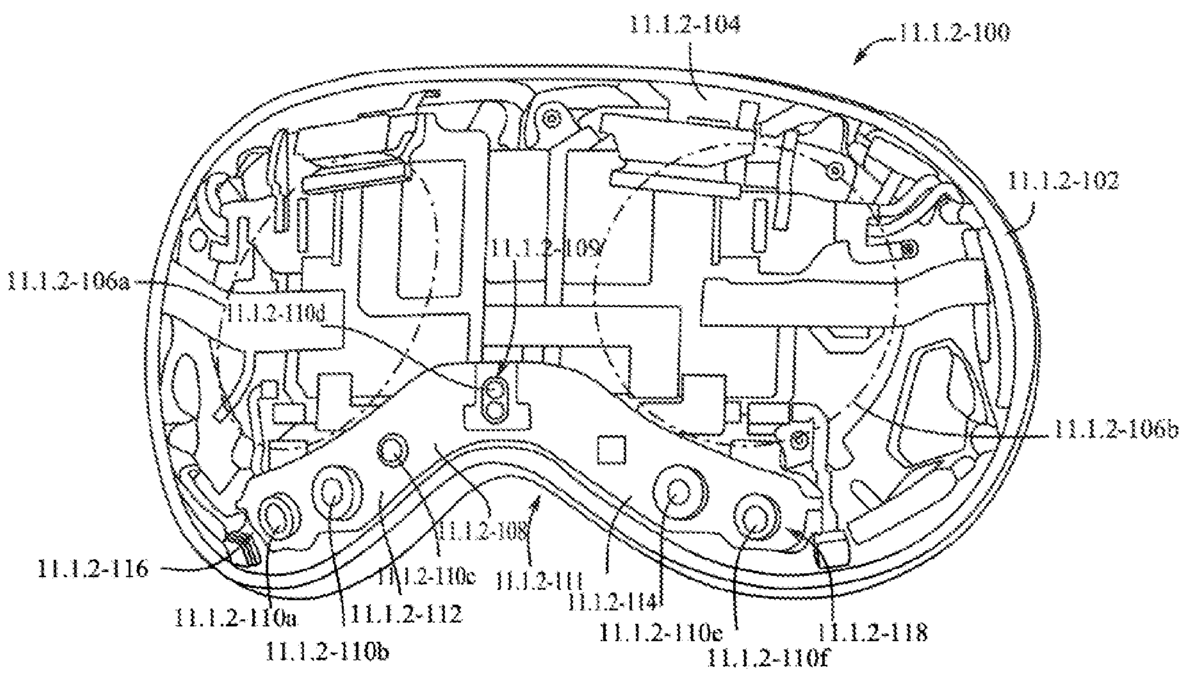
Figure 1O:
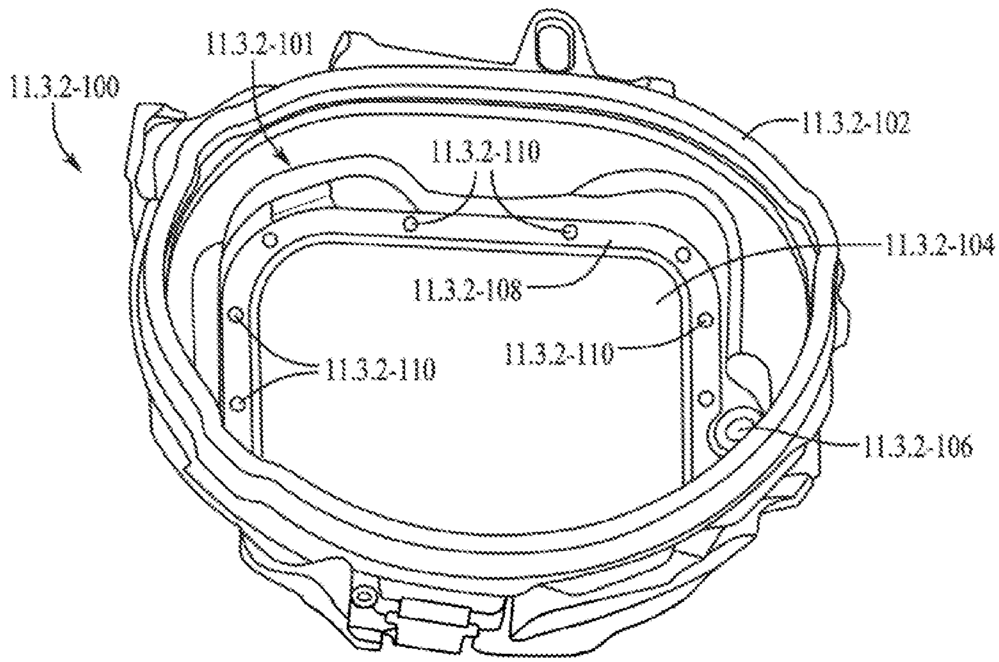
Figure 1P:
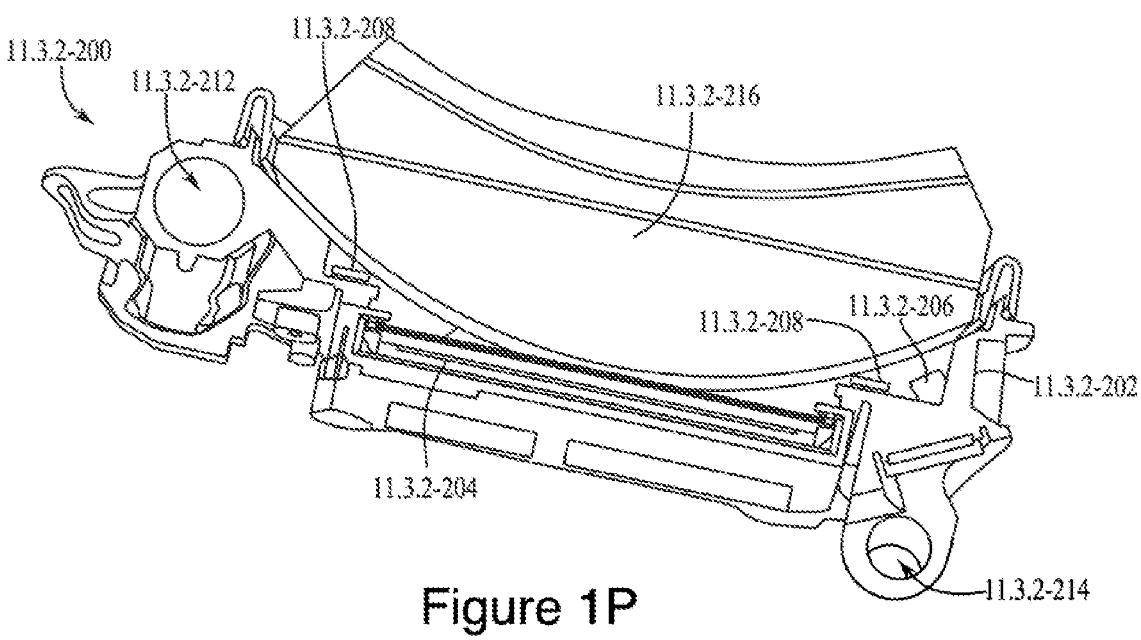

While pertinent features of the operating environment 100 are shown in FIGS. 1A-1P, those of ordinary skill in the art will appreciate from the present disclosure that various other features have not been illustrated for the sake of brevity and so as not to obscure more pertinent aspects of the example embodiments disclosed herein.

FIGS. 1A-1P illustrate various examples of a computer system that is used to perform the methods and provide audio, visual and/or haptic feedback as part of user interfaces described herein. In some embodiments, computer system includes one or more display generation components (e.g., first and second display assemblies 1-120*a*, 1-120*b* and/or first and second optical modules 11.1.1-104*a* and 11.1.1-104*b*) for displaying virtual elements and/or a representation of a physical environment to a user of the computer system, optionally generated based on detected events and/or user inputs detected by the computer system. User interfaces generated by the computer system are optionally corrected by one or more corrective lenses 11.3.2-216 (sometimes referred to as prescription lenses or non-prescription lenses) that are optionally removably attached to one or more of the optical modules to enable the user interfaces to be more easily viewed by users who would otherwise use glasses or contacts to correct their vision. While many user interfaces illustrated herein show a single view of a user interface, user interfaces in a HMD are optionally displayed using two optical modules (e.g., first and second display assemblies 1-120*a*, 1-120*b* and/or first and second optical modules 11.1.1-104*a* and 11.1.1-104*b*), one for a user's right eye and a different one for a user's left eye, and slightly different images are presented to the two different eyes to generate the illusion of stereoscopic depth, the single view of the user interface would typically be either a right-eye or left-eye view and the depth effect is explained in the text or using other schematic charts or views. In some embodiments, computer system includes one or more external displays (e.g., display assembly 1-108) for displaying status information for the computer system to the user of the computer system (when the computer system is not being worn) and/or to other people who are near the computer system, optionally generated based on detected events and/or user inputs detected by the computer system. In some embodiments, computer system includes one or more audio output components (e.g., electronic component 1-112) for generating audio feedback, optionally generated based on detected events and/or user inputs detected by the computer system. In some embodiments, the computer system includes one or more input devices for detecting input such as one or more sensors (e.g., one or more sensors in sensor assembly 1-356, and/or FIG. 1I) for detecting information about a physical environment of the device which can be used (optionally in conjunction with one or more illuminators such as the illuminators describe in FIG. 1I) to generate a digital passthrough image, capture visual media corresponding to the physical environment (e.g., photos and/or video), or determine a pose (e.g., position and/or orientation) of physical objects and/or surfaces in the physical environment so that virtual objects ban be placed based on a detected pose of physical objects and/or surfaces. In some embodiments, the computer system includes one or more input devices for detecting input such as one or more sensors for detecting hand position and/or movement (e.g., one or more sensors in sensor assembly 1-356, and/or FIG. 1I) that can be used (optionally in conjunction with one or more illuminators such as the illuminators 6-124 describe in FIG. 1I) to determine when one or more air gestures have been performed. In some embodiments, the computer system includes one or more input devices for detecting input such as one or more sensors for detecting eye movement (e.g., eye tracking and gaze tracking sensors in FIG. 1I) which can be used (optionally in conjunction with one or more lights such as lights 11.3.2-110 in FIG. 1O) to determine attention or gaze position and/or gaze movement which can optionally be used to detect gaze-only inputs based on gaze movement and/or dwell. A combination of the various sensors described above can be used to determine user facial expressions and/or hand movements for use in generating an avatar or representation of the user such as an anthropomorphic avatar or representation for use in a real-time communication session where the avatar has facial expressions, hand movements, and/or body movements that are based on or similar to detected facial expressions, hand movements, and/or body movements of a user of the device. Gaze and/or attention information is, optionally, combined with hand tracking information to determine interactions between the user and one or more user interfaces based on direct and/or indirect inputs such as air gestures or inputs that use one or more hardware input devices such as one or more buttons (e.g., first button 1-128, button 11.1.1-114, second button 1-132, and or dial or button 1-328), knobs (e.g., first button 1-128, button 11.1.1-114, and/or dial or button 1-328), digital crowns (e.g., first button 1-128 which is depressible and twistable or rotatable, button 11.1.1-114, and/or dial or button 1-328), trackpads, touch screens, keyboards, mice and/or other input devices. One or more buttons (e.g., first button 1-128, button 11.1.1-114, second button 1-132, and or dial or button 1-328) are optionally used to perform system operations such as recentering content in three-dimensional environment that is visible to a user of the device, displaying a home user interface for launching applications, starting real-time communication sessions, or initiating display of virtual three-dimensional backgrounds. Knobs or digital crowns (e.g., first button 1-128 which is depressible and twistable or rotatable, button 11.1.1-114, and/or dial or button 1-328) are optionally rotatable to adjust parameters of the visual content such as a level of immersion of a virtual three-dimensional environment (e.g., a degree to which virtual-content occupies the viewport of the user into the three-dimensional environment) or other parameters associated with the three-dimensional environment and the virtual content that is displayed via the optical modules (e.g., first and second display assemblies 1-120*a*, 1-120*b* and/or first and second optical modules 11.1.1-104*a* and 11.1.1-104*b*).

FIG. 1B illustrates a front, top, perspective view of an example of a head-mountable display (HMD) device 1-100 configured to be donned by a user and provide virtual and altered/mixed reality (VR/AR) experiences. The HMD 1-100 can include a display unit 1-102 or assembly, an electronic strap assembly 1-104 connected to and extending from the display unit 1-102, and a band assembly 1-106 secured at either end to the electronic strap assembly 1-104. The electronic strap assembly 1-104 and the band 1-106 can be part of a retention assembly configured to wrap around a user's head to hold the display unit 1-102 against the face of the user.

In at least one example, the band assembly 1-106 can include a first band 1-116 configured to wrap around the rear side of a user's head and a second band 1-117 configured to extend over the top of a user's head. The second strap can extend between first and second electronic straps 1-105*a*, 1-105*b* of the electronic strap assembly 1-104 as shown. The strap assembly 1-104 and the band assembly 1-106 can be part of a securement mechanism extending rearward from the display unit 1-102 and configured to hold the display unit 1-102 against a face of a user.

In at least one example, the securement mechanism includes a first electronic strap 1-105*a* including a first proximal end 1-134 coupled to the display unit 1-102, for example a housing 1-150 of the display unit 1-102, and a first distal end 1-136 opposite the first proximal end 1-134. The securement mechanism can also include a second electronic strap 1-105*b* including a second proximal end 1-138 coupled to the housing 1-150 of the display unit 1-102 and a second distal end 1-140 opposite the second proximal end 1-138. The securement mechanism can also include the first band 1-116 including a first end 1-142 coupled to the first distal end 1-136 and a second end 1-144 coupled to the second distal end 1-140 and the second band 1-117 extending between the first electronic strap 1-105*a* and the second electronic strap 1-105*b*. The straps 1-105*a-b* and band 1-116 can be coupled via connection mechanisms or assemblies 1-114. In at least one example, the second band 1-117 includes a first end 1-146 coupled to the first electronic strap 1-105*a* between the first proximal end 1-134 and the first distal end 1-136 and a second end 1-148 coupled to the second electronic strap 1-105*b* between the second proximal end 1-138 and the second distal end 1-140.

In at least one example, the first and second electronic straps 1-105*a-b* includes plastic, metal, or other structural materials forming the shape the substantially rigid straps 1-105*a-b*. In at least one example, the first and second bands 1-116, 1-117 are formed of elastic, flexible materials including woven textiles, rubbers, and the like. The first and second bands 1-116, 1-117 can be flexible to conform to the shape of the user' head when donning the HMD 1-100.

In at least one example, one or more of the first and second electronic straps 1-105*a-b* can define internal strap volumes and include one or more electronic components disposed in the internal strap volumes. In one example, as shown in FIG. 1B, the first electronic strap 1-105*a* can include an electronic component 1-112. In one example, the electronic component 1-112 can include a speaker. In one example, the electronic component 1-112 can include a computing component such as a processor.

In at least one example, the housing 1-150 defines a first, front-facing opening 1-152. The front-facing opening is labeled in dotted lines at 1-152 in FIG. 1B because the front cover assembly 1-108 is disposed to occlude the first opening 1-152 from view when the HMD is assembled. The housing 1-150 can also define a rear-facing second opening 1-154. The housing 1-150 also defines an internal volume between the first and second openings 1-152, 1-154. In at least one example, the HMD 1-100 includes the display assembly 1-108, which can include a front cover and display screen (shown in other figures) disposed in or across the front opening 1-152 to occlude the front opening 1-152. In at least one example, the display screen of the display assembly 1-108, as well as the display assembly 1-108 in general, has a curvature configured to follow the curvature of a user's face. The display screen of the display assembly 1-108 can be curved as shown to compliment the user's facial features and general curvature from one side of the face to the other, for example from left to right and/or from top to bottom where the display unit 1-102 is pressed.

In at least one example, the housing 1-150 can define a first aperture 1-126 between the first and second openings 1-152, 1-154 and a second aperture 1-130 between the first and second openings 1-152, 1-154. The HMD 1-100 can also include a first button 1-128 disposed in the first aperture 1-126 and a second button 1-132 disposed in the second aperture 1-130. The first and second buttons 1-128, 1-132 can be depressible through the respective apertures 1-126, 1-130. In at least one example, the first button 1-126 and/or second button 1-130 can be twistable dials as well as depressible buttons. In at least one example, the first button 1-128 is a depressible and twistable dial button and the second button 1-132 is a depressible button.

FIG. 1C illustrates a rear, perspective view of the HMD 1-100. The HMD 1-100 can include a light seal 1-110 extending rearward from the housing 1-150 of the display unit 1-108 around a perimeter of the housing 1-150 as shown. The light seal 1-110 can be configured to extend from the housing 1-150 to the user's face around the user's eyes to block external light from being visible. In one example, the HMD 1-100 can include first and second display assemblies 1-120*a*, 1-120*b* disposed at or in the rearward facing second opening 1-154 defined by the housing 1-150 and/or disposed in the internal volume of the housing 1-150 and configured to project light through the second opening 1-154. In at least one example, each display assembly 1-120*a-b* can include respective display screens 1-122*a*, 1-122*b* configured to project light in a rearward direction through the second opening 1-154 toward the user's eyes.

In at least one example, referring to both FIGS. 1B and 1C, the display assembly 1-108 can be a front-facing, forward display assembly including a display screen configured to project light in a first, forward direction and the rear facing display screens 1-122*a-b* can be configured to project light in a second, rearward direction opposite the first direction. As noted above, the light seal 1-110 can be configured to block light external to the HMD 1-100 from reaching the user's eyes, including light projected by the forward facing display screen of the display assembly 1-108 shown in the front perspective view of FIG. 1B. In at least one example, the HMD 1-100 can also include a curtain 1-124 occluding the second opening 1-154 between the housing 1-150 and the rear-facing display assemblies 1-120*a-b*. In at least one example, the curtain 1-124 can be elastic or at least partially elastic.

Any of the features, components, and/or parts, including the arrangements and configurations thereof shown in FIGS. 1B and 1C can be included, either alone or in any combination, in any of the other examples of devices, features, components, and parts shown in FIGS. 1D-1F and described herein. Likewise, any of the features, components, and/or parts, including the arrangements and configurations thereof shown and described with reference to FIGS. 1D-1F can be included, either alone or in any combination, in the example of the devices, features, components, and parts shown in FIGS. 1B and 1C.

FIG. 1D illustrates an exploded view of an example of an HMD 1-200 including various portions or parts thereof separated according to the modularity and selective coupling of those parts. For example, the HMD 1-200 can include a band 1-216 which can be selectively coupled to first and second electronic straps 1-205*a*, 1-205*b*. The first securement strap 1-205*a* can include a first electronic component 1-212*a* and the second securement strap 1-205*b* can include a second electronic component 1-212*b*. In at least one example, the first and second straps 1-205*a-b* can be removably coupled to the display unit 1-202.

In addition, the HMD 1-200 can include a light seal 1-210 configured to be removably coupled to the display unit 1-202. The HMD 1-200 can also include lenses 1-218 which can be removably coupled to the display unit 1-202, for example over first and second display assemblies including display screens. The lenses 1-218 can include customized prescription lenses configured for corrective vision. As noted, each part shown in the exploded view of FIG. 1D and described above can be removably coupled, attached, re-attached, and changed out to update parts or swap out parts for different users. For example, bands such as the band 1-216, light seals such as the light seal 1-210, lenses such as the lenses 1-218, and electronic straps such as the straps 1-205*a-b* can be swapped out depending on the user such that these parts are customized to fit and correspond to the individual user of the HMD 1-200.

Any of the features, components, and/or parts, including the arrangements and configurations thereof shown in FIG. 1D can be included, either alone or in any combination, in any of the other examples of devices, features, components, and parts shown in FIGS. 1B, 1C, and 1E-1F and described herein. Likewise, any of the features, components, and/or parts, including the arrangements and configurations thereof shown and described with reference to FIGS. 1B, 1C, and 1E-1F can be included, either alone or in any combination, in the example of the devices, features, components, and parts shown in FIG. 1D.

FIG. 1E illustrates an exploded view of an example of a display unit 1-306 of a HMD. The display unit 1-306 can include a front display assembly 1-308, a frame/housing assembly 1-350, and a curtain assembly 1-324. The display unit 1-306 can also include a sensor assembly 1-356, logic board assembly 1-358, and cooling assembly 1-360 disposed between the frame assembly 1-350 and the front display assembly 1-308. In at least one example, the display unit 1-306 can also include a rear-facing display assembly 1-320 including first and second rear-facing display screens 1-322*a*, 1-322*b* disposed between the frame 1-350 and the curtain assembly 1-324.

In at least one example, the display unit 1-306 can also include a motor assembly 1-362 configured as an adjustment mechanism for adjusting the positions of the display screens 1-322*a-b* of the display assembly 1-320 relative to the frame 1-350. In at least one example, the display assembly 1-320 is mechanically coupled to the motor assembly 1-362, with at least one motor for each display screen 1-322*a-b*, such that the motors can translate the display screens 1-322*a-b* to match an interpupillary distance of the user's eyes.

In at least one example, the display unit 1-306 can include a dial or button 1-328 depressible relative to the frame 1-350 and accessible to the user outside the frame 1-350. The button 1-328 can be electronically connected to the motor assembly 1-362 via a controller such that the button 1-328 can be manipulated by the user to cause the motors of the motor assembly 1-362 to adjust the positions of the display screens 1-322*a-b*.

Any of the features, components, and/or parts, including the arrangements and configurations thereof shown in FIG. 1E can be included, either alone or in any combination, in any of the other examples of devices, features, components, and parts shown in FIGS. 1B-1D and 1F and described herein. Likewise, any of the features, components, and/or parts, including the arrangements and configurations thereof shown and described with reference to FIGS. 1B-1D and 1F can be included, either alone or in any combination, in the example of the devices, features, components, and parts shown in FIG. 1E.

FIG. 1F illustrates an exploded view of another example of a display unit 1-406 of a HMD device similar to other HMD devices described herein. The display unit 1-406 can include a front display assembly 1-402, a sensor assembly 1-456, a logic board assembly 1-458, a cooling assembly 1-460, a frame assembly 1-450, a rear-facing display assembly 1-421, and a curtain assembly 1-424. The display unit 1-406 can also include a motor assembly 1-462 for adjusting the positions of first and second display sub-assemblies 1-420*a*, 1-420*b* of the rear-facing display assembly 1-421, including first and second respective display screens for interpupillary adjustments, as described above.

The various parts, systems, and assemblies shown in the exploded view of FIG. 1F are described in greater detail herein with reference to FIGS. 1B-1E as well as subsequent figures referenced in the present disclosure. The display unit 1-406 shown in FIG. 1F can be assembled and integrated with the securement mechanisms shown in FIGS. 1B-1E, including the electronic straps, bands, and other components including light seals, connection assemblies, and so forth.

Any of the features, components, and/or parts, including the arrangements and configurations thereof shown in FIG. 1F can be included, either alone or in any combination, in any of the other examples of devices, features, components, and parts shown in FIGS. 1B-1E and described herein. Likewise, any of the features, components, and/or parts, including the arrangements and configurations thereof shown and described with reference to FIGS. 1B-1E can be included, either alone or in any combination, in the example of the devices, features, components, and parts shown in FIG. 1F.

FIG. 1G illustrates a perspective, exploded view of a front cover assembly 3-100 of an HMD device described herein, for example the front cover assembly 3-1 of the HMD 3-100 shown in FIG. 1G or any other HMD device shown and described herein. The front cover assembly 3-100 shown in FIG. 1B can include a transparent or semi-transparent cover 3-102, shroud 3-104 (or "canopy"), adhesive layers 3-106, display assembly 3-108 including a lenticular lens panel or array 3-110, and a structural trim 3-112. The adhesive layer 3-106 can secure the shroud 3-104 and/or transparent cover 3-102 to the display assembly 3-108 and/or the trim 3-112. The trim 3-112 can secure the various components of the front cover assembly 3-100 to a frame or chassis of the HMD device.

In at least one example, as shown in FIG. 1G, the transparent cover 3-102, shroud 3-104, and display assembly 3-108, including the lenticular lens array 3-110, can be curved to accommodate the curvature of a user's face. The transparent cover 3-102 and the shroud 3-104 can be curved in two or three dimensions, e.g., vertically curved in the Z-direction in and out of the Z-X plane and horizontally curved in the X-direction in and out of the Z-X plane. In at least one example, the display assembly 3-108 can include the lenticular lens array 3-110 as well as a display panel having pixels configured to project light through the shroud 3-104 and the transparent cover 3-102. The display assembly 3-108 can be curved in at least one direction, for example the horizontal direction, to accommodate the curvature of a user's face from one side (e.g., left side) of the face to the other (e.g., right side). In at least one example, each layer or component of the display assembly 3-108, which will be shown in subsequent figures and described in more detail, but which can include the lenticular lens array 3-110 and a display layer, can be similarly or concentrically curved in the horizontal direction to accommodate the curvature of the user's face.

In at least one example, the shroud 3-104 can include a transparent or semi-transparent material through which the display assembly 3-108 projects light. In one example, the shroud 3-104 can include one or more opaque portions, for example opaque ink-printed portions or other opaque film portions on the rear surface of the shroud 3-104. The rear surface can be the surface of the shroud 3-104 facing the user's eyes when the HMD device is donned. In at least one example, opaque portions can be on the front surface of the shroud 3-104 opposite the rear surface. In at least one example, the opaque portion or portions of the shroud 3-104 can include perimeter portions visually hiding any components around an outside perimeter of the display screen of the display assembly 3-108. In this way, the opaque portions of the shroud hide any other components, including electronic components, structural components, and so forth, of the HMD device that would otherwise be visible through the transparent or semi-transparent cover 3-102 and/or shroud 3-104.

In at least one example, the shroud 3-104 can define one or more apertures transparent portions 3-120 through which sensors can send and receive signals. In one example, the portions 3-120 are apertures through which the sensors can extend or send and receive signals. In one example, the portions 3-120 are transparent portions, or portions more transparent than surrounding semi-transparent or opaque portions of the shroud, through which sensors can send and receive signals through the shroud and through the transparent cover 3-102. In one example, the sensors can include cameras, IR sensors, LUX sensors, or any other visual or non-visual environmental sensors of the HMD device.

Any of the features, components, and/or parts, including the arrangements and configurations thereof shown in FIG. 1G can be included, either alone or in any combination, in any of the other examples of devices, features, components, and parts described herein. Likewise, any of the features, components, and/or parts, including the arrangements and configurations thereof shown and described herein can be included, either alone or in any combination, in the example of the devices, features, components, and parts shown in FIG. 1G.

FIG. 1H illustrates an exploded view of an example of an HMD device 6-100. The HMD device 6-100 can include a sensor array or system 6-102 including one or more sensors, cameras, projectors, and so forth mounted to one or more components of the HMD 6-100. In at least one example, the sensor system 6-102 can include a bracket 1-338 on which one or more sensors of the sensor system 6-102 can be fixed/secured.

FIG. 1I illustrates a portion of an HMD device 6-100 including a front transparent cover 6-104 and a sensor system 6-102. The sensor system 6-102 can include a number of different sensors, emitters, receivers, including cameras, IR sensors, projectors, and so forth. The transparent cover 6-104 is illustrated in front of the sensor system 6-102 to illustrate relative positions of the various sensors and emitters as well as the orientation of each sensor/emitter of the system 6-102. As referenced herein, "sideways," "side," "lateral," "horizontal," and other similar terms refer to orientations or directions as indicated by the X-axis shown in FIG. 1J. Terms such as "vertical," "up," "down," and similar terms refer to orientations or directions as indicated by the Z-axis shown in FIG. 1J. Terms such as "frontward," "rearward," "forward," backward," and similar terms refer to orientations or directions as indicated by the Y-axis shown in FIG. 1J.

In at least one example, the transparent cover 6-104 can define a front, external surface of the HMD device 6-100 and the sensor system 6-102, including the various sensors and components thereof, can be disposed behind the cover 6-104 in the Y-axis/direction. The cover 6-104 can be transparent or semi-transparent to allow light to pass through the cover 6-104, both light detected by the sensor system 6-102 and light emitted thereby.

As noted elsewhere herein, the HMD device 6-100 can include one or more controllers including processors for electrically coupling the various sensors and emitters of the sensor system 6-102 with one or more mother boards, processing units, and other electronic devices such as display screens and the like. In addition, as will be shown in more detail below with reference to other figures, the various sensors, emitters, and other components of the sensor system 6-102 can be coupled to various structural frame members, brackets, and so forth of the HMD device 6-100 not shown in FIG. 1I. FIG. 1I shows the components of the sensor system 6-102 unattached and un-coupled electrically from other components for the sake of illustrative clarity.

In at least one example, the device can include one or more controllers having processors configured to execute instructions stored on memory components electrically coupled to the processors. The instructions can include, or cause the processor to execute, one or more algorithms for self-correcting angles and positions of the various cameras described herein overtime with use as the initial positions, angles, or orientations of the cameras get bumped or deformed due to unintended drop events or other events.

In at least one example, the sensor system 6-102 can include one or more scene cameras 6-106. The system 6-102 can include two scene cameras 6-102 disposed on either side of the nasal bridge or arch of the HMD device 6-100 such that each of the two cameras 6-106 correspond generally in position with left and right eyes of the user behind the cover 6-103. In at least one example, the scene cameras 6-106 are oriented generally forward in the Y-direction to capture images in front of the user during use of the HMD 6-100. In at least one example, the scene cameras are color cameras and provide images and content for MR video pass through to the display screens facing the user's eyes when using the HMD device 6-100. The scene cameras 6-106 can also be used for environment and object reconstruction.

In at least one example, the sensor system 6-102 can include a first depth sensor 6-108 pointed generally forward in the Y-direction. In at least one example, the first depth sensor 6-108 can be used for environment and object reconstruction as well as user hand and body tracking. In at least one example, the sensor system 6-102 can include a second depth sensor 6-110 disposed centrally along the width (e.g., along the X-axis) of the HMD device 6-100. For example, the second depth sensor 6-110 can be disposed above the central nasal bridge or accommodating features over the nose of the user when donning the HMD 6-100. In at least one example, the second depth sensor 6-110 can be used for environment and object reconstruction as well as hand and body tracking. In at least one example, the second depth sensor can include a LIDAR sensor.

In at least one example, the sensor system 6-102 can include a depth projector 6-112 facing generally forward to project electromagnetic waves, for example in the form of a predetermined pattern of light dots, out into and within a field of view of the user and/or the scene cameras 6-106 or a field of view including and beyond the field of view of the user and/or scene cameras 6-106. In at least one example, the depth projector can project electromagnetic waves of light in the form of a dotted light pattern to be reflected off objects and back into the depth sensors noted above, including the depth sensors 6-108, 6-110. In at least one example, the depth projector 6-112 can be used for environment and object reconstruction as well as hand and body tracking.

In at least one example, the sensor system 6-102 can include downward facing cameras 6-114 with a field of view pointed generally downward relative to the HDM device 6-100 in the Z-axis. In at least one example, the downward cameras 6-114 can be disposed on left and right sides of the HMD device 6-100 as shown and used for hand and body tracking, headset tracking, and facial avatar detection and creation for display a user avatar on the forward facing display screen of the HMD device 6-100 described elsewhere herein. The downward cameras 6-114, for example, can be used to capture facial expressions and movements for the face of the user below the HMD device 6-100, including the cheeks, mouth, and chin.

In at least one example, the sensor system 6-102 can include jaw cameras 6-116. In at least one example, the jaw cameras 6-116 can be disposed on left and right sides of the HMD device 6-100 as shown and used for hand and body tracking, headset tracking, and facial avatar detection and creation for display a user avatar on the forward facing display screen of the HMD device 6-100 described elsewhere herein. The jaw cameras 6-116, for example, can be used to capture facial expressions and movements for the face of the user below the HMD device 6-100, including the user's jaw, cheeks, mouth, and chin. for hand and body tracking, headset tracking, and facial avatar In at least one example, the sensor system 6-102 can include side cameras 6-118. The side cameras 6-118 can be oriented to capture side views left and right in the X-axis or direction relative to the HMD device 6-100. In at least one example, the side cameras 6-118 can be used for hand and body tracking, headset tracking, and facial avatar detection and re-creation.

In at least one example, the sensor system 6-102 can include a plurality of eye tracking and gaze tracking sensors for determining an identity, status, and gaze direction of a user's eyes during and/or before use. In at least one example, the eye/gaze tracking sensors can include nasal eye cameras 6-120 disposed on either side of the user's nose and adjacent the user's nose when donning the HMD device 6-100. The eye/gaze sensors can also include bottom eye cameras 6-122 disposed below respective user eyes for capturing images of the eyes for facial avatar detection and creation, gaze tracking, and iris identification functions.

In at least one example, the sensor system 6-102 can include infrared illuminators 6-124 pointed outward from the HMD device 6-100 to illuminate the external environment and any object therein with IR light for IR detection with one or more IR sensors of the sensor system 6-102. In at least one example, the sensor system 6-102 can include a flicker sensor 6-126 and an ambient light sensor 6-128. In at least one example, the flicker sensor 6-126 can detect overhead light refresh rates to avoid display flicker. In one example, the infrared illuminators 6-124 can include light emitting diodes and can be used especially for low light environments for illuminating user hands and other objects in low light for detection by infrared sensors of the sensor system 6-102.

In at least one example, multiple sensors, including the scene cameras 6-106, the downward cameras 6-114, the jaw cameras 6-116, the side cameras 6-118, the depth projector 6-112, and the depth sensors 6-108, 6-110 can be used in combination with an electrically coupled controller to combine depth data with camera data for hand tracking and for size determination for better hand tracking and object recognition and tracking functions of the HMD device 6-100. In at least one example, the downward cameras 6-114, jaw cameras 6-116, and side cameras 6-118 described above and shown in FIG. 1I can be wide angle cameras operable in the visible and infrared spectrums. In at least one example, these cameras 6-114, 6-116, 6-118 can operate only in black and white light detection to simplify image processing and gain sensitivity.

Any of the features, components, and/or parts, including the arrangements and configurations thereof shown in FIG. 1I can be included, either alone or in any combination, in any of the other examples of devices, features, components, and parts shown in FIGS. 1J-1L and described herein. Likewise, any of the features, components, and/or parts, including the arrangements and configurations thereof shown and described with reference to FIGS. 1J-1L can be included, either alone or in any combination, in the example of the devices, features, components, and parts shown in FIG. 1I.

FIG. 1J illustrates a lower perspective view of an example of an HMD 6-200 including a cover or shroud 6-204 secured to a frame 6-230. In at least one example, the sensors 6-203 of the sensor system 6-202 can be disposed around a perimeter of the HDM 6-200 such that the sensors 6-203 are outwardly disposed around a perimeter of a display region or area 6-232 so as not to obstruct a view of the displayed light. In at least one example, the sensors can be disposed behind the shroud 6-204 and aligned with transparent portions of the shroud allowing sensors and projectors to allow light back and forth through the shroud 6-204. In at least one example, opaque ink or other opaque material or films/layers can be disposed on the shroud 6-204 around the display area 6-232 to hide components of the HMD 6-200 outside the display area 6-232 other than the transparent portions defined by the opaque portions, through which the sensors and projectors send and receive light and electromagnetic signals during operation. In at least one example, the shroud 6-204 allows light to pass therethrough from the display (e.g., within the display region 6-232) but not radially outward from the display region around the perimeter of the display and shroud 6-204.

In some examples, the shroud 6-204 includes a transparent portion 6-205 and an opaque portion 6-207, as described above and elsewhere herein. In at least one example, the opaque portion 6-207 of the shroud 6-204 can define one or more transparent regions 6-209 through which the sensors 6-203 of the sensor system 6-202 can send and receive signals. In the illustrated example, the sensors 6-203 of the sensor system 6-202 sending and receiving signals through the shroud 6-204, or more specifically through the transparent regions 6-209 of the (or defined by) the opaque portion 6-207 of the shroud 6-204 can include the same or similar sensors as those shown in the example of FIG. 1I, for example depth sensors 6-108 and 6-110, depth projector 6-112, first and second scene cameras 6-106, first and second downward cameras 6-114, first and second side cameras 6-118, and first and second infrared illuminators 6-124. These sensors are also shown in the examples of FIGS. 1K and 1L. Other sensors, sensor types, number of sensors, and relative positions thereof can be included in one or more other examples of HMDs.

Any of the features, components, and/or parts, including the arrangements and configurations thereof shown in FIG. 1J can be included, either alone or in any combination, in any of the other examples of devices, features, components, and parts shown in FIGS. 1I and 1K-1L and described herein. Likewise, any of the features, components, and/or parts, including the arrangements and configurations thereof shown and described with reference to FIGS. 1I and 1K-1L can be included, either alone or in any combination, in the example of the devices, features, components, and parts shown in FIG. 1J.

FIG. 1K illustrates a front view of a portion of an example of an HMD device 6-300 including a display 6-334, brackets 6-336, 6-338, and frame or housing 6-330. The example shown in FIG. 1K does not include a front cover or shroud in order to illustrate the brackets 6-336, 6-338. For example, the shroud 6-204 shown in FIG. 1J includes the opaque portion 6-207 that would visually cover/block a view of anything outside (e.g., radially/peripherally outside) the display/display region 6-334, including the sensors 6-303 and bracket 6-338.

In at least one example, the various sensors of the sensor system 6-302 are coupled to the brackets 6-336, 6-338. In at least one example, the scene cameras 6-306 include tight tolerances of angles relative to one another. For example, the tolerance of mounting angles between the two scene cameras 6-306 can be 0.5 degrees or less, for example 0.3 degrees or less. In order to achieve and maintain such a tight tolerance, in one example, the scene cameras 6-306 can be mounted to the bracket 6-338 and not the shroud. The bracket can include cantilevered arms on which the scene cameras 6-306 and other sensors of the sensor system 6-302 can be mounted to remain un-deformed in position and orientation in the case of a drop event by a user resulting in any deformation of the other bracket 6-226, housing 6-330, and/or shroud.

Any of the features, components, and/or parts, including the arrangements and configurations thereof shown in FIG. 1K can be included, either alone or in any combination, in any of the other examples of devices, features, components, and parts shown in FIGS. 1I-1J and 1L and described herein. Likewise, any of the features, components, and/or parts, including the arrangements and configurations thereof shown and described with reference to FIGS. 1I-1J and 1L can be included, either alone or in any combination, in the example of the devices, features, components, and parts shown in FIG. 1K.

FIG. 1L illustrates a bottom view of an example of an HMD 6-400 including a front display/cover assembly 6-404 and a sensor system 6-402. The sensor system 6-402 can be similar to other sensor systems described above and elsewhere herein, including in reference to FIGS. 1I-1K. In at least one example, the jaw cameras 6-416 can be facing downward to capture images of the user's lower facial features. In one example, the jaw cameras 6-416 can be coupled directly to the frame or housing 6-430 or one or more internal brackets directly coupled to the frame or housing 6-430 shown. The frame or housing 6-430 can include one or more apertures/openings 6-415 through which the jaw cameras 6-416 can send and receive signals.

Any of the features, components, and/or parts, including the arrangements and configurations thereof shown in FIG. 1L can be included, either alone or in any combination, in any of the other examples of devices, features, components, and parts shown in FIGS. 1I-1K and described herein. Likewise, any of the features, components, and/or parts, including the arrangements and configurations thereof shown and described with reference to FIGS. 1I-1K can be included, either alone or in any combination, in the example of the devices, features, components, and parts shown in FIG. 1L.

FIG. 1M illustrates a rear perspective view of an inter-pupillary distance (IPD) adjustment system 11.1.1-102 including first and second optical modules 11.1.1-104*a-b* slidably engaging/coupled to respective guide-rods 11.1.1-108*a-b* and motors 11.1.1-110*a-b* of left and right adjustment subsystems 11.1.1-106*a-b*. The IPD adjustment system 11.1.1-102 can be coupled to a bracket 11.1.1-112 and include a button 11.1.1-114 in electrical communication with the motors 11.1.1-110*a-b*. In at least one example, the button 11.1.1-114 can electrically communicate with the first and second motors 11.1.1-110*a-b* via a processor or other circuitry components to cause the first and second motors 11.1.1-110*a-b* to activate and cause the first and second optical modules 11.1.1-104*a-b*, respectively, to change position relative to one another.

In at least one example, the first and second optical modules 11.1.1-104*a-b* can include respective display screens configured to project light toward the user's eyes when donning the HMD 11.1.1-100. In at least one example, the user can manipulate (e.g., depress and/or rotate) the button 11.1.1-114 to activate a positional adjustment of the optical modules 11.1.1-104*a-b* to match the inter-pupillary distance of the user's eyes. The optical modules 11.1.1-104*a-b* can also include one or more cameras or other sensors/sensor systems for imaging and measuring the IPD of the user such that the optical modules 11.1.1-104*a-b* can be adjusted to match the IPD.

In one example, the user can manipulate the button 11.1.1-114 to cause an automatic positional adjustment of the first and second optical modules 11.1.1-104*a-b*. In one example, the user can manipulate the button 11.1.1-114 to cause a manual adjustment such that the optical modules 11.1.1-104*a-b* move further or closer away, for example when the user rotates the button 11.1.1-114 one way or the other, until the user visually matches her/his own IPD. In one example, the manual adjustment is electronically communicated via one or more circuits and power for the movements of the optical modules 11.1.1-104*a-b* via the motors 11.1.1-110*a-b* is provided by an electrical power source. In one example, the adjustment and movement of the optical modules 11.1.1-104*a-b* via a manipulation of the button 11.1.1-114 is mechanically actuated via the movement of the button 11.1.1-114.

Any of the features, components, and/or parts, including the arrangements and configurations thereof shown in FIG. 1M can be included, either alone or in any combination, in any of the other examples of devices, features, components, and parts shown in any other figures shown and described herein. Likewise, any of the features, components, and/or parts, including the arrangements and configurations thereof shown and described with reference to any other figure shown and described herein, either alone or in any combination, in the example of the devices, features, components, and parts shown in FIG. 1M.

FIG. 1N illustrates a front perspective view of a portion of an HMD 11.1.2-100, including an outer structural frame 11.1.2-102 and an inner or intermediate structural frame 11.1.2-104 defining first and second apertures 11.1.2-106*a*, 11.1.2-106*b*. The apertures 11.1.2-106*a-b* are shown in dotted lines in FIG. 1N because a view of the apertures 11.1.2-106*a-b* can be blocked by one or more other components of the HMD 11.1.2-100 coupled to the inner frame 11.1.2-104 and/or the outer frame 11.1.2-102, as shown. In at least one example, the HMD 11.1.2-100 can include a first mounting bracket 11.1.2-108 coupled to the inner frame 11.1.2-104. In at least one example, the mounting bracket 11.1.2-108 is coupled to the inner frame 11.1.2-104 between the first and second apertures 11.1.2-106*a-b*.

The mounting bracket 11.1.2-108 can include a middle or central portion 11.1.2-109 coupled to the inner frame 11.1.2-104. In some examples, the middle or central portion 11.1.2-109 may not be the geometric middle or center of the bracket 11.1.2-108. Rather, the middle/central portion 11.1.2-109 can be disposed between first and second cantilevered extension arms extending away from the middle portion 11.1.2-109. In at least one example, the mounting bracket 108 includes a first cantilever arm 11.1.2-112 and a second cantilever arm 11.1.2-114 extending away from the middle portion 11.1.2-109 of the mount bracket 11.1.2-108 coupled to the inner frame 11.1.2-104.

As shown in FIG. 1N, the outer frame 11.1.2-102 can define a curved geometry on a lower side thereof to accommodate a user's nose when the user dons the HMD 11.1.2-100. The curved geometry can be referred to as a nose bridge 11.1.2-111 and be centrally located on a lower side of the HMD 11.1.2-100 as shown. In at least one example, the mounting bracket 11.1.2-108 can be connected to the inner frame 11.1.2-104 between the apertures 11.1.2-106*a-b* such that the cantilevered arms 11.1.2-112, 11.1.2-114 extend downward and laterally outward away from the middle portion 11.1.2-109 to compliment the nose bridge 11.1.2-111 geometry of the outer frame 11.1.2-102. In this way, the mounting bracket 11.1.2-108 is configured to accommodate the user's nose as noted above. The nose bridge 11.1.2-111 geometry accommodates the nose in that the nose bridge 11.1.2-111 provides a curvature that curves with, above, over, and around the user's nose for comfort and fit.

The first cantilever arm 11.1.2-112 can extend away from the middle portion 11.1.2-109 of the mounting bracket 11.1.2-108 in a first direction and the second cantilever arm 11.1.2-114 can extend away from the middle portion 11.1.2-109 of the mounting bracket 11.1.2-10 in a second direction opposite the first direction. The first and second cantilever arms 11.1.2-112, 11.1.2-114 are referred to as "cantilevered" or "cantilever" arms because each arm 11.1.2-112, 11.1.2-114, includes a distal free end 11.1.2-116, 11.1.2-118, respectively, which are free of affixation from the inner and outer frames 11.1.2-102, 11.1.2-104. In this way, the arms 11.1.2-112, 11.1.2-114 are cantilevered from the middle portion 11.1.2-109, which can be connected to the inner frame 11.1.2-104, with distal ends 11.1.2-102, 11.1.2-104 unattached.

In at least one example, the HMD 11.1.2-100 can include one or more components coupled to the mounting bracket 11.1.2-108. In one example, the components include a plurality of sensors 11.1.2-110*a-f*. Each sensor of the plurality of sensors 11.1.2-110*a-f* can include various types of sensors, including cameras, IR sensors, and so forth. In some examples, one or more of the sensors 11.1.2-110*a-f* can be used for object recognition in three-dimensional space such that it is important to maintain a precise relative position of two or more of the plurality of sensors 11.1.2-110*a-f*. The cantilevered nature of the mounting bracket 11.1.2-108 can protect the sensors 11.1.2-110*a-f* from damage and altered positioning in the case of accidental drops by the user. Because the sensors 11.1.2-110*a-f* are cantilevered on the arms 11.1.2-112, 11.1.2-114 of the mounting bracket 11.1.2-108, stresses and deformations of the inner and/or outer frames 11.1.2-104, 11.1.2-102 are not transferred to the cantilevered arms 11.1.2-112, 11.1.2-114 and thus do not affect the relative positioning of the sensors 11.1.2-110*a-f* coupled/mounted to the mounting bracket 11.1.2-108.

Any of the features, components, and/or parts, including the arrangements and configurations thereof shown in FIG. 1N can be included, either alone or in any combination, in any of the other examples of devices, features, components, and described herein. Likewise, any of the features, components, and/or parts, including the arrangements and configurations thereof shown and described herein can be included, either alone or in any combination, in the example of the devices, features, components, and parts shown in FIG. 1N.

FIG. 1O illustrates an example of an optical module 11.3.2-100 for use in an electronic device such as an HMD, including HDM devices described herein. As shown in one or more other examples described herein, the optical module 11.3.2-100 can be one of two optical modules within an HMD, with each optical module aligned to project light toward a user's eye. In this way, a first optical module can project light via a display screen toward a user's first eye and a second optical module of the same device can project light via another display screen toward the user's second eye.

In at least one example, the optical module 11.3.2-100 can include an optical frame or housing 11.3.2-102, which can also be referred to as a barrel or optical module barrel. The optical module 11.3.2-100 can also include a display 11.3.2-104, including a display screen or multiple display screens, coupled to the housing 11.3.2-102. The display 11.3.2-104 can be coupled to the housing 11.3.2-102 such that the display 11.3.2-104 is configured to project light toward the eye of a user when the HMD of which the display module 11.3.2-100 is a part is donned during use. In at least one example, the housing 11.3.2-102 can surround the display 11.3.2-104 and provide connection features for coupling other components of optical modules described herein.

In one example, the optical module 11.3.2-100 can include one or more cameras 11.3.2-106 coupled to the housing 11.3.2-102. The camera 11.3.2-106 can be positioned relative to the display 11.3.2-104 and housing 11.3.2-102 such that the camera 11.3.2-106 is configured to capture one or more images of the user's eye during use. In at least one example, the optical module 11.3.2-100 can also include a light strip 11.3.2-108 surrounding the display 11.3.2-104. In one example, the light strip 11.3.2-108 is disposed between the display 11.3.2-104 and the camera 11.3.2-106. The light strip 11.3.2-108 can include a plurality of lights 11.3.2-110. The plurality of lights can include one or more light emitting diodes (LEDs) or other lights configured to project light toward the user's eye when the HMD is donned. The individual lights 11.3.2-110 of the light strip 11.3.2-108 can be spaced about the strip 11.3.2-108 and thus spaced about the display 11.3.2-104 uniformly or non-uniformly at various locations on the strip 11.3.2-108 and around the display 11.3.2-104.

In at least one example, the housing 11.3.2-102 defines a viewing opening 11.3.2-101 through which the user can view the display 11.3.2-104 when the HMD device is donned. In at least one example, the LEDs are configured and arranged to emit light through the viewing opening 11.3.2-101 and onto the user's eye. In one example, the camera 11.3.2-106 is configured to capture one or more images of the user's eye through the viewing opening 11.3.2-101.

As noted above, each of the components and features of the optical module 11.3.2-100 shown in FIG. 1O can be replicated in another (e.g., second) optical module disposed with the HMD to interact (e.g., project light and capture images) of another eye of the user.

Any of the features, components, and/or parts, including the arrangements and configurations thereof shown in FIG. 1O can be included, either alone or in any combination, in any of the other examples of devices, features, components, and parts shown in FIG. 1P or otherwise described herein. Likewise, any of the features, components, and/or parts, including the arrangements and configurations thereof shown and described with reference to FIG. 1P or otherwise described herein can be included, either alone or in any combination, in the example of the devices, features, components, and parts shown in FIG. 1O.

FIG. 1P illustrates a cross-sectional view of an example of an optical module 11.3.2-200 including a housing 11.3.2-202, display assembly 11.3.2-204 coupled to the housing 11.3.2-202, and a lens 11.3.2-216 coupled to the housing 11.3.2-202. In at least one example, the housing 11.3.2-202 defines a first aperture or channel 11.3.2-212 and a second aperture or channel 11.3.2-214. The channels 11.3.2-212, 11.3.2-214 can be configured to slidably engage respective rails or guide rods of an HMD device to allow the optical module 11.3.2-200 to adjust in position relative to the user's eyes for match the user's interpapillary distance (IPD). The housing 11.3.2-202 can slidably engage the guide rods to secure the optical module 11.3.2-200 in place within the HMD.

In at least one example, the optical module 11.3.2-200 can also include a lens 11.3.2-216 coupled to the housing 11.3.2-202 and disposed between the display assembly 11.3.2-204 and the user's eyes when the HMD is donned. The lens 11.3.2-216 can be configured to direct light from the display assembly 11.3.2-204 to the user's eye. In at least one example, the lens 11.3.2-216 can be a part of a lens assembly including a corrective lens removably attached to the optical module 11.3.2-200. In at least one example, the lens 11.3.2-216 is disposed over the light strip 11.3.2-208 and the one or more eye-tracking cameras 11.3.2-206 such that the camera 11.3.2-206 is configured to capture images of the user's eye through the lens 11.3.2-216 and the light strip 11.3.2-208 includes lights configured to project light through the lens 11.3.2-216 to the users' eye during use.

Any of the features, components, and/or parts, including the arrangements and configurations thereof shown in FIG. 1P can be included, either alone or in any combination, in any of the other examples of devices, features, components, and parts and described herein. Likewise, any of the features, components, and/or parts, including the arrangements and configurations thereof shown and described herein can be included, either alone or in any combination, in the example of the devices, features, components, and parts shown in FIG. 1P.

Figure 2:
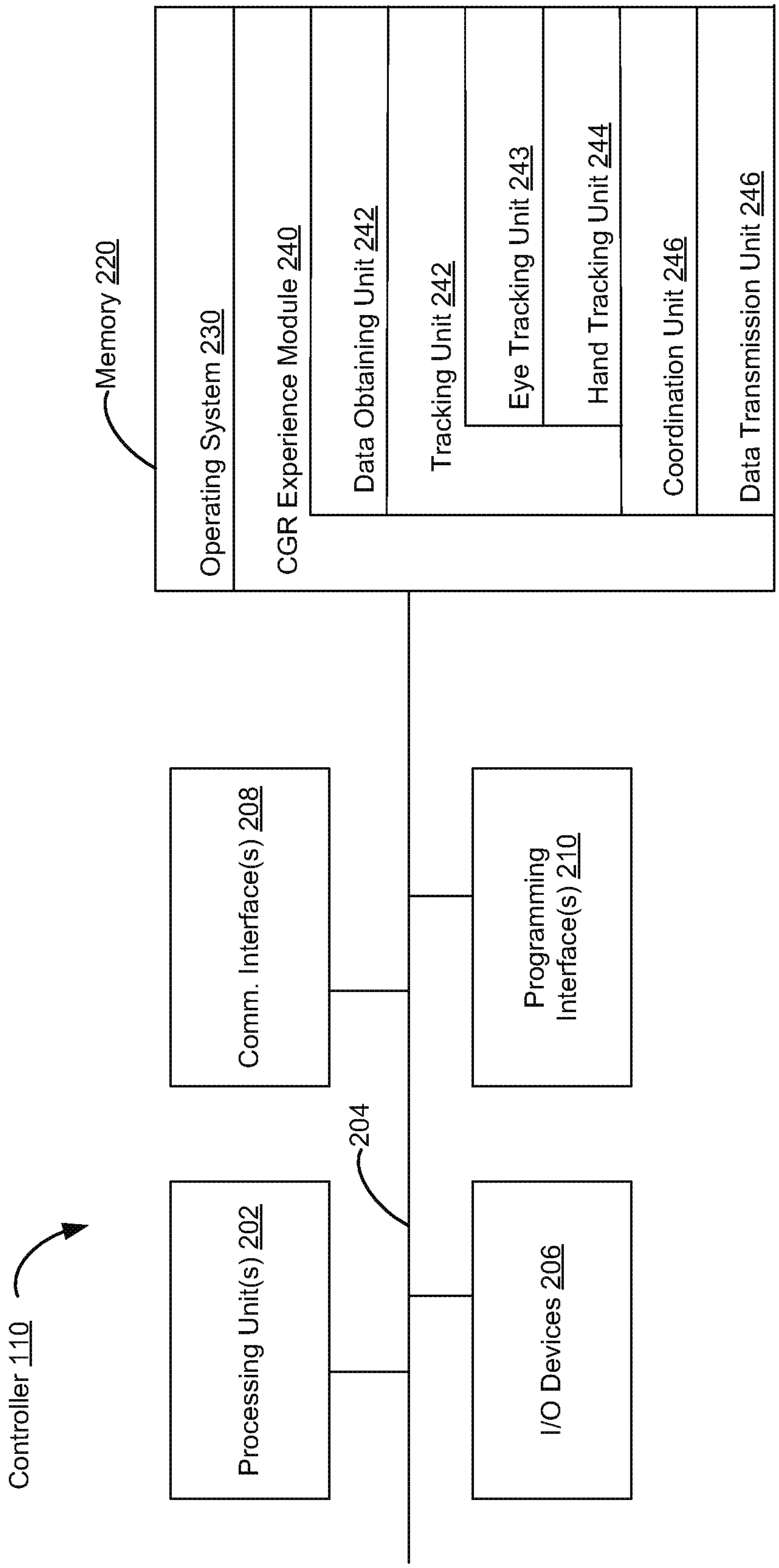
FIG. 2 is a block diagram illustrating a controller of a computer system that is configured to manage and coordinate an XR experience for the user in accordance with some embodiments.

FIG. 2 is a block diagram of an example of the controller 110 in accordance with some embodiments. While certain specific features are illustrated, those skilled in the art will appreciate from the present disclosure that various other features have not been illustrated for the sake of brevity, and so as not to obscure more pertinent aspects of the embodiments disclosed herein. To that end, as a non-limiting example, in some embodiments, the controller 110 includes one or more processing units 202 (e.g., microprocessors, application-specific integrated-circuits (ASICs), field-programmable gate arrays (FPGAs), graphics processing units (GPUs), central processing units (CPUs), processing cores, and/or the like), one or more input/output (I/O) devices 206, one or more communication interfaces 208 (e.g., universal serial bus (USB), FIREWIRE, THUNDERBOLT, IEEE 802.3x, IEEE 802.11x, IEEE 802.16x, global system for mobile communications (GSM), code division multiple access (CDMA), time division multiple access (TDMA), global positioning system (GPS), infrared (IR), BLUETOOTH, ZIGBEE, and/or the like type interface), one or more programming (e.g., I/O) interfaces 210, a memory 220, and one or more communication buses 204 for interconnecting these and various other components.

In some embodiments, the one or more communication buses 204 include circuitry that interconnects and controls communications between system components. In some embodiments, the one or more I/O devices 206 include at least one of a keyboard, a mouse, a touchpad, a joystick, one or more microphones, one or more speakers, one or more image sensors, one or more displays, and/or the like.

The memory 220 includes high-speed random-access memory, such as dynamic random-access memory (DRAM), static random-access memory (SRAM), double-data-rate random-access memory (DDR RAM), or other random-access solid-state memory devices. In some embodiments, the memory 220 includes non-volatile memory, such as one or more magnetic disk storage devices, optical disk storage devices, flash memory devices, or other non-volatile solid-state storage devices. The memory 220 optionally includes one or more storage devices remotely located from the one or more processing units 202. The memory 220 comprises a non-transitory computer readable storage medium. In some embodiments, the memory 220 or the non-transitory computer readable storage medium of the memory 220 stores the following programs, modules and data structures, or a subset thereof including an optional operating system 230 and an XR experience module 240.

The operating system 230 includes instructions for handling various basic system services and for performing hardware dependent tasks. In some embodiments, the XR experience module 240 is configured to manage and coordinate one or more XR experiences for one or more users (e.g., a single XR experience for one or more users, or multiple XR experiences for respective groups of one or more users). To that end, in various embodiments, the XR experience module 240 includes a data obtaining unit 241, a tracking unit 242, a coordination unit 246, and a data transmitting unit 248.

In some embodiments, the data obtaining unit 241 is configured to obtain data (e.g., presentation data, interaction data, sensor data, location data, etc.) from at least the display generation component 120 of FIG. 1A, and optionally one or more of the input devices 125, output devices 155, sensors 190, and/or peripheral devices 195. To that end, in various embodiments, the data obtaining unit 241 includes instructions and/or logic therefor, and heuristics and metadata therefor.

In some embodiments, the tracking unit 242 is configured to map the scene 105 and to track the position/location of at least the display generation component 120 with respect to the scene 105 of FIG. 1A, and optionally, to one or more of the input devices 125, output devices 155, sensors 190, and/or peripheral devices 195. To that end, in various embodiments, the tracking unit 242 includes instructions and/or logic therefor, and heuristics and metadata therefor. In some embodiments, the tracking unit 242 includes hand tracking unit 244 and/or eye tracking unit 243. In some embodiments, the hand tracking unit 244 is configured to track the position/location of one or more portions of the user's hands, and/or motions of one or more portions of the user's hands with respect to the scene 105 of FIG. 1A, relative to the display generation component 120, and/or relative to a coordinate system defined relative to the user's hand. The hand tracking unit 244 is described in greater detail below with respect to FIG. 4. In some embodiments, the eye tracking unit 243 is configured to track the position and movement of the user's gaze (or more broadly, the user's eyes, face, or head) with respect to the scene 105 (e.g., with respect to the physical environment and/or to the user (e.g., the user's hand)) or with respect to the XR content displayed via the display generation component 120. The eye tracking unit 243 is described in greater detail below with respect to FIG. 5.

In some embodiments, the coordination unit 246 is configured to manage and coordinate the XR experience presented to the user by the display generation component 120, and optionally, by one or more of the output devices 155 and/or peripheral devices 195. To that end, in various embodiments, the coordination unit 246 includes instructions and/or logic therefor, and heuristics and metadata therefor.

In some embodiments, the data transmitting unit 248 is configured to transmit data (e.g., presentation data, location data, etc.) to at least the display generation component 120, and optionally, to one or more of the input devices 125, output devices 155, sensors 190, and/or peripheral devices 195. To that end, in various embodiments, the data transmitting unit 248 includes instructions and/or logic therefor, and heuristics and metadata therefor.

Although the data obtaining unit 241, the tracking unit 242 (e.g., including the eye tracking unit 243 and the hand tracking unit 244), the coordination unit 246, and the data transmitting unit 248 are shown as residing on a single device (e.g., the controller 110), it should be understood that in other embodiments, any combination of the data obtaining unit 241, the tracking unit 242 (e.g., including the eye tracking unit 243 and the hand tracking unit 244), the coordination unit 246, and the data transmitting unit 248 may be located in separate computing devices.

Moreover, FIG. 2 is intended more as functional description of the various features that may be present in a particular implementation as opposed to a structural schematic of the embodiments described herein. As recognized by those of ordinary skill in the art, items shown separately could be combined and some items could be separated. For example, some functional modules shown separately in FIG. 2 could be implemented in a single module and the various functions of single functional blocks could be implemented by one or more functional blocks in various embodiments. The actual number of modules and the division of particular functions and how features are allocated among them will vary from one implementation to another and, in some embodiments, depends in part on the particular combination of hardware, software, and/or firmware chosen for a particular implementation.

Figure 3:
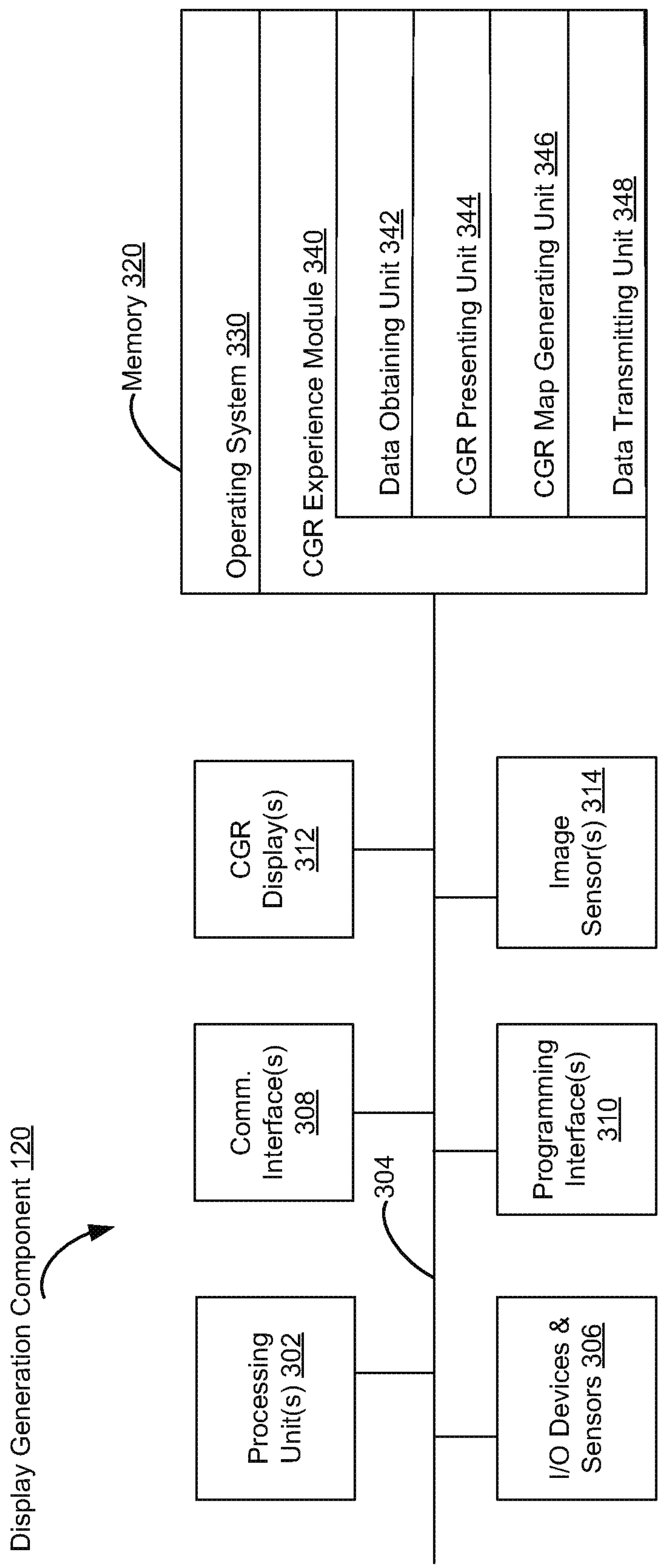
FIG. 3 is a block diagram illustrating a display generation component of a computer system that is configured to provide a visual component of the XR experience to the user in accordance with some embodiments.

FIG. 3 is a block diagram of an example of the display generation component 120 in accordance with some embodiments. While certain specific features are illustrated, those skilled in the art will appreciate from the present disclosure that various other features have not been illustrated for the sake of brevity, and so as not to obscure more pertinent aspects of the embodiments disclosed herein. To that end, as a non-limiting example, in some embodiments the display generation component 120 (e.g., HMD) includes one or more processing units 302 (e.g., microprocessors, ASICs, FPGAs, GPUs, CPUs, processing cores, and/or the like), one or more input/output (I/O) devices and sensors 306, one or more communication interfaces 308 (e.g., USB, FIREWIRE, THUNDERBOLT, IEEE 802.3x, IEEE 802.11x, IEEE 802.16x, GSM, CDMA, TDMA, GPS, IR, BLUETOOTH, ZIGBEE, and/or the like type interface), one or more programming (e.g., I/O) interfaces 310, one or more XR displays 312, one or more optional interior- and/or exterior-facing image sensors 314, a memory 320, and one or more communication buses 304 for interconnecting these and various other components.

In some embodiments, the one or more communication buses 304 include circuitry that interconnects and controls communications between system components. In some embodiments, the one or more I/O devices and sensors 306 include at least one of an inertial measurement unit (IMU), an accelerometer, a gyroscope, a thermometer, one or more physiological sensors (e.g., blood pressure monitor, heart rate monitor, blood oxygen sensor, blood glucose sensor, etc.), one or more microphones, one or more speakers, a haptics engine, one or more depth sensors (e.g., a structured light, a time-of-flight, or the like), and/or the like.

In some embodiments, the one or more XR displays 312 are configured to provide the XR experience to the user. In some embodiments, the one or more XR displays 312 correspond to holographic, digital light processing (DLP), liquid-crystal display (LCD), liquid-crystal on silicon (LCoS), organic light-emitting field-effect transitory (OLET), organic light-emitting diode (OLED), surface-conduction electron-emitter display (SED), field-emission display (FED), quantum-dot light-emitting diode (QD-LED), micro-electro-mechanical system (MEMS), and/or the like display types. In some embodiments, the one or more XR displays 312 correspond to diffractive, reflective, polarized, holographic, etc. waveguide displays. For example, the display generation component 120 (e.g., HMD) includes a single XR display. In another example, the display generation component 120 includes an XR display for each eye of the user. In some embodiments, the one or more XR displays 312 are capable of presenting MR and VR content. In some embodiments, the one or more XR displays 312 are capable of presenting MR or VR content.

In some embodiments, the one or more image sensors 314 are configured to obtain image data that corresponds to at least a portion of the face of the user that includes the eyes of the user (and may be referred to as an eye-tracking camera). In some embodiments, the one or more image sensors 314 are configured to obtain image data that corresponds to at least a portion of the user's hand(s) and optionally arm(s) of the user (and may be referred to as a hand-tracking camera). In some embodiments, the one or more image sensors 314 are configured to be forward-facing so as to obtain image data that corresponds to the scene as would be viewed by the user if the display generation component 120 (e.g., HMD) was not present (and may be referred to as a scene camera). The one or more optional image sensors 314 can include one or more RGB cameras (e.g., with a complimentary metal-oxide-semiconductor (CMOS) image sensor or a charge-coupled device (CCD)

image sensor), one or more infrared (IR) cameras, one or more event-based cameras, and/or the like.

The memory 320 includes high-speed random-access memory, such as DRAM, SRAM, DDR RAM, or other random-access solid-state memory devices. In some embodiments, the memory 320 includes non-volatile memory, such as one or more magnetic disk storage devices, optical disk storage devices, flash memory devices, or other non-volatile solid-state storage devices. The memory 320 optionally includes one or more storage devices remotely located from the one or more processing units 302. The memory 320 comprises a non-transitory computer readable storage medium. In some embodiments, the memory 320 or the non-transitory computer readable storage medium of the memory 320 stores the following programs, modules and data structures, or a subset thereof including an optional operating system 330 and an XR presentation module 340.

The operating system 330 includes instructions for handling various basic system services and for performing hardware dependent tasks. In some embodiments, the XR presentation module 340 is configured to present XR content to the user via the one or more XR displays 312. To that end, in various embodiments, the XR presentation module 340 includes a data obtaining unit 342, an XR presenting unit 344, an XR map generating unit 346, and a data transmitting unit 348.

In some embodiments, the data obtaining unit 342 is configured to obtain data (e.g., presentation data, interaction data, sensor data, location data, etc.) from at least the controller 110 of FIG. 1A. To that end, in various embodiments, the data obtaining unit 342 includes instructions and/or logic therefor, and heuristics and metadata therefor.

In some embodiments, the XR presenting unit 344 is configured to present XR content via the one or more XR displays 312. To that end, in various embodiments, the XR presenting unit 344 includes instructions and/or logic therefor, and heuristics and metadata therefor.

In some embodiments, the XR map generating unit 346 is configured to generate an XR map (e.g., a 3D map of the mixed reality scene or a map of the physical environment into which computer-generated objects can be placed to generate the extended reality) based on media content data. To that end, in various embodiments, the XR map generating unit 346 includes instructions and/or logic therefor, and heuristics and metadata therefor.

In some embodiments, the data transmitting unit 348 is configured to transmit data (e.g., presentation data, location data, etc.) to at least the controller 110, and optionally one or more of the input devices 125, output devices 155, sensors 190, and/or peripheral devices 195. To that end, in various embodiments, the data transmitting unit 348 includes instructions and/or logic therefor, and heuristics and metadata therefor.

Although the data obtaining unit 342, the XR presenting unit 344, the XR map generating unit 346, and the data transmitting unit 348 are shown as residing on a single device (e.g., the display generation component 120 of FIG. 1A), it should be understood that in other embodiments, any combination of the data obtaining unit 342, the XR presenting unit 344, the XR map generating unit 346, and the data transmitting unit 348 may be located in separate computing devices.

Moreover, FIG. 3 is intended more as a functional description of the various features that could be present in a particular implementation as opposed to a structural schematic of the embodiments described herein. As recognized by those of ordinary skill in the art, items shown separately could be combined and some items could be separated. For example, some functional modules shown separately in FIG. 3 could be implemented in a single module and the various functions of single functional blocks could be implemented by one or more functional blocks in various embodiments. The actual number of modules and the division of particular functions and how features are allocated among them will vary from one implementation to another and, in some embodiments, depends in part on the particular combination of hardware, software, and/or firmware chosen for a particular implementation.

Figure 4:
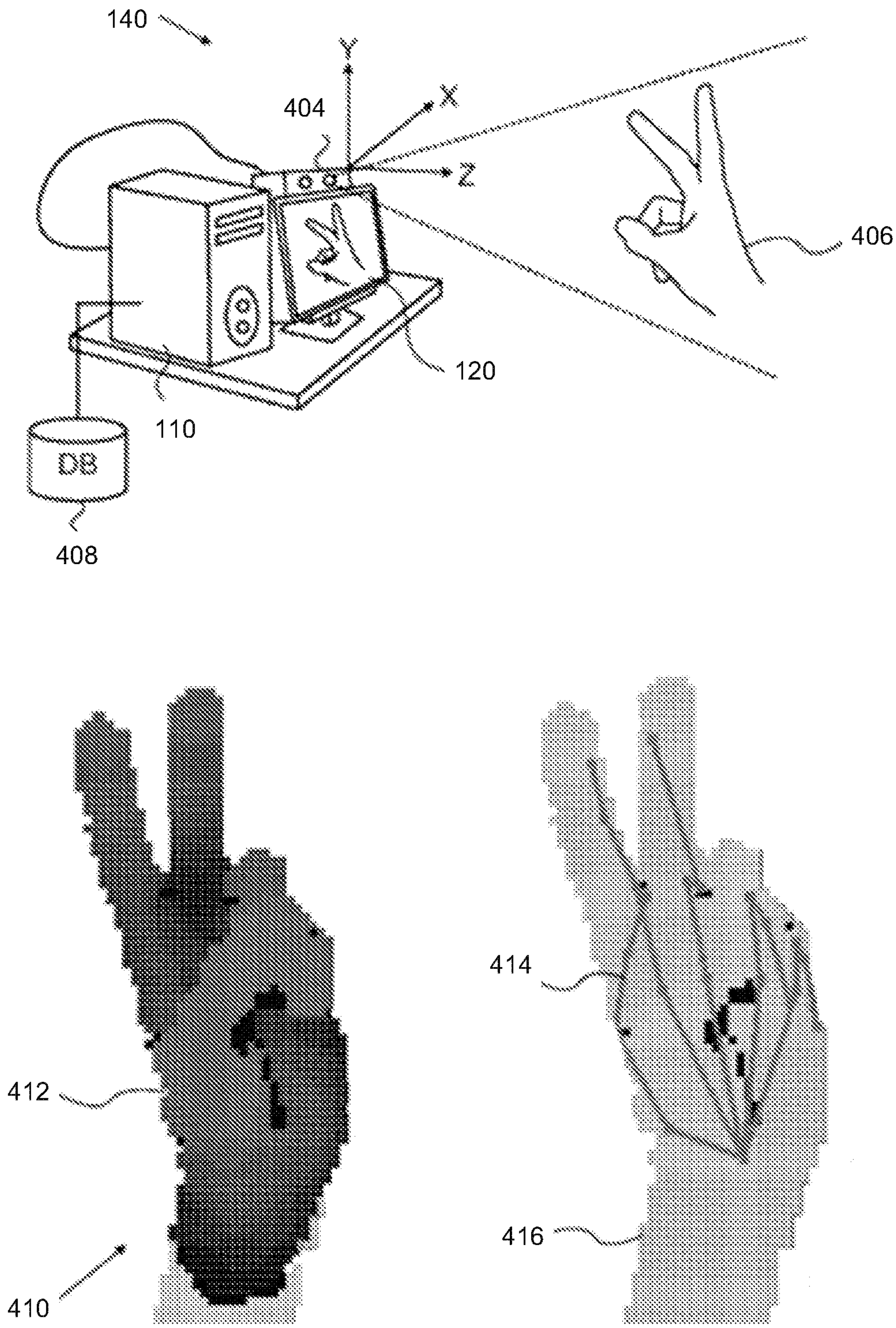
FIG. 4 is a block diagram illustrating a hand tracking unit of a computer system that is configured to capture gesture inputs of the user in accordance with some embodiments.

FIG. 4 is a schematic, pictorial illustration of an example embodiment of the hand tracking device 140. In some embodiments, hand tracking device 140 (FIG. 1A) is controlled by hand tracking unit 244 (FIG. 2) to track the position/location of one or more portions of the user's hands, and/or motions of one or more portions of the user's hands with respect to the scene 105 of FIG. 1A (e.g., with respect to a portion of the physical environment surrounding the user, with respect to the display generation component 120, or with respect to a portion of the user (e.g., the user's face, eyes, or head), and/or relative to a coordinate system defined relative to the user's hand). In some embodiments, the hand tracking device 140 is part of the display generation component 120 (e.g., embedded in or attached to a head-mounted device). In some embodiments, the hand tracking device 140 is separate from the display generation component 120 (e.g., located in separate housings or attached to separate physical support structures).

In some embodiments, the hand tracking device 140 includes image sensors 404 (e.g., one or more IR cameras, 3D cameras, depth cameras, and/or color cameras, etc.) that capture three-dimensional scene information that includes at least a hand 406 of a human user. The image sensors 404 capture the hand images with sufficient resolution to enable the fingers and their respective positions to be distinguished. The image sensors 404 typically capture images of other parts of the user's body, as well, or possibly all of the body, and may have either zoom capabilities or a dedicated sensor with enhanced magnification to capture images of the hand with the desired resolution. In some embodiments, the image sensors 404 also capture 2D color video images of the hand 406 and other elements of the scene. In some embodiments, the image sensors 404 are used in conjunction with other image sensors to capture the physical environment of the scene 105, or serve as the image sensors that capture the physical environments of the scene 105. In some embodiments, the image sensors 404 are positioned relative to the user or the user's environment in a way that a field of view of the image sensors or a portion thereof is used to define an interaction space in which hand movement captured by the image sensors are treated as inputs to the controller 110.

In some embodiments, the image sensors 404 output a sequence of frames containing 3D map data (and possibly color image data, as well) to the controller 110, which extracts high-level information from the map data. This high-level information is typically provided via an Application Program Interface (API) to an application running on the controller, which drives the display generation component 120 accordingly. For example, the user may interact with software running on the controller 110 by moving his hand 406 and changing his hand posture.

In some embodiments, the image sensors 404 project a pattern of spots onto a scene containing the hand 406 and capture an image of the projected pattern. In some embodiments, the controller 110 computes the 3D coordinates of points in the scene (including points on the surface of the user's hand) by triangulation, based on transverse shifts of the spots in the pattern. This approach is advantageous in that it does not require the user to hold or wear any sort of beacon, sensor, or other marker. It gives the depth coordinates of points in the scene relative to a predetermined reference plane, at a certain distance from the image sensors 404. In the present disclosure, the image sensors 404 are assumed to define an orthogonal set of x, y, z axes, so that depth coordinates of points in the scene correspond to z components measured by the image sensors. Alternatively, the image sensors 404 (e.g., a hand tracking device) may use other methods of 3D mapping, such as stereoscopic imaging or time-of-flight measurements, based on single or multiple cameras or other types of sensors.

In some embodiments, the hand tracking device 140 captures and processes a temporal sequence of depth maps containing the user's hand, while the user moves his hand (e.g., whole hand or one or more fingers). Software running on a processor in the image sensors 404 and/or the controller 110 processes the 3D map data to extract patch descriptors of the hand in these depth maps. The software matches these descriptors to patch descriptors stored in a database 408, based on a prior learning process, in order to estimate the pose of the hand in each frame. The pose typically includes 3D locations of the user's hand joints and finger tips.

The software may also analyze the trajectory of the hands and/or fingers over multiple frames in the sequence in order to identify gestures. The pose estimation functions described herein may be interleaved with motion tracking functions, so that patch-based pose estimation is performed only once in every two (or more) frames, while tracking is used to find changes in the pose that occur over the remaining frames. The pose, motion, and gesture information are provided via the above-mentioned API to an application program running on the controller 110. This program may, for example, move and modify images presented on the display generation component 120, or perform other functions, in response to the pose and/or gesture information.

In some embodiments, a gesture includes an air gesture. An air gesture is a gesture that is detected without the user touching (or independently of) an input element that is part of a device (e.g., computer system 101, one or more input device 125, and/or hand tracking device 140) and is based on detected motion of a portion (e.g., the head, one or more arms, one or more hands, one or more fingers, and/or one or more legs) of the user's body through the air including motion of the user's body relative to an absolute reference (e.g., an angle of the user's arm relative to the ground or a distance of the user's hand relative to the ground), relative to another portion of the user's body (e.g., movement of a hand of the user relative to a shoulder of the user, movement of one hand of the user relative to another hand of the user, and/or movement of a finger of the user relative to another finger or portion of a hand of the user), and/or absolute motion of a portion of the user's body (e.g., a tap gesture that includes movement of a hand in a predetermined pose by a predetermined amount and/or speed, or a shake gesture that includes a predetermined speed or amount of rotation of a portion of the user's body).

In some embodiments, input gestures used in the various examples and embodiments described herein include air gestures performed by movement of the user's finger(s) relative to other finger(s) (or part(s) of the user's hand) for interacting with an XR environment (e.g., a virtual or mixed-reality environment), in accordance with some embodiments. In some embodiments, an air gesture is a gesture that is detected without the user touching an input element that is part of the device (or independently of an input element that is a part of the device) and is based on detected motion of a portion of the user's body through the air including motion of the user's body relative to an absolute reference (e.g., an angle of the user's arm relative to the ground or a distance of the user's hand relative to the ground), relative to another portion of the user's body (e.g., movement of a hand of the user relative to a shoulder of the user, movement of one hand of the user relative to another hand of the user, and/or movement of a finger of the user relative to another finger or portion of a hand of the user), and/or absolute motion of a portion of the user's body (e.g., a tap gesture that includes movement of a hand in a predetermined pose by a predetermined amount and/or speed, or a shake gesture that includes a predetermined speed or amount of rotation of a portion of the user's body).

In some embodiments in which the input gesture is an air gesture (e.g., in the absence of physical contact with an input device that provides the computer system with information about which user interface element is the target of the user input, such as contact with a user interface element displayed on a touchscreen, or contact with a mouse or trackpad to move a cursor to the user interface element), the gesture takes into account the user's attention (e.g., gaze) to determine the target of the user input (e.g., for direct inputs, as described below). Thus, in implementations involving air gestures, the input gesture is, for example, detected attention (e.g., gaze) toward the user interface element in combination (e.g., concurrent) with movement of a user's finger(s) and/or hands to perform a pinch and/or tap input, as described in more detail below.

In some embodiments, input gestures that are directed to a user interface object are performed directly or indirectly with reference to a user interface object. For example, a user input is performed directly on the user interface object in accordance with performing the input gesture with the user's hand at a position that corresponds to the position of the user interface object in the three-dimensional environment (e.g., as determined based on a current viewpoint of the user). In some embodiments, the input gesture is performed indirectly on the user interface object in accordance with the user performing the input gesture while a position of the user's hand is not at the position that corresponds to the position of the user interface object in the three-dimensional environment while detecting the user's attention (e.g., gaze) on the user interface object. For example, for direct input gesture, the user is enabled to direct the user's input to the user interface object by initiating the gesture at, or near, a position corresponding to the displayed position of the user interface object (e.g., within 0.5 cm, 1 cm, 5 cm, or a distance between 0-5 cm, as measured from an outer edge of the option or a center portion of the option). For an indirect input gesture, the user is enabled to direct the user's input to the user interface object by paying attention to the user interface object (e.g., by gazing at the user interface object) and, while paying attention to the option, the user initiates the input gesture (e.g., at any position that is detectable by the computer system) (e.g., at a position that does not correspond to the displayed position of the user interface object).

In some embodiments, input gestures (e.g., air gestures) used in the various examples and embodiments described herein include pinch inputs and tap inputs, for interacting with a virtual or mixed-reality environment, in accordance with some embodiments. For example, the pinch inputs and tap inputs described below are performed as air gestures.

In some embodiments, a pinch input is part of an air gesture that includes one or more of: a pinch gesture, a long pinch gesture, a pinch and drag gesture, or a double pinch gesture. For example, a pinch gesture that is an air gesture includes movement of two or more fingers of a hand to make contact with one another, that is, optionally, followed by an immediate (e.g., within 0-1 seconds) break in contact from each other. A long pinch gesture that is an air gesture includes movement of two or more fingers of a hand to make contact with one another for at least a threshold amount of time (e.g., at least 1 second), before detecting a break in contact with one another. For example, a long pinch gesture includes the user holding a pinch gesture (e.g., with the two or more fingers making contact), and the long pinch gesture continues until a break in contact between the two or more fingers is detected. In some embodiments, a double pinch gesture that is an air gesture comprises two (e.g., or more) pinch inputs (e.g., performed by the same hand) detected in immediate (e.g., within a predefined time period) succession of each other. For example, the user performs a first pinch input (e.g., a pinch input or a long pinch input), releases the first pinch input (e.g., breaks contact between the two or more fingers), and performs a second pinch input within a predefined time period (e.g., within 1 second or within 2 seconds) after releasing the first pinch input.

In some embodiments, a pinch and drag gesture that is an air gesture includes a pinch gesture (e.g., a pinch gesture or a long pinch gesture) performed in conjunction with (e.g., followed by) a drag input that changes a position of the user's hand from a first position (e.g., a start position of the drag) to a second position (e.g., an end position of the drag). In some embodiments, the user maintains the pinch gesture while performing the drag input, and releases the pinch gesture (e.g., opens their two or more fingers) to end the drag gesture (e.g., at the second position). In some embodiments, the pinch input and the drag input are performed by the same hand (e.g., the user pinches two or more fingers to make contact with one another and moves the same hand to the second position in the air with the drag gesture). In some embodiments, the pinch input is performed by a first hand of the user and the drag input is performed by the second hand of the user (e.g., the user's second hand moves from the first position to the second position in the air while the user continues the pinch input with the user's first hand). In some embodiments, an input gesture that is an air gesture includes inputs (e.g., pinch and/or tap inputs) performed using both of the user's two hands. For example, the input gesture includes two (e.g., or more) pinch inputs performed in conjunction with (e.g., concurrently with, or within a predefined time period of) each other. For example, a first pinch gesture performed using a first hand of the user (e.g., a pinch input, a long pinch input, or a pinch and drag input), and, in conjunction with performing the pinch input using the first hand, performing a second pinch input using the other hand (e.g., the second hand of the user's two hands).

In some embodiments, a tap input (e.g., directed to a user interface element) performed as an air gesture includes movement of a user's finger(s) toward the user interface element, movement of the user's hand toward the user interface element optionally with the user's finger(s) extended toward the user interface element, a downward motion of a user's finger (e.g., mimicking a mouse click motion or a tap on a touchscreen), or other predefined movement of the user's hand. In some embodiments a tap input that is performed as an air gesture is detected based on movement characteristics of the finger or hand performing the tap gesture movement of a finger or hand away from the viewpoint of the user and/or toward an object that is the target of the tap input followed by an end of the movement. In some embodiments the end of the movement is detected based on a change in movement characteristics of the finger or hand performing the tap gesture (e.g., an end of movement away from the viewpoint of the user and/or toward the object that is the target of the tap input, a reversal of direction of movement of the finger or hand, and/or a reversal of a direction of acceleration of movement of the finger or hand).

In some embodiments, attention of a user is determined to be directed to a portion of the three-dimensional environment based on detection of gaze directed to the portion of the three-dimensional environment (optionally, without requiring other conditions). In some embodiments, attention of a user is determined to be directed to a portion of the three-dimensional environment based on detection of gaze directed to the portion of the three-dimensional environment with one or more additional conditions such as requiring that gaze is directed to the portion of the three-dimensional environment for at least a threshold duration (e.g., a dwell duration) and/or requiring that the gaze is directed to the portion of the three-dimensional environment while the viewpoint of the user is within a distance threshold from the portion of the three-dimensional environment in order for the device to determine that attention of the user is directed to the portion of the three-dimensional environment, where if one of the additional conditions is not met, the device determines that attention is not directed to the portion of the three-dimensional environment toward which gaze is directed (e.g., until the one or more additional conditions are met).

In some embodiments, the detection of a ready state configuration of a user or a portion of a user is detected by the computer system. Detection of a ready state configuration of a hand is used by a computer system as an indication that the user is likely preparing to interact with the computer system using one or more air gesture inputs performed by the hand (e.g., a pinch, tap, pinch and drag, double pinch, long pinch, or other air gesture described herein). For example, the ready state of the hand is determined based on whether the hand has a predetermined hand shape (e.g., a pre-pinch shape with a thumb and one or more fingers extended and spaced apart ready to make a pinch or grab gesture or a pre-tap with one or more fingers extended and palm facing away from the user), based on whether the hand is in a predetermined position relative to a viewpoint of the user (e.g., below the user's head and above the user's waist and extended out from the body by at least 15, 20, 25, 30, or 50 cm), and/or based on whether the hand has moved in a particular manner (e.g., moved toward a region in front of the user above the user's waist and below the user's head or moved away from the user's body or leg). In some embodiments, the ready state is used to determine whether interactive elements of the user interface respond to attention (e.g., gaze) inputs.

In scenarios where inputs are described with reference to air gestures, it should be understood that similar gestures could be detected using a hardware input device that is attached to or held by one or more hands of a user, where the position of the hardware input device in space can be tracked using optical tracking, one or more accelerometers, one or more gyroscopes, one or more magnetometers, and/or one or more inertial measurement units and the position and/or movement of the hardware input device is used in place of the position and/or movement of the one or more hands in the corresponding air gesture(s). In scenarios where inputs are described with reference to air gestures, it should be understood that similar gestures could be detected using a hardware input device that is attached to or held by one or more hands of a user. User inputs can be detected with controls contained in the hardware input device such as one or more touch-sensitive input elements, one or more pressure-sensitive input elements, one or more buttons, one or more knobs, one or more dials, one or more joysticks, one or more hand or finger coverings that can detect a position or change in position of portions of a hand and/or fingers relative to each other, relative to the user's body, and/or relative to a physical environment of the user, and/or other hardware input device controls, where the user inputs with the controls contained in the hardware input device are used in place of hand and/or finger gestures such as air taps or air pinches in the corresponding air gesture(s). For example, a selection input that is described as being performed with an air tap or air pinch input could be alternatively detected with a button press, a tap on a touch-sensitive surface, a press on a pressure-sensitive surface, or other hardware input. As another example, a movement input that is described as being performed with an air pinch and drag could be alternatively detected based on an interaction with the hardware input control such as a button press and hold, a touch on a touch-sensitive surface, a press on a pressure-sensitive surface, or other hardware input that is followed by movement of the hardware input device (e.g., along with the hand with which the hardware input device is associated) through space. Similarly, a two-handed input that includes movement of the hands relative to each other could be performed with one air gesture and one hardware input device in the hand that is not performing the air gesture, two hardware input devices held in different hands, or two air gestures performed by different hands using various combinations of air gestures and/or the inputs detected by one or more hardware input devices that are described above.

In some embodiments, the software may be downloaded to the controller 110 in electronic form, over a network, for example, or it may alternatively be provided on tangible, non-transitory media, such as optical, magnetic, or electronic memory media. In some embodiments, the database 408 is likewise stored in a memory associated with the controller 110. Alternatively or additionally, some or all of the described functions of the computer may be implemented in dedicated hardware, such as a custom or semi-custom integrated circuit or a programmable digital signal processor (DSP). Although the controller 110 is shown in FIG. 4, by way of example, as a separate unit from the image sensors 404, some or all of the processing functions of the controller may be performed by a suitable microprocessor and software or by dedicated circuitry within the housing of the image sensors 404 (e.g., a hand tracking device) or otherwise associated with the image sensors 404. In some embodiments, at least some of these processing functions may be carried out by a suitable processor that is integrated with the display generation component 120 (e.g., in a television set, a handheld device, or head-mounted device, for example) or with any other suitable computerized device, such as a game console or media player. The sensing functions of image sensors 404 may likewise be integrated into the computer or other computerized apparatus that is to be controlled by the sensor output.

FIG. 4 further includes a schematic representation of a depth map 410 captured by the image sensors 404, in accordance with some embodiments. The depth map, as explained above, comprises a matrix of pixels having respective depth values. The pixels 412 corresponding to the hand 406 have been segmented out from the background and the wrist in this map. The brightness of each pixel within the depth map 410 corresponds inversely to its depth value, i.e., the measured z distance from the image sensors 404, with the shade of gray growing darker with increasing depth. The controller 110 processes these depth values in order to identify and segment a component of the image (i.e., a group of neighboring pixels) having characteristics of a human hand. These characteristics, may include, for example, overall size, shape and motion from frame to frame of the sequence of depth maps.

FIG. 4 also schematically illustrates a hand skeleton 414 that controller 110 ultimately extracts from the depth map 410 of the hand 406, in accordance with some embodiments. In FIG. 4, the hand skeleton 414 is superimposed on a hand background 416 that has been segmented from the original depth map. In some embodiments, key feature points of the hand (e.g., points corresponding to knuckles, finger tips, center of the palm, end of the hand connecting to wrist, etc.) and optionally on the wrist or arm connected to the hand are identified and located on the hand skeleton 414. In some embodiments, location and movements of these key feature points over multiple image frames are used by the controller 110 to determine the hand gestures performed by the hand or the current state of the hand, in accordance with some embodiments.

Figure 5:
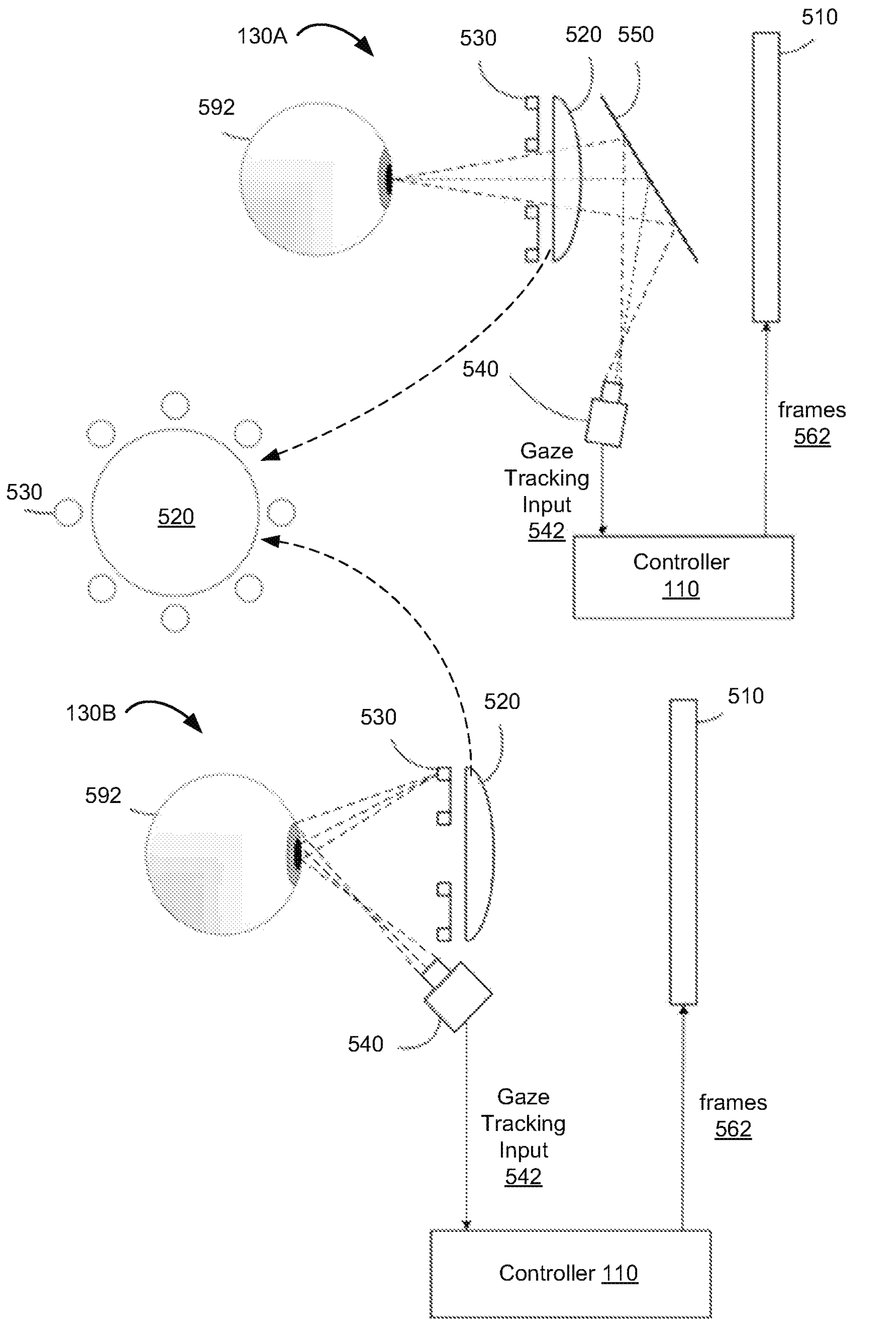
FIG. 5 is a block diagram illustrating an eye tracking unit of a computer system that is configured to capture gaze inputs of the user in accordance with some embodiments.

FIG. 5 illustrates an example embodiment of the eye tracking device 130 (FIG. 1A). In some embodiments, the eye tracking device 130 is controlled by the eye tracking unit 243 (FIG. 2) to track the position and movement of the user's gaze with respect to the scene 105 or with respect to the XR content displayed via the display generation component 120. In some embodiments, the eye tracking device 130 is integrated with the display generation component 120. For example, in some embodiments, when the display generation component 120 is a head-mounted device such as headset, helmet, goggles, or glasses, or a handheld device placed in a wearable frame, the head-mounted device includes both a component that generates the XR content for viewing by the user and a component for tracking the gaze of the user relative to the XR content. In some embodiments, the eye tracking device 130 is separate from the display generation component 120. For example, when display generation component is a handheld device or an XR chamber, the eye tracking device 130 is optionally a separate device from the handheld device or XR chamber. In some embodiments, the eye tracking device 130 is a head-mounted device or part of a head-mounted device. In some embodiments, the head-mounted eye-tracking device 130 is optionally used in conjunction with a display generation component that is also head-mounted, or a display generation component that is not head-mounted. In some embodiments, the eye tracking device 130 is not a head-mounted device, and is optionally used in conjunction with a head-mounted display generation component. In some embodiments, the eye tracking device 130 is not a head-mounted device, and is optionally part of a non-head-mounted display generation component.

In some embodiments, the display generation component 120 uses a display mechanism (e.g., left and right near-eye display panels) for displaying frames including left and right images in front of a user's eyes to thus provide 3D virtual views to the user. For example, a head-mounted display generation component may include left and right optical lenses (referred to herein as eye lenses) located between the display and the user's eyes. In some embodiments, the display generation component may include or be coupled to one or more external video cameras that capture video of the user's environment for display. In some embodiments, a head-mounted display generation component may have a transparent or semi-transparent display through which a user may view the physical environment directly and display virtual objects on the transparent or semi-transparent display. In some embodiments, display generation component projects virtual objects into the physical environment. The virtual objects may be projected, for example, on a physical surface or as a holograph, so that an individual, using the system, observes the virtual objects superimposed over the physical environment. In such cases, separate display panels and image frames for the left and right eyes may not be necessary.

As shown in FIG. 5, in some embodiments, eye tracking device 130 (e.g., a gaze tracking device) includes at least one eye tracking camera (e.g., infrared (IR) or near-IR (NIR) cameras), and illumination sources (e.g., IR or NIR light sources such as an array or ring of LEDs) that emit light (e.g., IR or NIR light) towards the user's eyes. The eye tracking cameras may be pointed towards the user's eyes to receive reflected IR or NIR light from the light sources directly from the eyes, or alternatively may be pointed towards "hot" mirrors located between the user's eyes and the display panels that reflect IR or NIR light from the eyes to the eye tracking cameras while allowing visible light to pass. The eye tracking device 130 optionally captures images of the user's eyes (e.g., as a video stream captured at 60-120 frames per second (fps)), analyze the images to generate gaze tracking information, and communicate the gaze tracking information to the controller 110. In some embodiments, two eyes of the user are separately tracked by respective eye tracking cameras and illumination sources. In some embodiments, only one eye of the user is tracked by a respective eye tracking camera and illumination sources.

In some embodiments, the eye tracking device 130 is calibrated using a device-specific calibration process to determine parameters of the eye tracking device for the specific operating environment 100, for example the 3D geometric relationship and parameters of the LEDs, cameras, hot mirrors (if present), eye lenses, and display screen. The device-specific calibration process may be performed at the factory or another facility prior to delivery of the AR/VR equipment to the end user. The device-specific calibration process may be an automated calibration process or a manual calibration process. A user-specific calibration process may include an estimation of a specific user's eye parameters, for example the pupil location, fovea location, optical axis, visual axis, eye spacing, etc. Once the device-specific and user-specific parameters are determined for the eye tracking device 130, images captured by the eye tracking cameras can be processed using a glint-assisted method to determine the current visual axis and point of gaze of the user with respect to the display, in accordance with some embodiments.

As shown in FIG. 5, the eye tracking device 130 (e.g., 130A or 130B) includes eye lens(es) 520, and a gaze tracking system that includes at least one eye tracking camera 540 (e.g., infrared (IR) or near-IR (NIR) cameras) positioned on a side of the user's face for which eye tracking is performed, and an illumination source 530 (e.g., IR or NIR light sources such as an array or ring of NIR light-emitting diodes (LEDs)) that emit light (e.g., IR or NIR light) towards the user's eye(s) 592. The eye tracking cameras 540 may be pointed towards mirrors 550 located between the user's eye(s) 592 and a display 510 (e.g., a left or right display panel of a head-mounted display, or a display of a handheld device, a projector, etc.) that reflect IR or NIR light from the eye(s) 592 while allowing visible light to pass (e.g., as shown in the top portion of FIG. 5), or alternatively may be pointed towards the user's eye(s) 592 to receive reflected IR or NIR light from the eye(s) 592 (e.g., as shown in the bottom portion of FIG. 5).

In some embodiments, the controller 110 renders AR or VR frames 562 (e.g., left and right frames for left and right display panels) and provides the frames 562 to the display 510. The controller 110 uses gaze tracking input 542 from the eye tracking cameras 540 for various purposes, for example in processing the frames 562 for display. The controller 110 optionally estimates the user's point of gaze on the display 510 based on the gaze tracking input 542 obtained from the eye tracking cameras 540 using the glint-assisted methods or other suitable methods. The point of gaze estimated from the gaze tracking input 542 is optionally used to determine the direction in which the user is currently looking.

The following describes several possible use cases for the user's current gaze direction, and is not intended to be limiting. As an example use case, the controller 110 may render virtual content differently based on the determined direction of the user's gaze. For example, the controller 110 may generate virtual content at a higher resolution in a foveal region determined from the user's current gaze direction than in peripheral regions. As another example, the controller may position or move virtual content in the view based at least in part on the user's current gaze direction. As another example, the controller may display particular virtual content in the view based at least in part on the user's current gaze direction. As another example use case in AR applications, the controller 110 may direct external cameras for capturing the physical environments of the XR experience to focus in the determined direction. The autofocus mechanism of the external cameras may then focus on an object or surface in the environment that the user is currently looking at on the display 510. As another example use case, the eye lenses 520 may be focusable lenses, and the gaze tracking information is used by the controller to adjust the focus of the eye lenses 520 so that the virtual object that the user is currently looking at has the proper vergence to match the convergence of the user's eyes 592. The controller 110 may leverage the gaze tracking information to direct the eye lenses 520 to adjust focus so that close objects that the user is looking at appear at the right distance.

In some embodiments, the eye tracking device is part of a head-mounted device that includes a display (e.g., display 510), two eye lenses (e.g., eye lens(es) 520), eye tracking cameras (e.g., eye tracking camera(s) 540), and light sources (e.g., illumination sources 530 (e.g., IR or NIR LEDs)), mounted in a wearable housing. The light sources emit light (e.g., IR or NIR light) towards the user's eye(s) 592. In some embodiments, the light sources may be arranged in rings or circles around each of the lenses as shown in FIG. 5. In some embodiments, eight illumination sources 530 (e.g., LEDs) are arranged around each lens 520 as an example. However, more or fewer illumination sources 530 may be used, and other arrangements and locations of illumination sources 530 may be used.

In some embodiments, the display 510 emits light in the visible light range and does not emit light in the IR or NIR range, and thus does not introduce noise in the gaze tracking system. Note that the location and angle of eye tracking camera(s) 540 is given by way of example, and is not intended to be limiting. In some embodiments, a single eye tracking camera 540 is located on each side of the user's face. In some embodiments, two or more NIR cameras 540 may be used on each side of the user's face. In some embodiments, a camera 540 with a wider field of view (FOV) and a camera 540 with a narrower FOV may be used on each side of the user's face. In some embodiments, a camera 540 that operates at one wavelength (e.g., 850 nm) and a camera 540 that operates at a different wavelength (e.g., 940 nm) may be used on each side of the user's face.

Embodiments of the gaze tracking system as illustrated in FIG. 5 may, for example, be used in computer-generated reality, virtual reality, and/or mixed reality applications to provide computer-generated reality, virtual reality, augmented reality, and/or augmented virtuality experiences to the user.

Figure 6:
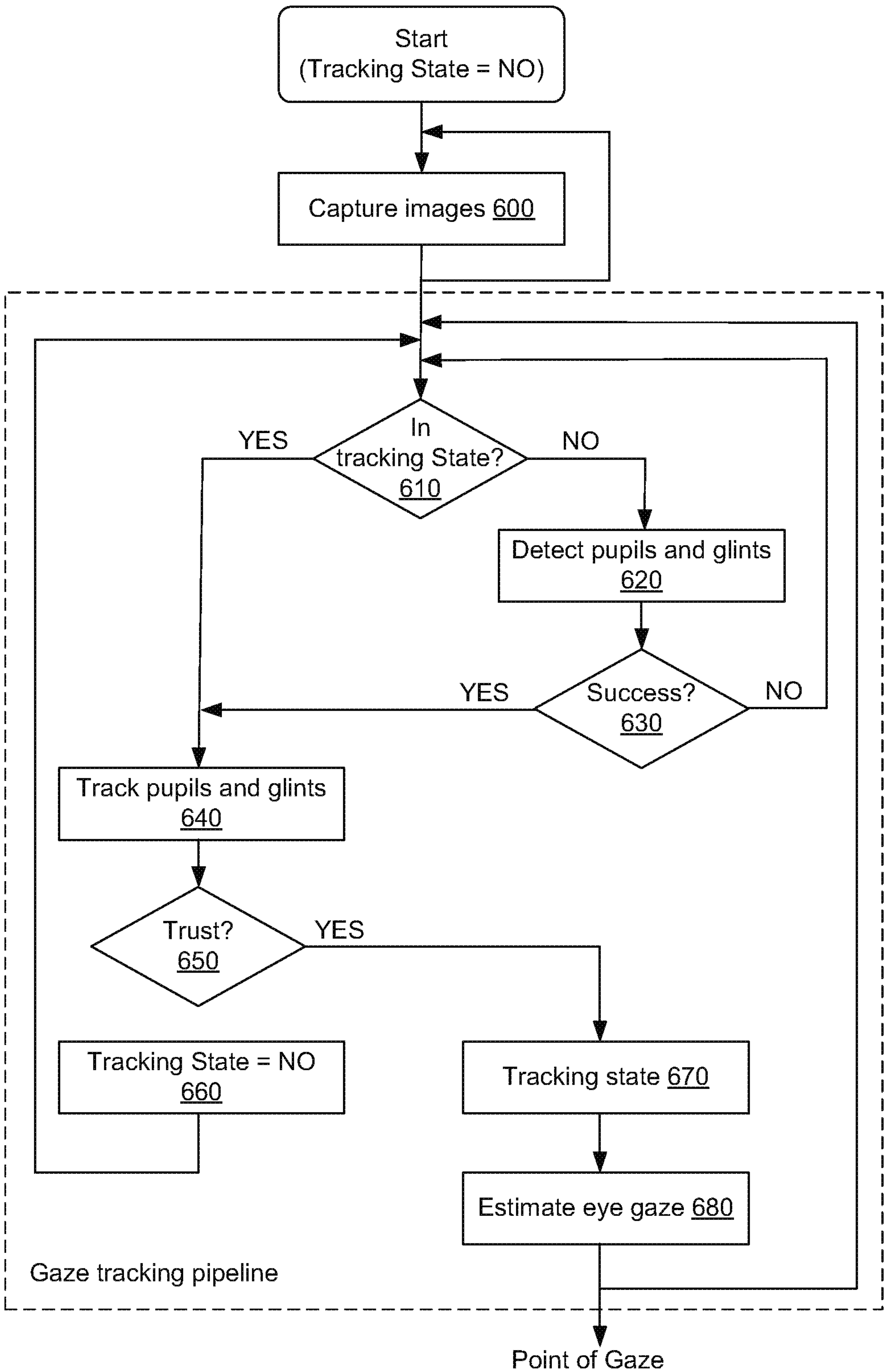
FIG. 6 is a flow diagram illustrating a glint-assisted gaze tracking pipeline in accordance with some embodiments.
Figure 7A:
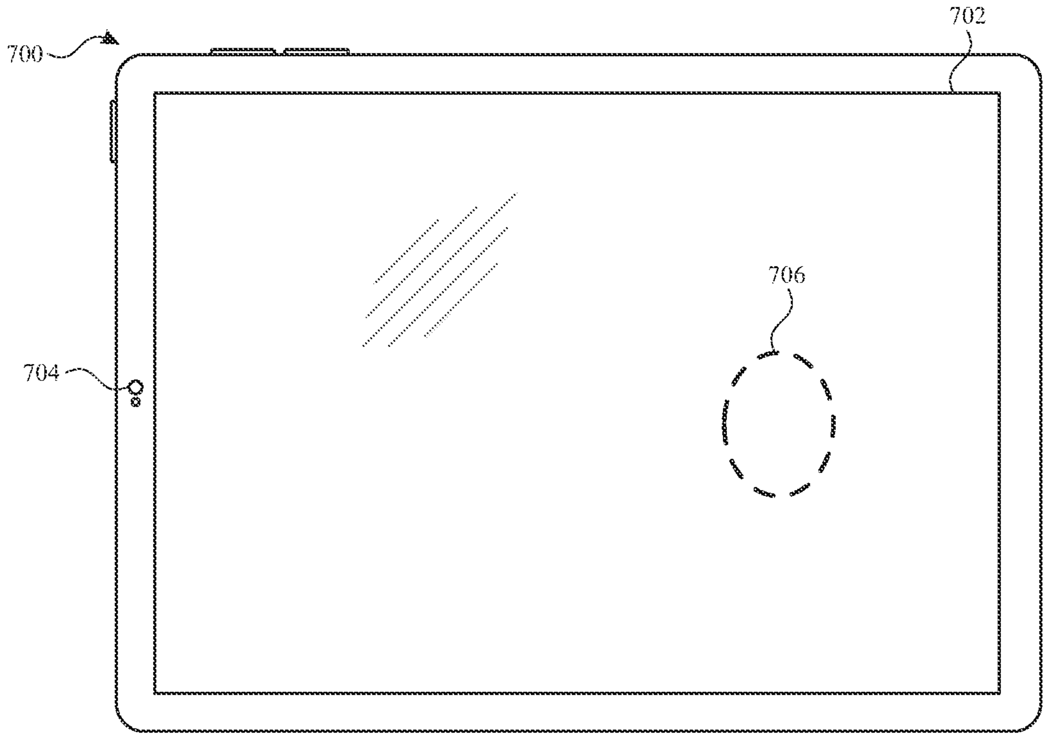
FIGS. 7A-7O illustrate example techniques for user authentication, in accordance with some embodiments.

FIG. 6 illustrates a glint-assisted gaze tracking pipeline, in accordance with some embodiments. In some embodiments, the gaze tracking pipeline is implemented by a glint-assisted gaze tracking system (e.g., eye tracking device 130 as illustrated in FIGS. 1A-1P and 5). The glint-assisted gaze tracking system may maintain a tracking state. Initially, the tracking state is off or "NO". When in the tracking state, the glint-assisted gaze tracking system uses prior information from the previous frame when analyzing the current frame to track the pupil contour and glints in the current frame. When not in the tracking state, the glint-assisted gaze tracking system attempts to detect the pupil and glints in the current frame and, if successful, initializes the tracking state to "YES" and continues with the next frame in the tracking state.

As shown in FIG. 6, the gaze tracking cameras may capture left and right images of the user's left and right eyes. The captured images are then input to a gaze tracking pipeline for processing beginning at 610. As indicated by the arrow returning to element 600, the gaze tracking system may continue to capture images of the user's eyes, for example at a rate of 60 to 120 frames per second. In some embodiments, each set of captured images may be input to the pipeline for processing. However, in some embodiments or under some conditions, not all captured frames are processed by the pipeline.

At 610, for the current captured images, if the tracking state is YES, then the method proceeds to element 640. At 610, if the tracking state is NO, then as indicated at 620 the images are analyzed to detect the user's pupils and glints in the images. At 630, if the pupils and glints are successfully detected, then the method proceeds to element 640. Otherwise, the method returns to element 610 to process next images of the user's eyes.

At 640, if proceeding from element 610, the current frames are analyzed to track the pupils and glints based in part on prior information from the previous frames. At 640, if proceeding from element 630, the tracking state is initialized based on the detected pupils and glints in the current frames. Results of processing at element 640 are checked to verify that the results of tracking or detection can be trusted. For example, results may be checked to determine if the pupil and a sufficient number of glints to perform gaze estimation are successfully tracked or detected in the current frames. At 650, if the results cannot be trusted, then the tracking state is set to NO at element 660, and the method returns to element 610 to process next images of the user's eyes. At 650, if the results are trusted, then the method proceeds to element 670. At 670, the tracking state is set to YES (if not already YES), and the pupil and glint information is passed to element 680 to estimate the user's point of gaze.

FIG. 6 is intended to serve as one example of eye tracking technology that may be used in a particular implementation. As recognized by those of ordinary skill in the art, other eye tracking technologies that currently exist or are developed in the future may be used in place of or in combination with the glint-assisted eye tracking technology describe herein in the computer system 101 for providing XR experiences to users, in accordance with various embodiments.

In some embodiments, the captured portions of real world environment 602 are used to provide a XR experience to the user, for example, a mixed reality environment in which one or more virtual objects are superimposed over representations of real world environment 602.

Thus, the description herein describes some embodiments of three-dimensional environments (e.g., XR environments) that include representations of real world objects and representations of virtual objects. For example, a three-dimensional environment optionally includes a representation of a table that exists in the physical environment, which is captured and displayed in the three-dimensional environment (e.g., actively via cameras and displays of a computer system, or passively via a transparent or translucent display of the computer system). As described previously, the three-dimensional environment is optionally a mixed reality system in which the three-dimensional environment is based on the physical environment that is captured by one or more sensors of the computer system and displayed via a display generation component. As a mixed reality system, the computer system is optionally able to selectively display portions and/or objects of the physical environment such that the respective portions and/or objects of the physical environment appear as if they exist in the three-dimensional environment displayed by the computer system. Similarly, the computer system is optionally able to display virtual objects in the three-dimensional environment to appear as if the virtual objects exist in the real world (e.g., physical environment) by placing the virtual objects at respective locations in the three-dimensional environment that have corresponding locations in the real world. For example, the computer system optionally displays a vase such that it appears as if a real vase is placed on top of a table in the physical environment. In some embodiments, a respective location in the three-dimensional environment has a corresponding location in the physical environment. Thus, when the computer system is described as displaying a virtual object at a respective location with respect to a physical object (e.g., such as a location at or near the hand of the user, or at or near a physical table), the computer system displays the virtual object at a particular location in the three-dimensional environment such that it appears as if the virtual object is at or near the physical object in the physical world (e.g., the virtual object is displayed at a location in the three-dimensional environment that corresponds to a location in the physical environment at which the virtual object would be displayed if it were a real object at that particular location).

In some embodiments, real world objects that exist in the physical environment that are displayed in the three-dimensional environment (e.g., and/or visible via the display generation component) can interact with virtual objects that exist only in the three-dimensional environment. For example, a three-dimensional environment can include a table and a vase placed on top of the table, with the table being a view of (or a representation of) a physical table in the physical environment, and the vase being a virtual object.

In a three-dimensional environment (e.g., a real environment, a virtual environment, or an environment that includes a mix of real and virtual objects), objects are sometimes referred to as having a depth or simulated depth, or objects are referred to as being visible, displayed, or placed at different depths. In this context, depth refers to a dimension other than height or width. In some embodiments, depth is defined relative to a fixed set of coordinates (e.g., where a room or an object has a height, depth, and width defined relative to the fixed set of coordinates). In some embodiments, depth is defined relative to a location or viewpoint of a user, in which case, the depth dimension varies based on the location of the user and/or the location and angle of the viewpoint of the user. In some embodiments where depth is defined relative to a location of a user that is positioned relative to a surface of an environment (e.g., a floor of an environment, or a surface of the ground), objects that are further away from the user along a line that extends parallel to the surface are considered to have a greater depth in the environment, and/or the depth of an object is measured along an axis that extends outward from a location of the user and is parallel to the surface of the environment (e.g., depth is defined in a cylindrical or substantially cylindrical coordinate system with the position of the user at the center of the cylinder that extends from a head of the user toward feet of the user). In some embodiments where depth is defined relative to viewpoint of a user (e.g., a direction relative to a point in space that determines which portion of an environment that is visible via a head mounted device or other display), objects that are further away from the viewpoint of the user along a line that extends parallel to the direction of the viewpoint of the user are considered to have a greater depth in the environment, and/or the depth of an object is measured along an axis that extends outward from a line that extends from the viewpoint of the user and is parallel to the direction of the viewpoint of the user (e.g., depth is defined in a spherical or substantially spherical coordinate system with the origin of the viewpoint at the center of the sphere that extends outwardly from a head of the user). In some embodiments, depth is defined relative to a user interface container (e.g., a window or application in which application and/or system content is displayed) where the user interface container has a height and/or width, and depth is a dimension that is orthogonal to the height and/or width of the user interface container. In some embodiments, in circumstances where depth is defined relative to a user interface container, the height and or width of the container are typically orthogonal or substantially orthogonal to a line that extends from a location based on the user (e.g., a viewpoint of the user or a location of the user) to the user interface container (e.g., the center of the user interface container, or another characteristic point of the user interface container) when the container is placed in the three-dimensional environment or is initially displayed (e.g., so that the depth dimension for the container extends outward away from the user or the viewpoint of the user). In some embodiments, in situations where depth is defined relative to a user interface container, depth of an object relative to the user interface container refers to a position of the object along the depth dimension for the user interface container. In some embodiments, multiple different containers can have different depth dimensions (e.g., different depth dimensions that extend away from the user or the viewpoint of the user in different directions and/or from different starting points). In some embodiments, when depth is defined relative to a user interface container, the direction of the depth dimension remains constant for the user interface container as the location of the user interface container, the user and/or the viewpoint of the user changes (e.g., or when multiple different viewers are viewing the same container in the three-dimensional environment such as during an in-person collaboration session and/or when multiple participants are in a real-time communication session with shared virtual content including the container). In some embodiments, for curved containers (e.g., including a container with a curved surface or curved content region), the depth dimension optionally extends into a surface of the curved container. In some situations, z-separation (e.g., separation of two objects in a depth dimension), z-height (e.g., distance of one object from another in a depth dimension), z-position (e.g., position of one object in a depth dimension), z-depth (e.g., position of one object in a depth dimension), or simulated z dimension (e.g., depth used as a dimension of an object, dimension of an environment, a direction in space, and/or a direction in simulated space) are used to refer to the concept of depth as described above.

In some embodiments, a user is optionally able to interact with virtual objects in the three-dimensional environment using one or more hands as if the virtual objects were real objects in the physical environment. For example, as described above, one or more sensors of the computer system optionally capture one or more of the hands of the user and display representations of the hands of the user in the three-dimensional environment (e.g., in a manner similar to displaying a real world object in three-dimensional environment described above), or in some embodiments, the hands of the user are visible via the display generation component via the ability to see the physical environment through the user interface due to the transparency/translucency of a portion of the display generation component that is displaying the user interface or due to projection of the user interface onto a transparent/translucent surface or projection of the user interface onto the user's eye or into a field of view of the user's eye. Thus, in some embodiments, the hands of the user are displayed at a respective location in the three-dimensional environment and are treated as if they were objects in the three-dimensional environment that are able to interact with the virtual objects in the three-dimensional environment as if they were physical objects in the physical environment. In some embodiments, the computer system is able to update display of the representations of the user's hands in the three-dimensional environment in conjunction with the movement of the user's hands in the physical environment.

In some of the embodiments described below, the computer system is optionally able to determine the "effective" distance between physical objects in the physical world and virtual objects in the three-dimensional environment, for example, for the purpose of determining whether a physical object is directly interacting with a virtual object (e.g., whether a hand is touching, grabbing, holding, etc. a virtual object or within a threshold distance of a virtual object). For example, a hand directly interacting with a virtual object optionally includes one or more of a finger of a hand pressing a virtual button, a hand of a user grabbing a virtual vase, two fingers of a hand of the user coming together and pinching/holding a user interface of an application, and any of the other types of interactions described here. For example, the computer system optionally determines the distance between the hands of the user and virtual objects when determining whether the user is interacting with virtual objects and/or how the user is interacting with virtual objects. In some embodiments, the computer system determines the distance between the hands of the user and a virtual object by determining the distance between the location of the hands in the three-dimensional environment and the location of the virtual object of interest in the three-dimensional environment. For example, the one or more hands of the user are located at a particular position in the physical world, which the computer system optionally captures and displays at a particular corresponding position in the three-dimensional environment (e.g., the position in the three-dimensional environment at which the hands would be displayed if the hands were virtual, rather than physical, hands). The position of the hands in the three-dimensional environment is optionally compared with the position of the virtual object of interest in the three-dimensional environment to determine the distance between the one or more hands of the user and the virtual object. In some embodiments, the computer system optionally determines a distance between a physical object and a virtual object by comparing positions in the physical world (e.g., as opposed to comparing positions in the three-dimensional environment). For example, when determining the distance between one or more hands of the user and a virtual object, the computer system optionally determines the corresponding location in the physical world of the virtual object (e.g., the position at which the virtual object would be located in the physical world if it were a physical object rather than a virtual object), and then determines the distance between the corresponding physical position and the one of more hands of the user. In some embodiments, the same techniques are optionally used to determine the distance between any physical object and any virtual object. Thus, as described herein, when determining whether a physical object is in contact with a virtual object or whether a physical object is within a threshold distance of a virtual object, the computer system optionally performs any of the techniques described above to map the location of the physical object to the three-dimensional environment and/or map the location of the virtual object to the physical environment.

In some embodiments, the same or similar technique is used to determine where and what the gaze of the user is directed to and/or where and at what a physical stylus held by a user is pointed. For example, if the gaze of the user is directed to a particular position in the physical environment, the computer system optionally determines the corresponding position in the three-dimensional environment (e.g., the virtual position of the gaze), and if a virtual object is located at that corresponding virtual position, the computer system optionally determines that the gaze of the user is directed to that virtual object. Similarly, the computer system is optionally able to determine, based on the orientation of a physical stylus, to where in the physical environment the stylus is pointing. In some embodiments, based on this determination, the computer system determines the corresponding virtual position in the three-dimensional environment that corresponds to the location in the physical environment to which the stylus is pointing, and optionally determines that the stylus is pointing at the corresponding virtual position in the three-dimensional environment.

Similarly, the embodiments described herein may refer to the location of the user (e.g., the user of the computer system) and/or the location of the computer system in the three-dimensional environment. In some embodiments, the user of the computer system is holding, wearing, or otherwise located at or near the computer system. Thus, in some embodiments, the location of the computer system is used as a proxy for the location of the user. In some embodiments, the location of the computer system and/or user in the physical environment corresponds to a respective location in the three-dimensional environment. For example, the location of the computer system would be the location in the physical environment (and its corresponding location in the three-dimensional environment) from which, if a user were to stand at that location facing a respective portion of the physical environment that is visible via the display generation component, the user would see the objects in the physical environment in the same positions, orientations, and/or sizes as they are displayed by or visible via the display generation component of the computer system in the three-dimensional environment (e.g., in absolute terms and/or relative to each other). Similarly, if the virtual objects displayed in the three-dimensional environment were physical objects in the physical environment (e.g., placed at the same locations in the physical environment as they are in the three-dimensional environment, and having the same sizes and orientations in the physical environment as in the three-dimensional environment), the location of the computer system and/or user is the position from which the user would see the virtual objects in the physical environment in the same positions, orientations, and/or sizes as they are displayed by the display generation component of the computer system in the three-dimensional environment (e.g., in absolute terms and/or relative to each other and the real world objects).

In the present disclosure, various input methods are described with respect to interactions with a computer system. When an example is provided using one input device or input method and another example is provided using another input device or input method, it is to be understood that each example may be compatible with and optionally utilizes the input device or input method described with respect to another example. Similarly, various output methods are described with respect to interactions with a computer system. When an example is provided using one output device or output method and another example is provided using another output device or output method, it is to be understood that each example may be compatible with and optionally utilizes the output device or output method described with respect to another example. Similarly, various methods are described with respect to interactions with a virtual environment or a mixed reality environment through a computer system. When an example is provided using interactions with a virtual environment and another example is provided using mixed reality environment, it is to be understood that each example may be compatible with and optionally utilizes the methods described with respect to another example. As such, the present disclosure discloses embodiments that are combinations of the features of multiple examples, without exhaustively listing all features of an embodiment in the description of each example embodiment.

User Interfaces and Associated Processes

Attention is now directed towards embodiments of user interfaces ("UI") and associated processes that may be implemented on a computer system, such as a portable multifunction device or a head-mounted device, in communication with a display generation component, and (optionally) one or more input devices.

FIGS. 7A-7O illustrate examples of user authentication. FIG. 8A is a flow diagram of an exemplary method 800 for user authentication. FIG. 8B is a flow diagram of an exemplary method 850 for user authentication. The user interfaces in FIGS. 7A-7O are used to illustrate the processes described below, including the processes in FIGS. 8A and 8B.

FIG. 7A depicts electronic device 700, which is a tablet that includes touch-sensitive display 702 and one or more input sensors 704 (e.g., one or more cameras, eye gaze trackers, hand movement trackers, and/or head movement trackers). In some embodiments described below, electronic device 700 is a tablet. In some embodiments, electronic device 700 is a smart phone, a wearable device, a wearable smartwatch device, a head-mounted system (e.g., a headset), or other computer system that includes and/or is in communication with one or more display devices (e.g., display screen, projection device, or the like). Electronic device 700 is a computer system (e.g., computer system 101 in FIG. 1A).

At FIG. 7A, electronic device 700 is in a low power, inactive, or sleep state, in which content is not displayed via display 702. At FIG. 7A, electronic device 700 detects user input 706. In the depicted embodiment, user input 706 is a touch input via touch-screen display 702. However, in some embodiments, user input 706 is a non-touch input, such as a gesture or other action taken by a user. For example, in some embodiments, electronic device 700 is a head-mounted system, and user input 706 includes, for example, a user putting the electronic device 700 on his or her head, performing a gesture while wearing electronic device 700, and/or pressing a button while wearing electronic device 700.

Figure 7B:
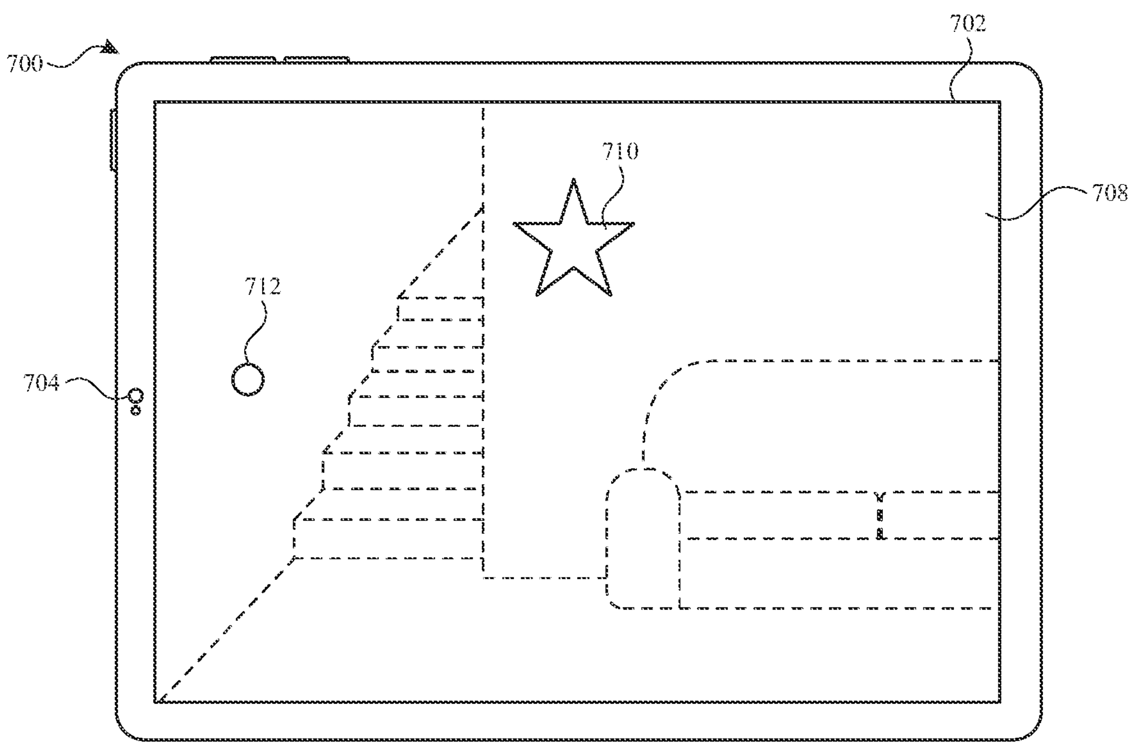

At FIG. 7B, in response to user input 706, electronic device 700 transitions from the low power, inactive, or sleep state to an active state, in which electronic device 700 displays, via display 702, three-dimensional environment 708 and gaze target 710. In some embodiments, three-dimensional environment 708 is displayed by a display (as depicted in FIG. 7B). In some embodiments, three-dimensional environment 708 includes a virtual environment or an image (or video) of a physical environment captured by one or more cameras. In some embodiments, three-dimensional environment 708 is visible to a user behind gaze target 710, but is not displayed by a display. For example, in some embodiments, three-dimensional environment 708 is a physical environment that is visible to a user (e.g., through a transparent display) behind gaze target 710 without being displayed by a display.

At FIG. 7B, electronic device 700 is in an active state, but is also in a locked state in which one or more features of the device are locked and/or unavailable to the user. In the depicted embodiment, user authentication is required to unlock electronic device 700. In FIG. 7B, electronic device 700 is configured to perform biometric authentication of the user (e.g., authentication and/or identification of the user based on biometric information collected from the user), including eye-based user authentication (e.g., scanning one or more eyes of the user (e.g., via input sensors 704) and identifying the user based on the eye scan). Electronic device 700 displays gaze target 710 to encourage the user to look at gaze target 710 in order to maximize the accuracy of an eye scan and eye-based user authentication. In FIG. 7B, three-dimensional environment 708 is visually obscured (as indicated by the dashed lines in FIG. 7B) (e.g., displayed with decreased focus, decreased sharpness, decreased color saturation, and/or greater opacity) in order to draw the user's attention and gaze to gaze target 710. As discussed above, in some embodiments, three-dimensional environment 708 is a "pass-through" environment that a user sees through a transparent display and is not displayed by a display. In some such embodiments, three-dimensional environment 708 is visually de-emphasized by applying masking or other techniques to the regions of the display (e.g., display 702) through which the user can view three-dimensional environment 708. In FIG. 7B, electronic device 700 detects that the user is looking at the left side of display 702, as indicated by gaze indication 712. Gaze indication 712 is provided for a better understanding of the described techniques and is optionally not a part of the user interface of the described device (e.g., is not displayed by the electronic device).

In some embodiments, when electronic device 700 displays gaze target 710, electronic device 700 adjusts the brightness of display 702 based on observed pupil dilation of the user (e.g., to adjust and/or control pupil dilation of the user). This is done in order to maximize the effectiveness and/or accuracy of the eye scans used for eye-based user authentication. For example, in some embodiments, electronic device 700 adjusts the brightness of one or more virtual elements (e.g., gaze target 710 and/or other elements) displayed on display 702 (e.g., makes one or more virtual elements brighter in order to decrease dilation of the user's pupils and/or makes one or more virtual elements darker in order to increase dilation of the user's pupils). In some embodiments, electronic device 700 adjusts the brightness of a passthrough environment (e.g., three-dimensional environment 708).

Figure 7C:
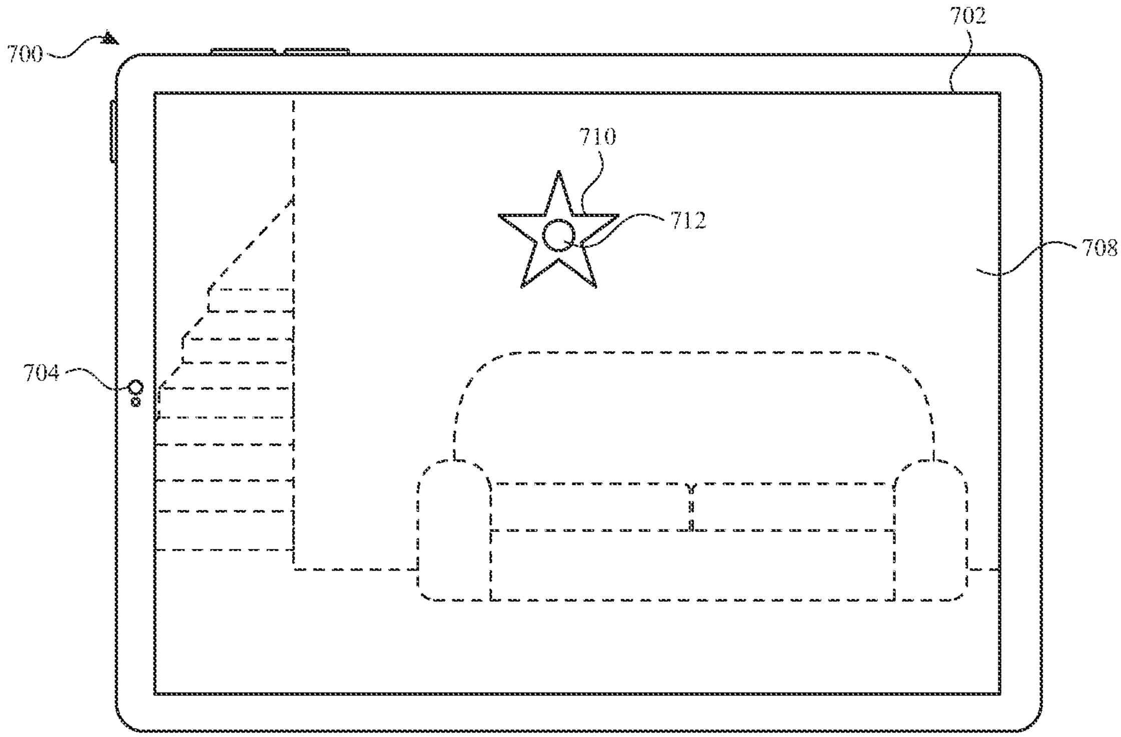

At FIG. 7C, the user has shifted his or her viewpoint such that display 702 now displays a different area of three-dimensional environment 708. For example, in some embodiments in which electronic device 700 is a head-mounted system, the user shifts his or her viewpoint by turning his or her head while wearing electronic device 700 (e.g., from FIG. 7B to FIG. 7C, the user has turned his or her head slightly to the right). However, although the user's viewpoint has changed from FIG. 7B to FIG. 7C, the position of gaze target 710 within the user's viewpoint (e.g., the position of gaze target 710 on display 702) does not move as the user's viewpoint moves. In the depicted embodiment, gaze target 710 is a viewpoint-locked virtual object. In some embodiments, gaze target 710 exhibits lazy follow behavior, such that as the user changes his or her viewpoint, gaze target 710 temporarily stops occupying a default position within the field of view of the user, but moves back to the default position in a delayed manner.

At FIG. 7C, electronic device 700 detects, via input sensors 704, that the user is looking at gaze target 710, as indicated by gaze indication 712. In response to the user looking at gaze target 710, electronic device 700 performs eye-based user authentication of the user.

Figure 7D:
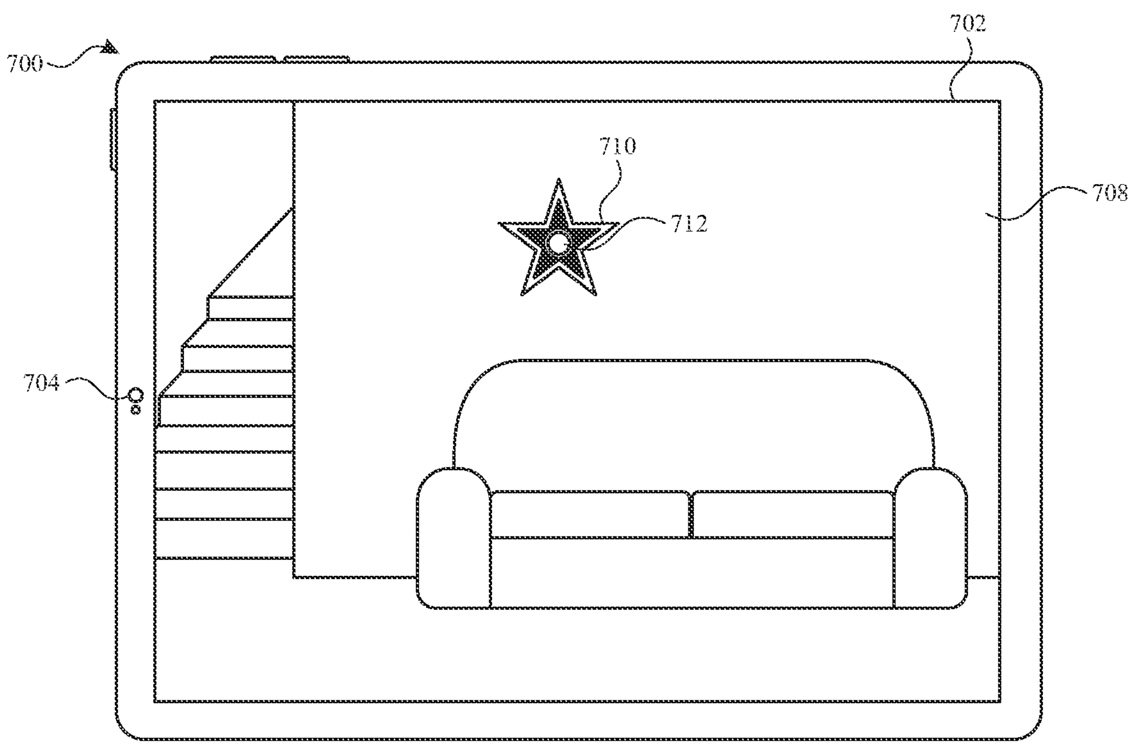

At FIG. 7D, as electronic device 700 performs eye-based user authentication of the user (and, in some embodiments, in response to the user looking at gaze target 710 and/or in response to electronic device 700 initiating eye-based user authentication), electronic device 700 displays, via display 702, an animation of gaze target 710. In some embodiments, the animation of gaze target 710 indicates to the user that electronic device 700 is performing eye-based user authentication. Furthermore, as (or after) electronic device 700 performs eye-based user authentication of the user (in some embodiments, in response to the user looking at gaze target 710 and/or in response to the electronic device 700 initiating eye-based user authentication), electronic device 700 modifies display of three-dimensional environment 708 so that three-dimensional environment 708 is no longer visually obscured (e.g., by increasing focus, increasing sharpness, increasing color saturation, and/or decreasing opacity), as indicated by the solid lines of three-dimensional environment 708 in FIG. 7D.

Figure 7E:
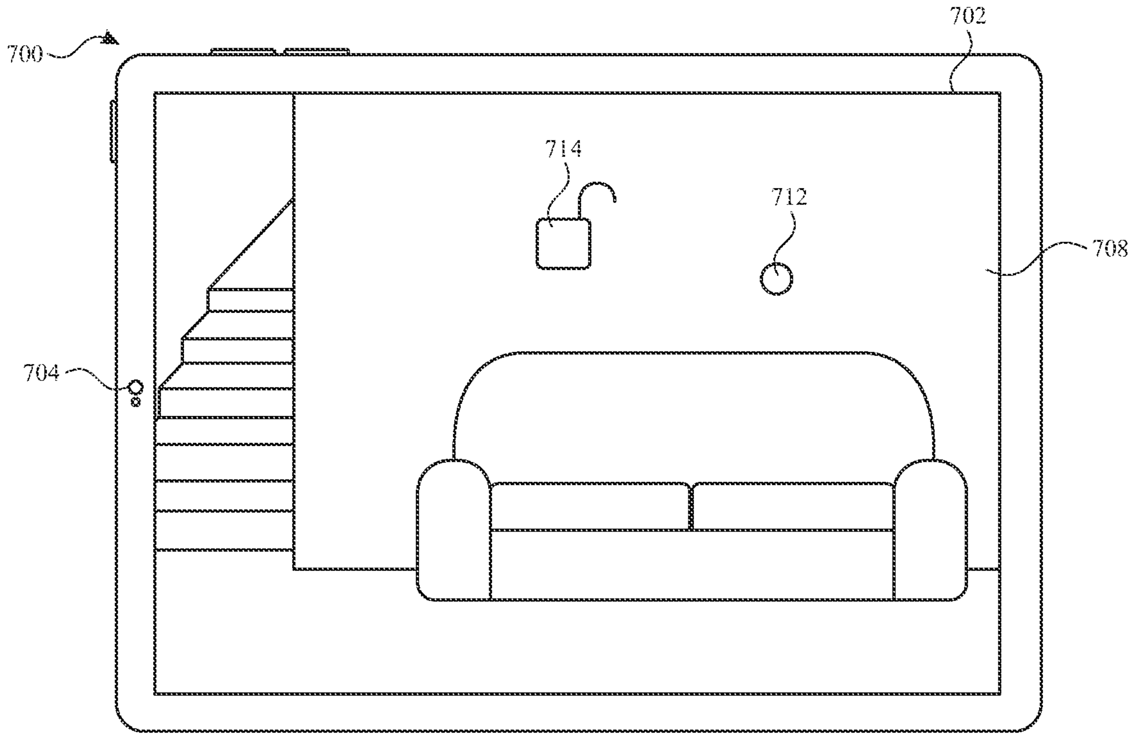

FIG. 7E depicts a first scenario, in which the eye-based user authentication of the user is successful. For example, in FIG. 7E, electronic device 700 has scanned the user's eye(s) and determined that the eye scan matches eye scan information corresponding to a known or registered user. At FIG. 7E, in response to successful authentication of the user, electronic device 700 replaces display of gaze target 710 with user interface object 714, indicating that the user has successfully been authenticated, and electronic device 700 is transitioning from the locked state to an unlocked state.

Figure 7F:
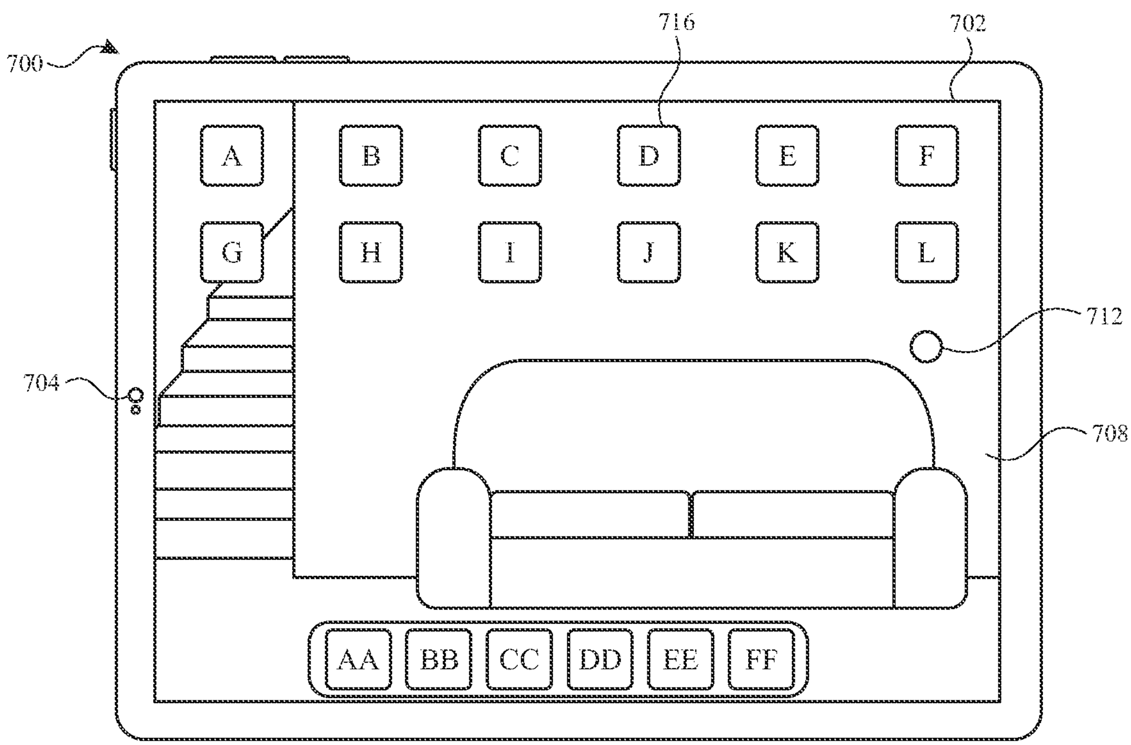

At FIG. 7F, in response to the successful authentication of the user, electronic device 700 displays home user interface 716 overlaid on three-dimensional environment 708. In some embodiments, home user interface 716 is indicative of electronic device 700 being in an unlocked state (e.g., a state in which a known and/or registered user is logged in).

Figure 7G:
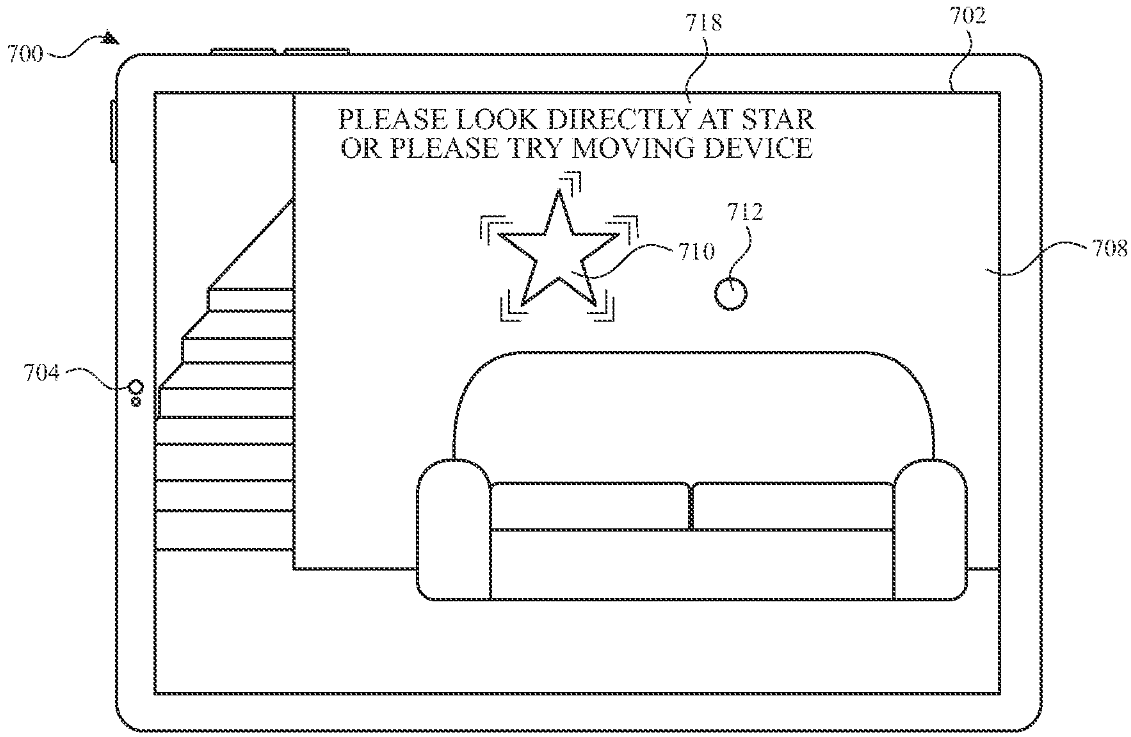

FIG. 7G depicts a second scenario in which the eye-based user authentication of the user was not successful. For example, in FIG. 7G, electronic device 700 has scanned the user's eye(s) and determined that the eye scan does not match eye scan information corresponding to any known or registered user. At FIG. 7G, in response to unsuccessful authentication of the user, electronic device 700 displays, via display 702, a different animation of gaze target 710 indicating that user authentication was unsuccessful (e.g., shows gaze target 710 shake and/or show a change in color of gaze target 710). In response to the unsuccessful authentication, electronic device 700 also displays notice 718 instructing the user to look directly at gaze target 710 or to adjust the position of electronic device 700. For example, if electronic device 700 is a head-mounted system, the user can adjust the position of electronic device 700 on his or her head.

Subsequent to displaying notice 718, electronic device 700 attempts a second eye-based authentication of the user (e.g., in response to the user looking at gaze target 710 and/or after a threshold duration of time). If the second eye-based authentication of the user is successful, electronic device 700 replaces gaze target 710 with user interface object 714 and/or displays, via display 702, home user interface 716, as previously depicted and discussed with reference to FIGS. 7E and 7F, and transitions from the locked state to the unlocked state. However, if the second eye-based authentication of the user is unsuccessful, electronic device 700 forgoes displaying home user interface 716 and does not transition into the unlocked state (e.g., remains in the locked state).

Figure 7H:
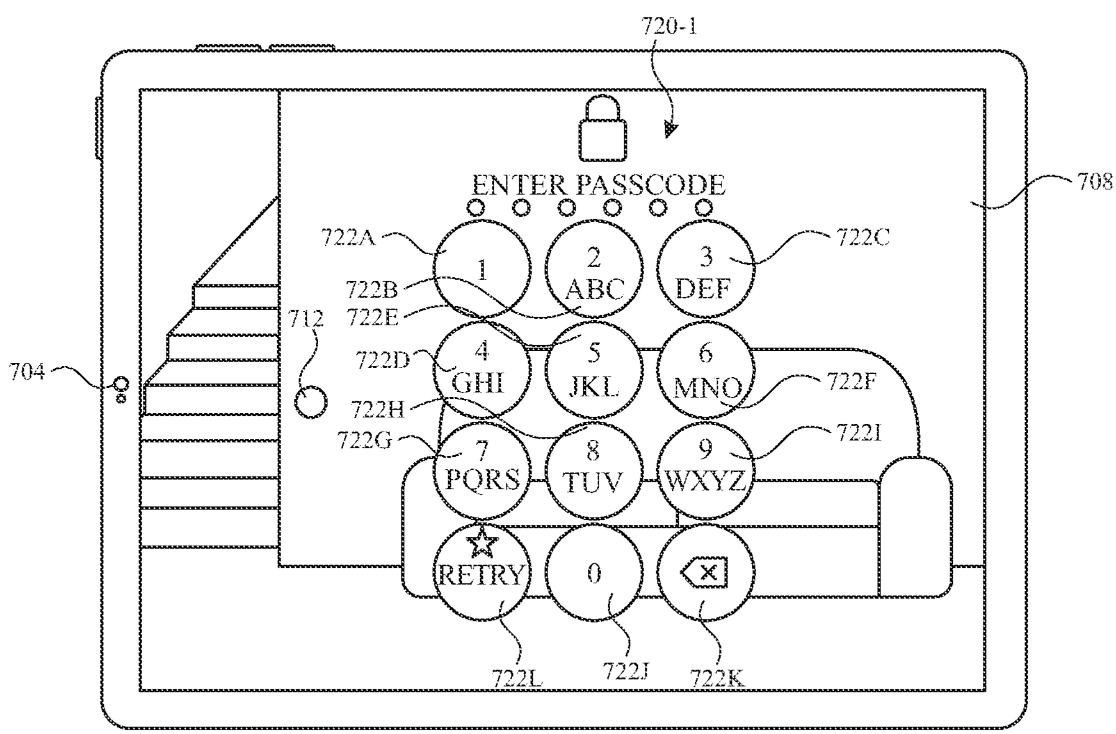

At FIG. 7H, in response to a determination that the second eye-based authentication of the user was unsuccessful, electronic device 700 replaces display of gaze target 710 with display of passcode entry user interface 720-1. Passcode entry user interface 720-1 includes a plurality of virtual keys 722A-722K that a user can select to enter passcode information for passcode-based user authentication. For example, a user can select keys to enter passcode information via one or more touch inputs, one or more non-touch inputs, one or more gestures, one or more air gestures, and/or the user's gaze. As discussed above, in some embodiments, electronic device 700 is a head-mounted system. In some embodiments, a user interacts with passcode entry user interface 720-1 based on the user's gaze. In some embodiments, a user interacts with passcode entry user interface 720-1 based on the user's gaze and based on one or more other movements by the user. For example, in some embodiments, a user selects a key in passcode entry user interface 720-1 by looking at the key, and performing an air gesture (e.g., a pinch air gesture and/or a swipe air gesture) with his or her hand. The user selects a second key by looking at the second key, and performing the same air gesture (e.g., a pinch air gesture and/or a swipe air gesture). If the user enters passcode information that satisfies authentication criteria (e.g., matches a passcode corresponding to a known and/or registered user), electronic device 700 transitions from the locked state to the unlocked state. In some embodiments, a user selects a key in passcode entry user interface 720-1 by performing a "poking" air gesture at a three-dimensional position that corresponds to the key the user would like to select.

Passcode entry user interface 720-1 also includes selectable object 722L that is selectable by a user to cause electronic device 700 to re-attempt biometric authentication of the user (e.g., biometric and/or eye-based authentication of the user). In some embodiments, selection of selectable object 722L causes electronic device 700 to cease displaying passcode entry user interface 720-1, and re-display gaze target 710.

Figure 7I:
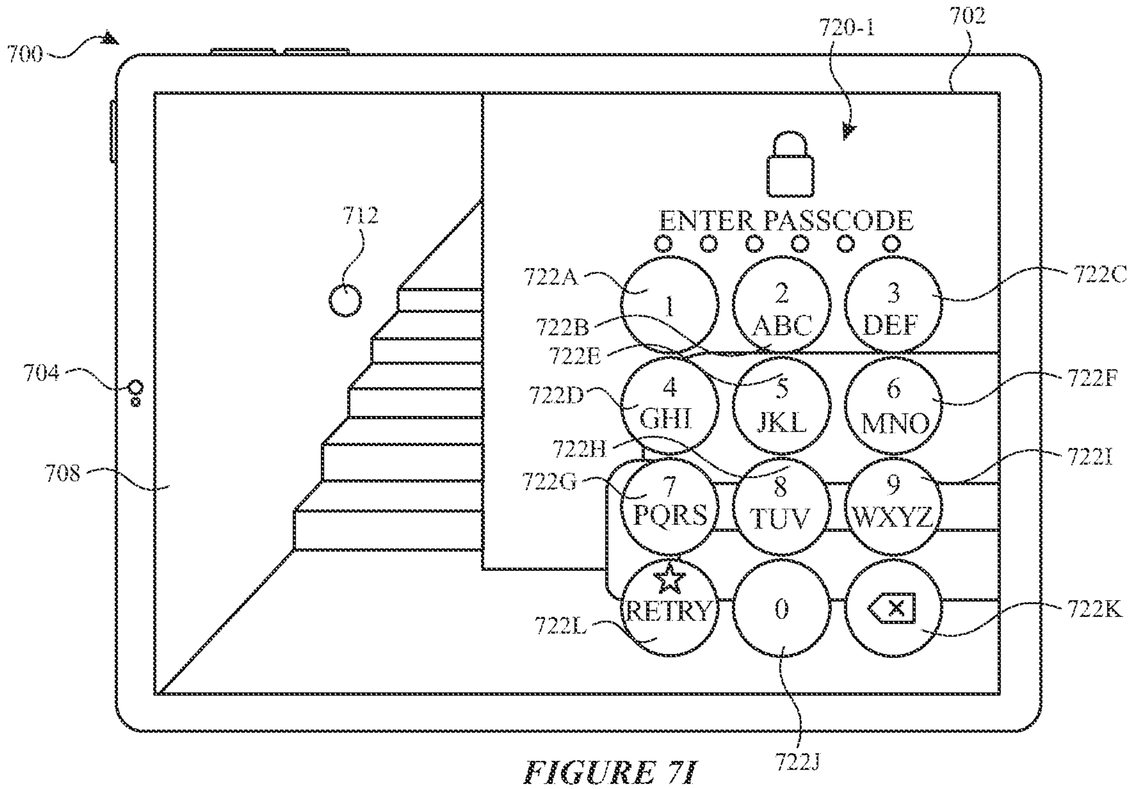

At FIG. 7I, the user has changed his or her viewpoint, as was discussed above with reference to FIGS. 7B and 7C. As can be seen in FIGS. 7H and 7I, the user has shifted his or her view slightly to the left, and display of three-dimensional environment 708 on display 702 has shifted to the right in a corresponding manner. In the depicted embodiment, passcode entry user interface 720-1 is an environment-locked virtual object (e.g., selectable keys 722A-722L of passcode entry user interface 720-1 are environment-locked virtual objects), such that passcode entry user interface 720-1 maintains a constant position within three-dimensional environment 708 and moves with three-dimensional environment 708 as the user changes his or her viewpoint. This is in contrast to gaze target 710, which was a viewpoint-locked virtual object, and maintained a constant position within the user's field of view even as the user changes his or her field of view. Accordingly, in FIG. 7I, as the user shifts his or her viewpoint to the left, and three-dimensional environment 708 moves to the right, passcode entry user interface 720-1 (and its component objects 722A-722L) moves with three-dimensional environment 708 to the right.

In some embodiments, passcode entry user interface 720-1 is locked to a position within three-dimensional environment 708 based on the viewpoint of the user when user authentication failed and passcode entry user interface 720-1 was first displayed. For example, in FIG. 6H, user authentication failed and passcode entry user interface 720-1 is displayed in a pre-defined region of display 702, while the user's viewpoint captures a particular area of three-dimensional environment 708. Now that passcode entry user interface 720-1 is displayed, its position within three-dimensional environment 708 has been locked. Had the user been looking at a different portion of three-dimensional environment 708 (e.g., by moving device 700) when user authentication failed, passcode entry user interface 720-1 would be displayed at and tied to a different position within three-dimensional environment 708.

In some embodiments, although passcode entry user interface 720-1 is an environment-locked virtual object, if the user changes his or her viewpoint by a threshold amount, the position of passcode entry user interface 720-1 within three-dimensional environment 708 is changed so that passcode entry user interface 720-1 remains visible to the user. For example, in some embodiments, if the user moves by less than a threshold amount (e.g., as long as passcode entry user interface 720-1 remains within the field of view of the user), passcode entry user interface 720-1 remains as an environment-locked virtual object and remains in the same position within three-dimensional environment 708. However, if the user moves more than the threshold amount (e.g., such that passcode entry user interface 720-1 is no longer within the field of view of the user), passcode entry user interface 720-1 is re-displayed at a predefined region within the field of view of the user and re-positioned within three-dimensional environment 708.

Figure 7J:
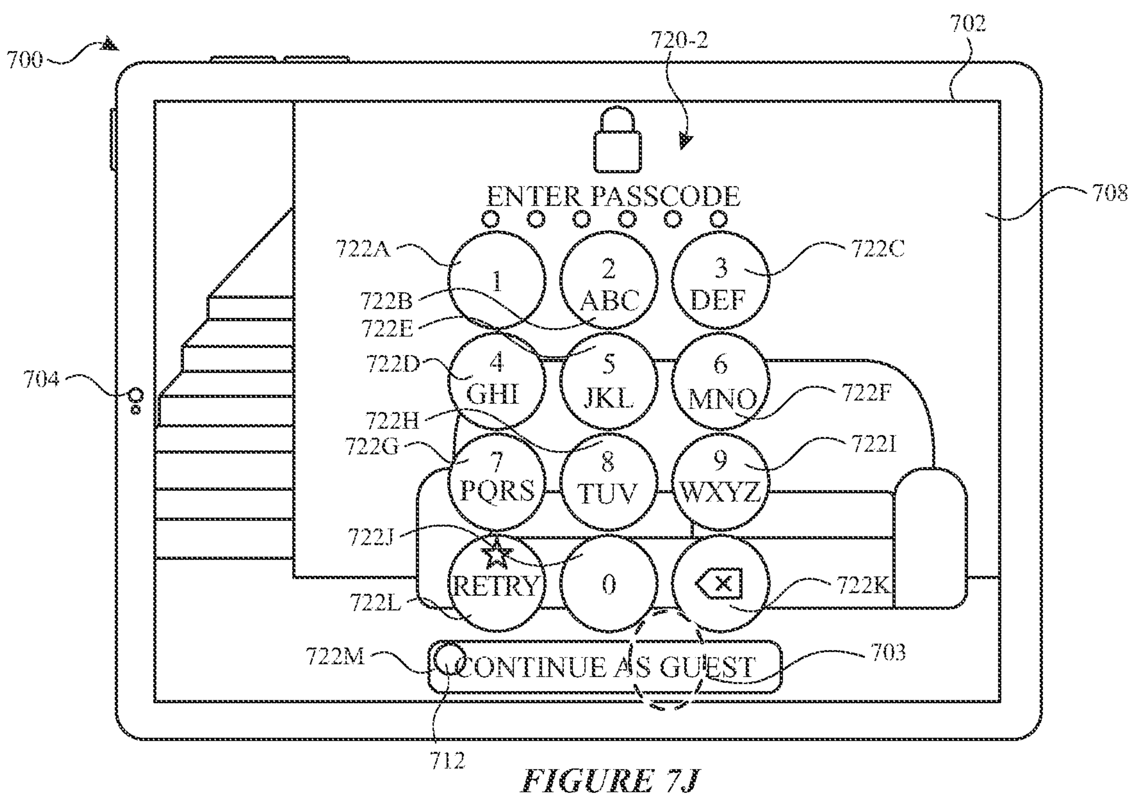

FIG. 7J depicts a slightly different passcode entry user interface 720-2. In FIG. 7J, passcode entry user interface 720-2 includes all of the same virtual keys as passcode entry user interface 720-1 (722A-722L), but passcode entry user interface 720-2 also includes selectable object 722M that is selectable by a user to transition electronic device 700 from the locked state to a guest mode state. In some embodiments, the guest mode state allows the user to utilize more functions and/or features than the locked state, but fewer than the unlocked state. For example, in some embodiments, in the guest mode state, a guest user is granted access to certain content, applications, and/or features, that are not accessible while electronic device 700 is in the locked state, but is not granted access to other content, applications, and/or features (e.g., navigation options and/or system features (e.g., making phone calls and/or making payments)) that would normally be accessible to a registered user (e.g., while electronic device 700 is in the unlocked state). As discussed above, in some embodiments, electronic device 700 is a head-mounted system that only allows a single user to view content that is being displayed. In some such embodiments, when a user is using electronic device 700 in the guest mode state, electronic device 700 transmits information to a companion device (e.g., a smart phone, a tablet, or other computing system) (e.g., a companion device corresponding to an authorized user of electronic device 700) such that the companion device displays what the guest user is viewing on electronic device 700 in the guest mode state. In this way, the authorized user that is allowing a guest user to temporarily user electronic device 700 in the guest mode state can see what the guest user is viewing and/or doing on electronic device 700. In some embodiments, when an authorized user removes electronic device 700 from his or her body (e.g., removes the head-mounted system from his or her head), electronic device 700 automatically transitions from the unlocked state to the locked state in order to prevent unauthorized access.

In some embodiments, in response to failed user authentication at FIG. 7G, electronic device 700 determines whether one or more guest mode criteria are satisfied. If the one or more guest mode criteria are satisfied, electronic device 700 displays passcode entry user interface 720-2, that includes object 722M, and if the guest mode criteria are not satisfied, electronic device 700 displays passcode entry user interface 720-1, which does not include object 722M. In some embodiments, the guest mode criteria includes a criterion that is satisfied if a most recent previous user of electronic device 700 was an authorized user (e.g., a user for which user authentication was successful). In some embodiments, the guest mode criteria includes a criterion that is satisfied if electronic device 700 has been in the locked state for less than a threshold duration of time. In some embodiments, the guest mode criteria includes a criterion that is satisfied if an authorized user of electronic device 700 has enabled guest use of electronic device 700.

At FIG. 7J, electronic device 700 detects user input 703 corresponding to selection of selectable object 722M. In FIG. 7J, user input 703 includes a touch input on touch-sensitive display 702. In some embodiments, electronic device 700 is a head-mounted system, and user input 703 includes one or more non-touch inputs. For example, in some embodiments, user input 703 includes a determination that the user is gazing at selectable object 722M (e.g., as indicated by gaze indication 712), and, in some embodiments, performs a gesture while gazing at selectable object 722M (e.g., an air gesture (e.g., a pinch air gesture, a tap air gesture and/or a poke air gesture)).

Figures 1, 7J:
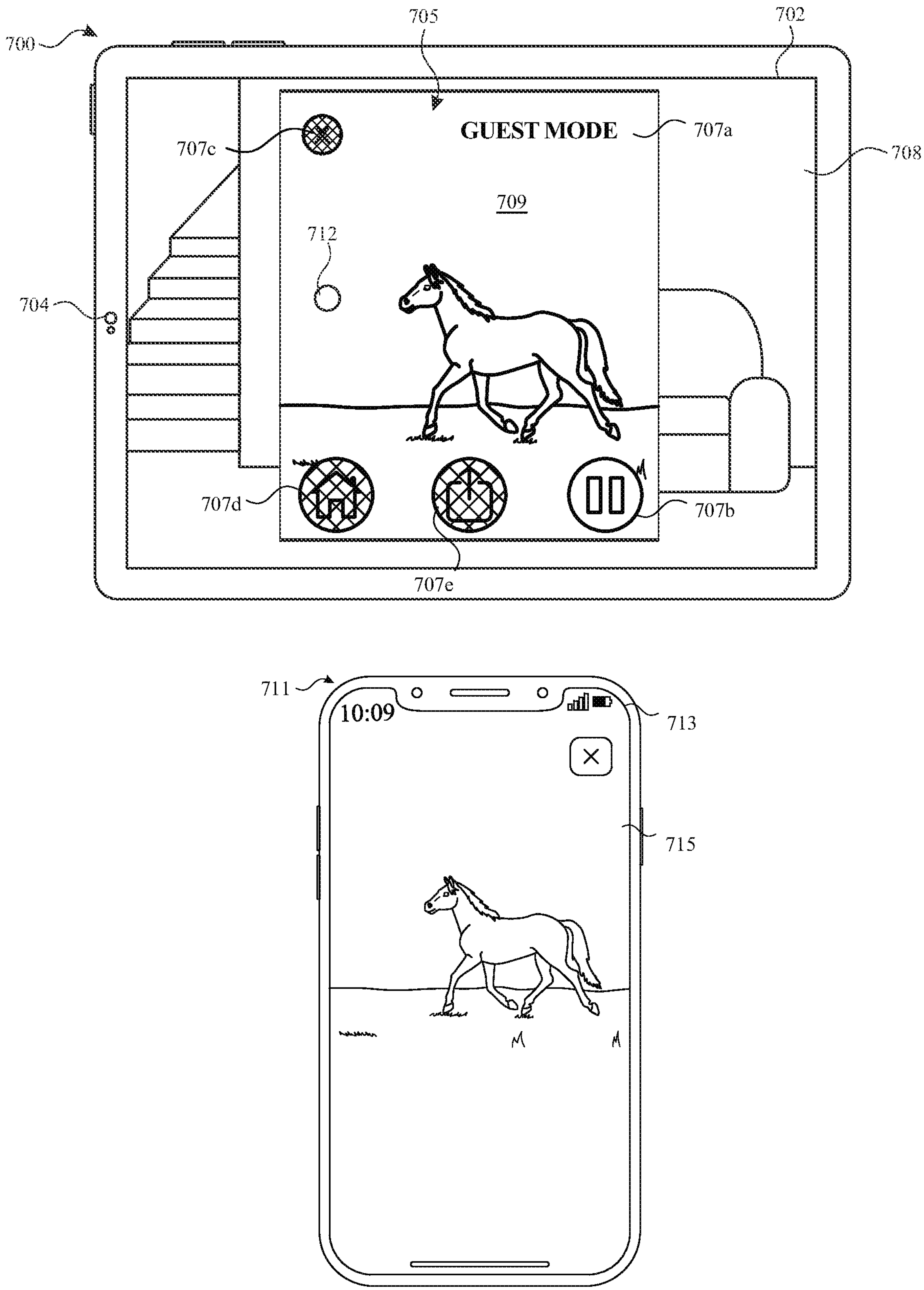
Figure 8A:
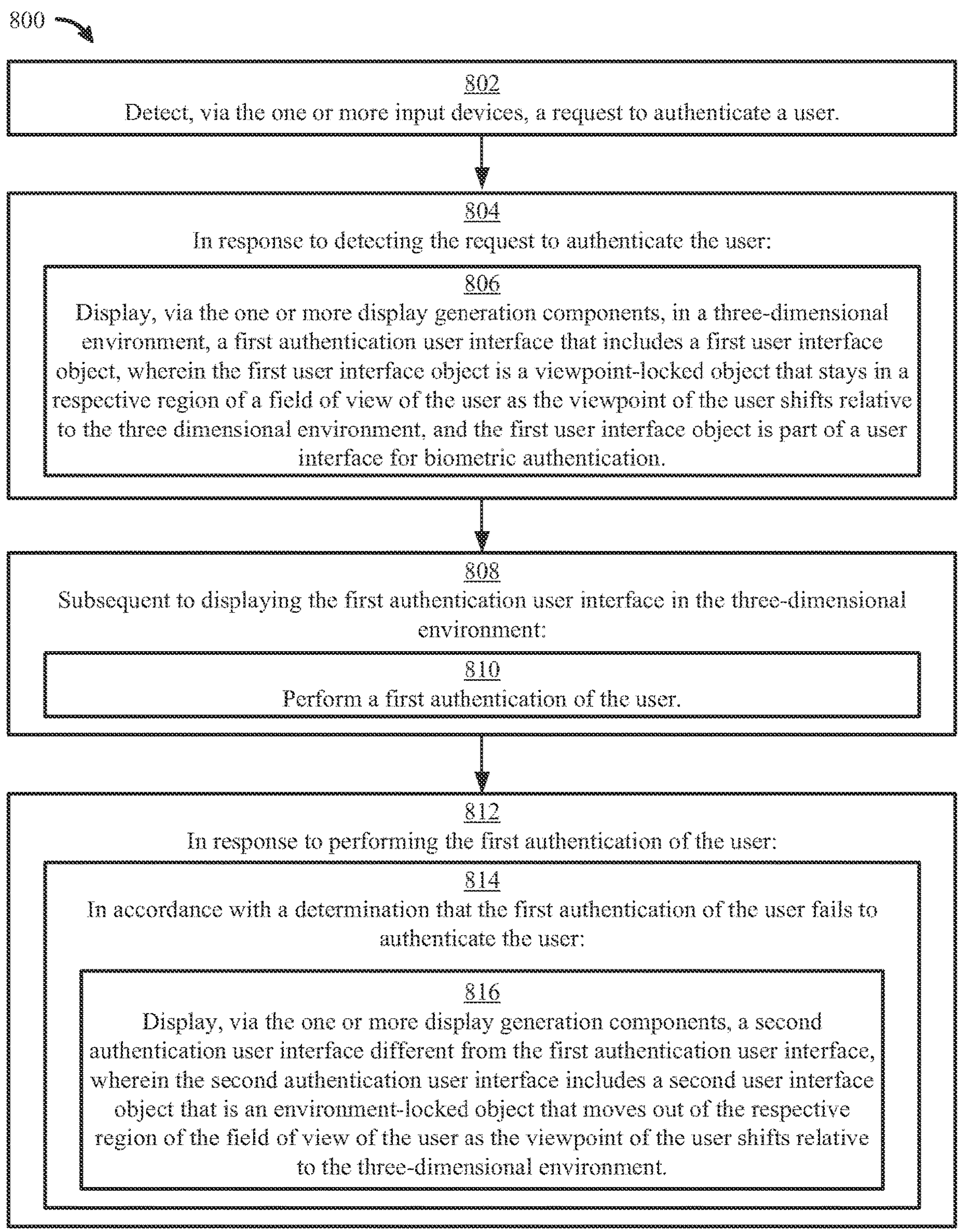
FIG. 8A is a flow diagram of methods of user authentication, in accordance with various embodiments.
Figure 8B:
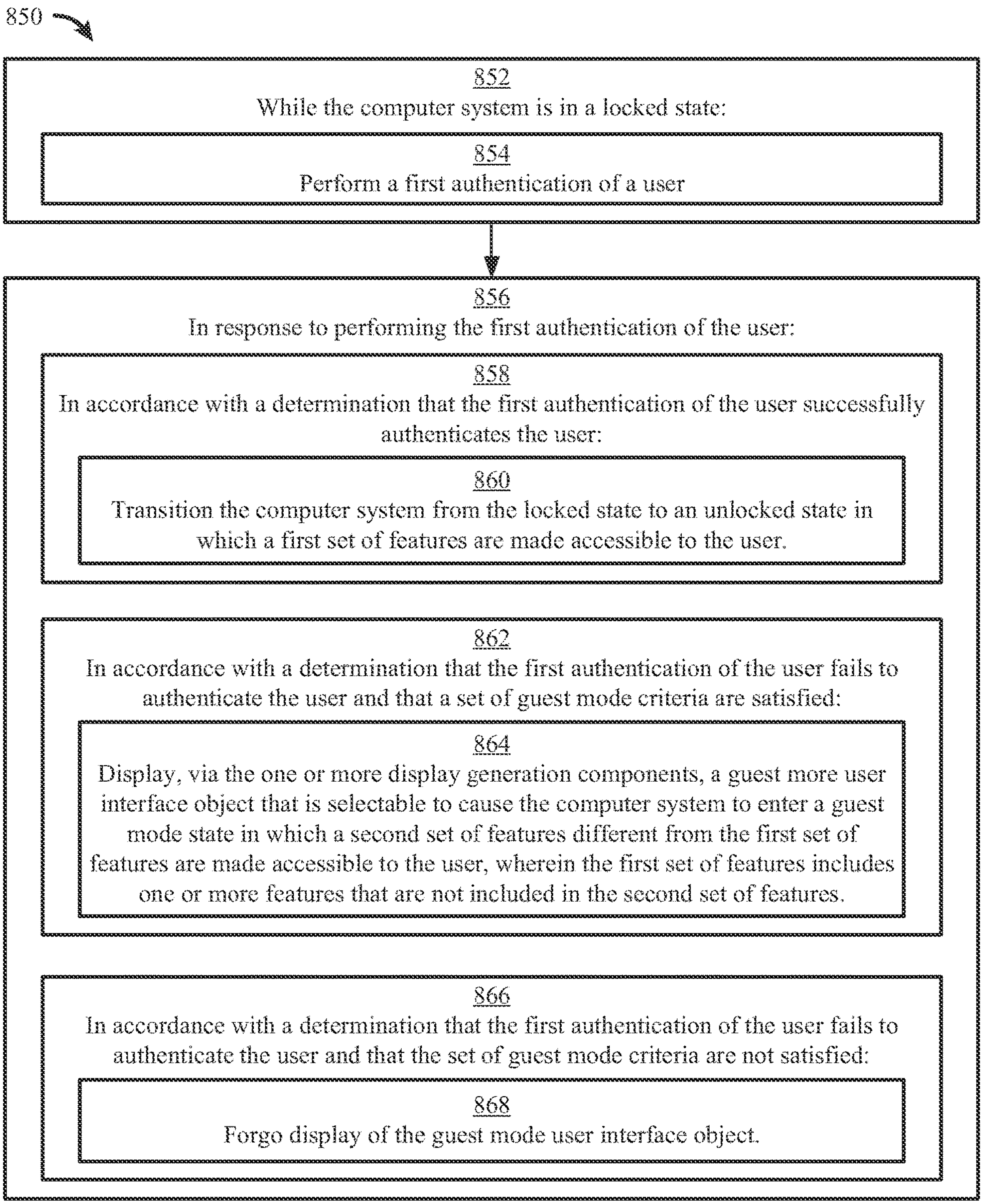
FIG. 8B is a flow diagram of methods of user authentication, in accordance with various embodiments.

At FIG. 7J-1, in response to user input 703, electronic device 700 transitions into a guest mode state, as indicated by visual indication 707*a*. The guest mode state allows the user to utilize more functions and/or features than the locked state, but fewer than the unlocked state. For example, in FIG. 7J-1, electronic device 700 displays, via display 702, media player user interface 705 that is playing video content 709, which is a video of a horse. Media player user interface 705 includes play/pause button 707*b* that is selectable by the user (e.g., a guest user) to pause and/or resume playback of video content 709. However, because electronic device 700 is being operated in the guest mode state, electronic device 700 locks and/or prevents access to one or more features that would normally be available and/or accessible in the unlocked state. For example, in FIG. 7J-1, media player user interface 705 includes object 707*c* that would be selectable by a user, if electronic device 700 was operating in the unlocked state, to close media player 705 and cause displayed of a folder user interface that includes one or more additional content items (e.g., photos and/or videos) that are contained within a folder and/or album (e.g., a folder and/or album that contains video 709). However, because electronic device 700 is in the guest mode state, object 707*c* is not selectable by the guest user, and the user is not able to exit out of media player 705 and/or view the additional content items that are contained within the folder and/or album. Similarly, media player user interface includes object 707*d* that, when electronic device 700 is in the unlocked state, is selectable to cease display of media player user interface 705 and display a home screen user interface (e.g., interface 716), and object 707*e* that, when electronic device 700 is in the unlocked state, is selectable to open a messenger application user interface to share video content 709 via the messenger application. However, because electronic device 700 is in the guest mode state, object 707*d* is not selectable (e.g., and the guest user is prohibited from accessing the home screen user interface), and object 707*e* is also not selectable (e.g., and the guest user is prohibited from sharing video content 709 and/or accessing the messenger application).

In some embodiments, including the depicted embodiment, when electronic device 700 is operating in the guest mode state, content that is displayed on electronic device 700 is also displayed (e.g., transmitted to and displayed) on an external electronic device that corresponds to an authorized, registered, and/or known user of electronic device 700. In FIG. 7J-1, external device 711 is a smart phone with touch-screen display 713 that corresponds to a registered user of electronic device 700. In response to electronic device 700 displaying video content 709, external device 711 also displays, via display 713, video content 715 that corresponds to video content 709. This allows the registered and/or known user to monitor what content is being viewed on electronic device 700 by a guest user.

The various example embodiments described above with reference to FIGS. 7A-7J dealt primary with user authentication for transitioning electronic device 700 from a locked state to an unlocked state. In some embodiments, the user authentication methods described herein can also be used to authenticate and/or authorize other features, such as initiating transfer (e.g., transfers of credentials and/or payment transactions (e.g., transmitting payment information to an external device)).

Figure 7K:
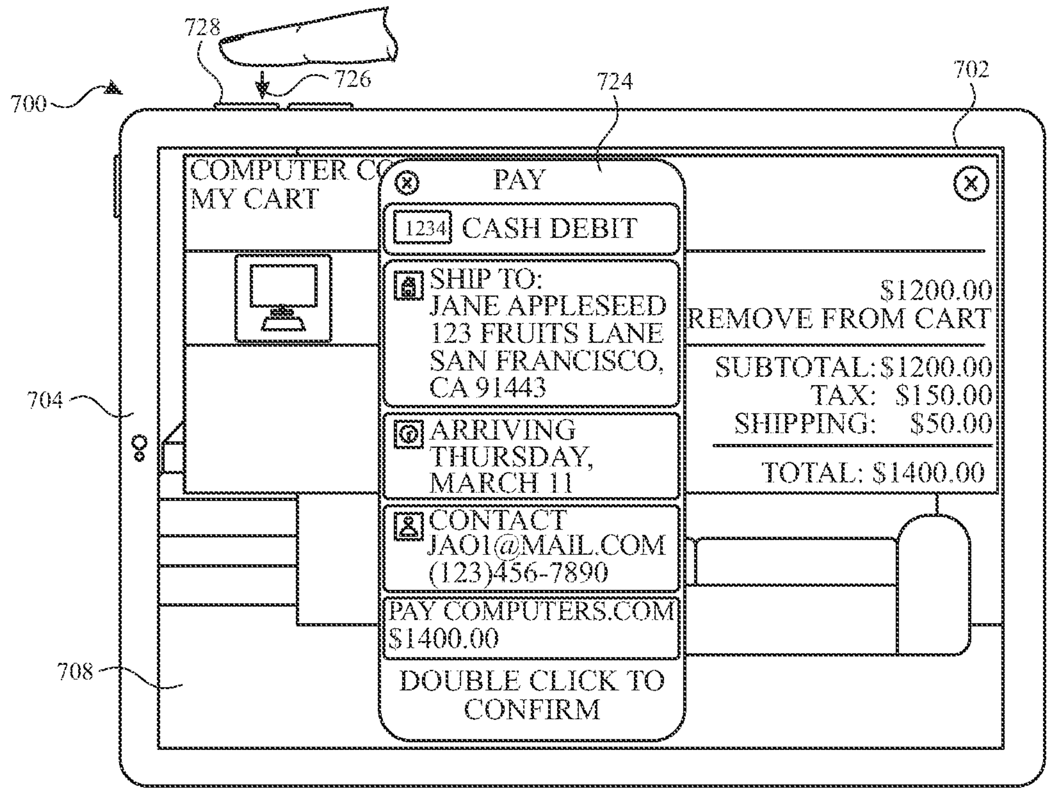

At FIG. 7K, a user is using electronic device 700 to make a payment to Computers.com., as indicated by payment user interface 724. Payment user interface 724 includes an instruction for the user to perform a double click gesture to confirm payment to Computers.com. At FIG. 7K, electronic device 700 detects user input 726 corresponding to a double press of hardware button 728 confirming the user's request to transmit payment information to Computers.com. In some embodiments, user input 726 is a different type of input, such as a touch input, a gesture, and/or an air gesture. In some embodiments, where electronic device 700 is a head-mounted system, hardware button 728 is located at an external portion of electronic device 700 such that the user can perform the double click gesture while continuing to wear the head-mounted system on the user's head.

Figure 7L:
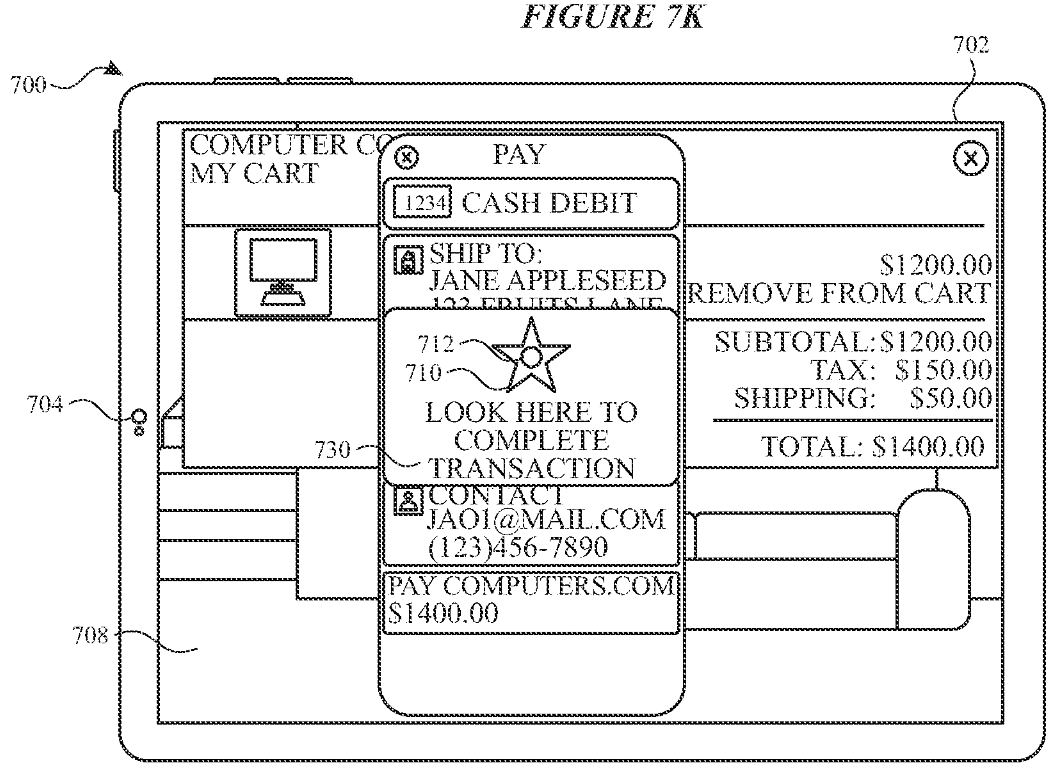

At FIG. 7L, in response to user input 726, electronic device 700 displays gaze target 710, as well as instruction 730 instructing the user to look at gaze target 710 in order to complete the payment transaction. In some embodiments, as discussed above, gaze target 710 is a viewpoint-locked virtual object. In some embodiments, gaze target 710 is a viewpoint-locked virtual object, and payment user interface 724 is an environment-locked virtual object (e.g., locked to a particular position within three-dimensional environment 708). At FIG. 7L, electronic device 700 determines that the user is looking at gaze target 710, as indicated by gaze indication 712. In response to detecting that the user is looking at gaze target 710, electronic device 700 performs biometric authentication (e.g., eye-based authentication) of the user.

Figure 7M:
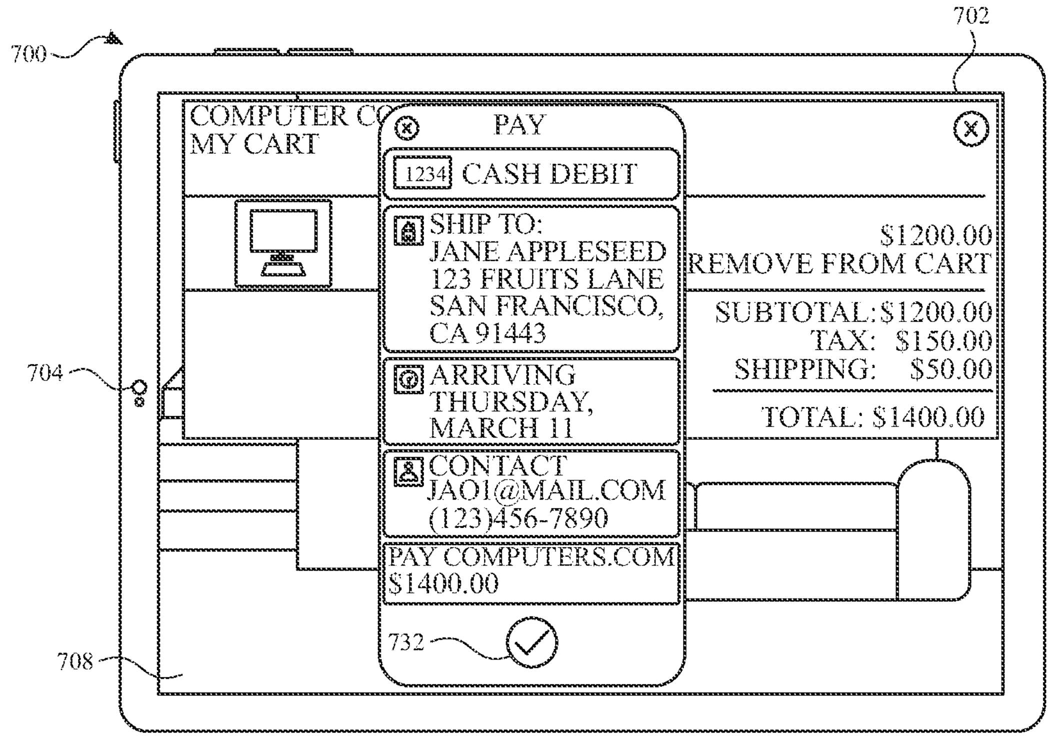

FIG. 7M depicts a first scenario, in which biometric authentication of the user is successful. In response, electronic device 700 displays, via display 702, indication 732 that biometric authentication of the user was successful and transmits payment information to Computers.com.

Figure 7N:
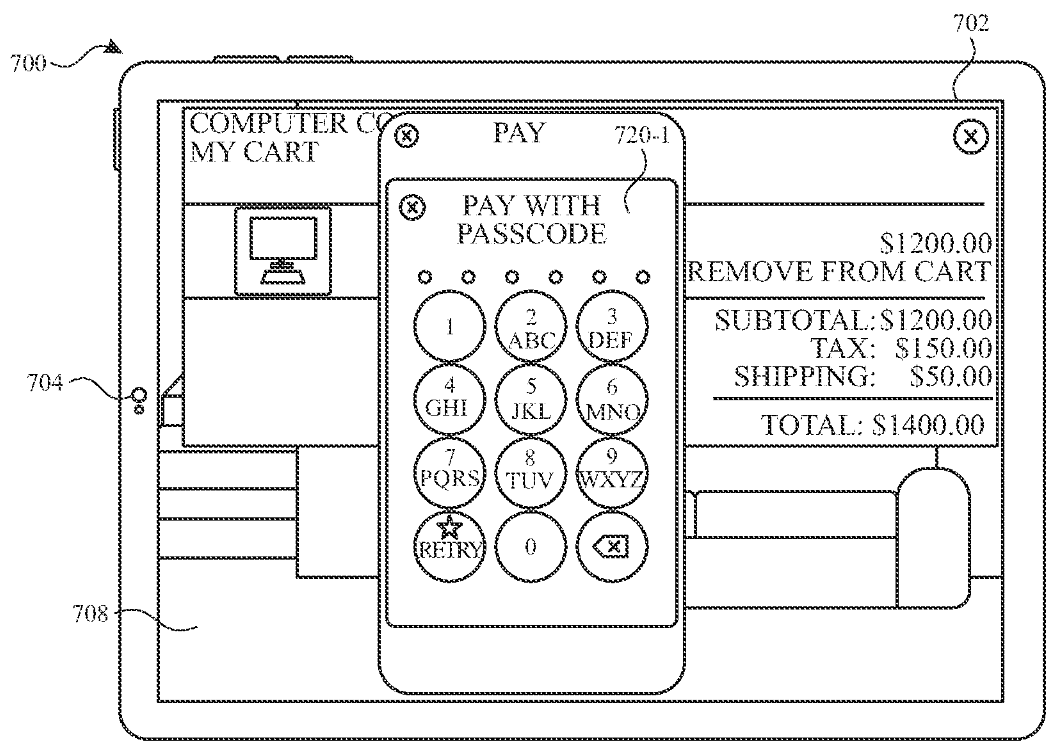
Figure 7O:
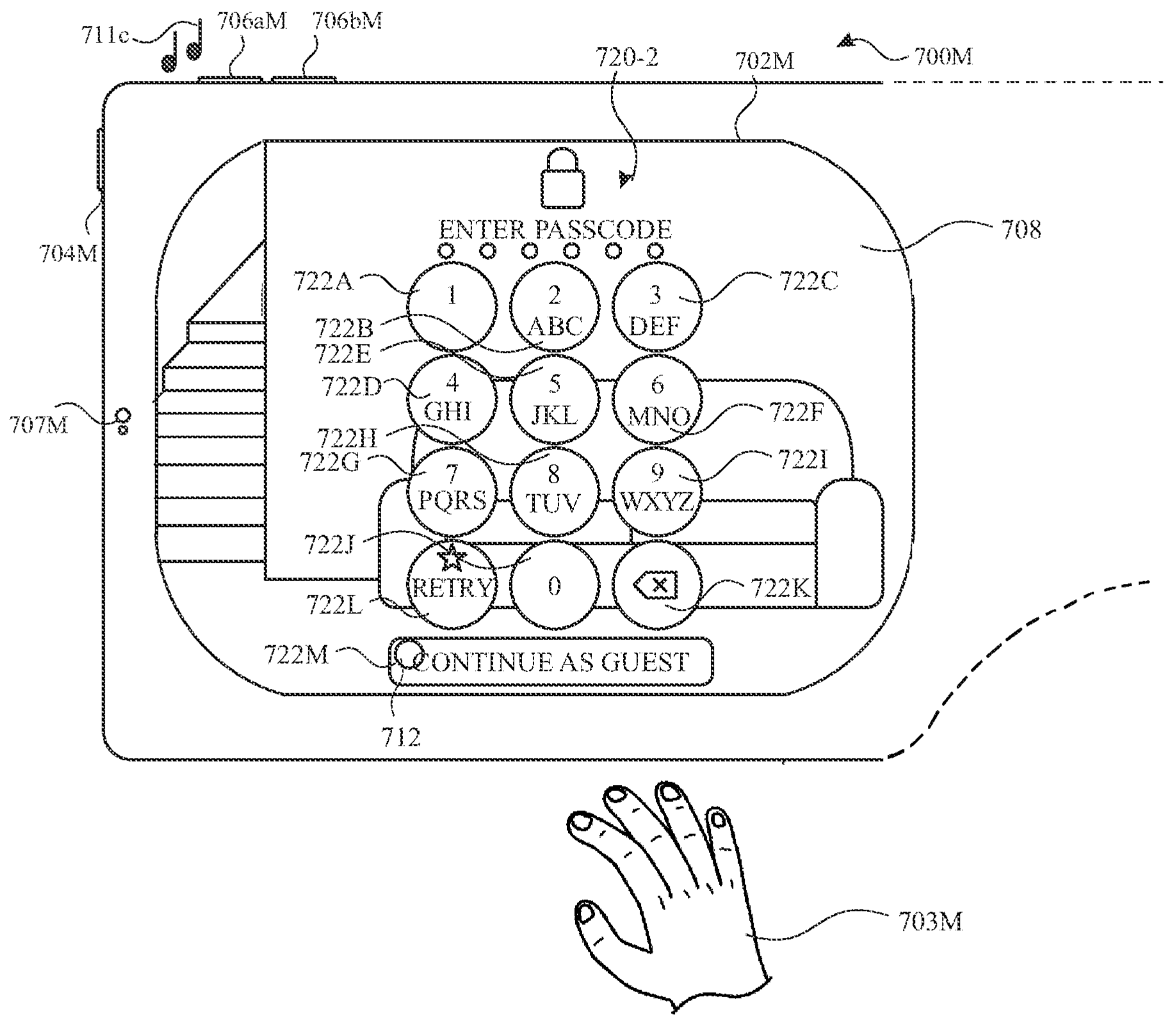

FIG. 7N depicts a second scenario, in which biometric authentication of the user is not successful. In response, electronic device 700 forgoes transmitting payment information to Computers.com, and displays passcode user interface 720-1, for a user to manually enter passcode information to authenticate transmission of payment information (e.g., using gaze and/or air gestures when electronic device 700 is a head-mount system). If the user enters passcode information that successfully authenticates the user, electronic device 700 transmits payment information to Computers.com. However, if the user does not enter passcode information that successfully authenticates the user, electronic device 700 forgoes transmitting payment information to Computers.com.

In some embodiments, the techniques and user interfaces described in FIGS. 7A-7N are provided by one or more of the devices described in FIGS. 1A-1P. FIG. 7O illustrates an embodiment in which user interface 720-2 (e.g., as described in FIG. 7J is displayed on display module 702M of head-mounted device (HMD) 700M. In FIG. 7O, passcode entry user interface 720-2 includes virtual keys 722A-722L for entering passcode information, and also includes selectable object 722M that is selectable by a user to transition HMD 700M from a locked state to a guest mode state. In some embodiments, the guest mode state allows the user to utilize more functions and/or features than the locked state, but fewer than an unlocked state. For example, in some embodiments, in the guest mode state, a guest user is granted access to certain content, applications, and/or features, that are not accessible while HMD 700M is in the locked state, but is not granted access to other content, applications, and/or features (e.g., navigation options and/or system features (e.g., making phone calls and/or making payments)) that would normally be accessible to a registered user (e.g., while HMD 700M is in the unlocked state). As discussed above, in some embodiments, HMD 700M is a head-mounted system that only allows a single user to view content that is being displayed. In some such embodiments, when a user is using HMD 700M in the guest mode state, HMD 700M transmits information to a companion device (e.g., a smart phone, a tablet, or other computing system) (e.g., a companion device corresponding to an authorized user of HMD 700M) such that the companion device displays what the guest user is viewing on HMD 700M in the guest mode state. In this way, the authorized user that is allowing a guest user to temporarily use HMD 700M in the guest mode state can see what the guest user is viewing and/or doing on HMD 700M. In some embodiments, when an authorized user removes HMD 700M from his or her body (e.g., removes the head-mounted system from his or her head), HMD 700M automatically transitions from the unlocked state to the locked state in order to prevent unauthorized access.

In some embodiments, in response to failed user authentication (e.g., as discussed above in FIG. 7G), HMD 700M determines whether one or more guest mode criteria are satisfied. If the one or more guest mode criteria are satisfied, HMD 700M displays passcode entry user interface 720-2, that includes object 722M, and if the guest mode criteria are not satisfied, HMD 700M displays passcode entry user interface 720-1 (e.g., as described above with reference to FIGS. 7H-7I), which does not include object 722M. In some embodiments, the guest mode criteria includes a criterion that is satisfied if a most recent previous user of HMD 700M was an authorized user (e.g., a user for which user authentication was successful). In some embodiments, the guest mode criteria includes a criterion that is satisfied if HMD 700M has been in the locked state for less than a threshold duration of time. In some embodiments, the guest mode criteria includes a criterion that is satisfied if an authorized user of HMD 700M has enabled guest use of HMD 700M.

At FIG. 7O, HMD 700M detects user input 703M corresponding to selection of selectable object 722M. In some embodiments, user input 703M includes one or more non-touch inputs. For example, in some embodiments, user input 703M includes a determination that the user is gazing at selectable object 722M (e.g., as indicated by gaze indication 712), and, in some embodiments, performs a gesture while gazing at selectable object 722M (e.g., an air gesture (e.g., a pinch air gesture, tap air gesture and/or a poke air gesture)).

In some embodiments, device 700M includes a pair of display modules that provide stereoscopic content to different eyes of the same user. For example, HMD 700M includes display module 702M (which provides content to a left eye of the user) and a second display module (which provides content to a right eye of the user). In some embodiments, the second display module displays a slightly different image than display module 702M to generate the illusion of stereoscopic depth.

Any of the features, components, and/or parts, including the arrangements and configurations thereof shown in FIGS. 1B-1P can be included, either alone or in any combination, in HMD 700M. For example, in some embodiments, HMD 700M includes any of the features, components, and/or parts of HMD 1-100, 1-200, 3-100, 6-100, 6-200, 6-300, 6-400, 11.1.1-100, and/or 11.1.2-100, either alone or in any combination. In some embodiments, display module 702M includes any of the features, components, and/or parts of display unit 1-102, display unit 1-202, display unit 1-306, display unit 1-406, display generation component 120, display screens 1-122*a-b*, first and second rear-facing display screens 1-322*a*, 1-322*b*, display 11.3.2-104, first and second display assemblies 1-120*a*, 1-120*b*, display assembly 1-320, display assembly 1-421, first and second display sub-assemblies 1-420*a*, 1-420*b*, display assembly 3-108, display assembly 11.3.2-204, first and second optical modules 11.1.1-104*a* and 11.1.1-104*b*, optical module 11.3.2-100, optical module 11.3.2-200, lenticular lens array 3-110, display region or area 6-232, and/or display/display region 6-334, either alone or in any combination. In some embodiments, sensor 707M includes any of the features, components, and/or parts of any of sensors 190, sensors 306, image sensors 314, image sensors 404, sensor assembly 1-356, sensor assembly 1-456, sensor system 6-102, sensor system 6-202, sensors 6-203, sensor system 6-302, sensors 6-303, sensor system 6-402, and/or sensors 11.1.2-110*a-f*, either alone or in any combination. In some embodiments, input devices 704M, 706*a*M, and/or 706*b*M include any of the features, components, and/or parts of any of first button 1-128, button 11.1.1-114, second button 1-132, and or dial or button 1-328, either alone or in any combination. In some embodiments, HMD 700M includes one or more audio output components (e.g., electronic component 1-112) for generating audio feedback (e.g., audio output 711*c*), optionally generated based on detected events and/or user inputs detected by the HMD 700M.

Additional descriptions regarding FIGS. 7A-7O are provided below in reference to methods 800 and 850 described with respect to FIGS. 7A-7O.

FIG. 8A is a flow diagram of an exemplary method 800 for user authentication, in accordance with some embodiments. In some embodiments, method 800 is performed at a computer system (e.g., 700) (e.g., computer system 101 in FIG. 1A) including one or more display generation components (e.g., 702) (e.g., display generation component 120 in FIGS. 1A, 3, and 4) (e.g., a heads-up display, a display, a touchscreen, a projector, etc.) and one or more input devices (e.g., 704) (e.g., one or more buttons, one or more eye movement trackers, one or more hand movement trackers, one or more cameras (e.g., a camera (e.g., color sensors, infrared sensors, and other depth-sensing cameras))). In some embodiments, the method 800 is governed by instructions that are stored in a non-transitory (or transitory) computer-readable storage medium and that are executed by one or more processors of a computer system, such as the one or more processors 202 of computer system 101 (e.g., control 110 in FIG. 1A). Some operations in method 800 are, optionally, combined and/or the order of some operations is, optionally, changed.

In some embodiments, the computer system (e.g., 700) detects (802), via the one or more input devices (e.g., 704), a request to authenticate a user (e.g., 706) (e.g., a request to authenticate a user that is wearing the computer system and/or one or more components of the computer system) (e.g., detecting that at least a portion of the computer system has been placed on a body of a respective user; and/or detecting one or more user inputs (e.g., one or more gestures, one or more touch-screen inputs, one or more button presses, and/or one or more rotations of a rotatable input mechanism) indicative of a request to authenticate a user). In some embodiments, the request to authenticate a user corresponds to a request to grant access to (e.g., unlock and/or display) one or more features (e.g., one or more sets of content, one or more user interfaces, one or more files, and/or one or more applications) of the computer system. In some embodiments, the computer system is a head-mounted system, and detecting the request to authenticate the user comprises detecting that the user has placed the head-mounted system on his or her head.

In response to detecting the request to authenticate the user (804), the computer system displays (806), via the one or more display generation components (e.g., 702), in a three-dimensional environment (e.g., 708) (e.g., a virtual three-dimensional environment and/or a passthrough three-dimensional environment), a first authentication user interface (e.g., the user interface displayed in FIG. 7B) that includes a first user interface object (e.g., 710) (e.g., a gaze target), wherein: the first user interface object (e.g., 710) is a viewpoint-locked object that stays in a respective region of a field of view of the user as the viewpoint of the user shifts relative to the three-dimensional environment (e.g., 708) (in some embodiments, the first user interface does not include environment-locked objects); and the first user interface object is part of a user interface for biometric authentication (e.g., the user interface in FIG. 7B is a user interface for biometric authentication) (e.g., a gaze target for eye or face based biometric authentication).

Subsequent to displaying the first authentication user interface in the three-dimensional environment (808) (e.g., while displaying the first authentication user interface and/or subsequent to ceasing display of the first authentication user interface), the computer system performs (810) a first authentication of the user (e.g., FIGS. 7C-7D) (e.g., a biometric authentication (e.g., comparing biometric information collected from the user with one or more biometric profiles stored on and/or accessible to the computer system (e.g., one or more biometric profiles corresponding to one or more known and/or registered users)) and/or a non-biometric authentication (e.g., authentication of a user without use of biometric information (e.g., password and/or passcode-based authentication))). In some embodiments, the computer system is a head-mounted system, and performing the first authentication of the user comprises performing a biometric authentication (e.g., eye scan and/or facial scan) while the user is wearing the head-mounted system on his or her head.

In response to performing the first authentication of the user (812), and in accordance with a determination that the first authentication of the user fails to authenticate the user (814) (e.g., in accordance with a determination that biometric information collected from the user does not match one or more biometric profiles stored on and/or accessible to the computer system (e.g., does not match biometric information corresponding to one or more known and/or registered users); and/or in accordance with a determination that authentication information provided by (e.g., input by) the user does not match authentication information for a known and/or registered user), the computer system displays (816), via the one or more display generation components (e.g., 702), a second authentication user interface (e.g., 720-1, 720-2) different from the first authentication user interface (e.g., 710), wherein the second authentication user interface includes a second user interface object (e.g., 722A-722K) (e.g., a keyboard, a keypad, and/or a user interface object that a user can select and/or interact with to provide one or more inputs to the computer system) that is an environment-locked object that moves out of the respective region of the field of view of the user as the viewpoint of the user shifts relative to the three-dimensional environment. In some embodiments, the second user interface does not include viewpoint-locked objects.

In some embodiments, the computer system is a head-mounted system. In some embodiments, the three-dimensional environment includes an optical passthrough environment (e.g., the physical, real environment) that is visible to the user through transparent display generation components (e.g., transparent optical lens displays) on which the first authentication user interface and the second authentication user interface are displayed. In some embodiments, the three-dimensional environment includes a virtual three-dimensional environment that is displayed by one or more display generation components. In some embodiments, the three-dimensional environment includes a virtual passthrough environment (e.g., a virtual passthrough environment that is a virtual representation of the user's physical, real-world environment (e.g., as captured by one or more cameras that are in communication with the computer system)) that is displayed by one or more display generation components.

In some embodiments, in response to performing the first authentication of the user, and in accordance with a determination that the first authentication of the user succeeds in authenticating the user (e.g., in accordance with a determination that biometric information collected from the user matches one or more biometric profiles stored on and/or accessible to the computer system (e.g., matches a biometric profile corresponding to a known and/or registered user); and/or in accordance with a determination that authentication information provided by (e.g., input by) the user matches authentication information for a known and/or registered user), the computer system displays, via the one or more display generation components, a third user interface indicative of successful user authentication, wherein the third user interface is different from the first and second authentication user interfaces.

Displaying the first user interface object, which is part of a user interface for biometric authentication, as a viewpoint-locked object enhances the operability of the computer system by helping the user to provide proper inputs and reducing user mistakes when operating/interacting with the computer system by keeping the first user interface object within the user's view as the computer system performs biometric authentication. Displaying the second user interface object as an environment-locked object enhances the operability of the computer system by helping the user to provide proper inputs and reducing user mistakes when operating/interacting with the computer system by keeping the second user interface object stationary as the user provides input. Displaying a second authentication user interface in accordance with a determination that the first authentication of the user fails to authenticate the user provides the user with visual feedback about the state of the system (e.g., that the system has failed to authenticate the user), thereby providing improved visual feedback to the user. Displaying a second authentication user interface in accordance with a determination that the first authentication of the user fails to authenticate the user allows a user to re-try authentication without requiring additional user inputs to display the second authentication user interface, thereby reducing the number of inputs needed to perform an operation.

In some embodiments, in response to performing the first authentication of the user (e.g., FIGS. 7C-7D), and in accordance with the determination that the first authentication of the user fails to authenticate the user, the computer system ceases display of the first user interface object (e.g., 710) (e.g., computer system 700 ceases to display gaze target 710 in FIG. 7H) (and, optionally, ceases display of the first authentication user interface). In some embodiments, the computer system ceases display of the first user interface object and displays the second authentication user interface while maintaining display of at least a portion of the three-dimensional environment. Ceasing display of the first user interface object in accordance with a determination that the first authentication of the user fails to authenticate the user provides the user with visual feedback about the state of the system (e.g., that the system has failed to authenticate the user), thereby providing improved visual feedback to the user.

While displaying the second authentication user interface (e.g., 720-1, 720-2), the computer system detects, via the one or more input devices (e.g., 704), a first user input (e.g., 712, and/or one more gestures) that corresponds to selection of a first displayed element (e.g., 722A-722K) in the second authentication user interface (e.g., a touch input, a non-touch input, an air gesture (e.g., a pinch air gesture and/or a tap air gesture) (e.g., a first air gesture that has a directionality and/or position (e.g., three-dimensional position) that corresponds to the first displayed element) and/or a user gaze corresponding to the first displayed element (e.g., a user gaze that dwells on the first displayed element for a threshold duration of time and/or a user gaze in combination with a gesture)); and in response to detecting the first user input that corresponds to selection of the first displayed element (e.g., 722A-722M) in the second authentication user interface (e.g., 720-1, 720-2), the computer system receives first user authentication information corresponding to the first displayed element (e.g., entering a first character (e.g., letter and/or number) corresponding to the first displayed element as part of the user authentication information). In some embodiments, in response to receiving the first user authentication information corresponding to the first displayed element, the computer system displays, via the display generation component, an indication that the computer system has received the first user authentication information.

In some embodiments, the second authentication user interface includes a virtual keyboard and/or keypad with a plurality of keys that a user can interact with and/or select to input user authentication information. In some embodiments, if correct authentication information is entered (e.g., authentication information that matches a known password or passcode corresponding to a known and/or registered user), the computer system transitions to an unlocked state (e.g., from an unlocked state). In some embodiments, if incorrect authentication information is entered (e.g., authentication information that does not match a known password or passcode corresponding to a known and/or registered user), the computer system is maintained in a locked state.

In some embodiments, receiving the user authentication information includes receiving multiple user inputs corresponding to a plurality of selections of one or more displayed elements (e.g., 722A-722M) in the second authentication user interface (e.g., 720-1, 720-2) and receiving corresponding authentication information until a user has completed entering a passcode and/or password.

Allowing a user to enter authentication information by performing one or more gestures enhances the operability of the computer system and makes user-device interfaces more efficient by providing additional control options without cluttering the user interface with additional displayed controls.

Displaying a second authentication user interface in accordance with a determination that the first authentication of the user fails to authenticate the user allows a user to re-try authentication without requiring additional user inputs to display the second authentication user interface, thereby reducing the number of inputs needed to perform an operation.

In some embodiments the second user interface object (e.g., 722A-722M) is displayed at a first position within the three-dimensional environment (e.g., 708) (e.g., is persistently displayed at the first position within the three-dimensional environment (e.g., the second user interface object is an environment-locked object that is persistently displayed at the first position within the three-dimensional environment)), and the first position is determined based on a field of view of the user of the computer system at the time the first authentication was performed (e.g., FIGS. 7G-7I) (e.g., the second user interface object is centered within the field of view of the user at the time the first authentication was performed and/or positioned at a predetermined position within the field of view of the user at the time the first authentication was performed). In some embodiments, the first position is determined based on a position of the first user interface object at the time the first authentication was performed (e.g., the second user interface object is positioned at the same position as the first user interface object at the time the first authentication was performed and/or positioned at a predetermined position relative to the first user interface object at the time the first authentication was performed). Displaying the second user interface object at a location within the three-dimensional environment based on the field of view of the user at the time the first authentication was performed provides the user with improved visual feedback by displaying the second user interface object at a position within the three-dimensional environment that will be readily visible to the user, thereby helping the user to provide proper inputs and reducing user mistakes when operating/interacting with the computer system.

In some embodiments, the first user interface object (e.g., 710) occupies a respective position within the three-dimensional environment (e.g., 708) when the first authentication of the user is performed (e.g., FIGS. 7D, 7G) (e.g., when performing the first authentication of the user is initiated and/or when performing the first authentication of the user is completed); and the second user interface object (e.g., 720-1, 720-2, 722A-722M) is displayed at the respective position within the three-dimensional environment (e.g., 708) (e.g., FIG. 7H). In some embodiments, in response to performing the first authentication of the user and in accordance with the determination that the first authentication of the user fails to authenticate the user, the computer system replaces display of the first user interface object at the respective position within the three-dimensional environment with display of the second user interface object at the respective position within the three-dimensional environment. Displaying the second user interface object at a location within the three-dimensional environment based on the displayed position of the first user interface object at the time the first authentication was performed provides the user with improved visual feedback by displaying the second user interface object at a position within the three-dimensional environment that will be readily visible to the user, thereby helping the user to provide proper inputs and reducing user mistakes when operating/interacting with the computer system.

In some embodiments, in response to performing the first authentication of the user (e.g., FIGS. 7C-7D), and in accordance with a determination that the first authentication of the user succeeds in authenticating the user (e.g., in accordance with a determination that biometric information collected from the user matches one or more biometric profiles stored on and/or accessible to the computer system (e.g., matches a biometric profile corresponding to a known and/or registered user); and/or in accordance with a determination that authentication information provided by (e.g., input by) the user matches authentication information for a known and/or registered user), the computer system displays, via the one or more display generation components (e.g., 702), a success user interface (e.g., 714, 716) indicative of successful user authentication (e.g., a home screen user interface and/or a user interface associated with and/or corresponding to a particular user (e.g., and indicative of successful authentication of the particular user)), wherein the success user interface is different from the first authentication user interface and the second authentication user interface. In some embodiments, the computer system displays the success user interface without displaying the second authentication user interface. Displaying a success user interface in accordance with a determination that the first authentication of the user succeeds in authenticating the user provides the user with visual feedback about the state of the system (e.g., that the system has succeeded in authenticating the user), thereby providing improved visual feedback to the user.

In some embodiments, in response to performing the first authentication of the user (e.g., FIGS. 7C-7D) (or, in some embodiments, while performing the first authentication of the user and), the computer system displays, via the one or more display generation components (e.g., 702), a visual animation (e.g., 710, 714) that includes one or more visual changes to the first user interface object (e.g., 710) (e.g., animation of object 710 in FIGS. 7C-7D and/or replacement of object 710 with object 714 in FIGS. 7D-7E) (e.g., a visual animation of the first user interface object and/or replacement of the first user interface object). In some embodiments, the visual animation includes changing the size, shape, and/or color of the first user interface object. In some embodiments, the visual animation includes changing the first user interface object from a first object (e.g., a star and/or an eye) to a second object different from the first object. Displaying an animation of the first user interface object in response to performing the first authentication of the user provides the user with visual feedback about the state of the system (e.g., that the system has performed (e.g., attempted) and/or is performing (e.g., is attempting) authentication of the user), thereby providing improved visual feedback to the user.

In some embodiments, displaying the visual animation includes: in accordance with a determination that the first authentication of the user fails to authenticate the user, displaying, via the one or more display generation components (e.g., 702), a first animation (e.g., 710 in FIG. 7G) (e.g., a first animation that includes a first set of visual changes to the first user interface object) (e.g., a first animation indicative of and/or corresponding to a failed authentication of the user); and in accordance with a determination that the first authentication of the user succeeds in authenticating the user, displaying, via the one or more display generation components, a second animation (e.g., 714, in FIG. 7E) different from the first animation (e.g., a second animation that includes a second set of visual changes to the first user interface object that are different from the first set of visual changes) (e.g., a second animation indicative of and/or corresponding to a successful authentication of the user). In some embodiments, the first animation includes a shaking and/or vibrating of the first user interface object. In some embodiments, the first animation includes text that indicates a failed authentication of the user. In some embodiments, the second animation includes changing the first user interface object from a first object (e.g., a star and/or an eye) to a second object different from the first object (e.g., a padlock and/or a key). In some embodiments, the first animation includes maintaining the first user interface object as the first object (e.g., vibrating and/or moving the first object). Displaying different animations based on whether the authentication is successful or the authentication has failed provides the user with visual feedback about the state of the system (e.g., that the system has succeeded and/or failed in authenticating the user), thereby providing improved visual feedback to the user.

In some embodiments, prior to performing the first authentication of the user (e.g., FIGS. 7C-7D), and while displaying the first user interface object (e.g., 710), the computer system displays, via the one or more display generation components (e.g., 702), the three-dimensional environment (e.g., 708) with a first set of visual characteristics (e.g., three-dimensional environment 708 in FIGS. 7B-7C) (e.g., opacity, brightness, contrast, focus, sharpness, and/or saturation); and subsequent to performing the first authentication of the user (e.g., FIGS. 7C-7D) (e.g., while displaying the second authentication user interface and/or while displaying the second user interface object), the computer system displays, via the one or more display generation components (e.g., 702), the three-dimensional environment (e.g., 708) with a second set of visual characteristics (e.g., opacity, brightness, contrast, focus, sharpness, and/or saturation) different from the first set of visual characteristics (e.g., three-dimensional environment 708 in FIGS. 7D-7J and/or 7O), wherein when the three-dimensional environment is displayed with the first set of visual characteristics, the three-dimensional environment is visually de-emphasized relative to when the three-dimensional environment is displayed with the second set of visual characteristics (e.g., the three-dimensional environment is darker, has less saturated color, has less sharpness, and/or is more blurry and/or out of focus when displayed with the first set of visual characteristics compared to when the three-dimensional environment is displayed with the second set of visual characteristics).

In some embodiments, while the three-dimensional environment is displayed with the first set of visual characteristics, the first user interface object is displayed with a third set of visual characteristics (e.g., opacity, brightness, contrast, focus, sharpness, and/or saturation) that causes the first user interface object to be visually emphasized relative to the three-dimensional environment (e.g., the first user interface object is displayed with greater brightness, contrast, color saturation, sharpness, and/or focus than the three-dimensional environment).

In some embodiments, the computer system is a head-mounted system, and the three-dimensional environment includes an optical passthrough environment (e.g., a real, physical environment) that is visible by the user through transparent display generation components (e.g., transparent optical lens display generation components). In some embodiments, displaying the three-dimensional environment with the first set of visual characteristics and/or with the second set of visual characteristics includes displaying and/or applying one or more visual filters and/or masks to the transparent display generation components such that the way the user views the passthrough three-dimensional environment is visually modified. In some embodiments, the computer system is a head-mounted system, and the three-dimensional environment includes a virtual passthrough environment (e.g., a virtual passthrough environment that is a virtual representation of the user's physical, real-world environment (e.g., as captured by one or more cameras that are in communication with the computer system)) that is displayed by one or more display generation components. In some embodiments, displaying the three-dimensional environment with the first set of visual characteristics and/or with the second set of visual characteristics includes displaying the virtual passthrough environment with one or more display settings (e.g., brightness, saturation, tint, sharpness, and/or focus) in order to modify and/or define one or more visual characteristics of the virtual passthrough environment.

Visually de-emphasizing the three-dimensional environment prior to performing the first authentication of the user and while displaying the first user interface object provides the user with improved visual feedback by indicating that the user should look at the first user interface object (rather than looking at the three-dimensional environment), thereby helping the user to provide proper inputs and reducing user mistakes when operating/interacting with the computer system.

In some embodiments, while displaying the first authentication user interface (e.g., FIG. 7B, 710), including displaying the first user interface object (e.g., 710) (e.g., while displaying the gaze target within the first authentication user interface): in accordance with a determination that one or more pupils of a user to be authenticated are dilated by a first amount, the computer system (e.g., 700) causes the one or more display generation components (e.g., 702) to output a first amount of light (e.g., displaying one or more elements of the first authentication user interface and/or displaying the three-dimensional environment at a brightness and/or with one or more visual characteristics (e.g., brightness, color, and/or hue) that correspond to the first amount of light, and/or displaying a set of content that collectively results in an overall brightness that corresponds to the first amount of light); and in accordance with a determination that the one or more pupils of the user of the computer system are dilated by a second amount different from the first amount (e.g., a second amount that is less than the first amount (e.g., less dilated than the first amount)), the computer system (e.g., 700) causes the one or more display generation components (e.g., 702) to output a second amount of light (e.g., displaying the one or more elements of the first authentication user interface and/or the three-dimensional environment at a brightness and/or with one or more visual characteristics (e.g., brightness, color, and/or hue) that correspond to the second amount of light, and/or displaying a set of content that collectively results in an overall brightness that corresponds to the second amount of light) (e.g., a second amount of light that is greater than the first amount of light (e.g., is brighter than the first amount of light) and/or a second amount of light that is less than the first amount of light (e.g., is dimmer than the first amount of light)).

In some embodiments, the computer system is a head-mounted system, and the three-dimensional environment includes an optical passthrough environment (e.g., a real, physical environment) that is visible by the user through transparent display generation components (e.g., transparent optical lens display generation components). In some embodiments, adjusting the amount of light output by the one or more display generation components includes adjusting one or more filters and/or masks applied to the one or more display generation components to adjust the amount of natural light (e.g., light that passes through the transparent display generation components rather than light that is output by and/or generated by the display generation components) that passes through the display generation components. In some embodiments, the computer system is a head-mounted system, and the three-dimensional environment includes a virtual passthrough environment (e.g., a virtual passthrough environment that is a virtual representation of the user's physical, real-world environment (e.g., as captured by one or more cameras that are in communication with the computer system)) that is displayed by one or more display generation components. In some embodiments, adjusting the amount of light output by the one or more display generation components includes adjusting one or more display settings of the virtual passthrough environment (e.g., brightness, saturation, tint, sharpness, and/or focus) in order to modify and/or define the amount of light that is output by and/or generated by the display generation components.

Adjusting the amount of light being shown to a user based on pupil dilation of the user enhances the operability of the computer system by helping the user to provide proper inputs and reducing user mistakes when operating/interacting with the device (e.g., by providing the appropriate amount of light and/or causing the appropriate amount of pupil dilation for accurate eye-based user authentication).

In some embodiments, causing the one or more display generation components to output the first amount of light includes displaying, via the one or more display generation components (e.g., 702), a first element (e.g., 710) of the first authentication user interface (e.g., user interface of FIG. 7B) at a first brightness; and causing the one or more display generation components to output the second amount of light includes displaying, via the one or more display generation components (e.g., 702), the first element (e.g., 710) of the first authentication user interface at a second brightness that is different from (e.g., brighter than or darker than) the first brightness. In some embodiments, causing the one or more display generation components to output the first amount of light further includes displaying, via the one or more display generation components, a second element of the first authentication user interface at a third brightness (e.g., concurrently displaying the first element at the first brightness and the second element at the third brightness); and causing the one or more display generation component to output the second amount of light further includes displaying, via the one or more display generation components, the second element of the first authentication user interface at a fourth brightness that is different from the third brightness (e.g., concurrently displaying the first element at the second brightness and the second element at the fourth brightness). Automatically adjusting the brightness of displayed user interface elements based on pupil dilation of the user enhances the operability of the computer system by helping the user to provide proper inputs and reducing user mistakes when operating/interacting with the device (e.g., by providing the appropriate amount of light and/or causing the appropriate amount of pupil dilation for accurate eye-based user authentication).

In some embodiments, causing the one or more display generation components (e.g., 702) to output the first amount of light includes displaying, via the one or more display generation components, the three-dimensional environment (e.g., 708) at a third brightness (e.g., causing a virtual three-dimensional environment to be displayed at the third brightness and/or causing a pass-through three-dimensional environment to be displayed at the third brightness level); and causing the one or more display generation components (e.g., 702) to output the second amount of light includes displaying, via the one or more display generation components, the three-dimensional environment (e.g., 708) at a fourth brightness that is different from (e.g., brighter than or darker than) the third brightness (e.g., causing a virtual three-dimensional environment to be displayed at the fourth brightness and/or causing a pass-through three-dimensional environment to be displayed at the fourth brightness level).

In some embodiments, the computer system is a head-mounted system, and the three-dimensional environment includes an optical passthrough environment (e.g., a real, physical environment) that is visible by the user through transparent display generation components (e.g., transparent optical lens display generation components). In some embodiments, displaying the three-dimensional environment at the third brightness and/or at the fourth brightness includes adjusting one or more filters and/or masks applied to the one or more display generation components to adjust the amount of natural light (e.g., light that passes through the transparent display generation components rather than light that is output by and/or generated by the display generation components) that passes through the display generation components. In some embodiments, the computer system is a head-mounted system, and the three-dimensional environment includes a virtual passthrough environment (e.g., a virtual passthrough environment that is a virtual representation of the user's physical, real-world environment (e.g., as captured by one or more cameras that are in communication with the computer system)) that is displayed by one or more display generation components. In some embodiments, displaying the three-dimensional environment at the third brightness and/or at the fourth brightness includes adjusting one or more display settings of the virtual passthrough environment (e.g., brightness, saturation, tint, sharpness, and/or focus) in order to modify and/or define the amount of light that is output by and/or generated by the display generation components.

Automatically adjusting the brightness of displayed user interface elements based on pupil dilation of the user enhances the operability of the computer system by helping the user to provide proper inputs and reducing user mistakes when operating/interacting with the device (e.g., by providing the appropriate amount of light and/or causing the appropriate amount of pupil dilation for accurate eye-based user authentication).

In some embodiments, the first user interface object (e.g., 710) is a viewpoint-locked object (e.g., FIGS. 7B-7C) that exhibits lazy follow behavior (e.g., behavior which reduces or delays motion of the first user interface object relative to detected physical movement of the user (e.g., relative to detected physical movement of the head of the user)). In some embodiments, the computer system displays, via the one or more display generation components, the first user interface object at a first position within the field of view of a user (e.g., at a first position on the one or more display generation components); while displaying the first user interface at the first position within the field of view of the user, the computer system detects, via the one or more input devices, movement by the user (e.g., movement of the head of the user, and/or movement of the eyes of the user); and in response to detecting the movement by the user, the computer system displays, via the one or more display generation components, the first user interface object at a second position within the field of view of the user that is different from the first position; and subsequent to displaying the first user interface object at the second position within the field of view of the user, displays, via the one or more display generation components, the first user interface object at the first position within the field of view of the user. In some embodiments, the computer system re-displays the first user interface object at the first position within the field of view of the user after a predetermined duration of time (e.g., a duration of time that is calculated and/or determined based on a predefined algorithm) after detecting the movement by the user. Displaying a first user interface that is a viewpoint-locked object that exhibits lazy follow behavior provides the user with visual feedback about the state of the system (e.g., that the system is intentionally moving the first user interface object as the head of the user moves), thereby providing improved visual feedback to the user.

In some embodiments, while displaying the second authentication user interface (e.g., 720-1, 720-2) at a first position within the three-dimensional environment (e.g., 708) (e.g., in an environment-locked manner and/or as an environment-locked object), the computer system detects, via the one or more input devices, movement by the user (e.g., movement of the head of the user (e.g., rotation of the head of the user)). In response to detecting the movement by the user: in accordance with a determination that the movement by the user satisfies movement threshold criteria (e.g., in accordance with a determination that the movement by the user shifts the viewpoint of the user by greater than a threshold amount (e.g., by greater than a threshold angle) and/or in accordance with a determination that the movement by the user causes the second authentication user interface to no longer be displayed within the field of view of the user), the computer system re-positions the second authentication user interface (e.g., 720-1, 720-2) to a second position within the three-dimensional environment (e.g., 708) different from the first position to center the second authentication user interface within the field of view of the user (e.g., displaying (e.g., re-displaying), via the one or more display generation components, the second authentication user interface at a center position within the field of view of the user (e.g., at a position on the one or more display generation components that corresponds to a center position within the field of view of the user)). In some embodiments, in response to detecting the movement by the user, and in accordance with a determination that the movement by the user does not satisfy the movement threshold criteria (e.g., in accordance with a determination that the movement by the user does not shift the viewpoint of the user by greater than the threshold angle and/or in accordance with a determination that the movement by the user does not cause the second authentication user interface to no longer be displayed within the field of view of the user), the computer system maintains the second authentication user interface (e.g., maintains display of the second authentication user interface) at the first position within the three-dimensional environment (e.g., does not change the position of the second authentication user interface within the three-dimensional environment). Re-centering the second authentication user interface when the user moves by a threshold amount provides the user with visual feedback about the state of the system (e.g., that the system is waiting for the user to interact with the second authentication user interface), thereby providing improved visual feedback to the user.

In some embodiments, while displaying the second authentication user interface (e.g., 720-1, 720-2), the computer system receives user authentication information based on one or more user inputs, including: detecting, via the one or more input devices, a user gaze (e.g., 712) corresponding to a first displayed element (e.g., 722A-722M) (e.g., a first virtual key of a plurality of virtual keys (e.g., a plurality of virtual keys in a virtual keyboard and/or number pad)) in the second authentication user interface (e.g., 720-1, 720-2) (e.g., detecting and/or determining that the user is gazing at the first displayed element in the second authentication user interface). While continuing to detect the user gaze (e.g., 712) corresponding to the first displayed element (e.g., 722A-722M) in the second authentication user interface (e.g., 720-1, 720-2), the computer system detects, via the one or more input devices (e.g., 704), a first pinch air gesture (e.g., two fingers (e.g., two fingers of one hand or two hands) moving from a first distance relative to one another to a second distance relative to one another, wherein the second distance is smaller than the first distance (in some embodiments, the second distance is smaller than a threshold distance (e.g., the two fingers are moved to a position that is sufficiently close to satisfy a distance threshold))) (e.g., a one-handed pinch air gesture or a two-handed pinch air gesture). In response to detecting the first pinch air gesture while continuing to detect the user gaze (e.g., 712) corresponding to the first displayed element (e.g., 722A-722M) in the second authentication user interface (e.g., 720-1, 720-2), the computer system receives first user authentication information corresponding to the first displayed element (e.g., entering a first character (e.g., letter and/or number) corresponding to the first displayed element as part of the user authentication information). In some embodiments, in response to receiving the first user authentication information corresponding to the first displayed element, the computer system displays, via the display generation component, an indication that the computer system has received the first user authentication information.

In some embodiments, receiving the user authentication information further includes: detecting, via the one or more input devices, a user gaze corresponding to a second displayed element (e.g., a second displayed element different from the first displayed element) (e.g., a second virtual key of a plurality of virtual keys (e.g., a plurality of virtual keys in a virtual keyboard and/or number pad)) in the second authentication user interface (e.g., detecting and/or determining that the user is gazing at the second displayed element in the second authentication user interface); while continuing to detect the user gaze corresponding to the second displayed element in the second authentication user interface, detecting, via the one or more input devices, a second pinch air gesture; and in response to detecting the second pinch air gesture while continuing to detect the user gaze corresponding to the second displayed element in the second authentication user interface, receiving second user authentication information corresponding to the second displayed element (e.g., entering a second character (e.g., letter and/or number) corresponding to the second displayed element as part of the user authentication information). In some embodiments, in response to receiving the second user authentication information corresponding to the second displayed element, the computer system displays, via the display generation component, an indication that the computer system has received the second user authentication information.

In some embodiments, the computer system repeatedly detects gaze and pinch gestures by a user selecting various displayed elements in the second authentication user interface, and receives corresponding user authentication information, until the user has completed entering a passcode and/or password (e.g., until the user has entered a threshold number of characters and/or until the user provides a user input indicating that the user has completed entering the passcode and/or password).

Allowing a user to enter authentication information by gazing and pinching enhances the operability of the computer system and makes user-device interfaces more efficient by providing additional control options without cluttering the user interface with additional displayed controls.

While displaying the second authentication user interface (e.g., 720-1, 720-2), the computer system (e.g., 700) receives user authentication information based on one or more user inputs, including: detecting, via the one or more input devices (e.g., 704), a first air gesture (e.g., a pinch air gesture and/or a tap air gesture) that corresponds to selection of a first displayed element (e.g., 722A-722M) in the second authentication user interface (e.g., 720-1, 720-2) (e.g., a first air gesture that has a directionality and/or position (e.g., three-dimensional position) that corresponds to the first displayed element). In response to detecting the first air gesture corresponding to selection of the first displayed element in the second authentication user interface, the computer system receives first user authentication information corresponding to the first displayed element (e.g., entering a first character (e.g., letter and/or number) corresponding to the first displayed element as part of the user authentication information). In some embodiments, in response to receiving the first user authentication information corresponding to the first displayed element, the computer system displays, via the display generation component, an indication that the computer system has received the first user authentication information.

In some embodiments, receiving the user authentication information further includes: detecting, via the one or more input devices, a second air gesture (e.g., a pinch air gesture and/or a tap air gesture) corresponding to selection of a second displayed element in the second authentication user (e.g., a second displayed element different from the first displayed element) (e.g., a second virtual key of a plurality of virtual keys (e.g., a plurality of virtual keys in a virtual keyboard and/or number pad)) (e.g., a second air gesture that has a directionality and/or position (e.g., three-dimensional position) that corresponds to the second displayed element); and in response to detecting the second air gesture corresponding to selection of the second displayed element in the second authentication user interface, receiving second user authentication information corresponding to the second displayed element (e.g., entering a second character (e.g., letter and/or number) corresponding to the second displayed element as part of the user authentication information). In some embodiments, in response to receiving the second user authentication information corresponding to the second displayed element, the computer system displays, via the display generation component, an indication that the computer system has received the second user authentication information.

In some embodiments, the computer system repeatedly detects air gestures by a user selecting various displayed elements in the second authentication user interface, and receives corresponding user authentication information, until the user has completed entering a passcode and/or password (e.g., until the user has entered a threshold number of characters and/or until the user provides a user input indicating that the user has completed entering the passcode and/or password).

Allowing a user to enter authentication information by performing one or more gestures enhances the operability of the computer system and makes user-device interfaces more efficient by providing additional control options without cluttering the user interface with additional displayed controls.

While displaying the second authentication user interface (e.g., 720-1, 720-2), the computer system (e.g., 700), detects, via the one or more input devices (e.g., 704), a user gaze (e.g., 712) corresponding to a first displayed element (e.g., 722A-722M) (e.g., a first virtual key of a plurality of virtual keys (e.g., a plurality of virtual keys in a virtual keyboard and/or number pad)) in the second authentication user interface (e.g., 720-1, 720-2) (e.g., detecting and/or determining that the user is gazing at the first displayed element in the second authentication user interface). In response to detecting the user gaze corresponding to the first displayed element, and in accordance with a determination that the user has gazed at the first displayed element for a threshold duration of time (e.g., continuously gazed at the first displayed element for the threshold duration of time), the computer system enters first user authentication information corresponding to the first displayed element (e.g., entering a first character (e.g., letter and/or number) corresponding to the first displayed element as part of the user authentication information) (in some embodiments, in response to entering the first user authentication information corresponding to the first displayed element, the computer system displays, via the display generation component, an indication that the computer system has entered the first user authentication information); and in accordance with a determination that the user has not gazed at the first displayed element for the threshold duration of time, the computer system forgoes entering the first user authentication information corresponding to the first displayed element.

In some embodiments, receiving the user authentication information further includes: detecting, via the one or more input devices, a user gaze (e.g., 712) corresponding to a second displayed element (e.g., 722A-722M) (e.g., a second displayed element different from the first displayed element) (e.g., a second virtual key of a plurality of virtual keys (e.g., a plurality of virtual keys in a virtual keyboard and/or number pad)) in the second authentication user interface (e.g., 720-1, 720-2) (e.g., detecting and/or determining that the user is gazing at the second displayed element in the second authentication user interface); determining that the user has gazed at the second displayed element for the threshold duration of time; and in response to determining that the user has gazed at the second displayed element for the threshold duration of time, entering second user authentication information corresponding to the second displayed element (e.g., entering a second character (e.g., letter and/or number) corresponding to the second displayed element as part of the user authentication information). In some embodiments, in response to entering the second user authentication information corresponding to the second displayed element, the computer system displays, via the display generation component, an indication that the computer system has received the second user authentication information.

In some embodiments, the computer system repeatedly detects gaze and dwell gestures by a user selecting various displayed elements in the second authentication user interface, and receives corresponding user authentication information, until the user has completed entering a passcode and/or password (e.g., until the user has entered a threshold number of characters and/or until the user provides a user input indicating that the user has completed entering the passcode and/or password).

Allowing a user to enter authentication information by gazing and dwelling enhances the operability of the computer system and makes user-device interfaces more efficient by providing additional control options without cluttering the user interface with additional displayed controls.

In some embodiments, while displaying the second authentication user interface (e.g., 720-1, 720-2), the computer system (e.g., 700) detects, via the one or more input devices (e.g., 704), a user input (e.g., a touch input, a non-touch input, an air gesture (e.g., a pinch air gesture and/or a tap air gesture) (e.g., a first air gesture that has a directionality and/or position (e.g., three-dimensional position) that corresponds to the first displayed element) and/or a user gaze corresponding to the first displayed element (e.g., a user gaze that dwells on the first displayed element for a threshold duration of time and/or a user gaze in combination with a gesture)) corresponding to selection of a first object (e.g., 722L) in the second authentication user interface (e.g., 720-1, 720-2) (e.g., a first object that is selectable to cause the computer system to attempt biometric authentication of the user (e.g., facial scan authentication, iris scan authentication, and/or fingerprint authentication)). In response to detecting the user input corresponding to selection of the first object (e.g., 722L) in the second authentication user interface (e.g., 720-1, 720-2), the computer system performs biometric authentication of the user (e.g., comparing biometric information collected from the user with one or more biometric profiles stored on and/or accessible to the computer system (e.g., one or more biometric profiles corresponding to one or more known and/or registered users)). Displaying a user interface object that is selectable by a user to cause the computer system to attempt biometric authentication of the user allows a user to request biometric authentication with minimal user input, thereby reducing the number of inputs needed to perform an operation.

In some embodiments, the second user interface object (e.g., 722A-722M) (e.g., the first object) includes a visual element that corresponds to the first user interface object (e.g., 710) (e.g., object 722L includes a glyph that corresponds to first user interface object 710) (e.g., the second user interface object (e.g., the first object) includes a glyph of the first user interface object). Displaying, within the second user interface object, a visual element that corresponds to the first user interface element provides visual feedback to the user that selecting the second user interface object will cause the computer system to re-attempt biometric authentication, thereby improving visual feedback to the user and helping the user to provide proper inputs.

In some embodiments, while displaying the second authentication user interface (e.g., 720-1, 720-2), the computer system (e.g., 700) detects, via the one or more input devices (e.g., 704), a user input (e.g., a touch input, a non-touch input, an air gesture (e.g., a pinch air gesture and/or a tap air gesture) (e.g., a first air gesture that has a directionality and/or position (e.g., three-dimensional position) that corresponds to the first displayed element) and/or a user gaze corresponding to the first displayed element (e.g., a user gaze that dwells on the first displayed element for a threshold duration of time and/or a user gaze in combination with a gesture)) corresponding to selection of a second object (e.g., 722M) in the second authentication user interface (e.g., 720-2) (e.g., a second object that is selectable to cause the computer system to enter a guest mode state in which a first set of features (e.g., a first set of content and/or functions) are made accessible to and/or are unlocked for the user without successful user authentication). In response to detecting the user input corresponding to selection of the second object (e.g., 722M) in the second authentication user interface (e.g., 720-2), the computer system transitions the computer system from a locked state to a guest mode state in which a first set of features are made accessible to the user without successful user authentication. In some embodiments, successful authentication of a user results in the computer system entering an unlocked state in which a second set of features (e.g., a second set of content and/or functions) are made accessible to (e.g., are unlocked for) the user, wherein the second set of features includes one or more features that are not included in the first set of features. In some embodiments, the first set of features represents a subset of the second set of features such that when the computer system is operated in the guest mode state, the user is provided with fewer features than would be provided in the unlocked state. Displaying a user interface object that is selectable by a user to cause the computer system to enter a guest mode state allows a user to enter the guest mode state with minimal user input, thereby reducing the number of inputs needed to perform an operation.

In some embodiments, subsequent to displaying the first authentication user interface (e.g., 710) in the three-dimensional environment (e.g., 708), (and, optionally, prior to performing the first authentication of the user) the computer system performs a second authentication of the user (e.g., a biometric authentication (e.g., comparing biometric information collected from the user with one or more biometric profiles stored on and/or accessible to the computer system (e.g., one or more biometric profiles corresponding to one or more known and/or registered users)) and/or a non-biometric authentication (e.g., authentication of a user without use of biometric information (e.g., password and/or passcode-based authentication))). In response to performing the second authentication of the user, and in accordance with the determination that the second authentication of the user fails to authenticate the user, the computer system (e.g., 700) displays, via the one or more display generation components (e.g., 702), visual guidance (e.g., 718) (e.g., textual guidance, non-textual guidance, video instructions, and/or animated instructions) instructing the user to change an eye gaze position of the user (e.g., instructing the user to look at a particular location (e.g., instructing the user to look at a gaze target (e.g., the first user interface object)) and/or instructing the user to not look at a particular location). Displaying the visual guidance instructing the user to change the eye gaze position of the user provides the user with visual feedback about the state of the system (e.g., that the second authentication of the user has failed to authenticate the user), thereby providing improved visual feedback to the user.

In some embodiments, subsequent to displaying the first authentication user interface (e.g., 710) in the three-dimensional environment (e.g., 708), (and, optionally, prior to performing the first authentication of the user) the computer system performs a second authentication of the user (e.g., a biometric authentication (e.g., comparing biometric information collected from the user with one or more biometric profiles stored on and/or accessible to the computer system (e.g., one or more biometric profiles corresponding to one or more known and/or registered users)) and/or a non-biometric authentication (e.g., authentication of a user without use of biometric information (e.g., password and/or passcode-based authentication))). In response to performing the second authentication of the user, and in accordance with the determination that the second authentication of the user fails to authenticate the user, the computer system (e.g., 700) displays, via the one or more display generation components (e.g., 702), visual guidance (e.g., 718) (e.g., textual guidance, non-textual guidance, video instructions, and/or animated instructions) instructing the user to change a physical position of the computer system (e.g., 700) (e.g., orientation and/or spatial position) relative to the body of the user (e.g., relative to a portion of the body of the user) (e.g., instructing the user to adjust the position of a head mounted unit on the head of the user); and in accordance with a determination that the second authentication of the user succeeds in authenticating the user, the computer system (e.g., 700) displays, via the one or more display generation components (e.g., 702), a success user interface (e.g., 714, 716) (e.g., different from the first authentication user interface and the second authentication user interface) indicative of successful authentication of the user. In some embodiments, in accordance with the determination that the second authentication of the user succeeds in authenticating the user, the computer system unlocks the computer system (e.g., transitions the computer system from a locked state to an unlocked state). Displaying the visual guidance instructing the user to change the physical position of the computer system relative to the body of the user provides the user with visual feedback about the state of the system (e.g., that the second authentication of the user has failed to authenticate the user), thereby providing improved visual feedback to the user.

In some embodiments, in response to performing the first authentication of the user (e.g., FIGS. 7C-7D), and in accordance with a determination that the first authentication of the user succeeds in authenticating the user (e.g., in accordance with a determination that biometric information collected from the user matches one or more biometric profiles stored on and/or accessible to the computer system (e.g., matches biometric information corresponding to one or more known and/or registered users); and/or in accordance with a determination that authentication information provided by (e.g., input by) the user matches authentication information for a known and/or registered user), and in accordance with a determination that the request to authenticate the user corresponds to a request to unlock the computer system (e.g., 700) (e.g., unlock the computer system from a state in which one or more features of the computer system and/or one or more sets of content are locked (e.g., inaccessible); and/or a state in which an authorized user is not logged into the computer system)): the computer system unlocks the computer system (e.g., FIGS. 7E-7F). In some embodiments, the computer system displays, via the one or more display generation components, a third user interface indicative of the computer system entering an unlocked state (e.g., a third user interface different from the first authentication user interface and the second authentication user interface) (e.g., a home user interface and/or a most recently viewed user interface while the computer system was in the unlocked state). In some embodiments, in accordance with a determination that the first authentication of the user fails to authenticate the user, and in accordance with a determination that the request to authenticate the user corresponds to a request to unlock the computer system, the computer system forgoes unlocking the computer system (e.g., maintains the computer system in a locked state). In accordance with a determination that the first authentication of the user succeeds in authenticating the user (e.g., in accordance with a determination that biometric information collected from the user matches one or more biometric profiles stored on and/or accessible to the computer system (e.g., matches biometric information corresponding to one or more known and/or registered users); and/or in accordance with a determination that authentication information provided by (e.g., input by) the user matches authentication information for a known and/or registered user), and in accordance with a determination that the request to authenticate a user corresponds to a request to authorize a secure operation (e.g., a secure transaction, a payment transaction, auto-fill of user login credentials (e.g., username and/or password), and/or confirmation of the identity of the user): the computer system authorizes the secure operation (e.g., FIGS. 7K-7M). In some embodiments, the computer system displays, via the one or more display generation components, a fourth user interface (e.g., a fourth user interface different from the first authentication user interface, the second authentication user interface, and the third user interface) indicative of the computer system transmitting secure information (e.g., payment information and/or personal information) to an external computer system as part of a transaction). In some embodiments, in accordance with a determination that the first authentication of the user fails in authenticating the user, and in accordance with a determination that the request to authenticate a user corresponds to a request to authorize a transaction, the computer system forgoes authorizing the transaction (e.g., denies the transaction and/or forgoes transmitting secure information for the transaction to an external device). Providing for biometric authentication of a user prior to unlocking the computer system and/or prior to authorizing a transaction prevents unauthorized users from accessing and/or transmitting sensitive information, thereby improving security.

In some embodiments, aspects/operations of methods 850, 1000, 1050, 1200, and/or 1400 may be interchanged, substituted, and/or added between these methods. For example, the first authentication of the user that is performed in method 800 is the first authentication of the user that is performed in method 850. For brevity, these details are not repeated here.

FIG. 8B is a flow diagram of an exemplary method 850 for user authentication, in accordance with some embodiments. In some embodiments, method 850 is performed at a computer system (e.g., 700) (e.g., computer system 101 in FIG. 1A) including one or more display generation components (e.g., 702) (e.g., display generation component 120 in FIGS. 1A, 3, and 4) (e.g., a heads-up display, a display, a touchscreen, a projector, etc.) and one or more input devices (e.g., 704) (e.g., one or more buttons, one or more eye movement trackers, one or more hand movement trackers, one or more cameras (e.g., a camera (e.g., color sensors, infrared sensors, and other depth-sensing cameras))). In some embodiments, the method 850 is governed by instructions that are stored in a non-transitory (or transitory) computer-readable storage medium and that are executed by one or more processors of a computer system, such as the one or more processors 202 of computer system 101 (e.g., control 110 in FIG. 1A). Some operations in method 850 are, optionally, combined and/or the order of some operations is, optionally, changed.

In some embodiments, while the computer system (e.g., 700) is in a locked state (852) (e.g., FIGS. 7A-7D) (e.g., a state in which one or more features of the computer system and/or one or more sets of content are locked (e.g., inaccessible); and/or a state in which an authorized user is not logged into the computer system), the computer system (e.g., 700) performs (854) a first authentication of a user (e.g., FIGS. 7C-7D) (e.g., a user that is wearing the computer system and/or one or more components of the computer system) (e.g., a biometric authentication (e.g., comparing biometric information collected from the user with one or more biometric profiles stored on and/or accessible to the computer system (e.g., one or more biometric profiles corresponding to one or more known and/or registered users)) and/or a non-biometric authentication (e.g., authentication of a user without use of biometric information (e.g., password and/or passcode-based authentication))). In response to performing the first authentication of the user (856) (e.g., FIGS. 7C-7D): in accordance with a determination that the first authentication of the user successfully authenticates the user (858) (e.g., in accordance with a determination that biometric information collected from the user matches one or more biometric profiles stored on and/or accessible to the computer system (e.g., matches a biometric profile corresponding to a known and/or registered user); and/or in accordance with a determination that authentication information provided by (e.g., input by) the user matches authentication information for a known and/or registered user), the computer system (e.g., 700) transitions (860) the computer system from the locked state to an unlocked state in which a first set of features (e.g., a first set of content and/or functions) are made accessible to (e.g., are unlocked for) the user (e.g., FIGS. 7D-7F); in accordance with a determination that the first authentication of the user fails to authenticate the user (e.g., in accordance with a determination that biometric information collected from the user does not match one or more biometric profiles stored on and/or accessible to the computer system (e.g., does not match biometric information corresponding to one or more known and/or registered users); and/or in accordance with a determination that authentication information provided by (e.g., input by) the user does not match authentication information for a known and/or registered user) and that a set of guest mode criteria are satisfied (862), the computer system displays (864), via the one or more display generation components (e.g., 702), a guest mode user interface object (e.g., 722M) that is selectable to cause the computer system to enter a guest mode state in which a second set of features (e.g., a second set of content and/or functions) different from the first set of features are made accessible to (e.g., are unlocked for) the user, wherein the first set of features includes one or more features that are not included in the second set of features (in some embodiments, the second set of features represents a subset of the first set of features such that when the computer system is operated in the guest mode state, the user is provided with fewer features than would be provided in the unlocked state); and in accordance with a determination that the first authentication of the user fails to authenticate the user and that the set of guest mode criteria are not satisfied (866), the computer system forgoes display (868) of the guest mode user interface object (e.g., FIGS. 7H-7I, user interface 720-1 does not include object 722M). In some embodiments, the computer system also forgoes transitioning the computer system from the locked state to the unlocked stated (e.g., maintains the computer system in the locked state while forgoing display of the guest mode user interface object). In some embodiments, forgoing display of the guest mode user interface object includes maintaining the computer system in the locked state in which both the first set of features and the second set of features remain inaccessible to the user.

In some embodiments, prior to performing the first authentication of the user, the computer system receives, via the one or more input devices, a request to authenticate the user (e.g., 706) (e.g., detecting that at least a portion of the computer system has been placed on a body of a respective user; and/or detecting one or more user inputs (e.g., one or more gestures, one or more touch-screen inputs, one or more button presses, and/or one or more rotations of a rotatable input mechanism) indicative of a request to authenticate a user) (in some embodiments, the request to authenticate a user corresponds to a request to grant access to (e.g., unlock) one or more features (e.g., one or more sets of content, one or more user interfaces, one or more files, and/or one or more applications) of the computer system), and performs the first authentication of the user in response to the request to authenticate the user (e.g., FIGS. 7B-7D).

In some embodiments, the computer system is in a locked state (e.g., FIGS. 7A-7B) or an unlocked state (e.g., FIG. 7F). In the locked state (e.g., FIGS. 7A-7B), the computer system is powered on and operational but is prevented from performing a predefined set of operations in response to user input. The predefined set of operations optionally includes navigation between user interfaces, activation or deactivation of a predefined set of functions, and activation or deactivation of certain applications. The locked state can be used to prevent unintentional or unauthorized use of some functionality of the computer system or activation or deactivation of some functions on the computer system. In some embodiments, in the unlocked state (e.g., FIG. 7F), the computer system is power on and operational and is not prevented from performing at least a portion of the predefined set of operations that cannot be performed while in the locked state. When the computer system is in the locked state, the computer system is said to be locked. In some embodiments, the computer system in the locked state optionally responds to a limited set of user inputs (e.g., user input 706, gaze indication 712, and/or user inputs interacting with user interface 720-1 and/or 720-2), including input that corresponds to an attempt to transition the computer system to the unlocked state or input that corresponds to powering the computer system off.

Forgoing displaying the guest mode user interface object if the set of guest mode criteria are not satisfied prevents unauthorized users from accessing sensitive data and/or features, thereby improving security. Displaying the guest mode user interface object if the first authentication of the user fails to authenticate user and a set of guest mode criteria are satisfied provides the user with visual feedback about the state of the device (e.g., that the first authentication of the user failed to authenticate the user and guest mode criteria are satisfied), thereby improving visual feedback to the user. Forgoing displaying the guest mode user interface object if the first authentication of the user fails to authenticate user and the set of guest mode criteria are not satisfied provides the user with visual feedback about the state of the device (e.g., that the first authentication of the user failed to authenticate the user and guest mode criteria are not satisfied), thereby improving visual feedback to the user.

In some embodiments, the set of guest mode criteria includes a criterion (e.g., a first criterion of one or more criteria) that is satisfied if a most recent user of the computer system (e.g., 700) other than the current user (e.g., the most recent user that used the computer system prior to the user) is an authorized user (e.g., is a user for which authentication was performed and the user was successfully authenticated by the computer system) (e.g., a user for which biometric information collected from the user matched one or more biometric profiles stored on and/or accessible to the computer system (e.g., matched a biometric profile corresponding to a known and/or registered user); and/or a user for which authentication information provided by (e.g., input by) the user matches authentication information for a known and/or registered user). Displaying the guest mode user interface object only if a most recent user of the computer system was an authorized user prevents unauthorized users from accessing sensitive data and/or features, thereby improving device security.

In some embodiments, the set of guest mode criteria includes a criterion (e.g., a first criterion of one or more criteria) that is satisfied if the computer system (e.g., 700) has been in the locked state (e.g., FIGS. 7A-7D) (e.g., has been continuously and/or uninterruptedly in the locked state) for less than a threshold duration of time since the last time the computer system was in an unlocked state (e.g., has been in the locked state for less than one minute, less than three minutes, less than five minutes, less than ten minutes, and/or less than fifteen minutes). Displaying the guest mode user interface object only if the computer system has been in the locked state for less than the threshold duration of time prevents unauthorized users from accessing sensitive data and/or features, thereby improving device security.

In some embodiments, prior to performing the first authentication of the user (e.g., FIGS. 7C-7D), while the computer system (e.g., 700) is in the unlocked state, the computer system detects, via the one or more input devices (e.g., 704), that an authorized user has ceased using the computer system (e.g., detecting that biometric continuity criteria are no longer satisfied and/or detecting that an authorized user has removed the computer system from his or her body); and in response to detecting that the authorized user has ceased using the computer system, the computer system transitions the computer system from the unlocked state to the locked state (e.g., FIGS. 7A-7D).

In some embodiments, detecting that an authorized user has ceased using the computer system includes detecting that biometric continuity criteria (e.g., biometric continuity criteria which were previously satisfied) are no longer satisfied. In some embodiments, the determination of whether biometric continuity criteria are satisfied is performed based on sensor measurements taken at a plurality of intermediate times between a first time and a second time, including sensor measurements taken at a first intermediate time and sensor measurements taken at a second intermediate time to determine whether the same user was using the computer system between the first time and the second time (e.g., determining that the same user has been continuously using the computer system includes determining that eye tracking continuity policy has not had a false result since the user previously performed a first level (e.g., complete or high-fidelity) iris features verification and/or fingerprint continuity policy has not had a false result since the user previously performed a first level (complete or high-fidelity) fingerprint verification). In some embodiments, the biometric continuity criteria between the first time and the second time includes a biometric continuity criterion that is met when a biometric feature (e.g., the user's eye, and/or the user's fingerprint) is repeatedly (e.g., continuously or periodically) detected between the first time and the second time (e.g., without determining that the biometric feature is not detected between the first time and the second time).

In some embodiments, the computer system is a head-mounted system, and detecting that the authorized user has ceased using the computer system comprises a determination that the authorized user has removed the computer system from his or her head.

Automatically transitioning the computer system from the unlocked state to the locked state when it is detected that the authorized user is no longer using the computer system prevents unauthorized users from accessing sensitive data and/or features, thereby improving device security.

In some embodiments, the set of guest mode criteria includes a criterion (e.g., a first criterion of one or more criteria) that is satisfied if a guest mode setting has been enabled by an authorized user (e.g., an authorized user has enabled the guest mode setting (e.g., within a settings user interface) while the computer system was in the unlocked state). Displaying the guest mode user interface object only if the guest mode setting has been enabled by an authorized user prevents unauthorized users from accessing sensitive data and/or features, thereby improving device security.

In some embodiments, the guest mode user interface object (e.g., 722M) is not displayed while performing the first authentication of the user (e.g., FIGS. 7C-7D); and the guest mode user interface object (e.g., 722M) is displayed in response to the determination that the first authentication of the user fails to authenticate the user and that the set of guest mode criteria are satisfied (e.g., FIGS. 7J and/or 7O). In some embodiments, the guest mode user interface object is displayed only after the first authentication of the user fails to authenticate the user. In some embodiments, in accordance with a determination that the first authentication of the user successfully authenticates the user, the computer system forgoes displaying the guest mode user interface object. Displaying the guest mode user interface object in response to the determination that the first authentication of the user fails to authenticate user and that the set of guest mode criteria are satisfied provides the user with visual feedback about the state of the device (e.g., that the first authentication of the user failed to authenticate the user and guest mode criteria are satisfied), thereby improving visual feedback to the user.

In some embodiments, in response to performing the first authentication of the user (e.g., FIGS. 7C-7D): in accordance with the determination that the first authentication of the user fails to authenticate the user and that the set of guest mode criteria are satisfied, the computer system (e.g., 700) displays, via the one or more display generation components (e.g., 702), a first passcode entry user interface (e.g., 720-1, 720-2), including displaying a plurality of passcode entry user interface elements (e.g., 722A-722M) that are selectable by a user (e.g., via one or more user inputs (e.g., one or more gesture and/or non-gesture inputs)) to enter user authentication information (e.g., passcode information, voice information, and/or one or more characters and/or strings), wherein the guest mode user interface object (e.g., 722M) is displayed as a user interface element within the first passcode entry user interface (e.g., 720-2, FIGS. 7J and/or 7O).

In some embodiments, in response to performing the first authentication of the user: in accordance with the determination that the first authentication of the user fails to authenticate the user and that the set of guest mode criteria are not satisfied, the computer system displays, via the one or more display generation components, a second passcode entry user interface different from the first passcode entry user interface, wherein the second passcode entry user interface includes a plurality of passcode entry user interface elements that are selectable by a user to enter user authentication information, and does not include the guest mode user interface object.

In some embodiments, while displaying the first passcode entry user interface, the computer system receives user authentication information based on one or more user inputs, including: detecting, via the one or more input devices, a first user input that corresponds to selection of a first displayed element (e.g., 722A-722M) in the first passcode entry user interface (e.g., 720-1, 720-2) (e.g., a touch input, a non-touch input, an air gesture (e.g., a pinch air gesture and/or a tap air gesture) (e.g., a first air gesture that has a directionality and/or position (e.g., three-dimensional position) that corresponds to the first displayed element) and/or a user gaze corresponding to the first displayed element (e.g., a user gaze that dwells on the first displayed element for a threshold duration of time and/or a user gaze in combination with a gesture)); and in response to detecting the first user input that corresponds to selection of the first displayed element in the first passcode entry user interface, the computer system receives first user authentication information corresponding to the first displayed element (e.g., entering a first character (e.g., letter and/or number) corresponding to the first displayed element as part of the user authentication information) (in some embodiments, in response to receiving the first user authentication information corresponding to the first displayed element, the computer system displays, via the display generation component, an indication that the computer system has received the first user authentication information).

In some embodiments, receiving the user authentication information includes receiving multiple user inputs corresponding to a plurality of selections of one or more displayed elements (e.g., 722A-722M) in the first passcode entry user interface (e.g., 720-1, 720-2) and receiving corresponding authentication information until a user has completed entering a passcode and/or password.

Displaying the first passcode entry user interface in response to the determination that the first authentication of the user fails to authenticate user and that the set of guest mode criteria are satisfied provides the user with visual feedback about the state of the device (e.g., that the first authentication of the user failed to authenticate the user and guest mode criteria are satisfied), thereby improving visual feedback to the user. Displaying the guest mode user interface object allows a user to cause the computer system to enter the guest mode state with minimal user input, thereby reducing the number of inputs needed to perform an operation.

In some embodiments, the unlocked state (e.g., FIG. 7F) includes access to a first set of applications (e.g., when the computer system is operating in the unlocked state, the user is able to access and/or is provided access to a first set of applications); and the guest mode state includes access to a second set of applications (e.g., when the computer system is in the guest mode state, a user is able to access and/or is provided access to a second set of applications) different from the first set of applications, wherein the second set of applications that are accessible in the guest mode excludes one or more applications that are included in the first set of applications that are accessible in the unlocked state. In some embodiments, the second set of applications represents a subset of the first set of applications such that when the computer system is operated in the guest mode, the user is provided with access to fewer applications than would be provided in the unlocked state. In some embodiments, the guest mode state restricts access to the first set of applications (e.g., provides limited access or no access to the first set of applications). Limiting access to certain applications when the computer system is operating in the guest mode state prevents unauthorized users from accessing sensitive data, thereby improving device security.

In some embodiments, the unlocked state (e.g., FIG. 7F) includes access to a first set of content (e.g., file directories, media items, photo albums, browsing history, and/or user contacts) (e.g., when the computer system is operating in the unlocked state, the user is able to access and/or is provided access to a first set of content); and the guest mode state includes access to a second set of content (e.g., when the computer system is in the guest mode state, a user is able to access and/or is provided access to a second set of content) different from the first set of content, wherein the second set of content that is accessible in the guest mode excludes content that is included in the first set of content that is accessible in the unlocked state. In some embodiments, the second set of content represents a subset of the first set of content such that when the computer system is operated in the guest mode, the user is provided with access to less content than would be provided in the unlocked state. Limiting access to certain content when the computer system is operating in the guest mode state prevents unauthorized users from accessing sensitive data, thereby improving device security.

In some embodiments, the computer system (e.g., 700) receives, via the one or more input devices (e.g., 702, 704), one or more user inputs (e.g., one or more gesture inputs, one or more non-gesture inputs, and/or one or more gaze-based inputs) corresponding to a request to navigate to a respective user interface (e.g., a request to navigate to a first user interface and/or a request to view and/or display first content); and in response to receiving the one or more user inputs: in accordance with a determination that the one or more user inputs were received while the computer system is in the unlocked state (e.g., FIG. 7F), the computer system navigates to the respective user interface; and in accordance with a determination that the one or more user inputs were received while the computer system is in the guest mode state, the computer system forgoes navigating to the respective user interface (e.g., and maintains display of a currently displayed user interface or displays an error indicating that navigation to the respective user interface is not allowed). Limiting access to certain content when the computer system is operating in the guest mode state prevents unauthorized users from accessing sensitive data, thereby improving device security.

In some embodiments, the one or more user inputs correspond to a request to navigate to a home screen user interface (e.g., 716) (e.g., a user interface that includes representations of a plurality of applications that are selectable by a user to open a respective application); navigating to the respective user interface includes displaying, via the one or more display generation components, the home screen user interface; and forgoing navigation to the respective user interface includes forgoing display of the home screen user interface. Prohibiting navigation to a home screen user interface when the computer system is operating in the guest mode state prevents unauthorized users from accessing sensitive data, thereby improving device security.

In some embodiments, the one or more user inputs correspond to a request to navigate from a first application to a second application different from the first application (e.g., in FIG. 7J-1, selection of option 707*d* corresponds to a request to navigate from the media player application to an operating system application (e.g., that displays home screen user interface 716); and/or selection of option 707*e* corresponds to a request to navigate from a media player application to a messenger application) (e.g., navigate from a first user interface corresponding to (e.g., generated by and/or displayed by) the first application to a second user interface corresponding to (e.g., generated by and/or displayed by) the second application); navigating to the respective user interface includes transitioning from displaying the first application (e.g., media player user interface 705) to displaying the second application (e.g., in FIG. 7J-1, if electronic device 700 was in the unlocked state, selection of object 707*c* results in transitioning from media player user interface 705 to an operating system application; and/or selection of object 707*e* results in transitioning from media player user interface 705 to a messenger application) (e.g., transitioning from displaying a first user interface corresponding to (e.g., generated by and/or displayed by) the first application to displaying a second user interface corresponding to (e.g., generated by and/or displayed by) the second application); and forgoing navigating to the respective user interface includes forgoing display of the second application (e.g., selection of object 707*c* in FIG. 7J-1 while electronic device 700 is in the guest mode state does not result in display of the operating system application; and/or selection of object 707*e* in FIG. 7J-1 while electronic device 700 is in the guest mode state does not result in display of the messenger application) (e.g., forgoing display of a user interface corresponding to (e.g., generated by and/or displayed by) the second application) (and, optionally, in some embodiments, maintaining display of a first user interface corresponding to (e.g., generated by and/or displayed by) the first application and/or displaying an indication that navigating to the second application is not allowed). Prohibiting navigation from a first application to a second application when the computer system is operating in the guest mode state prevents unauthorized users from accessing sensitive data, thereby improving device security.

In some embodiments, the one or more user inputs correspond to a request to navigate from a first user interface (e.g., 705) corresponding to (e.g., generated by and/or displayed by) a first application (e.g., a media player application) to a second user interface corresponding to the first application (e.g., selection of object 707*c* corresponds to a request to view additional media items (e.g., a folder of media items) within the media player application), wherein the second user interface is different from the first user interface (e.g., accessing different content within the same application); navigating to the respective user interface includes transitioning from displaying the first user interface to displaying the second user interface (e.g., selection of object 707*c*, when electronic device 700 is in the unlocked state, causes electronic device 700 to cease display of media player user interface 705 and display a folder user interface with one or more additional content items); and forgoing navigating to the respective user interface includes forgoing display of the second user interface (e.g., selection of object 707*c*, when electronic device 700 is in the guest mode state, does not cause electronic device 700 to display a folder user interface) (and, optionally, in some embodiments, maintaining display of a first user interface and/or displaying an indication that navigating to the second application is not allowed). Prohibiting navigation from a first user interface to a second user interface within a first application when the computer system is operating in the guest mode state prevents unauthorized users from accessing sensitive data, thereby improving device security.

In some embodiments, the first user interface is positioned in a first hierarchy level of the first application (e.g., media player user interface 705 is positioned in a first hierarchy level of a media player application; and/or displays video content 709 that is contained within a folder of the media player application) (e.g., a first folder of a file browser application; a first album of a photo album application; and/or a first section of an application); and the second user interface is positioned in a second hierarchy level of the first application different from the first hierarchy level (e.g., a folder user interface that includes a plurality of content items, including video content 709) (e.g., a second folder of the file browser application; a second album of the photo album application; and/or a second section of the application). In some embodiments, the second hierarchy level is at a level that is higher than and/or above the first hierarchy level, and the first hierarchy level is contained within the second hierarchy level. For example, in some embodiments, the first hierarchy level includes a first folder and/or a first set of content, and the second hierarchy includes a second folder and/or a second set of content. In some such embodiments, the second folder includes the first folder (e.g., the first folder is contained within the second folder) and/or the second set of content includes the first set of content (e.g., the first set of content is contained within the second set of content). Prohibiting navigation from a first user interface to a second user interface within a first application when the computer system is operating in the guest mode state prevents unauthorized users from accessing sensitive data, thereby improving device security.

In some embodiments, the first user interface includes (e.g., displays) a first set of content (e.g., video content 709) (e.g., file directories, media items, photo albums, photos, videos, documents, browsing history, and/or user contacts); and the second user interface (e.g., a folder user interface that includes a plurality of content items, including video content 709) includes (e.g., displays) a second set of content different from the first set of content. Prohibiting access to certain content within a first application when the computer system is operating in the guest mode state prevents unauthorized users from accessing sensitive data, thereby improving device security.

In some embodiments, the computer system (e.g., 700) receives, via the one or more input devices (e.g., 704), one or more user inputs (e.g., one or more gesture inputs, one or more non-gesture inputs, and/or one or more gaze-based inputs) corresponding to a request to use a first feature (e.g., making calls, sending messages, and/or making payments (e.g., transmitting payment information)); and in accordance with a determination that the one or more user inputs were received while the computer system is in the unlocked state (e.g., FIG. 7F), the computer system provides access to the first feature (e.g., displaying a user interface corresponding to the first feature and/or performing an action corresponding to the first feature); and in accordance with a determination that the one or more user inputs were received while the computer system is in the guest mode state, the computer system forgoes providing access to the first feature (e.g., and maintains display of a currently displayed user interface and/or displays an error indicating that navigation to the respective user interface is not allowed).

In some embodiments, the unlocked state includes access to a first set of system features (e.g., making calls, sending messages, and/or making payments (e.g., transmitting payment information)) (e.g., when the computer system is operating in the unlocked state, the user is able to access and/or is provided access to a first set of system features); and the guest mode state includes access to a second set of system features (e.g., when the computer system is in the guest mode state, a user is able to access and/or is provided access to a second set of system features) different from the first set of system features, wherein the first set of system features includes system features that are not included in the second set of system features.

In some embodiments, the second set of system features represents a subset of the first set of system features such that when the computer system is operated in the guest mode, the user is provided with access to fewer system features than would be provided in the unlocked state.

Limiting access to certain system features when the computer system is operating in the guest mode state prevents unauthorized users from accessing sensitive data and/or features, thereby improving device security.

In some embodiments, while the computer system (e.g., 700) is operating in the guest mode state (in some embodiments, in accordance with a determination that the computer system is operating in the guest mode state), the computer system detects user activity information indicative of user activity on the computer system (e.g., receiving information pertaining to content being viewed by a user, and/or receiving information pertaining to one or more user inputs by the user); and the computer system transmits the user activity information to an external device (e.g., a computer system, a smart phone, a smart watch, a tablet, a wearable device, and/or a head-mounted device) (e.g., an external device that is in communication with one or more display generation components and/or one or more input devices) that is associated with (e.g., corresponds to and/or is logged into by) an authorized user of the computer system.

In some embodiments, the computer system does not transmit the user activity information to the external device that is associated with the authorized user of the computer system if the computer system is not operating in the guest mode state (e.g., if the computer system is operating in the locked state and/or the unlocked state). In some embodiments, the computer system displays, via the one or more display generation components, an indication to the user that user activity information is being transmitted to an external device. Transmitting user activity information to an external device that is associated with an authorized user of the computer system when the computer system is operating in the guest mode state prevents unauthorized users from accessing sensitive data and/or features, thereby improving device security.

In some embodiments, the user activity information includes visual content displayed on the computer system. In some embodiments, the visual content displayed on the computer system is displayed at the external device. In some embodiments, the visual content is displayed at the external device while the visual content is displayed by the computer system. In some embodiments, the visual content displayed at the external device changes over time as visual content displayed by the computer system changes. Causing visual content that is displayed by the computer system to also be displayed by an external device that is associated with an authorized user of the computer system when the computer system is operating in the guest mode state prevents unauthorized users from accessing sensitive data and/or features, thereby improving device security.

In some embodiments, while displaying the guest mode user interface object (e.g., 722M), the computer system detects, via the one or more input devices (e.g., 704), a user input (e.g., a touch input, a non-touch input, an air gesture (e.g., a pinch air gesture and/or a tap air gesture) (e.g., a first air gesture that has a directionality and/or position (e.g., three-dimensional position) that corresponds to the first displayed element) and/or a user gaze corresponding to the first displayed element (e.g., a user gaze that dwells on the first displayed element for a threshold duration of time and/or a user gaze in combination with a gesture)) corresponding to selection of the guest mode user interface object (e.g., 722M). In response to detecting the user input corresponding to selection of the guest mode user interface object (e.g., 722M), the computer system transitions the computer system (e.g., 700) from the locked state to the guest mode state in which the second set of features (e.g., a second set of content and/or functions) different from the first set of features are made accessible to (e.g., are unlocked for) the user, wherein the first set of features includes one or more features that are not included in the second set of features. In some embodiments, the second set of features represents a subset of the first set of features such that when the computer system is operated in the guest mode state, the user is provided with fewer features than would be provided in the unlocked state. In some embodiments, in response to detecting the user input corresponding to selection of the guest mode user interface object, the computer system displays a guest mode user interface indicative of the computer system entering and/or operating in the guest mode. Limiting access to certain system features when the computer system is operating in the guest mode state prevents unauthorized users from accessing sensitive data and/or features, thereby improving device security.

In some embodiments, aspects/operations of methods 800, 1000, 1050, 1200, and/or 1400 may be interchanged, substituted, and/or added between these methods. For example, the first authentication of the user performed in method 850 is the first authentication of the user performed in method 800. For brevity, these details are not repeated here.

FIGS. 9A-9M illustrate examples of enrolling and managing personalized accessories of one or more users of a computer system. FIG. 10A is a flow diagram of an exemplary method 1000 for enrolling personalized accessories of one or more users of a computer system. FIG. 10B is a flow diagram of an exemplary method 1050 for managing personalized accessories of one or more users of a computer system. The user interfaces in FIGS. 9A-9M are used to illustrate the processes described below, including the processes in FIGS. 10A and 10B.

Figure 9A:
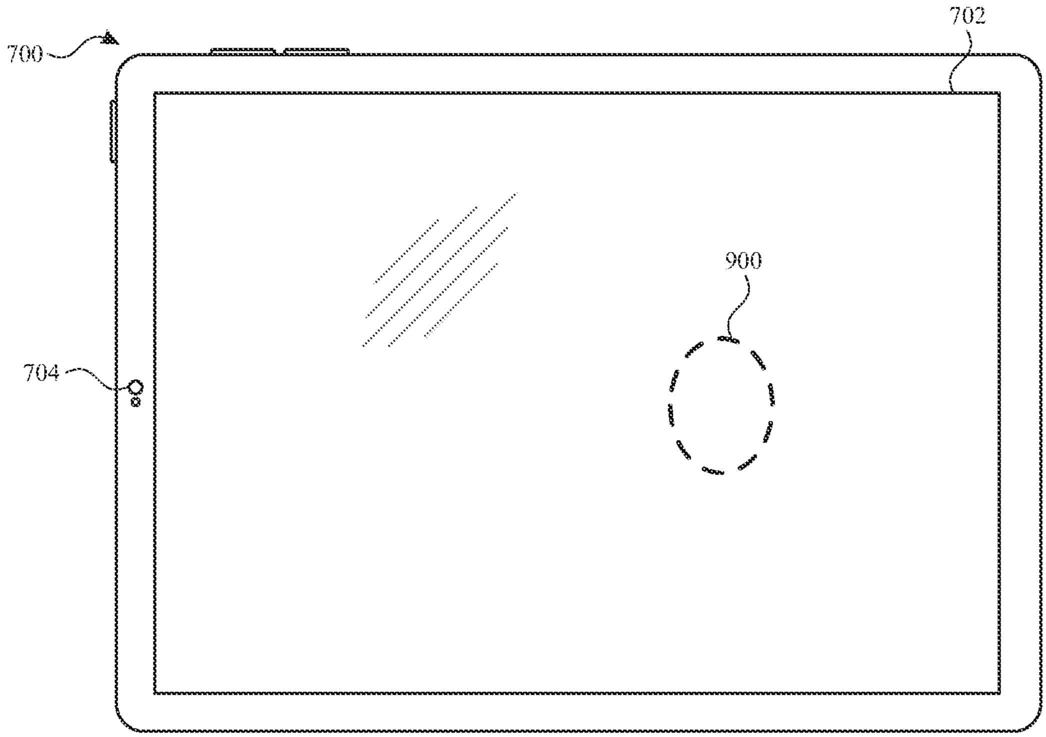
FIGS. 9A-9M illustrate example techniques for enrolling and managing personalized accessories of one or more users of a computer system, in accordance with some embodiments.
Figure 10A:
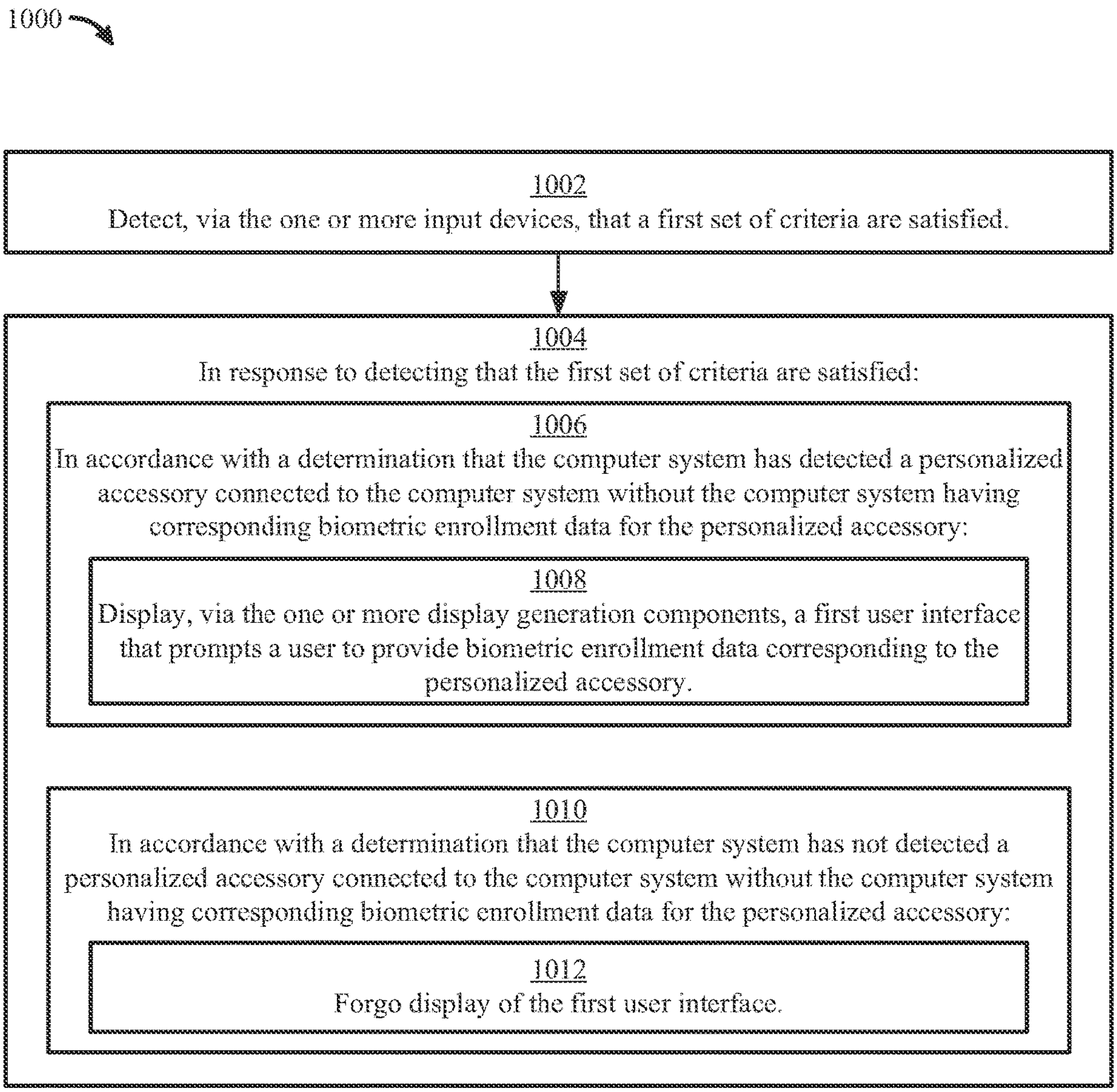
FIG. 10A is a flow diagram of methods of enrolling personalized accessories of one or more users of a computer system, in accordance with various embodiments.

FIG. 9A depicts electronic device 700, which is a tablet that includes touch-sensitive display 702, and one or more input sensors 704 (e.g., one or more cameras, eye gaze trackers, hand movement trackers, and/or head movement trackers). In some embodiments described below, electronic device 700 is a tablet. In some embodiments, electronic device 700 is a smart phone, a wearable device, a wearable smartwatch device, a head-mounted system (e.g., a headset), or other computer system that includes and/or is in communication with one or more display devices (e.g., display screen, projection device, or the like). Electronic device 700 is a computer system (e.g., computer system 101 in FIG. 1A).

In the examples described herein, electronic device 700 is configured to be connected to one or more personalized accessories for users. Personalized accessories include, for example, optical lenses (e.g., prescription optical lenses, corrective lenses 11.3.2-216, or non-prescription optical lenses) or personalized displays. For example, in FIGS. 9A-9M, the personalized accessory can include an optical display overlay (e.g., prescription optical lens, corrective lenses 11.3.2-216, or non-prescription optical lens) that is overlaid on display 702 (e.g., placed between the user's eye(s) and display 702) to enable a user to more clearly view content displayed on display 702 without wearing their prescription glasses or contact lenses. As described above, in some embodiments, electronic device 700 is a head-mounted system. In certain embodiments, users that wear prescription glasses or contact lenses may need prescriptions lenses inserted into the head-mounted system in order to better view content displayed by the head-mounted system. Furthermore, as described above, the head-mounted system, in some embodiments, utilizes user eye movements (e.g., gaze tracking) for user inputs and/or utilizes eye scans for biometric authentication (e.g., eye-based authentication).

However, insertion of prescription optical lenses into the head-mounted system can affect the accuracy and efficacy of gaze tracking and/or eye-based authentication unless the system is properly calibrated for the inserted prescription optical lenses. Accordingly, in some embodiments, electronic device 700 maintains biometric enrollment data corresponding to a specific personalized accessory (e.g., corresponding to a specific optical lens), such as gaze tracking enrollment data, and eye-based biometric authentication enrollment data, to ensure that electronic device 700 can accurately perform gaze tracking and eye-based authentication when the personalized accessory is attached. For example, in some embodiments, gaze tracking enrollment data includes a gaze tracking calibration profile for the personalized accessory to ensure that electronic device 700 accurately tracks a user's gaze while the personalized accessory is attached. And in another example, eye-based biometric authentication enrollment data includes one or more scans of the user's eyes taken while the personalized accessory is attached to ensure that electronic device 700 can accurately perform eye-based biometric authentication of the user while the personalized accessory is attached. Further embodiments and examples are described in greater detail below.

At FIG. 9A, electronic device 700 is in an inactive, low power, or sleep state, in which content is not displayed via display 702. At FIG. 9A, electronic device 700 detects user input 900. In the depicted embodiment, user input 900 is a touch input via touch-screen display 702. However, in some embodiments, user input 900 includes non-touch inputs, such as a gesture or other action taken by a user. For example, in some embodiments, electronic device 700 is a head-mounted system, and user input 900 includes, for example, a user putting electronic device 700 on his or her head, performing a gesture while wearing electronic device 700, and/or pressing a button while wearing electronic device 700.

Figure 9B:
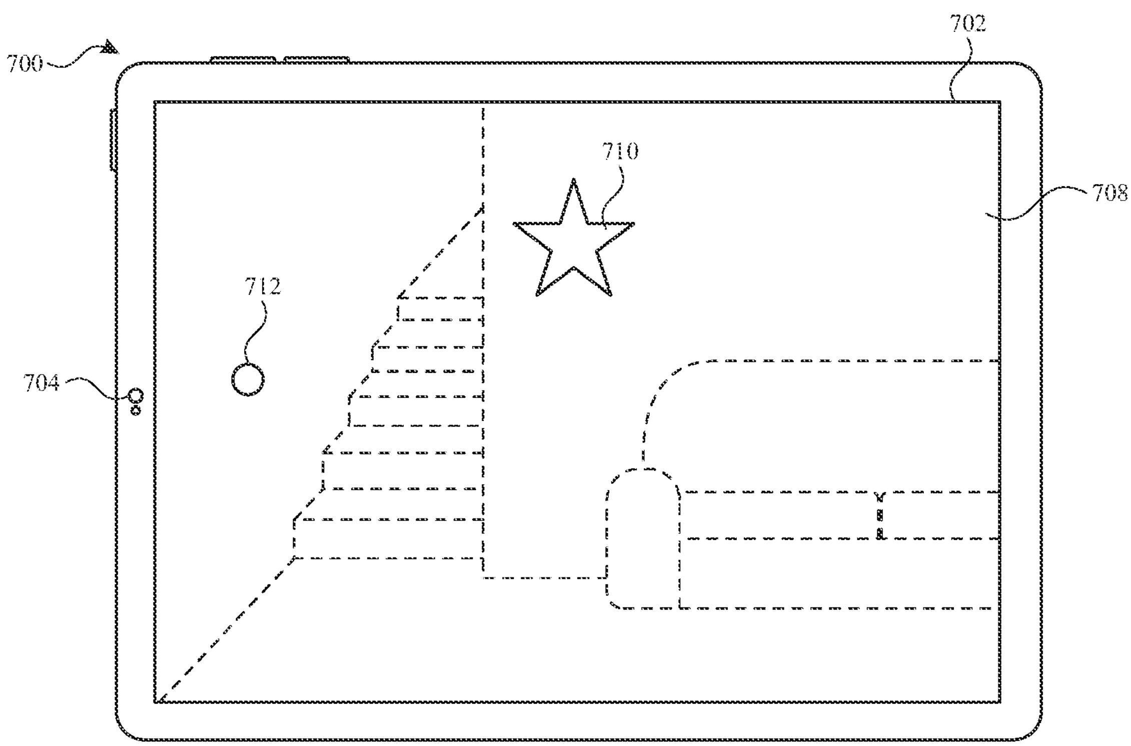

FIG. 9B depicts a first scenario in which electronic device 700, at the time of user input 900, does not detect any personalized accessories that are attached to electronic device 700 for which electronic device 700 does not have corresponding biometric enrollment data. For example, in some scenarios, this determination includes electronic device 700 detecting that there are no personalized accessories attached to electronic device 700. In other scenarios, this determination includes electronic device 700 detecting that there is a personalized accessory attached to electronic device 700, but also determining that electronic device 700 already has biometric enrollment data corresponding to the attached personalized accessory. In FIG. 9B, in response to the determination that there are not personalized accessories attached to electronic device 700 for which electronic device 700 does not have corresponding biometric enrollment data, electronic device 700 attempts biometric authentication of the user by displaying gaze target 710 overlaid on three-dimensional environment 708, as was discussed above with reference to FIGS. 7A-7N. As discussed above, if biometric authentication of the user is successful, electronic device 700 transitions from a locked state to an unlocked state.

Figure 9C:
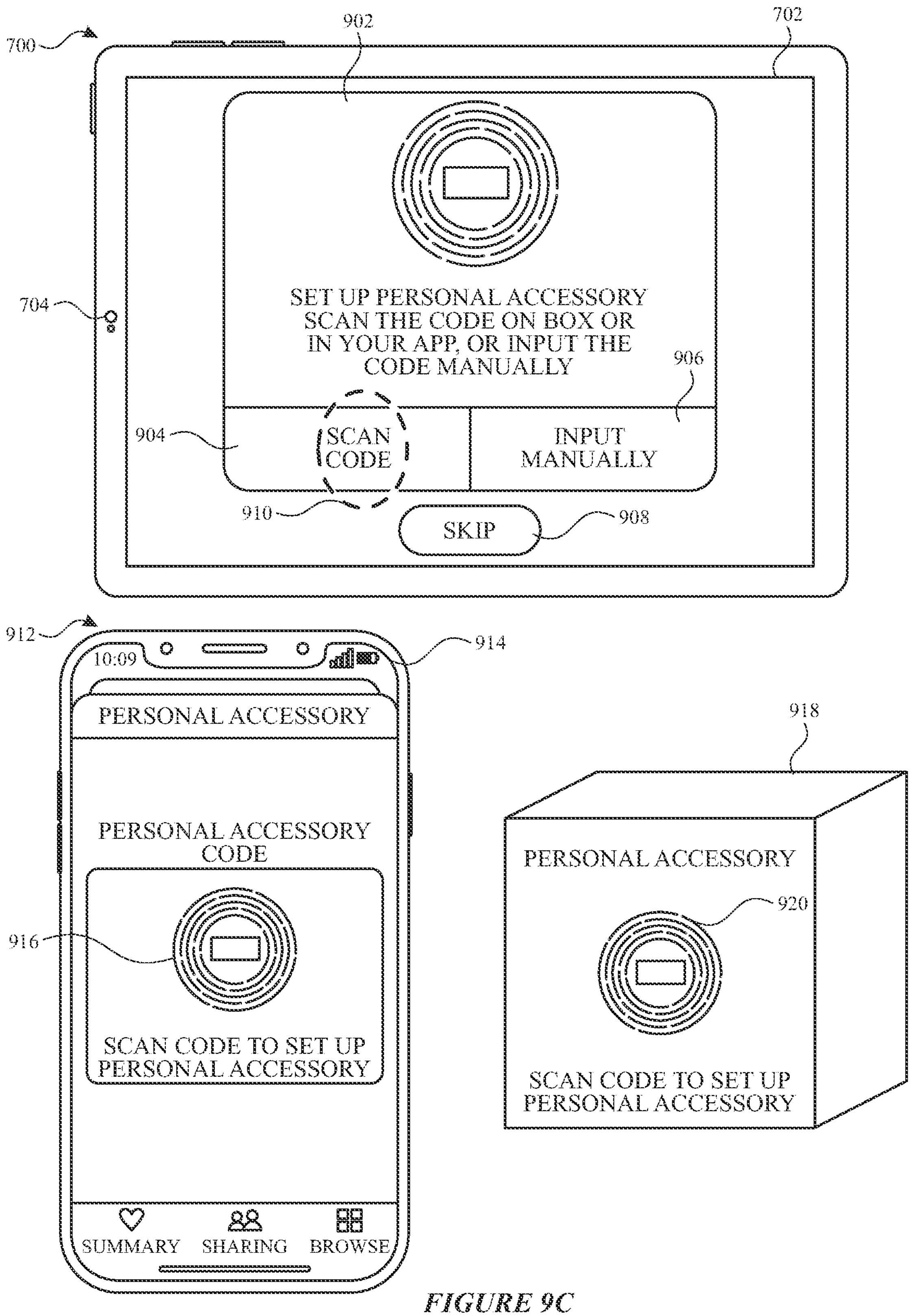

FIG. 9C depicts a second scenario in which electronic device 700, at the time of user input 900, detects a personalized accessory attached to electronic device 700 (e.g., an optical prescription display overlay overlaid on display 702 and/or prescription optical lenses) for which electronic device 700 does not have corresponding biometric enrollment data. In FIG. 9C, in response to this determination, electronic device 700 displays, via display 702, setup user interface 902, which instructs the user to set up the attached personalized accessory (e.g., by performing one or more biometric enrollment steps for the attached personalized accessory). Setup user interface 902 includes selectable option 904, selectable option 906, and selectable option 908. In the depicted embodiment, option 904 is selectable by a user to initiate a process for scanning a code (e.g., using a camera that is connected to and/or integrated with electronic device 700) corresponding to the personalized accessory, and option 906 is selectable by a user to initiate a process for manually entering the product code. Option 908 is selectable by a user to skip biometric enrollment for the attached personalized accessory, and use the attached personalized accessory without setting up the personalized accessory (e.g., without providing biometric enrollment data corresponding to the personalized accessory).

In FIG. 9C, companion device 912 is a smart phone that includes touch-screen display 914. In some embodiments, companion device 912 is a tablet, a wearable device, a wearable smartwatch device, or other computer system that includes and/or is in communication with one or more display devices. Companion device 912 displays, via display 914, code 916 that corresponds to the attached personalized accessory (e.g., uniquely identifies the attached personalized accessory and/or identifies one or more characteristics of the attached personalized accessory). In some embodiments, companion device 912 displays code 916 in accordance with a determination that electronic device 700 is within a threshold distance of companion device 912 and is attempting to set up (e.g., perform biometric enrollment steps) for a personalized accessory for which companion device 912 has relevant information. Similarly, product packaging 918 also includes code 920 that corresponds to the attached personalized accessory. In some embodiments, code 920 is the same as 916 with the exception that code 920 is printed on the side of product packaging 918 and code 916 is displayed via display 914.

At FIG. 9C, electronic device 700 detects user input 910 corresponding to selection of selectable option 904. In FIG. 9C, user input 910 is a touch input. In some embodiments, such as when electronic device 700 is a head-mounted system, user input 910 is a non-touch input, a gesture input, an air gesture input, and/or a gaze-based input.

Figure 9D:
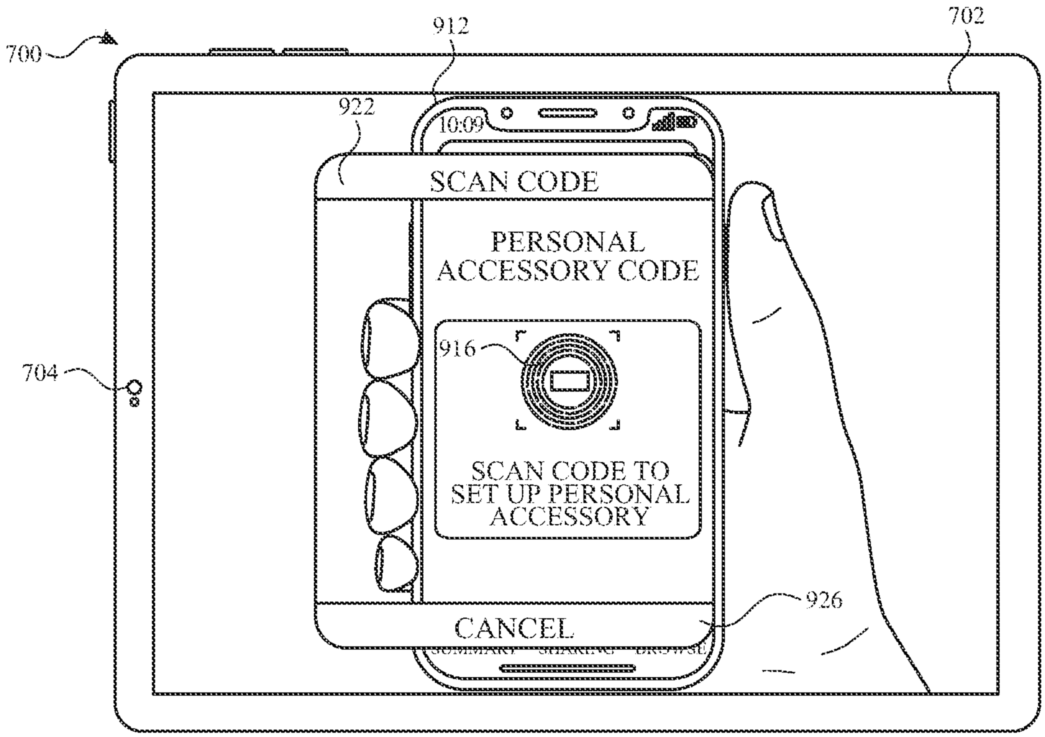

At FIG. 9D, in response to user input 910, electronic device 700 displays, via display 702, code scanning user interface 922, and activates a camera of electronic device 700 so that the user can scan code 916 or 920 using the camera. Code scanning user interface 922 displays content within view of the camera, and in FIG. 9D, code scanning user interface 922 shows that the camera views the user's hand holding companion device 912, and code 916 displayed on companion device 912. Code scanning user interface 922 includes selectable option 926 that is selectable to caused electronic device 700 to de-activate the camera, cease displaying code scanning user interface 922, and cancel setup of the attached personalized accessory.

In FIG. 9D, electronic device 700 is a tablet, and code scanning user interface 922 is displayed on display 702 of the tablet, and the user scans code 916 by pointing a camera of electronic device 700 toward code 916. In some embodiments, electronic device 700 is a head-mounted system. In some such embodiments, code scanning user interface 922 is displayed on a display that is worn on the user's head. Furthermore, in some such embodiments, the head-mounted system includes one or more cameras that are worn on the user's head, and point forward from the user's head, and the user scans code 916 by turning his or her face towards code 916 and looking at code 916, so that the one or more cameras worn on the user's head are able to capture code 916.

Figure 9E:
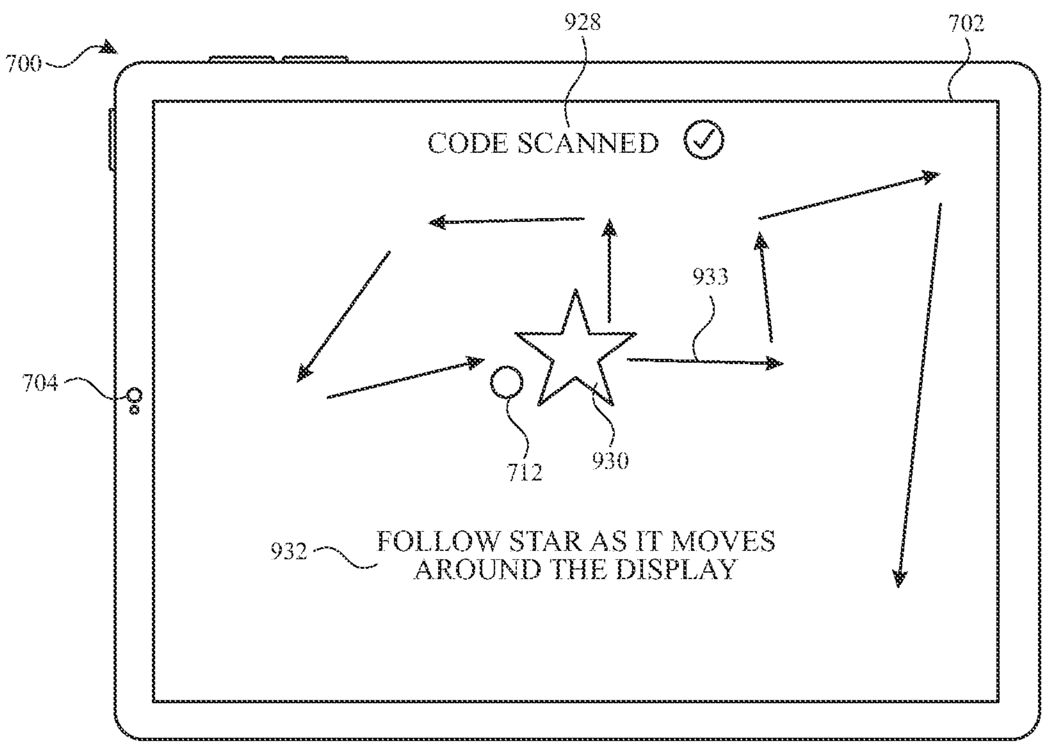

At FIG. 9D, electronic device 700 detects code 916. In FIG. 9E, in response to detecting code 916, electronic device 700 displays, via display 702, indication 928 indicating that electronic device 700 has scanned code 916. Additionally, in response to detecting code 916, electronic device 700 initiates gaze tracking biometric enrollment corresponding to the attached personalized accessory by displaying gaze target 930 and instruction 932, which instructs the user to follow gaze target 930 with the user's eyes while gaze target 930 moves around the display (e.g., as indicated by arrows 933). In the depicted embodiment, electronic device 700 performs gaze tracking biometric enrollment by scanning the eyes of the user as the users tracks moving gaze target 930. Electronic device 700 then uses the scans of the user's eyes during this process to create a gaze tracking profile corresponding to the user and/or the attached personalized accessory, and stores this information as gaze tracking biometric enrollment data corresponding to the personalized accessory so that whenever the personalized accessory is attached, electronic device 700 can accurately track the gaze of the user.

Figure 9F:
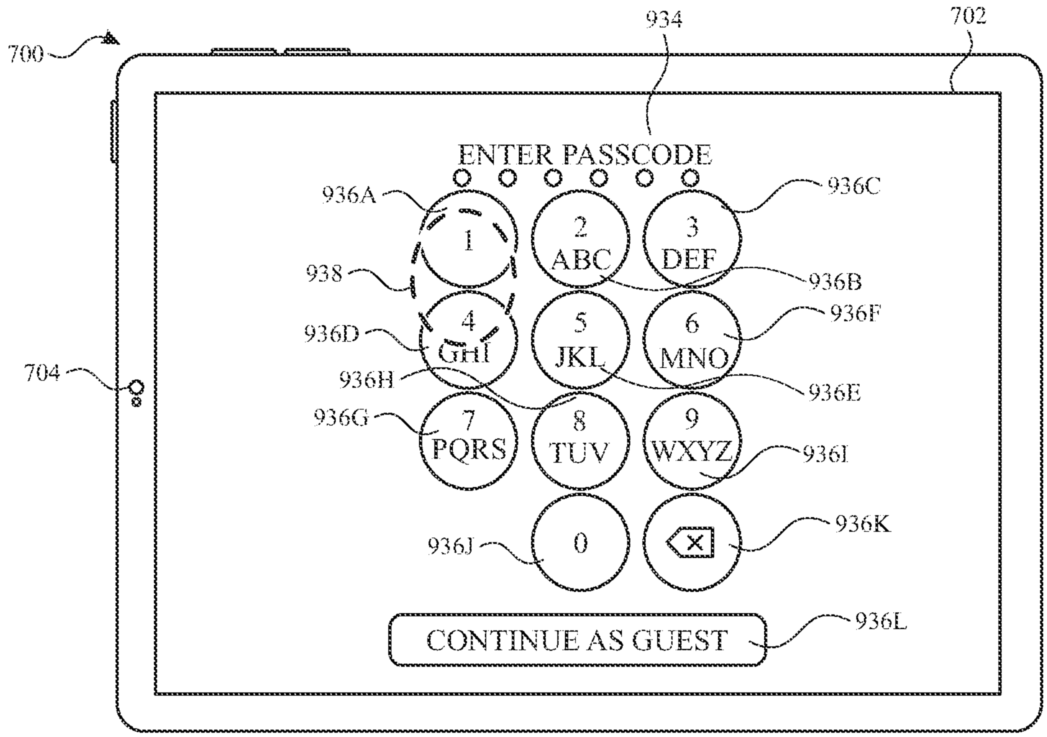

At FIG. 9F, electronic device 700 has completed gaze tracking biometric enrollment and, consequently, has ceased display of gaze target 930 and instruction 932. At FIG. 9F, electronic device 700 now displays passcode user interface 934 so that the user can authenticate himself or herself by entering a passcode (e.g., using virtual keys 936A-936K), as described above with reference to FIGS. 7H-7J and/or 7O. In the depicted embodiment, electronic device 700 requires the user to enter passcode authentication information in order for electronic device 700 to perform biometric authentication enrollment and generate biometric authentication enrollment data corresponding to the attached personalized accessory. If the user successfully enters a valid passcode (e.g., a passcode corresponding to a known and/or registered user), electronic device 700 performs biometric authentication enrollment and stored biometric authentication enrollment data for the personalized accessory so that, in the future, electronic device 700 can perform eye-based biometric authentication of the user when the personalized accessory is attached. The user also has the option to select selectable option 936L in order to use electronic device 700 in a guest mode state (as described above with reference to FIGS. 7A-7N) without performing biometric authentication enrollment for the attached personalized accessory. In some embodiments, if the user selects this option, information about the attached personalized accessory is stored on electronic device 700 as a guest personalized accessory that was used by a guest user of electronic device 700. In some embodiments, if the user forgoes performing biometric authentication enrollment for the attached personalized accessory, and electronic device 700 does not have biometric authentication enrollment data stored for the personalized accessory, electronic device 700 does not perform biometric authentication (e.g., eye-based biometric authentication) of the user while the personalized accessory is attached to electronic device 700.

At FIG. 9F, electronic device 700 detects one or more user inputs 938 corresponding to user input of passcode information. In FIG. 9F, user inputs 938 are touch inputs. In some embodiments, user inputs 938 include non-touch inputs, gesture inputs, air gesture inputs, and/or gaze-based inputs. In some embodiments, when electronic device 700 is a head-mounted system, user inputs 938 are, for example, detecting a gaze at an element to be selected and detecting a pinch air gesture.

Figure 9G:
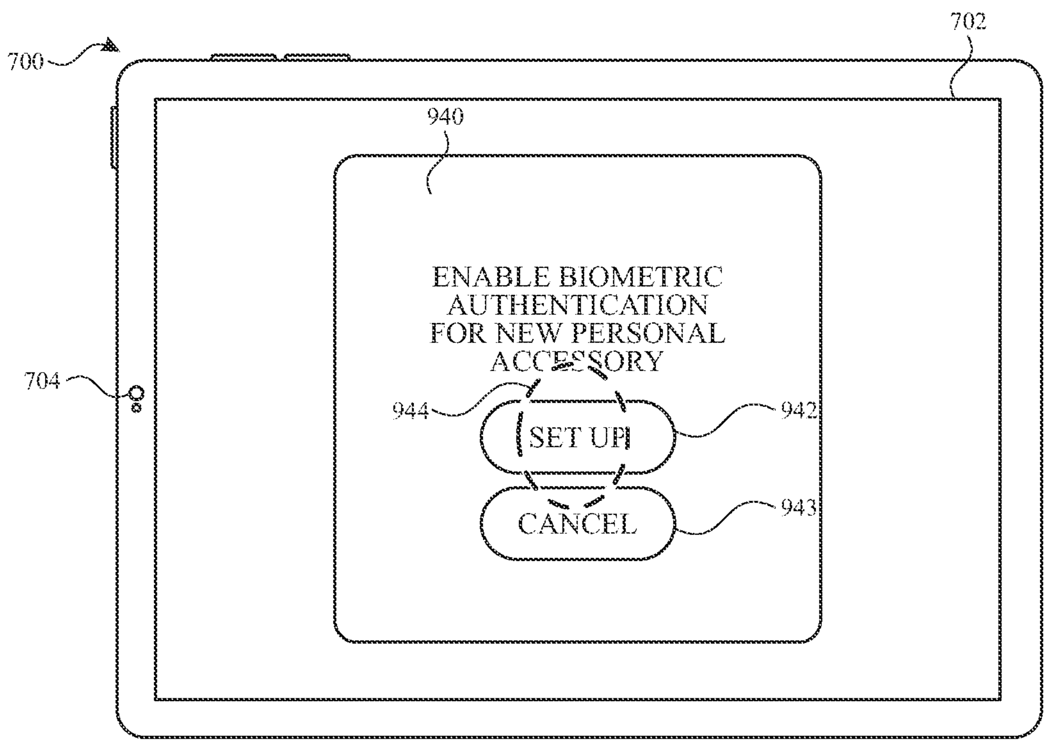

At FIG. 9G, in response to user inputs 938, and in accordance with a determination that the user inputs 938 correspond to a valid passcode (e.g., an authorized passcode and/or a passcode corresponding to an authorized and/or known user), electronic device 700 displays user interface 940, which includes selectable option 942 that is selectable to initiate biometric authentication enrollment for the attached personalized accessory, and selectable option 943 that is selectable to cancel and/or forgo biometric authentication enrollment for the personalized accessory.

At FIG. 9G, electronic device 700 detects user input 944 corresponding to selection of option 942. In FIG. 9G, user input 944 is a touch input. In some embodiments, user input 944 is a non-touch input, a gesture input, an air gesture input, and/or a gaze-based input. In some embodiments, when electronic device 700 is a head-mounted system, user input 944 is, for example, detecting a gaze at option 942 and detecting a pinch air gesture.

Figure 9H:
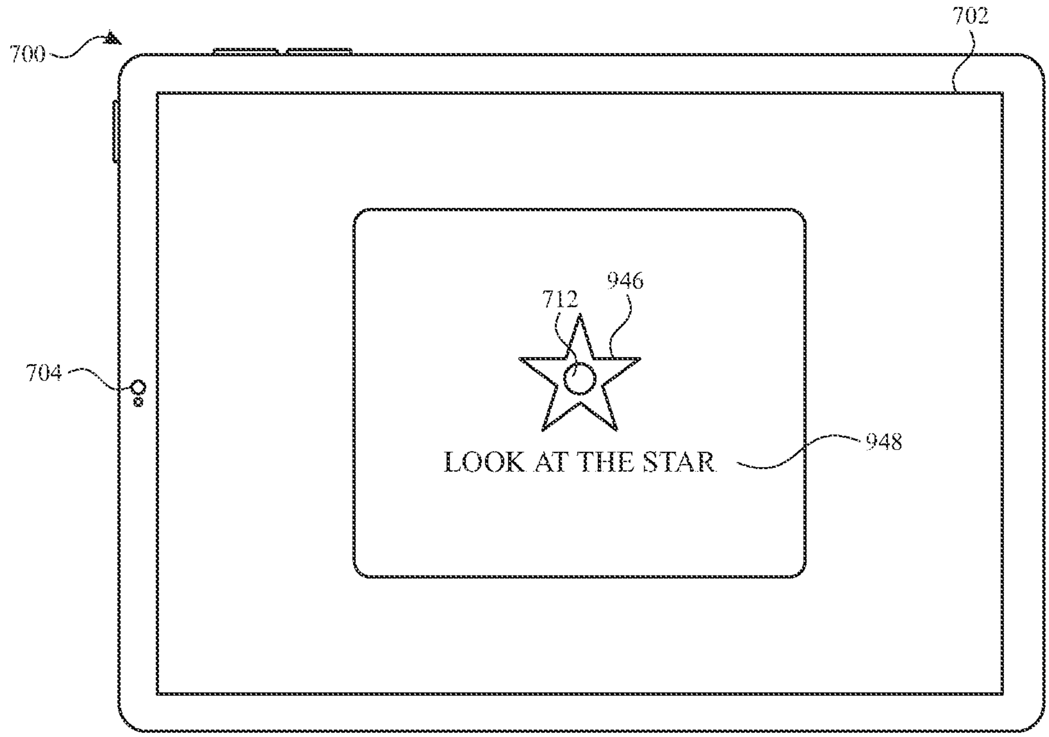

At FIG. 9H, in response to user input 944, electronic device 700 initiates biometric authentication enrollment for the attached personalized accessory and displays, via display 702, gaze target 946 and instruction 948 (instructing the user to look at gaze target 946). In some embodiments, electronic device 700 captures one or more scans of the user's eye(s) while the user looks at gaze target 946, and stores the scans as biometric authentication enrollment data so that, in the future, electronic device 700 can perform biometric authentication (e.g., eye-based biometric authentication) of the user while the personalized accessory is attached to electronic device 700. As described above, gaze indication 712 is provided for a better understanding of the described techniques and is optionally not a part of the user interface of the described device (e.g., is not displayed by the electronic device).

Figure 9I:
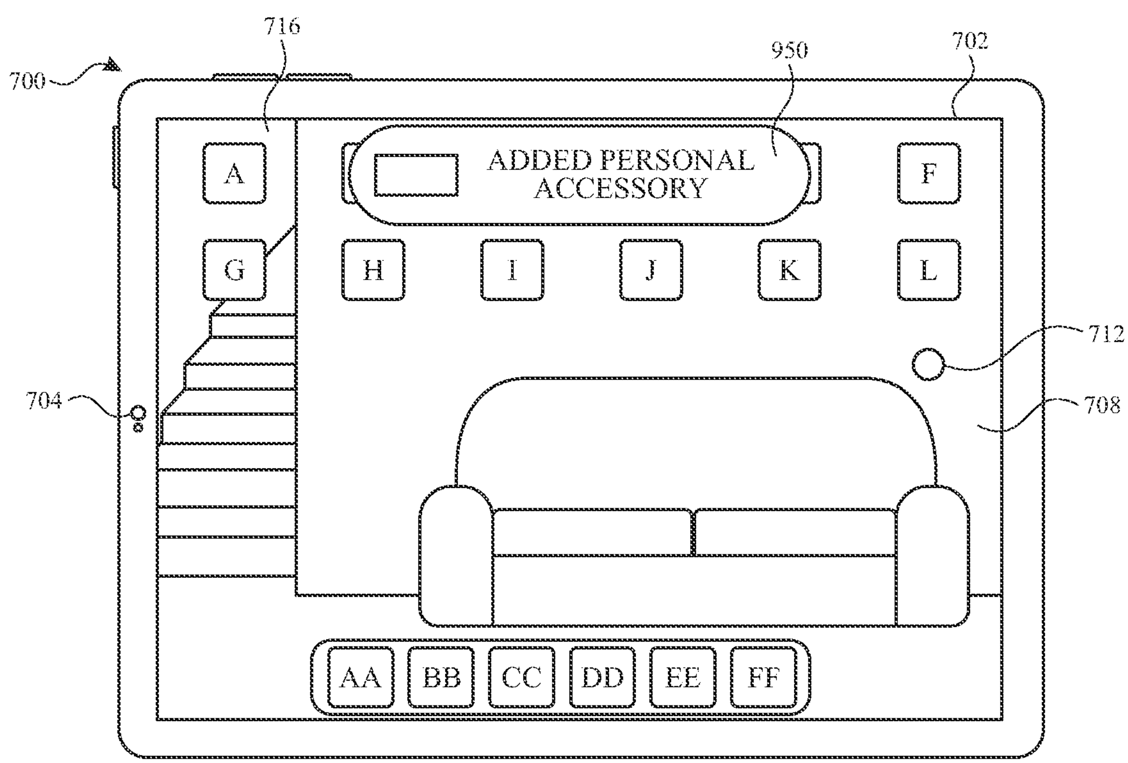

At FIG. 9I, electronic device 700 completes biometric authentication enrollment, and displays confirmation indication 950 overlaid on home user interface 716. Confirmation indication 950 indicates that biometric enrollment data for the attached personalized accessory has been collected and stored on electronic device 700, and home user interface 716 indicates that electronic device 700 is now operating in an unlocked state (e.g., as described above with reference to FIGS. 7A-7N).

Figure 9J:
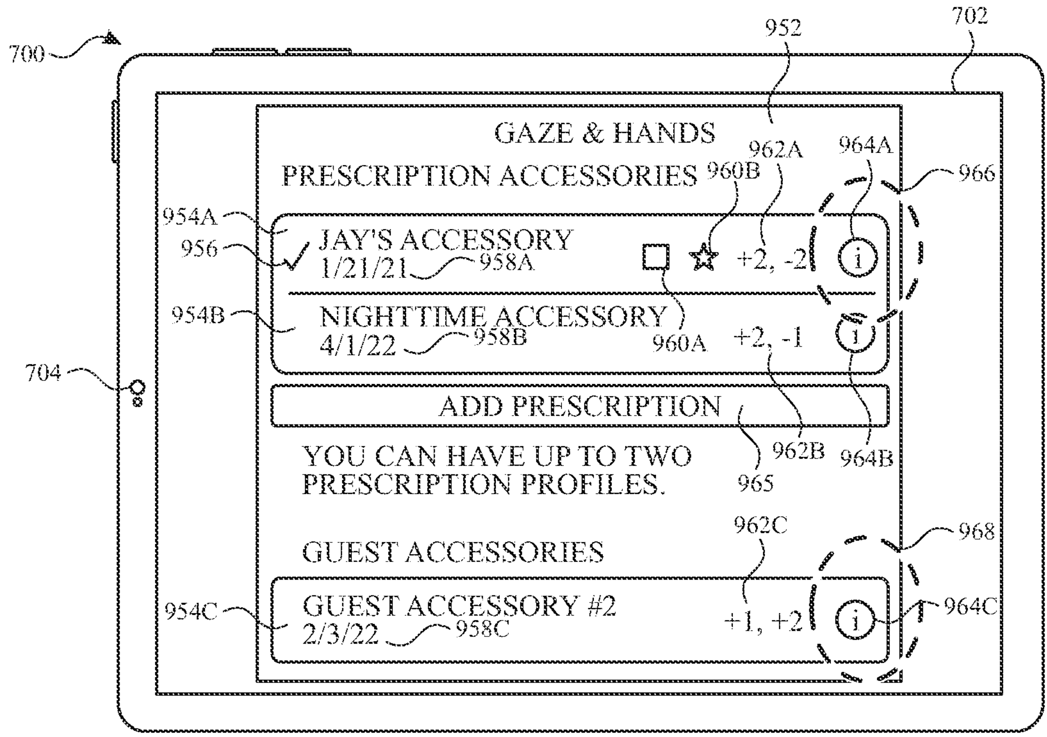
Figure 9K:
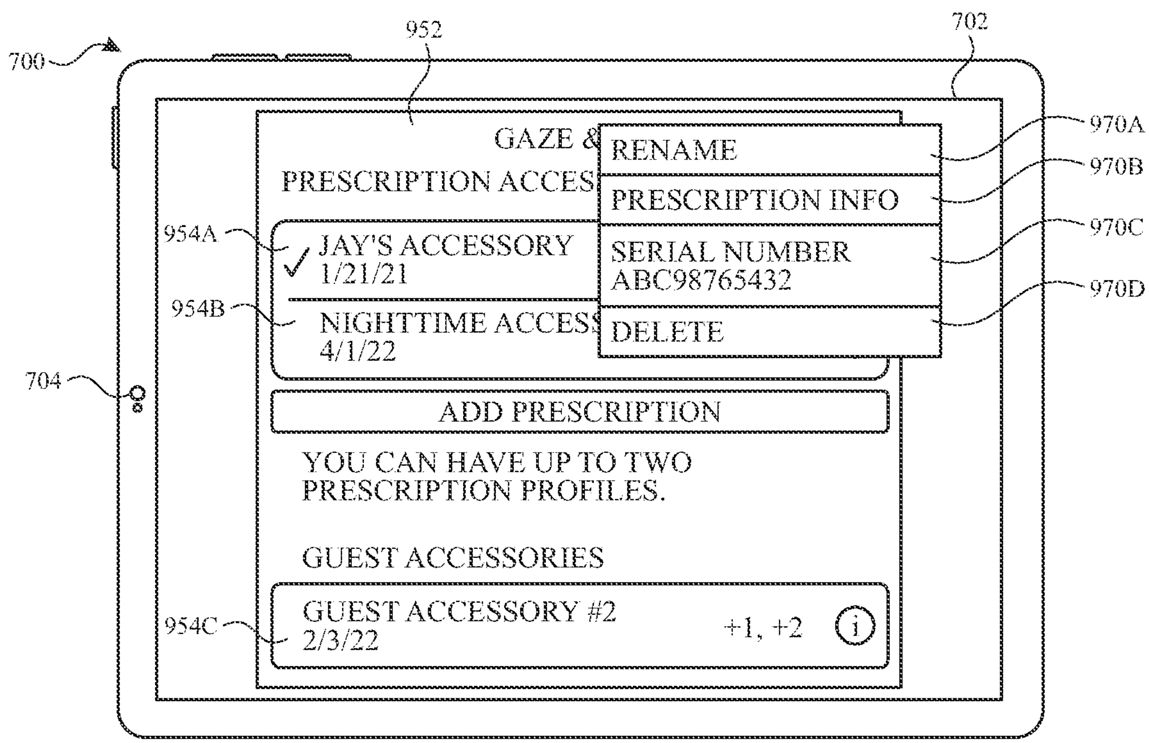
Figure 9L:
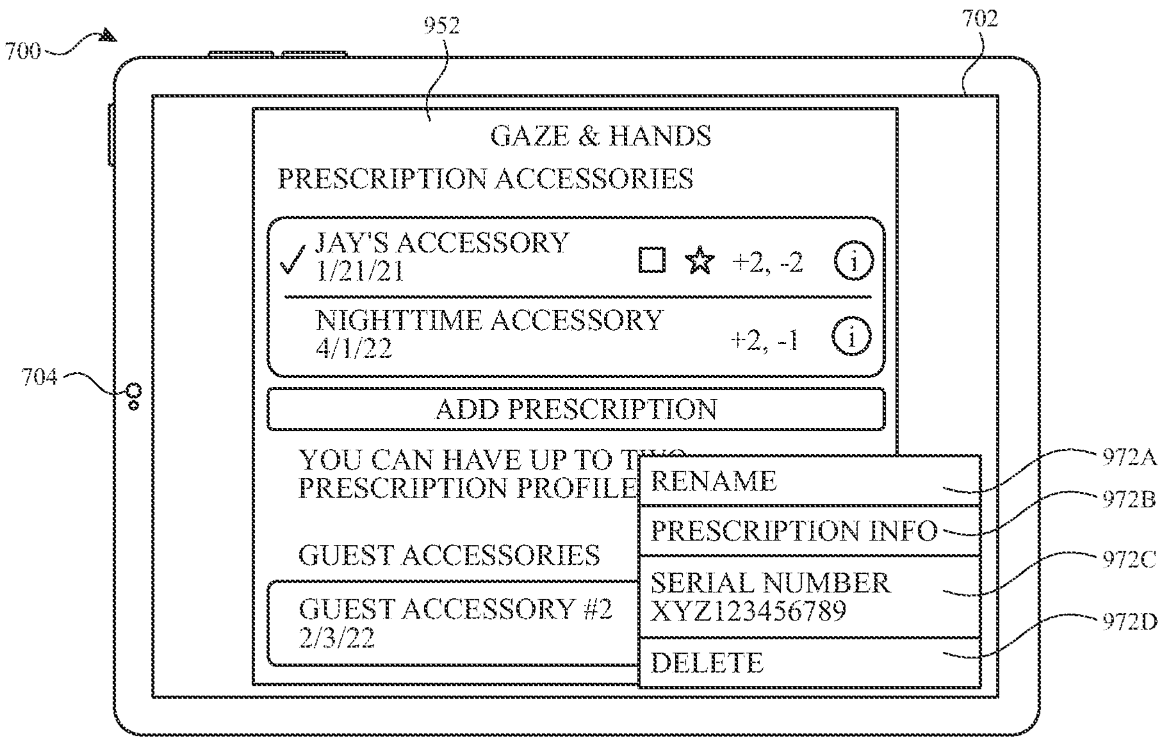

FIGS. 9J-9L display various user interfaces for managing personalized accessories, according to various embodiments.

At FIG. 9J, electronic device 700 displays, via display 702, accessories user interface 952. Accessories user interface 952 displays representations of various personalized accessories. For example, in some embodiments, accessories user interface 952 displays representations of personalized accessories that have previously been connected to electronic device 700 and/or have been previously connected to one or more companion devices that share personalized accessory information with electronic device 700. Accessories user interface 952 includes representation 954A corresponding to a first personalized accessory (labeled "Jay's Accessory"); representation 954B corresponding to a second personalized accessory (labeled "Nighttime Accessory"); and representation 954C corresponding to a third personalized accessory (labeled "Guest Accessory #2"). Accessories user interface 952 separates personalized accessories that are associated with known and/or registered users (e.g., 954A, 954B) from personalized accessories that are associated with guest users (e.g., 954C). Accessories user interface 952 also includes option 965 that is selectable to add a new personalized accessory (e.g., a new optical lens (e.g., prescription optical lens or non-prescription optical lens)).

In FIG. 9J, each representation of a personalized accessory includes information about the personalized accessory. For example, representation 954A includes prescription information 962A corresponding to the first personalized accessory, representation 954B includes prescription information 962B corresponding to the second personalized accessory, and representation 954C includes prescription information 962C corresponding to the third personalized accessory.

Representation 954A also includes visual indication 956 indicating that the first personalized accessory is currently connected to electronic device 700, whereas representations 954B and 954C do not include visual indication 956 because those personalized accessories are not currently connected to electronic device 700. Representation 954A also includes visual indication 960A indicating that a first biometric enrollment (e.g., gaze tracking biometric enrollment) has been completed for the first personalized accessory and/or that a first type of biometric enrollment data corresponding to the first biometric enrollment (e.g., gaze tracking biometric enrollment data) is stored on and/or available to electronic device 700. It can be seen that representations 954B and 954C do not include a corresponding visual indication similar to indication 960A, indicating that the first biometric enrollment (e.g., gaze tracking biometric enrollment) has not been completed for the second and third personalized accessories and/or that the first type of biometric enrollment data (e.g., gaze tracking biometric enrollment data) is not available for the second and third personalized accessories. In some embodiments, a user can still use the second and third personalized accessories with electronic device 700, but certain features, such as gaze tracking, may not be as effective or accurate as if the first biometric enrollment had been completed for those personalized accessories.

Representation 954A also includes visual indication 960B indicating that a second biometric enrollment (e.g., biometric authentication enrollment) has been completed for the first personalized accessory, and that a second type of biometric enrollment data corresponding to the first biometric enrollment (e.g., biometric authentication enrollment data) is stored on and/or available to electronic device 700. It can be seen that representations 954B and 954C do not include a corresponding visual indication similar to indication 960B, indicating that the second biometric enrollment (e.g., biometric authentication enrollment) has not been completed for the second and third personalized accessories and/or that the second type of biometric enrollment data is not available for the second and third personalized accessories. In some embodiments, a user can still attempt biometric authentication (e.g., eye-based biometric authentication) while the second or third personalized accessories are attached to electronic device 700, but biometric authentication may not be as accurate or effective. In some embodiments, users are prohibited from performing biometric authentication while a personalized accessory is attached to electronic device 700 until the user completes biometric authentication enrollment for the personalized accessory.

Settings user interface 952 includes selectable options 964A, 964B, 964C which correspond, respectively, to representations 954A, 954B, and 954C. Options 964A-964C are selectable to display additional options for managing each personalized accessory.

In FIG. 9J, electronic device 700 detects user input 966 corresponding to selection of option 964A, and user input 968 corresponding to selection of option 964C. In FIG. 9J, user inputs 966 and 968 are touch inputs. In other embodiments, user inputs 966 and 968 include different types of inputs, such as non-touch inputs, gesture inputs, air gesture inputs, and/or gaze-based inputs.

At FIG. 9K, in response to user input 966, electronic device 700 displays objects 970A-970D. Object 970A is selectable to rename representation 954A. Object 970B is selectable to display prescription information corresponding to representation 954A and the first personalized accessory. Object 970C displays a serial number corresponding to the first personalized accessory. Object 970D is selectable to delete information corresponding to the first personalized accessory from electronic device 700, and remove representation 954A from settings user interface 952.

At FIG. 9L, in response to user input 968, electronic device 700 displays objects 972A-972D. Object 920A is selectable to rename representation 954C. Object 972B is selectable to display prescription information corresponding to representation 954C and the third personalized accessory. Object 972C displays a serial number corresponding to the third personalized accessory. Object 972D is selectable to delete information corresponding to the third personalized accessory from electronic device 700, and remove representation 954C from settings user interface 952.

Figure 9M:
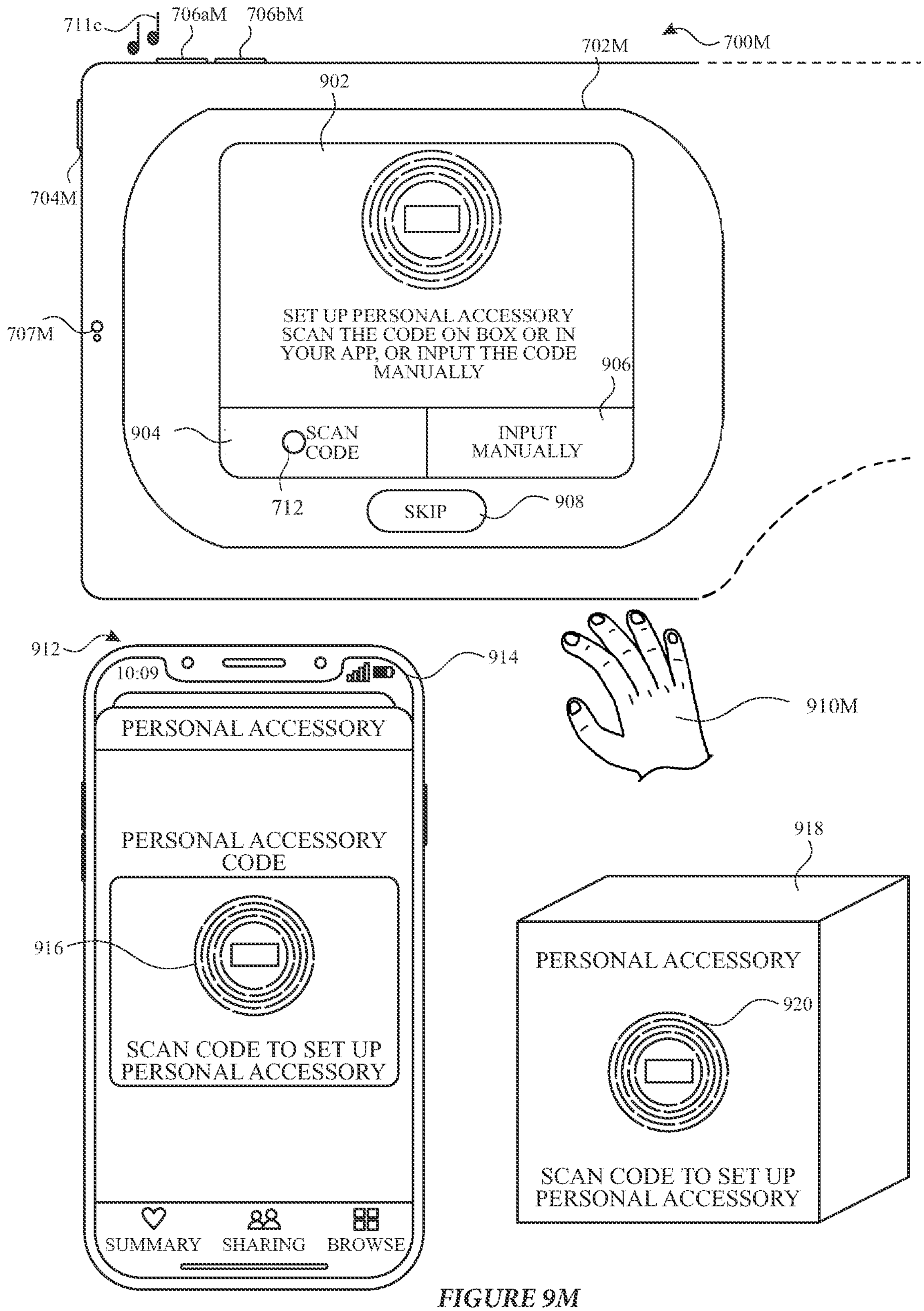

In some embodiments, the techniques and user interfaces described in FIGS. 9A-9L are provided by one or more of the devices described in FIGS. 1A-1P. FIG. 9M illustrates an embodiment in which user interface 902 (e.g., as described in FIG. 9C) is displayed on display module 702M of head-mounted device (HMD) 700M. FIG. 9M depicts a scenario in which HMD 700M detects a personalized accessory attached to HMD 700M (e.g., one or more corrective lenses positioned between display module 702M and one or more eyes of the user) for which HMD 700M does not have corresponding biometric enrollment data. In FIG. 9M, in response to this determination, HMD 700M displays, via display module 702M, setup user interface 902, which instructs the user to set up the attached personalized accessory (e.g., by performing one or more biometric enrollment steps for the attached personalized accessory). Setup user interface 902 includes selectable option 904, selectable option 906, and selectable option 908. In the depicted embodiment, option 904 is selectable by a user to initiate a process for scanning a code (e.g., using a camera that is connected to and/or integrated with HMD 700M) corresponding to the personalized accessory, and option 906 is selectable by a user to initiate a process for manually entering the product code. Option 908 is selectable by a user to skip biometric enrollment for the attached personalized accessory, and use the attached personalized accessory without setting up the personalized accessory (e.g., without providing biometric enrollment data corresponding to the personalized accessory).

In FIG. 9M, companion device 912 is a smart phone that includes touch-screen display 914. In some embodiments, companion device 912 is a tablet, a wearable device, a wearable smartwatch device, or other computer system that includes and/or is in communication with one or more display devices. Companion device 912 displays, via display 914, code 916 that corresponds to the attached personalized accessory (e.g., uniquely identifies the attached personalized accessory and/or identifies one or more characteristics of the attached personalized accessory). In some embodiments, companion device 912 displays code 916 in accordance with a determination that HMD 700M is within a threshold distance of companion device 912 and is attempting to set up (e.g., perform biometric enrollment steps) for a personalized accessory for which companion device 912 has relevant information. Similarly, product packaging 918 also includes code 920 that corresponds to the attached personalized accessory. In some embodiments, code 920 is the same as 916 with the exception that code 920 is printed on the side of product packaging 918 and code 916 is displayed via display 914.

At FIG. 9M, HMD 700M detects user input 910M corresponding to selection of selectable option 904. In some embodiments, user input 910M is a non-touch input, such as an air gesture input that is performed while the gaze of the user is directed at option 904 (e.g., as indicated by gaze indication 712).

In some embodiments, device 700M includes a pair of display modules that provide stereoscopic content to different eyes of the same user. For example, HMD 700M includes display module 702M (which provides content to a left eye of the user) and a second display module (which provides content to a right eye of the user). In some embodiments, the second display module displays a slightly different image than display module 702M to generate the illusion of stereoscopic depth.

Any of the features, components, and/or parts, including the arrangements and configurations thereof shown in FIGS. 1B-1P can be included, either alone or in any combination, in HMD 700M. For example, in some embodiments, HMD 700M includes any of the features, components, and/or parts of HMD 1-100, 1-200, 3-100, 6-100, 6-200, 6-300, 6-400, 11.1.1-100, and/or 11.1.2-100, either alone or in any combination. In some embodiments, display module 702M includes any of the features, components, and/or parts of display unit 1-102, display unit 1-202, display unit 1-306, display unit 1-406, display generation component 120, display screens 1-122*a-b*, first and second rear-facing display screens 1-322*a*, 1-322*b*, display 11.3.2-104, first and second display assemblies 1-120*a*, 1-120*b*, display assembly 1-320, display assembly 1-421, first and second display sub-assemblies 1-420*a*, 1-420*b*, display assembly 3-108, display assembly 11.3.2-204, first and second optical modules 11.1.1-104*a* and 11.1.1-104*b*, optical module 11.3.2-100, optical module 11.3.2-200, lenticular lens array 3-110, display region or area 6-232, and/or display/display region 6-334, either alone or in any combination. In some embodiments, sensor 707M includes any of the features, components, and/or parts of any of sensors 190, sensors 306, image sensors 314, image sensors 404, sensor assembly 1-356, sensor assembly 1-456, sensor system 6-102, sensor system 6-202, sensors 6-203, sensor system 6-302, sensors 6-303, sensor system 6-402, and/or sensors 11.1.2-110*a-f*, either alone or in any combination. In some embodiments, input devices 704M, 706*a*M, and/or 706*b*M include any of the features, components, and/or parts of any of first button 1-128, button 11.1.1-114, second button 1-132, and or dial or button 1-328, either alone or in any combination. In some embodiments, HMD 700M includes one or more audio output components (e.g., electronic component 1-112) for generating audio feedback (e.g., audio output 711*c*), optionally generated based on detected events and/or user inputs detected by the HMD 700M.

Additional descriptions regarding FIGS. 9A-9M are provided below in reference to methods 1000 and 1050 described with respect to FIGS. 9A-9M.

FIG. 10A is a flow diagram of an exemplary method 1000 for enrolling personalized accessories (e.g., corrective lenses 11.3.2-216 or lenses 1-218) of one or more users of a computer system, in accordance with some embodiments. In some embodiments, method 1000 is performed at a computer system (e.g., 700) (e.g., computer system 101 in FIG. 1A) including one or more display generation components (e.g., 702) (e.g., display generation component 120 in FIGS. 1A, 3, and 4) (e.g., a heads-up display, a display, a touchscreen, a projector, etc.) and one or more input devices (e.g., 704) (e.g., one or more buttons, one or more eye movement trackers, one or more hand movement trackers, one or more cameras (e.g., a camera (e.g., color sensors, infrared sensors, and other depth-sensing cameras))). In some embodiments, the method 1000 is governed by instructions that are stored in a non-transitory (or transitory) computer-readable storage medium and that are executed by one or more processors of a computer system, such as the one or more processors 202 of computer system 101 (e.g., control 110 in FIG. 1A). Some operations in method 1000 are, optionally, combined and/or the order of some operations is, optionally, changed.

In some embodiments, the computer system (e.g., 700) detects (1002), via the one or more input devices (e.g., 704), that a first set of criteria are satisfied (e.g., detects that the user has worn the computer system and/or one or more components of the computer system; detects that the user has provided one or more user inputs to the computer system; and/or detects that the user is using the computer system for the first time and/or using the computer system with one or more personalized accessories attached to the computer system for the first time).

In response to detecting that the first set of criteria are satisfied (1004): in accordance with a determination that the computer system has detected a personalized accessory (e.g., a prescription optical lens and/or a set of prescription optical lenses) connected (e.g., physically connected) to the computer system (e.g., 700) (e.g., in accordance with a determination that a personalized accessory is connected to the computer system and in accordance with a determination that the personalized accessory that is connected to the computer system does not have corresponding biometric enrollment data) without the computer system having corresponding biometric enrollment data for the personalized accessory (1006) (e.g., eye gaze enrollment data (e.g., gaze tracking enrollment data), hand enrollment data (e.g., hand movement tracking enrollment data), biometric identification data (e.g., facial scan identification data, eye scan identification data, and/or iris scan identification data)), the computer system displays (1008), via the one or more display generation components (e.g., 702), a first user interface (e.g., 902, 922, 930, FIG. 9E, 940, FIG. 9G) that prompts a user to provide biometric enrollment data corresponding to the personalized accessory (e.g., a first user interface that indicates that the user is required to provide additional information (e.g., biometric enrollment data) in order to use the connected personalized accessory); and in accordance with a determination that the computer system has not detected a personalized accessory connected to the computer system without the computer system having corresponding biometric enrollment data for the personalized accessory (1010) (e.g., a personalized accessory is not connected to the computer system and/or a personalized accessory that has corresponding biometric enrollment data is connected to the computer system), the computer system forgoes display (1012) of the first user interface (e.g., FIG. 9B).

In some embodiments, the computer system is a head-mounted system, and the personalized accessory includes one or more optical lenses (e.g., prescription and/or non-prescription optical lenses) through which the user views content displayed by the one or more display generation components.

Displaying a first user interface that prompts the user to provide biometric enrollment data corresponding to a personalized accessory when the computer system determines that the device has detected a personalized accessory connected to the computer system without the computer system having corresponding biometric enrollment data for the personalized accessory provides the user with visual feedback about the state of the system (e.g., that the computer system has detected a personalized accessory for which the computer system does not have corresponding biometric enrollment data), thereby improving visual feedback to the user. Prompting a user to provide biometric enrollment data corresponding to a personalized accessory when the computer system determines that the device has detected a personalized accessory connected to the computer system without the computer system having corresponding biometric enrollment data for the personalized accessory also enhances the operability of the computer system by helping the user to provide proper inputs and reducing user mistakes when operating/interacting with the computer system.

In some embodiments, detecting that the first set of criteria are satisfied comprises detecting, via the one or more input devices (e.g., 704), that a user has performed one or more actions indicative of an attempt to user the computer system (e.g., 900) (e.g., detecting that the user has worn the computer system and/or one or more components of the computer system; and/or detecting that the user has provided one or more user inputs to the computer system) while the computer system (e.g., 700) is in a locked state (e.g., FIG. 9A) (e.g., a state in which one or more features of the computer system and/or one or more sets of content are locked (e.g., inaccessible); and/or a state in which an authorized user is not logged into the computer system). In some embodiments, in response to detecting that the first set of criteria are satisfied: in accordance with the determination that the computer system has not detected a personalized accessory connected to the computer system without the computer system having corresponding biometric enrollment data for the personalized accessory: the computer system forgoes display of the first user interface (e.g., 902) (e.g., FIG. 9B, computer system 700 forgoes displays of user interface 902); and performs a first authentication of the user (e.g., FIG. 9B, computer system 700 displays gaze target 710 to perform authentication of the user) (e.g., a biometric authentication (e.g., comparing biometric information collected from the user with one or more biometric profiles stored on and/or accessible to the computer system (e.g., one or more biometric profiles corresponding to one or more known and/or registered users)) and/or a non-biometric authentication (e.g., authentication of a user without use of biometric information (e.g., password and/or passcode-based authentication))).

In some embodiments, in response to detecting that the first set of criteria are satisfied: in accordance with a determination that the computer system has detected a personalized accessory connect to the computer system without the computer system having corresponding biometric enrollment data for the personalized accessory (e.g., FIGS. 9C-9H and/or 9M), the computer system displays, via the one or more display generation components, the first user interface (e.g., 902, 922, 930, 940, 946, 948) that prompts the user to provide biometric enrollment data corresponding to the personalized accessory.

In some embodiments, the computer system (e.g., 700) is a head-mounted system, and detecting the one or more actions indicative of an attempt to user the computer system (e.g., 900) includes detecting that the user has placed the head-mounted system on his or her head (e.g., in some embodiments, user input 900 is a determination that the user has placed electronic device 700 on his or her head, rather than touch input 900 depicted in FIG. 9A).

Forgoing displaying the first user interface and performing a first authentication of the user (e.g., attempting to unlock the device) when the computer system determines that the device has not detected a personalized accessory connected to the computer system without the computer system having corresponding biometric enrollment data for the personalized accessory enhances the operability of the computer system by helping the user to provide proper inputs and reducing user mistakes when operating/interacting with the computer system.

In some embodiments, the determination that the computer system (e.g., 700) has not detected a personalized accessory connected to the computer system without the computer system having corresponding biometric enrollment data for the personalized accessory (e.g., FIG. 9B) comprises a determination that the computer system has not detected a personalized accessory connected to the computer system (e.g., there is no personalized accessory connected to the computer system) (e.g., regardless of biometric enrollment data corresponding to the personalized accessory). Forgoing displaying the first user interface when the computer system determines that a personalized accessory is not attached to the computer system enhances the operability of the computer system by helping the user to provide proper inputs and reducing user mistakes when operating/interacting with the computer system.

In some embodiments, the determination that the computer system (e.g., 700) has not detected a personalized accessory connected to the computer system without the computer system having corresponding biometric enrollment data for the personalized accessory (e.g., FIG. 9B) comprises a determination that the computer system has detected a personalized accessory connected to the computer system with the computer system having corresponding biometric enrollment data for the personalized accessory (e.g., the computer system has detected a personalized accessory connected to the computer system, but the computer system already has biometric enrollment data for the personalized accessory). Forgoing displaying the first user interface when the computer system determines that the computer system already has biometric enrollment data for the attached personalized accessory enhances the operability of the computer system by helping the user to provide proper inputs and reducing user mistakes when operating/interacting with the computer system.

In some embodiments, in response to performing the first authentication of the user (e.g., FIG. 9B): in accordance with a determination that the first authentication of the user succeeds in authenticating the user (e.g., in accordance with a determination that biometric information collected from the user matches one or more biometric profiles stored on and/or accessible to the computer system (e.g., matches a biometric profile corresponding to a known and/or registered user); and/or in accordance with a determination that authentication information provided by (e.g., input by) the user matches authentication information for a known and/or registered user), the computer system transitions the computer system from the locked state to an unlocked state (e.g., FIGS. 7C-7F) (e.g., a state in which a first set of features (e.g., a first set of content and/or functions) are made accessible to (e.g., are unlocked for) the user).

In some embodiments, transitioning the computer system from the locked state to the unlocked state includes displaying, via the one or more display generation components, a logged-in user interface indicative of successful authentication of the user (e.g., a home screen user interface) (e.g., 714, 716).

In some embodiments, in response to performing the first authentication of the user: in accordance with a determination that the first authentication of the user fails to authenticate the user (e.g., in accordance with a determination that biometric information collected from the user does not match one or more biometric profiles stored on and/or accessible to the computer system (e.g., does not match biometric information corresponding to one or more known and/or registered users); and/or in accordance with a determination that authentication information provided by (e.g., input by) the user does not match authentication information for a known and/or registered user), the computer system forgoes transitioning the computer system from the locked state to the unlocked state (e.g., maintains the computer system in the locked state) and/or displays, via the one or more display generation components, a user interface (e.g., FIG. 7G, FIG. 7H, FIG. 7J, FIG. 7O, 720-1, 720-2) indicative of failed authentication of the user.

Transitioning the computer system from the locked state to the unlocked state in accordance with a determination that the first authentication of the user succeeds in authenticating the user prevents unauthorized users from accessing sensitive data and/or features, thereby improving security.

In some embodiments, the determination that the first authentication of the user succeeds in authenticating the user comprises a determination that biometric information collected from the user (e.g., eye scan (e.g., iris scan) information, facial scan information, and/or fingerprint scan information) matches (e.g., corresponds to and/or satisfies one or more similarity criteria with respect to) one or more biometric profiles (e.g., eye scan profile, iris scan profile, facial scan profile, and/or fingerprint scan profile) corresponding to an enrolled (e.g., known and/or registered) user (e.g., FIGS. 7C-7F).

In some embodiments, the determination that the first authentication of the user succeeds in authenticating the user comprises biometric authentication (e.g., comparing biometric information collected from the user with one or more biometric profiles stored on and/or accessible to the computer system (e.g., one or more biometric profiles corresponding to one or more known and/or registered users)).

In some embodiments, biometric authentication of the user includes displaying, via the one or more display generation components, a gaze target object; while displaying the gaze target object, collecting biometric information (e.g., collecting eye scan information while the user is looking at the gaze target object); and comparing the collected biometric information with one or more biometric profiles stored on and/or accessible to the computer system (e.g., comparing the collected eye scan information with stored eye scan information corresponding to known and/or registered users).

Transitioning the computer system from the locked state to the unlocked state in accordance with a determination that biometric information collected from the user matches a known biometric profile prevents unauthorized users from accessing sensitive data and/or features, thereby improving security.

In some embodiments, the determination that the first authentication of the user succeeds in authenticating the user comprises a determination that authentication information (e.g., passcode and/or password information) provided by (e.g., input by) the user (e.g., via user interface 720-1 and/or 720-2) matches (e.g., corresponds to and/or is identical to) authentication information for an enrolled user (e.g., a user registered on the computer system).

In some embodiments, the determination that authentication information provided by the user matches authentication information for an enrolled user includes: displaying, via the one or more display generation components, a first passcode entry user interface (e.g., 720-1, 720-2), including displaying a plurality of passcode entry user interface elements (e.g., 722A-722M) that are selectable by a user (e.g., via one or more user inputs (e.g., one or more gesture and/or non-gesture inputs)) to enter user authentication information (e.g., passcode information, voice information, and/or one or more characters and/or strings), while displaying the first passcode entry user interface (e.g., 720-1, 720-2), the computer system receives user authentication information based on one or more user inputs, including: detecting, via the one or more input devices, a first user input that corresponds to selection of a first displayed element (e.g., 722A-722M) in the first passcode entry user interface (e.g., 720-1, 720-2) (e.g., a touch input, a non-touch input, an air gesture (e.g., a pinch air gesture and/or a tap air gesture) (e.g., a first air gesture that has a directionality and/or position (e.g., three-dimensional position) that corresponds to the first displayed element) and/or a user gaze corresponding to the first displayed element (e.g., a user gaze that dwells on the first displayed element for a threshold duration of time and/or a user gaze in combination with a gesture)); and in response to detecting the first user input that corresponds to selection of the first displayed element in the first passcode entry user interface, the computer system receives first user authentication information corresponding to the first displayed element (e.g., entering a first character (e.g., letter and/or number) corresponding to the first displayed element as part of the user authentication information) (in some embodiments, in response to receiving the first user authentication information corresponding to the first displayed element, the computer system displays, via the display generation component, an indication that the computer system has received the first user authentication information).

In some embodiments, receiving the user authentication information includes receiving multiple user inputs corresponding to a plurality of selections of one or more displayed elements in the first passcode entry user interface and receiving corresponding authentication information until a user has completed entering a passcode and/or password.

Transitioning the computer system from the locked state to the unlocked state in accordance with a determination that authentication information provided by a user matches authentication information for a known user prevents unauthorized users from accessing sensitive data and/or features, thereby improving security.

In some embodiments, biometric enrollment data corresponding to the personalized accessory includes eye gaze enrollment information (e.g., FIG. 9E) corresponding to the personalized accessory for providing gaze-based inputs (e.g., inputs based on a user's gaze (e.g., where the user is looking)) while the personalized accessory is connected to the computer system. In some embodiments, the computer system is a head-mounted system. In some embodiments, while the user is using the head-mounted system, the user provides one or more user inputs based on the gaze of the user and, accordingly, the head-mounted system tracks the gaze of the user (e.g., FIG. 9E, object 930 moves around display 702 and the user is instructed to track object 930 with their gaze, and electronic device 700 tracks the user's gaze (e.g., as indicated by gaze indication 712)). For example, in some embodiments, the user selects displayed objects and/or interacts with displayed objects by gazing at the displayed object (e.g., 930) (and, optionally, performing another gesture (e.g., hand gesture, head gesture, and/or face gesture)). Prompting a user to provide biometric eye gaze enrollment information corresponding to a personalized accessory when the computer system determines that the device has detected a personalized accessory connected to the computer system without the computer system having corresponding eye gaze enrollment information for the personalized accessory enhances the operability of the computer system by helping the user to provide proper inputs and reducing user mistakes when operating/interacting with the computer system.

In some embodiments, biometric enrollment data corresponding to the personalized accessory includes hand movement enrollment information corresponding to the personalized accessory (e.g., for providing user inputs based on movement of the user's hand(s) (e.g., while the personalized accessory is connected to the computer system)). In some embodiments, the computer system is a head-mounted system. In some embodiments, while the user is using the head-mounted system, the user provides one or more user inputs based on movement of the user's hands and, accordingly, the head-mounted system detects movements of the user's hands (e.g., in some embodiments, in FIG. 9E, in addition to instructing the user to follow object 930 with their gaze, electronic device 700 instructs the user to perform one or more hand-based gestures to interact with object 930, and tracks the movement of the user's hands). Prompting a user to provide hand movement enrollment information corresponding to a personalized accessory when the computer system determines that the device has detected a personalized accessory connected to the computer system without the computer system having corresponding hand movement enrollment information for the personalized accessory enhances the operability of the computer system by helping the user to provide proper inputs and reducing user mistakes when operating/interacting with the computer system.

In some embodiments, biometric enrollment data corresponding to the personalized accessory includes biometric identity verification information (e.g., FIGS. 9G-9H, instructing the user to look at object 946 and capture one or more scans of the user's eyes to be used for biometric identity verification while the user looks at object 946) (e.g., facial scan-based identity verification information, iris-scan based identity verification information, and/or fingerprint-based identity verification information) corresponding to the personalized accessory for identifying the user (e.g., verifying the identity of the user) based on one or more biometric features (e.g., facial features, iris features, and/or fingerprint features) (e.g., while the personalized accessory is connected to the computer system). Prompting a user to biometric identity verification information corresponding to a personalized accessory when the computer system determines that the device has detected a personalized accessory connected to the computer system without the computer system having corresponding biometric identity verification information for the personalized accessory enhances the operability of the computer system by helping the user to provide proper inputs and reducing user mistakes when operating/interacting with the computer system.

In some embodiments, the computer system detects a first personal accessory connected to the computer system (e.g., 700). In some embodiments, the computer system receives (e.g., via the one or more input devices) personalized accessory setup information (e.g., 916, 920) (e.g., one or more optical lens properties (e.g., lens prescription and/or thickness), a serial number, a model number, a scannable code (e.g., a QR code), an RFID, and/or other identifying information) associated with the first personalized accessory. In response to receiving the personalized accessory setup information, the computer system modifies one or more settings of the computer system (e.g., one or more display settings (e.g., modifying one or more display settings determined to be helpful in providing a user with an optimal viewing experience while using the personalized accessory) and/or one or more user input settings (e.g., modifying one or more user inputs settings determined to be helpful and/or necessary to accurately receive user input from a user while the user is using the personalized accessory)) based on the personalized accessory setup information associated with the first personalized accessory. Modifying one or more settings of the computer system based on personalized accessory setup information associated with a personalized accessory enhances the operability of the computer system by helping the user to provide proper inputs and reducing user mistakes when operating/interacting with the computer system.

In some embodiments, receiving the personalized accessory setup information associated with the first personalized accessory includes receiving the personalized accessory setup information from the first personalized accessory (e.g., via etching, printed code, and/or RFID). In some embodiments, receiving the personalized accessory setup information from the first personalized accessory includes receiving, from the first personalized accessory, a link (e.g., a weblink and/or file directory link) to access the personalized accessory setup information from a file location, and accessing and/or retrieving the personalized accessory setup information from the file location. Automatically receiving personalized accessory setup information from the personalized accessory allows the computer system to receive relevant and/or necessary information without any inputs by a user, thereby reducing the number of inputs needed to perform an operation.

In some embodiments, receiving the personalized accessory setup information associated with the first personalized accessory includes receiving the personalized accessory setup information based on one or more user inputs by a user (e.g., 906, the user can provide a user input to select option 906 to input personalized accessory setup information manually (e.g., to enter a code corresponding to the personal accessory manually and/or to enter prescription information corresponding to the personal accessory manually)) (e.g., one or more gesture inputs, one or more non-gesture inputs, and/or one or more touch inputs) (e.g., one or more user inputs inputting the personalized accessory set up information via a keyboard, and/or a passcode entry user interface) (e.g., one or more user inputs inputting optical lens prescription information via a keyboard (e.g., virtual and/or physical)). Modifying one or more settings of the computer system based on personalized accessory setup information associated with a personalized accessory input by a user enhances the operability of the computer system by helping the user to provide proper inputs and reducing user mistakes when operating/interacting with the computer system.

In some embodiments, in response to detecting that the first set of criteria are satisfied (e.g., FIG. 9A): in accordance with the determination that the computer system (e.g., 700) has detected a personalized accessory connected to the computer system without the computer system having corresponding biometric enrollment data for the personalized accessory: prior to displaying the first user interface (e.g., 902) that prompts the user to provide biometric enrollment data corresponding to the personalized accessory, the computer system displays, via the one or more display generation components (e.g., 702), a second user interface (e.g., 902) that prompts the user to provide personalized accessory setup information (e.g., prompts the user to provide information identifying the personalized accessory and/or identifying one or more characteristics of the personalized accessory (e.g., a corrective vision prescription of the personalized accessory)). Displaying a second user interface that prompts the user to provide personalized accessory setup information corresponding to a personalized accessory when the computer system determines that the device has detected a personalized accessory connected to the computer system without the computer system having corresponding biometric enrollment data for the personalized accessory provides the user with visual feedback about the state of the system (e.g., that the computer system has detected a personalized accessory for which the computer system does not have corresponding biometric enrollment data), thereby improving visual feedback to the user.

In some embodiments, the personalized accessory setup information associated with the first personalized accessory is received from an external device (e.g., 912) (e.g., a smart phone, a smart watch, a tablet, a wearable device, and/or head-mounted device) (e.g., an external device in communication with the computer system) in accordance with a determination that the user has provided authorization for the external device (e.g., via one or more user inputs (e.g., via one or more touch inputs and/or non-touch inputs) received by and/or at the external device) to share the personalized accessory set up information associated with the first personalized accessory (e.g., the user has provided user inputs on external device 912 authorizing sharing of information from device 912 to computer system 700 and/or the user scans code 916 from external device 912 using computer system 700). Receiving personalized accessory setup information from an external device allows the computer system to receive relevant and/or necessary information without additional input from a user, thereby reducing the number of inputs needed to perform an operation.

In some embodiments, the personalized accessory setup information associated with the first personalized accessory is received via product packaging (e.g., 918) (e.g., a bag, box, and/or other container within which the personalized accessory was packaged) corresponding to the first personalized accessory (e.g., via text and/or computer readable code printed on the product packaging) (e.g., received by scanning the text and/or computer readable code printed on the product packaging). Receiving personalized accessory setup information from product packaging allows the computer system to receive relevant and/or necessary information without additional input from a user, thereby reducing the number of inputs needed to perform an operation.

In some embodiments, prior to receiving the personalized accessory setup information associated with the first personalized accessory (and, in some embodiments, in response to detecting the first personal accessory connected to the computer system): in accordance with a determination that a first external device (e.g., 912) (e.g., a smart phone, a smart watch, a tablet, a wearable device, and/or head-mounted device) (e.g., an external device in communication with the computer system) (e.g., an external device associated with the computer system (e.g., signed into the same user account as the computer system and/or associated with the same user and/or account as the computer system)) satisfies one or more proximity criteria with respect to the computer system (e.g., 700) (e.g., one or more proximity criteria indicating that the first external device is within a threshold distance of the computer system) and that the first external device has access to personalized accessory setup information associated with the first personalized accessory (e.g., the personalized accessory setup information associated with the first personalized accessory is stored on the first external device): the computer system (e.g., 700) causes the first external device (e.g., 912) to display a prompt (e.g., 916) to share the personalized accessory setup information associated with the first personalized accessory (e.g., share the personalized accessory setup information associated with the first personalized accessory with the computer system) (e.g., display, on the first external device, a user interface object that is selectable by a user to cause the computer system to receive the personalized accessory setup information associated with the first personalized accessory and/or cause the first external device to transmit (e.g., to initiate a process for transmitting) the personalized accessory setup information associated with the first personalized accessory to the computer system).

In some embodiments, while the first external device displays the prompt to share the personalized accessory setup information associated with the first personalized accessory, the first external device receives one or more user inputs corresponding to a request to share the personalized accessory setup information associated with the first personalized accessory (e.g., in FIG. 9C and/or in FIG. 9M, prior to displaying code 916, electronic device 912 displays a prompt asking the user if they would like to share personalized accessory setup information with electronic device 700, and the user provides one or more user inputs confirming that the user would like to share personalized accessory setup information). In some embodiments, in response to the one or more user inputs, the first external device displays a pairing user interface (e.g., electronic device 912 in FIG. 9C and/or FIG. 9M) that, in some embodiments, includes a code (e.g., 916) for pairing the first external device and the computer system. In some embodiments, while the first external device displays the pairing user interface and/or the code (e.g., 916), the computer system (e.g., 700) receives the code (e.g., FIG. 9D, electronic device 700 scanning code 916 from device 912) (e.g., scans the code and/or reads the code via one or more cameras that are in communication with the computer system) and, in response to receiving the code, pairs with the first external device (e.g., 912) (e.g., transmits information corresponding to the code to the first external device). In response to the computer system (e.g., 700) pairing with the first external device (e.g., 912), the external device (e.g., 912) provides the personalized accessory setup information associated with the first personalized accessory to the computer system (e.g., 700) (e.g., transmits the personalized accessory setup information via wireless signal (e.g., WiFi and/or Bluetooth) and/or via optical signal (e.g., QR code and/or other optical display of information)). In some embodiments, the pairing user interface and/or the code includes the personalized accessory setup information associated with the first personalized accessory such that scanning of the pairing user interface and/or the code by the computer system provides the computer system with the personalized accessory setup information associated with the first personalized accessory.

Causing the external device to display the prompt to share the personalized accessory setup information associated with the first personalized accessory provides the user with visual feedback about the state of the system (e.g., that the external device has detected a nearby computer system that requires the personalized accessory setup information associated with the first personalized accessory), thereby improving visual feedback.

In some embodiments, the personalized accessory includes an optical lens (e.g., a corrective optical lens (e.g., for correcting a user's vision)). In some embodiments, the computer system is a head-mounted system, and the personalized accessory includes one or more optical lenses (e.g., prescription and/or non-prescription optical lenses) through which the user views content displayed by the one or more display generation components. Modifying one or more settings of the computer system based on personalized accessory setup information associated with a personalized optical lens enhances the operability of the computer system by helping the user to provide proper inputs and reducing user mistakes when operating/interacting with the computer system (e.g., by helping the user to accurately view information displayed by the computer system and/or helping the user to provide proper gaze-based and/or eye-movement-based inputs).

In some embodiments, the personalized accessory includes an optical lens through which a user views content displayed by the one or more display generation components (e.g., 702). Modifying one or more settings of the computer system based on personalized accessory setup information associated with a personalized optical lens that the user uses to view content displayed by the computer system enhances the operability of the computer system by helping the user to provide proper inputs and reducing user mistakes when operating/interacting with the computer system (e.g., by helping the user to accurately view information displayed by the computer system and/or helping the user to provide proper gaze-based and/or eye-movement-based inputs).

In some embodiments, the personalized accessory setup information includes vision correction prescription information associated with the optical lens. Modifying one or more settings of the computer system based on personalized accessory setup information associated with a personalized optical lens that the user uses to view content displayed by the computer system enhances the operability of the computer system by helping the user to provide proper inputs and reducing user mistakes when operating/interacting with the computer system (e.g., by helping the user to accurately view information displayed by the computer system and/or helping the user to provide proper gaze-based and/or eye-movement-based inputs).

In some embodiments, aspects/operations of methods 800, 850, 1050, 1200, and/or 1400 may be interchanged, substituted, and/or added between these methods. For example, representations of personalized accessories connected and/or detected in method 1000 are displayed in the settings user interface of method 1050. For brevity, these details are not repeated here.

FIG. 10B is a flow diagram of an exemplary method 1050 for managing personalized accessories (e.g., corrective lenses 11.3.2-216 or lenses 1-218) of one or more users of a computer system, in accordance with some embodiments. In some embodiments, method 1050 is performed at a computer system (e.g., 700) (e.g., computer system 101 in FIG. 1A) including one or more display generation components (e.g., 702) (e.g., display generation component 120 in FIGS. 1A, 3, and 4) (e.g., a heads-up display, a display, a touchscreen, a projector, etc.) and one or more input devices (e.g., 704) (e.g., one or more buttons, one or more eye movement trackers, one or more hand movement trackers, one or more cameras (e.g., a camera (e.g., color sensors, infrared sensors, and other depth-sensing cameras))). In some embodiments, the method 1050 is governed by instructions that are stored in a non-transitory (or transitory) computer-readable storage medium and that are executed by one or more processors of a computer system, such as the one or more processors 202 of computer system 101 (e.g., control 110 in FIG. 1A). Some operations in method 1050 are, optionally, combined and/or the order of some operations is, optionally, changed.

In some embodiments, the computer system (e.g., 700) displays (1052), via the one or more display generation components (e.g., 702), a settings user interface (e.g., 952), including concurrently displaying: a representation of a first personalized accessory (1054) (e.g., 954A, 954B, 954C) (e.g., a first set of prescription optical lenses) associated with the computer system (e.g., registered to the computer system and/or associated with (e.g., corresponding to) one or more users that are registered on the computer system); and a representation of a second personalized accessory (1056) (e.g., 954A, 954B, 954C) associated with the computer system (e.g., registered to the computer system and/or associated with (e.g., corresponding to) one or more users that are registered on the computer system) and different from the first personalized accessory (e.g., a second set of prescription optical lenses), wherein the representation of the first personalized accessory is visually distinguished from the representation of the second personalized accessory in a manner that indicates that biometric enrollment associated with the first personalized accessory has been completed and that biometric enrollment associated with the second personalized accessory has not been completed (e.g., representation 954A includes visual indications 960A, 960B, and representations 954B, 954C do not).

In some embodiments, in accordance with a determination that biometric enrollment associated with (e.g., corresponding to) a respective personalized accessory has been completed, the representation of the respective accessory is displayed with a first visual characteristic (e.g. with a textual indication that enrollment has been completed, with a visual user interface object indicating that enrollment has been completed, in a first color, and/or in a first area of the display); and in accordance with a determination that biometric enrollment associated with (e.g., corresponding to) the respective personalized accessory has not been completed, the representation of the respective accessory is displayed with a second visual characteristic (e.g. with a textual indication that enrollment has not been completed, with a visual user interface object indicating that enrollment has not been completed, in a second color, and/or in a second area of the display), different from the first visual characteristic.

Displaying a settings user interface in which a representation of a first personalized accessory is displayed in a manner that indicates that biometric enrollment associated with the first personalized accessory has been completed and a representation of a second personalized accessory is displayed in a manner that indicates that biometric enrollment associated with the second personalized accessory has not been completed provides the user with visual feedback about the state of the device (e.g., that biometric enrollment has been completed for the first personalized accessory but has not been completed for the second personalized accessory), thereby providing improved visual feedback to the user.

In some embodiments, the representation of the first personalized accessory (e.g., 954A) is displayed in a first manner (e.g., displayed with a first visual indication and/or displayed with a first visual style (e.g., font, color, and/or size)) indicating that biometric enrollment (e.g., eye gaze tracking enrollment, hand movement enrollment, biometric authentication enrollment (e.g., facial scan authentication enrollment, eye scan authentication enrollment, and/or iris scan authentication enrollment)) associated with (e.g., corresponding to) the first personalized accessory has been completed (e.g., with visual indications 960A, 960B); and the representation of the second personalized accessory (e.g., 954B, 954C) is displayed in a second manner different from the first manner (e.g., displayed without the first visual indication, displayed with a second visual indication different from the first visual indication, and/or displayed with a second visual style (e.g., font, color, and/or size) different from the first visual style) indicating that biometric enrollment associated with (e.g., corresponding to) the second personalized accessory has not been completed (e.g., without visual indications 960A, 960B). Displaying a settings user interface in which a representation of a first personalized accessory is displayed in a manner that indicates that biometric enrollment associated with the first personalized accessory has been completed and a representation of a second personalized accessory is displayed in a manner that indicates that biometric enrollment associated with the second personalized accessory has not been completed provides the user with visual feedback about the state of the device (e.g., that biometric enrollment has been completed for the first personalized accessory but has not been completed for the second personalized accessory), thereby providing improved visual feedback to the user.

In some embodiments, the settings user interface (e.g., 952) includes a first region (e.g., "PRESCRIPTION ACCESSORIES" of FIG. 9J) containing (e.g., displaying) representations of one or more personalized accessories (e.g., 954A, 954B) associated with a first user (e.g., a first authorized user and/or a first user registered on the computer system); and the settings user interface (e.g., 952) includes a second region (e.g., "GUEST ACCESSORIES" of FIG. 9J) (e.g., a second region separate from the first region and/or does not overlap the first region) containing (e.g., displaying) representations of one or more personalized accessories (e.g., 954C) associated with one or more guest users (e.g., one or more non-registered users (e.g., not registered on the computer system)). Displaying a settings user interface in which a first region lists personalized accessories associated with a first user, and a second region lists personalized accessories associated with one or more guest users provides the user with visual feedback about the state of the device (e.g., that the computer system has stored information for the one or more personalized accessory for the first user and the one or more personalized accessories for one or more guest users), thereby providing improved visual feedback to the user.

In some embodiments, the representation of the first personalized accessory (e.g., 954A) is displayed in a third manner (e.g., displayed with a third visual indication and/or displayed in a third visual style) indicating that eye gaze tracking enrollment associated with the first personalized accessory has been completed (e.g., with visual indication 960A and/or 960B) (e.g., indicating that a user has completed one or more eye gaze tracking steps and/or instructions (e.g., steps and/or instructions in which the user performs one or more predefined tasks with their eyes) while the first personalized accessory was connected to the computer system).

In some embodiments, representations of one or more personalized accessories (e.g., 954B, 954C) (e.g., other than the first personalized accessory) for which eye gaze tracking enrollment has not completed are not displayed in the third manner (e.g., without visual indication 960A and/or 960B) (e.g., are displayed in a different manner). In some embodiments, at a first time, while the representation of the first personalized accessory (e.g., 954A) is displayed in the third manner (e.g., with visual indication 960A and/or 960B), the representation of the second personalized accessory (e.g., 954B and/or 954C) is not displayed in the third manner (e.g., without visual indication 960A and/or 960B) (e.g., is displayed in a different manner) indicating that eye gaze tracking enrollment associated with the second personalized accessory has not been completed at the first time. At a second time subsequent to the first time, while the representation of the first personalized accessory (e.g., 954A) is displayed in the third manner (e.g., with visual indication 960A and/or 960B), the representation of the second personalized accessory (e.g., 954B and/or 954C) is also displayed in the third manner (e.g., with visual indication 960A and/or 960B added to representation 954B and/or 954C), indicating that eye gaze tracking enrollment associated with the second personalized accessory has been completed (for example, after the user completes eye gaze tracking enrollment for the second personalized accessory). In some embodiments, the computer system is a head-mounted system. In some embodiments, while the user is using the head-mounted system, the user provides one or more user inputs based on the gaze of the user and, accordingly, the head-mounted system tracks the gaze of the user. For example, in some embodiments, the user selects displayed objects and/or interacts with displayed objects by gazing at the displayed object (and, optionally, performing another gesture (e.g., hand gesture, head gesture, and/or face gesture)). In some embodiments, the computer system performs gaze tracking enrollment in order to improve the accuracy and/or precision with which the computer system is able to track eye gaze movements of the user.

Displaying the representation of the first personalized accessory in the third manner indicating that eye gaze tracking enrollment associated with the first personalized accessory has been completed provides the user with visual feedback about the state of the device (e.g., that eye gaze tracking enrollment has been completed for the first personalized accessory), thereby providing improved visual feedback to the user.

In some embodiments, the representation of the first personalized accessory (e.g., 954A) is displayed in a fourth manner (e.g., displayed with a fourth visual indication and/or displayed in a fourth visual style) indicating that hand movement tracking enrollment associated with the first personalized accessory has been completed (e.g., with visual indications 960A and/or 960B) (e.g., indicating that a user has completed one or more hand movement tracking steps and/or instructions (e.g., steps and/or instructions in which the user performs one or more predefined tasks with their hands) while the first personalized accessory was connected to the computer system).

In some embodiments, representations of one or more personalized accessories (e.g., other than the first personalized accessory) for which hand movement tracking enrollment has not completed are not displayed in the fourth manner (e.g., without visual indication 960A and/or 960B) (e.g., are displayed in a different manner). In some embodiments, at a first time, while the representation of the first personalized accessory (e.g., 954A) is displayed in the fourth manner (e.g., with visual indication 960A and/or 960B), the representation of the second personalized accessory (e.g., 954B and/or 954C) is not displayed in the fourth manner (e.g., without visual indication 960A and/or 960B) (e.g., is displayed in a different manner) indicating that hand movement tracking enrollment associated with the second personalized accessory has not been completed at the first time. At a second time subsequent to the first time, while the representation of the first personalized accessory (e.g., 954A) is displayed in the fourth manner (e.g., with visual indication 960A and/or 960B), the representation of the second personalized accessory (e.g., 954B and/or 954C) is also displayed in the fourth manner (e.g., with visual indication 960A and/or 960B), indicating that hand movement tracking enrollment associated with the second personalized accessory has been completed (for example, after the user completes hand movement tracking enrollment for the second personalized accessory). In some embodiments, the computer system is a head-mounted system. In some embodiments, while the user is using the head-mounted system, the user provides one or more user inputs based on movement of the user's hands and, accordingly, the head-mounted system detects movements of the user's hands. In some embodiments, the computer system performs hand movement tracking enrollment in order to improve the accuracy and/or precision with which the computer system is able to track hand movements of the user.

Displaying the representation of the first personalized accessory in the fourth manner indicating that hand movement tracking enrollment associated with the first personalized accessory has been completed provides the user with visual feedback about the state of the device (e.g., that hand movement tracking enrollment has been completed for the first personalized accessory), thereby providing improved visual feedback to the user.

In some embodiments, the representation of the first personalized accessory (e.g., 954A) is displayed in a fifth manner (e.g., displayed with a fifth visual indication and/or displayed in a fifth visual style) indicating that biometric authentication enrollment (e.g., eye-based (e.g., iris-based) authentication, facial-scan authentication, fingerprint-based authentication) associated with the first personalized accessory has been completed (e.g., with visual indications 960A and/or 960B) (e.g., indicating that a user has completed one or more biometric authentication steps and/or instructions (e.g., steps and/or instructions in which the user provides biometric information) while the first personalized accessory was connected to the computer system).

In some embodiments, representations of one or more personalized accessories (e.g., 954B and/or 954C) (e.g., other than the first personalized accessory) for which biometric authentication enrollment has not completed are not displayed in the fifth manner (e.g., without visual indication 960A and/or 960B) (e.g., are displayed in a different manner). In some embodiments, at a first time, while the representation of the first personalized accessory (e.g., 954A) is displayed in the fifth manner (e.g., with visual indication 960A and/or 960B), the representation of the second personalized accessory (e.g., 954B and/or 954C) is not displayed in the fifth manner (e.g., without visual indication 960A and/or 960B) (e.g., is displayed in a different manner) indicating that biometric authentication enrollment associated with the second personalized accessory has not been completed at the first time. At a second time subsequent to the first time, while the representation of the first personalized accessory (e.g., 954A) is displayed in the fifth manner (e.g., with visual indication 960A and/or 960B), the representation of the second personalized accessory (e.g., 954B and/or 954C) is also displayed in the fifth manner (e.g., with visual indication 960A and/or 960B), indicating that biometric authentication enrollment associated with the second personalized accessory has been completed (for example, after the user completes biometric authentication enrollment for the second personalized accessory). Displaying the representation of the first personalized accessory in the fifth manner indicating that biometric authentication enrollment associated with the first personalized accessory has been completed provides the user with visual feedback about the state of the device (e.g., that biometric authentication enrollment has been completed for the first personalized accessory), thereby providing improved visual feedback to the user.

In some embodiments, while concurrently displaying the representation of the first personalized accessory (e.g., 954A, 954B, 954C) and the representation of the second personalized accessory (e.g., 954A, 954B, 954C) (1058): the computer system (e.g., 700) displays (1060), via the one or more display generation components (e.g., 702), (e.g., in a region corresponding to the first personalized accessory) personalized accessory setup information corresponding to the first personalized accessory (e.g., 962A, 962B, 962C), wherein the personalized accessory setup information corresponding to the first personalized accessory displays one or more characteristics of the first personalized accessory (e.g., lens prescription information for a first personalized optical lens).

In some embodiments, while concurrently displaying the representation of the first personalized accessory (e.g., 954A) and the representation of the second personalized accessory (e.g., 954B), the computer system concurrently displays the personalized accessory setup information corresponding to the first personalized accessory (e.g., 962A) (e.g., prescription information corresponding to the first personalized accessory and/or other characteristics of the first personalized accessory), and personalized accessory setup information corresponding to the second personalized accessory (e.g., 962B) (e.g., prescription information corresponding to the second personalized accessory and/or other characteristics of the second personalized accessory) (e.g., in a region corresponding to the second personalized accessory), wherein the personalized accessory setup information corresponding to the second personalized accessory displays one or more characteristics of the second personalized accessory.

In some embodiments, at a first time, while the representation of the first personalized accessory (e.g., 954A) is displayed with personalized accessory setup information (e.g., 962A) corresponding to the first personalized accessory, the representation of the second personalized accessory (e.g., 954B) is not displayed with personalized accessory setup information corresponding to the second personalized accessory (e.g., is displayed without information 962B), indicating that personalized accessory setup information corresponding to the second personalized accessory has not been received by the computer system. At a second time subsequent to the first time, the representation of the second personalized accessory (e.g., 954B) is displayed with personalized accessory setup information corresponding to the second personalized accessory (e.g., 962B), indicating that personalized accessory setup information corresponding to the second personalized accessory has been received by the computer system (e.g., after the user and/or an external device provides personalized accessory setup information corresponding to the second personalized accessory).

Displaying the personalized accessory setup information corresponding to the first personalized accessory provides the user with visual feedback about the state of the device (e.g., that the computer system has stored information pertaining to the one or more characteristics of the first personalized accessory), thereby providing improved visual feedback to the user.

In some embodiments, the first personalized accessory is a first optical lens (e.g., a corrective optical lens (e.g., for correcting a user's vision)) (e.g., a first pair of optical lenses) and the second personalized accessory is a second optical lens (e.g., a second pair of optical lenses). In some embodiments, the computer system is a head-mounted system, and the personalized accessory includes one or more optical lenses (e.g., prescription and/or non-prescription optical lenses) through which the user views content displayed by the one or more display generation components. Displaying a settings user interface in which a representation of a first personalized optical lens is displayed in a manner that indicates that biometric enrollment associated with the first personalized optical lens has been completed and a representation of a second personalized optical lens is displayed in a manner that indicates that biometric enrollment associated with the second personalized optical lens has not been completed provides the user with visual feedback about the state of the device (e.g., that biometric enrollment has been completed for the first personalized optical lens but has not been completed for the second personalized optical lens), thereby providing improved visual feedback to the user.

In some embodiments, while concurrently displaying the representation of the first personalized accessory (e.g., 954A, 954B, 954C) and the representation of the second personalized accessory (e.g., 954A, 954B, 954C), the computer system (e.g., 700) detects a gesture (e.g., 966, 968) (e.g., a touch gesture, a non-touch gesture, and/or an air gesture); and in response to detecting the gesture, the computer system initiates a process to delete information about the first personalized accessory (e.g., displaying "delete" option 970D and/or 972D) (and, in some embodiments, deleting the information about the first personalized accessory) without initiating a process to delete information about the second personalized accessory. In some embodiments, while concurrently displaying the representation of the first personalized accessory and the representation of the second personalized accessory, the computer system detects a second gesture, and in response to detecting the second gesture, the computer system initiates a process to delete information about the second personalized accessory without initiating a process to delete information about the first personalized accessory. Initiating a process to delete information about the first personalized accessory in response to detecting the gesture provides the user with visual feedback about the state of the device (e.g., that the computer system has detected the gesture), thereby providing improved visual feedback to the user.

In some embodiments, while the computer system (e.g., 700) is logged into a user account corresponding to a first authorized user (e.g., a first registered user (e.g., a user registered on the computer system)): the computer system displays, via the one or more display generation components (e.g., 702), the settings user interface (e.g., 952), including concurrently displaying: within a first region (e.g., "PRESCRIPTION ACCESSORIES" in FIG. 9J) of the settings user interface (e.g., 952), representations of one or more personalized accessories associated with the first authorized user (e.g., 954A, 954B), including representation of a third personalized accessory (e.g., 954A, 954B) associated with the first authorized user; and within a second region (e.g., "GUEST ACCESSORIES" in FIG. 9J) of the settings user interface (e.g., 952) (e.g., a second region that is separate from the first region and/or that does not overlap with the first region), representations of one or more personalized accessories associated with one or more guest users (e.g., 954C) (e.g., one or more non-registered users (e.g., not registered on the computer system)), including a representation of a first guest personalized accessory (e.g., 954C), and a second selectable option (e.g., 972D) (e.g., a button and/or an affordance) that is selectable to remove (in some embodiments, selectable to initiate a process for removing) the representation of the first guest personalized accessory (e.g., 954C) from the settings user interface (e.g., 952) (e.g., selectable to remove information pertaining to the first guest personalized accessory from the computer system).

In some embodiments, the second selectable option (e.g., 972D) is displayed in the second region (e.g., "GUEST ACCESSORIES" in FIG. 9L) of the settings user interface (e.g., 952). In some embodiments, the second selectable option (e.g., 972D) is displayed in response to one or more user inputs (e.g., 968) (e.g., one or more predefined user inputs) (e.g., a swipe gesture on the representation of the first guest personalized accessory). In some embodiments, while displaying the settings user interface (e.g., 952), the computer system detects, via the one or more input devices, a user input (e.g., a touch input, a non-touch input, an air gesture (e.g., a pinch air gesture and/or a tap air gesture) (e.g., a first air gesture that has a directionality and/or position (e.g., three-dimensional position) that corresponds to the first displayed element) and/or a user gaze corresponding to the first displayed element (e.g., a user gaze that dwells on the first displayed element for a threshold duration of time and/or a user gaze in combination with a gesture)) corresponding to selection of the second selectable option (e.g., 972D); and in response to detecting the user input, the computer system ceases display of the representation (e.g., 954C) of the first guest personalized accessory within the settings user interface (e.g., 952) (or, in some embodiments, initiating a process to cease display of the representation of the first guest personalized accessory within the settings user interface) (and, optionally, in some embodiments, removing at least some information corresponding to the first guest personalized accessory from the computer system). In some embodiments, the computer system ceases display of the representation of the first guest personalized accessory (e.g., 954C) within the settings user interface (e.g., 952) while maintaining display of the representation of the third personalized accessory (e.g., 954A and/or 954B) within the settings user interface (e.g., 952). Displaying a selectable option that is selectable to remove the representation of first guest personalized accessory from the settings user interface allows a user to remove the representation of first guest personalized accessory from the settings user interface with fewer user inputs, thereby reducing the number of user inputs required to perform an operation.

In some embodiments, aspects/operations of methods 800, 850, 1000, 1200, and/or 1400 may be interchanged, substituted, and/or added between these methods. For example, representations of personalized accessories connected and/or detected in method 1000 are displayed in the settings user interface of method 1050. For brevity, these details are not repeated here.

FIGS. 11A-11H illustrate examples of setting up a computer system. In some embodiments, a user sets up a new computer system (e.g., a computer system that is not yet associated with the user) by importing user information from a computer system that is already associated with the user and has access to user information corresponding to the user. FIG. 12 is a flow diagram of an exemplary method 1200 for setting up a computer system. The user interfaces in FIGS. 11A-11H are used to illustrate the processes described below, including the processes in FIG. 12.

Figure 11A:
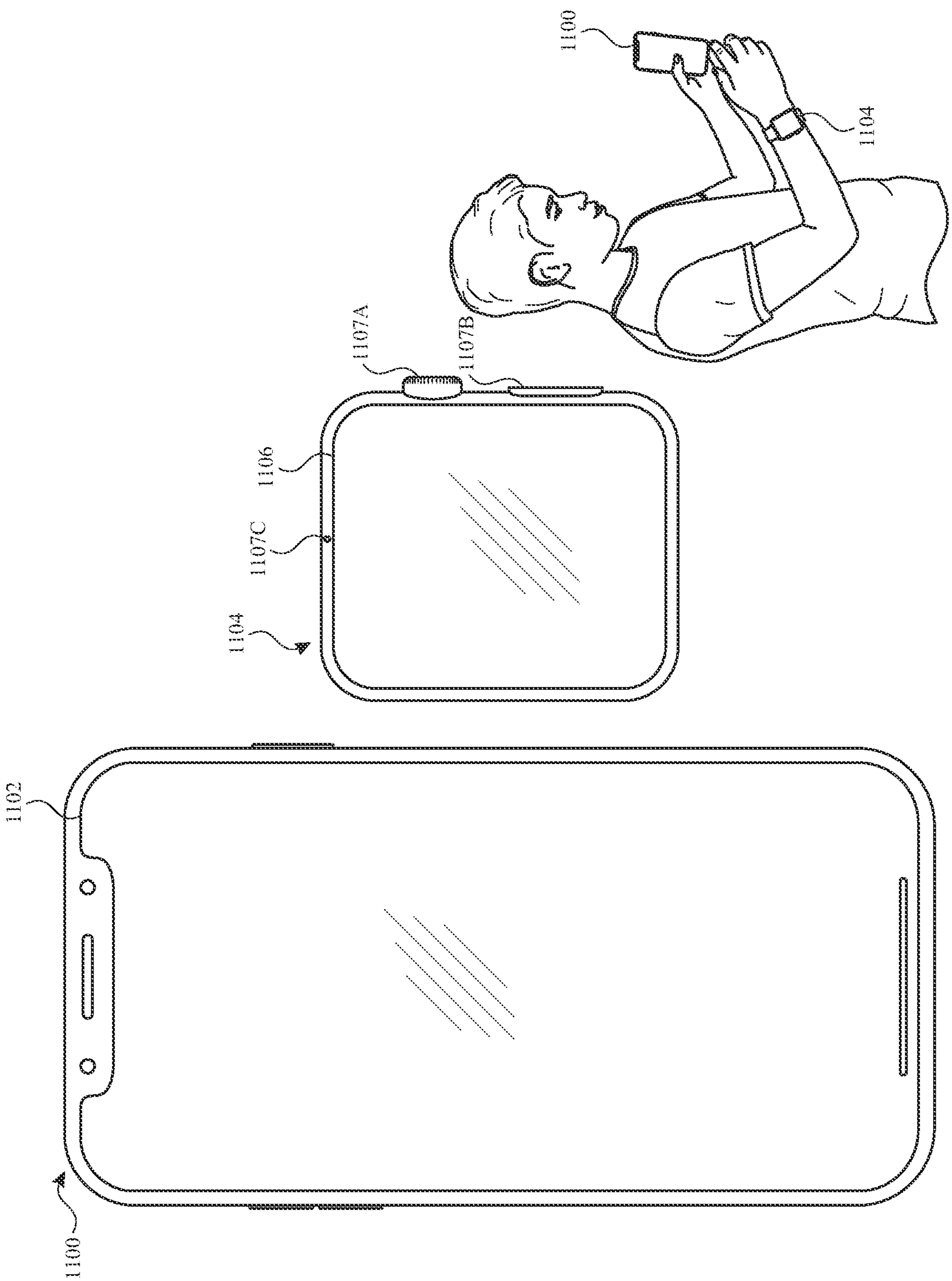
FIGS. 11A-11H illustrate example techniques for setting up a computer system, in accordance with some embodiments.

FIG. 11A depicts electronic device 1100, which is a smart phone that includes touch-sensitive display 1102. In some embodiments described below, electronic device 1100 is a smart phone. In some embodiments, electronic device 1100 is a tablet, a wearable device, a wearable smartwatch device, a head-mounted system (e.g., a headset), or other computer system that includes and/or is in communication with one or more display devices (e.g., display screen, project device, or the like). Electronic device 1100 is a computer system (e.g., computer system 101 in FIG. 1A).

FIG. 11A also depicts electronic device 1104, which is a wearable smartwatch device that includes touch-sensitive display 1106, rotatable and depressible input mechanism 1107A, button 1107B, and one or more input sensors 1107C (e.g., one or more cameras, one or more movement sensors (e.g., accelerometers and/or gyroscopes), eye gaze trackers, hand movement trackers, and/or head movement trackers). In some embodiments described below, electronic device 1104 is a wearable device. In some embodiments, electronic device 1104 is a smart phone, a wearable device, a wearable smartwatch device, a head-mounted system (e.g., a headset), or other computer system that includes and/or is in communication with one or more display devices. Electronic device 1104 is also a computer system (e.g., computer system 101 in FIG. 1A).

It can be seen in FIG. 11A that in the example scenario depicted in FIG. 11A, a user is wearing electronic device 1104 while holding electronic device 1100 nearby. In FIG. 11A, electronic device 1100 is an electronic device that is already associated with the user (e.g., the user is logged into electronic device 1100), while electronic device 1104 is a new device that is being set up (e.g., for the first time), and is not yet associated with the user.

Figure 11B:
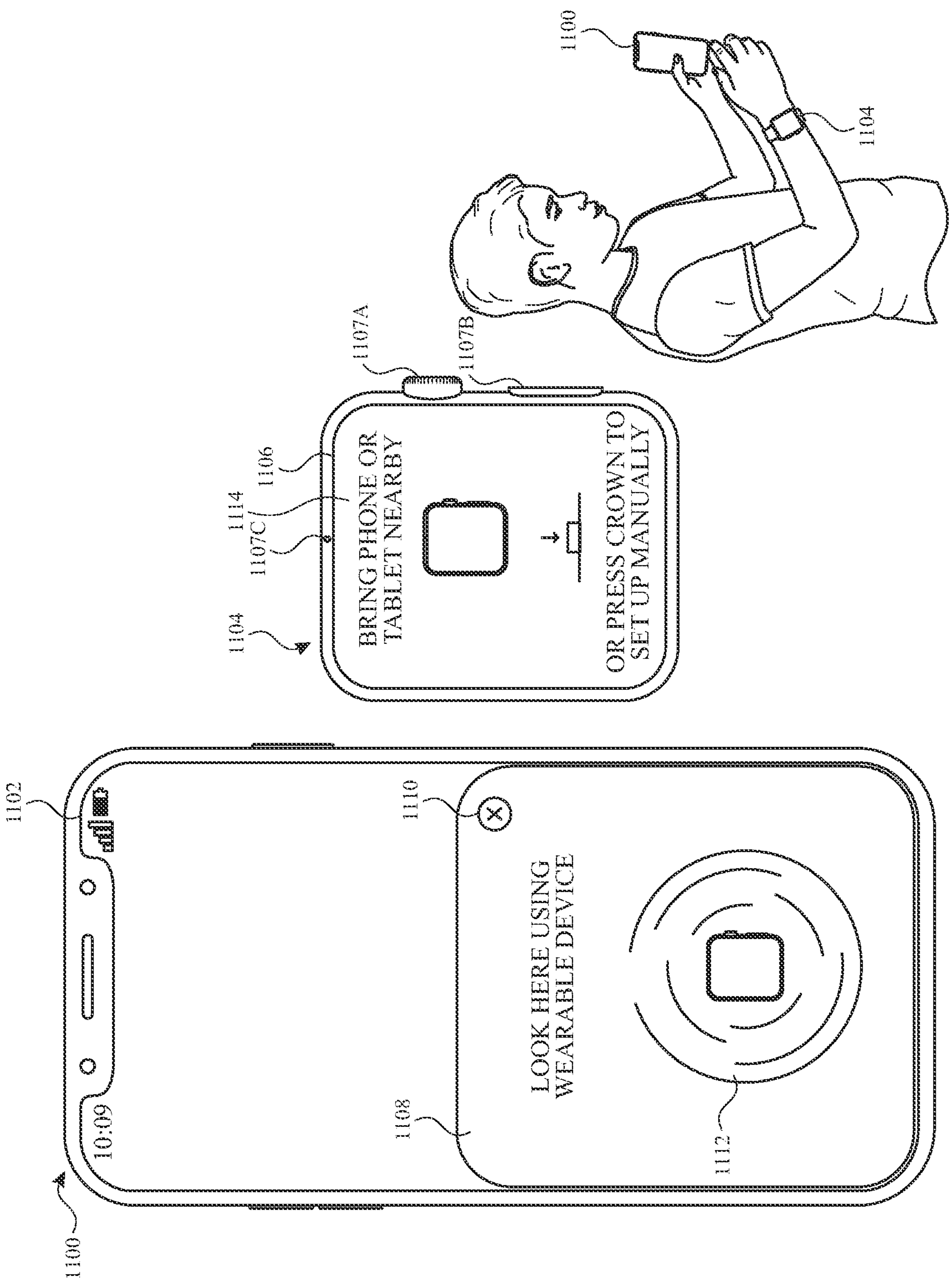

In FIG. 11B, electronic device 1104 and/or electronic device 1100 determine that one or more quick set up criteria are satisfied. In some embodiments, the one or more quick set up criteria includes a criterion that is satisfied if electronic device 1104 is in a set up state. In some embodiments, the one or more quick set up criteria includes a criterion that is satisfied if electronic device 1100 is in an unlocked state (e.g., an authorized user is logged into electronic device 1100). In some embodiments, the one or more quick set up criteria includes a criterion that is satisfied if electronic device 1100 satisfies proximity criteria relative to electronic device 1104 (e.g., is within a threshold distance of electronic device 1104).

Furthermore, in FIG. 11B, electronic device 1104 determines that it is being worn by a user. In the depicted embodiments, electronic device 1104 is a wearable smartwatch device, and it is worn on the wrist of the user. In other embodiments, electronic device 1104 is a head-mounted system, and the determination that electronic device 1104 is being worn by a user is a determination that electronic device 1104 is being worn on the head of the user.

In accordance with the determination that the one or more quick set up criteria are satisfied, and in accordance with the determination that electronic device 1104 is being worn by a user, electronic device 1104 displays user interface 1114 that instructs the user to place electronic device 1100 nearby electronic device 1104, and electronic device 1100 displays user interface 1108 that instructs the user to look at user interface 1108 on electronic device 1100 using electronic device 1104 (e.g., using one or more cameras on electronic device 1104). User interface 1108 includes object 1110 that is selectable to ceased display of user interface 1108, and also displays code 1112 that can be scanned using electronic device 1104 in order to pair electronic device 1104 and electronic device 1100. Once the two devices are paired, electronic device 1100, in some embodiments, transmits user information or other device setup information to electronic device 1104 in order to quickly set up electronic device 1104 without the user having to enter user information (e.g., user account information, user preference information, and/or biometric information) or other setup information (e.g., networking information and/or personalized accessory information) into electronic device 1104.

Figure 11C:
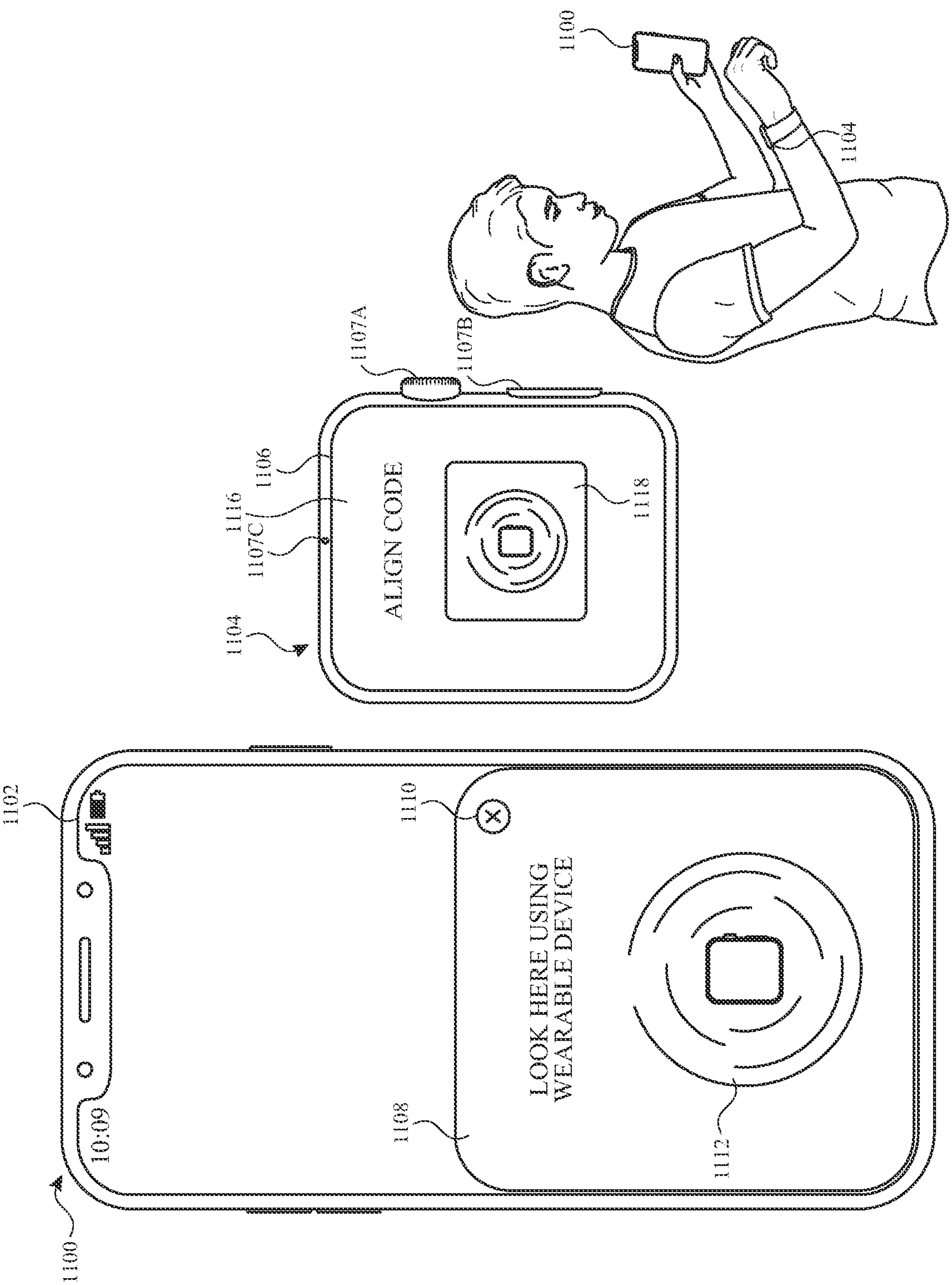

In FIG. 11C, after displaying user interface 1114, electronic device 1104 displays user interface 1116, which displays content that is within view of a camera (e.g., input devices 1107C) of electronic device 1104 and instructs the user to align code 1112 with box 1118. In FIG. 11C, the user points input device 1107C (which includes a camera) at electronic device 1100 in order to scan code 1112.

In the depicted embodiment, electronic device 1104 is a wearable smartwatch device, and the user scans code 1112 by pointing camera input device 1107C towards electronic device 1100. In some embodiments, electronic device 1104 is a head-mounted system that includes one or more forward-facing cameras mounted on the user's head, such that the one or more forward-facing cameras capture content that is visible directly in front of the user's head and/or face. In such scenarios, the user scans code 1112 displayed on electronic device 1100 using electronic device 1104 by placing electronic device 1104 on his or her head, and looking at electronic device 1100 (e.g., pointing his or her face towards electronic device 1100).

Figure 11D:
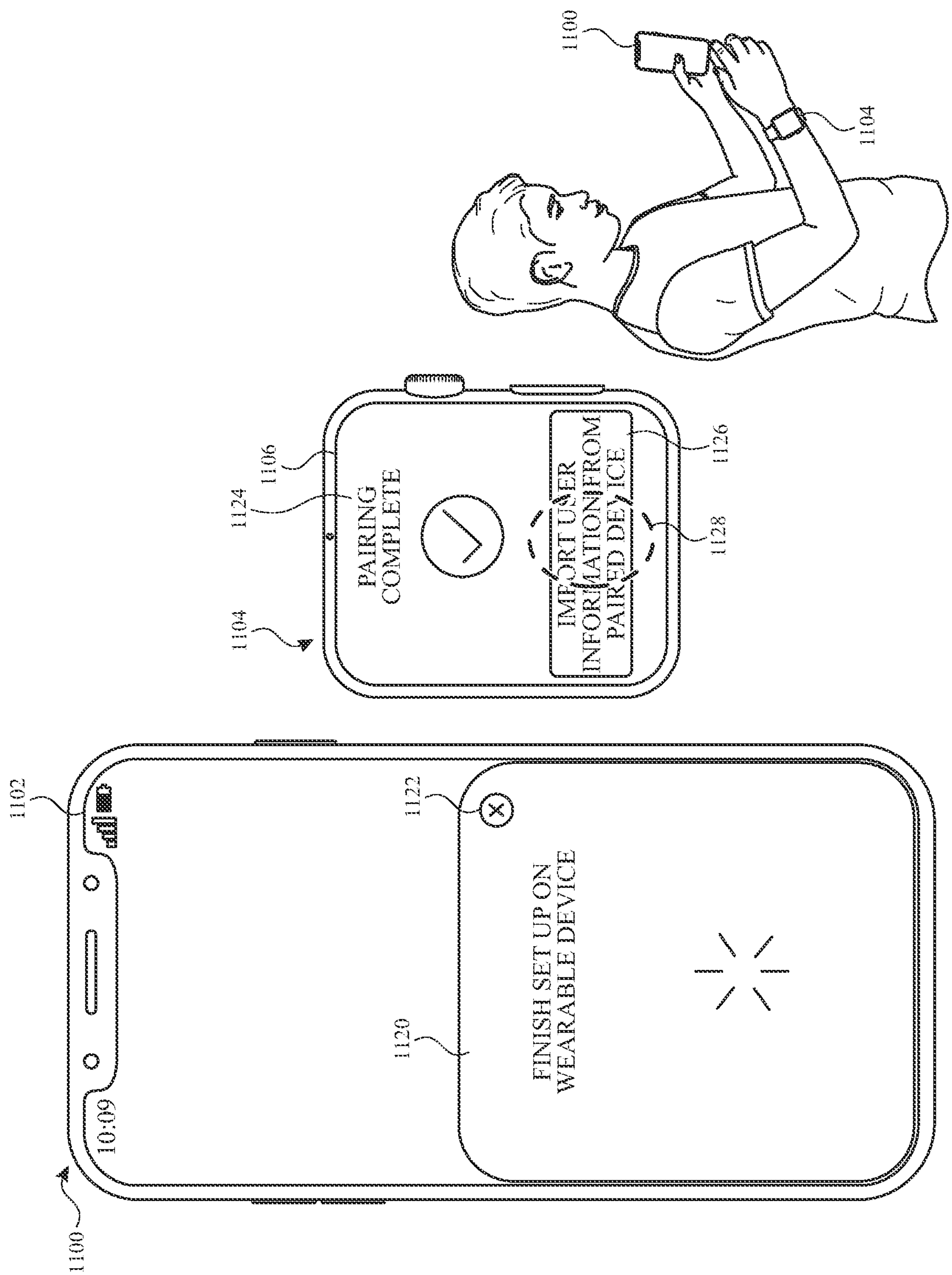

At FIG. 11D, electronic device 1104 determines that it has successfully scanned code 1112 and, in response, displays indication 1124 indicating that pairing of electronic device 1104 and electronic device 1100 in complete. Electronic device 1100 determines that electronic device 1104 has successfully scanned code 1112 and/or has paired with electronic device 1100, and displays user interface 1120 which instructs the user to finish set up on wearable electronic device 1104. User interface 1120 includes object 1122 that is selectable to cease display of user interface 1120.

In FIG. 11D, in response to the successful scanning of code 1112 and pairing of electronic device 1104 with electronic device 1100, electronic device 1104 displays object 1126 that is selectable to initiate and/or cause transfer of user information from electronic device 1100 to electronic device 1104.

At FIG. 11D, electronic device 1104 detects user input 1128 corresponding to selection of object 1126. In the depicted embodiment, user input 1128 is a touch input via touch-screen display 1106. However, in some embodiments, user input 1128 includes non-touch inputs, such as a gesture, an air gesture, and/or a gaze-based gesture by the user. For example, in some embodiments, electronic device 1104 is a head-mounted system, and the user selects object 1126 by gazing at object 1126 and performing a pinch air gesture.

In response to user input 1128, electronic device 1100 transmits secure information, including user information and/or device setup information, to electronic device 1104.

In various embodiments, secure information includes account information (e.g., username, login ID, and/or account password); networking information (e.g., wireless network name and/or password); personalized accessory information (e.g., information pertaining to one or more optical lenses (e.g., prescription optical lenses or non-prescription optical lenses) and/or one or more personalized controllers or input devices); user biometric information (e.g., height, eye color, and/or biometric authentication information); and/or user preferences (e.g., favorite contacts, email accounts, location settings, privacy settings, and/or language settings).

Figure 11E:
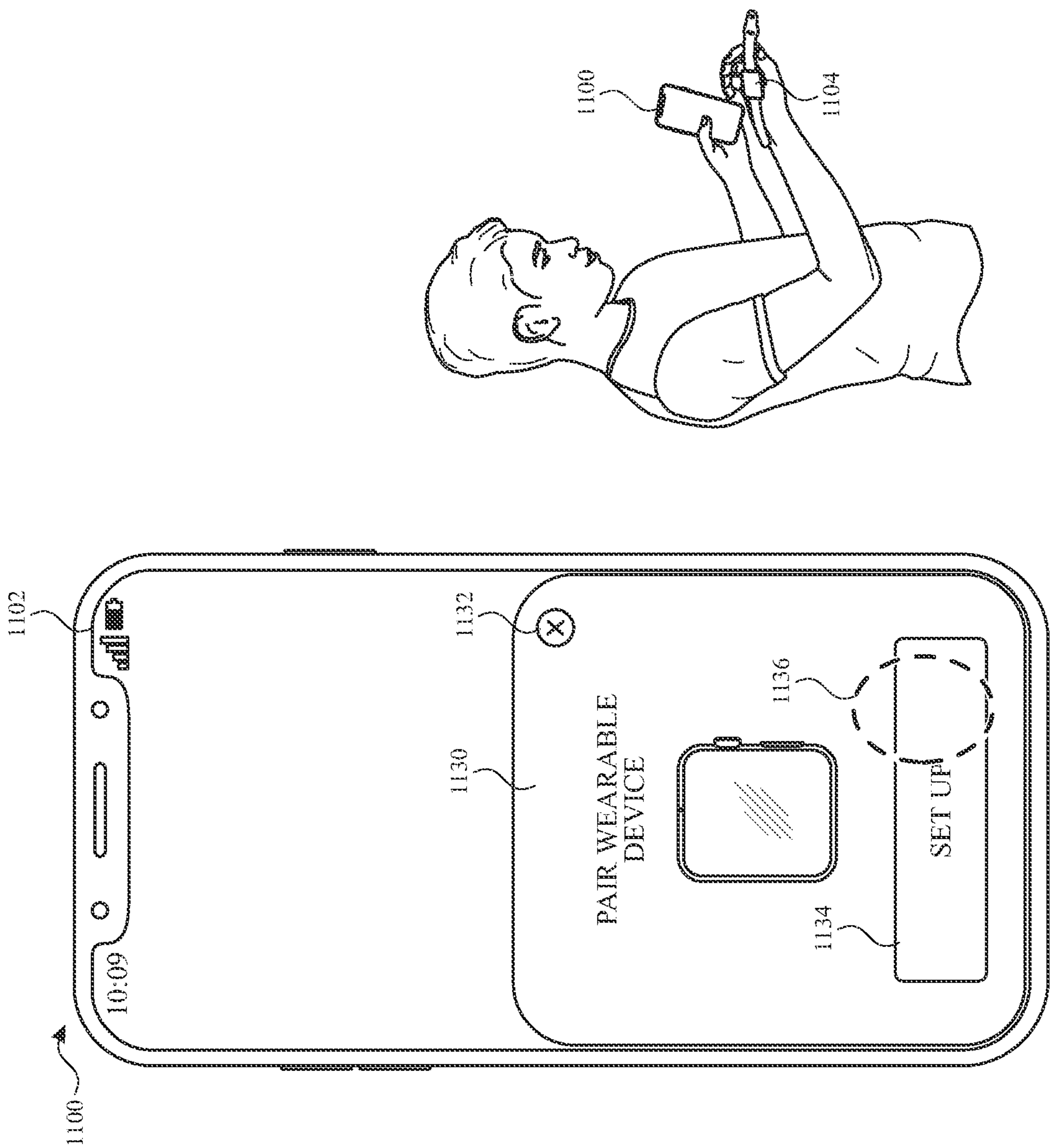
Figure 11F:
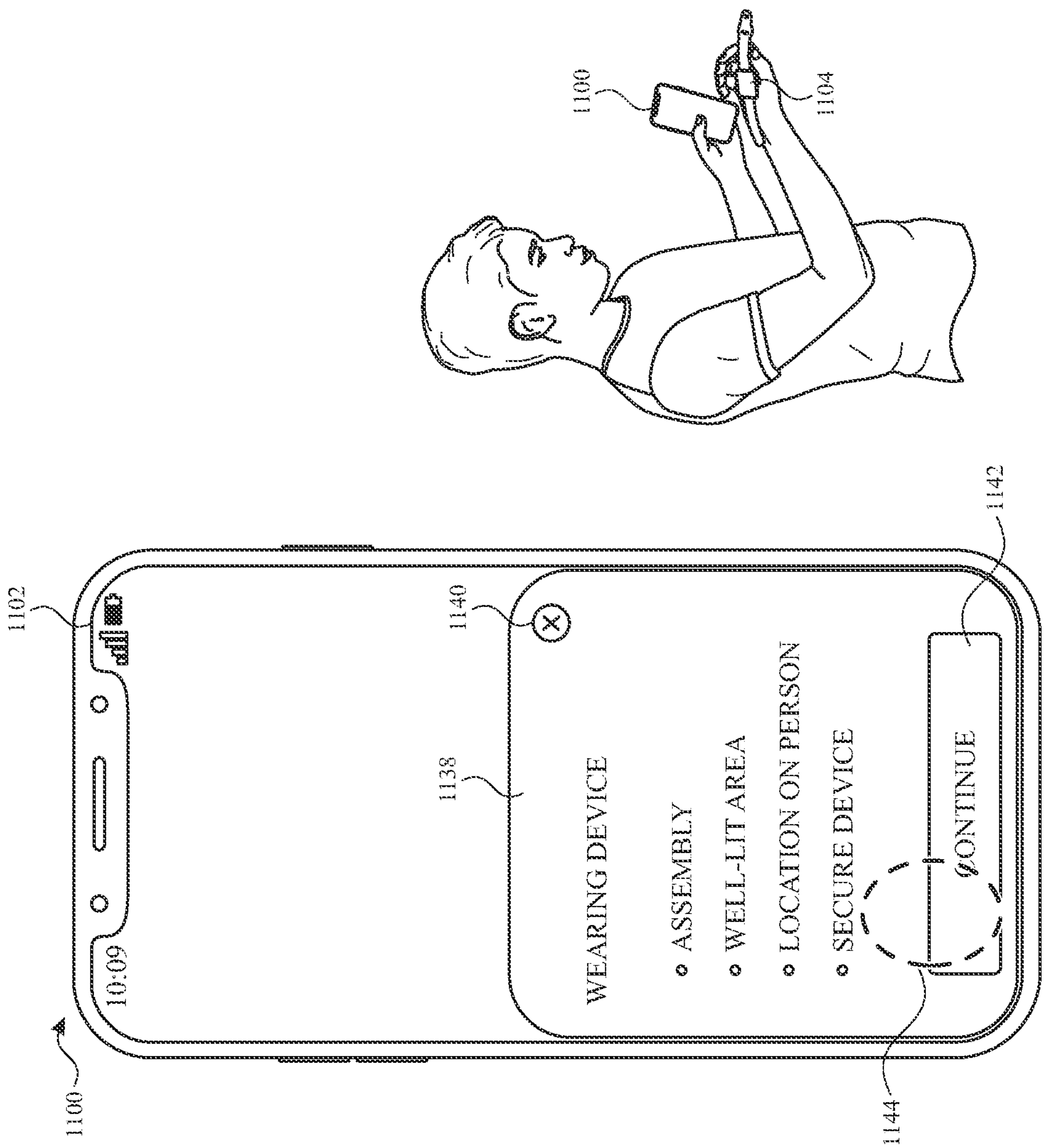
Figure 11G:
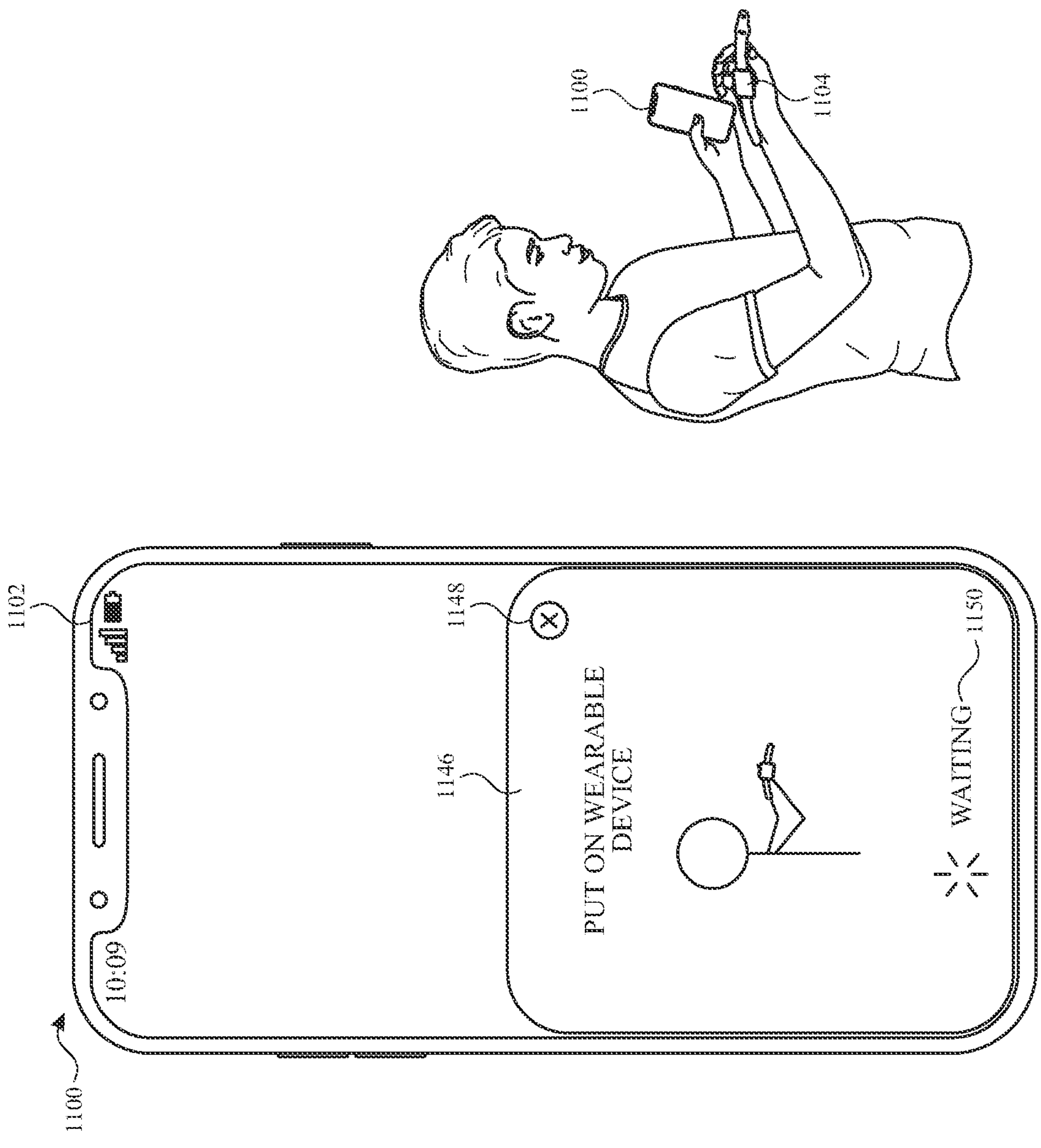

Whereas FIGS. 11A-11D depicted an example scenario in which the user was wearing electronic device 1104, FIGS. 11E-11G depict an alternative scenario in which the user is attempting to set up electronic device 1104, but is not wearing electronic device 1104. As discussed above with reference to FIG. 11B, in response to a determination that quick set up criteria are satisfied, and a determination that the user was wearing electronic device 1104, electronic device 1104 displayed user interface 1114 and electronic device 1100 displayed user interface 1108. However, in FIG. 11E, electronic device 1104 determines that electronic device 1104 is not being worn by a user. In accordance with this determination, in the depicted embodiment, electronic device 1104 does not display user interface 1114 and, optionally, does not display any content. Furthermore, in accordance with the determination that electronic device 1104 is not being worn by a user, and in accordance with a determination that the one or more quick setup criteria are satisfied, electronic device 1100 displays user interface 1130, which includes option 1134 that is selectable to initiate the set up process for electronic device 1104. Whereas in FIG. 11B, electronic device 1100 displayed user interface 1108 with instructions for the user to scan code 1112 using electronic device 1104, in FIG. 11E, electronic device 1100 displays a different user interface to set up electronic device 1104.

At FIG. 11E, electronic device 1100 detects user input 1136, (e.g., a touch input) corresponding to selection of object 1134.

At FIG. 11F, in response to user input 1136, electronic device 1100 displays user interface 1138, which provides instructions to the user for how to wear and/or put on electronic device 1104. User interface 1138 includes object 1140 that is selectable to cease display of user interface 1138 (and, in some embodiments, cancel set up of electronic device 1104), and object 1142 that is selectable to proceed with set up of electronic device 1104.

At FIG. 11F, electronic device 1100 detects user input 1144, (e.g., a touch input) corresponding to selection of object 1142.

At FIG. 11G, in response to user input 1144, electronic device 1100 displays user interface 1146, which instructs the user to wear electronic device 1104. User interface 1146 includes option 1148 that is selectable to cease display of user interface 1146 (and, in some embodiments, cancel set up of electronic device 1104). User interface 1146 also includes indication 1150, which indicates that electronic device 1100 is waiting for the user to put on electronic device 1104. In some embodiments, where electronic device 1104 is a head-mounted system, user interface 1146 instructs the user to wear electronic device 1004 on the head of the user.

Once the user puts on electronic device 1104, electronic device 1104 determines that it is being worn by a user, and transmits an indication of this change in state to electronic device 1100 so that electronic device 1100 is aware that electronic device 1104 is now being worn by a user. In the depicted embodiments, once it is determined that electronic device 1104 is being worn by a user, electronic devices 1100, 1104 proceed to the states depicted in FIG. 11B, with electronic device 1104 displaying user interface 1114, and electronic device 1100 displaying user interface 1108. The user then proceeds with the steps described above with reference to FIGS. 11B-11D in order to import secure information from electronic device 1100 to electronic device 1104.

Figure 11H:
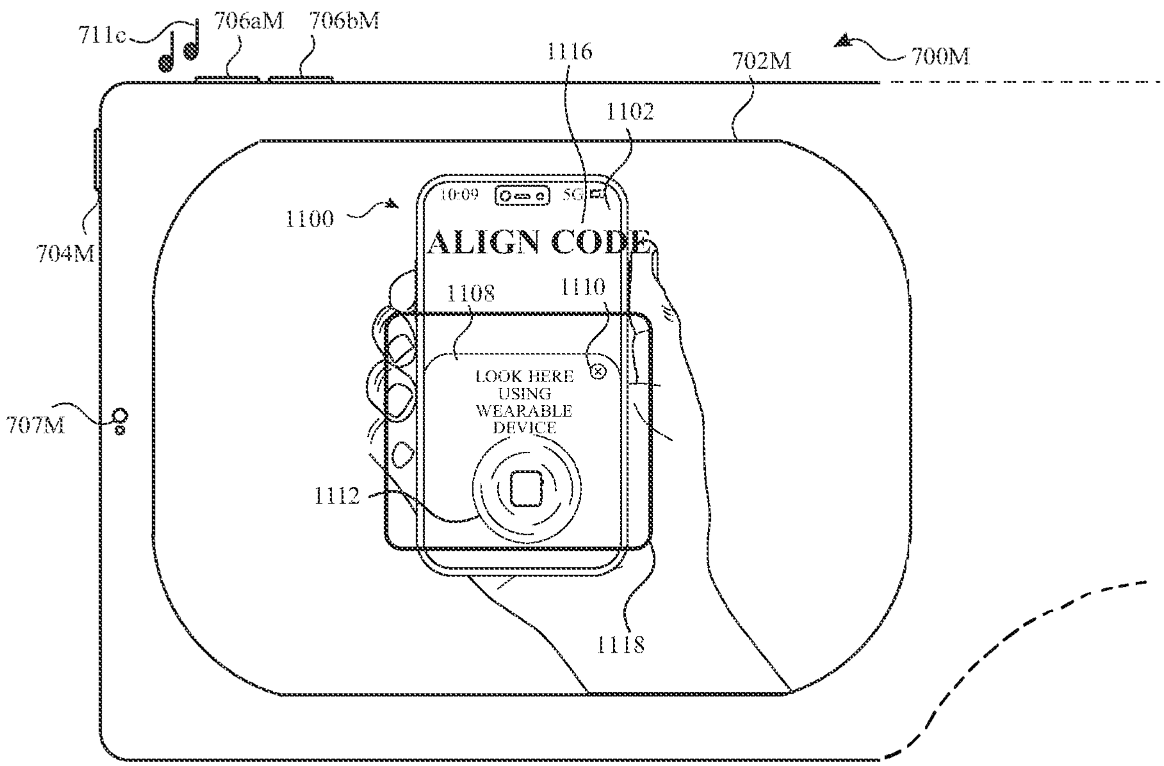

In some embodiments, the techniques and user interfaces described in FIGS. 11A-11G are provided by one or more of the devices described in FIGS. 1A-1P. FIG. 11H illustrates an embodiment in which user interface 1116 (e.g., as described in FIG. 11C) is displayed on display module 702M of head-mounted device (HMD) 700M. In FIG. 11H, HMD 700M displays user interface 1116, which displays content that is within view of a camera (e.g., a forward facing camera) of HMD 700M and instructs the user to align code 1112 with box 1118. In some embodiments, HMD 700M is a head-mounted system that includes one or more forward-facing cameras mounted on the user's head, such that the one or more forward-facing cameras capture content that is visible directly in front of the user's head and/or face. In such embodiments, such as that shown in FIG. 11H, the user looks at electronic device 1100 while wearing HMD 700M in order to scan code 1112.

In some embodiments, device 700M includes a pair of display modules that provide stereoscopic content to different eyes of the same user. For example, HMD 700M includes display module 702M (which provides content to a left eye of the user) and a second display module (which provides content to a right eye of the user). In some embodiments, the second display module displays a slightly different image than display module 702M to generate the illusion of stereoscopic depth.

Any of the features, components, and/or parts, including the arrangements and configurations thereof shown in FIGS. 1B-1P can be included, either alone or in any combination, in HMD 700M. For example, in some embodiments, HMD 700M includes any of the features, components, and/or parts of HMD 1-100, 1-200, 3-100, 6-100, 6-200, 6-300, 6-400, 11.1.1-100, and/or 11.1.2-100, either alone or in any combination. In some embodiments, display module 702M includes any of the features, components, and/or parts of display unit 1-102, display unit 1-202, display unit 1-306, display unit 1-406, display generation component 120, display screens 1-122*a*-*b*, first and second rear-facing display screens 1-322*a*, 1-322*b*, display 11.3.2-104, first and second display assemblies 1-120*a*, 1-120*b*, display assembly 1-320, display assembly 1-421, first and second display sub-assemblies 1-420*a*, 1-420*b*, display assembly 3-108, display assembly 11.3.2-204, first and second optical modules 11.1.1-104*a* and 11.1.1-104*b*, optical module 11.3.2-100, optical module 11.3.2-200, lenticular lens array 3-110, display region or area 6-232, and/or display/display region 6-334, either alone or in any combination. In some embodiments, sensor 707M includes any of the features, components, and/or parts of any of sensors 190, sensors 306, image sensors 314, image sensors 404, sensor assembly 1-356, sensor assembly 1-456, sensor system 6-102, sensor system 6-202, sensors 6-203, sensor system 6-302, sensors 6-303, sensor system 6-402, and/or sensors 11.1.2-110*a*-*f*, either alone or in any combination. In some embodiments, input devices 704M, 706*a*M, and/or 706*b*M include any of the features, components, and/or parts of any of first button 1-128, button 11.1.1-114, second button 1-132, and or dial or button 1-328, either alone or in any combination. In some embodiments, HMD 700M includes one or more audio output components (e.g., electronic component 1-112) for generating audio feedback (e.g., audio output 711c), optionally generated based on detected events and/or user inputs detected by the HMD 700M.

Additional descriptions regarding FIGS. 11A-11H are provided below in reference to method 1200 described with respect to FIGS. 11A-11H.

FIG. 12 is a flow diagram of an exemplary method 1200 for setting up a computer system, in accordance with some embodiments. In some embodiments, method 1200 is performed at a computer system (e.g., 1100, 1104) (e.g., computer system 101 in FIG. 1A) including one or more display generation components (e.g., 1102, 1106) (e.g., display generation component 120 in FIGS. 1A, 3, and 4) (e.g., a heads-up display, a display, a touchscreen, a projector, etc.) and one or more input devices (e.g., 1102, 1106, 1107A, 1107B, 1107C) (e.g., one or more buttons, one or more eye movement trackers, one or more hand movement trackers, one or more cameras (e.g., a camera (e.g., color sensors, infrared sensors, and other depth-sensing cameras))). In some embodiments, the method 1200 is governed by instructions that are stored in a non-transitory (or transitory) computer-readable storage medium and that are executed by one or more processors of a computer system, such as the one or more processors 202 of computer system 101 (e.g., control 110 in FIG. 1A). Some operations in method 1200 are, optionally, combined and/or the order of some operations is, optionally, changed.

In some embodiments, the computer system (e.g., 1100) detects (1202) that a companion device (e.g., 1104) (e.g., a companion computer system) (e.g., a smart phone, a smart watch, a tablet, a wearable device, and/or head-mounted device) (e.g., a device that is in communication with the computer system) satisfies a first set of criteria (e.g., including detecting that the companion device satisfies one or more proximity criteria relative to the computer system (e.g., is within a threshold distance of the computer system and/or satisfies one or more signal strength thresholds relative to the computer system)) including a first criterion that is satisfied when the companion device (e.g., 1104) has initiated a set up process (e.g., a set-up process for the companion device) (e.g., a process to enroll one or more users on the companion device; a process to set up one or more user preferences on the companion device; a process to prepare the companion device for use; a process that is initiated the first time the companion device is used by a user; a process that is initiated when the companion device is turned on).

In response to detecting that the companion device satisfies the first set of criteria (1204): in accordance with a determination that the companion device (e.g., 1104) is in a first state (1206) (e.g., FIG. 11A) (e.g., is worn by a user (e.g., at least a portion of the companion device has been placed on the body of a user)), the computer system (e.g., 1100) displays (1208), via the one or more display generation components of the computer system (e.g., 1102), a first quick start user interface (e.g., 1108) (e.g., a first quick start user interface that corresponds to the companion device being in the first state (e.g., corresponds to the companion device being worn by a user)); and in accordance with a determination that the companion device is in a second state different from the first state (e.g., 1210) (e.g., FIG. 11E) (e.g., is not worn by a user), the computer system displays (1212), via the one or more display generation components of the computer system (e.g., 1102), a second quick start user interface (e.g., 1130, 1138) different from the first quick start user interface (e.g., a second quick start user interface that corresponds to the companion device being in the second state (e.g., corresponds to the companion device not being worn by a user)). In some embodiments, the companion device is a head-mounted system, and the determination that the companion device is in the first state includes a determination that the head-mounted system is placed on the head of a user, and the determination that the companion device is in the second state includes a determination that the head-mounted system is not placed on the head of the user. Displaying the first quick start user interface when the companion device is in the first state and displaying the second quick start user interface when the companion device is in the second state provides the user with visual feedback about the state of the device (e.g., that the device has detected that the companion device is in the first state or the second state), thereby improving visual feedback to the user. Displaying the first quick start user interface when the companion device is in the first state and displaying the second quick start user interface when the companion device is in the second state enhances the operability of the device and makes the user-device interface more efficient by helping the user to provide the proper inputs and reducing user mistakes when operating/interacting with the device (e.g., by providing appropriate feedback and/or instructions for the companion device being in the first state or being in the second state).

In some embodiments, the determination that the companion device (e.g., 1104) is in the first state (e.g., FIGS. 11A-11D) comprises a determination that the companion device is being worn by a user (e.g., at least a portion of the companion device has been placed on the body of a user). In some embodiments, the companion device comprises one or more sensors (e.g., one or more pressure sensors, one or more infrared sensors, one or more temperature sensors, and/or one or more light sensors) and the determination that the companion device is being worn by a user is made based on information from the one or more sensors. Displaying the first quick start user interface when the companion device is being worn by a user provides the user with visual feedback about the state of the device (e.g., that the device has detected that the companion device is being worn by a user), thereby improving visual feedback to the user.

In some embodiments, the determination that the companion device (e.g., 1104) is in the first state (e.g., FIGS. 11A-11D) comprises a determination that the companion device is in the first state prior to the companion device (e.g., 1104) displaying, via a display generation component of the companion device (e.g., 1106), a first tutorial user interface (e.g., 1114) (e.g., a user interface that comprises one or more instructions for the user) (e.g., prior to the companion device displaying any instructions for the user). Displaying the first quick start user interface when the companion device is in the first state prior to the companion device displaying a tutorial user interface enhances the operability of the device and makes the user-device interface more efficient by helping the user to provide the proper inputs and reducing user mistakes when operating/interacting with the device (e.g., by providing appropriate feedback and/or instructions for the companion device being in the first state).

In some embodiments, the determination that the companion device (e.g., 1104) is in the second state (e.g., FIGS. 11E-11G) comprises a determination that the companion device is not being worn by a user (e.g., a determination that a portion of the companion device (e.g., a particular and/or specific portion of the companion device) has not been placed on the body of a user, a determination that a particular portion of the companion device (e.g., a headset, glasses, and/or gloves) has not been placed on a particular body part of the user (e.g., the head of the user, the face of the user, and/or the hands of the user), and/or a determination that a particular part of the user's body (e.g., user's face and/or eyes) is not detectable and/or identifiable by the computer system). Displaying the second quick start user interface when the companion device is not being worn by a user provides the user with visual feedback about the state of the device (e.g., that the device has detected that the companion device is not being worn by a user), thereby improving visual feedback to the user.

In some embodiments, displaying the first quick start user interface (e.g., 1108) includes displaying, via the one or more display generation components of the computer system (e.g., 1102), the first quick start user interface (e.g., 1108) subsequent to (or, in some embodiments, concurrently with) the companion device (e.g., 1104) displaying, via one or more display generation components of the companion device (e.g., 1106), a first tutorial user interface (e.g., 1114) (e.g., a user interface which provides one or more instructions for a user (e.g., an instruction for the user to perform one or more actions and/or an instruction for the user to look at the computer system using the companion device)). Displaying a tutorial user interface on the companion device enhances the operability of the device and makes the user-device interface more efficient by helping the user to provide the proper inputs and reducing user mistakes when operating/interacting with the device (e.g., by providing appropriate feedback and/or instructions for the companion device being in the first state).

In some embodiments, the second quick start user interface (e.g., 1130, 1138) includes instructions instructing the user to wear the companion device (e.g., "wearing device" in FIG. 11F) (e.g., instructions to put one or more components of the companion device on the body of the user). In some embodiments, the companion device is a head-mounted system, and the determination that the companion device is in the first state includes a determination that the head-mounted system is placed on the head of a user, and the determination that the companion device is in the second state includes a determination that the head-mounted system is not placed on the head of the user. In some embodiments, the second quick start user interface includes instructions instructing the user to place the head-mounted system on the user's head and, optionally, instructions for how to place the head-mounted system on the user's head. Instructing the user to wear the companion device when the companion device is in the second state enhances the operability of the device and makes the user-device interface more efficient by helping the user to provide the proper inputs and reducing user mistakes when operating/interacting with the device (e.g., by providing appropriate feedback and/or instructions for the companion device being in the second state).

In some embodiments, the second quick start user interface (e.g., 1130, 1138) includes a first option (e.g., 1134, 1142) (e.g., first affordance) that is selectable to display a third user interface (e.g., 1138, 1146) (e.g., a third user interface different from the first and second quick start user interfaces) that includes one or more instructions for the user (e.g., FIGS. 11F, 11G) (e.g., one or more instructions for setting up the companion device) (e.g., one or more instructions about how to wear the companion device). Displaying one or more instructions for the user when the companion device is in the second state enhances the operability of the device and makes the user-device interface more efficient by helping the user to provide the proper inputs and reducing user mistakes when operating/interacting with the device (e.g., by providing appropriate feedback and/or instructions for the companion device being in the second state).

In some embodiments, the second quick start user interface (e.g., 1130, 1138) includes a second option (e.g., 1134, 1142) (e.g., a second affordance) that is selectable to initiate a process for displaying, via the one or more display generation components (e.g., 1102), the first quick start user interface (e.g., 1108) (e.g., selecting option 1134 and/or 1142 will initiate a process for displaying user interface 1108 (e.g., after the user has worn companion device 1104)). In some embodiments, the second quick start user interface includes a first option that is selectable to go to a next user interface in an ordered series of tutorial user interfaces that instruct the user on how to set up the companion device, wherein the ordered series of tutorial user interfaces includes the first quick start user interface. In some embodiments, subsequent to displaying the second quick start user interface (and, optionally, in response to one or more user inputs (e.g., one or more touch inputs and/or non-touch inputs)), the computer system displays the first quick start user interface. In some embodiments, the computer system displays the first quick start user interface in response to a user input selecting an option that corresponds to a user indication that the companion device is now in the first state (e.g., has transitioned from being in the second state to being in the first state) (e.g., corresponds to a user indication that the user has worn the companion device). Displaying an option that is selectable to initiate a process for displaying the first quick start user interface allows a user to display the first quick start user interface with fewer inputs, thereby reducing the number of user inputs needed to perform an operation.

In some embodiments, the first quick start user interface (e.g., 1108) includes one or more instructions for how to set up the companion device (e.g., 1104) (e.g., an instruction to look at the computer system using the companion device (e.g., an instruction to look at the computer system while wearing the companion device)). Displaying one or more instructions for the user when the companion device is in the first state enhances the operability of the device and makes the user-device interface more efficient by helping the user to provide the proper inputs and reducing user mistakes when operating/interacting with the device (e.g., by providing appropriate feedback and/or instructions for the companion device being in the first state).

In some embodiments, the first quick start user interface (e.g., 1108) includes information (e.g., 1112) (e.g., text, a computer-readable code (e.g., a QR code or other computer readable code)), and/or a selectable object (e.g., button, affordance)) that enables the companion device (e.g., 1104) to retrieve companion device setup information (e.g., user account information (e.g., account name and/or identifier, and/or password), networking information (e.g., wireless network connection information (e.g., network name and/or password)), personalized accessory setup information (e.g., prescription optical lens information), user biometric information (e.g., height, eye color, biometric authentication information (e.g., facial scan information, iris scan information, and/or fingerprint scan information), and/or user preference information) from the computer system (e.g., 1100). In some embodiments, the first quick start user interface includes information that can be scanned by the companion device and/or input at the companion device to cause the companion device and the computer system to connect and/or causes the computer system to transmit companion device setup information to the companion device. Displaying information that enables the companion device to retrieve companion device setup information from the computer system allows for setup of the companion device with fewer user inputs, thereby reducing the number of inputs required to perform an operation.

In some embodiments, the first quick start user interface (e.g., 1108) is displayed in accordance with a determination that authentication information received at the computer system (e.g., 1100) successfully authenticates a user (e.g., the user has successfully unlocked computer system 1100) (e.g., the authentication information matches known authentication information corresponding to a registered and/or authorized user) (e.g., via biometric authentication, passcode authentication, and/or proximity to an external authenticating device (e.g., watch, smart phone, and/or tablet)). In some embodiments, the authentication information is received at the computer system after detecting that the companion device satisfies the first set of criteria. Displaying the first quick start user interface in accordance with a determination that authentication information received at the computer system successfully authenticates a user protects against unauthorized users accessing sensitive data, thereby improving security of the device.

In some embodiments, while the computer system (e.g., 1100) displays, via the one or more display generation components of the computer system (e.g., 1102), the first quick start user interface (e.g., 1108), the companion device (e.g., 1104) displays, via one or more display generation components of the companion device (e.g., 1106), a prompt (e.g., 1114, 1116) to scan information (e.g., 1112) displayed on the computer system. In some embodiments, the first quick start user interface displays a prompt to look at the computer system (e.g., look at one or more display generation components of the computer system) with the companion device (e.g., while wearing the companion device). In some embodiments, the companion device is a head-mounted system. In some embodiments, the head-mounted system includes a front-facing camera that captures at least a portion of the field of view of the user. In some embodiments, the prompt to scan information displayed on the computer system includes a prompt to look at the computer system while the user is wearing the head-mounted system (e.g., such that the companion device is placed within the field of view of the front-facing camera). Displaying, at the companion device, a prompt to scan information displayed on the computer system enhances the operability of the device and makes the user-device interface more efficient by helping the user to provide the proper inputs and reducing user mistakes when operating/interacting with the device.

In some embodiments, the first quick start user interface (e.g., 1108) includes information (e.g., 1112) (e.g., text and/or a computer-readable code (e.g., a QR code)) that, when scanned by the companion device (e.g., 1104) (e.g., FIGS. 11C-11D and/or FIG. 11H) (e.g., detected via one or more camera sensors and/or detected via short-range communication radio), enables the companion device to retrieve secure information (e.g., user account information (e.g., account name and/or identifier, and/or password), networking information (e.g., wireless network connection information (e.g., network name and/or password)), personalized accessory setup information (e.g., prescription optical lens information), user biometric information (e.g., height, eye color, biometric authentication information (e.g., facial scan information, iris scan information, and/or fingerprint scan information)), and/or user preference information) from the computer system (e.g., 1000). Displaying information that enables the companion device to retrieve secure information from the computer system allows for setup of the companion device with fewer user inputs, thereby reducing the number of inputs required to perform an operation.

In some embodiments, the secure information includes user account information (e.g., username, login ID, and/or account password). Displaying information that enables the companion device to retrieve user account information from the computer system allows for setup of the companion device with fewer user inputs, thereby reducing the number of inputs required to perform an operation.

In some embodiments, the secure information includes networking information (e.g., trusted network information and/or known wireless network names and passwords). Displaying information that enables the companion device to retrieve networking information from the computer system allows for setup of the companion device with fewer user inputs, thereby reducing the number of inputs required to perform an operation.

In some embodiments, the secure information includes personalized accessory information (e.g., information pertaining to one or more prescription optical lenses (e.g., one or more prescription optical lenses associated with a user of the computer system) and/or one or more personalized controllers or input devices). Displaying information that enables the companion device to retrieve personalized accessory information from the computer system allows for setup of the companion device with fewer user inputs, thereby reducing the number of inputs required to perform an operation.

In some embodiments, the secure information includes biometric information corresponding to one or more users of the computer system (e.g., one or more users registered on the computer system) (e.g., height, eye color, biometric authentication information (e.g., facial scan information, iris scan information, and/or fingerprint scan information)). Displaying information that enables the companion device to retrieve biometric information for one or more users from the computer system allows for setup of the companion device with fewer user inputs, thereby reducing the number of inputs required to perform an operation.

In some embodiments, the secure information includes user preference information corresponding to one or more users of the computer system (e.g., contacts, favorite contacts, email accounts, application settings, location settings (e.g., settings defining user preferences with respect to location tracking), privacy settings, and/or language settings (e.g., preferred, known, and/or used languages)). Displaying information that enables the companion device to retrieve user preference information for one or more users from the computer system allows for setup of the companion device with fewer user inputs, thereby reducing the number of inputs required to perform an operation.

In some embodiments, aspects/operations of methods 800, 850, 1000,1050, and/or 1400 may be interchanged, substituted, and/or added between these methods. For example, in some embodiments, the companion device in method 1200 is the computer system in methods 800, 850, 1000, 1050, and/or 1400. For brevity, these details are not repeated here.

FIGS. 13A-13X illustrate examples of providing an input tutorial. FIG. 14 is a flow diagram of an exemplary method 1400 for providing an input tutorial. The user interfaces in FIGS. 13A-13X are used to illustrate the processes described below, including the processes in FIG. 14.

FIG. 13A depicts electronic device 700, which is a tablet that includes touch-sensitive display 702 and one or more input sensors 704 (e.g., one or more cameras, eye gaze trackers, hand movement trackers, and/or head movement trackers). In some embodiments described below, electronic device 700 is a tablet. In some embodiments, electronic device 700 is a smart phone, a wearable device, a wearable smartwatch device, a head-mounted system (e.g., a headset), or other computer system that includes and/or is in communication with one or more display devices (e.g., display screen, projection device, or the like). Electronic device 700 is a computer system (e.g., computer system 101 in FIG. 1A).

At FIG. 13A, electronic device 700 displays video 1300 and object **1308*a* overlaid on three-dimensional environment 708. In some embodiments, video 1300 and object 1308*a* are displayed as part of an input tutorial which instructs a user on how to use and interact with electronic device 700. For example, in some embodiments, the input tutorial demonstrates for a user and/or instructs a user on how to perform various types of user inputs, such as a gaze input, a hand gesture and/or air gesture input, a selection input, and/or a scroll input. In some embodiments, the input tutorial is displayed based on a determination that the user is using electronic device 700 for the first time, based on a determination that the user is using an electronic device of a first type (e.g., a tablet or a head-mounted system) for the first time, and/or based on a determination that the user has not previously gone through and/or completed the input tutorial. Video 1300 is displayed within window border 1302. In FIG. 13A, video 1300 depicts simulated user 1304 interacting with objects 1306*a*-1306*d* by gazing (e.g., looking) at objects 1306*a*-1306*d*. In FIG. 13A, simulated user 1304 is looking at object 1306*a*, as indicated by the dotted lines, and as also indicated by object 1306*a*** being shown with bolded lines and letters.

Object **1308*a* displays an input description for a first type of user input (e.g., a gaze input) and instructs the user on how to perform the first type of user input. For example, in some embodiments, in FIG. 13A, object 1308*a* instructs the user that the user is able to interact with various objects using a gaze input by looking at the object that the user wishes to interact with. In some embodiments, the input instructions in object 1308*a* correspond to video content shown in video 1300. For example, object 1308*a* instructs the user that the user is able to interact with displayed object by gazing at the objects, and video 1300 demonstrates simulated user 1304 interacting with displayed objects 1306*a*-1306*d* by gazing at them. Object 1308*a* also includes button 1308*b* that is selectable by a user to skip video 1300 and progress to a next portion of the input tutorial (e.g., as shown in FIGS. 13C and 13**D, described below).

As discussed above, in some embodiments, electronic device 700 is a head-mounted system. In some embodiments, a user interacts with button **1308*b* (and/or other objects displayed by electronic device 700) based on the user's gaze. In some embodiments, a user interacts with button 1308*b* (and/or other objects displayed by electronic device 700) based on the user's gaze and based on one or more other movements by the user. For example, in some embodiments, a user selects a displayed object (such as button 1308*b*) by looking at the object and performing an air gesture (e.g., a pinch air gesture, a tap air gesture, a poke air gesture, and/or a swipe air gesture) with his or her hand. In some embodiments, three-dimensional environment 708 is displayed by a display (as depicted in FIG. 13A). In some embodiments, three-dimensional environment 708 includes a virtual environment or an image (or video) of a physical environment captured by one or more cameras. In some embodiments, three-dimensional environment 708 is visible to a user behind video 1300 and object 1308*a*, but is not displayed by a display. For example, in some embodiments, three-dimensional environment 708 is a physical environment that is visible to a user (e.g., through a transparent display) behind video 1300 and object 1308*a* without being displayed by a display. In FIG. 13A, electronic device 700 detects that the user is looking at video 1300, as indicated by gaze indication 712. Gaze indication 712** is provided for a better understanding of the described techniques, and is optionally not a part of the user interface of the described device (e.g., is not displayed by the electronic device).

Figure 13B:
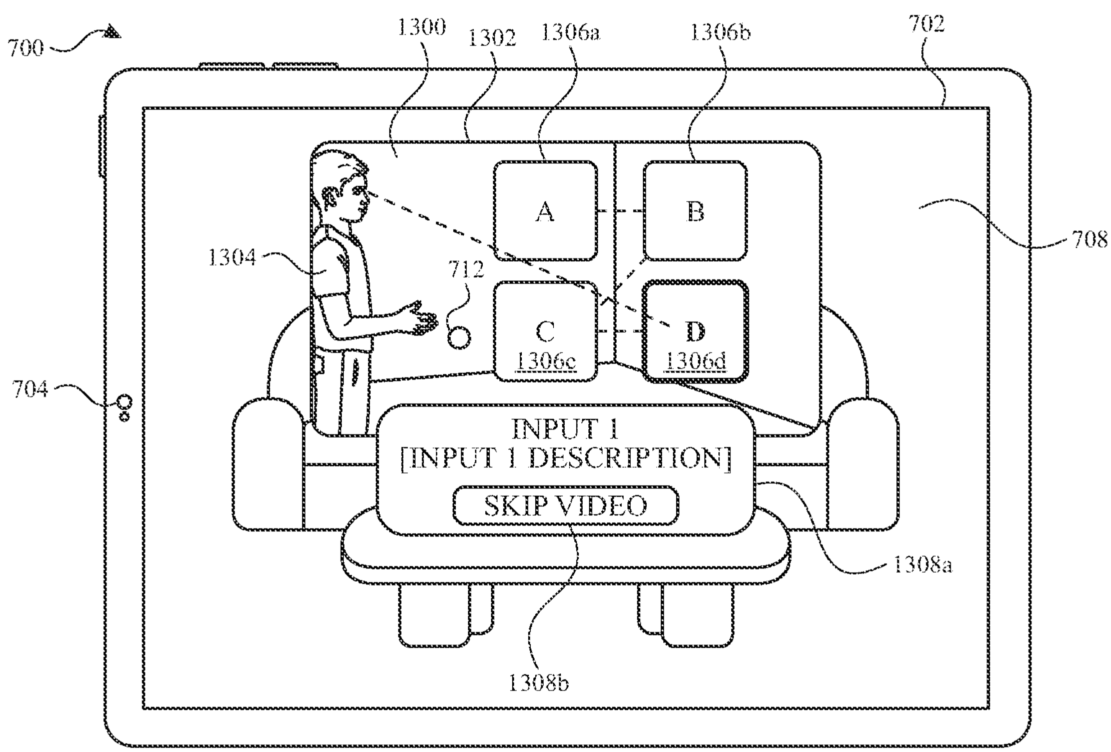

From FIG. 13A to FIG. 13B, playback of video 1300 continues, and video 1300 shows simulated user 1304 looking at each of objects **1306*a*, 1306*b*, 1306*c*, and 1306*d* in sequence until, in FIG. 13B, video 1300 shows simulated user 1304 looking at object 1306*d***.

Figure 13C:
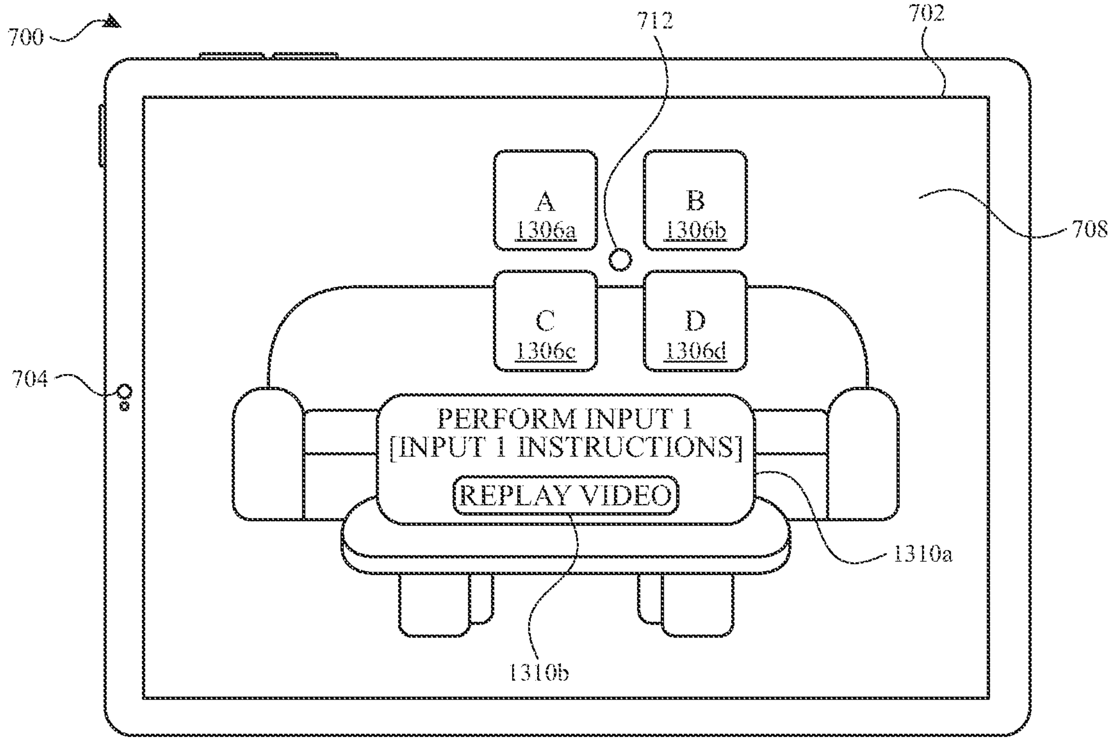

At FIG. 13C, video 1300 has completed playback and electronic device 700 ceases display of various elements of video 1300 including window border 1302 and simulated user 1304, but maintains display of objects **1306*a*-1306*d*. Furthermore, electronic device 700 replaces display of object 1308*a* which, for example, instructed the user on how to perform the first type of user input (e.g., a gaze input) with display of object 1310*a*, which, in some embodiments, instructs the user to perform the first type of user input that was demonstrated in video 1300 and explained in object 1308*a*. For example, in some embodiments, in FIG. 13C, object 1310*a* instructs the user to gaze at each of objects 1306*a*-1306*d* sequentially. Object 1310*a* also includes option 1310*b* that is selectable to cause video 1300 and object 1308*a* to be re-displayed and video 1300** to be replayed.

Figure 13D:
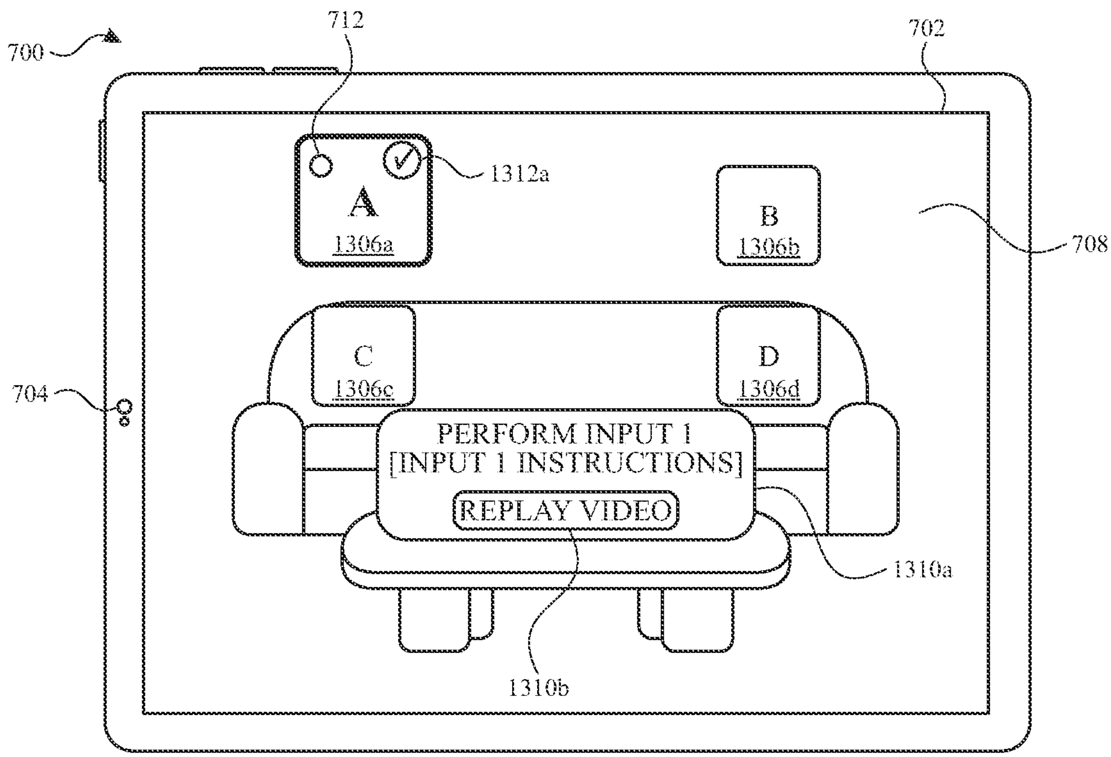

From FIG. 13C to FIG. 13D, electronic device 700 displays an animation in which objects **1306*a*-1306*d* move from a first position, shown in FIG. 13C (e.g., a first position in which they were displayed in video 1300), to a second position, shown in FIG. 13D. As discussed above, in some embodiments, electronic device 700 is a head-mounted system, and objects 1306*a*-1306*d* are displayed on one or more display generation components that are worn on the head of the user. In some embodiments, the animation shown in FIGS. 13C to 13D is displayed via the head-mounted system, and objects 1306*a*-1306*d* move in a manner to appear as if objects 1306*a*-1306*d* are moving towards the user. As also discussed above, in some embodiments, object 1310*a* instructs the user to interact with objects 1306*a*-1306*d* by gazing at the objects sequentially. In FIG. 13D, electronic device 700 determines (e.g., via input sensors 704) that the user is looking at object 1306*a*, as indicated by gaze indication 712. In response to this determination, electronic device 700 displays object 1306*a* in a first manner (e.g., bold and/or enlarged) and also displays indication 1312*a* indicating that the user has successfully performed the first type of user input (e.g., a gaze input) with respect to object 1306*a***.

Figure 13E:
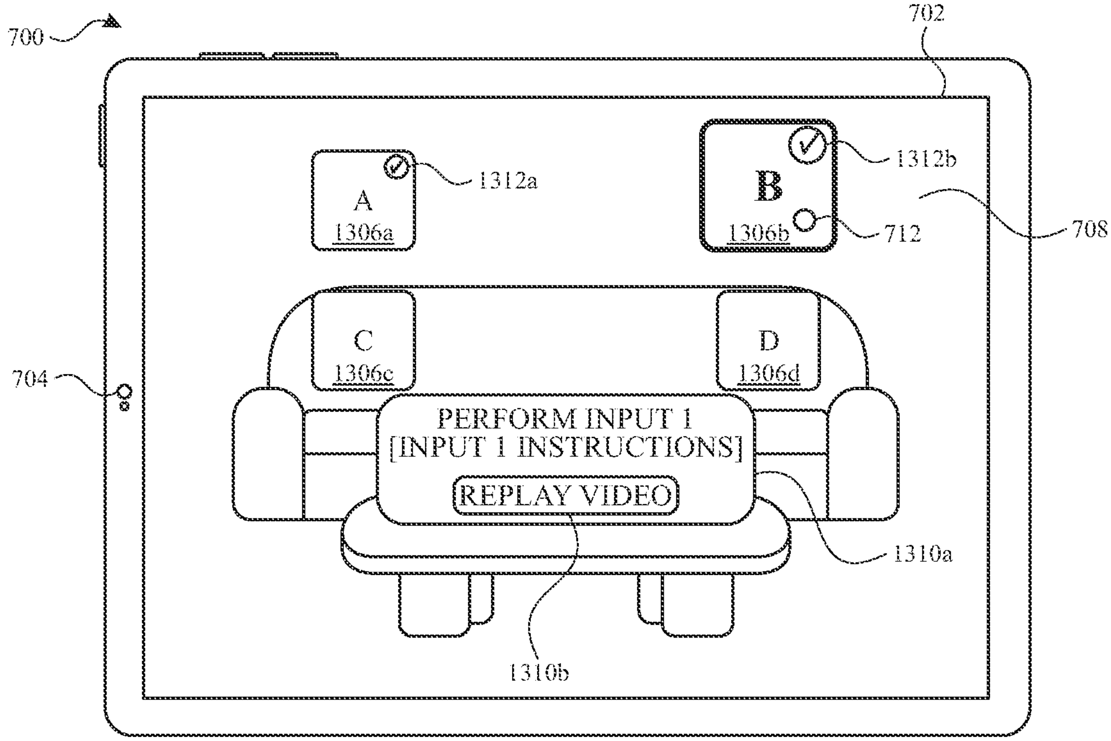

At FIG. 13E, electronic device 700 determines (e.g., via input sensors 704) that the user is looking at object **1306*b*, as indicated by gaze indication 712. In response to this determination, electronic device 700 displays object 1306*b* in the first manner (e.g., bold and/or enlarged) and also displays indication 1312*b* indicating that the user has successfully performed the first type of user input (e.g., a gaze input) with respect to object 1306*b***.

Figure 13F:
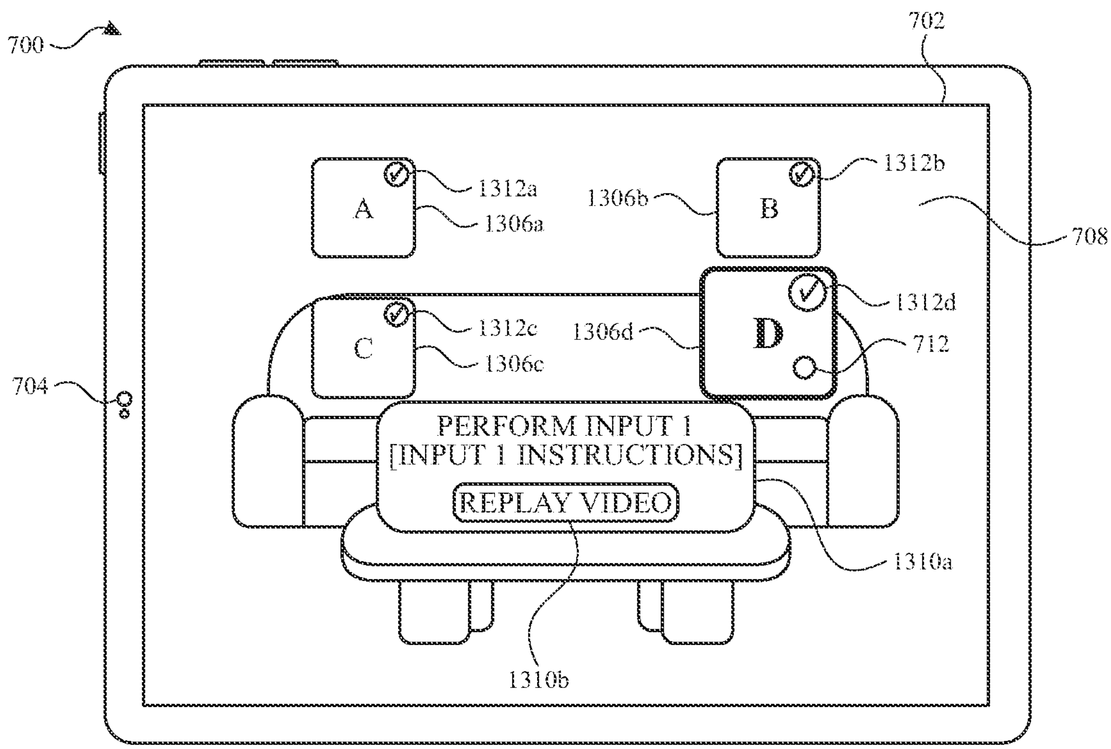

At FIG. 13F, electronic device 700 has determined that the user has looked at all four objects **1306*a*-1306*d* (as indicated by indications 1312*a*, 1312*b*, 1312*c*, and 1312*d*), and is currently looking at object 1306***d*, as indicated by gaze indication 712, and as also indicated by object 1306*d* being displayed in the first manner (e.g., bold and enlarged). Accordingly, at FIG. 13F, electronic device 700 determines that the user has successfully performed the first type of user input (e.g., a gaze input) with respect to all four of the displayed objects 1306*a*-1306*d*.

Figure 13G:
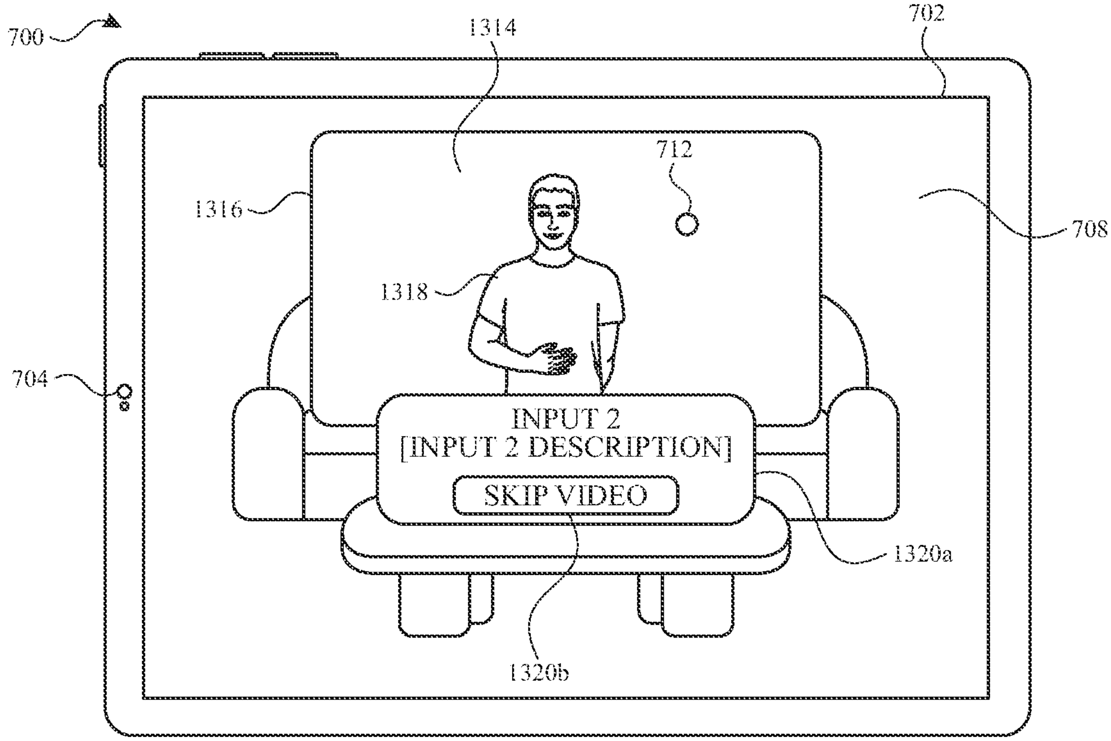

At FIG. 13G, in response to the determination that the user has successfully performed the first type of user input (e.g., a gaze input) with respect to a threshold number (e.g., 2, 3, or all four) of the displayed objects 1306*a*-1306*d*, electronic device 700 ceases display of objects 1306*a*-1306*d* and object 1310*a*, and now displays video 1314 along with object 1320*a*. In some embodiments, video 1314 and object 1320*a* correspond to a second type of user input (e.g., a hand gesture and/or an air gesture input). Video 1314 is displayed within window border 1316 and displays simulated user 1318 performing the second type of user input (e.g., a hand gesture and/or an air gesture). Object 1320*a* displays a description of the second type of user input (e.g., a hand gesture and/or an air gesture), and also includes button 1320*b* that is selectable to skip video 1314 (e.g., cease display of video 1314) and move to a next portion of the input tutorial (e.g., as shown in FIG. 13H, described below).

Figure 13H:
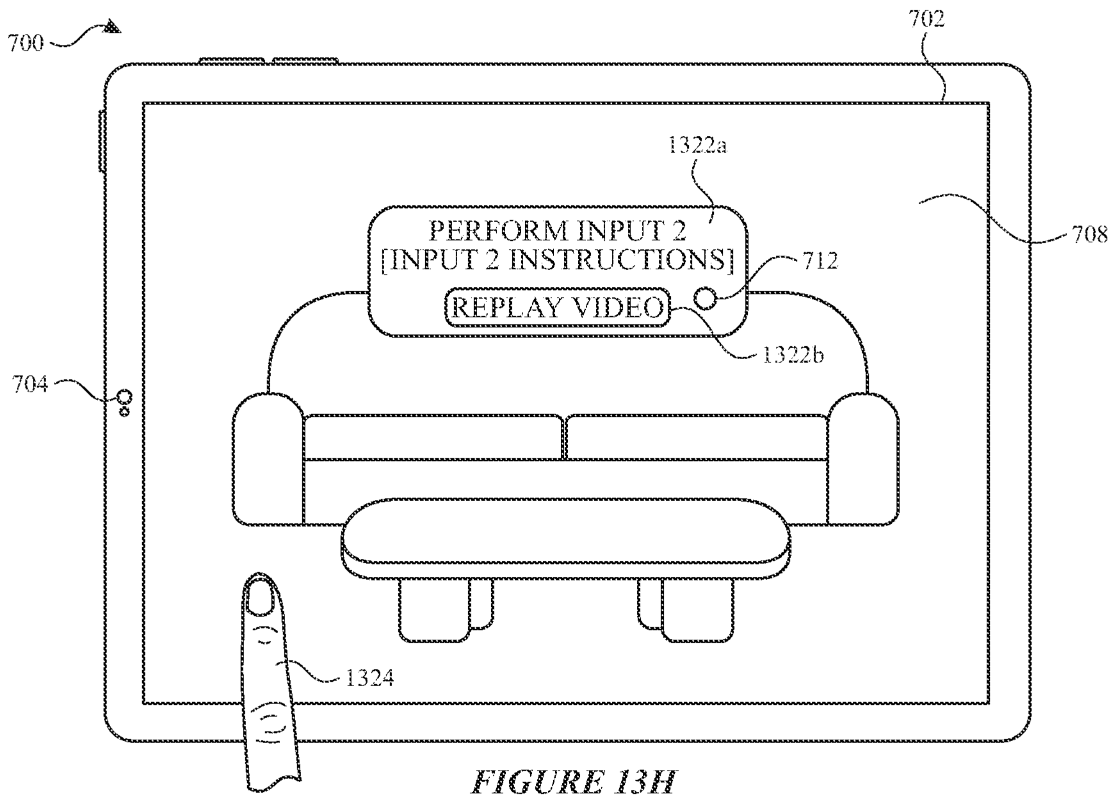

At FIG. 13H, video 1314 has completed playback, and electronic device 700 ceases display of video 1314 and object 1320*a*, and now displays object 1322*a*, which instructs the user to perform the second type of user input (e.g., a hand gesture and/or an air gesture). Object 1322*a* also includes button 1322*b* that is selectable to replay video 1314 (e.g., selectable to re-display video 1314 and object 1320*a*). At FIG. 13H, electronic device 700 detects (e.g., via input sensors 704) that a hand of the user (1324) has successfully performed the second type of user input.

Figure 13I:
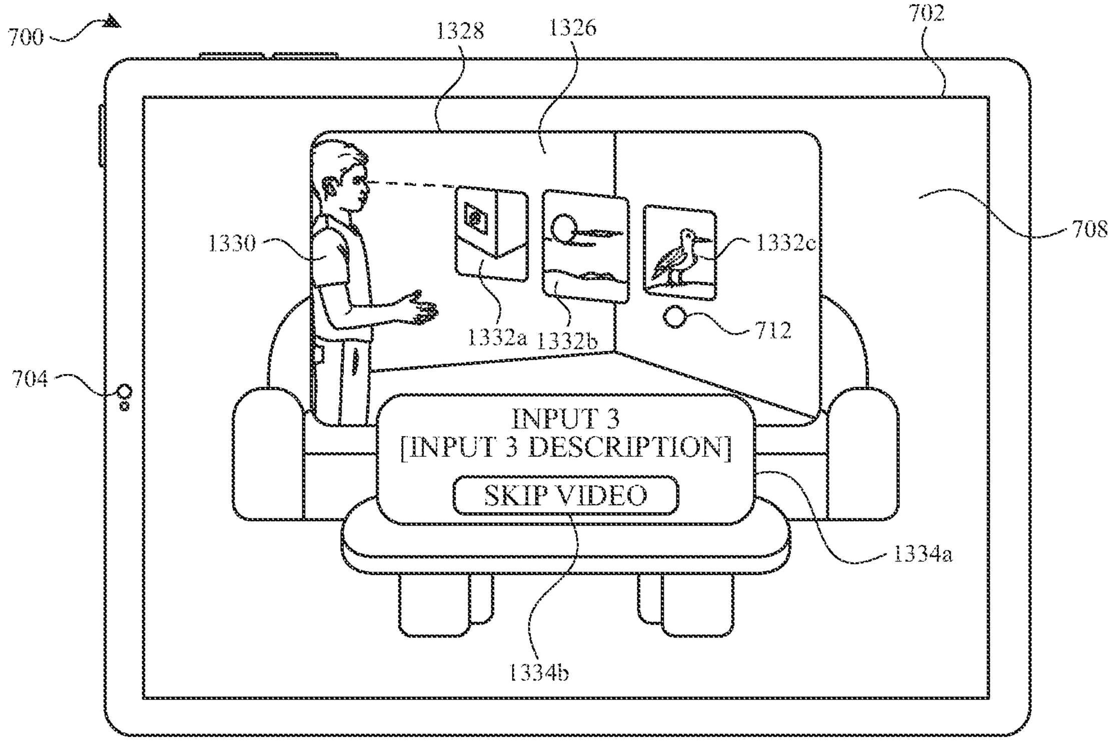

At FIG. 13I, in response to detecting that the user has successfully performed the second type of user input, electronic device 700 ceases display of object 1322*a* (including button 1322*b*) and displays video 1326 and object 1334*a*, which correspond to a third type of user input (e.g., a selection input). As discussed above, in some embodiments, electronic device 700 is a head-mounted system. As also described above, in some embodiments, a user performs a selection input by gazing at a particular object and performing a hand gesture and/or an air gesture while gazing at the object that the user wishes to select. Object 1334*a* also includes button 1334*b* that is selectable to skip video 1326 (e.g., cease display of video 1326) and move to a next portion of the input tutorial (e.g., as shown in FIGS. 13K-13N, described below). In some embodiments, in FIG. 13I, object 1334*a* includes instructions for how to perform a selection input (e.g., by performing a hand gesture and/or an air gesture while gazing at an object). In FIG. 13I, video 1326 is displayed within window border 1328, and depicts simulated user 1330 interacting with objects 1332*a*-1332*c* to demonstrate how to perform a selection input. In FIG. 13I, simulated user 1330 is gazing at object 1332*a*, and is performing a hand gesture and/or an air gesture (e.g., a pinch gesture and/or a poke gesture) to select object 1332*a*.

Figure 13J:
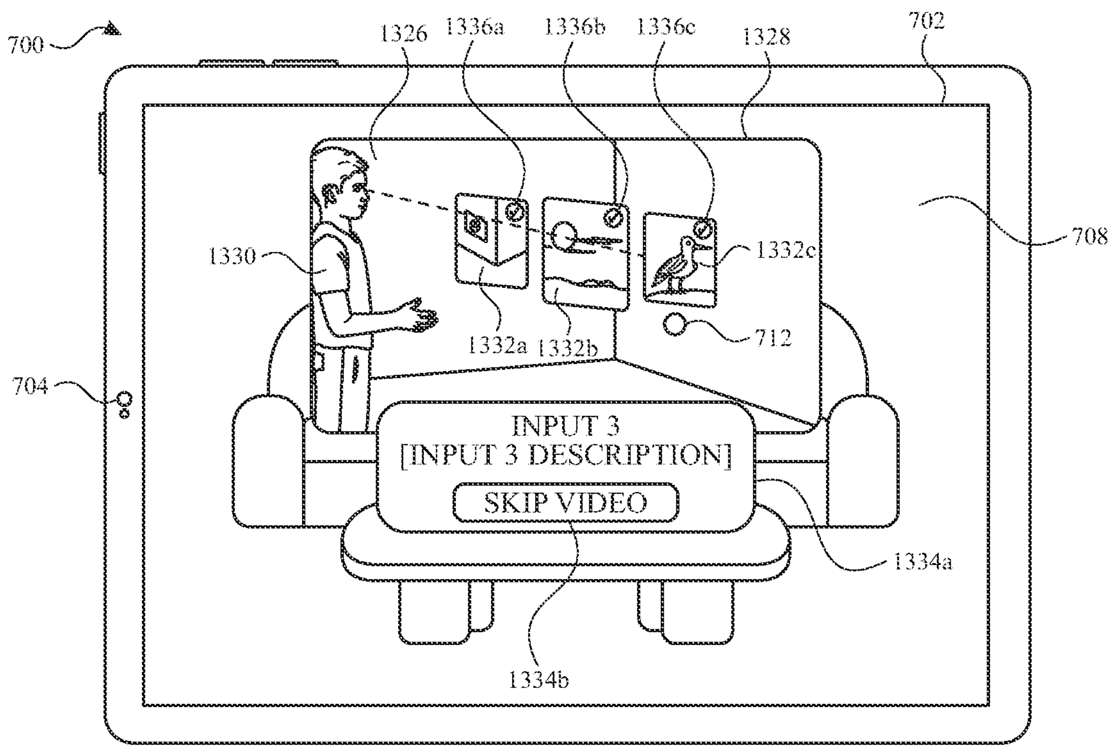

At FIG. 13J, playback of video 1326 has progressed, and simulated user 1330 has sequentially performed three selection inputs selecting each of objects 1332*a*-1332*c*, as indicated by indications 1336*a*-1336*c*. At FIG. 13K, playback of video 1326 has completed and, accordingly, electronic device 700 ceases display of window border 1328 and simulated user 1330, while maintaining display of objects 1332*a*-1332*c*. Electronic device 700 also ceases display of object 1334*a* (including button 1334*b*), and now displays object 1338*a*, which instructs the user to perform the selection input (which was demonstrated in video 1326 and explained in object 1334*a*) on objects 1332*a*-1332*c*. Object 1338*a* includes button 1338*b*, which is selectable to re-play video 1326 (e.g., selectable to re-display video 1326 and object 1334*a*).

Figure 13K:
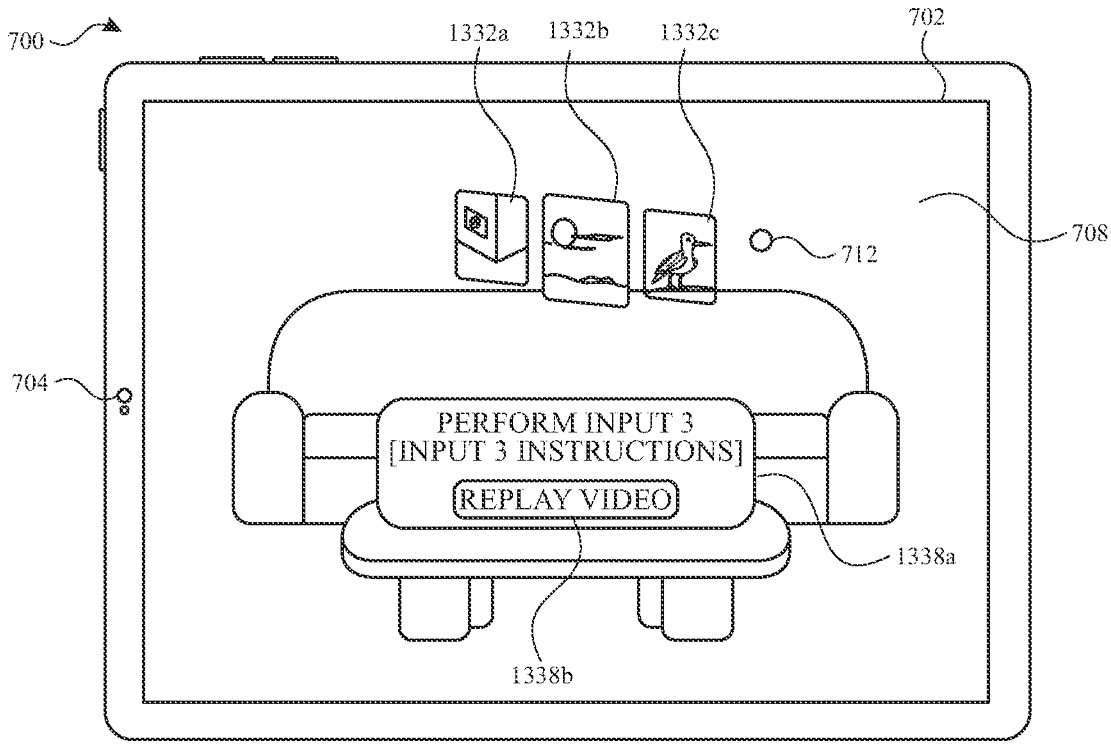
Figure 13L:
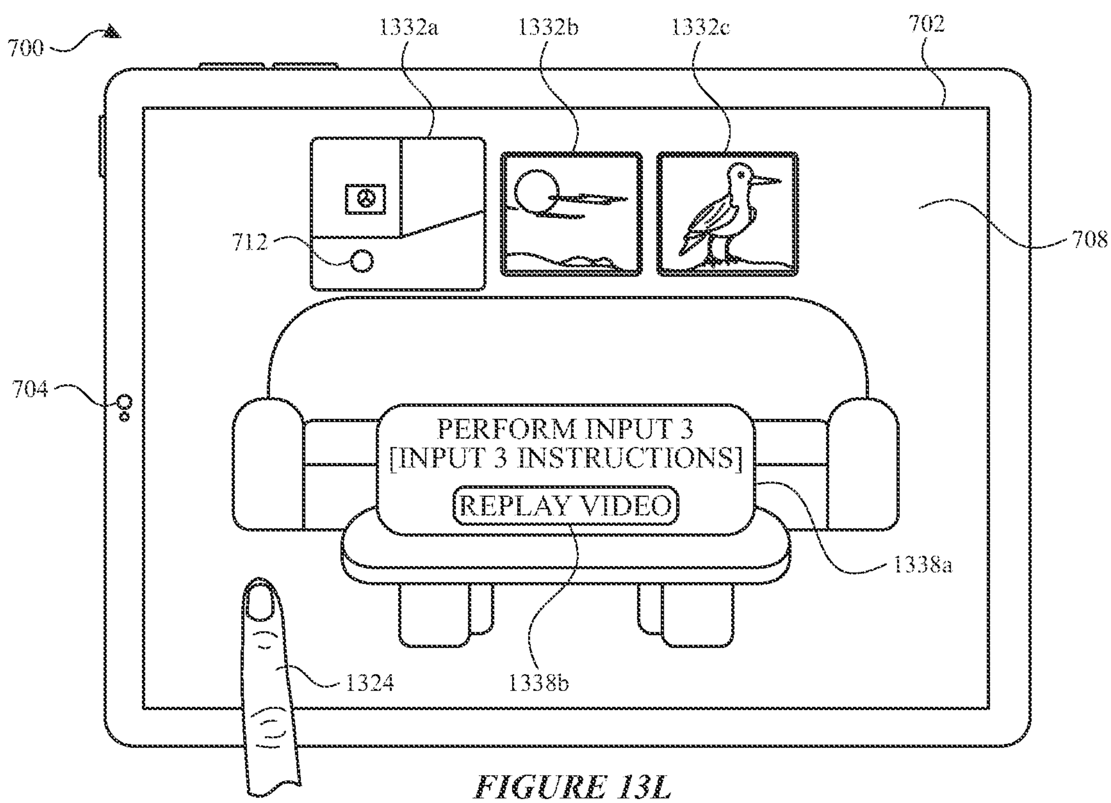

In FIG. 13K and FIG. 13L, electronic device 700 displays an animation in which objects 1332*a*-1332*c* move from a first position, shown in FIG. 13K (e.g., a first position in which they were displayed in video 1326), to a second position, shown in FIG. 13L. As discussed above, in some embodiments, electronic device 700 is a head-mounted system, and objects 1332*a*-1332*c* are displayed on one or more display generation components that are worn on the head of the user. In some embodiments, the animation shown in FIGS. 13K to 13L is displayed via the head-mounted system and objects 1332*a*-1332*c* are animated such that objects 1332*a*-1332*c* appear to be moving towards the user.

At FIG. 13L, electronic device 700 detects (e.g., via input sensors 704) that the user is looking at object 1332*a*, as indicated by gaze indication 712. In response, electronic device 700 displays object 1332*a* in a particular manner (e.g., enlarged) to indicate that electronic device 700 detects that the user is looking at object 1332*a*. At FIG. 13L, electronic device 700 detects (e.g., via input sensors 704) that the user's hand 1324 is performing a hand gesture and/or an air gesture corresponding to a selection input (e.g., a pinch gesture and/or a poke gesture).

Figure 13M:
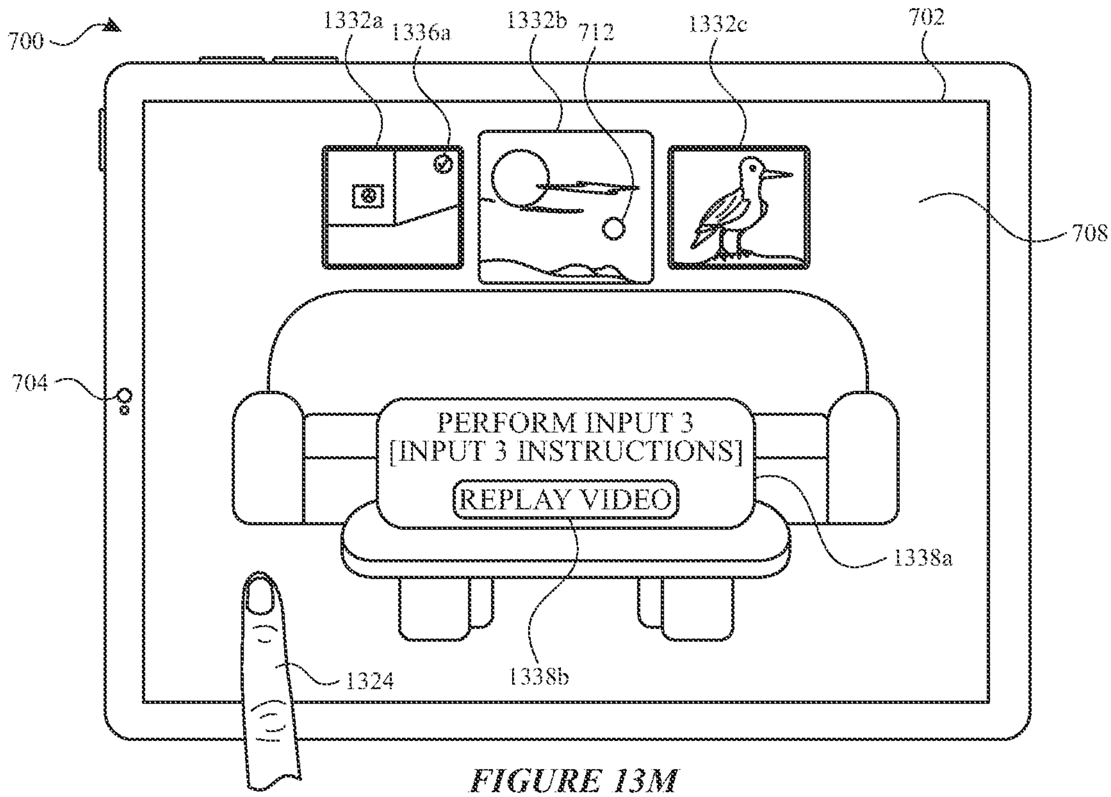

At FIG. 13M, in response to the selection input performed by the user in FIG. 13L, electronic device 700 displays indication 1336*a* indicating that the user has successfully performed a selection gesture with respect to object 1332*a*. At FIG. 13M, electronic device 700 detects (e.g., via input sensors 704) that the user is now looking at object 1332*b*, and displays object 1332*b* in an enlarged manner. Electronic device 700 also detects (e.g., via input sensors 704), that the user's hand 1324 is performing a hand gesture and/or an air gesture corresponding to a selection input while the user is looking at object 1332*b*.

Figure 13N:
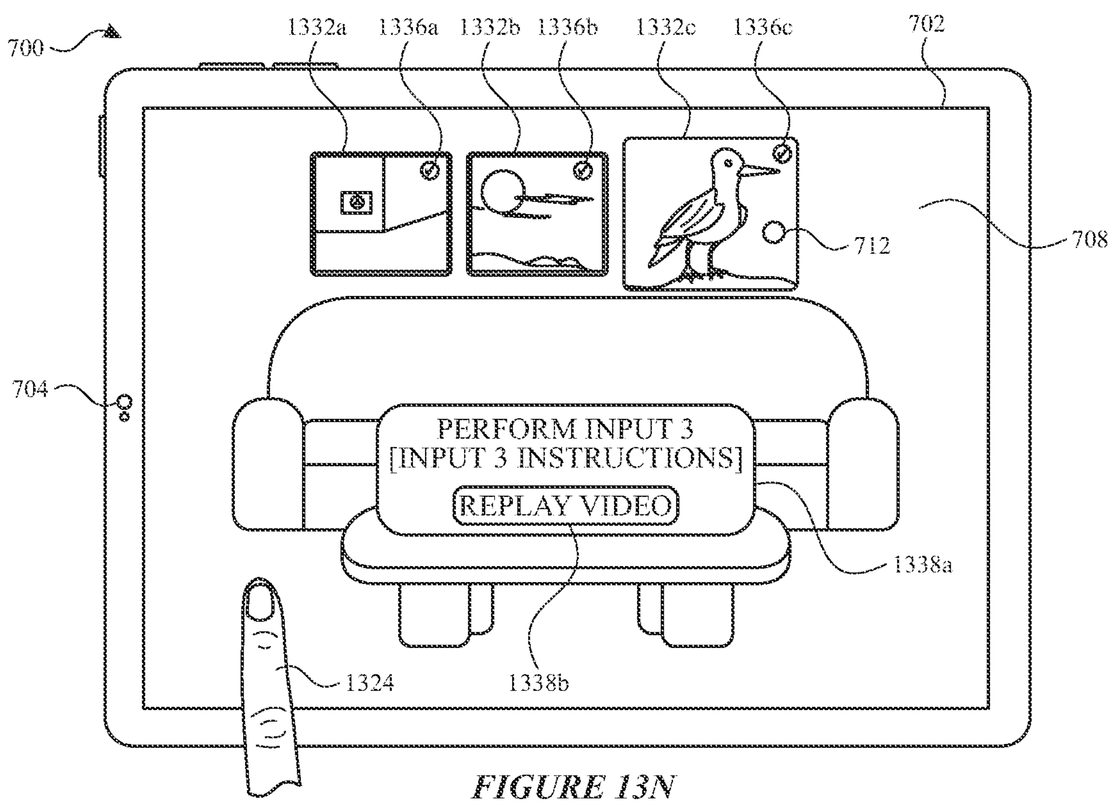

At FIG. 13N, in response to detecting that the user's hand performed a hand gesture and/or an air gesture corresponding to a selection input while the user was looking at object 1332*b*, electronic device 700 displays indication 1336*b* indicating that the user has successfully performed a selection input with respect to object 1332*b*. In FIG. 13N, the user has also performed a selection input corresponding to object 1332*c*, as indicated by indication 1336*c*.

Figure 13O:
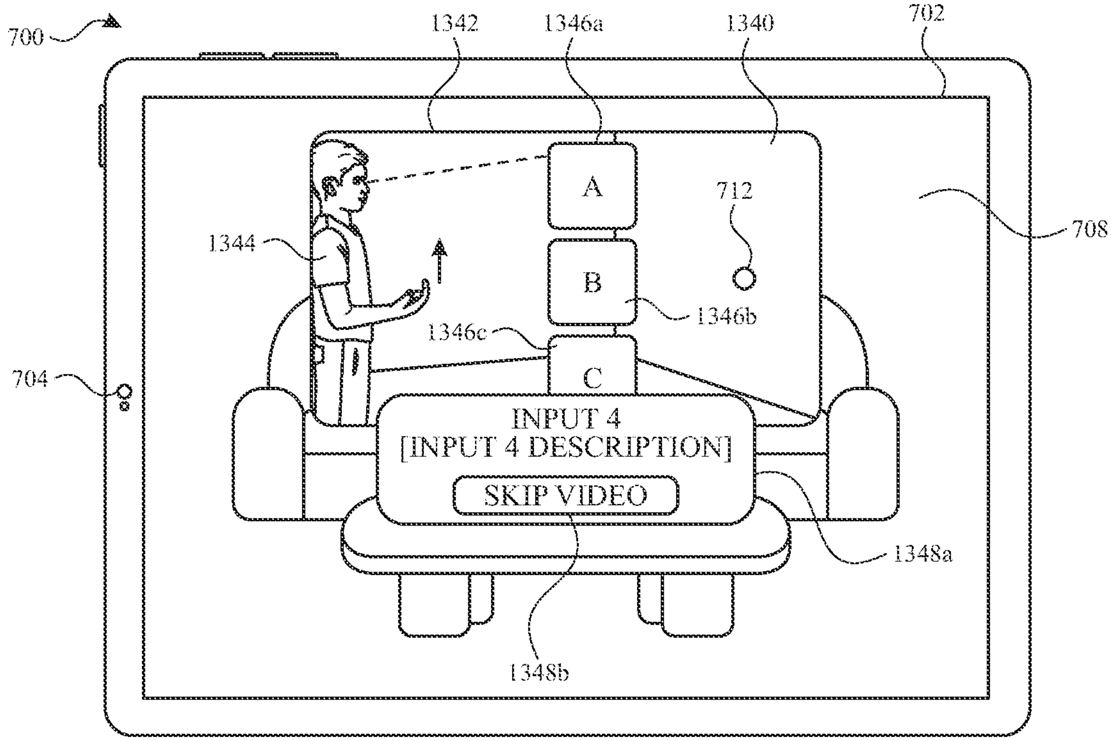

At FIG. 13O, in response to detecting that the user has successfully performed selection inputs for each of objects 1332*a*-1332*c*, electronic device 700 ceases display of objects 1332*a*-1332*c* and object 1338*a* (including button 1338*b*), and displays video 1340 and object 1348*a*, which correspond to a fourth type of user input (e.g., a scroll input). In some embodiments, a user performs a scroll input by gazing at an object and/or a set of objects that the user wishes to scroll, and performing a hand gesture and/or an air gesture (e.g., a swipe air gesture in one of a plurality of directions). For example, in some embodiments, if a user wishes to scroll up, the user performs a swipe up gesture while looking at one or more objects to be scrolled, and if the user wishes to scroll down, the user performs a swipe down gesture while looking at one or more objects to be scrolled. Object 1348*a* includes instructions instructing the user on how to perform the scroll input, and also includes button 1348*b* that is selectable to skip video 1340 (e.g., cease display of video 1340 (e.g., and advance to the user interfaces shown in FIGS. 13R-13U). Video 1340 is displayed within window border 1342, and depicts simulated user 1344 performing the scroll input to demonstrate to the user how to perform the scroll input. In FIG. 13O, video 1340 depicts simulated user 1344 performing a scroll input by performing a swipe up hand gesture while looking at object 1346*a*.

Figure 13P:
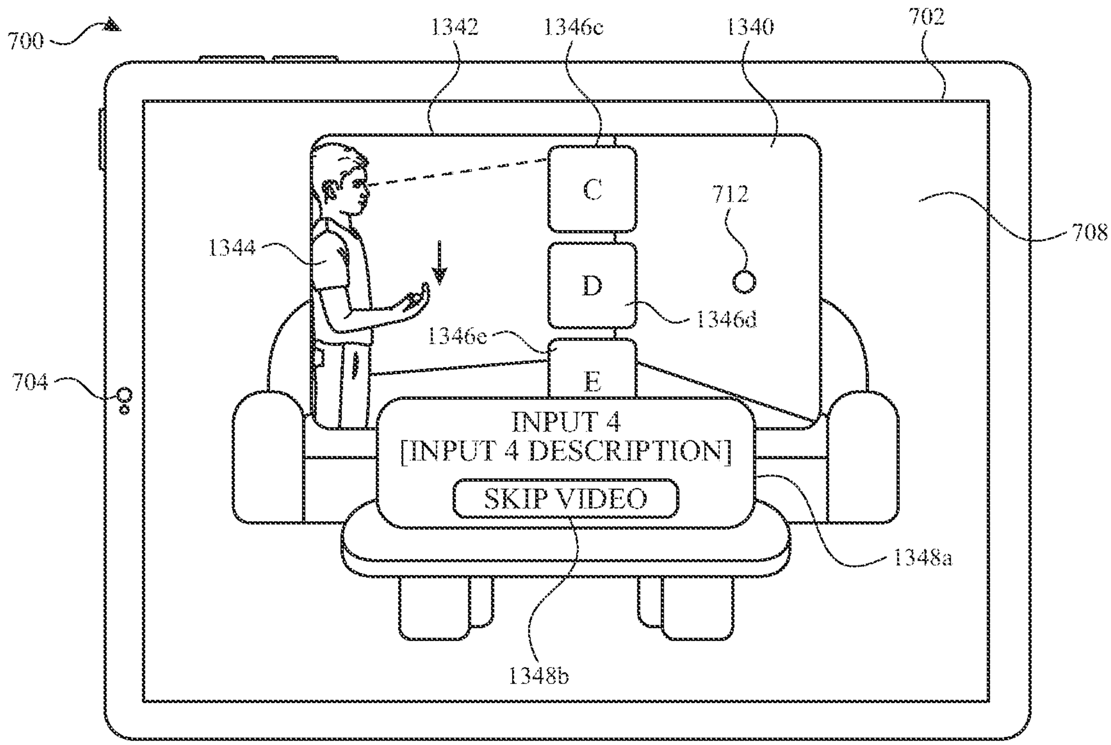
Figure 13Q:
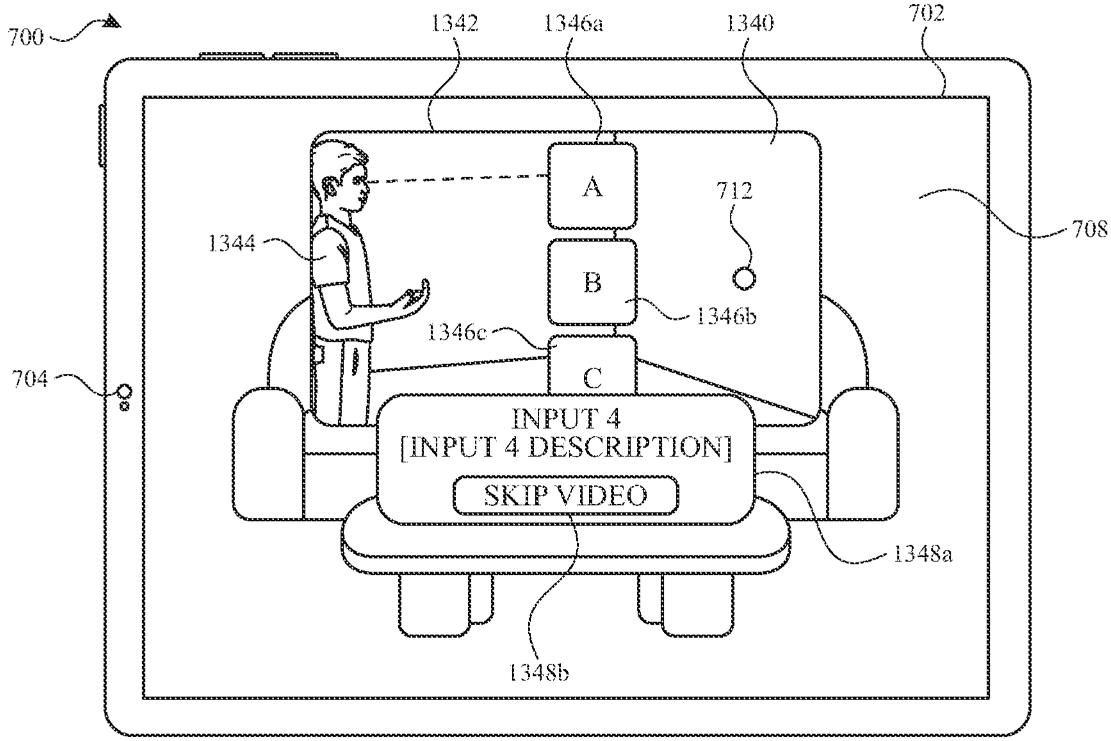

In FIG. 13P, in response to simulated user 1344 performing the scroll input, video 1340 depicts objects 1346*a*-1346*c* scroll upwards such that objects 1346*a*-1346*b* are no longer displayed, object 1346*c* is displayed at the top of video 1340, and objects 1346*d* and 1346*e* are now visible. In FIG. 13P, video 1340 now depicts simulated user 1344 performing a scroll down input by performing a swipe down gesture while gazing at object 1346*c*. In FIG. 13Q, video 1340 depicts objects 1346*a*-1346*e* scrolled back down in response to the scroll input by simulated user 1344.

Figure 13R:
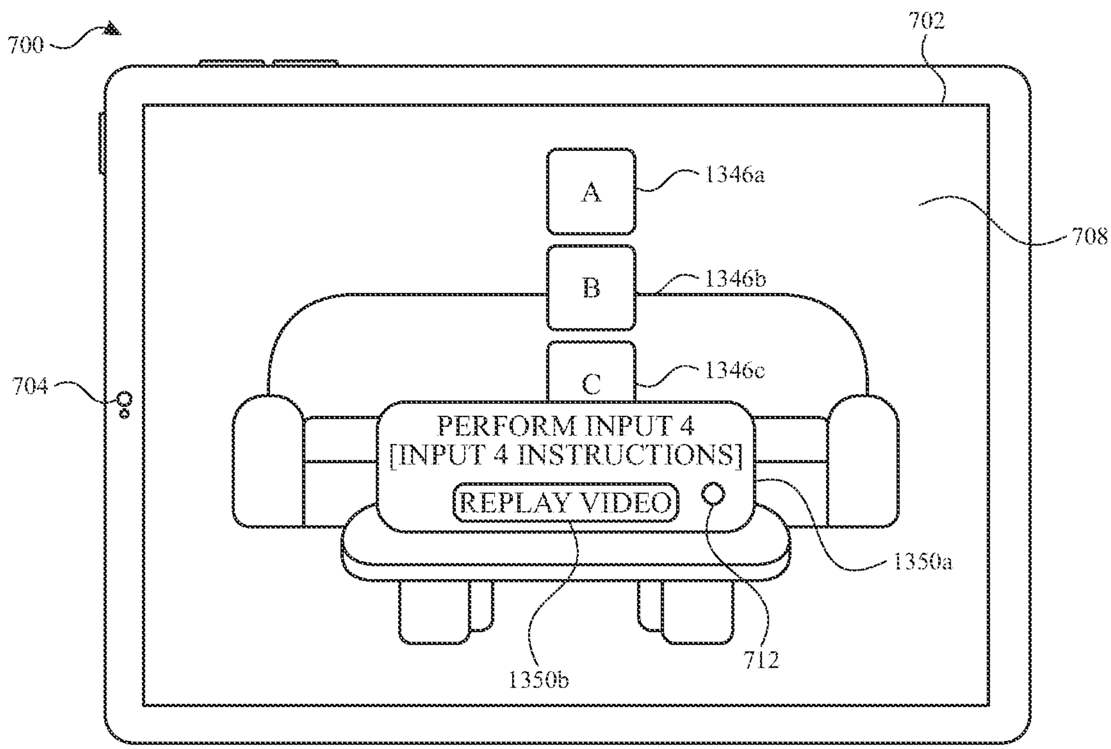

At FIG. 13R, playback of video 1340 has completed. In response, electronic device 700 ceases display of window border 1340 and simulated user 1344, and maintains display of objects 1346*a*-1346*c*. Electronic device 700 also ceases display of object 1348*a* (including button 1348*b*), and now displays object 1350*a* which, in some embodiments, instructs the user to perform the scroll input on objects 1346*a*-1346*e*. Object 1350*a* also includes button 1350*b* that is selectable to re-display and re-play video 1340.

Figure 13S:
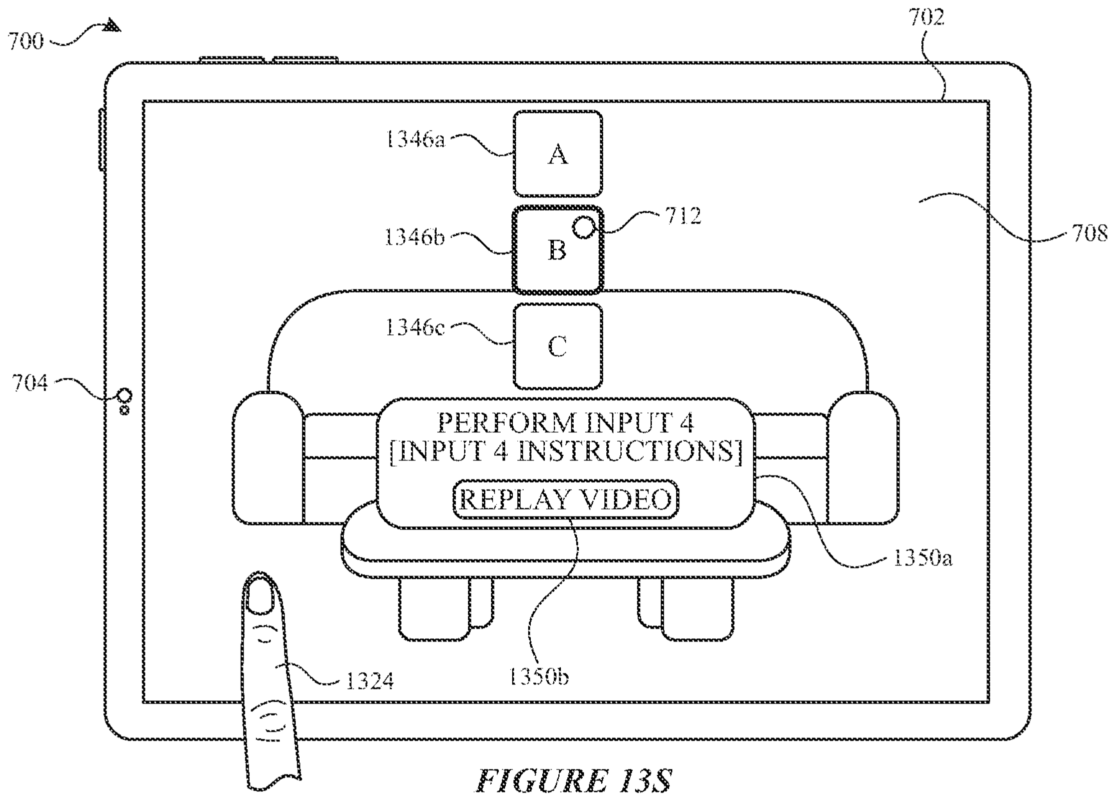

At FIG. 13S, electronic device 700 detects (e.g., via input sensors 704) that the user is looking at object 1346*b*, as indicated by gaze indication 712. At FIG. 13S, electronic device 700 also detects (e.g., via input sensors 704) that the user's hand 1324 performs a hand gesture and/or an air gesture corresponding to a scroll down input (e.g., a swipe down gesture) while the user is gazing at object 1346*b*.

Figure 13T:
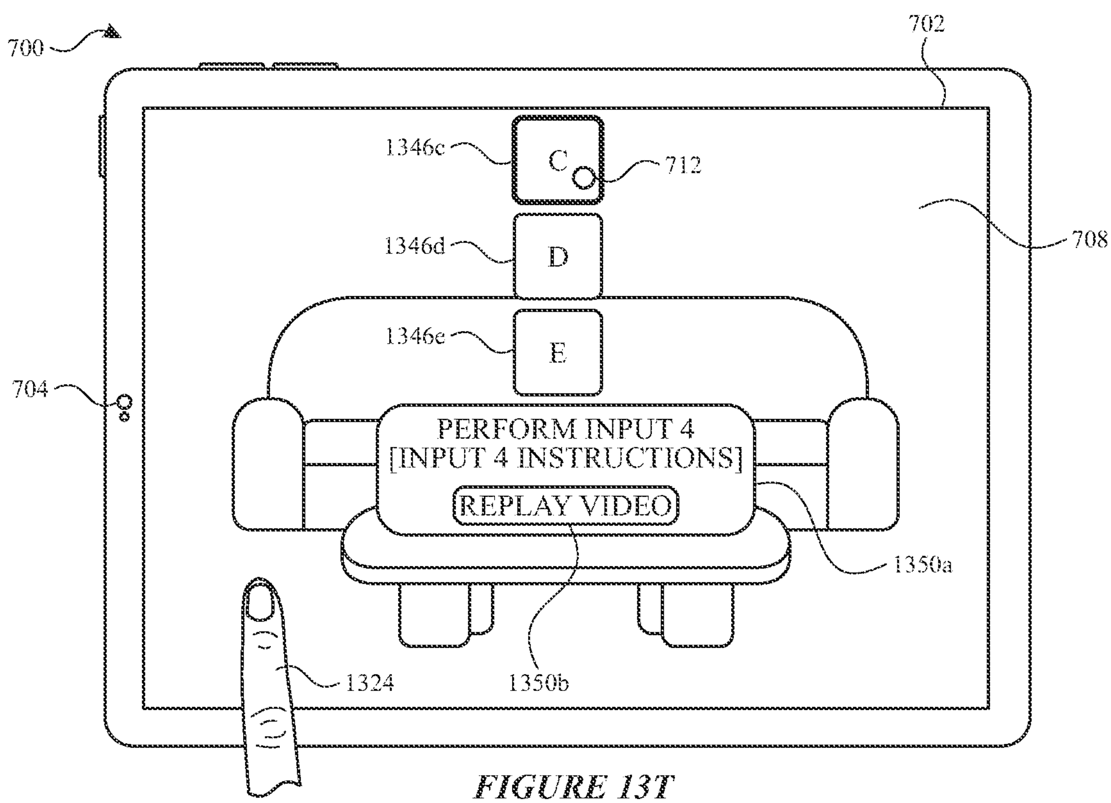
Figure 13U:
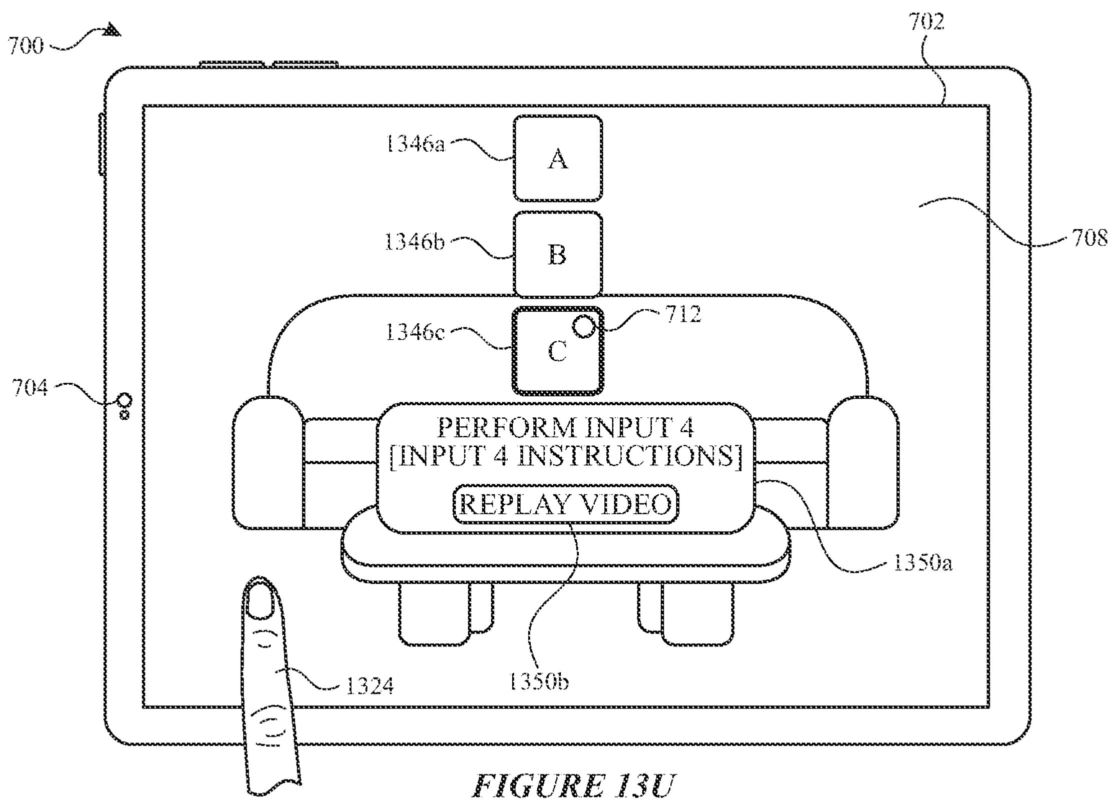

At FIG. 13T, in response to detecting the scroll down input by the user, electronic device 700 displays downward scrolling of objects 1346*a*-1346*e*. At FIG. 13T, electronic device 700 detects (e.g., via input sensors 704) that the user's hand 1324 performs a hand gesture and/or an air gesture corresponding to a scroll up input (e.g., a swipe up gesture) while the user is gazing at object 1346*c* (as indicated by gaze indication 712). At FIG. 13U, in response to detecting the scroll up input by the user, electronic device 700 displays upward scrolling of objects 1346*a*-1346*e*.

Figure 13V:
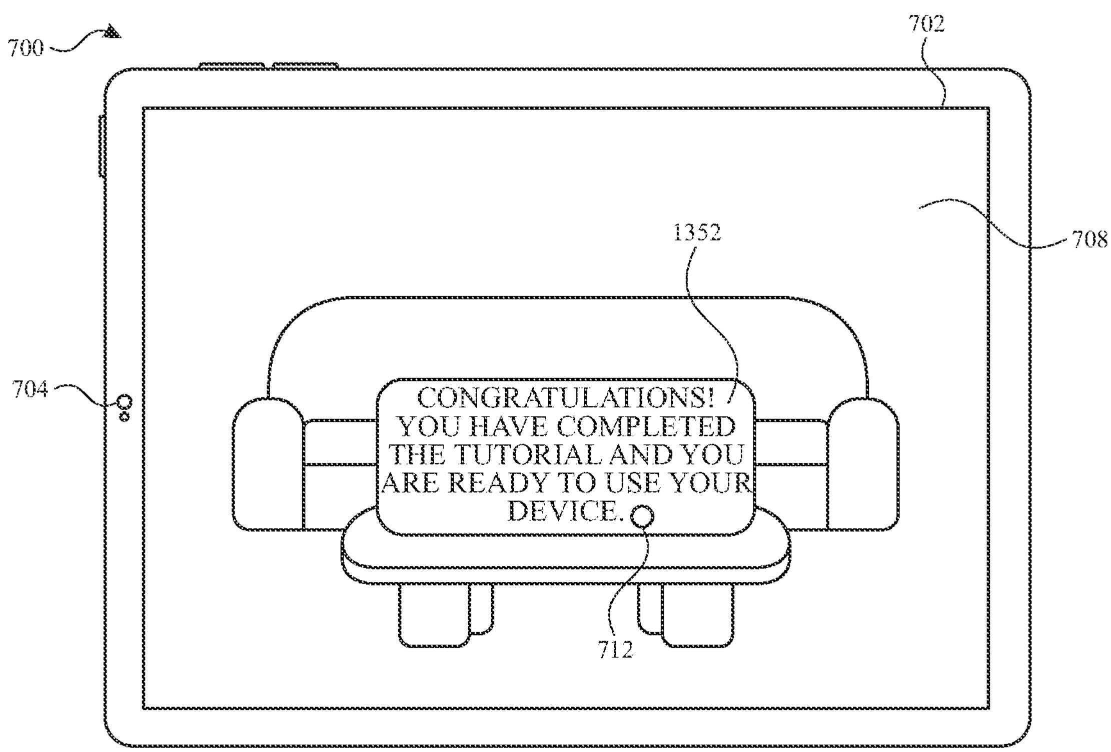

At FIG. 13V, electronic device 700 determines that the user has successfully performed a scroll down input and a scroll up input. In response to this determination, electronic device 700 ceases display of objects 1346*a*-1346*c* and object 1350*a* (including button 1350*b*), and displays indication 1352 indicating that the user has completed the input tutorial.

Figure 13W:
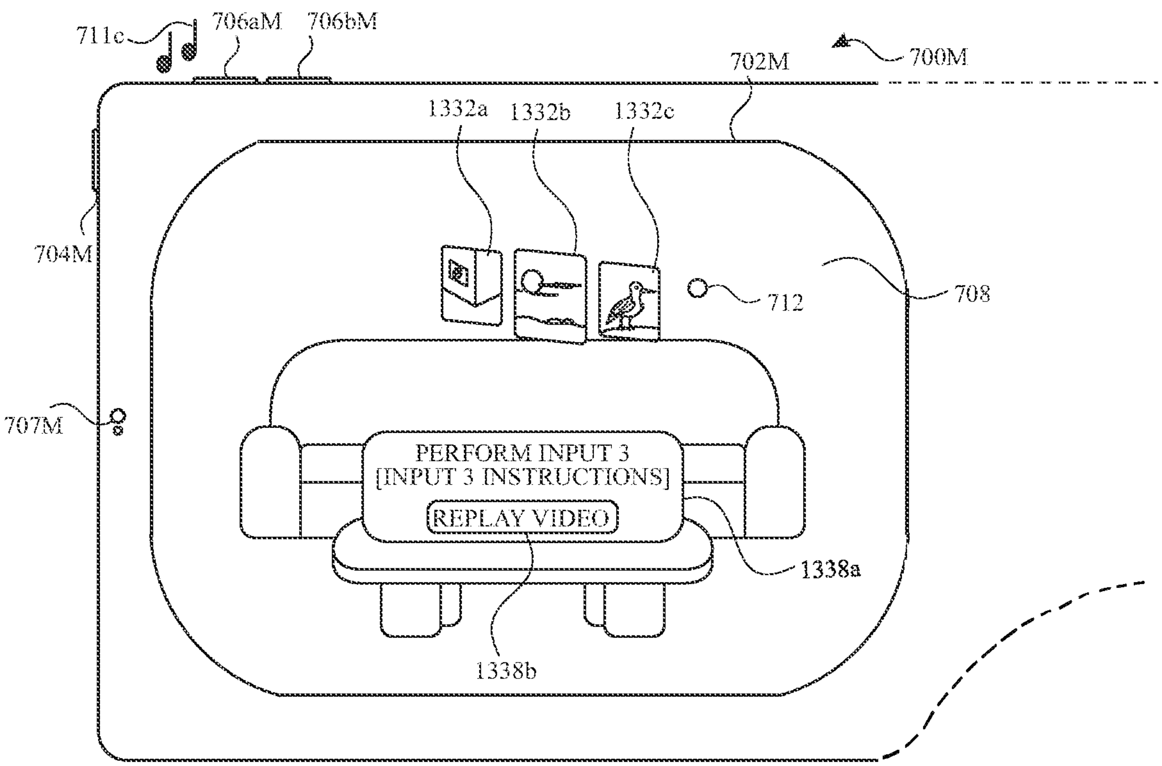
Figure 13X:
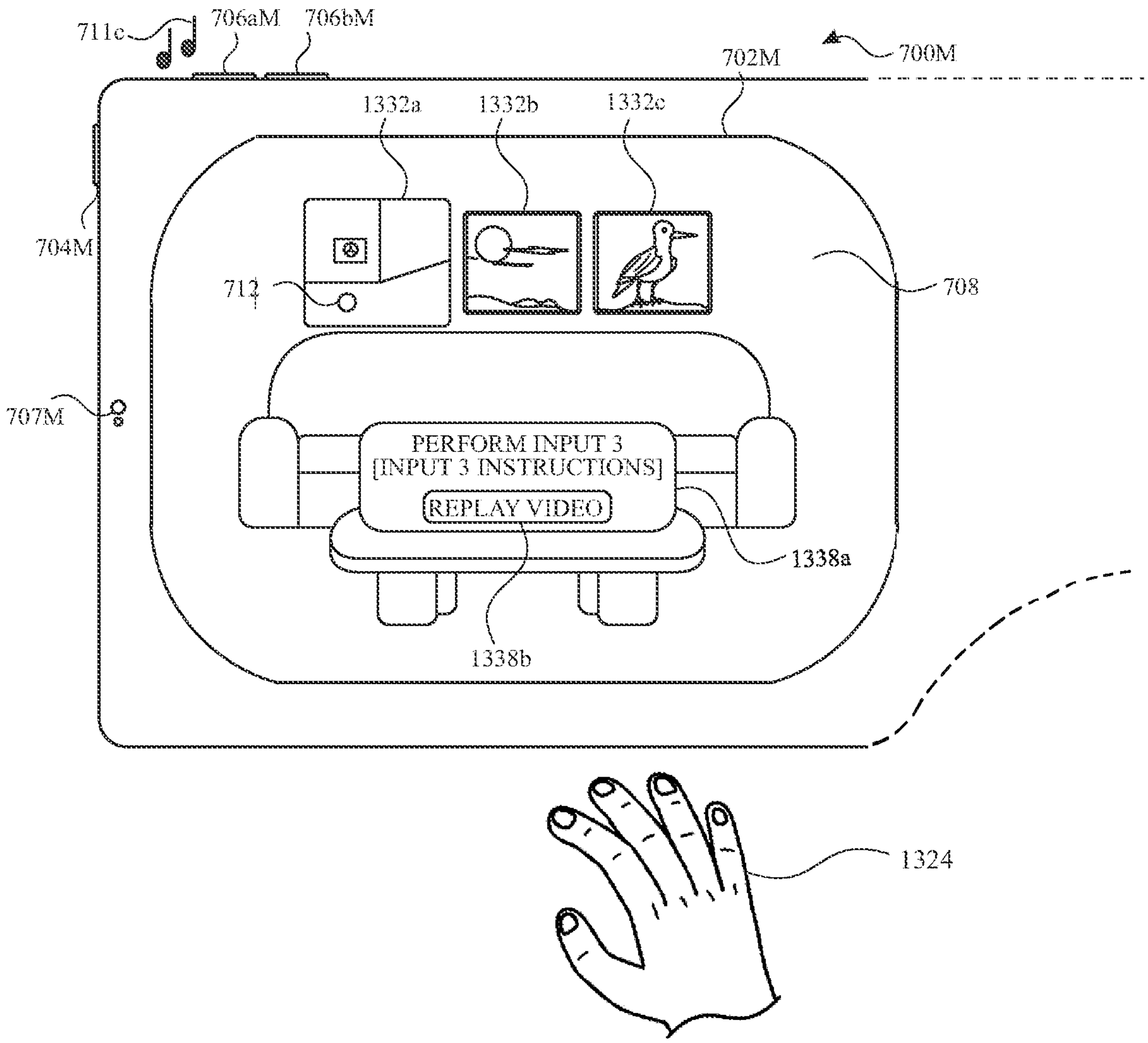

In some embodiments, the techniques and user interfaces described in FIGS. 13A-13V are provided by one or more of the devices described in FIGS. 1A-1P. FIGS. 13W-13X illustrate an embodiment in which objects 1332*a*-1332, and 1338*a*-1338*b* (e.g., as described in FIGS. 13K-13L) are displayed on display module 702M of head-mounted device (HMD) 700M. At FIG. 13W, playback of video 1326 (e.g., from FIG. 13J) has completed and, accordingly, HMD 700M ceases display of window border 1328 and simulated user 1330, while maintaining display of objects 1332*a*-1332*c*. HMD 700M also ceases display of object 1334*a* (including button 1334*b*), and now displays object 1338*a*, which instructs the user to perform the selection input (which was demonstrated in video 1326 and explained in object 1334*a*) on objects 1332*a*-1332*c*. Object 1338*a* includes button 1338*b*, which is selectable to re-play video 1326 (e.g., selectable to re-display video 1326 and object 1334*a*). In FIG. 13W and FIG. 13X, HMD 700M displays an animation in which objects 1332*a*-1332*c* move from a first position, shown in FIG. 13W (e.g., a first position in which they were displayed in video 1326), to a second position, shown in FIG. 13X. In some embodiments, the animation shown in FIGS. 13W and 13X is displayed via HMD 700M while HMD 700M is worn on the head and/or face of a user, and objects 1332*a*-1332*c* are animated such that objects 1332*a*-1332*c* appear to be moving towards the user. At FIG. 13X, HMD 700M detects that the user is looking at object 1332*a*, as indicated by gaze indication 712. In response, HMD 700M displays object 1332*a* in a particular manner (e.g., enlarged) to indicate that HMD 700M detects that the user is looking at object 1332*a*. At FIG. 13X, HMD 700M detects (e.g., via input sensors 704) that the user's hand 1324 is performing a hand gesture and/or an air gesture corresponding to a selection input (e.g., a pinch gesture and/or a poke gesture).

In some embodiments, device 700M includes a pair of display modules that provide stereoscopic content to different eyes of the same user. For example, HMD 700M includes display module 702M (which provides content to a left eye of the user) and a second display module (which provides content to a right eye of the user). In some embodiments, the second display module displays a slightly different image than display module 702M to generate the illusion of stereoscopic depth.

Any of the features, components, and/or parts, including the arrangements and configurations thereof shown in FIGS. 1B-1P can be included, either alone or in any combination, in HMD 700M. For example, in some embodiments, HMD 700M includes any of the features, components, and/or parts of HMD 1-100, 1-200, 3-100, 6-100, 6-200, 6-300, 6-400, 11.1.1-100, and/or 11.1.2-100, either alone or in any combination. In some embodiments, display module 702M includes any of the features, components, and/or parts of display unit 1-102, display unit 1-202, display unit 1-306, display unit 1-406, display generation component 120, display screens 1-122*a*-*b*, first and second rear-facing display screens 1-322*a*, 1-322*b*, display 11.3.2-104, first and second display assemblies 1-120*a*, 1-120*b*, display assembly 1-320, display assembly 1-421, first and second display sub-assemblies 1-420*a*, 1-420*b*, display assembly 3-108, display assembly 11.3.2-204, first and second optical modules 11.1.1-104*a* and 11.1.1-104*b*, optical module 11.3.2-100, optical module 11.3.2-200, lenticular lens array 3-110, display region or area 6-232, and/or display/display region 6-334, either alone or in any combination. In some embodiments, sensor 707M includes any of the features, components, and/or parts of any of sensors 190, sensors 306, image sensors 314, image sensors 404, sensor assembly 1-356, sensor assembly 1-456, sensor system 6-102, sensor system 6-202, sensors 6-203, sensor system 6-302, sensors 6-303, sensor system 6-402, and/or sensors 11.1.2-110*a*-*f*, either alone or in any combination. In some embodiments, input devices 704M, 706*a*M, and/or 706*b*M include any of the features, components, and/or parts of any of first button 1-128, button 11.1.1-114, second button 1-132, and or dial or button 1-328, either alone or in any combination. In some embodiments, HMD 700M includes one or more audio output components (e.g., electronic component 1-112) for generating audio feedback (e.g., audio output 711*c*), optionally generated based on detected events and/or user inputs detected by the HMD 700M.

Additional descriptions regarding FIGS. 13A-13X are provided below in reference to method 1400 described with respect to FIGS. 13A-13X and FIG. 14.

FIG. 14 is a flow diagram of an exemplary method 1400 for providing an input tutorial, in accordance with some embodiments. In some embodiments, method 1400 is performed at a computer system (e.g., computer system 101 in FIG. 1A) (e.g., 700) that is in communication with one or more display generation components (e.g., 702) (e.g., a visual output device, a 3D display, a display having at least a portion that is transparent or translucent on which images can be projected (e.g., a see-through display), a projector, a heads-up display, and/or a display controller) and one or more input devices (e.g., 704) (e.g., a touch-sensitive surface (e.g., a touch-sensitive display); a mouse; a keyboard; a remote control; a visual input device (e.g., one or more cameras (e.g., an infrared camera, a depth camera, a visible light camera)); an audio input device; and/or a biometric sensor (e.g., a fingerprint sensor, a face identification sensor, and/or an iris identification sensor)). In some embodiments, the method 1400 is governed by instructions that are stored in a non-transitory (or transitory) computer-readable storage medium and that are executed by one or more processors of a computer system, such as the one or more processors 202 of computer system 101 (e.g., control 110 in FIG. 1A). Some operations in method 1400 are, optionally, combined and/or the order of some operations is, optionally, changed.

The computer system (e.g., 700) displays (1402), via the one or more display generation components (e.g., 702), as part of an input tutorial, a first set of user input instructions (e.g., 1308*a*, 1310*a*, 1320*a*, 1322*a*, 1334*a*, 1338*a*, 1348*a*, and/or 1350*a*) corresponding to a first type of operation (e.g., a first set of user instructions instructing the user how to perform a first type of user input (e.g., one or more user inputs and/or a set of user inputs) that causes the computer system to perform the first type of operation) (e.g., a first set of user instructions instructing the user how to perform a first type of user input that includes one or more user gaze inputs, one or more user hand inputs (e.g., hand movements, hand gestures, and/or air gestures), and/or one or more physical control inputs (e.g., one or more button presses, one or more depressions of a depressible input mechanism, one or more rotations of a rotatable input mechanism, and/or one or more rotations and/or depressions of a rotatable and depressible input mechanism)). Subsequent to displaying the first set of user input instructions (e.g., after displaying the first set of user input instructions and/or while the first set of user input instructions are displayed) and while in the input tutorial (1404), the computer system detects (1406), via the one or more input devices, a first user input (e.g., a gaze input in FIGS. 13C-13F, a hand gesture and/or air gesture by hand 1324 in FIG. 13H, a selection input in FIGS. 13K-13N and/or 13W-13X, and/or a scroll input in FIGS. 13R-13U) (e.g., one or more user inputs and/or a first set of user inputs) (e.g., one or more user gaze inputs, one or more user hand inputs (e.g., hand movements, hand gestures, and/or air gestures), and/or one or more physical control inputs (e.g., one or more button presses, one or more depressions of a depressible input mechanism, one or more rotations of a rotatable input mechanism, and/or one or more rotations and/or depressions of a rotatable and depressible input mechanism)) representative of an attempt to perform an input corresponding to the first type of operation (e.g., representative of an attempt to perform a first type of user input demonstrated and/or instructed by the first set of user input instructions and/or a first type of user input that causes the computer system to perform the first type of operation). In response to detecting the first user input (e.g., while in the input tutorial) (1408): in accordance with a determination that the first user input meets a first set of criteria corresponding to the first type of operation (1410) (e.g., a first set of criteria corresponding to the first set of user input instructions and/or a first set of criteria indicative of successful performance of a first type of user input corresponding to the first type of operation): the computer system (e.g., 700) performs (1412) the first type of operation (e.g., displaying indications 1312*a*-1312*d* in FIGS. 13D-13F, displaying indications 1336*a*-1336*c* in FIGS. 13M-13N indicating that the user has selected objects 1132*a*-1332, and/or scrolling objects 1346*a*-1346*e* in FIGS. 13R-13U); and initiates (1414) a process for advancing the input tutorial (e.g., advancing from a first type of user input to a second type of user input in FIGS. 13F-13G, advancing from a second type of user input to a third type of user input in FIGS. 13H-13I, advancing from a third type of user input to a fourth type of user input in FIGS. 13N-13O, and/or advancing from a fourth type of user input to a conclusion of the input tutorial in FIGS. 13U-13V) (in some embodiments, advancing the input tutorial from a first portion corresponding to the first type of operation to a second portion corresponding to a second type of operation different from the first type of operation).

In some embodiments, in response to detecting the first user input, and in accordance with a determination that the first user input does not meet the first set of criteria corresponding to the first type of operation (and, optionally, in accordance with a determination that the first user input meets a second set of criteria corresponding to a second type of operation different from the first type of operation), the computer system performs a second type of operation different from the first type of operation (e.g., performs scrolling instead of selection, performs selection instead of scrolling, and/or does not perform any operation). In some embodiments, in response to detecting the first user input, and in accordance with a determination that the first user input does not meet the first set of criteria corresponding to the first type of operation, the computer system displays an indication that the first user input does not meet the first set of criteria corresponding to the first type of operation. Displaying the first set of user input instructions corresponding to a first type of operation enhances the operability of the device and makes the user-device interface more efficient by helping the user to provide the proper inputs and reducing user mistakes when operating/interacting with the device. Automatically advancing the input tutorial in response to detecting the first user input and in accordance with a determination that the first user input meets the first set of criteria allows a user to advance the input tutorial with fewer user inputs, thereby reducing the number of user inputs required to perform an operation. Performing the first type of operation in response to detecting the first user input and in accordance with a determination that the first user input meet the first set of criteria provides the user with visual feedback about the state of the device (e.g., that the device has detected the first user input and has determined that the first user input meets the first set of criteria), thereby improving visual feedback to the user.

In some embodiments, initiating the process for advancing the input tutorial includes advancing the input tutorial from a first portion corresponding to the first type of operation (e.g., a first portion instructing the user on how to perform the first type of operation, a first portion instructing the user on how to cause the computer system to perform the first type of operation, and/or testing the user on the first type of operation) to a second portion corresponding to a second type of operation different from the first type of operation (e.g., a second portion instructing the user on how to perform the second type of operation, a second portion instructing the user on how to cause the computer system to perform the second type of operation, and/or testing the user on the second type of operation) (e.g., advancing from FIG. 13F to FIG. 13G, from FIG. 13H to FIG. 13I, and/or from FIG. 13N to FIG. 13O). Automatically advancing the input tutorial from the first portion corresponding to the first type of operation to a second portion corresponding to a second type of operation in response to detecting the first user input and in accordance with a determination that the first user input meets the first set of criteria allows a user to advance the input tutorial with fewer user inputs, thereby reducing the number of user inputs required to perform an operation.

In some embodiments, initiating the process for advancing the input tutorial includes displaying, via the one or more display generation components, a first selectable option (e.g., in some embodiments, in FIG. 13F, electronic device 700 displays a selectable option that is selectable to advance to FIG. 13G; in some embodiments, in FIG. 13H, electronic device 700 displays a selectable option that is selectable to advance to FIG. 13I; in some embodiments, in FIG. 13N, electronic device 700 displays a selectable option that is selectable to advance to FIG. 13O; and/or in some embodiments, in FIG. 13U, electronic device 700 displays a selectable option that is selectable to advance to FIG. 13V). In some embodiments, while displaying the first selectable option, the computer system detects, via the one or more input devices, a selection input (e.g., one or more user inputs and/or a set of user inputs) (e.g., one or more user gaze inputs, one or more user hand inputs (e.g., hand movements, hand gestures, and/or air gestures), and/or one or more physical control inputs (e.g., one or more button presses, one or more depressions of a depressible input mechanism, one or more rotations of a rotatable input mechanism, and/or one or more rotations and/or depressions of a rotatable and depressible input mechanism)) corresponding to selection of the first selectable option. In response to detecting the selection input, the computer system displays, via the one or more display generation components, as part of the input tutorial, a second set of user input instructions (e.g., 1308*a*, 1310*a*, 1320*a*, 1322*a*, 1334*a*, 1338*a*, 1348*a*, and/or 1350*a*) different from the first set of user input instructions and corresponding to a second type of operation different from the first type of operation (e.g., advancing from FIG. 13F to FIG. 13G, from FIG. 13H to FIG. 13I, and/or from FIG. 13N to FIG. 13O). In some embodiments, the second set of user input instructions (e.g., 1308*a*, 1310*a*, 1320*a*, 1322*a*, 1334*a*, 1338*a*, 1348*a*, and/or 1350*a*) instruct the user how to perform a second type of user input (e.g., different from the first type of user input) that causes the computer system to perform the second type of operation (e.g., a second set of user instructions instructing the user how to perform a second type of user input that includes one or more user gaze inputs, one or more user hand inputs (e.g., hand movements, hand gestures, and/or air gestures), and/or one or more physical control inputs (e.g., one or more button presses, one or more depressions of a depressible input mechanism, one or more rotations of a rotatable input mechanism, and/or one or more rotations and/or depressions of a rotatable and depressible input mechanism)). Displaying the second set of user input instructions corresponding to the second type of operation enhances the operability of the device and makes the user-device interface more efficient by helping the user to provide the proper inputs and reducing user mistakes when operating/interacting with the device.

In some embodiments, in response to detecting the first user input, and in accordance with a determination that the first user input does not meet the first set of criteria corresponding to the first type of operation, the computer system forgoes performing the first type of operation (e.g., forgoes displaying indications 1312*a*-1312*d* in FIGS. 13D-13F; forgoes displaying indications 1336*a*-1336*c* in FIGS. 13M-13N; and/or forgoes scrolling objects 1346*a*-1346*e* in FIGS. 13R-13U); and forgoes initiating the process for advancing the input tutorial (e.g., forgoes advancing from FIG. 13F to FIG. 13G, from FIG. 13H to FIG. 13I, and/or from FIG. 13N to FIG. 13O). In some embodiments, forgoing initiating the process for advancing the input tutorial includes maintaining the input tutorial at a first portion corresponding to the first type of operation without advancing the input tutorial to a second portion corresponding to a second type of operation. In some embodiments, until the user provides a user input that meets the first set of criteria, the computer system maintains the input tutorial at a current step without advancing the input tutorial (e.g., prohibits the user from advancing in the input tutorial). Forgoing performing the first type of operation and forgoing initiating the process for advancing the input tutorial in accordance with a determination that the first user input does not meet the first set of criteria provides the user with visual feedback about the state of the device (e.g., that the device has determined that the first user input does not meet the first set of criteria), thereby improving visual feedback to the user.

In some embodiments, initiating the process for advancing the input tutorial further includes: displaying (e.g., automatically displaying and/or displaying, without further user input) (in some embodiments, subsequent to performing the first type of operation), via the one or more display generation components, as part of the input tutorial, a second set of user input instructions (e.g., 1308*a*, 1310*a*, 1320*a*, 1322*a*, 1334*a*, 1338*a*, 1348*a*, and/or 1350*a*) different from the first set of user input instructions and corresponding to the second type of operation. In some embodiments, subsequent to displaying the second set of user input instructions (e.g., after displaying the second set of user input instructions and/or while the second set of user input instructions are displayed) and while in the input tutorial, the computer system detects, via the one or more input devices, a second user input (e.g., a gaze input in FIGS. 13C-13F, a hand gesture and/or air gesture by hand 1324 in FIG. 13H, a selection input in FIGS. 13K-13N and/or FIGS. 13W-13X, and/or a scroll input in FIGS. 13R-13U) (e.g., one or more user inputs and/or a second set of user inputs) (e.g., one or more user gaze inputs, one or more user hand inputs (e.g., hand movements, hand gestures, and/or air gestures), and/or one or more physical control inputs (e.g., one or more button presses, one or more depressions of a depressible input mechanism, one or more rotations of a rotatable input mechanism, and/or one or more rotations and/or depressions of a rotatable and depressible input mechanism)) representative of an attempt to perform an input corresponding to the second type of operation (e.g., representative of an attempt to perform a second type of user input demonstrated and/or instructed by the second set of user input instructions and/or a second type of user input that causes the computer system to perform the second type of operation). In response to detecting the second user input (e.g., while in the input tutorial), and in accordance with a determination that the second user input meets a second set of criteria corresponding to the second type of operation (e.g., a second set of criteria corresponding to the second set of user input instructions and/or a second set of criteria indicative of successful performance of a second type of user input corresponding to the second type of operation) (in some embodiments, a second set of criteria different from the first set of criteria), the computer system performs the second type of operation (e.g., displaying indications 1312*a*-1312*d* in FIGS. 13D-13F, displaying indications 1336*a*-1336*c* in FIGS. 13M-13N indicating that the user has selected objects 1132*a*-1332, and/or scrolling objects 1346*a*-1346*e* in FIGS. 13R-13U); and initiates a second process for advancing the input tutorial (e.g., advancing from a first type of user input to a second type of user input in FIGS. 13F-13G, advancing from a second type of user input to a third type of user input in FIGS. 13H-13I, advancing from a third type of user input to a fourth type of user input in FIGS. 13N-13O, and/or advancing from a fourth type of user input to a conclusion of the input tutorial in FIGS. 13U-13V) (in some embodiments, advancing the input tutorial from a second portion corresponding to the second type of operation to a third portion corresponding to a third type of operation different from the first and second types of operation). In some embodiments, in response to detecting the second user input: in accordance with a determination that the second user input does not meet the second set of criteria corresponding to the second type of operation, the computer system forgoes performing the second type of operation and forgoes initiating the second process for advancing the input tutorial. Displaying the second set of user input instructions corresponding to a second type of operation enhances the operability of the device and makes the user-device interface more efficient by helping the user to provide the proper inputs and reducing user mistakes when operating/interacting with the device. Performing the second type of operation in response to detecting the second user input and in accordance with a determination that the second user input meets the second set of criteria provides the user with visual feedback about the state of the device (e.g., that the device has detected the second user input and has determined that the second user input meets the second set of criteria), thereby improving visual feedback to the user.

In some embodiments, initiating the second process for advancing the input tutorial includes displaying (e.g., automatically displaying and/or displaying, without further user input) (in some embodiments, subsequent to performing the second type of operation), via the one or more display generation components, as part of the input tutorial, a third set of user input instructions (e.g., 1308*a*, 1310*a*, 1320*a*, 1322*a*, 1334*a*, 1338*a*, 1348*a*, and/or 1350*a*) different from the first set of user input instructions and the second set of user input instructions and corresponding to a third type of operation different from the first type of operation and the second type of operations. In some embodiments, subsequent to displaying the third set of user input instructions (e.g., after displaying the third set of user input instructions and/or while the third set of user input instructions are displayed) and while in the input tutorial, the computer system detects, via the one or more input devices, a third user input (e.g., a gaze input in FIGS. 13C-13F, a hand gesture and/or air gesture by hand 1324 in FIG. 13H, a selection input in FIGS. 13K-13N and/or FIGS. 13W-13X, and/or a scroll input in FIGS. 13R-13U) (e.g., one or more user inputs and/or a third set of user inputs) (e.g., one or more user gaze inputs, one or more user hand inputs (e.g., hand movements, hand gestures, and/or air gestures), and/or one or more physical control inputs (e.g., one or more button presses, one or more depressions of a depressible input mechanism, one or more rotations of a rotatable input mechanism, and/or one or more rotations and/or depressions of a rotatable and depressible input mechanism)) representative of an attempt to perform an input corresponding to the third type of operation (e.g., representative of an attempt to perform a third type of user input demonstrated and/or instructed by the third set of user input instructions and/or a third type of user input that causes the computer system to perform the third type of operation). In response to detecting the third user input (e.g., while in the input tutorial), and in accordance with a determination that the third user input meets a third set of criteria corresponding to the third type of operation (e.g., a third set of criteria corresponding to the third set of user input instructions and/or a third set of criteria indicative of successful performance of a third type of user input corresponding to the third type of operation) (in some embodiments, a third set of criteria different from the first and second sets of criteria), the computer system performs the third type of operation (e.g., displaying indications 1312*a*-1312*d* in FIGS. 13D-13F, displaying indications 1336*a*-1336*c* in FIGS. 13M-13N indicating that the user has selected objects 1132*a*-1332, and/or scrolling objects 1346*a*-1346*e* in FIGS. 13R-13U); and initiates a third process for advancing the input tutorial (e.g., advancing from a first type of user input to a second type of user input in FIGS. 13F-13G, advancing from a second type of user input to a third type of user input in FIGS. 13H-13I, advancing from a third type of user input to a fourth type of user input in FIGS. 13N-13O, and/or advancing from a fourth type of user input to a conclusion of the input tutorial in FIGS. 13U-13V) (in some embodiments, advancing the input tutorial from a third portion corresponding to the third type of operation to a fourth portion corresponding to a fourth type of operation different from the first, second, and third types of operations). In some embodiments, in response to detecting the third user input: in accordance with a determination that the third user input does not meet the third set of criteria corresponding to the third type of operation, the computer system forgoes performing the third type of operation and forgoes initiating the third process for advancing the input tutorial. Displaying the third set of user input instructions corresponding to a third type of operation enhances the operability of the device and makes the user-device interface more efficient by helping the user to provide the proper inputs and reducing user mistakes when operating/interacting with the device. Performing the third type of operation in response to detecting the third user input and in accordance with a determination that the third user input meets the third set of criteria provides the user with visual feedback about the state of the device (e.g., that the device has detected the third user input and has determined that the third user input meets the third set of criteria), thereby improving visual feedback to the user.

In some embodiments, the first set of user input instructions (e.g., 1308*a*, 1310*a*, 1320*a*, 1322*a*, 1334*a*, 1338*a*, 1348*a*, and/or 1350*a*) instructs a user to perform a first set of user inputs (e.g., one or more user inputs) (e.g., a gaze input, a hand gesture input, and/or an air gesture input); the second set of user input instructions (e.g., 1308*a*, 1310*a*, 1320*a*, 1322*a*, 1334*a*, 1338*a*, 1348*a*, and/or 1350*a*) instructs the user to perform a second set of user inputs (e.g., one or more user inputs) different from the first set of user inputs (e.g., a gaze input, a hand gesture input, and/or an air gesture input); and the third set of user input instructions (e.g., 1308*a*, 1310*a*, 1320*a*, 1322*a*, 1334*a*, 1338*a*, 1348*a*, and/or 1350*a*) instructs the user to perform a third set of user inputs (e.g., one or more user inputs) that includes at least a subset of the first set of user inputs and/or at least a subset of the second set of user inputs (e.g., object 1334*a* and/or object 1338*a* instruct the user to perform a selection input, which includes a gaze input (e.g., instructed in objects 1308*a* and/or 1310*a*) and an air gesture (e.g., instructed in objects 1320*a* and/or 1322*a*); and/or object 1348*a* and/or object 1350*a* instruct the user to perform a scroll input, which includes a gaze input (e.g., instructed in objects 1308*a* and/or 1310*a*) and an air gesture (e.g., instructed in objects 1320*a* and/or 1322*a*)). Teaching the user how to perform the first set of user inputs and the second set of user inputs, and then teaching the user how to perform a third set of user inputs that includes at least a subset of the first set of user inputs and/or at least a subset of the second set of user inputs enhances the operability of the device and makes the user-device interface more efficient by helping the user to provide the proper inputs and reducing user mistakes when operating/interacting with the device.

In some embodiments, initiating the third process for advancing the input tutorial includes displaying (e.g., automatically displaying and/or displaying, without further user input) (in some embodiments, subsequent to performing the third type of operation), via the one or more display generation components, as part of the input tutorial, a fourth set of user input instructions (e.g., 1308*a*, 1310*a*, 1320*a*, 1322*a*, 1334*a*, 1338*a*, 1348*a*, and/or 1350*a*) different from the first set of user input instructions, the second set of user input instructions, and the third set of user input instructions and corresponding to a fourth type of operation different from the first type of operation, the second type of operation, and the third type of operation. In some embodiments, subsequent to displaying the fourth set of user input instructions (e.g., after displaying the fourth set of user input instructions and/or while the fourth set of user input instructions are displayed) and while in the input tutorial, the computer system detects, via the one or more input devices, a fourth user input (e.g., a gaze input in FIGS. 13C-13F, a hand gesture and/or air gesture by hand 1324 in FIG. 13H, a selection input in FIGS. 13K-13N and/or FIGS. 13W-13X, and/or a scroll input in FIGS. 13R-13U) (e.g., one or more user inputs and/or a fourth set of user inputs) (e.g., one or more user gaze inputs, one or more user hand inputs (e.g., hand movements, hand gestures, and/or air gestures), and/or one or more physical control inputs (e.g., one or more button presses, one or more depressions of a depressible input mechanism, one or more rotations of a rotatable input mechanism, and/or one or more rotations and/or depressions of a rotatable and depressible input mechanism)) representative of an attempt to perform an input corresponding to the fourth type of operation (e.g., representative of an attempt to perform a fourth type of user input demonstrated and/or instructed by the fourth set of user input instructions and/or a fourth type of user input that causes the computer system to perform the fourth type of operation). In response to detecting the fourth user input (e.g., while in the input tutorial), and in accordance with a determination that the fourth user input meets a fourth set of criteria corresponding to the fourth type of operation (e.g., a fourth set of criteria corresponding to the fourth set of user input instructions and/or a fourth set of criteria indicative of successful performance of a fourth type of user input corresponding to the fourth type of operation) (in some embodiments, a fourth set of criteria different from the first, second, and third sets of criteria), the computer system performs the fourth type of operation (e.g., displaying indications 1312*a*-1312*d* in FIGS. 13D-13F, displaying indications 1336*a*-1336*c* in FIGS. 13M-13N indicating that the user has selected objects 1132*a*-1332, and/or scrolling objects 1346*a*-1346*e* in FIGS. 13R-13U); and initiates a fourth process for advancing the input tutorial (e.g., advancing from a first type of user input to a second type of user input in FIGS. 13F-13G, advancing from a second type of user input to a third type of user input in FIGS. 13H-13I, advancing from a third type of user input to a fourth type of user input in FIGS. 13N-13O, and/or advancing from a fourth type of user input to a conclusion of the input tutorial in FIGS. 13U-13V) (in some embodiments, advancing the input tutorial from a fourth portion corresponding to the fourth type of operation to a fifth portion corresponding to a fifth type of operation different from the first, second, third, and fourth types of operations). In some embodiments, in response to detecting the fourth user input: in accordance with a determination that the fourth user input does not meet the fourth set of criteria corresponding to the fourth type of operation, the computer system forgoes performing the fourth type of operation and forgoes initiating the fourth process for advancing the input tutorial. Displaying the fourth set of user input instructions corresponding to a fourth type of operation enhances the operability of the device and makes the user-device interface more efficient by helping the user to provide the proper inputs and reducing user mistakes when operating/interacting with the device. Performing the fourth type of operation in response to detecting the fourth user input and in accordance with a determination that the fourth user input meets the fourth set of criteria provides the user with visual feedback about the state of the device (e.g., that the device has detected the fourth user input and has determined that the fourth user input meets the fourth set of criteria), thereby improving visual feedback to the user.

In some embodiments, the first set of user input instructions (e.g., 1308*a*, 1310*a*, 1320*a*, 1322*a*, 1334*a*, 1338*a*, 1348*a*, and/or 1350*a*) instructs a user to perform a first set of user inputs (e.g., one or more user inputs); the second set of user input instructions (e.g., 1308*a*, 1310*a*, 1320*a*, 1322*a*, 1334*a*, 1338*a*, 1348*a*, and/or 1350*a*) instructs the user to perform a second set of user inputs (e.g., one or more user inputs) different from the first set of user inputs; and the fourth set of user input instructions (e.g., 1308*a*, 1310*a*, 1320*a*, 1322*a*, 1334*a*, 1338*a*, 1348*a*, and/or 1350*a*) instructs the user to perform a fourth set of user inputs (e.g., one or more user inputs) that includes at least a subset of the first set of user inputs and/or at least a subset of the second set of user inputs (e.g., object 1334*a* and/or object 1338*a* instruct the user to perform a selection input, which includes a gaze input (e.g., instructed in objects 1308*a* and/or 1310*a*) and an air gesture (e.g., instructed in objects 1320*a* and/or 1322*a*); and/or object 1348*a* and/or object 1350*a* instruct the user to perform a scroll input, which includes a gaze input (e.g., instructed in objects 1308*a* and/or 1310*a*) and an air gesture (e.g., instructed in objects 1320*a* and/or 1322*a*)). Teaching the user how to perform the first set of user inputs and the second set of user inputs, and then teaching the user how to perform a fourth set of user inputs that includes at least a subset of the first set of user inputs and/or at least a subset of the second set of user inputs enhances the operability of the device and makes the user-device interface more efficient by helping the user to provide the proper inputs and reducing user mistakes when operating/interacting with the device.

In some embodiments, the first set of user input instructions includes one or more instructions for the user to provide one or more gaze inputs (e.g., 1308*a* and/or 1310*a* in FIGS. 13A-13F) (in some embodiments, without hand inputs) (e.g., looking and/or gazing at one or more displayed objects); and the second set of user input instructions includes one or more instructions for the user to provide one or more hand inputs (e.g., 1320*a* and/or 1322*a* in FIGS. 13G-13H) (in some embodiments, without gaze inputs)

(e.g., one or more hand touch inputs, one or more hand gestures, and/or one or more air gestures using the user's hand). Displaying the first set of user input instructions that includes instructions for gaze inputs and displaying the second set of user input instructions that includes instructions for hand inputs enhances the operability of the device and makes the user-device interface more efficient by helping the user to provide the proper inputs and reducing user mistakes when operating/interacting with the device.

In some embodiments, initiating the second process for advancing the input tutorial includes displaying (e.g., automatically displaying and/or displaying, without further user input) (in some embodiments, subsequent to performing the second type of operation), via the one or more display generation components, as part of the input tutorial, a fifth set of user input instructions (e.g., 1308*a*, 1310*a*, 1320*a*, 1322*a*, 1334*a*, 1338*a*, 1348*a*, and/or 1350*a*) different from the first set of user input instructions and the second set of user input instructions and corresponding to a fifth type of operation different from the first type of operation and the second type of operation; and the fifth set of user input instructions includes one or more instructions for the user to provide one or more gaze inputs and one or more hand inputs (e.g., object 1334*a* and/or object 1338*a* instruct the user to perform a selection input, which includes a gaze input (e.g., instructed in objects 1308*a* and/or 1310*a*) and a hand gesture (e.g., instructed in objects 1320*a* and/or 1322*a*); and/or object 1348*a* and/or object 1350*a* instruct the user to perform a scroll input, which includes a gaze input (e.g., instructed in objects 1308*a* and/or 1310*a*) and a hand gesture (e.g., instructed in objects 1320*a* and/or 1322*a*)). Displaying the fifth set of user input instructions corresponding to a fifth type of operation enhances the operability of the device and makes the user-device interface more efficient by helping the user to provide the proper inputs and reducing user mistakes when operating/interacting with the device.

In some embodiments, the first set of criteria corresponding to the first type of operation includes a repetition criterion that is met when the first user input is preceded by a second user input corresponding to the first type of operation (e.g., a repetition of the first type of operation and/or multiple instances of the first type of operation) (e.g., in FIGS. 13C-13F, the user is instructed to perform four gaze gestures, in FIGS. 13L-13N and 13W-13X, the user is instructed to perform three selection gestures, and in FIGS. 13R-13U, the user is instructed to perform two scroll gestures). Having the user perform the input corresponding to the first type of operation multiple times during an input tutorial enhances the operability of the device and makes the user-device interface more efficient by helping the user to provide the proper inputs and reducing user mistakes when operating/interacting with the device.

In some embodiments, while in the input tutorial and prior to detecting the first user input, the computer system displays, via the one or more display generation components, a plurality of objects (e.g., 1306*a*-1306*d*). In some embodiments, the first set of criteria corresponding to the first type of operation includes a gaze criterion that is met when the computer system detects a user gaze directed at a respective object (e.g., any object and/or a particular object) of the plurality of objects (e.g., in FIGS. 13C-13F, the user is instructed to gaze at each of objects 1306*a*-1306*d*). In some embodiments, the second set of criteria corresponding to the second type of operation, the third set of criteria corresponding to the third type of operation, and/or the fourth set of criteria corresponding to the fourth type of operation includes a gaze criterion that is met when the computer system detects a user gaze directed at a respective object of a plurality of objects (e.g., a plurality of displayed objects). Having the user perform a gaze input multiple times during an input tutorial enhances the operability of the device and makes the user-device interface more efficient by helping the user to provide the proper inputs and reducing user mistakes when operating/interacting with the device.

In some embodiments, while in the input tutorial and prior to detecting the first user input, the computer system displays, via the one or more display generation components, a plurality of objects (e.g., 1332*a*-1332*c*). In some embodiments, the first type of operation is an operation to select a respective object (e.g., any object and/or a particular object) of the plurality of objects (e.g., in FIGS. 13K-13N and FIGS. 13W-13X, the user is instructed to select each of objects 1332*a*-1332*c*). In some embodiments, the second type of operation, the third type of operation, and/or the fourth type of operation is an operation to select a respective object of a plurality of objects (e.g., a plurality of displayed objects). Having the user perform a selection operation multiple times during an input tutorial enhances the operability of the device and makes the user-device interface more efficient by helping the user to provide the proper inputs and reducing user mistakes when operating/interacting with the device.

In some embodiments, the first type of operation is a scroll operation (e.g., FIGS. 13O-13U). In some embodiments, the second type of operation, the third type of operation, and/or the fourth type of operation is a scroll operation. Having the user perform a scroll operation multiple times during an input tutorial enhances the operability of the device and makes the user-device interface more efficient by helping the user to provide the proper inputs and reducing user mistakes when operating/interacting with the device.

In some embodiments, prior to detecting the first user input, and while in the input tutorial, the computer system detects, via the one or more input devices, a fifth user input (e.g., a gaze input in FIGS. 13C-13F, a hand gesture and/or air gesture by hand 1324 in FIG. 13H, a selection input in FIGS. 13K-13N and/or FIGS. 13W-13X, and/or a scroll input in FIGS. 13R-13U) (e.g., one or more user inputs and/or a fifth set of user inputs) (e.g., one or more user gaze inputs, one or more user hand inputs (e.g., hand movements, hand gestures, and/or air gestures), and/or one or more physical control inputs (e.g., one or more button presses, one or more depressions of a depressible input mechanism, one or more rotations of a rotatable input mechanism, and/or one or more rotations and/or depressions of a rotatable and depressible input mechanism)) representative of an attempt to perform an input corresponding to the first type of operation. In response to detecting the fifth user input corresponding to the first type of operation and in accordance with a determination that the fifth user input meets the first set of criteria corresponding to the first type of operation, the computer system displays, via the one or more display generation components, a first indication (e.g., 1312*a*-1312*d* and/or 1336*a*-1336*c*) indicating that the fifth user input meets the first set of criteria corresponding to the first type of operation. In response to detecting the first user input corresponding to the first type of operation and in accordance with a determination that the first user input meets the first set of criteria corresponding to the first type of operation, the computer system displays, via the one or more display generation components, a second indication (e.g., 1312*a*-1312*d* and/or 1336*a*-1336*c*) (e.g., a second indication different from and/or separate from the first indication) indicating that the first user input meets the first set of criteria corresponding to the first type of operation. Displaying progressive feedback indicating successful performance of a particular operation during an input tutorial enhances the operability of the device and makes the user-device interface more efficient by helping the user to provide the proper inputs and reducing user mistakes when operating/interacting with the device. Displaying the first indication indicating that the fifth user input meets the first set of criteria and the second indication indicating that the first user input meets the first set of criteria provides the user with visual feedback about the state of the device (e.g., that the device has determined that the fifth and first user inputs meet the first set of criteria), thereby improving visual feedback to the user.

In some embodiments, prior to initiating the process for advancing the input tutorial and subsequent to displaying the first set of user input instructions (e.g., while displaying the first set of user input instructions and/or after the first set of user input instructions are no longer displayed)), the computer system displays, via the one or more display generation components, a replay option (e.g., 1310*b*, 1322*b*, 1338*b*, and/or 1350*b*). While displaying the replay option, the computer system detects, via the one or more input devices, a selection input corresponding to selection of the replay option (e.g., one or more gaze inputs and/or one or more non-gaze inputs (e.g., one or more touch inputs, one or more hand gestures, and/or one or more air gestures) (e.g., a gaze and pinch gesture, a gaze and tap gesture, and/or a gaze and point gesture)). In response to detecting the selection input corresponding to selection of the replay option, the computer system re-displays, via the one or more display generation components, the first set of user input instructions (e.g., 1308*a*, 1310*a*, 1320*a*, 1322*a*, 1334*a*, 1338*a*, 1348*a*, and/or 1350*a*) corresponding to the first type of operation. Providing an option that is selectable to redisplay the first set of user input instructions allows the user to perform this operation with fewer inputs, and also enhances the operability of the device and makes the user-device interface more efficient by helping the user to provide the proper inputs and reducing user mistakes when operating/interacting with the device.

In some embodiments, displaying the first set of user input instructions corresponding to the first type of operation includes displaying a video (e.g., 1300, 1314, 1326, and/or 1340) of a simulated user (e.g., 1304, 1318, 1330, and/or 1344) (e.g., a virtual user and/or an avatar) performing a first type of user input corresponding to the first type of operation (e.g., a first type of user input that causes the computer system to perform the first type of operation). Displaying a video that provides an example of the user input required to perform an operation enhances the operability of the device and makes the user-device interface more efficient by helping the user to provide the proper inputs and reducing user mistakes when operating/interacting with the device.

In some embodiments, the video (e.g., 1300, 1314, 1326, and/or 1340) includes virtual elements (e.g., 1306*a*-1306*d*, 1336*a*-1336*c*, and/or 1346*a*-1346*c*) that move in a simulated depth dimension relative to a viewpoint associated with a user of the device (e.g., the video is a spatial and/or three-dimensional video that is displayed with depth feedback) (e.g., a stereoscopic video with media captured at the same time from two different cameras (or sets of cameras) that is displayed by displaying an image from a first set of one or more cameras for a first eye of a user and an image from a second set of one or more cameras for a second eye of the user) (e.g., from FIGS. 13C-13D, objects 1306*a*-1306*d* appear to move toward the user; from FIGS. 13K-13L and FIGS. 13W-13X, objects 1332*a*-1332*c* appear to move toward the user; and/or from FIGS. 13R-13S, objects 1346*a*-1346*c* appear to move toward the user). Displaying a video that provides an example of the user input required to perform an operation enhances the operability of the device and makes the user-device interface more efficient by helping the user to provide the proper inputs and reducing user mistakes when operating/interacting with the device.

In some embodiments, the video (e.g., 1300, 1314, 1326, and/or 1340) includes a first set of displayed objects (e.g., 1306*a*-1306*d*, 1336*a*-1336*c*, and/or 1346*a*-1346*c*) (e.g., one or more displayed objects) and depicts the simulated user (e.g., 1304, 1318, 1330, and/or 1344) providing one or more user inputs to perform the first type of operation with respect to the first set of displayed objects (e.g., with respect to one or more of the first set of displayed objects). Subsequent to displaying the first set of user input instructions, and while in the input tutorial, the computer system displays, via the one or more display generation components, a second set of displayed objects (e.g., one or more displayed objects) representative of the first set of displayed objects (e.g., objects 1306*a*-1306*d* in FIGS. 13C-13F are representative of objects 1306*a*-1306*d* in FIGS. 13A-13B; objects 1332*a*-1332*c* in FIGS. 13K-13N and 13W-13X are representative of objects 1332*a*-1332*c* in FIGS. 13I-13J; and/or objects 1346*a*-1346*e* in FIGS. 13R-13U are representative of objects 1346*a*-1346*e* in FIGS. 13O-13Q) (in some embodiments, the second set of displayed objects are the first set of displayed objects and/or are visually identical to and/or similar to the first set of displayed objects; in some embodiments, the second set of displayed objects are visually distinct and/or different from the first set of displayed objects). In some embodiments, the first user input is detected while the second set of displayed objects are displayed, and the first user input is representative of an attempt to perform an input corresponding to the first type of operation and directed to at least one displayed object of the second set of displayed objects (e.g., an attempt to perform an input that causes the computer system to perform the first type of operation to at least one displayed object of the second set of displayed objects). Displaying a video that provides an example of the user input required to perform an operation enhances the operability of the device and makes the user-device interface more efficient by helping the user to provide the proper inputs and reducing user mistakes when operating/interacting with the device.

In some embodiments, the video (e.g., 1300, 1314, 1326, and/or 1340) includes a third set of displayed objects (e.g., 1306*a*-1306*d*, 1336*a*-1336*c*, and/or 1346*a*-1346*c*) (e.g., one or more displayed objects) and depicts the simulated user (e.g., 1304, 1318, 1330, and/or 1344) providing one or more user inputs to perform the first type of operation with respect to the third set of displayed objects (e.g., with respect to one or more of the third set of displayed objects). Subsequent to playback of at least a portion of the video (or, optionally all of the video), the computer system ceases display of one or more user interface elements (e.g., 1302, 1304, 1316, 1318, 1328, 1330, 1342, and/or 1344) corresponding to the video (e.g., ceasing display of a video frame, background, and/or the simulated user); and maintains display of the third set of displayed objects (e.g., 1306*a*-1306*d*, 1336*a*-1336*c*, and/or 1346*a*-1346*c*) (in some embodiments, the third set of displayed objects are moved from a first display position to a second display position and/or from a first display orientation to a second display orientation). In some embodiments, the first user input is detected subsequent to completion of the video and while the third set of displayed objects is displayed, and the first user input is representative of an attempt to perform an input corresponding to the first type of operation and directed to at least one displayed object of the third set of displayed objects (e.g., an attempt to perform an input that causes the computer system to perform the first type of operation to at least one displayed object of the third set of displayed objects). Transitioning the objects in the video into targets for the user's input attempts provides the user with visual feedback about the state of the device (e.g., that the device requires user interaction with the objects, as was demonstrated in the video), thereby improving visual feedback to the user. Displaying a video that provides an example of the user input required to perform an operation enhances the operability of the device and makes the user-device interface more efficient by helping the user to provide the proper inputs and reducing user mistakes when operating/interacting with the device.

In some embodiments, the input tutorial is part of a device configuration procedure (e.g., a procedure for configuring one or more settings and/or user preferences of electronic device 700); and initiating the process for advancing the input tutorial includes: completing (e.g., ending and/or terminating) the input tutorial (e.g., FIG. 13V); and advancing to a subsequent device configuration step. Providing an input tutorial during device configuration enhances the operability of the device and makes the user-device interface more efficient by helping the user to provide the proper inputs and reducing user mistakes when operating/interacting with the device.

In some embodiments, prior to displaying the first set of user input instructions corresponding to the first type of operation: in accordance with a determination that a first set of alert criteria are met, the computer system displays, via the one or more display generation components, a first alert. While displaying the first alert, the computer system detects, via the one or more input devices, a selection input corresponding to selection of the first alert. In response to detecting the selection input corresponding to selection of the first alert, the computer system initiates the input tutorial, wherein the first set of user input instructions corresponding to the first type of operation is displayed as part of the input tutorial in response to detecting the selection input corresponding to selection of the first alert. In some embodiments, prior to displaying the first set of user input instructions corresponding to the first type of operation: in accordance with a determination that the first set of alert criteria are not met, the computer system forgoes displaying the first alert (e.g., forgoes displaying an alert that is selectable to initiate the input tutorial). Displaying an alert that is selectable to initiate an input tutorial enhances the operability of the device and makes the user-device interface more efficient by helping the user to provide the proper inputs and reducing user mistakes when operating/interacting with the device.

In some embodiments, prior to displaying the first set of user input instructions corresponding to the first type of operation, the computer system (e.g., 700) detects that a user of the computer system (e.g., a user that is operating, holding, and/or wearing the computer system) satisfies new user criteria (e.g., new user criteria indicating that the user is a new user of the computer system (e.g., a guest user and/or a user who is not yet enrolled on the computer system)). In response to detecting that the user of the computer system satisfies the new user criteria, the computer system initiates the input tutorial, wherein the first set of user input instructions corresponding to the first type of operation is displayed as part of the input tutorial in response to detecting the selection input corresponding to selection of the first alert. In some embodiments, the new user criteria includes a criterion that is met when the user logs into the computer system (e.g., 700) for the first time. In some embodiments, the new user criteria includes a criterion that is met when the user has not previously logged into a computer system of a first type (e.g., a smart phone, a smart watch, a tablet, a wearable device, and/or head-mounted device) (e.g., a computer system of the same type as the computer system). In some embodiments, the new user criteria includes a criterion that is met when the user signs up for a new user account. In some embodiments, the new user criteria includes a criterion that is met when biometric information collected from the user (e.g., facial scan, eye scan, fingerprint scan) indicates that the user has not previously used and/or previously logged into the computer system. In some embodiments, the new user criteria includes a criterion that is met when biometric information collected from the user indicates that the user has not previously used and/or previously logged into a computer system of a first type (e.g., a smart phone, a smart watch, a tablet, a wearable device, and/or head-mounted device) (e.g., a computer system of the same type as the computer system). Providing the input tutorial based on a determination that the user is a new user provides the user with visual feedback about the state of the device (e.g., that the device has detected that the user is a new user), thereby improving visual feedback to the user. Providing the input tutorial based on a determination that the user is a new user enhances the operability of the device and makes the user-device interface more efficient by helping the user to provide the proper inputs and reducing user mistakes when operating/interacting with the device.

In some embodiments, prior to displaying the first set of user input instructions corresponding to the first type of operation, the computer system detects, via the one or more input devices, an application selection user input (e.g., one or more user inputs) corresponding to a request to launch a first application. In response to detecting the application selection user input, and in accordance with a determination that the first application is being launched for a first time (e.g., launched for the first time on the computer system and/or launched for the first time by a current user of the computer system), the computer system initiates the input tutorial, wherein the first set of user input instructions corresponding to the first type of operation is displayed as part of the input tutorial in response to detecting the selection input corresponding to selection of a selectable user interface object associated with the first alert (e.g., selection of the first alert or selection of a selectable user interface object associated with the alert such as an "enroll now" or "start enrollment" user interface object). Providing the input tutorial based on a determination that the user is launching an application for the first time provides the user with visual feedback about the state of the device (e.g., that the device has detected that the user is launching the application for the first time), thereby improving visual feedback to the user. Providing the input tutorial based on a determination that the user is launching an application for the first time enhances the operability of the device and makes the user-device interface more efficient by helping the user to provide the proper inputs and reducing user mistakes when operating/interacting with the device.

In some embodiments, aspects/operations of methods 800, 850, 1000, 1050, and/or 1200 may be interchanged, substituted, and/or added between these methods. For example, in some embodiments, the computer system in method 1400 is the computer system in methods 800, 850, 1000, and/or 1050, and/or the companion device in method 1200 is the computer system in method 1400. For brevity, these details are not repeated here.

FIGS. 15A-15Q illustrate examples of managing personal accessories, such as corrective lenses. FIG. 16 is a flow diagram of an exemplary method 1600 for managing personal accessories and/or corrective lenses (e.g., corrective lenses 11.3.2-216 or lenses 1-218). The user interfaces in FIGS. 15A-15Q are used to illustrate the processes described below, including the process in FIG. 16.

FIG. 15A depicts electronic device 1500, which includes display 1502, one or more input sensors 1504 (e.g., one or more cameras, eye gaze trackers, hand movement trackers, and/or head movement trackers), physical input devices 1506*a*-1506*c*, and lens mount 1508 for securing and/or attaching one or more corrective lenses (e.g., corrective lenses 1-218). In some embodiments, electronic device 1500 is a smart phone, a tablet a wearable device, a wearable smartwatch device, a head-mounted system (e.g., a headset), or other computer system that includes and/or is in communication with one or more display devices (e.g., display screen, projection device, or the like). In some embodiments, the techniques and user interfaces described in FIGS. 15A-15Q are provided by one or more of the devices described in FIGS. 1A-1P. In some embodiments, electronic device 1500 includes a pair of display modules that provide stereoscopic content to different eyes of the same user. For example, electronic device 1500 includes display module 1502 (which provides content to a left eye of the user) and a second display module (which provides content to a right eye of the user). In some embodiments, the second display module displays a slightly different image than display module 1502 to generate the illusion of stereoscopic depth. In some embodiments, electronic device 1500 includes lens mount 1508 that allows a user to secure a first corrective lens (e.g., a first corrective lens for the left eye of the user; and/or that will be positioned between a left eye of the user and display 1502), and also includes a second lens mount that allows a user to secure a second corrective lens (e.g., a second corrective lens for the right eye of the user; and/or that will be positioned between a right eye of the user and a second display that provides content to the right eye of the user).

Any of the features, components, and/or parts, including the arrangements and configurations thereof shown in FIGS. 1B-1P can be included, either alone or in any combination, in electronic device 1500 For example, in some embodiments, electronic device 1500 includes any of the features, components, and/or parts of HMD 1-100, 1-200, 3-100, 6-100, 6-200, 6-300, 6-400, 11.1.1-100, and/or 11.1.2-100, either alone or in any combination. In some embodiments, display 1502 includes any of the features, components, and/or parts of display unit 1-102, display unit 1-202, display unit 1-306, display unit 1-406, display generation component 120, display screens 1-122*a*-*b*, first and second rear-facing display screens 1-322*a*, 1-322*b*, display 11.3.2-104, first and second display assemblies 1-120*a*, 1-120*b*, display assembly 1-320, display assembly 1-421, first and second display sub-assemblies 1-420*a*, 1-420*b*, display assembly 3-108, display assembly 11.3.2-204, first and second optical modules 11.1.1-104*a* and 11.1.1-104*b*, optical module 11.3.2-100, optical module 11.3.2-200, lenticular lens array 3-110, display region or area 6-232, and/or display/display region 6-334, either alone or in any combination. In some embodiments, input sensor 1504 includes any of the features, components, and/or parts of any of sensors 190, sensors 306, image sensors 314, image sensors 404, sensor assembly 1-356, sensor assembly 1-456, sensor system 6-102, sensor system 6-202, sensors 6-203, sensor system 6-302, sensors 6-303, sensor system 6-402, and/or sensors 11.1.2-110*a*-*f*, either alone or in any combination. In some embodiments, mechanical input devices 1506*a*-1506*c* include any of the features, components, and/or parts of any of first button 1-128, button 11.1.1-114, second button 1-132, and or dial or button 1-328, either alone or in any combination. In some embodiments, electronic device 1500 includes one or more audio output components (e.g., electronic component 1-112) for generating audio feedback, optionally generated based on detected events and/or user inputs detected by the electronic device 1500. Electronic device 1500 is a computer system (e.g., computer system 101 in FIG. 1A).

FIGS. 15A-15Q illustrate various example scenarios and user interfaces for managing corrective lenses. In some embodiments, electronic device 1500 is configured to detect and/or respond to gaze-based user inputs. In some embodiments, the use of corrective lenses affects gaze-based user inputs. For example, a gaze-based input that is received without corrective lenses attached to electronic device 1500 can be detected differently by electronic device 1500 compared to when the same gaze-based input is received with corrective lenses attached to electronic device 1500 (e.g., due to light refraction caused by the corrective lenses). Similarly, different corrective lenses (e.g., with differing vision prescriptions) can cause different effects on gaze-based user inputs. Furthermore, in some embodiments, visual content displayed by display 1502 can appear different to a user based on whether or not corrective lenses are attached and/or based on the prescription of the corrective lenses that are attached. Accordingly, in some embodiments, electronic device 1500 is configured to store lens enrollment information that corrects one or more gaze-based input issues and/or display issues caused by corrective lenses. In some embodiments, lens enrollment information includes, for each set of corrective lenses that is enrolled on (e.g., registered on) electronic device 1500, vision prescription information for the set of corrective lenses and/or a respective device calibration profile. In some embodiments, the respective device calibration profile informs and/or determines how content is displayed by display 1502 to correct for effects of the set of corrective lenses (e.g., to correct for chromatic aberration or other visual effects caused by the corrective lenses). In some embodiments, the respective device calibration profile informs and/or determines how gaze-based inputs are interpreted by electronic device 1500 to correct for effects of the set of corrective lenses. For example, in some embodiments, a user is prompted to perform gaze input enrollment (e.g., FIGS. 9A-9L and/or 13A-13V) while the set of corrective lenses are attached so that electronic device 1500 can determine a gaze input profile corresponding to the set of corrective lenses (e.g., in order to accurately detect and interpret gaze-based inputs while the set of corrective lenses is attached).

In FIG. 15A, electronic device 1500 is in a low power, inactive, or sleep state, in which content is not displayed via display 1502. Furthermore, in FIG. 15A, corrective lenses are not attached to lens mount 1508, whereas in FIG. 15C (discussed in greater detail below), corrective lens 1510 is secured to lens mount 1508 (as indicated by the bold line used in FIG. 15C). Accordingly, in FIG. 15A, electronic device does not detect any corrective lenses attached to electronic device 1500 (e.g., mounted to lens mount 1508). At FIG. 15A, electronic device 1500 detects user input 1511, which is a user input via physical input device 1506*a* (e.g., a press of a button and/or depression of a depressible input mechanism). In the depicted embodiments, detecting user input 1511 includes detecting a press of physical input device 1506*a*. In some embodiments, electronic device 1500 is a head-mounted system. In some embodiments, detecting user input 1511 includes detecting that electronic device 1500 has been worn on the head and/or on the face of a user. In some embodiments, detecting user input 1511 includes detecting one or more facial features of a user (e.g., via sensors 1504), such as detecting the eyes of the user (e.g., in front of display 1502).

Figure 15B:
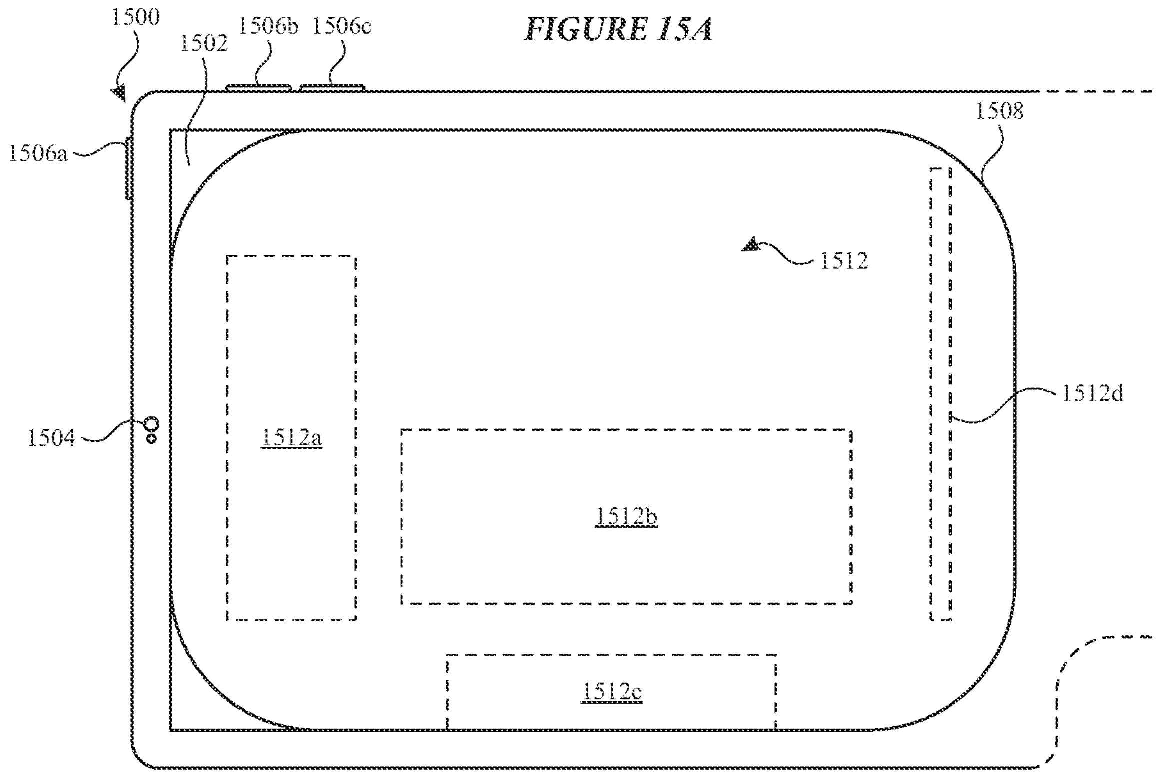

At FIG. 15B, in response to detecting user input 1511, electronic device 1500 transitions from the low power, inactive, or sleep state to an active state, in which electronic device 1500 displays, via display 1502, three-dimensional environment 1512, which includes objects 1512*a*-1512*d*. In some embodiments, three-dimensional environment 1512 is displayed by a display (e.g., display 1502). In some embodiments, three-dimensional environment 1512 includes a virtual environment or an image (or video) of a physical environment captured by one or more cameras (e.g., one or more cameras that are part of input sensors 1504 and/or one or more external cameras). For example, in some embodiments, object 1512*a* is a virtual object that is representative of a physical object that has been captured by one or more cameras and/or detected by one or more sensors; and object 1512*b* is a virtual object that is representative of a second physical object that has been captured by one or more cameras and/or detected by one or more sensors, and so forth. In some embodiments, three-dimensional environment 1512 is visible to a user through display 1502 but is not displayed by a display. For example, in some embodiments, three-dimensional environment 1512 is a physical environment (and, for example, objects 1512*a*-1512*d* are physical objects) that is visible to a user (e.g., through one or more transparent displays (e.g., 1502)) without being displayed by a display. In some embodiments, three-dimensional environment 1512 is part of an extended reality experience. In FIG. 15B, based on a determination that corrective lenses are not attached to electronic device 1500 (e.g., are not attached to lens mount 1508), electronic device 1500 does not display any content pertaining to corrective lenses in response to user input 1511.

Figure 15C:
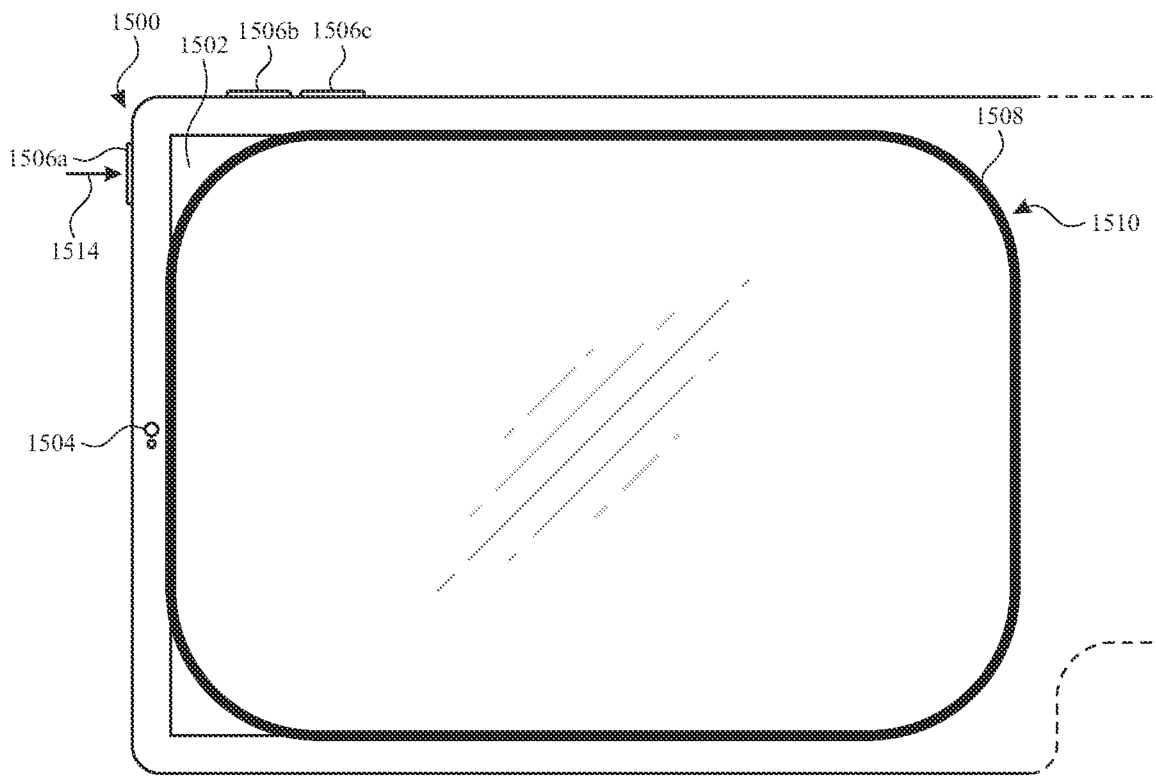

Whereas FIGS. 15A-15B show an example scenario in which a corrective lens is not attached to electronic device 1500, FIG. 15C depicts an example scenario in which corrective lens 1510 is attached to electronic device 1500 via lens mount 1508. At FIG. 15A, electronic device 1500 is in a low power, inactive, or sleep state, in which content is not displayed via display 1502. At FIG. 15A, electronic device 1500 detects user input 1514, which is a user input via physical input device 1506*a* (e.g., a press of a button and/or depression of a depressible input mechanism). In the depicted embodiments, detecting user input 1514 includes detecting a press of physical input device 1506*a*. In some embodiments, electronic device 1500 is a head-mounted system. In some embodiments, detecting user input 1514 includes detecting that electronic device 1500 has been worn on the head and/or on the face of a user. In some embodiments, detecting user input 1514 includes detecting one or more facial features of a user (e.g., via sensors 1504), such as detecting the eyes of the user (e.g., in front of display 1502).

Figure 15D:
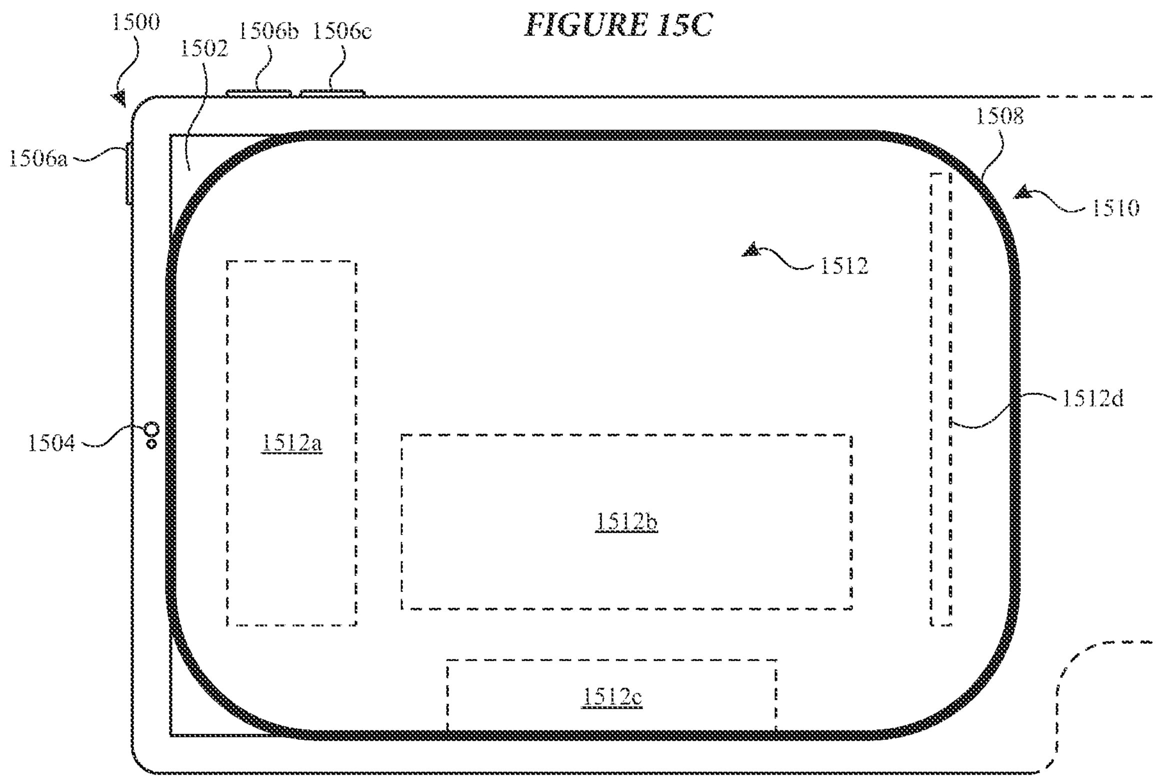

At FIG. 15D, in response to detecting user input 1514, electronic device 1500 transitions from the low power, inactive, or sleep state to an active state, in which electronic device 1500 displays, via display 1502, three-dimensional environment 1512. Similar to FIG. 15B, in FIG. 15D, in response to user input 1514, electronic device 1500 displays three-dimensional environment 1512 and does not display any content pertaining to corrective lenses. In some embodiments, electronic device 1500 does not display content pertaining to corrective lenses even when corrective lens 1510 is detected by electronic device 1500. For example, in some embodiments, electronic device 1500 does not display content pertaining to corrective lenses based on a determination that corrective lenses were previously attached to electronic device 1500 when electronic device 1500 was last used by a user, and only a single set of corrective lenses are enrolled on the computer system. In this scenario, electronic device 1500 can automatically apply a device calibration profile corresponding to the single set of corrective lenses that are enrolled on the computer system, and the user is able to assume that this device calibration profile is being applied because there is only one set of corrective lenses enrolled on electronic device 1500.

Figure 15E:
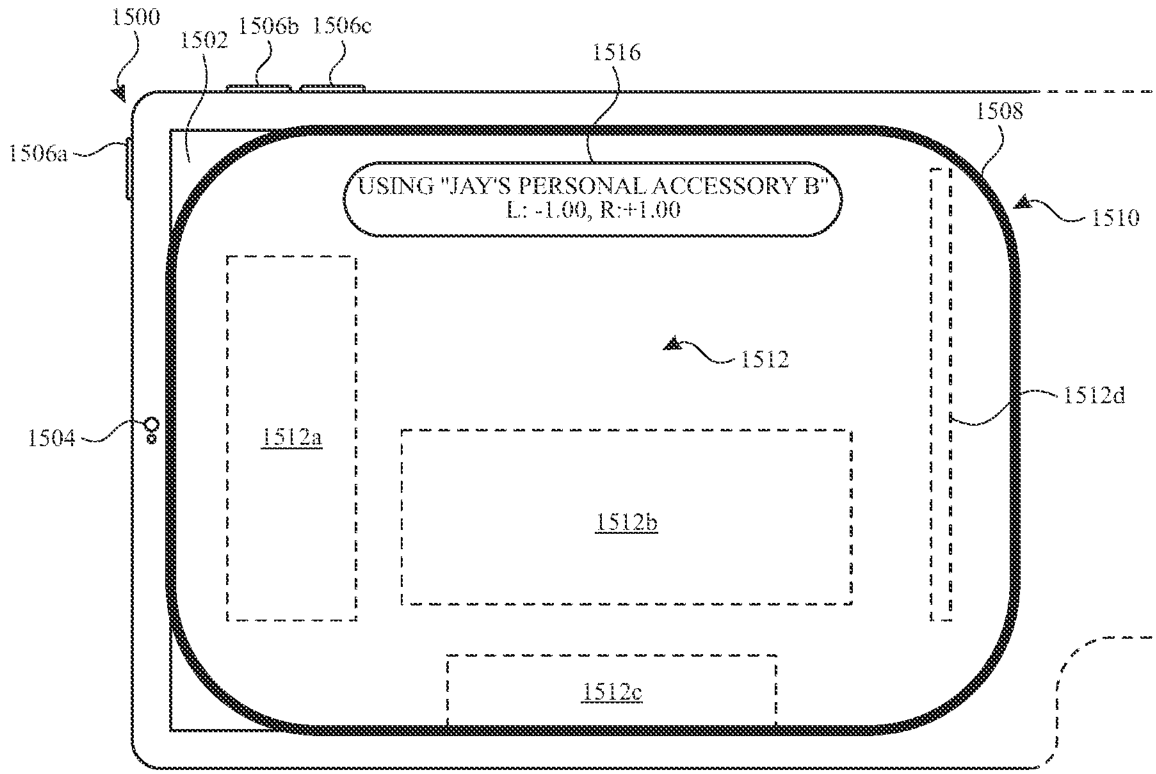

FIG. 15E depicts a different scenario. For example, in some embodiments, in FIG. 15E, multiple sets of corrective lenses are enrolled on electronic device 1500 (e.g., Jay's Personal Accessory A, and Jay's Personal Accessory B, as shown in FIG. 15H), each having its own corresponding device calibration profile. Accordingly, in FIG. 15E, in response to detecting user input 154 in FIG. 15C, electronic device 1500 displays indication 1516, which indicates that electronic device 1500 is using a device calibration profile corresponding to a set of corrective lenses that are labeled "Jay's Personal Accessory B." In some embodiments, Jay's Personal Accessory B is selected from multiple enrolled sets of corrective lenses based on a determination that the most recent time corrective lenses were attached to electronic device 1500, the device calibration profile corresponding to Jay's Personal Accessory B was used (e.g., was selected by a user and/or was maintained (e.g., not changed) by the user). In the depicted embodiment, indication 1516 also includes vision prescription information for Jay's Personal Accessory B.

Figure 15F:
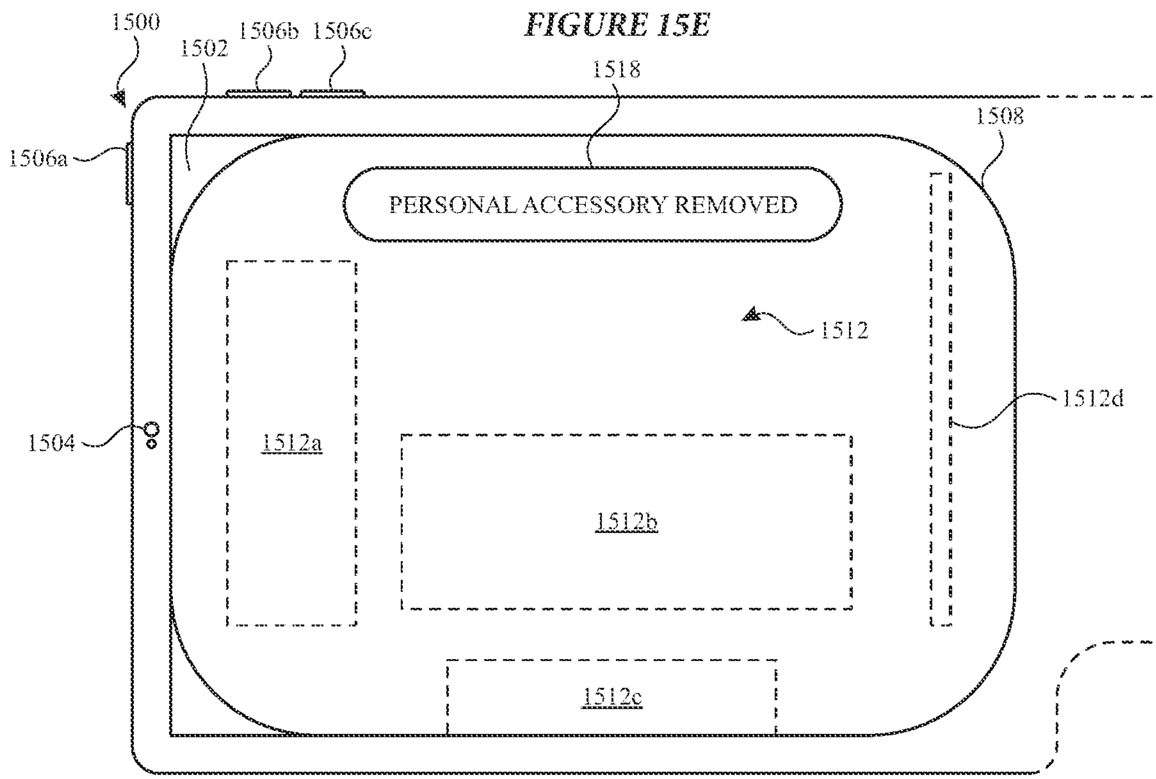

At FIG. 15F, electronic device 1500 detects that corrective lens 1510 has been removed from (e.g., unmounted from and/or unattached from) electronic device 1500. In response to detecting that corrective lens 1510 has been removed from electronic device 1500, electronic device 1500 displays indication 1518. Furthermore, in some embodiments, in response to detecting that corrective lens 1510 has been removed from electronic device 1500, electronic device 1500 also ceases applying the device calibration profile corresponding to Jay's Personal Accessory B. In some embodiments, electronic device 1500 applies a different device calibration profile that corresponds to operation of electronic device 1500 without corrective lenses attached.

Figure 15G:
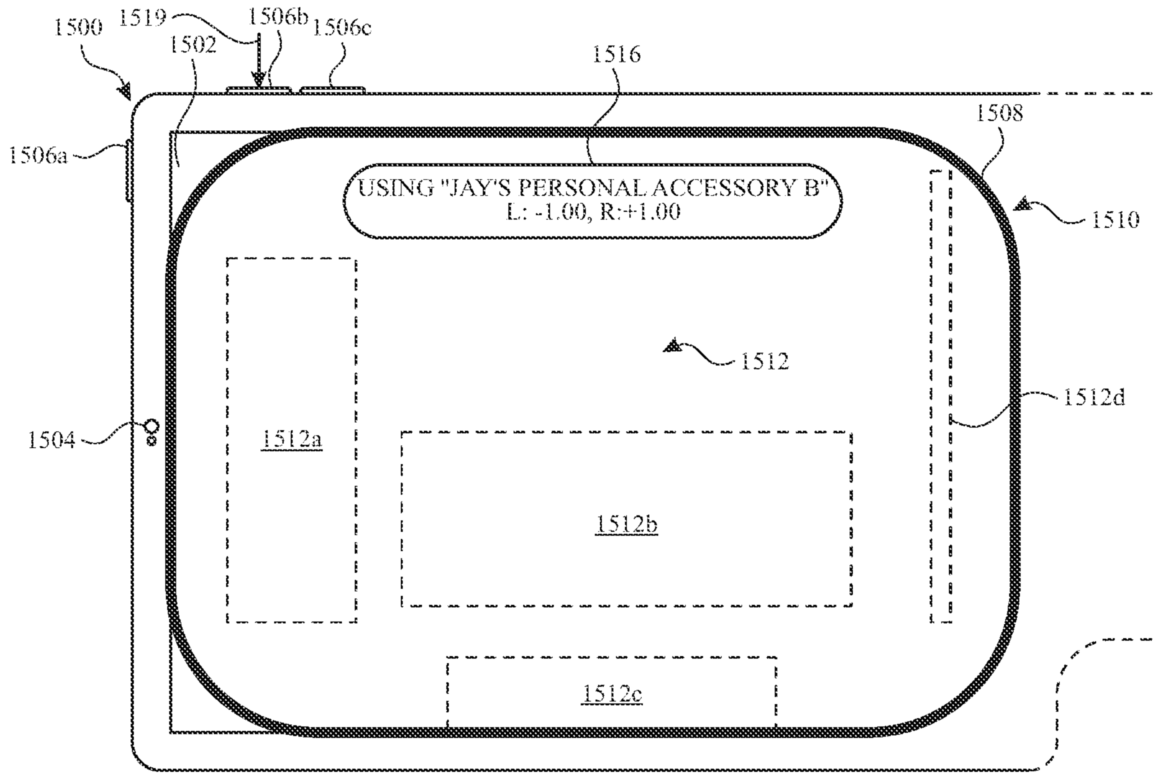
Figure 15H:
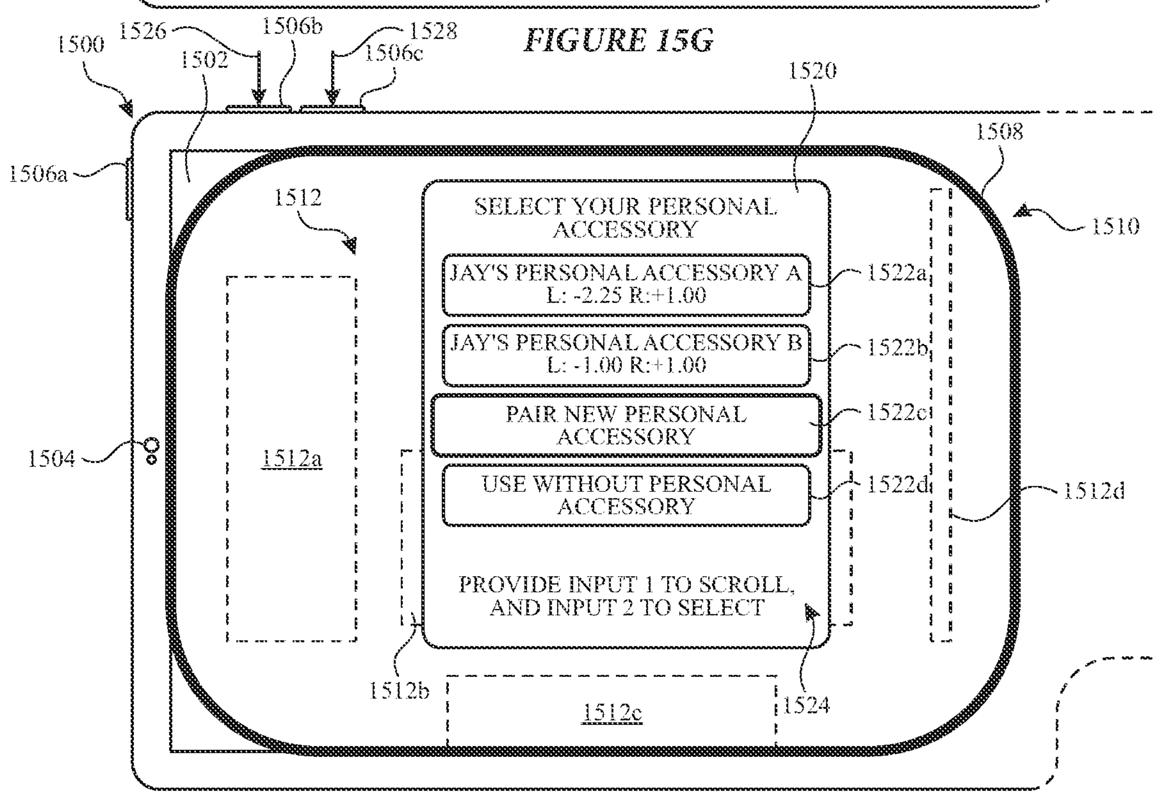

At FIG. 15G, electronic device 1500 detects that corrective lens 1510 has been attached to electronic device 1500 (e.g., attached to lens mount 1508). In response to detecting that corrective lens 1510 has been attached to electronic device 1500, electronic device 1500 displays indication 1516, once again indicating that a device calibration profile corresponding to Jay's Personal Accessory B is being used and/or has been applied to electronic device 1500.

At FIG. 15G, electronic device 1500 detects user input 1519, which is one or more presses of physical input device 1506*b*. In some embodiments, user input 1519 includes multiple presses of physical input device 1506*b* (e.g., three presses, four presses, or five presses). As discussed above, in some embodiments, different sets of corrective lenses having different prescriptions can result in differential detection of gaze-based inputs. Accordingly, if a set of corrective lenses are attached, but an incorrect device calibration profile is being applied, it can be difficult for a user to provide gaze-based inputs (e.g., difficult to provide accurate gaze-based inputs). Accordingly, in some embodiments, electronic device 1500 allows for one or more hardware-based inputs that a user can use to change device calibration profiles.

At FIG. 15H, in response to detecting user input 1519, electronic device 1500 displays user interface 1520. User interface 1520 includes various options 1522*a*-1522*d* that allow a user to change the device calibration profile that is applied to electronic device 1500 using one or more hardware-based inputs (e.g., pressing of a physical button and/or rotation of a physical rotatable input mechanism (e.g., a rotatable crown)). As discussed above, in some embodiments, when an incorrect device calibration is applied, it can be difficult for a user to provide gaze-based user inputs. Accordingly, in some embodiments, while user interface 1520 is displayed, electronic device 1500 does not receive and/or respond to gaze-based user inputs, and a user is required to provide hardware-based user inputs to interact with electronic device 1500 and/or cease display of user interface 1520. In some embodiments, when user interface 1520 ceases to be displayed, electronic device 1500 resumes receiving and/or responding to gaze-base user inputs.

Option 1522*a* corresponds to a first set of enrolled corrective lenses, "Jay's Personal Accessory A," and is selectable to apply a device calibration profile corresponding to Jay's Personal Accessory A. Option 1522*b* corresponds to a second set of enrolled corrective lenses, "Jay's Personal Accessory B," and is selectable to apply a device calibration profile corresponding to Jay's Personal Accessory B. In FIG. 15H, selection of option 1522*b* does not result in any change of device calibration profile, as the device calibration profile corresponding to Jay's Personal Accessory B is already being used. In some embodiments, selection of option 1522*b* results in electronic device 1500 ceasing display of user interface 1520 (and, in some embodiments, resuming detection of and/or response to gaze-based user inputs). Option 1522*c* is selectable to indicate that a new set of corrective lenses that are not currently enrolled on electronic device 1500 (e.g., do not having a corresponding device calibration profile stored on electronic device 1500) are attached to electronic device 1500. Option 1522*d* is selectable to apply a device calibration profile that corresponds to use of electronic device 1500 without corrective lenses attached. In some embodiments, selection of option 1522*d* results in electronic device 1500 applying the device calibration profile that corresponds to use of electronic device 1500 without corrective lenses attached and ceasing display of user interface 1520 (and, in some embodiments, resuming detection of and/or response to gaze-based user inputs). User interface 1520 also includes instruction 1524, which instructs the user to provide a first hardware-based user input (input 1) to scroll through options 1522*a*-1522*d*, and to provide a second hardware-based user input (input 2) to select one of options 1522*a*-1522*d*. In some embodiments, input 1 to scroll through options 1522*a*-1522*d* includes rotation of a rotatable input mechanism. For example, in some embodiments, one of physical input devices 1506*a*-1506*c* is a rotatable input mechanism, and input 1 includes rotation of the rotatable input mechanism. In some embodiments, input 1 and/or input 2 includes depression of a depressible input mechanism, such as a button and/or a depressible and rotatable crown. At FIG. 15H, electronic device 1500 detects user inputs 1526 and 1528 on physical input devices 1506*b* and 1506*c*. FIGS. 15I-15M depict various scenarios corresponding to different inputs while user interface 1520 is displayed.

Figure 15I:
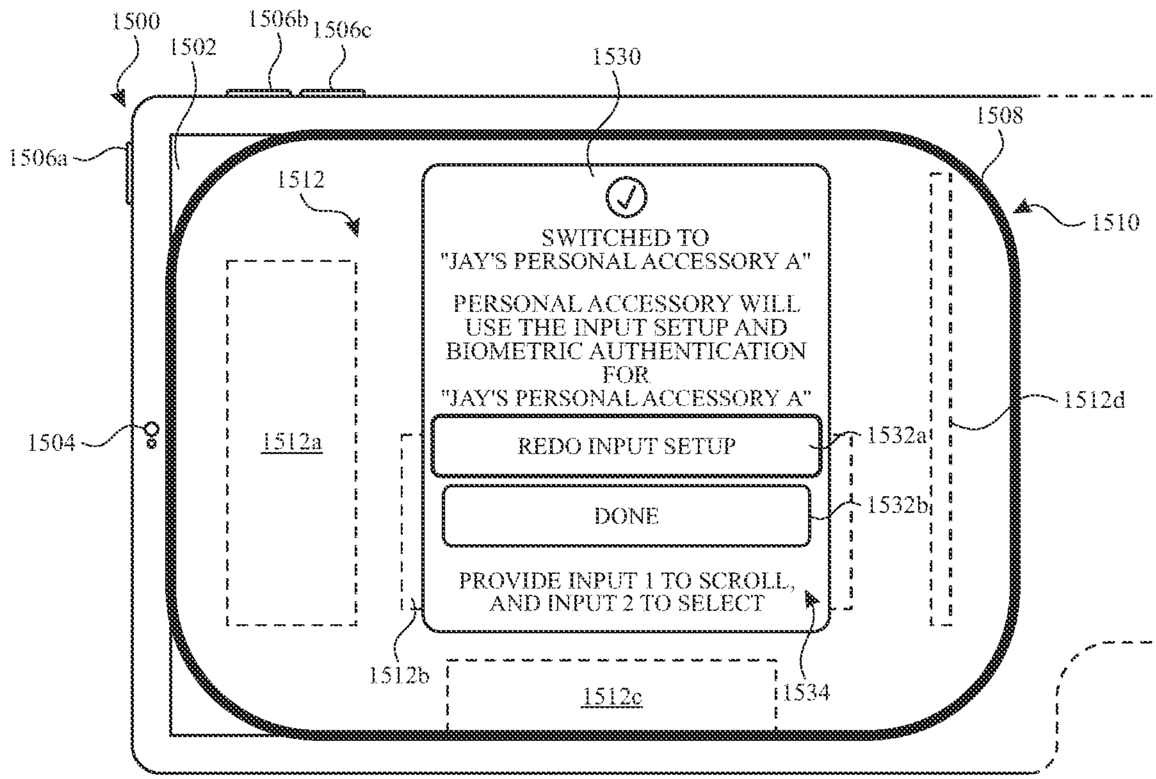

FIG. 15I corresponds to a first example scenario in which user inputs 1526, 1528 correspond to selection of option 1522*a*. In response to detecting user inputs 1526, 1528 corresponding to selection of option 1522*a*, electronic device 1500 displays user interface 1530 which indicates that electronic device 1500 has switched to a device calibration profile corresponding to Jay's Personal Accessory A. User interface 1530 includes option 1532*a*, which is selectable to create a new device calibration profile corresponding to Jay's Personal Accessory A (e.g., re-perform gaze-based input enrollment to create anew device calibration profile corresponding to Jay's Personal Accessory A) (e.g., FIGS. 9A-9L and/or 13A-13V). User interface 1530 also includes option 1532*b*, which is selectable to cease display of user interface 1530 while maintaining the device calibration profile corresponding to Jay's Personal Accessory A. User interface 1530 also includes instructions 1534, which instructs the user that the user can provide a first hardware-based user input to scroll through options 1532*a*-1532*b*, and a second hardware-based user input to select an option.

Figure 15J:
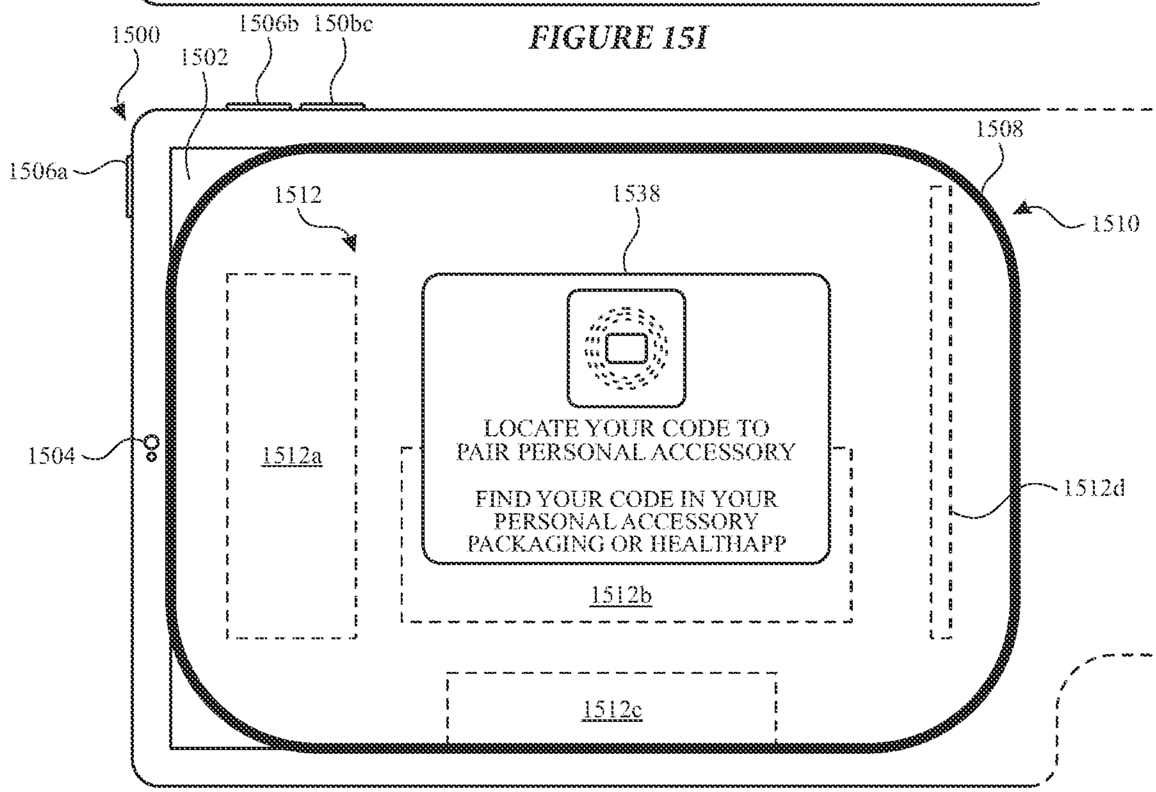
Figure 15K:
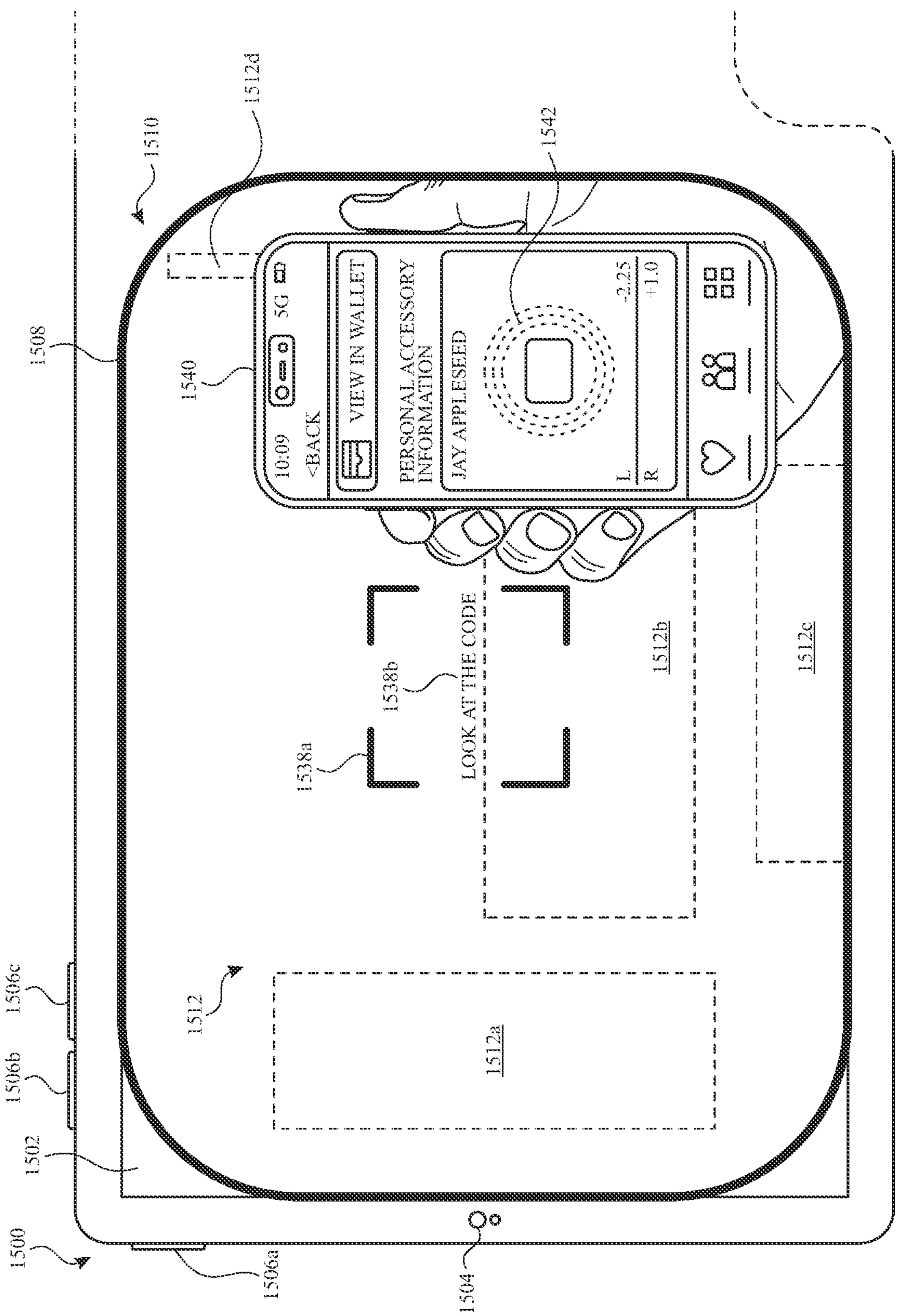
Figure 15L:
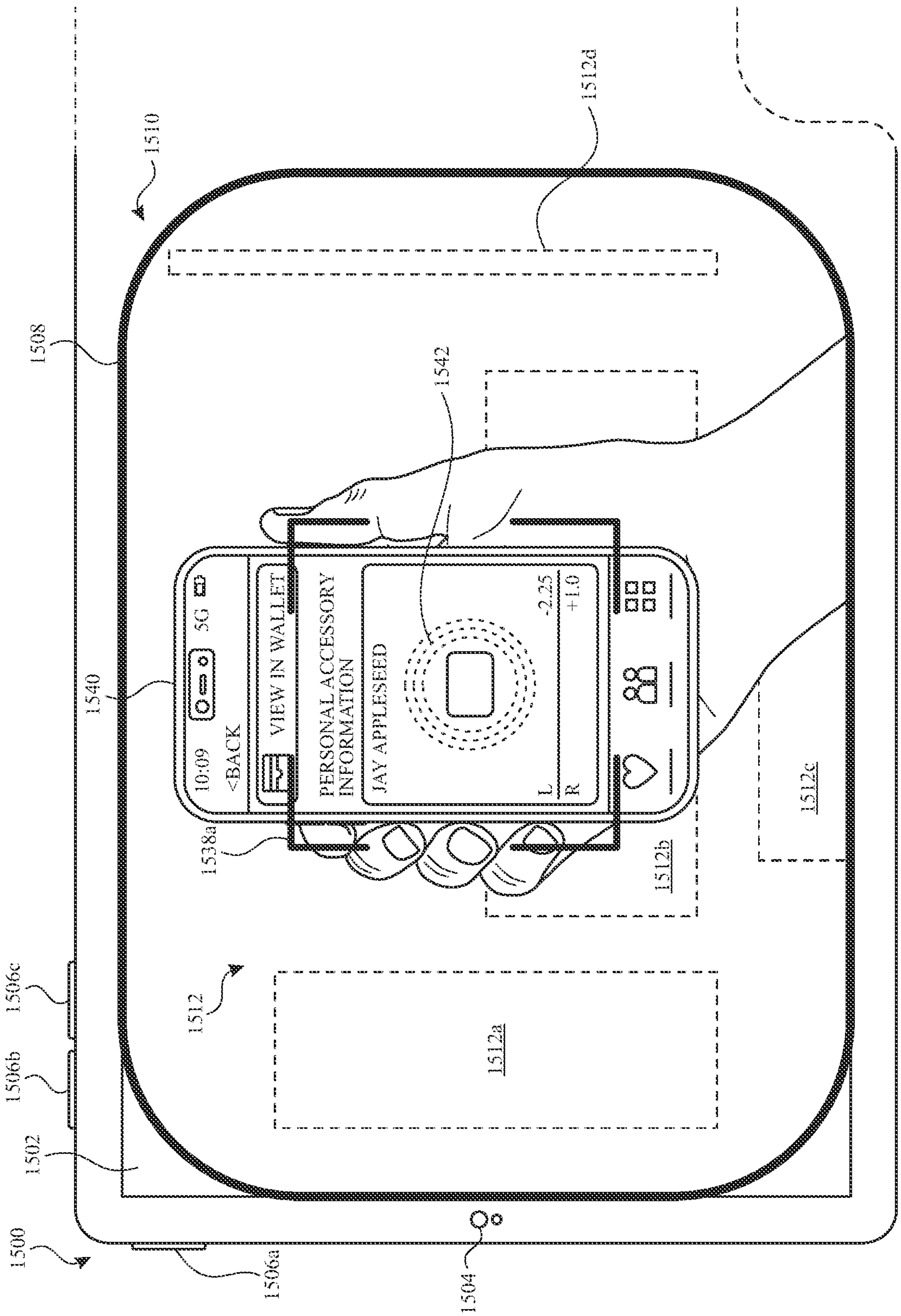
Figure 15M:
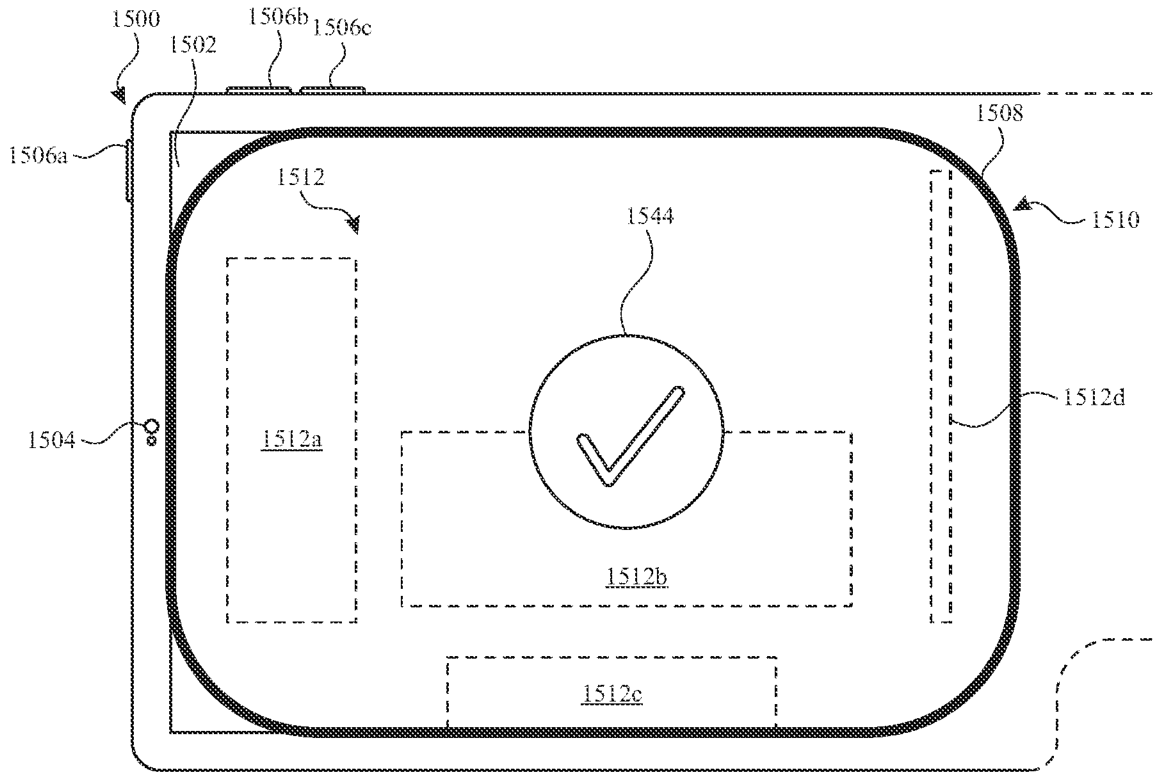

FIG. 15J corresponds to a second example scenario in which user inputs 1526, 1528 correspond to selection of option 1522*c*. In response to detecting user inputs 1526, 1528 corresponding to selection of option 1522*c*, electronic device 1500 displays user interface 1538, which prompts the user to provide a computer-readable code that corresponds to the new corrective lenses that the user wishes to enroll on electronic device 1500. In some embodiments, the computer-readable code allows electronic device 1500 to retrieve vision prescription information corresponding to the corrective lenses. At FIG. 15K, electronic device 1500 detects computer-readable code 1542 (e.g., detects that computer-readable code 1542 has moved within a field of view of electronic device 1500 (e.g., within a field of view of one or more cameras of electronic device 1500)). In response to detecting computer-readable code 1542, electronic device 1500 ceases display of user interface 1530, and displays brackets 1538*a* as well as instruction 1538*b*, which instructs the user to move computer-readable code 1542 within brackets 1538*a*. In the depicted embodiments, computer-readable code 1542 is displayed on smart phone 1540. However, in some embodiments, computer-readable code 1542 is printed on a physical media, such as a piece of paper and/or product packaging. At FIG. 15L, computer-readable code 1542 has been positioned within brackets 1538*a*, and electronic device 1500 reads computer-readable code 1542. At FIG. 15M, in response to receiving computer-readable code 1542, electronic device 1500 receives information corresponding to computer-readable code 1542 (e.g., vision prescription information) and/or enrolls a new set of corrective lenses corresponding to computer-readable code 1542. At FIG. 15M, electronic device 1500 displays indication 1544 indicating that the new set of corrective lenses have been successfully enrolled on electronic device 1500.

Figure 15N:
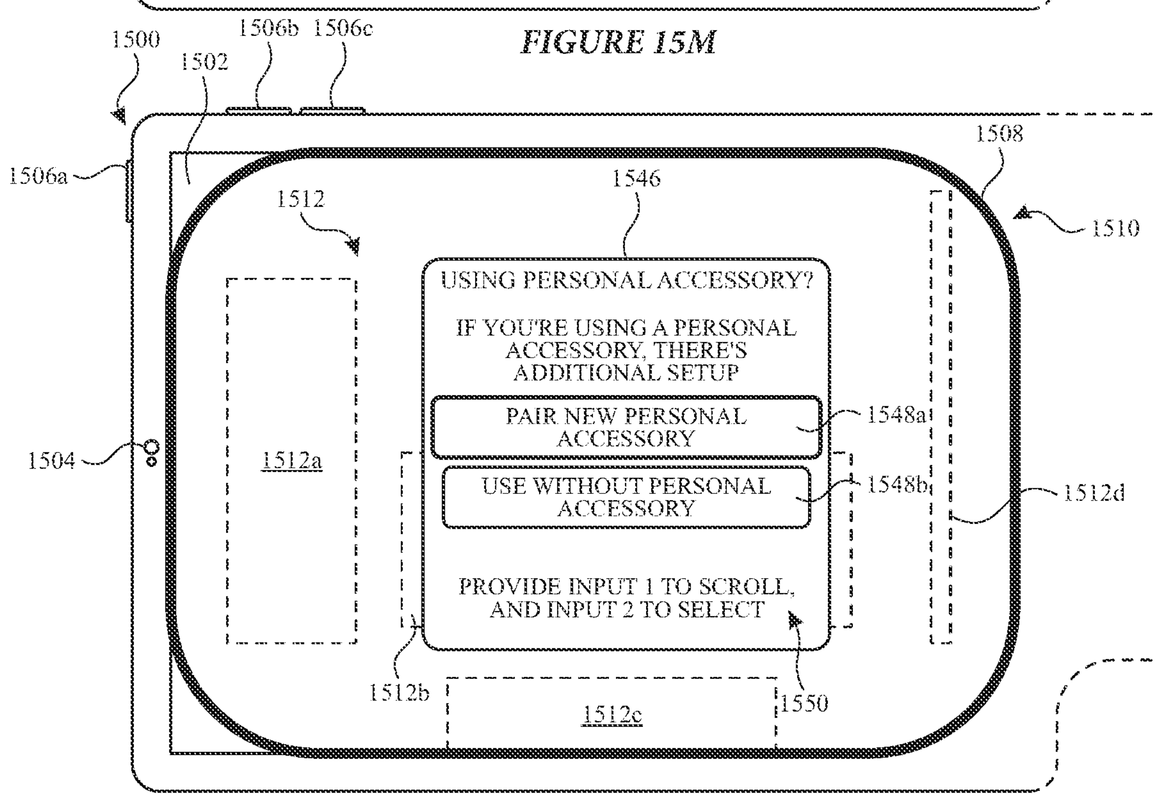

FIG. 15N depicts an example scenario in which, when user input 1514 is detected in FIG. 15C, electronic device 1500 does not have any corrective lenses enrolled on electronic device 1500 (and, accordingly, does not have any device calibration profiles stored for any sets of corrective lenses). In FIG. 15N, in response to detecting user input 1514 and based on a determination that there are no corrective lenses enrolled on electronic device 1500, electronic device 1500 displays user interface 1546, which informs the user that the user should enroll the set of corrective lenses that are attached to electronic device 1500 (e.g., corrective lens 1510). In some embodiments, while user interface 1546 is displayed, electronic device 1500 ceases detecting and/or ceases responding to gaze-based user inputs (and, optionally, requires that a user provide hardware-based user inputs). User interface 1546 includes option 1548*a* that is selectable to cause electronic device to display user interface 1538 (e.g., to enroll anew set of corrective lenses using a computer-readable code corresponding to the new set of corrective lenses). User interface 1548 includes option 1548*b* that is selectable to apply a device calibration profile that corresponds to use of electronic device 1500 without corrective lenses attached. In some embodiments, selection of option 1548*b* results in electronic device 1500 applying the device calibration profile that corresponds to use of electronic device 1500 without corrective lenses attached and ceasing display of user interface 1546 (and, in some embodiments, resuming detection of and/or response to gaze-based user inputs). User interface 1546 also includes instruction 1550, which instructs the user to provide a first hardware-based user input (input 1) to scroll through options 1548*a*-1548*b*, and to provide a second hardware-based user input (input 2) to select one of options 1548*a*-1548*b*. In some embodiments, input 1 to scroll through options 1548*a*-1548*b* includes rotation of a rotatable input mechanism. For example, in some embodiments, one of physical input devices 1506*a*-1506*c* is a rotatable input mechanism, and input 1 includes rotation of the rotatable input mechanism. In some embodiments, input 1 and/or input 2 includes depression of a depressible input mechanism, such as a button and/or a depressible and rotatable crown.

Figure 15O:
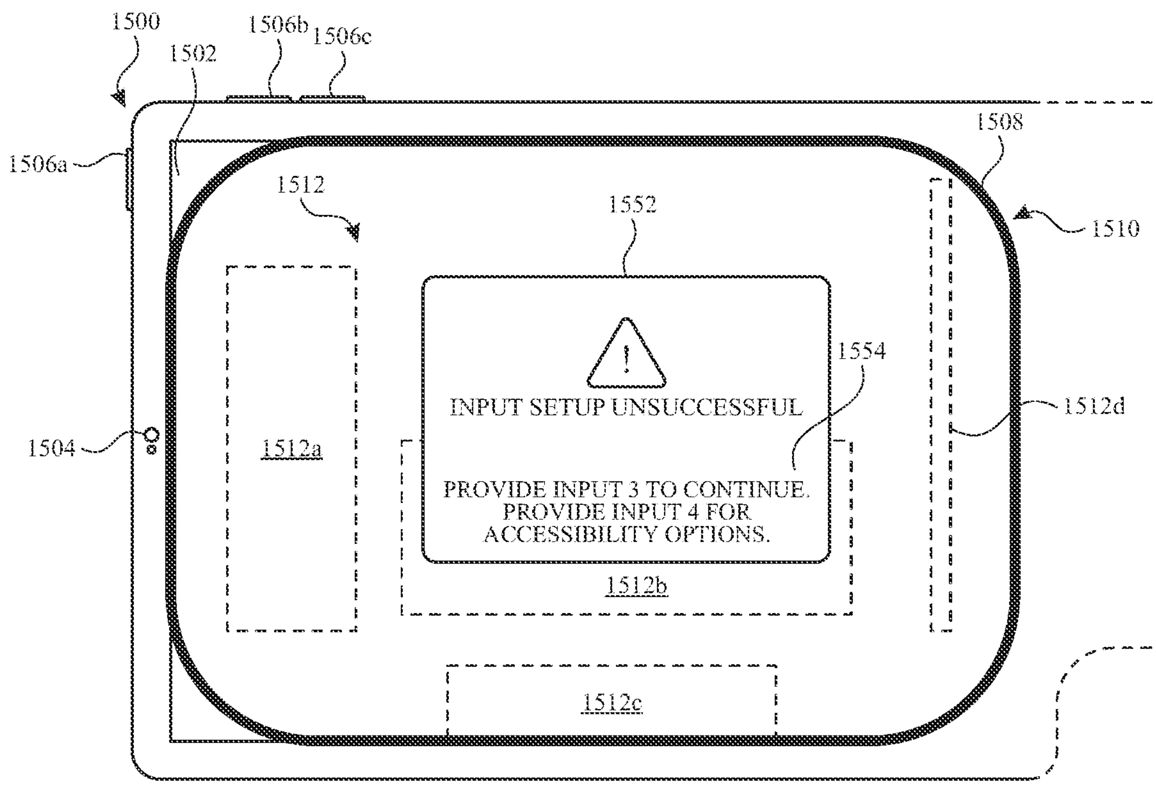

FIG. 15O depicts an example scenario in which gaze-based enrollment of a user has failed. For example, in some embodiments, after performing the gaze-based enrollment of a user described with reference to FIGS. 9A-9L and/or FIGS. 13A-13V, electronic device 1500 determines that gaze-based enrollment of the user has failed. In response to this determination, in FIG. 15O, electronic device 1500 displays user interface 1552, which instructs the user to provide a first type of input (e.g., input 3 (e.g., a hardware input and/or a non-hardware input (e.g., a gaze-based input, a gesture, and/or an air gesture)) to proceed with using electronic device 1500 despite the failed gaze-based enrollment, and to provide a second type of input (e.g., input 4 (e.g., a hardware input and/or a non-hardware input (e.g., a gaze-based input, a gesture, and/or an air gesture)) to access accessibility options. In some embodiments, in response to providing input 3 (e.g., to continue), electronic device 1500 displays user interface 1520, which allows the user to select device calibration profiles corresponding to previously enrolled corrective lenses (e.g., options 1522*a*-1522*b*); pair a new corrective lens (e.g., option 1522*c*); and/or use electronic device 1500 with a default device calibration (e.g., option 1522*d*). In some embodiments, in response to providing input 3 (e.g., to continue), electronic device 1500 displays user interface 1546, which allows the user to pair a new set of corrective lenses (e.g., option 1548*a*) and/or use electronic device 1500 with a default device calibration profile (e.g., option 1548*b*). In some embodiments, electronic device 1500 displays user interface 1520 when one or more corrective lenses are enrolled on electronic device 1500, and displays user interface 1546 when no corrective lenses are enrolled on electronic device 1500.

Figure 15P:
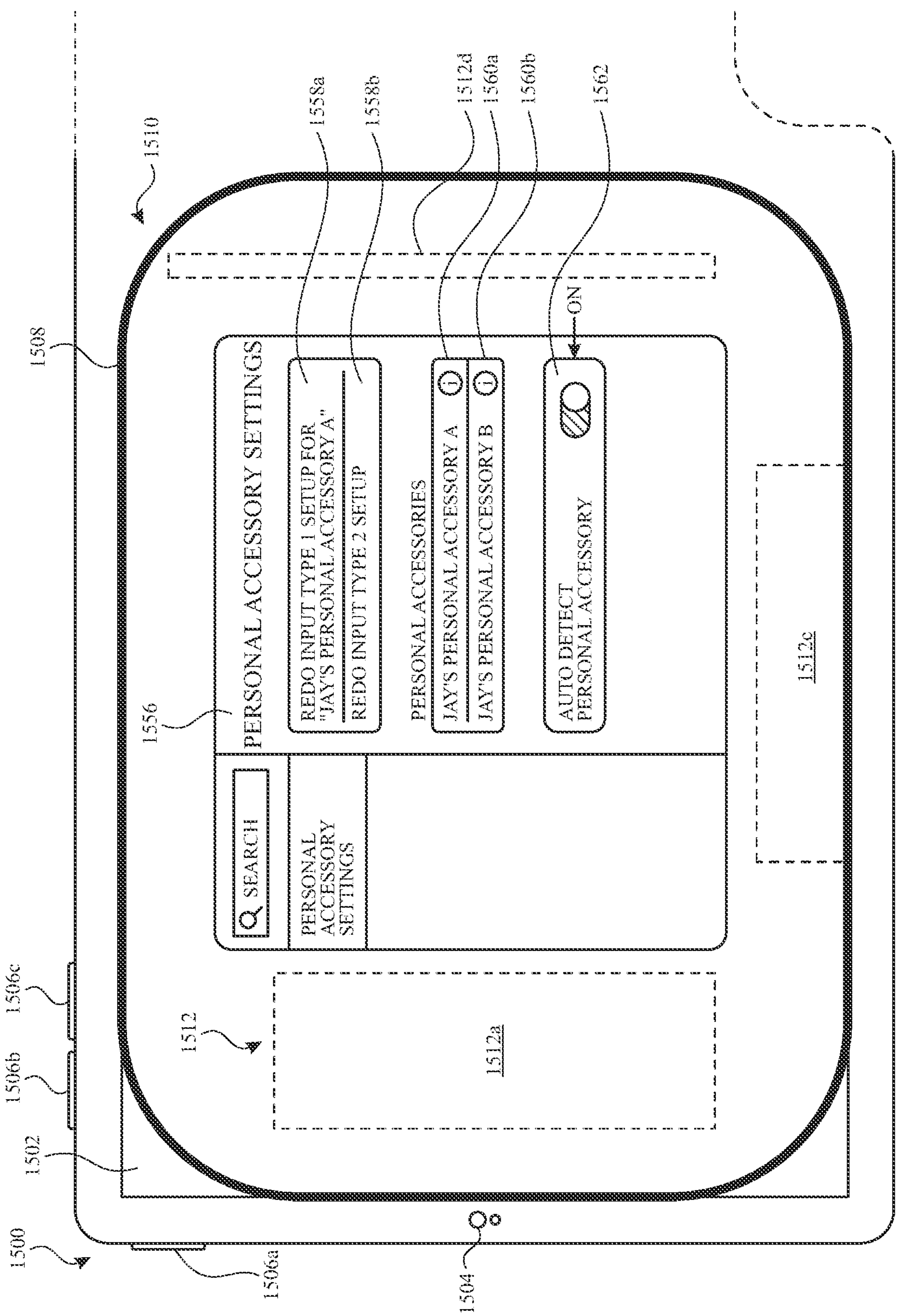

FIG. 15P depicts a personal accessory settings user interface 1556. User interface 1556 includes options 1560*a*-1560*b* which identify two sets of corrective lenses enrolled on electronic device 1500 (Jay's Personal Accessory A and Jay's Personal Accessory B). Option 1560*a* is selectable to view more information about Jay's Personal Accessory A, and option 1560*b* is selectable to view more information about Jay's Personal Accessory B. For example, option 1560*a* is selectable to display user interface 1564 in FIG. 15Q, which displays additional information (e.g., vision prescription information 1566*b*) corresponding to Jay's Personal Accessory A. Returning to FIG. 15P, user interface 1556 also includes option 1558*a* that is selectable to initiate a process for re-performing gaze-based input enrollment (e.g., FIGS. 9A-9L and/or 13A-13V) for Jay's Personal Accessory A (e.g., creating a new device calibration profile corresponding to Jay's Personal Accessory A); and option 1558*b* that is selectable to initiate a process for re-performing hand-based input enrollment (e.g., FIGS. 13A-13V). User interface 1556 also includes option 1562, that is selectable to selectively enable or disable automatic detection of when corrective lenses are attached to electronic device 1500.

Additional descriptions regarding FIGS. 15A-15Q are provided below in reference to method 1600 described with respect to FIG. 16.

FIG. 16 is a flow diagram of an exemplary method 1600 for managing personal accessories and/or corrective lenses, in accordance with some embodiments. In some embodiments, method 1600 is performed at a computer system (e.g., 700 and/or 1500) (e.g., computer system 101 in FIG. 1A) (e.g., a smart phone, a smart watch, a tablet, a laptop, a desktop, a wearable device, and/or head-mounted device) that is in communication with one or more display generation components (e.g., 1502) (e.g., display generation component 120 in FIGS. 1A, 3, and 4) (e.g., a visual output device, a 3D display, a display having at least a portion that is transparent or translucent on which images can be projected (e.g., a see-through display), a projector, a heads-up display, and/or a display controller) and one or more input devices (e.g., 1504, 1506*a*-1506*c*) (e.g., a touch-sensitive surface (e.g., a touch-sensitive display); a mouse; a keyboard; a remote control; a visual input device (e.g., one or more cameras (e.g., an infrared camera, a depth camera, a visible light camera, and/or a gaze tracking camera)); an audio input device; a biometric sensor (e.g., a fingerprint sensor, a face identification sensor, a gaze tracking sensor, and/or an iris identification sensor) and/or one or more mechanical input devices (e.g., a depressible input mechanism; a button; a rotatable input mechanism; a crown; and/or a dial)). In some embodiments, the method 1600 is governed by instructions that are stored in a non-transitory (or transitory) computer-readable storage medium and that are executed by one or more processors of a computer system, such as the one or more processors 202 of computer system 101 (e.g., control 110 in FIG. 1A). Some operations in method 1600 are, optionally, combined and/or the order of some operations is, optionally, changed.

In some embodiments, the computer system (e.g., 1500) detects (1602) a first event (e.g., a first predetermined and/or pre-specified event, and/or an event that satisfies one or more criteria) (e.g., in some embodiments, detecting the first event includes detecting that the computer system has been placed on the body of a user and/or has been worn by a user (e.g., detecting that at least a portion of the computer system is placed on the head of the user and/or on the face of the user; and/or detecting at least a portion of the body of the user (e.g., one or more eyes, a face, a nose, and/or a mouth) (e.g., detecting at least a portion of the body of the user at a particular position relative to the computer system)); in some embodiments, detecting the first event includes detecting that the computer system is being set up and/or is running a set up process; in some embodiments, detecting the first event includes detecting a first set of user inputs (e.g., 1511, 1514, 1519, 1526, and/or 1528) (e.g., one or more hardware inputs, one or more touch inputs, one or more gaze-based inputs, one or more gesture inputs, and/or one or more air-gesture inputs)). In response to detecting the first event (1604) while the one or more display generation components (e.g., 1502) have a respective spatial relationship to one or more eyes of a user (e.g., while a portion of the computer system that includes the one or more display generation components is worn on the body of a user of the computer system, such as a HMD being worn over a face of the user) (e.g., while at least a portion of the computer system is placed on the head of the user and/or on the face of the user; and/or while at least a portion of the body of the user (e.g., one or more eyes, a face, a nose, and/or a mouth) is detected by the computer system (e.g., is detected by the computer system at a particular position relative to the computer system)): in accordance with a determination that corrective lens criteria are met (1606), wherein the corrective lens criteria include one or more criteria pertaining to corrective lens information corresponding to one or more corrective lenses (e.g., 1510, "Jay's Personal Accessory A," and/or "Jay's Personal Accessory B") used to modify content visible via the one or more display generation components (e.g., 1502) while the one or more display generation components (e.g., 1502) have a respective spatial relationship to one or more eyes of the user (e.g., one or more criteria pertaining to a visual prescription, an optical prescription, corrective lenses, prescription lenses, and/or prescription optical elements corresponding to a user), the computer system displays (1608), via the one or more display generation components (e.g., 1502), a corrective lens management user interface (e.g., 1516, 1518, 1520, 1530, 1538, 1538, 1538*b*, 1546, and/or 1552) that includes user interface elements associated with one or more corrective lenses for the computer system (e.g., displayed information about the presence of one or more corrective lenses, displayed information about the absence of one or more corrective lenses, displayed information about the identity of one or more corrective lenses, displayed information about a prescription of one or more corrective lenses, and/or controls for managing one or more corrective lenses such as adding, removing, or selecting between different corrective lenses) (e.g., a corrective lens management user interface that includes information pertaining to one or more vision prescriptions, prescription lenses, prescription optical lenses, corrective lenses, prescription optical elements, and/or optical accessories corresponding to a user); and in accordance with a determination that the corrective lens criteria are not met (1610), the computer system forgoes (1612) display of the corrective lens management user interface (e.g., FIGS. 15B and/or 15D) (and, optionally, displaying a first user interface that is different from the corrective lens management user interface). Displaying a corrective lens management user interface when corrective lens criteria are met, and forgoing display of the corrective lens management user interface when the corrective lens criteria are not met, enhances the operability of the system and makes the user-system interface more efficient (e.g., by helping the user to provide proper inputs and reducing errors) which, additionally, reduces power usage and improves battery life of the device by enabling the user to use the system more quickly and efficiently. Doing so also provides the user with feedback about a state of the device (e.g., the device has determined that corrective lens criteria are met or are not met). Ensuring that a computer system is using proper information for corrective lenses and/or vision prescriptions reduces visual discomfort, increases visual fidelity, and/or improves input accuracy (e.g., for gaze-based inputs), which reduces the likelihood of inaccurate inputs and, additionally, reduces power usage and improves battery life of the device (e.g., by reducing the energy that would be used to performed and undo erroneous inputs and/or by enabling the user to use the system more quickly and efficiently).

In some embodiments, the determination that the corrective lens criteria are met includes a determination that one or more corrective lenses (e.g., 1510) are detected by the computer system (e.g., FIG. 15C) (e.g., one or more corrective lenses are attached to the computer system (e.g., 1500) and/or are detected at a specified position on the computer system (e.g., mounted in lens mount 1508)) (e.g., one or more corrective lenses used to modify content visible via the one or more display generation components (e.g., 1502) while the one or more display generation components have a respective spatial relationship to one or more eyes of the user; and/or one or more corrective lenses that are positioned between the one or more display generation components and one or more eyes of a person (e.g., a user) when the computer system is worn by the person); and the determination that the corrective lens criteria are not met includes a determination that one or more corrective lenses (e.g., 1510) are not detected (e.g., FIGS. 15A-15B) (e.g., one or more corrective lenses are not attached to the computer system and/or are not detected at a specified position on the computer system) (e.g., one or more corrective lenses used to modify content visible via the one or more display generation components while the one or more display generation components have a respective spatial relationship to one or more eyes of the user; and/or one or more corrective lenses that are positioned between the one or more display generation components and one or more eyes of a person (e.g., a user) when the computer system is worn by the person). Displaying a corrective lens management user interface when one or more corrective lenses are detected, and forgoing display of the corrective lens management user interface when corrective lenses are not detected, enhances the operability of the system and makes the user-system interface more efficient (e.g., by helping the user to provide proper inputs and reducing errors) which, additionally, reduces power usage and improves battery life of the device by enabling the user to use the system more quickly and efficiently. Doing so also provides the user with feedback about a state of the device (e.g., the device has detected one or more corrective lenses, or has not detected one or more corrective lenses).

In some embodiments, while displaying the corrective lens management user interface (e.g., 1516, 1518, 1520, 1530, 1538, 1538, 1538*b*, 1546, and/or 1552), the computer system (e.g., 1500) receives, via the one or more input devices (e.g., 1506*a*-1506*c*), a first set of hardware control inputs (e.g., 1519, 1526, and/or 1528) (e.g., inputs received via one or more hardware controls (e.g., a push of a button, a press of a depressible input mechanism, and/or rotation of a physical, rotatable input mechanism)); and in response to receiving the first set of hardware control inputs, the computer system modifies display of the corrective lens management user interface (e.g., 1516, 1518, 1520, 1530, 1538, 1538, 1538*b*, 1546, and/or 1552) (e.g., in FIG. 15H, displays a focus selector moving between options 1522*a*-1522*d* and/or displays a user interface corresponding to selection of one of options 1522*a*-1522*d*; and/or in FIG. 15I, displays a focus selector moving between options 1532*a*-1532*b* and/or displays a user interface corresponding to selection of one of options 1532*a*-1532*b*) (e.g., displaying scrolling and/or movement of one or more displayed elements of the corrective lens management user interface; and/or displaying a visual change in one or more displayed elements of the corrective lens management user interface). Allowing a user to interact with the corrective lens management user interface with hardware control inputs when corrective lens criteria are met (e.g., when corrective lenses are detected), enhances the operability of the system and makes the user-system interface more efficient (e.g., by helping the user to provide proper inputs and reducing errors) which, additionally, reduces power usage and improves battery life of the device by enabling the user to use the system more quickly and efficiently.

In some embodiments, the first set of hardware control inputs (e.g., 1519, 1526, and/or 1528) includes a first rotation of a first rotatable input mechanism (e.g., in some embodiments, at least one of physical input devices 1506*a*-1506*c* is a rotatable input mechanism, and at least one of inputs 1519, 1526, and/or 1528 includes rotation of the rotatable input mechanism) (e.g., a physical rotatable input mechanism and/or a physically rotatable input mechanism); and modifying display of the corrective lens management user interface (e.g., 1516, 1518, 1520, 1530, 1538, 1538, 1538*b*, 1546, and/or 1552) includes displaying, via the one or more display generation components, navigating through options of a first element (e.g., scrolling or moving focus between different selectable options) (e.g., in FIG. 15H, displaying a focus selector moving between options 1522*a*-1522*d*; and/or in FIG. 15I, displaying a focus selector moving between options 1532*a*-1532*b*) of the corrective lens management user interface. In some embodiments, navigating through options of the first element of the corrective lens management user interface includes navigating through options of the first element by a first amount based on a magnitude and/or a speed of the first rotation. In some embodiments, navigating through options of the first element of the corrective lens management user interface includes navigating through options of the first element in a first direction based on a direction of rotation of the first rotation (e.g., navigating in a first direction when the first rotatable input mechanism is rotated in a first rotation direction, and navigating in a second direction (e.g., a second direction opposite the first direction) when the first rotatable input mechanism is rotated in a second rotation direction different from the first rotation direction (e.g., a second rotation direction opposite the first rotation direction). In some embodiments, while displaying the corrective lens management user interface (e.g., 1516, 1518, 1520, 1530, 1538, 1538, 1538*b*, 1546, and/or 1552), the computer system receives, via the one or more input devices (e.g., 1506*a*-1506*c*), a first rotation of a first rotatable input mechanism (e.g., a physical rotatable input mechanism and/or a physically rotatable input mechanism); and in response to receiving the first rotation of the first rotatable input mechanism, the computer system displays, via the one or more display generation components (e.g., 1502), scrolling of a first element of the corrective lens management user interface (e.g., scrolling of a list of elements and/or scrolling of a focus selector element) and/or navigation through options of a first element of the corrective lens management user interface. Allowing a user to interact with the corrective lens management user interface with hardware control inputs when corrective lens criteria are met (e.g., when corrective lenses are detected), enhances the operability of the system and makes the user-system interface more efficient (e.g., by helping the user to provide proper inputs and reducing errors) which, additionally, reduces power usage and improves battery life of the device by enabling the user to use the system more quickly and efficiently.

In some embodiments, the first set of hardware control inputs (e.g., 1519, 1526, and/or 1528) includes a first press of a first depressible input mechanism (e.g., 1506*a*-1506*c*) (e.g., a press of a depressible button) (e.g., a first depressible input mechanism that is the same as the first rotatable input mechanism or that is different from the first rotatable input mechanism); and modifying display of the corrective lens management user interface (e.g., 1516, 1518, 1520, 1530, 1538, 1538, 1538*b*, 1546, and/or 1552) includes displaying, via the one or more display generation components (e.g., 1502), an indication that a second element of the corrective lens management user interface has been selected (e.g., in FIG. 15I, displaying user interface 1530 to indicate that option 1522*a* was selected in FIG. 15H; and/or in FIG. 15J, displaying user interface 1538 to indicate that option 1522*c* was selected in FIG. 15H) (e.g., displaying a visual indication that the second element of the corrective lens management user interface has been selected). In some embodiments, displaying the indication that the second element of the corrective lens management user interface has been selected includes displaying an indication that a currently selected (e.g., currently highlighted and/or currently in focus) element has been selected. In some embodiments, prior to displaying the indication that the second element of the corrective lens management user interface has been selected, the computer system displays navigation through options of the corrective lens management user interface to navigate to the second element (e.g., in FIG. 15H, displays movement of a focus selector between options 1522*a*-1522*d*). In some embodiments, prior to receiving the first press of the first depressible input mechanism, and prior to displaying the indication that the second element has been selected, the computer system receives one or more navigation inputs (e.g., a first rotation of a first rotatable input mechanism) and displays navigating through options of the corrective lens management user interface, including navigating to the second element (e.g., in FIG. 15H, displays movement of a focus selector between options 1522*a*-1522*d*). In some embodiments, while displaying the corrective lens management user interface (e.g., 1516, 1518, 1520, 1530, 1538, 1538, 1538*b*, 1546, and/or 1552), the computer system receives, via the one or more input devices (e.g., 1506*a*-1506*c*), a first rotation of a first rotatable input mechanism (e.g., in some embodiments, at least one of physical input devices 1506*a*-1506*c* is a rotatable input mechanism that is rotatable by a user); and in response to receiving the first rotation of the first rotatable input mechanism, the computer system displays, via the one or more display generation components, an indication that a second element of the corrective lens management user interface has been selected (e.g., displays a visual indication that the second element of the corrective lens management user interface has been selected) (e.g., in FIG. 15H, displays movement of a focus selector to indicate that the second element has been selected). Allowing a user to interact with the corrective lens management user interface with hardware control inputs when corrective lens criteria are met (e.g., when corrective lenses are detected), enhances the operability of the system and makes the user-system interface more efficient (e.g., by helping the user to provide proper inputs and reducing errors) which, additionally, reduces power usage and improves battery life of the device by enabling the user to use the system more quickly and efficiently.

In some embodiments, the first depressible input mechanism is a rotatable and depressible input mechanism (e.g., in some embodiments, at least one of physical input devices 1506*a*-1506*c* is a rotatable and depressible input mechanism) (e.g., a rotatable and depressible crown) (e.g., a rotatable and depressible input mechanism that is the same as the first rotatable input mechanism or different from the first rotatable input mechanism). In some embodiments, displaying the indication that the second element of the corrective lens management user interface has been selected includes displaying an indication that a currently selected (e.g., currently highlighted and/or currently in focus) element has been selected. In some embodiments, prior to displaying the indication that the second element of the corrective lens management user interface has been selected, the computer system displays navigation through options of the corrective lens management user interface to navigate to the second element (e.g., in FIG. 15H, displays movement of a focus selector between options 1522*a*-1522*d* to display which option is currently selected). In some embodiments, prior to receiving the first press of the rotatable and depressible input mechanism, and prior to displaying the indication that the second element has been selected, the computer system receives one or more navigation inputs (e.g., a first rotation of the rotatable and depressible input mechanism) and, in response to receiving the one or more navigation inputs (e.g., in response to a first rotation of the rotatable and depressible input mechanism), displays navigating through options of the corrective lens management user interface, including navigating to the second element. Allowing a user to interact with the corrective lens management user interface with hardware control inputs when corrective lens criteria are met (e.g., when corrective lenses are detected), enhances the operability of the system and makes the user-system interface more efficient: (e.g., by helping the user to provide proper inputs and reducing errors) which, additionally, reduces power usage and improves battery life of the device by enabling the user to use the system more quickly and efficiently.

In some embodiments, the computer system (e.g., 1500) displays, via the one or more display generation components (e.g., 1502) (e.g., in some embodiments, concurrently with the corrective lens management user interface (e.g., 1516, 1518, 1520, 1530, 1538, 1538, 1538*b*, 1546, and/or 1552), within the corrective lens management user interface, and/or as part of the corrective lens management user interface), a first instruction (e.g., 1524, 1534, 1550, and/or 1554) (e.g., a visual instruction, a graphical instruction, an image-based instruction, and/or text-based instruction) instructing the user to provide a first hardware control input (e.g., one or more inputs via one or more hardware controls (e.g., a push of a button, a press of a depressible input mechanism, and/or rotation of a physical, rotatable input mechanism)) to perform a first function with respect to the corrective lens management user interface (e.g., a first instruction instructing the user to perform a first hardware control input to navigate through options of the corrective lens management user interface; and/or a first instruction instructing the user to perform a first hardware control input to select an element in the corrective lens management user interface). Providing the user with visual instructions on how to interact with the corrective lens management user interface enhances the operability of the system and makes the user-system interface more efficient (e.g., by helping the user to provide proper inputs and reducing errors) which, additionally, reduces power usage and improves battery life of the device by enabling the user to use the system more quickly and efficiently.

In some embodiments, the computer system (e.g., 1500) detects a second event (e.g., a second event different from the first event and/or the same as the first event) (e.g., a second predetermined and/or pre-specified event, and/or an event that satisfies one or more criteria) (e.g., in some embodiments, detecting the second event includes detecting that the computer system has been placed on the body of a user and/or has been worn by a user (e.g., detecting that at least a portion of the computer system is placed on the head of the user and/or on the face of the user; and/or detecting at least a portion of the body of the user (e.g., one or more eyes, a face, a nose, and/or a mouth) (e.g., detecting at least a portion of the body of the user at a particular position relative to the computer system)); in some embodiments, detecting the second event includes detecting that the computer system is being set up and/or is running a set up process; in some embodiments, detecting the second event includes detecting a second set of user inputs (e.g., 1511, 1514, 1519, 1526, and/or 1528) (e.g., one or more hardware inputs, one or more touch inputs, one or more gaze-based inputs, one or more gesture inputs, and/or one or more air-gesture inputs)). In response to detecting the second event: in accordance with a determination that one or more corrective lenses (e.g., 1510) are detected by the computer system (e.g., 1500) (e.g., one or more corrective lenses are attached to the computer system and/or are detected at a specified position on the computer system) (e.g., one or more corrective lenses used to modify content visible via the one or more display generation components while the one or more display generation components have a respective spatial relationship to one or more eyes of the user) and a single set of corrective lenses are enrolled on the computer system (e.g., only one set of corrective lenses are enrolled on the computer system, and/or more than one set of corrective lenses is not enrolled on the computer system) (e.g., are registered on the computer system and/or saved on the computer system), the computer system applies a first device calibration profile (e.g., of a plurality of device calibration profiles) (e.g., a gaze input calibration profile and/or a gaze calibration profile) corresponding to the single set of corrective lenses enrolled on the computer system (e.g., in FIG. 15D, based on detection of corrective lens 1510 and a determination that a single set of corrective lenses are enrolled on electronic device 1500, electronic device 1500 applies a first device calibration profile corresponding to the single enrolled corrective lens); and in accordance with a determination that one or more corrective lenses (e.g., 1510) are not detected (e.g., FIGS. 15A-15B) (e.g., one or more corrective lenses are not attached to the computer system and/or are not detected at a specified position on the computer system) and a single set of corrective lenses are enrolled on the computer system (e.g., only one set of corrective lenses are enrolled on the computer system, and/or more than one set of corrective lenses is not enrolled on the computer system) (e.g., are registered on the computer system and/or saved on the computer system), the computer system applies a second device calibration profile (e.g., of a plurality of device calibration profiles) (e.g., a gaze input calibration profile and/or a gaze calibration profile) (e.g., a second device calibration profile that does not utilize and/or is not associated with the single set of corrective lenses that are enrolled on the computer system) different from the first device calibration profile (e.g., in FIGS. 15A-15B, electronic device 1500 applies a different device calibration profile that in FIG. 15D). In some embodiments, the second device calibration profile is a default calibration profile and/or a device calibration profile that corresponds to no corrective lenses being used, detected, and/or installed. Applying a first device calibration profile when one or more corrective lenses are detected, and applying a second device calibration profile when corrective lenses are not detected, enhances the operability of the system and makes the user-system interface more efficient (e.g., by helping the user to provide proper inputs and reducing errors) which, additionally, reduces power usage and improves battery life of the device by enabling the user to use the system more quickly and efficiently. Ensuring that a computer system is using proper information for corrective lenses and/or vision prescriptions reduces visual discomfort, increases visual fidelity, and/or improves input accuracy (e.g., for gaze-based inputs), which reduces the likelihood of inaccurate inputs and, additionally, reduces power usage and improves battery life of the device (e.g. by reducing the energy that would be used to performed and undo erroneous inputs and/or by enabling the user to use the system more quickly and efficiently).

In some embodiments, the computer system displays, via the one or more display generation components, a first virtual object, including: in accordance with a determination that the first device calibration profile is applied (e.g., and the second device calibration profile is not applied) (e.g., in FIG. 15D, a first device calibration profile corresponding to corrective lens 1510 and/or corresponding to the single set of enrolled corrective lenses is applied), displaying the first virtual object in a first manner (e.g., at a first position, at a first size, with a first set of visual characteristics (e.g., size, shape, color, saturation, and/or opacity); and/or with a first set of distortion adjustments (e.g., lens distortion adjustments, color adjustments, and/or chromatic aberration adjustments)); and in accordance with a determination that the second device calibration profile is applied (e.g., in FIG. 15B, a second device calibration profile is applied (e.g., a default device calibration profile and/or a device calibration profile corresponding to use of electronic device 1500 without corrective lenses) (e.g., and the first device calibration profile is not applied), displaying the first virtual object in a second manner (e.g., at a second position, at a second size, with a second set of visual characteristics (e.g., size, shape, color, saturation, and/or opacity); and/or with a second set of distortion adjustments (e.g., lens distortion adjustments, color adjustments, and/or chromatic aberration adjustments) different from the first set of distortion adjustments) different from the first manner (e.g., in FIG. 15B, content is displayed differently than in FIG. 15D based on the different device calibration profiles being applied (e.g., to account for the correct lenses installed in FIG. 15D)). In some embodiments, virtual elements and/or user interface elements are displayed differently when different device calibration profiles are applied. Displaying virtual elements differently based on whether one or more corrective lenses are detected and/or when different device calibration profiles are applied enhances the operability of the system and makes the user-system interface more efficient (e.g., by helping the user to provide proper inputs and reducing errors) which, additionally, reduces power usage and improves battery life of the device by enabling the user to use the system more quickly and efficiently.

In some embodiments, the computer system receives (e.g., 1500), via the one or more input devices (e.g., 1504), a first gaze-based user input (e.g., a user input that includes determination of a location, direction and/or position of a user gaze; a user gaze directed at a particular position within a user interface; and/or a user gaze in a particular direction) (e.g., a first standalone gaze-based user input (e.g., a user input that includes only gaze information and/or eye information) and/or a first gaze-based user input that is part of multi-part user input that includes additional user inputs (e.g., a user input that includes gaze-based input and hand-based input; and/or an air gesture input)). In response to receiving the first gaze-based user input: in accordance with a determination that the first device calibration profile is applied (e.g., and the second device calibration profile is not applied) (e.g., in FIG. 15D, a first device calibration profile corresponding to corrective lens 1510 and/or corresponding to the single set of enrolled corrective lenses is applied), the computer system outputs a first response to the first gaze-based user input (e.g., displaying first content that is responsive to the first gaze-based user input and/or performing a first function that is responsive to the first gaze-based user input); and in accordance with a determination that the second device calibration profile is applied (e.g., and the first device calibration profile is not applied) (e.g., in FIG. 15B, a second device calibration profile is applied (e.g., a default device calibration profile and/or a device calibration profile corresponding to use of electronic device 1500 without corrective lenses), the computer system outputs a second response to the first gaze-based user input (e.g., displaying second content that is responsive to the first gaze-based user input and is different from the first content and/or performing a second function that is responsive to the first gaze-based user input and is different from the first function) that is different from the first response (e.g., the same gaze-based user input is detected and/or interpreted differently in FIG. 15B and FIG. 15D based on the different device calibration profiles being applied (e.g., to account for the correct lenses installed in FIG. 15D)). In some embodiments, the computer system detects gaze-based user input differently when different device calibration profiles are applied. Outputting different responses to a first gaze-based user input based on whether one or more corrective lenses are detected and/or when different device calibration profiles are applied enhances the operability of the system and makes the user-system interface more efficient (e.g., by helping the user to provide proper inputs and reducing errors) which, additionally, reduces power usage and improves battery life of the device by enabling the user to use the system more quickly and efficiently. Ensuring that a computer system is using proper information for corrective lenses and/or vision prescriptions reduces visual discomfort, increases visual fidelity, and/or improves input accuracy (e.g., for gaze-based inputs), which reduces the likelihood of inaccurate inputs and, additionally, reduces power usage and improves battery life of the device (e.g., by reducing the energy that would be used to performed and undo erroneous inputs and/or by enabling the user to use the system more quickly and efficiently).

In some embodiments, the computer system receives, via the one or more input devices, a second gaze-based user input (e.g., a user input that includes determination of a location, direction and/or position of a user gaze; a user gaze directed at a particular position within a user interface; and/or a user gaze in a particular direction) (e.g., a first standalone gaze-based user input (e.g., a user input that includes only gaze information and/or eye information) and/or a first gaze-based user input that is part of multi-part user input that includes additional user inputs (e.g., a user input that includes gaze-based input and hand-based input; and/or an air gesture input)). In response to receiving the second gaze-based user input: in accordance with a determination that the first device calibration profile is applied (e.g., and the second device calibration profile is not applied) (e.g., in FIG. 15D, a first device calibration profile corresponding to corrective lens 1510 and/or corresponding to the single set of enrolled corrective lenses is applied), the computer system determines that the second gaze-based user input is directed to a first position (e.g., a first position on a display generation components, a first display position, and/or a first position in a user interface); and in accordance with a determination that the second device calibration profile is applied (e.g., and the first device calibration profile is not applied) (e.g., in FIG. 15B, a second device calibration profile is applied (e.g., a default device calibration profile and/or a device calibration profile corresponding to use of electronic device 1500 without corrective lenses), the computer system determines that the second gaze-based user input is directed to a second position (e.g., a second position on a display generation components, a second display position, and/or a second position in a user interface) different from the first position (e.g., the same gaze-based user input is detected and/or interpreted differently in FIG. 15B and FIG. 15D based on the different device calibration profiles being applied (e.g., to account for the correct lenses installed in FIG. 15D)). In some embodiments, the computer system detects gaze-based user input differently when different device calibration profiles are applied. Interpreting gaze-based user inputs differently based on whether one or more corrective lenses are detected and/or when different device calibration profiles are applied enhances the operability of the system and makes the user-system interface more efficient (e.g., by helping the user to provide proper inputs and reducing errors) which, additionally, reduces power usage and improves battery life of the device by enabling the user to use the system more quickly and efficiently. Ensuring that a computer system is using proper information for corrective lenses and/or vision prescriptions reduces visual discomfort, increases visual fidelity, and/or improves input accuracy (e.g., for gaze-based inputs), which reduces the likelihood of inaccurate inputs and, additionally, reduces power usage and improves battery life of the device (e.g. by reducing the energy that would be used to performed and undo erroneous inputs and/or by enabling the user to use the system more quickly and efficiently).

In some embodiments, the computer system (e.g., 1500) displays, via the one or more display generation components (e.g., 1502), the corrective lens management user interface (e.g., 1516, 1518, 1520, 1530, 1538, 1538, 1538*b*, 1546, and/or 1552). Subsequent to displaying the corrective lens management user interface: in accordance with a determination that a first set of criteria are met (e.g., the corrective lens management user interface has been displayed for a threshold duration of time (e.g., 3 seconds, 5 seconds, 10 seconds, or 30 seconds)), the computer system ceases display of the corrective lens management user interface (e.g., 1516, 1518, 1520, 1530, 1538, 1538, 1538*b*, 1546, and/or 1552). In some embodiments, subsequent to displaying the corrective lens management user interface, in accordance with a determination that the first set of criteria are not met, the computer system maintains display of the corrective lens management user interface. Temporarily displaying the corrective lens management user interface, and then ceasing display of the corrective lens management user interface when criteria are met, enhances the operability of the system and makes the user-system interface more efficient (e.g., by helping the user to provide proper inputs and reducing errors) which, additionally, reduces power usage and improves battery life of the device by enabling the user to use the system more quickly and efficiently.

In some embodiments, detecting the first event includes detecting that the computer system (e.g., 1500) has been placed on the body of a user (e.g., detecting that the computer system has been worn by a user; detecting that at least a portion of the computer system is placed on the head of the user and/or on the face of the user; and/or detecting at least a portion of the body of the user (e.g., one or more eyes, a face, a nose, and/or a mouth) (e.g., detecting at least a portion of the body of the user at a particular position relative to the computer system); the determination that corrective lens criteria are met includes a determination that one or more corrective lenses (e.g., 1510) are detected by the computer system (e.g., one or more corrective lenses are attached to the computer system and/or are detected at a specified position on the computer system) (e.g., one or more corrective lenses used to modify content visible via the one or more display generation components while the one or more display generation components have a respective spatial relationship to one or more eyes of the user) and a plurality of sets of corrective lenses (e.g., in some embodiments, a set of corrective lenses includes one corrective lens, two corrective lenses, and/or one or more corrective lenses) are enrolled on the computer system (e.g., FIG. 15E) (e.g., multiple sets of corrective lenses having different vision prescriptions (e.g., including a first set of corrective lenses having a first vision prescription (in some embodiments, the first vision prescription includes a left vision prescription and a right vision prescription); and a second set of corrective lenses having a second vision prescription (in some embodiments, the second vision prescription includes a left vision prescription and a right vision prescription) different from the first vision prescription)); and displaying the corrective lens management user interface (e.g., 1516, 1518, 1520, 1530, 1538, 1538, 1538*b*, 1546, and/or 1552) includes displaying an indication of a first set of corrective lenses that has been selected from the plurality of sets of corrective lenses (e.g., in FIG. 15E, user interface 1516 indicates that Jay's Personal Accessory B has been selected from multiple enrolled corrective lenses) (e.g., a first set of corrective lenses that has been automatically selected; and/or a first set of corrective lenses that was last applied when corrective lenses are detected by the computer system). Displaying an indication that a first set of corrective lenses has been selected (e.g., the first set of corrective lenses has been applied and/or a calibration profile corresponding to the first set of corrective lenses has been applied) enhances the operability of the system and makes the user-system interface more efficient (e.g., by helping the user to provide proper inputs and reducing errors) which, additionally, reduces power usage and improves battery life of the device by enabling the user to use the system more quickly and efficiently.

In some embodiments, detecting the first event includes detecting (e.g., via one or more sensors of the computer system and/or one or more sensors that are in communication with the computer system) that one or more corrective lenses (e.g., 1510) have been attached to the computer system (e.g., FIGS. 15F-15G) (e.g., one or more corrective lenses that were not previously attached to the computer system have been attached to the computer system) (e.g., at a specified position on the computer system (e.g., lens mount 1508)) (e.g., one or more corrective lenses used to modify content visible via the one or more display generation components (e.g., 1502) while the one or more display generation components have a respective spatial relationship to one or more eyes of the user). In some embodiments, the determination that corrective lens criteria are met includes a determination that one or more corrective lenses have been attached to the computer system. In some embodiments, the determination that corrective lens criteria are not met includes a determination that one or more corrective lenses have not been attached to the computer system. Displaying the corrective lens management user interface when one or more corrective lenses are attached to the computer system enhances the operability of the system and makes the user-system interface more efficient (e.g., by helping the user to provide proper inputs and reducing errors) which, additionally, reduces power usage and improves battery life of the device by enabling the user to use the system more quickly and efficiently. Furthermore, doing so also provides the user with visual feedback about a state of the device (e.g., the device has detected that one or more corrective lenses have been attached to the computer system).

In some embodiments, detecting the first event includes detecting (e.g., via one or more sensors of the computer system and/or one or more sensors that are in communication with the computer system) that one or more corrective lenses (e.g., 1510) have been removed from (e.g., unattached from and/or unmounted from) the computer system (e.g., FIGS. 15E-15F) (e.g., one or more corrective lenses that were previously attached to the computer system have been removed from and/or unattached from the computer system) (e.g., one or more corrective lenses used to modify content visible via the one or more display generation components (e.g., 1502) while the one or more display generation components have a respective spatial relationship to one or more eyes of the user). In some embodiments, the determination that corrective lens criteria are met includes a determination that one or more corrective lenses have been removed from (e.g., unattached from and/or unmounted from) the computer system. In some embodiments, the determination that corrective lens criteria are not met includes a determination that one or more corrective lenses have not been removed from the computer system (e.g., remain mounted to and/or attached to the computer system). Displaying the corrective lens management user interface when one or more corrective lenses are removed from the computer system enhances the operability of the system and makes the user-system interface more efficient (e.g., by helping the user to provide proper inputs and reducing errors) which, additionally, reduces power usage and improves battery life of the device by enabling the user to use the system more quickly and efficiently. Furthermore, doing so also provides the user with visual feedback about a state of the device (e.g. the device has detected that one or more corrective lenses have been removed from the computer system).

In some embodiments, detecting the first event comprises detecting one or more user inputs corresponding to a user request to reset input enrollment for a first type of user input (e.g., user input 1519, selection of option 1532*a*, and/or selection of option 1558*a*) (e.g., gaze-based input enrollment and/or hand-based input enrollment) (e.g., a user request to re-enroll one or more eyes of the user; a user request to create a new gaze-based input calibration profile for the user; and/or a user request to create a new hand-based input calibration profile for the user). Displaying the corrective lens management user interface in response to a user request to reset input enrollment for a first type of user input enhances the operability of the system and makes the user-system interface more efficient (e.g., by helping the user to provide proper inputs and reducing errors) which, additionally, reduces power usage and improves battery life of the device by enabling the user to use the system more quickly and efficiently.

In some embodiments, the one or more user inputs corresponding to a user request to reset input enrollment for a first type of user input includes one or more hardware-based user inputs (e.g., in some embodiments, user input 1519 corresponds to a user request to initiate a process for resetting input enrollment for a first type of user input (e.g., reset gaze-based input enrollment)) (e.g., one or more presses of a physical button (e.g., one or more short presses (e.g., multiple presses (e.g., four presses)) and/or one or more long presses), one or more depressions of a depressible input mechanism (e.g., one or more short presses (e.g., multiple presses (e.g., four presses)) and/or one or more long presses), and/or one or more rotations of a physically-rotatable input mechanism). In some embodiments, a long press is a press that has a duration longer than a time threshold, while a short press is a press that has a duration less than the time threshold. Allowing a user to reset input enrollment with one or more hardware-based user inputs enhances the operability of the system and makes the user-system interface more efficient (e.g., by helping the user to provide proper inputs and reducing errors) which, additionally, reduces power usage and improves battery life of the device by enabling the user to use the system more quickly and efficiently.

In some embodiments, detecting the first event includes detecting that gaze enrollment of a user has failed (e.g., FIG. 15O) (e.g., detecting that eye gaze enrollment information collected from a user (e.g., one or more recordings of the eyes of the user while the user looks at one or more displayed objects) does not satisfy completion criteria, is faulty, is incomplete, and/or is inconsistent; and/or determining that a gaze enrollment profile and/or a gaze calibration profile corresponding to the user cannot be generated). In some embodiments, the determination that corrective lens criteria are met includes a determination that gaze enrollment of a user has failed. In some embodiments, the determination that corrective lens criteria are not met includes a determination that gaze enrollment of a user has succeeded. Displaying the corrective lens management user interface when gaze enrollment of a user fails enhances the operability of the system and makes the user-system interface more efficient (e.g., by helping the user to provide proper inputs and reducing errors) which, additionally, reduces power usage and improves battery life of the device by enabling the user to use the system more quickly and efficiently. Furthermore, doing so also provides the user with visual feedback about a state of the device (e.g., gaze enrollment has failed).

In some embodiments, displaying the corrective lens management user interface includes outputting (e.g., displaying via one or more display generation components or providing an audio output corresponding to) a first prompt (e.g., 1538, 1538*a*, and/or 1538*b*) (e.g., within the corrective lens management user interface and/or as part of the corrective lens management user interface) prompting a user to provide (e.g., scan) a computer-readable code (e.g., 1542) (e.g., a QR code and/or bar code) (e.g., a computer-readable code corresponding to a first set of corrective lenses and/or a computer-readable code that identifies a first set of corrective lenses). Displaying a prompt that prompts a user to provide a computer-readable code enhances the operability of the system and makes the user-system interface more efficient (e.g., by helping the user to provide proper inputs and reducing errors) which, additionally, reduces power usage and improves battery life of the device by enabling the user to use the system more quickly and efficiently.

In some embodiments, the computer system display, within the corrective lens management user interface (e.g., 1520 and/1546), a lens enrollment option (e.g., 1522*c* and/or 1548*a*). While displaying the lens enrollment option (e.g., 1522*c* and/or 1548*a*), the computer system receives, via the one or more input devices, a selection input (e.g., 1526 and/or 1528) (e.g., one or more touch inputs, one or more gesture inputs, one or more air gesture inputs, and/or one or more hardware inputs (e.g., one or more presses of a physical button (e.g., one or more short presses and/or one or more long presses), one or more depressions of a depressible input mechanism (e.g., one or more short presses and/or one or more long presses), and/or one or more rotations of a physically-rotatable input mechanism)) corresponding to selection of the lens enrollment option (e.g., 1522*c*). In response to receiving the selection input (e.g., 1526 and/or 1528) corresponding to selection of the lens enrollment option (e.g., 152*c*), the computer system initiates a process for enrolling a new set of corrective lenses (e.g., one or more corrective lenses) on the computer system (e.g., FIG. 15J). In some embodiments, initiating a process for enrolling the new set of corrective lenses includes prompting a user (e.g., displaying a prompt and/or outputting a prompt (e.g., an audio prompt) that instructs the user and/or prompts the user) to provide identification information corresponding to the new set of corrective lenses and/or that identifies the new set of corrective lenses (e.g., FIG. 15J). In some embodiments, initiating a process for enrolling the new set of corrective lenses includes prompting a user (e.g., displaying a prompt and/or outputting a prompt (e.g., an audio prompt) that instructs the user and/or prompts the user) to provide a computer-readable code that corresponds to the new set of corrective lenses and/or that identifies the new set of corrective lenses (e.g., FIG. 15J). Displaying a selectable object that is selectable to initiate a process for enrolling a new set of corrective lenses enhances the operability of the system and makes the user-system interface more efficient (e.g., by helping the user to provide proper inputs and reducing errors) which, additionally, reduces power usage and improves battery life of the device by enabling the user to use the system more quickly and efficiently. Ensuring that a computer system is using proper information for corrective lenses and/or vision prescriptions reduces visual discomfort, increases visual fidelity, and/or improves input accuracy (e.g., for gaze-based inputs), which reduces the likelihood of inaccurate inputs and, additionally, reduces power usage and improves battery life of the device (e.g., by reducing the energy that would be used to performed and undo erroneous inputs and/or by enabling the user to use the system more quickly and efficiently).

In some embodiments, the computer system (e.g., 1500) displays, within the corrective lens management user interface (e.g., 1520 and/or 1546), a first selectable option (e.g., 1522*d* and/or 1548*b*) (e.g., an option to use the computer system without corrective lenses and/or prescription lenses). While displaying the first selectable option (e.g., 1522*d*), the computer system receives, via the one or more input devices, a selection input (e.g., 1526 and/or 1528) (e.g., one or more touch inputs, one or more gesture inputs, one or more air gesture inputs, and/or one or more hardware inputs (e.g., one or more presses of a physical button (e.g., one or more short presses and/or one or more long presses), one or more depressions of a depressible input mechanism (e.g., one or more short presses and/or one or more long presses), and/or one or more rotations of a physically-rotatable input mechanism)) corresponding to selection of the first selectable option (e.g., 1522*d*). In response to receiving the selection input (e.g., 1526 and/or 1528) corresponding to selection of the first selectable option (e.g., 1522*d*), the computer system provides access to one or more features of the computer system (e.g., allowing the user to use the computer system) without corrective lenses (e.g., without one or more corrective lenses being installed and/or attached to the computer system; and/or without applying a calibration profile that corresponds to one or more corrective lenses). Displaying a selectable object that is selectable to allow a user to use the computer system without corrective lenses enhances the operability of the system and makes the user-system interface more efficient (e.g., by helping the user to provide proper inputs and reducing errors) which, additionally, reduces power usage and improves battery life of the device by enabling the user to use the system more quickly and efficiently.

In some embodiments, the computer system displays, within the corrective lens management user interface (e.g., 1520), a first option (e.g., 1522*a* and/or 1522*b*) that corresponds to a first previously-enrolled set of corrective lenses (e.g., a set of corrective lenses (e.g., one or more corrective lenses) that were previously enrolled on the computer system; a set of corrective lenses for which prescription information is stored on the computer system; and/or a set of corrective lenses for which a device calibration profile has previously been generated and/or is stored on the computer system). While displaying the first option (e.g., 1522*a* and/or 1522*b*), the computer system receives, via the one or more input devices (e.g., 1506*a*-1506*c*), a selection input (e.g., 1526 and/or 1528) (e.g., one or more touch inputs, one or more gesture inputs, one or more air gesture inputs, and/or one or more hardware inputs (e.g., one or more presses of a physical button (e.g., one or more short presses and/or one or more long presses), one or more depressions of a depressible input mechanism (e.g., one or more short presses and/or one or more long presses), and/or one or more rotations of a physically-rotatable input mechanism)) corresponding to selection of the first option (e.g., 1522*a* and/or 1522*b*). In response to receiving the selection input corresponding to selection of the first selectable option, the computer system applies a first device calibration profile (e.g., gaze calibration profile and/or gaze-based input calibration profile) corresponding to the first previously-enrolled set of corrective lenses (e.g., corresponding uniquely to the first previously-enrolled set of corrective lenses) (e.g., in FIG. 15I, electronic device 1500 applies a device calibration profile corresponding to Jay's Personal Accessory A in response to user inputs 1526 and/or 1528 selecting option 1522*a* in FIG. 15H). Displaying a selectable object that is selectable to apply a first device calibration profile corresponding to a previously-enrolled set of corrective lenses enhances the operability of the system and makes the user-system interface more efficient (e.g., by helping the user to provide proper inputs and reducing errors) which, additionally, reduces power usage and improves battery if-e of the device by enabling the user to use the system more quickly and efficiently.

In some embodiments, the computer system detects a third event (e.g., 1511 and/or 1514) (e.g., a third event that is the same as the first event or different from the first event) (e.g., a predetermined and/or pre-specified event, and/or an event that satisfies one or more criteria) (e.g., in some embodiments, detecting the third event includes detecting that the computer system has been placed on the body of a user and/or has been worn by a user (e.g., detecting that at least a portion of the computer system is placed on the head of the user and/or on the face of the user; and/or detecting at least a portion of the body of the user (e.g., one or more eyes, a face, a nose, and/or a mouth) (e.g., detecting at least a portion of the body of the user at a particular position relative to the computer system)); in some embodiments, detecting the third event includes detecting that the computer system is being set up and/or is running a set up process; in some embodiments, detecting the third event includes detecting a set of user inputs (e.g., one or more hardware inputs, one or more touch inputs, one or more gaze-based inputs, one or more gesture inputs, and/or one or more air-gesture inputs)). In response to detecting the third event (e.g., 1511 and/or 1514) while the one or more display generation components (e.g., 1502) have a respective spatial relationship to one or more eyes of the user (e.g., while a portion of the computer system that includes the one or more display generation components is worn on the body of a user of the computer system, such as a HMD being worn over a face of the user) (e.g., while at least a portion of the computer system is placed on the head of the user and/or on the face of the user; and/or while at least a portion of the body of the user (e.g., one or more eyes, a face, a nose, and/or a mouth) is detected by the computer system (e.g., is detected by the computer system at a particular position relative to the computer system)): in accordance with a determination that a first set of corrective lens criteria are met, wherein the first set of corrective lens criteria include one or more criteria pertaining to corrective lens information corresponding to one or more corrective lenses used to modify content visible via the one or more display generation components (e.g., 1502) while the one or more display generation components have a respective spatial relationship to one or more eyes of the user (e.g., one or more criteria pertaining to a visual prescription, an optical prescription, corrective lenses, corrective lenses, and/or prescription optical elements corresponding to a user), the computer system displays, via the one or more display generation components, a first corrective lens management user interface (e.g., 1520) that includes a first set of user interface elements (e.g., 1522*a*-1522*d*) associated with one or more corrective lenses for the computer system (e.g., displayed information about the presence of one or more corrective lenses, displayed information about the absence of one or more corrective lenses, displayed information about the identity of one or more corrective lenses, displayed information about a prescription of one or more corrective lenses, and/or controls for managing one or more corrective lenses such as adding, removing, or selecting between different corrective lenses) (e.g., a corrective lens management user interface that includes information pertaining to one or more vision prescriptions, prescription lenses, prescription optical lenses, corrective lenses, prescription optical elements, and/or optical accessories corresponding to a user); and in accordance with a determination that a second set of corrective lens criteria different from the first set of corrective lens criteria are met, wherein the second set of corrective lens criteria include one or more criteria pertaining to corrective lens information corresponding to one or more corrective lenses used to modify content visible via the one or more display generation components while the one or more display generation components have a respective spatial relationship to one or more eyes of the user (e.g., one or more criteria pertaining to a visual prescription, an optical prescription, corrective lenses, prescription lenses, and/or prescription optical elements corresponding to a user), the computer system displays, via the one or more display generation components, a second corrective lens management user interface (e.g., 1546) different from the first corrective lens management user interface (e.g., without displaying the first corrective lens management user interface) and that includes a second set of user interface elements (e.g., 1548*a*-1548*b*) associated with one or more corrective lenses for the computer system (e.g., displayed information about the presence of one or more corrective lenses, displayed information about the absence of one or more corrective lenses, displayed information about the identity of one or more corrective lenses, displayed information about a prescription of one or more corrective lenses, and/or controls for managing one or more corrective lenses such as adding, removing, or selecting between different corrective lenses) (e.g., a corrective lens management user interface that includes information pertaining to one or more vision prescriptions, prescription lenses, prescription optical lenses, corrective lenses, prescription optical elements, and/or optical accessories corresponding to a user) (e.g., in FIG. 15H and FIG. 15N, a different user interface is displayed (1520 or 1546) based on how many corrective lenses are enrolled on electronic device 1500 (e.g., one or more in FIG. 15H, and non in FIG. 15N). Displaying a first corrective lens management user interface when first corrective lens criteria are net, and displaying a second corrective lens management user interface when second corrective lens criteria are met, enhances the operability of the system and makes the user-system interface more efficient (e.g., by helping the user to provide proper inputs and reducing errors) which, additionally, reduces power usage and improves battery life of the device by enabling the user to use the system more quickly and efficiently.

In some embodiments, detecting the first event includes detecting that the computer system is running a setup process (e.g., FIGS. 9A-9L and/or 13A-13V) (e.g., a setup process that is run the first time the computer system is used; a setup process that is run the first time the computer system is used after being reset (e.g., reset to factory settings); a setup process that is run the first time the computer system is used after a device update and/or operating system update; a device setup process that includes enrollment of a user (e.g., a new user and/or a previously unenrolled user); and/or a device setup process that includes input enrollment of a user (e.g., gaze-based input enrollment of a user) (e.g., an input enrollment in which an input calibration profile is generated for a user)); the determination that corrective lens criteria are met includes a determination that one or more corrective lenses (e.g., 1510) are detected by the computer system (e.g., 1500) (e.g., one or more corrective lenses are attached to the computer system and/or are detected at a specified position on the computer system) (e.g., one or more corrective lenses used to modify content visible via the one or more display generation components while the one or more display generation components have a respective spatial relationship to one or more eyes of the user) and one or more sets of corrective lenses are enrolled on the computer system (e.g., one or more corrective lenses have been registered on the computer system; prescription information pertaining to one or more corrective lenses have been registered and/or stored on the computer system; and/or one or more device calibration profiles corresponding to one or more corrective lenses has been previously generated by the computer system, are stored on the computer system, and/or are accessible by the computer system); and displaying the corrective lens management user interface includes: displaying a first selectable option (e.g., 1522*a* and/or 1522*b*) that corresponds to a first set of corrective lenses of the one or more sets of corrective lenses that are enrolled on the computer system (e.g., a first selectable option that is selectable to apply a first device calibration profile corresponding to the first set of corrective lenses). In some embodiments, while displaying the first selectable option (e.g., 1522*a* and/or 1522*b*), the computer system receives, via the one or more input devices (e.g., 1506*a*-1506*c*), a selection input corresponding to selection of the first selectable option; and in response to receiving the selection input corresponding to selection of the first selectable option, the computer system applies a first device calibration profile (e.g., of a plurality of device calibration profiles) (e.g., a gaze input calibration profile and/or a gaze calibration profile) corresponding to the first set of corrective lenses (e.g., FIG. 15J). Displaying a first selectable option that corresponds to a first set of previously enrolled corrective lenses when the computer system detects one or more corrective lenses and one or more corrective lenses are previously enrolled on the computer system enhances the operability of the system and makes the user-system interface more efficient (e.g., by helping the user to provide proper inputs and reducing errors) which, additionally, reduces power usage and improves battery life of the device by enabling the user to use the system more quickly and efficiently.

In some embodiments, detecting the first event includes detecting that the computer system is running a setup process (e.g., FIGS. 9A-9L and/or 13A-13V) (e.g., a setup process that is run the first time the computer system is used; a setup process that is run the first time the computer system is used after being reset (e.g., reset to factory settings); a setup process that is run the first time the computer system is used after a device update and/or operating system update; a device setup process that includes enrollment of a user (e.g., a new user and/or a previously unenrolled user); and/or a device setup process that includes input enrollment of a user (e.g., gaze-based input enrollment of a user) (e.g., an input enrollment in which an input calibration profile is generated for a user)); the determination that corrective lens criteria are met includes a determination that one or more corrective lenses (e.g., 1510) are detected by the computer system (e.g., 1500) (e.g., one or more corrective lenses are attached to the computer system and/or are detected at a specified position on the computer system) (e.g., one or more corrective lenses used to modify content visible via the one or more display generation components while the one or more display generation components have a respective spatial relationship to one or more eyes of the user) and there are no corrective lenses enrolled on the computer system (e.g., FIG. 15N) (e.g., no corrective lenses have previously been enrolled on the computer system; the computer system does not store and/or have access to prescription information corresponding to any corrective lenses; and/or the computer system does not store and/or have access to any device calibration profiles corresponding to corrective lenses); and displaying the corrective lens management user interface includes displaying a prompt (e.g., 1548*a* and/or 1538) (e.g., within the corrective lens management user interface and/or as part of the corrective lens management user interface) prompting the user to provide (e.g., scan) a computer-readable code (e.g., 1542) (e.g., a QR code and/or bar code) (e.g., a computer-readable code corresponding to a first set of corrective lenses and/or a computer-readable code that identifies a first set of corrective lenses). In some embodiments, in response to a determination that corrective lenses are attached but no corrective lenses are enrolled, electronic device 1500 displays user interface 1538. In some embodiments, while displaying and/or subsequent to displaying the prompt (e.g., 1548*a* and/or 1538) prompting the user to provide a computer-readable code, the computer system receives, via the one or more input devices, a first computer-readable code (e.g., 1542) corresponding to a first set of corrective lenses (e.g., a first set of corrective lenses having a first vision prescription and/or one or more vision prescriptions (e.g., a left prescription and a right prescription that are optionally different prescriptions or the same prescription); and in response to receiving the first computer-readable code, the computer system enrolls the first set of corrective lenses (e.g., FIG. 15M) (e.g., stores vision prescription information corresponding to the first set of corrective lenses, stores information associating the first set of corrective lenses with a user of the computer system, and/or generates a device calibration profile corresponding to the first set of corrective lenses). Displaying a prompt that prompts a user to provide a computer-readable code when the computer system detects one or more corrective lenses and no corrective lenses are enrolled on the computer system enhances the operability of the system and makes the user-system interface more efficient (e.g., by helping the user to provide proper inputs and reducing errors) which, additionally, reduces power usage and improves battery life of the device by enabling the user to use the system more quickly and efficiently.

In some embodiments, detecting the first event includes detecting that the computer system is running a setup process (e.g., FIGS. 9A-9L and/or 13A-13V) (e.g., a setup process that is run the first time the computer system is used; a setup process that is run the first time the computer system is used after being reset (e.g., reset to factory settings); a setup process that is run the first time the computer system is used after a device update and/or operating system update; a device setup process that includes enrollment of a user (e.g., a new user and/or a previously unenrolled user); and/or a device setup process that includes input enrollment of a user (e.g., gaze-based input enrollment of a user) (e.g., an input enrollment in which an input calibration profile is generated for a user)); the determination that corrective lens criteria are met includes a determination that one or more corrective lenses (e.g., 1510) are not detected by the computer system (e.g., FIGS. 15A-15B) (e.g., one or more corrective lenses are not attached to the computer system and/or are not detected at a specified position on the computer system) and gaze enrollment of a user has failed (e.g., FIG. 15O) (e.g., detecting that eye gaze enrollment information collected from a user (e.g., one or more recordings of the eyes of the user while the user looks at one or more displayed objects) does not satisfy completion criteria, is faulty, is incomplete, and/or is inconsistent; and/or determining that a gaze enrollment profile and/or a gaze calibration profile corresponding to the user cannot be generated); and displaying the corrective lens management user interface includes: displaying an enrolled lens option (e.g., 1522*a* and/or 1522*b*) that corresponds to a first set of corrective lenses of one or more sets of corrective lenses that are enrolled on the computer system (e.g., an enrolled lens option that is selectable to apply a first device calibration profile corresponding to the first set of corrective lenses). In some embodiments, while displaying the enrolled lens option (e.g., 1522*a* and/or 155*b*), the computer system receives, via the one or more input devices, a selection input corresponding to selection of the enrolled lens option; and in response to receiving the selection input corresponding to selection of the enrolled lens option, the computer system applies a first device calibration profile (e.g., of a plurality of device calibration profiles) (e.g., a gaze input calibration profile and/or a gaze calibration profile) corresponding to the first set of corrective lenses (e.g., FIG. 15I). Displaying an enrolled lens option that corresponds to a first set of previously enrolled corrective lenses when gaze enrollment of a user fails enhances the operability of the system and makes the user-system interface more efficient (e.g., by helping the user to provide proper inputs and reducing errors) which, additionally, reduces power usage and improves battery life of the device by enabling the user to use the system more quickly and efficiently.

In some embodiments, detecting the first event includes detecting that the computer system (e.g., 1500) has been placed on the body of a user (e.g., detecting that the computer system has been worn by a user; detecting that at least a portion of the computer system is placed on the head of the user and/or on the face of the user; and/or detecting at least a portion of the body of the user (e.g., one or more eyes, a face, a nose, and/or a mouth) (e.g., detecting at least a portion of the body of the user at a particular position relative to the computer system); the determination that corrective lens criteria are met includes a determination that one or more corrective lenses (e.g., 1510) are detected by the computer system (e.g., one or more corrective lenses are attached to the computer system and/or are detected at a specified position on the computer system (e.g., 1508)) (e.g., one or more corrective lenses used to modify content visible via the one or more display generation components while the one or more display generation components have a respective spatial relationship to one or more eyes of the user) (e.g., one or more corrective lenses that were not detected by the computer system the last time the computer system was used and/or worn by a user) and there are no corrective lenses enrolled on the computer system (e.g., no corrective lenses have previously been enrolled on the computer system; the computer system does not store and/or have access to prescription information corresponding to any corrective lenses; and/or the computer system does not store and/or have access to any device calibration profiles corresponding to corrective lenses); and displaying the corrective lens management user interface includes displaying a prompt (e.g., 1548*a* and/or 1538) (e.g., within the corrective lens management user interface and/or as part of the corrective lens management user interface) prompting the user to provide (e.g., scan) a computer-readable code (e.g., a QR code and/or bar code) (e.g., a computer-readable code corresponding to a first set of corrective lenses and/or a computer-readable code that identifies a first set of corrective lenses). In some embodiments, when electronic device 1500 is worn by a user, and corrective lenses are detected (e.g., are attached), but no corrective lenses are enrolled on electronic device 1500, electronic device 1500 displays user interface 1538 and/or user interface 1546. In some embodiments, while displaying and/or subsequent to displaying the prompt (e.g., 1548*a* and/or 1538) prompting the user to provide a computer-readable code, the computer system receives, via the one or more input devices, a first computer-readable code (e.g., 1542) corresponding to a first set of corrective lenses (e.g., a first set of corrective lenses having a first vision prescription and/or one or more vision prescriptions (e.g., a left prescription and a right prescription); and in response to receiving the first computer-readable code, the computer system enrolls the first set of corrective lenses (e.g., FIG. 15M) (e.g., stores vision prescription information corresponding to the first set of corrective lenses, stores information associating the first set of corrective lenses with a user of the computer system, and/or generates a device calibration profile corresponding to the first set of corrective lenses). Displaying a prompt that prompts a user to provide a computer-readable code when the computer system detects one or more corrective lenses and no corrective lenses are enrolled on the computer system enhances the operability of the system and makes the user-system interface more efficient (e.g., by helping the user to provide proper inputs and reducing errors) which, additionally, reduces power usage and improves battery life of the device by enabling the user to use the system more quickly and efficiently.

In some embodiments, detecting the first event includes detecting that the computer system (e.g., 1500) has been placed on the body of a user (e.g., detecting that the computer system has been worn by a user; detecting that at least a portion of the computer system is placed on the head of the user and/or on the face of the user; and/or detecting at least a portion of the body of the user (e.g., one or more eyes, a face, a nose, and/or a mouth) (e.g., detecting at least a portion of the body of the user at a particular position relative to the computer system); the determination that corrective lens criteria are met includes a determination that one or more corrective lenses (e.g., 1510) that were not detected by the computer system the last time the computer system was used by a user (e.g., the last time the computer system was worn by a user) are detected by the computer system (e.g., one or more corrective lenses are attached to the computer system and/or are detected at a specified position on the computer system) (e.g., one or more corrective lenses used to modify content visible via the one or more display generation components while the one or more display generation components have a respective spatial relationship to one or more eyes of the user) and a single set of corrective lenses are enrolled on the computer system (e.g., only one set of corrective lenses are enrolled on the computer system, and/or more than one set of corrective lenses is not enrolled on the computer system) (e.g., are registered on the computer system and/or saved on the computer system). In some embodiments, in response to detecting the first event while the one or more display generation components (e.g., 1502) have a respective spatial relationship to one or more eyes of the user: in accordance with a determination that the corrective lens criteria are met, the computer system applies a first device calibration profile (e.g., of a plurality of device calibration profiles) (e.g., a gaze input calibration profile and/or a gaze calibration profile) corresponding to the single set of corrective lenses enrolled on the computer system (e.g., FIG. 15E). In some embodiments, displaying the corrective lens management user interface includes displaying first information (e.g., 1516) corresponding to the single set of corrective lenses enrolled on the computer system (e.g., displaying information corresponding to and/or identifying the single set of corrective lenses enrolled on the computer system; and/or displaying an indication that the first device calibration profile corresponding to the single set of corrective lenses enrolled on the computer system has been applied). In some embodiments, in accordance with a determination that the corrective lens criteria are not met, the computer system applies a second device calibration profile different from the first device calibration profile (e.g., a second device calibration profile that does not correspond to the single set of corrective lenses enrolled on the computer system). In some embodiments, the determination that the corrective lens criteria are not met includes a determination that one or more corrective lenses (e.g., 1510) that were detected by the computer system the last time the computer system was used by a user are detected by the computer system (e.g., the first information is not displayed when the corrective lens configuration of the device does not change (e.g., corrective lenses were detected the last time the device was used by a user, and corrective lenses are once again detected in the current use of the computer system by a user)). Displaying first information corresponding to a single set of corrective lenses enrolled on the computer system when the computer system detects one or more corrective lenses that were not previously detected by the computer system the last time the computer system was used by a user enhances the operability of the system and makes the user-system interface more efficient (e.g., by helping the user to provide proper inputs and reducing errors) which, additionally, reduces power usage and improves battery life of the device by enabling the user to use the system more quickly and efficiently.

In some embodiments, detecting the first event includes detecting that the computer system (e.g., 1500) has been placed on the body of a user (e.g., detecting that the computer system has been worn by a user; detecting that at least a portion of the computer system is placed on the head of the user and/or on the face of the user; and/or detecting at least a portion of the body of the user (e.g., one or more eyes, a face, a nose, and/or a mouth) (e.g., detecting at least a portion of the body of the user at a particular position relative to the computer system); the determination that corrective lens criteria are met includes a determination that one or more corrective lenses (e.g., 1510) that were not detected by the computer system the last time the computer system was used by a user (e.g., the last time the computer system was worn by a user) are detected by the computer system (e.g., one or more corrective lenses are attached to the computer system and/or are detected at a specified position on the computer system) (e.g., one or more corrective lenses used to modify content visible via the one or more display generation components while the one or more display generation components have a respective spatial relationship to one or more eyes of the user) and a plurality of sets of corrective lenses (e.g., in some embodiments, a set of corrective lenses includes one corrective lens, two corrective lenses, and/or one or more corrective lenses) are enrolled on the computer system (e.g., multiple sets of corrective lenses having different vision prescriptions (e.g., including a first set of corrective lenses having a first vision prescription (in some embodiments, the first vision prescription includes a left vision prescription and a right vision prescription); and a second set of corrective lenses having a second vision prescription (in some embodiments, the second vision prescription includes a left vision prescription and a right vision prescription) different from the first vision prescription)). In some embodiments, in response to detecting the first event while the one or more display generation components (e.g., 1502) have a respective spatial relationship to one or more eyes of the user: in accordance with a determination that the corrective lens criteria are met, the computer system applies a first respective device calibration profile (e.g., of a plurality of device calibration profiles) (e.g., a gaze input calibration profile and/or a gaze calibration profile) that was applied in a most recent instance in which the computer system was used with corrective lenses (e.g., FIG. 15E) (e.g., a most recent instance in which the computer system detected corrective lenses and/or a most recent instance in which a device calibration profile corresponding to a set of corrective lenses was applied to the computer system), wherein the first respective device calibration profile corresponds to a first respective set of corrective lenses of the plurality of sets of corrective lenses enrolled on the computer system. In some embodiments, displaying the corrective lens management user interface includes displaying second information (e.g., 1516) corresponding to the first respective set of corrective lenses (e.g., displaying information corresponding to and/or identifying the first respective set of corrective lenses; and/or displaying an indication that the first respective device calibration profile corresponding to the first respective set of corrective lenses has been applied). In some embodiments, in accordance with a determination that the corrective lens criteria are not met, the computer system applies a second device calibration profile different from the first device calibration profile (e.g., a second device calibration profile that does not correspond to the first respective set of corrective lenses). Displaying second information corresponding to a first respective set of corrective lenses enrolled on the computer system when the computer system detects one or more corrective lenses that were not previously detected by the computer system the last time the computer system was used by a user enhances the operability of the system and makes the user-system interface more efficient (e.g., by helping the user to provide proper inputs and reducing errors) which, additionally, reduces power usage and improves battery life of the device by enabling the user to use the system more quickly and efficiently.

In some embodiments, aspects/operations of methods 800, 1000, 1050, 1200, 1400, and/or 1600 may be interchanged, substituted, and/or added between these methods. For example, the personalized accessories recited in methods 1000 and 1050 are the corrective lenses recited in method 1600. For brevity, these details are not repeated here.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best use the invention and various described embodiments with various modifications as are suited to the particular use contemplated.

As described above, one aspect of the present technology is the gathering and use of data available from various sources to improve XR experiences of users. The present disclosure contemplates that in some instances, this gathered data may include personal information data that uniquely identifies or can be used to contact or locate a specific person. Such personal information data can include demographic data, location-based data, telephone numbers, email addresses, twitter IDs, home addresses, data or records relating to a user's health or level of fitness (e.g., vital signs measurements, medication information, exercise information), date of birth, or any other identifying or personal information.

The present disclosure recognizes that the use of such personal information data, in the present technology, can be used to the benefit of users. For example, the personal information data can be used to improve an XR experience of a user. Further, other uses for personal information data that benefit the user are also contemplated by the present disclosure. For instance, health and fitness data may be used to provide insights into a user's general wellness, or may be used as positive feedback to individuals using technology to pursue wellness goals.

The present disclosure contemplates that the entities responsible for the collection, analysis, disclosure, transfer, storage, or other use of such personal information data will comply with well-established privacy policies and/or privacy practices. In particular, such entities should implement and consistently use privacy policies and practices that are generally recognized as meeting or exceeding industry or governmental requirements for maintaining personal information data private and secure. Such policies should be easily accessible by users, and should be updated as the collection and/or use of data changes. Personal information from users should be collected for legitimate and reasonable uses of the entity and not shared or sold outside of those legitimate uses. Further, such collection/sharing should occur after receiving the informed consent of the users. Additionally, such entities should consider taking any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices. In addition, policies and practices should be adapted for the particular types of personal information data being collected and/or accessed and adapted to applicable laws and standards, including jurisdiction-specific considerations. For instance, in the US, collection of or access to certain health data may be governed by federal and/or state laws, such as the Health Insurance Portability and Accountability Act (HIPAA); whereas health data in other countries may be subject to other regulations and policies and should be handled accordingly. Hence different privacy practices should be maintained for different personal data types in each country.

Despite the foregoing, the present disclosure also contemplates embodiments in which users selectively block the use of, or access to, personal information data. That is, the present disclosure contemplates that hardware and/or software elements can be provided to prevent or block access to such personal information data. For example, in the case of XR experiences, the present technology can be configured to allow users to select to "opt in" or "opt out" of participation in the collection of personal information data during registration for services or anytime thereafter. In another example, users can select not to provide data for customization of services. In yet another example, users can select to limit the length of time data is maintained or entirely prohibit the development of a customized service. In addition to providing "opt in" and "opt out" options, the present disclosure contemplates providing notifications relating to the access or use of personal information. For instance, a user may be notified upon downloading an app that their personal information data will be accessed and then reminded again just before personal information data is accessed by the app.

Moreover, it is the intent of the present disclosure that personal information data should be managed and handled in a way to minimize risks of unintentional or unauthorized access or use. Risk can be minimized by limiting the collection of data and deleting data once it is no longer needed. In addition, and when applicable, including in certain health related applications, data de-identification can be used to protect a user's privacy. De-identification may be facilitated, when appropriate, by removing specific identifiers (e.g., date of birth, etc.), controlling the amount or specificity of data stored (e.g., collecting location data a city level rather than at an address level), controlling how data is stored (e.g., aggregating data across users), and/or other methods.

Therefore, although the present disclosure broadly covers use of personal information data to implement one or more various disclosed embodiments, the present disclosure also contemplates that the various embodiments can also be implemented without the need for accessing such personal information data. That is, the various embodiments of the present technology are not rendered inoperable due to the lack of all or a portion of such personal information data. For example, an XR experience can generated by inferring preferences based on non-personal information data or a bare minimum amount of personal information, such as the content being requested by the device associated with a user, other non-personal information available to the service, or publicly available information.

What is claimed is:

1. A computer system configured to communicate with one or more display generation components and one or more input devices, the computer system comprising:

one or more processors; and memory storing one or more programs configured to be executed by the one or more processors, the one or more programs including instructions for:

detecting, via the one or more input devices, a request to authenticate a user;

in response to detecting the request to authenticate the user:

displaying, via the one or more display generation components, in a three-dimensional environment, a first authentication user interface that includes a first user interface object, wherein:

the first user interface object is a viewpoint-locked object that stays in a respective region of a field of view of the user as the viewpoint of the user shifts relative to the three-dimensional environment; and the first user interface object is part of a user interface for biometric authentication; and subsequent to displaying the first authentication user interface in the three-dimensional environment, performing a first authentication of the user; and in response to performing the first authentication of the user:

in accordance with a determination that the first authentication of the user fails to authenticate the user, displaying, via the one or more display generation components, a second authentication user interface different from the first authentication user interface, wherein the second authentication user interface includes a second user interface object that is an environment-locked object that moves out of the respective region of the field of view of the user as the viewpoint of the user shifts relative to the three-dimensional environment.

2. The computer system of claim 1, the one or more programs further including instructions for:

in response to performing the first authentication of the user:

in accordance with the determination that the first authentication of the user fails to authenticate the user:

ceasing display of the first user interface object.

3. The computer system of claim 1, the one or more programs further including instructions for:

while displaying the second authentication user interface, detecting, via the one or more input devices, a first user input that corresponds to selection of a first displayed element in the second authentication user interface; and in response to detecting the first user input that corresponds to selection of the first displayed element in the second authentication user interface, receiving first user authentication information corresponding to the first displayed element.

4. The computer system of claim 1, wherein the second user interface object is displayed at a first position within the three-dimensional environment, and wherein the first position is determined based on a field of view of the user of the computer system at the time the first authentication was performed.

5. The computer system of claim 4, wherein:

the first user interface object occupies a respective position within the three-dimensional environment when the first authentication of the user is performed; and the second user interface object is displayed at the respective position within the three-dimensional environment.

6. The computer system of claim 1, the one or more programs further including instructions for:

in response to performing the first authentication of the user:

in accordance with a determination that the first authentication of the user succeeds in authenticating the user, displaying, via the one or more display generation components, a success user interface indicative of successful user authentication, wherein the success user interface is different from the first authentication user interface and the second authentication user interface.

7. The computer system of claim 1, the one or more programs further including instructions for:

in response to performing the first authentication of the user, displaying, via the one or more display generation components, a visual animation that includes one or more visual changes to the first user interface object.

8. The computer system of claim 7, wherein displaying the visual animation includes:

in accordance with a determination that the first authentication of the user fails to authenticate the user, displaying, via the one or more display generation components, a first animation; and in accordance with a determination that the first authentication of the user succeeds in authenticating the user, displaying, via the one or more display generation components, a second animation different from the first animation.

9. The computer system of claim 1, the one or more programs further including instructions for:

prior to performing the first authentication of the user, and while displaying the first user interface object, displaying, via the one or more display generation components, the three-dimensional environment with a first set of visual characteristics; and subsequent to performing the first authentication of the user, displaying, via the one or more display generation components, the three-dimensional environment with a second set of visual characteristics different from the first set of visual characteristics, wherein when the three-dimensional environment is displayed with the first set of visual characteristics, the three-dimensional environment is visually de-emphasized relative to when the three-dimensional environment is displayed with the second set of visual characteristics.

10. The computer system of claim 1, the one or more programs further including instructions for:

while displaying the first authentication user interface, including displaying the first user interface object:

in accordance with a determination that one or more pupils of a user to be authenticated are dilated by a first amount, causing the one or more display generation components to output a first amount of light; and in accordance with a determination that the one or more pupils of the user of the computer system are dilated by a second amount different from the first amount, causing the one or more display generation components to output a second amount of light.

11. The computer system of claim 10, wherein:

causing the one or more display generation components to output the first amount of light includes displaying, via the one or more display generation components, a first element of the first authentication user interface at a first brightness; and causing the one or more display generation components to output the second amount of light includes displaying, via the one or more display generation components, the first element of the first authentication user interface at a second brightness that is different from the first brightness.

12. The computer system of claim 10, wherein:

causing the one or more display generation components to output the first amount of light includes displaying, via the one or more display generation components, the three-dimensional environment at a third brightness; and causing the one or more display generation components to output the second amount of light includes displaying, via the one or more display generation components, the three-dimensional environment at a fourth brightness that is different from the third brightness.

13. The computer system of claim 1, wherein the first user interface object is a viewpoint-locked object that exhibits lazy follow behavior.

14. The computer system of claim 1, the one or more programs further including instructions for:

while displaying the second authentication user interface at a first position within the three-dimensional environment, detecting, via the one or more input devices, movement by the user; and in response to detecting the movement by the user:

in accordance with a determination that the movement by the user satisfies movement threshold criteria, re-positioning the second authentication user interface to a second position within the three-dimensional environment different from the first position to center the second authentication user interface within the field of view of the user.

15. The computer system of claim 1, the one or more programs further including instructions for:

while displaying the second authentication user interface, receiving user authentication information based on one or more user inputs, including:

detecting, via the one or more input devices, a user gaze corresponding to a first displayed element in the second authentication user interface;

while continuing to detect the user gaze corresponding to the first displayed element in the second authentication user interface, detecting, via the one or more input devices, a first pinch air gesture; and in response to detecting the first pinch air gesture while continuing to detect the user gaze corresponding to the first displayed element in the second authentication user interface, receiving first user authentication information corresponding to the first displayed element.

16. The computer system of claim 1, the one or more programs further including instructions for:
- while displaying the second authentication user interface, receiving user authentication information based on one or more user inputs, including:
  - detecting, via the one or more input devices, a first air gesture that corresponds to selection of a first displayed element in the second authentication user interface; and
  - in response to detecting the first air gesture corresponding to selection of the first displayed element in the second authentication user interface, receiving first user authentication information corresponding to the first displayed element.

17. The computer system of claim 1, the one or more programs further including instructions for:
- while displaying the second authentication user interface:
  - detecting, via the one or more input devices, a user gaze corresponding to a first displayed element in the second authentication user interface; and
  - in response to detecting the user gaze corresponding to the first displayed element:
    - in accordance with a determination that the user has gazed at the first displayed element for a threshold duration of time, entering first user authentication information corresponding to the first displayed element; and
    - in accordance with a determination that the user has not gazed at the first displayed element for the threshold duration of time, forgoing entering the first user authentication information corresponding to the first displayed element.

18. The computer system of claim 1, the one or more programs further including instructions for:
- while displaying the second authentication user interface, detecting, via the one or more input devices, a user input corresponding to selection of a first object in the second authentication user interface; and
- in response to detecting the user input corresponding to selection of the first object in the second authentication user interface, performing biometric authentication of the user.

19. The computer system of claim 18, wherein the second user interface object includes a visual element that corresponds to the first user interface object.

20. The computer system of claim 1, the one or more programs further including instructions for:
- while displaying the second authentication user interface, detecting, via the one or more input devices, a user input corresponding to selection of a second object in the second authentication user interface; and
- in response to detecting the user input corresponding to selection of the second object in the second authentication user interface, transitioning the computer system from a locked state to a guest mode state in which a first set of features are made accessible to the user without successful user authentication.

21. The computer system of claim 1, the one or more programs further including instructions for:
- subsequent to displaying the first authentication user interface in the three-dimensional environment, performing a second authentication of the user; and
- in response to performing the second authentication of the user:
  - in accordance with the determination that the second authentication of the user fails to authenticate the user, displaying, via the one or more display generation components, visual guidance instructing the user to change an eye gaze position of the user.

22. The computer system of claim 1, the one or more programs further including instructions for:
- subsequent to displaying the first authentication user interface in the three-dimensional environment, performing a second authentication of the user; and
- in response to performing the second authentication of the user:
  - in accordance with the determination that the second authentication of the user fails to authenticate the user, displaying, via the one or more display generation components, visual guidance instructing the user to change a physical position of the computer system relative to the body of the user; and
  - in accordance with a determination that the second authentication of the user succeeds in authenticating the user, displaying, via the one or more display generation components, a success user interface indicative of successful authentication of the user.

23. The computer system of claim 1, the one or more programs further including instructions for:
- in response to performing the first authentication of the user:
  - in accordance with a determination that the first authentication of the user succeeds in authenticating the user, and in accordance with a determination that the request to authenticate the user corresponds to a request to unlock the computer system:
    - unlocking the computer system; and
  - in accordance with a determination that the first authentication of the user succeeds in authenticating the user, and in accordance with a determination that the request to authenticate a user corresponds to a request to authorize a secure operation:
    - authorizing the secure operation.

24. A non-transitory computer-readable storage medium storing one or more programs configured to be executed by one or more processors of a computer system that is in communication with one or more display generation components and one or more input devices, the one or more programs including instructions for:
- detecting, via the one or more input devices, a request to authenticate a user;
- in response to detecting the request to authenticate the user:
  - displaying, via the one or more display generation components, in a three-dimensional environment, a first authentication user interface that includes a first user interface object, wherein:
    - the first user interface object is a viewpoint-locked object that stays in a respective region of a field of view of the user as the viewpoint of the user shifts relative to the three-dimensional environment; and
    - the first user interface object is part of a user interface for biometric authentication; and
- subsequent to displaying the first authentication user interface in the three-dimensional environment, performing a first authentication of the user; and in response to performing the first authentication of the user:

in accordance with a determination that the first authentication of the user fails to authenticate the user, displaying, via the one or more display generation components, a second authentication user interface different from the first authentication user interface, wherein the second authentication user interface includes a second user interface object that is an environment-locked object that moves out of the respective region of the field of view of the user as the viewpoint of the user shifts relative to the three-dimensional environment.

25. A method, comprising:

at a computer system that is in communication with one or more display generation components and one or more input devices:

detecting, via the one or more input devices, a request to authenticate a user;

in response to detecting the request to authenticate the user:

displaying, via the one or more display generation components, in a three-dimensional environment, a first authentication user interface that includes a first user interface object, wherein:

the first user interface object is a viewpoint-locked object that stays in a respective region of a field of view of the user as the viewpoint of the user shifts relative to the three-dimensional environment; and the first user interface object is part of a user interface for biometric authentication; and subsequent to displaying the first authentication user interface in the three-dimensional environment, performing a first authentication of the user; and in response to performing the first authentication of the user:

in accordance with a determination that the first authentication of the user fails to authenticate the user, displaying, via the one or more display generation components, a second authentication user interface different from the first authentication user interface, wherein the second authentication user interface includes a second user interface object that is an environment-locked object that moves out of the respective region of the field of view of the user as the viewpoint of the user shifts relative to the three-dimensional environment.

26. The non-transitory computer-readable storage medium of claim 24, the one or more programs further including instructions for:

in response to performing the first authentication of the user:

in accordance with the determination that the first authentication of the user fails to authenticate the user:

ceasing display of the first user interface object.

27. The non-transitory computer-readable storage medium of claim 24, the one or more programs further including instructions for:

while displaying the second authentication user interface, detecting, via the one or more input devices, a first user input that corresponds to selection of a first displayed element in the second authentication user interface; and in response to detecting the first user input that corresponds to selection of the first displayed element in the second authentication user interface, receiving first user authentication information corresponding to the first displayed element.

28. The non-transitory computer-readable storage medium of claim 24, wherein the second user interface object is displayed at a first position within the three-dimensional environment, and wherein the first position is determined based on a field of view of the user of the computer system at the time the first authentication was performed.

29. The non-transitory computer-readable storage medium of claim 24, the one or more programs further including instructions for:

in response to performing the first authentication of the user:

in accordance with a determination that the first authentication of the user succeeds in authenticating the user, displaying, via the one or more display generation components, a success user interface indicative of successful user authentication, wherein the success user interface is different from the first authentication user interface and the second authentication user interface.

30. The non-transitory computer-readable storage medium of claim 24, the one or more programs further including instructions for:

in response to performing the first authentication of the user, displaying, via the one or more display generation components, a visual animation that includes one or more visual changes to the first user interface object.

31. The non-transitory computer-readable storage medium of claim 24, the one or more programs further including instructions for:

prior to performing the first authentication of the user, and while displaying the first user interface object, displaying, via the one or more display generation components, the three-dimensional environment with a first set of visual characteristics; and subsequent to performing the first authentication of the user, displaying, via the one or more display generation components, the three-dimensional environment with a second set of visual characteristics different from the first set of visual characteristics, wherein when the three-dimensional environment is displayed with the first set of visual characteristics, the three-dimensional environment is visually de-emphasized relative to when the three-dimensional environment is displayed with the second set of visual characteristics.

32. The non-transitory computer-readable storage medium of claim 24, the one or more programs further including instructions for:

while displaying the first authentication user interface, including displaying the first user interface object:

in accordance with a determination that one or more pupils of a user to be authenticated are dilated by a first amount, causing the one or more display generation components to output a first amount of light; and in accordance with a determination that the one or more pupils of the user of the computer system are dilated by a second amount different from the first amount, causing the one or more display generation components to output a second amount of light.

33. The non-transitory computer-readable storage medium of claim 24, wherein the first user interface object is a viewpoint-locked object that exhibits lazy follow behavior.

34. The non-transitory computer-readable storage medium of claim 24, the one or more programs further including instructions for:

while displaying the second authentication user interface at a first position within the three-dimensional environment, detecting, via the one or more input devices, movement by the user; and in response to detecting the movement by the user:

in accordance with a determination that the movement by the user satisfies movement threshold criteria, re-positioning the second authentication user interface to a second position within the three-dimensional environment different from the first position to center the second authentication user interface within the field of view of the user.

35. The non-transitory computer-readable storage medium of claim 24, the one or more programs further including instructions for:

while displaying the second authentication user interface, receiving user authentication information based on one or more user inputs, including:

detecting, via the one or more input devices, a user gaze corresponding to a first displayed element in the second authentication user interface;

while continuing to detect the user gaze corresponding to the first displayed element in the second authentication user interface, detecting, via the one or more input devices, a first pinch air gesture; and in response to detecting the first pinch air gesture while continuing to detect the user gaze corresponding to the first displayed element in the second authentication user interface, receiving first user authentication information corresponding to the first displayed element.

36. The non-transitory computer-readable storage medium of claim 24, the one or more programs further including instructions for:

while displaying the second authentication user interface, receiving user authentication information based on one or more user inputs, including:

detecting, via the one or more input devices, a first air gesture that corresponds to selection of a first displayed element in the second authentication user interface; and in response to detecting the first air gesture corresponding to selection of the first displayed element in the second authentication user interface, receiving first user authentication information corresponding to the first displayed element.

37. The non-transitory computer-readable storage medium of claim 24, the one or more programs further including instructions for:

while displaying the second authentication user interface:

detecting, via the one or more input devices, a user gaze corresponding to a first displayed element in the second authentication user interface; and in response to detecting the user gaze corresponding to the first displayed element:

in accordance with a determination that the user has gazed at the first displayed element for a threshold duration of time, entering first user authentication information corresponding to the first displayed element; and in accordance with a determination that the user has not gazed at the first displayed element for the threshold duration of time, forgoing entering the first user authentication information corresponding to the first displayed element.

38. The non-transitory computer-readable storage medium of claim 24, the one or more programs further including instructions for:

while displaying the second authentication user interface, detecting, via the one or more input devices, a user input corresponding to selection of a first object in the second authentication user interface; and in response to detecting the user input corresponding to selection of the first object in the second authentication user interface, performing biometric authentication of the user.

39. The non-transitory computer-readable storage medium of claim 24, the one or more programs further including instructions for:

while displaying the second authentication user interface, detecting, via the one or more input devices, a user input corresponding to selection of a second object in the second authentication user interface; and in response to detecting the user input corresponding to selection of the second object in the second authentication user interface, transitioning the computer system from a locked state to a guest mode state in which a first set of features are made accessible to the user without successful user authentication.

40. The non-transitory computer-readable storage medium of claim 24, the one or more programs further including instructions for:

subsequent to displaying the first authentication user interface in the three-dimensional environment, performing a second authentication of the user; and in response to performing the second authentication of the user:

in accordance with the determination that the second authentication of the user fails to authenticate the user, displaying, via the one or more display generation components, visual guidance instructing the user to change an eye gaze position of the user.

41. The non-transitory computer-readable storage medium of claim 24, the one or more programs further including instructions for:

subsequent to displaying the first authentication user interface in the three-dimensional environment, performing a second authentication of the user; and in response to performing the second authentication of the user:

in accordance with the determination that the second authentication of the user fails to authenticate the user, displaying, via the one or more display generation components, visual guidance instructing the user to change a physical position of the computer system relative to the body of the user; and in accordance with a determination that the second authentication of the user succeeds in authenticating the user, displaying, via the one or more display generation components, a success user interface indicative of successful authentication of the user.

42. The non-transitory computer-readable storage medium of claim 24, the one or more programs further including instructions for:

in response to performing the first authentication of the user:

in accordance with a determination that the first authentication of the user succeeds in authenticating the user, and in accordance with a determination that the request to authenticate the user corresponds to a request to unlock the computer system:

unlocking the computer system; and in accordance with a determination that the first authentication of the user succeeds in authenticating the user, and in accordance with a determination that the request to authenticate a user corresponds to a request to authorize a secure operation:

authorizing the secure operation.

43. The method of claim 25, further comprising:

in response to performing the first authentication of the user:

in accordance with the determination that the first authentication of the user fails to authenticate the user:

ceasing display of the first user interface object.

44. The method of claim 25, further comprising:

while displaying the second authentication user interface, detecting, via the one or more input devices, a first user input that corresponds to selection of a first displayed element in the second authentication user interface; and in response to detecting the first user input that corresponds to selection of the first displayed element in the second authentication user interface, receiving first user authentication information corresponding to the first displayed element.

45. The method of claim 25, wherein the second user interface object is displayed at a first position within the three-dimensional environment, and wherein the first position is determined based on a field of view of the user of the computer system at the time the first authentication was performed.

46. The method of claim 25, further comprising:

in response to performing the first authentication of the user:

in accordance with a determination that the first authentication of the user succeeds in authenticating the user, displaying, via the one or more display generation components, a success user interface indicative of successful user authentication, wherein the success user interface is different from the first authentication user interface and the second authentication user interface.

47. The method of claim 25, further comprising:

in response to performing the first authentication of the user, displaying, via the one or more display generation components, a visual animation that includes one or more visual changes to the first user interface object.

48. The method of claim 25, further comprising:

prior to performing the first authentication of the user, and while displaying the first user interface object, displaying, via the one or more display generation components, the three-dimensional environment with a first set of visual characteristics; and subsequent to performing the first authentication of the user, displaying, via the one or more display generation components, the three-dimensional environment with a second set of visual characteristics different from the first set of visual characteristics, wherein when the three-dimensional environment is displayed with the first set of visual characteristics, the three-dimensional environment is visually de-emphasized relative to when the three-dimensional environment is displayed with the second set of visual characteristics.

49. The method of claim 25, further comprising:

while displaying the first authentication user interface, including displaying the first user interface object:

in accordance with a determination that one or more pupils of a user to be authenticated are dilated by a first amount, causing the one or more display generation components to output a first amount of light; and in accordance with a determination that the one or more pupils of the user of the computer system are dilated by a second amount different from the first amount, causing the one or more display generation components to output a second amount of light.

50. The method of claim 25, wherein the first user interface object is a viewpoint-locked object that exhibits lazy follow behavior.

51. The method of claim 25, further comprising:

while displaying the second authentication user interface at a first position within the three-dimensional environment, detecting, via the one or more input devices, movement by the user; and in response to detecting the movement by the user:

in accordance with a determination that the movement by the user satisfies movement threshold criteria, re-positioning the second authentication user interface to a second position within the three-dimensional environment different from the first position to center the second authentication user interface within the field of view of the user.

52. The method of claim 25, further comprising:

while displaying the second authentication user interface, receiving user authentication information based on one or more user inputs, including:

detecting, via the one or more input devices, a user gaze corresponding to a first displayed element in the second authentication user interface;

while continuing to detect the user gaze corresponding to the first displayed element in the second authentication user interface, detecting, via the one or more input devices, a first pinch air gesture; and in response to detecting the first pinch air gesture while continuing to detect the user gaze corresponding to the first displayed element in the second authentication user interface, receiving first user authentication information corresponding to the first displayed element.

53. The method of claim 25, further comprising:

while displaying the second authentication user interface, receiving user authentication information based on one or more user inputs, including:

detecting, via the one or more input devices, a first air gesture that corresponds to selection of a first displayed element in the second authentication user interface; and in response to detecting the first air gesture corresponding to selection of the first displayed element in the second authentication user interface, receiving first user authentication information corresponding to the first displayed element.

54. The method of claim 25, further comprising:

while displaying the second authentication user interface:

detecting, via the one or more input devices, a user gaze corresponding to a first displayed element in the second authentication user interface; and in response to detecting the user gaze corresponding to the first displayed element:

in accordance with a determination that the user has gazed at the first displayed element for a threshold duration of time, entering first user authentication information corresponding to the first displayed element; and in accordance with a determination that the user has not gazed at the first displayed element for the threshold duration of time, forgoing entering the first user authentication information corresponding to the first displayed element.

55. The method of claim 25, further comprising:
while displaying the second authentication user interface, detecting, via the one or more input devices, a user input corresponding to selection of a first object in the second authentication user interface; and
in response to detecting the user input corresponding to selection of the first object in the second authentication user interface, performing biometric authentication of the user.

56. The method of claim 25, further comprising:
while displaying the second authentication user interface, detecting, via the one or more input devices, a user input corresponding to selection of a second object in the second authentication user interface; and
in response to detecting the user input corresponding to selection of the second object in the second authentication user interface, transitioning the computer system from a locked state to a guest mode state in which a first set of features are made accessible to the user without successful user authentication.

57. The method of claim 25, further comprising:
subsequent to displaying the first authentication user interface in the three-dimensional environment, performing a second authentication of the user; and
in response to performing the second authentication of the user:
in accordance with the determination that the second authentication of the user fails to authenticate the user, displaying, via the one or more display generation components, visual guidance instructing the user to change an eye gaze position of the user.

58. The method of claim 25, further comprising:
subsequent to displaying the first authentication user interface in the three-dimensional environment, performing a second authentication of the user; and
in response to performing the second authentication of the user:
in accordance with the determination that the second authentication of the user fails to authenticate the user, displaying, via the one or more display generation components, visual guidance instructing the user to change a physical position of the computer system relative to the body of the user; and
in accordance with a determination that the second authentication of the user succeeds in authenticating the user, displaying, via the one or more display generation components, a success user interface indicative of successful authentication of the user.

59. The method of claim 25, further comprising:
in response to performing the first authentication of the user:
in accordance with a determination that the first authentication of the user succeeds in authenticating the user, and in accordance with a determination that the request to authenticate the user corresponds to a request to unlock the computer system:
unlocking the computer system; and
in accordance with a determination that the first authentication of the user succeeds in authenticating the user, and in accordance with a determination that the request to authenticate a user corresponds to a request to authorize a secure operation:
authorizing the secure operation.

* * * * *